US012541277B2

(12) United States Patent
Louch et al.

(10) Patent No.: US 12,541,277 B2
(45) Date of Patent: Feb. 3, 2026

(54) SYSTEMS AND METHODS FOR INTERACTING WITH MULTIPLE APPLICATIONS ON AN ELECTRONIC DEVICE

(71) Applicant: Apple Inc., Cupertino, CA (US)

(72) Inventors: John O. Louch, Boulder, CO (US); Tuhin Kumar, Oakland, CA (US); Bryant A. Jow, San Mateo, CA (US); Shubham Kedia, San Francisco, CA (US); Chun Kin Minor Wong, San Jose, CA (US); Raymond S. Sepulveda, Portland, OR (US); Morgan A. Price, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/199,331

(22) Filed: May 18, 2023

(65) Prior Publication Data

US 2023/0393700 A1 Dec. 7, 2023

Related U.S. Application Data

(60) Provisional application No. 63/349,130, filed on Jun. 5, 2022.

(51) Int. Cl.
*G06F 3/0481* (2022.01)
*G06F 3/0486* (2013.01)
(Continued)

(52) U.S. Cl.
CPC .......... *G06F 3/0481* (2013.01); *G06F 3/0486* (2013.01); *G06F 3/04883* (2013.01); *G06F 3/04886* (2013.01)

(58) Field of Classification Search
CPC .. G06F 3/0481; G06F 3/0486; G06F 3/04883; G06F 3/04886
See application file for complete search history.

(56) References Cited

U.S. PATENT DOCUMENTS

| | | | |
|---|---|---|---|
| 6,717,520 | B1 | 4/2004 | Dorenbosch |
| 8,218,403 | B2 | 7/2012 | Scott et al. |

(Continued)

FOREIGN PATENT DOCUMENTS

| | | | |
|---|---|---|---|
| AU | 2019100493 A4 | 6/2019 | |
| CN | 102841755 A | 12/2012 | |

(Continued)

OTHER PUBLICATIONS

Pavel Pokorny et al., Graphics Visualization of Specific Dashboards in Transport Technologies, Jan. 11, 2017, International Conference on Mathematics and Computers in Sciences and in Industry, pp. 1-4 (Year: 2017).*

(Continued)

*Primary Examiner* — Tam T Tran
(74) *Attorney, Agent, or Firm* — Morgan, Lewis & Bockius LLP

(57) ABSTRACT

A method is performed at a computer system that is in communication with a display generation component and one or more input devices. A first set of one or more windows in an interactive mode, and a representation of a second set of one or more windows in a non-interactive mode are concurrently displayed. While a window is displayed in an interactive mode, the content of the window can be manipulated in response to user inputs. While a representation of a window is displayed in a non-interactive mode, the content of the window is not available to be manipulated in response to user inputs. An input selecting the representation of the second set of one or more windows is detected. In response to detecting the input, the first set of (Continued)

one or more windows in the interactive mode are ceased to be displayed. In response to detecting the input, one or more of the second set of one or more windows are displayed in the interactive mode concurrently with a representation of the first set of one or more windows displayed in a non-interactive mode.

46 Claims, 242 Drawing Sheets

(51) Int. Cl.
*G06F 3/04883* (2022.01)
*G06F 3/04886* (2022.01)

(56) References Cited

U.S. PATENT DOCUMENTS 8,446,337 B2 5/2013 Li
8,477,566 B2 7/2013 Lazaridis et al.
8,553,502 B2 10/2013 Lazaridis et al.
8,768,648 B2 7/2014 Panther et al.
9,032,013 B2 5/2015 Nukala et al.
9,406,103 B1 8/2016 Gray et al.
9,461,833 B1 10/2016 Marra et al.
9,541,986 B2 1/2017 Rohrweck
9,590,942 B1 3/2017 Yeskel et al.
9,693,311 B2 6/2017 Cardozo et al.
9,808,185 B2 11/2017 Arnold et al.
9,847,999 B2 12/2017 Van Os et al.
10,055,634 B2 8/2018 Han et al.
10,114,534 B2 10/2018 Kasterstein et al.
10,198,073 B2 2/2019 Chaudhri et al.
10,228,815 B2 3/2019 Forstall et al.
10,261,475 B1 4/2019 Kahn et al.
10,277,671 B2 4/2019 Passeri et al.
10,296,128 B1 5/2019 Nold et al.
10,311,745 B2 6/2019 Arnold et al.
10,334,054 B2 6/2019 Van Os et al.
10,338,773 B2 7/2019 Murarka et al.
10,410,035 B2 9/2019 Han et al.
10,521,107 B2 12/2019 Van Os et al.
10,860,207 B2 12/2020 Van Os et al.
11,137,904 B1 10/2021 Tyler et al.
11,354,034 B2 6/2022 Van Os et al.
11,861,159 B2 1/2024 Van Os et al.
2002/0078393 A1 6/2002 Parker
2003/0236935 A1 12/2003 Amemiya et al.
2005/0120306 A1 6/2005 Klassen et al.
2005/0154935 A1 7/2005 Jin
2005/0193143 A1 9/2005 Meyers et al.
2005/0249023 A1 11/2005 Bodlaender
2006/0116178 A1 6/2006 Vuong et al.
2006/0136828 A1 6/2006 Asano
2007/0150842 A1 6/2007 Chaudhri et al.
2007/0211877 A1 9/2007 Martin et al.
2007/0268784 A1 11/2007 Xu
2009/0027302 A1 1/2009 Li
2009/0143062 A1 6/2009 Skinner et al.
2009/0143114 A1 6/2009 Vargas et al.
2009/0282099 A1 11/2009 Romm et al.
2009/0284389 A1 11/2009 Klassen et al.
2009/0284482 A1 11/2009 Chin
2010/0295789 A1 11/2010 Shin et al.
2010/0313143 A1 12/2010 Jung et al.
2011/0115688 A1 5/2011 Yu
2011/0119630 A1 5/2011 Stroupe et al.
2011/0231499 A1 9/2011 Stovecek et al.
2011/0260997 A1 10/2011 Ozaki
2011/0283241 A1 11/2011 Miller et al.
2012/0096392 A1* 4/2012 Ording .................... G06F 9/451
715/783
2012/0112908 A1 5/2012 Prykari et al.
2012/0157165 A1 6/2012 Kim et al.
2012/0233563 A1 9/2012 Chakra et al.
2012/0252426 A1 10/2012 Nagaoka et al.
2012/0311466 A1 12/2012 Kluttz et al.
2012/0315960 A1 12/2012 Kim
2013/0024799 A1 1/2013 Fadell et al.
2013/0029729 A1 1/2013 Logan et al.
2013/0096768 A1 4/2013 Lovett et al.
2013/0100044 A1 4/2013 Zhao et al.
2013/0190032 A1 7/2013 Li
2013/0278484 A1* 10/2013 Hwang ................. G06F 3/1423
345/2.3
2013/0290757 A1 10/2013 Barlow et al.
2013/0332721 A1 12/2013 Chaudhri et al.
2013/0346408 A1 12/2013 Duarte et al.
2014/0055388 A1 2/2014 Yook et al.
2014/0068755 A1 3/2014 King et al.
2014/0106821 A1 4/2014 Nakahara
2014/0172996 A1 6/2014 Deeter et al.
2014/0232671 A1 8/2014 Chaudhri
2014/0245202 A1 8/2014 Yoon et al.
2014/0282174 A1 9/2014 Dempski
2014/0283142 A1 9/2014 Shepherd et al.
2014/0317530 A1 10/2014 Chang et al.
2014/0365919 A1 12/2014 Shaw et al.
2014/0365957 A1 12/2014 Louch et al.
2015/0067365 A1 3/2015 Nakazima et al.
2015/0094120 A1 4/2015 Suh et al.
2015/0105125 A1 4/2015 Min et al.
2015/0143266 A1 5/2015 Strode
2015/0186517 A1 7/2015 Gilad et al.
2015/0195789 A1 7/2015 Yoon et al.
2015/0205561 A1 7/2015 Morton et al.
2015/0249733 A1 9/2015 Miura
2015/0253894 A1 9/2015 McKenzie et al.
2015/0261423 A1 9/2015 Beaumont et al.
2015/0356045 A1 12/2015 Soffer
2016/0005290 A1 1/2016 Takahashi
2016/0022202 A1 1/2016 Peterson et al.
2016/0034695 A1 2/2016 Won et al.
2016/0065708 A1 3/2016 Yang et al.
2016/0077724 A1 3/2016 Lee et al.
2016/0124579 A1 5/2016 Tokutake
2016/0154549 A1 6/2016 Chaudhri et al.
2016/0235359 A1 8/2016 Cho et al.
2016/0248865 A1 8/2016 Dotan-Cohen et al.
2016/0255188 A1 9/2016 Chaudhri et al.
2016/0292989 A1 10/2016 Belk et al.
2016/0292994 A1 10/2016 Grimme et al.
2016/0337299 A1 11/2016 Lane et al.
2016/0357358 A1 12/2016 Forster et al.
2016/0357394 A1 12/2016 Tae et al.
2017/0011210 A1 1/2017 Cheong et al.
2017/0099602 A1 4/2017 Joo et al.
2017/0118162 A1 4/2017 Ratiu et al.
2017/0126609 A1 5/2017 Sharifi et al.
2017/0127009 A1 5/2017 Friedrich
2017/0127967 A1 5/2017 Garcia Molina et al.
2017/0185275 A1 6/2017 Ziegler et al.
2017/0189641 A1 7/2017 Moturu et al.
2017/0228114 A1 8/2017 Brett et al.
2017/0302609 A1 10/2017 Vardhan et al.
2017/0346303 A1 11/2017 Vanblon et al.
2017/0347946 A1 12/2017 Arnold et al.
2017/0347949 A1 12/2017 Arnold et al.
2017/0351396 A1 12/2017 Passeri et al.
2017/0352287 A1 12/2017 Arnold et al.
2017/0357217 A1 12/2017 Raymann et al.
2017/0357419 A1 12/2017 Raymann et al.
2017/0357439 A1 12/2017 Lemay et al.
2018/0032220 A1 2/2018 Anzures et al.
2018/0074693 A1 3/2018 Jones et al.
2018/0088787 A1 3/2018 Bereza et al.
2018/0088795 A1 3/2018 van Os et al.
2018/0088797 A1 3/2018 Mcatee et al.
2018/0101297 A1 4/2018 Yang et al.
2018/0109629 A1 4/2018 Van Os et al.
2018/0121409 A1 5/2018 Karunamuni et al.
2018/0164973 A1 6/2018 Kim et al.
2018/0173928 A1 6/2018 Han et al.
2018/0188925 A1 7/2018 Na et al.

(56) References Cited

U.S. PATENT DOCUMENTS

| | | | |
|---|---|---|---|
| 2018/0188935 A1 | 7/2018 | Singh et al. | |
| 2018/0225945 A1 | 8/2018 | Moravek et al. | |
| 2018/0226055 A1 | 8/2018 | Raymann et al. | |
| 2018/0227377 A1 | 8/2018 | Trivedi et al. | |
| 2018/0247440 A1 | 8/2018 | Heo et al. | |
| 2018/0267593 A1 | 9/2018 | Ramasamy et al. | |
| 2018/0336530 A1 | 11/2018 | Johnson et al. | |
| 2018/0351373 A1 | 12/2018 | Behzadi et al. | |
| 2019/0069154 A1 | 2/2019 | Booth et al. | |
| 2019/0097957 A1 | 3/2019 | Phanshikar et al. | |
| 2019/0150854 A1 | 5/2019 | Chung et al. | |
| 2019/0179493 A1 | 6/2019 | Goenka et al. | |
| 2019/0213060 A1 | 7/2019 | Raymann et al. | |
| 2019/0278901 A1 | 9/2019 | Lewis | |
| 2019/0289079 A1 | 9/2019 | Van Os et al. | |
| 2019/0302980 A1 | 10/2019 | Derks et al. | |
| 2019/0318608 A1 | 10/2019 | Rao et al. | |
| 2019/0342251 A1 | 11/2019 | Dascola et al. | |
| 2019/0342252 A1 | 11/2019 | Dascola et al. | |
| 2019/0342447 A1 | 11/2019 | Ko et al. | |
| 2019/0361714 A1 | 11/2019 | Rothkopf | |
| 2020/0012423 A1 | 1/2020 | Cinek et al. | |
| 2020/0098300 A1 | 3/2020 | Verma et al. | |
| 2020/0120201 A1 | 4/2020 | Siritzky | |
| 2020/0133477 A1 | 4/2020 | Van Os et al. | |
| 2020/0228616 A1 | 7/2020 | Nishikawa et al. | |
| 2020/0333994 A1 | 10/2020 | Sepulveda et al. | |
| 2021/0019437 A1 | 1/2021 | Neves Creto | |
| 2021/0048933 A1* | 2/2021 | Shah | G06F 3/1423 |
| 2021/0051226 A1 | 2/2021 | Ko et al. | |
| 2021/0060429 A1 | 3/2021 | Juenger et al. | |
| 2021/0122469 A1 | 4/2021 | Wu | |
| 2021/0173664 A1 | 6/2021 | Bai et al. | |
| 2021/0216201 A1 | 7/2021 | Van Os et al. | |
| 2021/0349617 A1 | 11/2021 | Crowley et al. | |
| 2021/0349618 A1 | 11/2021 | Crowley et al. | |
| 2021/0349619 A1 | 11/2021 | Crowley et al. | |
| 2022/0272420 A1* | 8/2022 | Tucker | H04N 21/64738 |
| 2022/0365640 A1 | 11/2022 | Graham et al. | |
| 2022/0391158 A1 | 12/2022 | Lemmens et al. | |
| 2022/0404963 A1 | 12/2022 | Van Os et al. | |
| 2023/0035905 A1 | 2/2023 | Dascola et al. | |
| 2023/0161470 A1 | 5/2023 | Crowley et al. | |
| 2023/0325067 A1 | 10/2023 | Zhou et al. | |
| 2023/0367452 A1 | 11/2023 | Graham et al. | |
| 2024/0126429 A1 | 4/2024 | Van Os et al. | |
| 2024/0406304 A1 | 12/2024 | Foss et al. | |
| 2024/0430225 A1 | 12/2024 | Dascola et al. | |

FOREIGN PATENT DOCUMENTS

| | | | |
|---|---|---|---|
| CN | 103297939 | A | 9/2013 |
| CN | 103514416 | A | 1/2014 |
| CN | 104350794 | A | 2/2015 |
| CN | 105791545 | A | 7/2016 |
| CN | 106022062 | A | 10/2016 |
| CN | 106027363 | A | 10/2016 |
| CN | 106250133 | A | 12/2016 |
| CN | 106462358 | A | 2/2017 |
| CN | 107491257 | A | 12/2017 |
| CN | 107968885 | A | 4/2018 |
| EP | 3 312 713 | A1 | 4/2018 |
| JP | H10-106344 | A | 4/1998 |
| JP | 2011-509541 | A | 3/2011 |
| JP | 2011-227821 | A | 11/2011 |
| JP | 4860505 | B2 | 1/2012 |
| JP | 2013157744 | | 8/2013 |
| JP | 2015-045902 | A | 3/2015 |
| JP | 2015-188275 | A | 10/2015 |
| JP | 2016-105630 | A | 6/2016 |
| JP | 2017-126067 | A | 7/2017 |
| JP | 2017-208112 | A | 11/2017 |
| JP | 2018-185830 | A | 11/2018 |
| JP | 2019-111181 | A | 7/2019 |
| JP | 2020010511 | A | 1/2020 |
| KR | 2016-0000793 | A | 1/2016 |
| KR | 2019/0115734 | A | 10/2019 |
| KR | 2014-0125671 | A | 9/2025 |
| WO | WO 2013/184530 | A1 | 12/2013 |
| WO | WO 2014/029361 | A1 | 2/2014 |
| WO | WO 2016/200584 | A1 | 12/2016 |
| WO | WO 2017/027526 | A1 | 2/2017 |
| WO | WO 2017/052043 | A1 | 3/2017 |
| WO | WO 2018/191972 | A1 | 10/2018 |
| WO | WO 2019/217020 | A1 | 11/2019 |
| WO | WO 2019/217196 | A2 | 11/2019 |
| WO | WO 2020/242882 | A1 | 12/2020 |

OTHER PUBLICATIONS

Albert Nagy et al., Review of Predictive Analytics Vendors for Transport Management Systems, Sep. 1, 2017, International Symposium on Intelligent Systems and Informatics, pp. 1-6 (Year: 2017).*

Office Action, dated Sep. 7, 2023, received in Australian Patent Application No. 2022203663, which corresponds with U.S. Appl. No. 18/100,530, 4 pages.

Office Action, dated Oct. 10, 2023, received in U.S. Appl. No. 17/940,858, 32 pages.

Patent, dated Aug. 29, 2023, received in Korean Patent Application No. 2022-7032607, which corresponds with U.S. Appl. No. 17/940,858, 4 pages.

Office Action, dated Sep. 19, 2023, received in Korean Patent Application No. 2023-7029431, 9 pages.

Invitation to Pay Additional Fees, dated Sep. 20, 2023, received in International Patent Application No. PCT/US2023/021750, 10 pages.

Final Office Action, dated Oct. 19, 2023, received in U.S. Appl. No. 17/483,751, 51 pages.

Office Action, dated Dec. 4, 2023, received in Japanese Patent Application No. 2022-135135, which corresponds with U.S. Appl. No. 18/100,530, 6 pages.

Invitation to Pay Additional Fees, dated Oct. 2, 2023, received in International Patent Application No. PCT/US2023/024363, 15 pages.

Office Action, dated Jan. 5, 2024, received in Korean Patent Application No. 2020-0123965, which corresponds with U.S. Appl. No. 16/948,370, 3 pages.

Office Action, dated Apr. 20, 2023, received in Korean Patent Application No. 2020-0123973, which corresponds with U.S. Appl. No. 16/948,375, 5 pages.

Final Office Action, dated Jan. 12, 2024, received in Korean Patent Application No. 2020-0123973, which corresponds with U.S. Appl. No. 16/948,375, 5 pages.

Office Action, dated May 7, 2024, received in U.S. Appl. No. 18/100,530, 28 pages.

Notice of Allowance, dated Apr. 8, 2024, received in Japanese Patent Application No. 2022-135135, which corresponds with U.S. Appl. No. 18/100,530, 2 pages.

Notice of Allowance, dated Apr. 8, 2024, received in U.S. Appl. No. 17/940,858, 9 pages.

Notice of Allowance, dated Jan. 5, 2024, received in Japanese Patent Application No. 2020-142215, which corresponds with U.S. Appl. No. 17/940,858, 2 pages.

Patent, dated Jan. 25, 2024, received in Japanese Patent Application No. 2020-142215, which corresponds with U.S. Appl. No. 17/940,858, 3 pages.

Notice of Allowance, dated May 29, 2024, received in Korean Patent Application No. 2023-7029431, 3 pages.

International Search Report and Written Opinion, dated Nov. 23, 2023, received in International Patent Application No. PCT/US2023/024363, which corresponds with U.S. Appl. No. 18/199,331, 20 pages.

Office Action, dated Jul. 1, 2024, received in Korean Patent Application No. 2020-0123973, which corresponds with U.S. Appl. No. 16/948,375, 5 pages.

Office Action, dated Jul. 24, 2024, received in U.S. Appl. No. 18/144,749, 31 pages.

(56) References Cited

OTHER PUBLICATIONS

7Labs, "How to Change Wallpaper Automatically on iPhone or iPad", https://7lads.io/mobile/iphone/change-wallpaper-automatically-on-ios-or-ipados.html, Dec. 6, 2020, 9 pages.
Samsung, "How to Use the Focus Mode Feature in Android Q with One UI 2.0?", http://www.samsung.com/ae/support/mobile-devices/how-to-use-the-focus-mode-feature-in-android-q-with-one-ui-20/, Nov. 22, 2021, 4 pages.
Notice of Allowance, dated Aug. 4, 2023, received in U.S. Appl. No. 17/831,384, 8 pages.
Office Action, dated Jul. 9, 2024, received in U.S. Appl. No. 18/398,059, 10 pages.
Patent, dated Jan. 10, 2025, received in Korean Patent Application No. 2020-0123965, which corresponds with U.S. Appl. No. 16/948,370, 3 pages.
Notice of Allowance, dated Feb. 24, 2025, received in U.S. Appl. No. 17/084,579, 7 pages.
Notice of Allowance, dated Jan. 22, 2025, received in U.S. Appl. No. 17/483,751, 11 pages.
Final Office Action, dated Feb. 3, 2025, received in U.S. Appl. No. 18/144,749, 30 pages.
Final Office Action, dated Feb. 6, 2025, received in U.S. Appl. No. 18/100,530, 30 pages.
Notice of Allowance, dated Jan. 31, 2025, received in Japanese Patent Application No. 2024-008169, 2 pages.
Notice of Allowance, dated Jan. 15, 2025, received in U.S. Appl. No. 18/398,059, 8 pages.
Amadeo, "Google Pixel 3 hands-on—Not the best first impression", https://arstechnica.com/gadgets/2028/10/scratching-the-surface-of-googles-newest-smartphone-hands-on-with-the-pixel-3#h1, 16 pages.
Android, Ambient Mode: Android's Proactive Google Assistant, https://www.youtube.com/watch?v=vaRzJo_19nY, 2 pages.
Johnson, "Google Pixel Stand (2nd gen) review: nice but not a must-have", https://www.theverge.com/22894924/google-pixel-stand-2nd_gen_review_price-specs, 11 pages.
MGT—Max Games Tech, How to Change Watch faces on Apple Watch 6 (Use Swipe or Digital Crown), https://www.youtube.com/watch?v=N2YmeYy4Z9c, 2021, 2 pages.
Wells, "Google Assistant's Ambient Mode: What It Is and How to Use It", https://www.lifewire.com/ambient-mode-in-google-assistant-5191407, 8 pages.
Notice of Allowance, dated Nov. 21, 2024, received in Korean Patent Application No. 2020-0123965, which corresponds with U.S. Appl. No. 16/948,370, 3 pages.
Notice of Allowance, dated Sep. 13, 2024, received in Korean Patent Application No. 2020-0123973, which corresponds with U.S. Appl. No. 16/948,375, 2 pages.
Notice of Allowance, dated Sep. 16, 2024, received in U.S. Appl. No. 17/483,751, 11 pages.
Office Action, dated Nov. 12, 2024, received in Chinese Patent Application No. 202111351532.6, 1 page.
Office Action, dated Jul. 31, 2024, received in Korean Patent Application No. 2024-7024732, 7 pages.
Invitation to Pay Additional Fees, dated Sep. 28, 2022, received in International Patent Application No. PCT/US2022/032204, which corresponds with U.S. Appl. No. 17/831,377, 16 pages.
International Search Report and Written Opinion, dated Jan. 17, 2023, received in International Patent Application No. PCT/US2022/032204, which corresponds with U.S. Appl. No. 17/831,377, 30 pages.
Office Action, dated Sep. 19, 2023, received in U.S. Appl. No. 17/831,377, 19 pages.
Final Office Action, dated May 16, 2024, received in U.S. Appl. No. 17/831,377, 22 pages.
Office Action, dated Feb. 13, 2025, received in Korean Patent Application No. 2024-7000365, which corresponds with U.S. Appl. No. 17/831,377, 8 pages.
Amadeo, "Twitter Post [online]", https://twitter.com/ronamadeo/status/972152445848694789, Mar. 9, 2018, 2 pages.
Anonymous, "Create a Group of Notifications / Android Developers", https://web.archive.org/20181028202552/https://devloper.android.com/training/notif-user/group, Oct. 27, 2018, 5 pages.
Apple, "iPhone User Guide for iOS 7.1 Software", https://manuals.info.apple.com/en_US/iphone_ios7_user_guide.pdf, Mar. 10, 2014, 162 pages.
Apple, "Stay Focused While Driving with iPhone", https://support.apple.com/guide/iphone/turn-on-do-not-disturb-while-driving-iphae754533b/ios#:~:text=Send%20an%20auto%2Dreply%20text%20message%20that%20you're%20driving&text=Go%20to%20Settings%20%3E%20Do%20Not%20Disturb%20%3E%20Auto%2DReply%20To,re%20not%20in%20your%20Contacts, 2022, 2 pages.
Black, "Samsung Galaxy S7 Silent Alarm Fix", https://www.youtube.com/watch?v=35LQtw7ucaw, Jan. 20, 2017, 4 pages.
Bohn, "Why Android Notifications Are Better Than The iPhone's", https://www.youtube.com/watch?v=bHtkjHSB5Nw, Apr. 18, 2018, 10 pages.
Cnet, "Android Lollipop Lock-Screen Notification Tips", https://www.youtube.com/watch?v=LZTxHBOwzIU, Nov. 13, 2014, 3 pages.
Droid Life, "Android 5.0 Feature: Notification Access and Do Not Disturb", https://www.youtube.com/watch?v=SY2kAqCqOko, Oct. 17, 2014, 2 pages.
Frick, "Automatically Turn on Theater Mode on Android Wear Watch When Sleep Tracking", https://forum.urbandroid.org/t/automatically-turn-on-theater-mode-on-android-wear-watch-when-sleep-tracking/398, Mar. 6, 2018, 2 pages.
Google, "Limit Interruptions with Do Not Disturb on Android" https://support.google.com/android/answer/9069335?hl=en#zippy=%2Cset-what-to-block, 2022, 2 pages.
Hill, "From Oreo to Jelly Bean, Here's How to Turn Off Notifications in Android", https://web.archive.org/web/20180503062117/https://www.ditaltrends.com/android/how-to-turn-off-notifications-in-android, May 3, 2018, 10 pages.
Hill, Here's How to Use Do Not Disturb Mode in Android, https://web.archive.org/web/20180313165228/https://www.digitaltrends.com/mobile/do-not-disturb-mode-in-android, Mar. 13, 2018, 6 pages.
Hill, "How to Turn Off Notifications in Andoid", http://web.archive.org/web/20180203023547/https://www.digitaltrends.com/android/how-to-turn-off-notifications-in-android, Dec. 28, 2017, 16 pages.
IPhoneHacksTV, How to Group Notifications by App in iOS 9 Notification Center—iPhone Hacks, https://www.youtube.com/watch?v=j9kEN1_1yh8, Sep. 16, 2015, 2 pages.
IPhoneTricks.org, "How to Snooze or Stop an iPhone Alarm Without Looking at the Display?", https://www.iphonetricks.org/how-to-snooze-or-stop-an-iphone-alarm-without-looking-at-the-display, Nov. 29, 2016, 5 pages.
Isom, "How to Change iPhone Notification Settings", https://www.youtube.com/watch?v=P2Z4dvieB5k, Mar. 16, 2017, 3 pages.
Jason, "New i0S 8 Features that Apple Didn't Have Time to Tell US About Today", https://web.archive.org/web/20171018064601-features-hidden.html, Jun. 2, 2014, 7 pages.
Klein, "How Manage, Customize, and Block Notifications in Android Lollipop and Marshmellow", http://web.archive.org/web/20171229125502/https:www.howtogeek.com/202404/how-to-tame-notifications-in-android-5.0, Sep. 29, 2016, 11 pages.
Lew, "Correctly Handling Bundled Android Notifications", https://web.archive.org/web/20171210085025/https://blog.danlew.net/20171018064601/http://, Feb. 7, 2017, 5 pages.
MacRumors, "iOS 11: How to Use the Lock Screen and Notification Center", https://www.youtube.com/watch?v=BQDyGNO9oGc, Sep. 19, 2017, 4 pages.
Mcfasa09, "Toggle Theater Mode on Wear 2.0", https://www.reddit.com/r/AndroidWear/comments/64qitr/toggle_theater_mode_on_wear_20, Mar. 18, 2014, 3 pages.
Mediati, "Master Notifications in Android Lollipop with Notification Priority and Downtime", https:/web.archive.org/web/20180503062117/https://www.digitaltrends.com/android/how-to-turn-off-notifications-in-android, Dec. 3, 2014, 7 pages.
Phandroid, "Do Not Disturb" mode will save you from notification hell, https://www.youtube.com/watch?v=R6A2As4VJpl, Jan. 16, 2017, 3 pages.

(56) References Cited

OTHER PUBLICATIONS

Raphael, "Oh, Oreo! 8 Things to Try When You Get Andoid 8.0", https://web.archive.org/web/20171224100520/https://www.computerworld.com/article/32191126/android/oreo-android-8, Aug. 24, 2017, 10 pages.
Rosenbaun, "How to Keep your Apple Watch Quiet", https://www.theverge.com/2019/10/24/20930506/how-to-apple-watch-do-not-disturb-iphone-quiet-mute-theater-mode, Oct. 24, 2019, 8 pages.
Samsung, "Samsung Goodnight Mode", https:/www.samsung.com/US/support/answer/ANS00080310, 1995-2021, 2 pages.
Sony Xperia Z, "How to turn off alarm when it sounds", https://www.youtube.com/watch?v=eerWJMN7e5s, May 14, 2015, 3 pages.
Summerson, 'Android's Confusing "Do Not Disturb" Settings, Explained', https://www.howtogeek.com/260225/androids-confusing-do-not-disturb-settings-explained, Jul. 3, 2017, 8 pages.
Tantsissa Holdings, "Autosleep Seep Rings", http://autosleep.tantsissa.com/sleeprings, 2016-2010, 6 pages.
Tropical Tech, How to Set Up Do Not Disturb Mode Rules / Schedule in Android / 2018, http://www.youtube.com/watch?v=DLnGcpKHVyM, Sep. 4, 2017, 3 pages.
VikuBalupura, "[Android] Hands-On With Android P—Is This The Beginning of a New Design Language?", http://en.miui.com/thread-1995365-1-1.html, Mar. 10, 2018, 11 pages.
Wallen, "How to Customize Androlid Oreo Notifications With Categories", http://web.archive.org/web/20171017232141/https://www.techrepublic.com/article/how-to-customize-android-oreo-notifications-with-categories, Oct. 17, 2017, 14 pages.
Wayback Machine, "Nights Keeper", http://nightskeeper.com/?page_id=15, 2013, 9 pages.
Whitwam, Android N Feature Spotlight: Do Not Disturb Automatic Rules Get Option ToEnd DND on Next Alarm, https://www.androidpolice.com/2016/03/11/android-n-feature-spotlight-do-not-disturb-gets-option-to-end-automatically-on-next-alarm/, Mar. 11, 2016, 5 pages.
Whitwarm, "Android P Feature Spotlight: Android Will Offer to Hide Notifications From Apps You Frequently Dismiss", https://www.androidpolice.com/2018/03/12/android-P-feature-spotlight-android-will-offer-hide-notifications-apps-frequently-dismiss, Mar. 12, 2018, 5 pages.
Woodpress, "Features—Lighting Launcher", https://www.lightninglauncher.com/wordpress/features, 2021, 3 pages.
XDA Spotlight, "Lock Me Out", https://www.xda-developers.com/curb-android-smartphone-addiction-lock-me-out, Apr. 16, 2018, 7 pages.
YouTube, "Notification Digest", https://support.google.com/youtube/answer/9012820_at_00:38, Dec. 29, 2018, 1 page.
Notice of Allowance, dated Apr. 19, 2019, received in U.S. Appl. No. 15/707,757, 8 pages.
Notice of Allowance, dated Aug. 6, 2019, received in U.S. Appl. No. 15/707,757, 8 pages.
Office Action, dated Jan. 16, 2020, received in U.S. Appl. No. 16/142,599, 13 pages.
Notice of Allowance, dated Jul. 16, 2020, received in U.S. Appl. No. 16/142,599, 7 pages.
Notice of Allowance, dated Sep. 18, 2020, received in U.S. Appl. No. 16/142,599, 7 pages.
Office Action, dated Nov. 6, 2020, received in Chinese Patent Application No. 202010095124.8, which corresponds with U.S. Appl. No. 16/142,599, 11 pages.
Office Action, dated Jul. 7, 2021, received in Chinese Patent Application No. 202010095124.8, which corresponds with U.S. Appl. No. 16/142,599, 1 page.
Notice of Allowance, dated Aug. 9, 2021, received in Chinese Patent Application No. 202010095124.8, which corresponds with U.S. Appl. No. 16/142,599, 2 pages.
Patent, dated Oct. 29, 2021, received in Chinese Patent Application No. 202010095124.8, which corresponds with U.S. Appl. No. 16/142,599, 5 pages.
Office Action, dated Aug. 27, 2018, received in Danish Patent Application No. 201870333, which corresponds with U.S. Appl. No. 16/142,599, 9 pages.
Office Action, dated Nov. 12, 2018, received in Danish Patent Application No. 201870333, which corresponds with U.S. Appl. No. 16/142,599, 3 pages.
Office Action, dated May 14, 2019, received in Danish Patent Application No. 201870333, which corresponds with U.S. Appl. No. 16/142,599, 6 pages.
Office Action, dated Nov. 15, 2019, received in Danish Patent Application No. 201870333, 2 pages.
Intention to Grant, dated Dec. 19, 2019, received in Danish Patent Application No. 201870333, 2 pages.
Notice of Allowance, dated Apr. 2, 2020, received in Danish Patent Application No. 201870333, 4 pages.
Patent, dated May 15, 2020, received in Danish Patent Application No. 201870333, which corresponds with U.S. Appl. No. 16/142,599, 5 pages.
Office Action, dated Sep. 9, 2022, received in European Patent Application No. 1972341.6, which corresponds with U.S. Appl. No. 16/142,599, 8 Pages.
Office Action, dated Apr. 3, 2020, received in U.S. Appl. No. 16/145,068, 35 pages.
Final Office Action, dated Nov. 30, 2020, received in U.S. Appl. No. 16/145,068, 44 pages.
Office Action, dated Jul. 12, 2021, received in U.S. Appl. No. 16/145,068, 82 pages.
Notice of Allowance, dated Feb. 28, 2022, received in U.S. Appl. No. 16/145,068, 25 pages.
Notice of Allowance, dated Jul. 12, 2022, received in U.S. Appl. No. 16/145,068, 9 pages.
Office Action, dated Aug. 29, 2018, received in Danish Patent Application No. 201870334, which corresponds with U.S. Appl. No. 16/145,068, 9 pages.
Office Action, dated Mar. 5, 2019, received in Danish Patent Application No. 201870334, which corresponds with U.S. Appl. No. 16/145,068, 6 pages.
Office Action, dated Sep. 6, 2019, received in Danish Patent Application No. 201870334, which corresponds with U.S. Appl. No. 16/145,068, 4 pages.
Office Action, dated Apr. 22, 2020, received in Danish Patent Application No. 201870334, which corresponds with U.S. Appl. No. 16/145,068, 2 pages.
Office Action, dated Apr. 6, 2020, received in U.S. Appl. No. 16/145,074, 22 pages.
Final Office Action, dated Nov. 16, 2020, received in U.S. Appl. No. 16/145,074, 33 pages.
Office Action, dated Jun. 28, 2021, received in U.S. Appl. No. 16/145,074, 39 pages.
Notice of Allowance, dated Mar. 11, 2022, received in U.S. Appl. No. 16/145,074, 27 pages.
Notice of Allowance, dated Jul. 28, 2022, received in U.S. Appl. No. 16/145,074, 27 pages.
Office Action, dated Apr. 16, 2021, received in Australian Patent Application No. 2019265367, U.S. Appl. No. 16/145,074, 3 pages.
Notice of Allowance, dated Jan. 18, 2022, received in Australian Patent Application No. 2019265367, U.S. Appl. No. 16/145,074, 3 pages.
Certificate of Grant, dated May 19, 2022, received in Australian Patent Application No. 2019265367, U.S. Appl. No. 16/145,074, 3 pages.
Office Action, dated Jan. 24, 2022, received in Chinese Patent Application No. 201811165505.8, which corresponds with U.S. Appl. No. 16/145,074, 1 page.
Office Action, dated Oct. 19, 2022, received in Chinese Patent Application No. 201811165505.8, which corresponds with U.S. Appl. No. 16/145,074, 2 pages.
Notice of Allowance, dated Jan. 28, 2023, received in Chinese Patent Application No. 201811165505.8, which corresponds with U.S. Appl. No. 16/145,074, 2 pages.
Patent, dated Jun. 27, 2023, received in Chinese Patent Application No. 201811165505.8, which corresponds with U.S. Appl. No. 16/145,074, 5 pages.

(56) References Cited

OTHER PUBLICATIONS

Office Action, dated Aug. 31, 2018, received in Danish Patent Application No. 201870335, which corresponds with U.S. Appl. No. 16/145,074, 9 pages.
Office Action, dated Dec. 20, 2018, received in Danish Patent Application No. 201870335, which corresponds with U.S. Appl. No. 16/145,074, 4 pages.
Office Action, dated Aug. 28, 2019, received in Danish Patent Application No. 201870335, which corresponds with U.S. Appl. No. 16/145,074, 5 pages.
Office Action, dated Apr. 20, 2020, received in Danish Patent Application No. 201870335, which corresponds with U.S. Appl. No. 16/145,074, 4 pages.
Office Action, dated Dec. 10, 2021, received in Japanese Patent Application No. 2020-557940, which corresponds with U.S. Appl. No. 16/145,074, 2 pages.
Notice of Allowance, dated Aug. 8, 2022, received in Japanese Patent Application No. 2020-557940, which corresponds with U.S. Appl. No. 16/145,074, 1 page.
Patent, dated Sep. 9, 2022, received in Japanese Patent Application No. 2020-557940, which corresponds with U.S. Appl. No. 16/145,074, 3 pages.
Office Action, dated Nov. 30, 2021, received in Korean Patent Application No. 2020-7037439, which corresponds with U.S. Appl. No. 16/145,074, 3 pages.
Notice of Allowance, dated Jul. 28, 2022, received in Korean Patent Application No. 2020-7037439, which corresponds with U.S. Appl. No. 16/145,074, 3 pages.
Office Action, dated Jul. 13, 2020, received in U.S. Appl. No. 16/730,921, 7 pages.
Notice of Allowance, dated Jul. 29, 2020, received in U.S. Appl. No. 16/730,921, 8 pages.
Office Action, dated Aug. 12, 2021, received in U.S. Appl. No. 16/948,370, 35 pages.
Final Office Action, dated Apr. 5, 2022, received in U.S. Appl. No. 16/948,370, 44 pages.
Notice of Allowance, dated Sep. 7, 2022, received in U.S. Appl. No. 16/948,370, 12 pages.
Notice of Allowance, dated Jan. 17, 2023, received in U.S. Appl. No. 16/948,370, 13 pages.
Office Action, dated Jun. 25, 2021, received in Australian Patent Application No. 2020233622, which corresponds with U.S. Appl. No. 16/948,370, 8 pages.
Notice of Allowance, dated Feb. 22, 2022, received in Australian Patent Application No. 2020233622, which corresponds with U.S. Appl. No. 16/948,370, 3 pages.
Office Action, dated Dec. 18, 2020, received in Danish Patent Application No. 2020-70595, which corresponds with U.S. Appl. No. 16/948,370, 9 pages.
Office Action, dated Sep. 30, 2021, received in Danish Patent Application No. 2020-70595, which corresponds with U.S. Appl. No. 16/948,370, 5 pages.
Office Action, dated May 19, 2022, received in Danish Patent Application No. 2020-70595, which corresponds with U.S. Appl. No. 16/948,370, 2 pages.
Intention to Grant, dated Nov. 3, 2022, received in Danish Patent Application No. 2020-70595, which corresponds with U.S. Appl. No. 16/948,370, 2 pages.
Patent, dated Jun. 20, 2023, received in Danish Patent Application No. 2020-70595, which corresponds with U.S. Appl. No. 16/948,370, 8 pages.
Office Action, dated Dec. 2, 2021, received in Indian Patent Application No. 202014040025, which corresponds with U.S. Appl. No. 16/948,370, 8 pages.
Office Action, dated Mar. 4, 2022, received in Japanese Patent Application No. 2020-160012, which corresponds with U.S. Appl. No. 16/948,370, 2 pages.
Notice of Allowance, dated Jan. 6, 2023, received in Japanese Patent Application No. 2020-160012, which corresponds with U.S. Appl. No. 16/948,370, 2 pages.
Patent, dated Jan. 26, 2023, received in Japanese Patent Application No. 2020-160012, which corresponds with U.S. Appl. No. 16/948,370, 3 pages.
Office Action, dated Apr. 20, 2023, received in Korean Patent Application No. 2020-0123965, which corresponds with U.S. Appl. No. 16/948,370, 4 pages.
Office Action, dated Feb. 1, 2021, received in U.S. Appl. No. 16/948,374, 27 pages.
Final Office Action, dated Jun. 11, 2021, received in U.S. Appl. No. 16/948,374, 29 pages.
Office Action, dated Dec. 29, 2021, received in U.S. Appl. No. 16/948,374, 29 pages.
Final Office Action, dated May 6, 2022, received in U.S. Appl. No. 16/948,374, 27 pages.
Notice of Allowance, dated Sep. 28, 2022, received in U.S. Appl. No. 16/948,374, 13 pages.
Office Action, dated May 11, 2021, received in Australian Patent Application No. 2020239686, which corresponds with U.S. Appl. No. 16/948,374, 4 pages.
Notice of Allowance, dated Oct. 7, 2021, received in Australian Patent Application No. 2020239686, which corresponds with U.S. Appl. No. 16/948,374, 3 pages.
Patent, dated Feb. 10, 2022, received in Australian Patent Application No. 2020239686, which corresponds with U.S. Appl. No. 16/948,374, 3 pages.
Innovation Patent, dated Jun. 9, 2021, received in Australian Patent Application No. 2021102471, which corresponds with U.S. Appl. No. 16/948,374, 5 pages.
Office Action, dated Jul. 30, 2021, received in Australian Patent Application No. 2021102471, which corresponds with U.S. Appl. No. 16/948,374, 4 pages.
Innovation Patent, dated Jan. 31, 2022, received in Australian Patent Application No. 2021102471, which corresponds with U.S. Appl. No. 16/948,374, 3 pages.
Office Action, dated Dec. 21, 2020, received in Danish Patent Application No. 2020-70599, which corresponds with U.S. Appl. No. 16/948,374, 8 pages.
Office Action, dated Oct. 4, 2021, received in Danish Patent Application No. 2020-70599, which corresponds with U.S. Appl. No. 16/948,374, 2 pages.
Office Action, dated Jun. 2, 2022, received in Danish Patent Application No. 2020-70599, which corresponds with U.S. Appl. No. 16/948,374, 2 pages.
Office Action, dated Dec. 1, 2021, received in Indian Patent Application No. 202014040935, which corresponds with U.S. Appl. No. 16/948,374, 9 pages.
Office Action, dated Nov. 30, 2021, received in Japanese Patent Application No. 2020-160013, which corresponds with U.S. Appl. No. 16/948,374, 2 pages.
Notice of Allowance, dated Sep. 22, 2022, received in Japanese Patent Application No. 2020-160013, which corresponds with U.S. Appl. No. 16/948,374, 2 pages.
Patent, dated Oct. 21, 2022, received in Japanese Patent Application No. 2020-160013, which corresponds with U.S. Appl. No. 16/948,374, 2 pages.
Office Action, dated May 29, 2022, received in Korean Patent Application No. 2020-0123967, which corresponds with U.S. Appl. No. 16/948,374, 3 pages.
Notice of Allowance, dated Dec. 26, 2022, received in Korean Patent Application No. 2020-0123967, which corresponds with U.S. Appl. No. 16/948,374, 2 pages.
Patent, dated Mar. 24, 2023, received in Korean Patent Application No. 2020-0123967, which corresponds with U.S. Appl. No. 16/948,374, 5 pages.
Office Action, dated Jan. 8, 2021, received in U.S. Appl. No. 16/948,375, 19 pages.
Final Office Action, dated Mar. 9, 2021, received in U.S. Appl. No. 16/948,375, 19 pages.
Notice of Allowance, dated Jun. 24, 2021, received in U.S. Appl. No. 16/948,375, 6 pages.
Notice of Allowance, dated Oct. 26, 2021, received in U.S. Appl. No. 16/948,375, 5 pages.

(56) References Cited

OTHER PUBLICATIONS

Office Action, dated Apr. 13, 2021, received in Australian Patent Application No. 2020239689, which corresponds with U.S. Appl. No. 16/948,375, 8 pages.
Notice of Allowance, dated Oct. 5, 2021, received in Australian Patent Application No. 2020239689, which corresponds with U.S. Appl. No. 16/948,375, 3 pages.
Patent, dated Feb. 10, 2022, received in Australian Patent Application No. 2020239689, which corresponds with U.S. Appl. No. 16/948,375, 3 pages.
Office Action, dated Jan. 11, 2021, received in Danish Patent Application No. 2020-70629, which corresponds with U.S. Appl. No. 16/948,375, 10 pages.
Office Action, dated Sep. 15, 2022, received in Danish Patent Application No. 2020-70629, which corresponds with U.S. Appl. No. 16/948,375, 5 pages.
Office Action, dated Dec. 1, 2021, received in Indian Patent Application No. 202014040936, which corresponds with U.S. Appl. No. 16/948,375, 10 pages.
Office Action, dated Dec. 6, 2021, received in Japanese Patent Application No. 2020-160014, which corresponds with U.S. Appl. No. 16/948,375, 2 pages.
Notice of Allowance, dated Jul. 29, 2022, received in Japanese Patent Application No. 2020-160014, which corresponds with U.S. Appl. No. 16/948,375, 2 pages.
Patent, dated Aug. 30, 2022, received in Japanese Patent Application No. 2020-160014, which corresponds with U.S. Appl. No. 16/948,375, 4 pages.
Office Action, dated Apr. 22, 2022, received in U.S. Appl. No. 17/084,579, 10 pages.
Office Action, dated May 5, 2022, received in U.S. Appl. No. 17/084,579, 11 pages.
Final Office Action, dated Oct. 11, 2022, received in U.S. Appl. No. 17/084,579, 12 pages.
Office Action, dated Jul. 26, 2021, received in U.S. Appl. No. 17/112,883, 9 pages.
Notice of Allowance, dated Feb. 4, 2022, received in U.S. Appl. No. 17/112,883, 8 pages.
Office Action, dated Jul. 27, 2022, received in U.S. Appl. No. 17/483,751, 30 pages.
Final Office Action, dated Dec. 20, 2022, received in U.S. Appl. No. 17/483,751, 43 pages.
Office Action, dated Apr. 14, 2023, received in U.S. Appl. No. 17/483,751, 43 pages.
Notice of Allowance, dated Feb. 2, 2022, received in U.S. Appl. No. 17/483,757, 35 pages.
Notice of Allowance, dated Mar. 30, 2022, received in U.S. Appl. No. 17/483,757, 5 pages.
Office Action, dated May 18, 2023, received in Australian Patent Application No. 2022203663, which corresponds with U.S. Appl. No. 18/100,530, 3 pages.
Office Action, dated Feb. 7, 2023, received in U.S. Appl. No. 17/831,384, 9 pages.
Office Action, dated Nov. 21, 2022, received in Korean Patent Application No. 2022-7032607, which corresponds with U.S. Appl. No. 17/940,858, 5 pages.
Notice of Allowance, dated May 30, 2023, received in Korean Patent Application No. 2022-7032607, which corresponds with U.S. Appl. No. 17/940,858, 2 pages.
Invitation to Pay Additional Fees, dated Jun. 17, 2019, received in International Patent Application No. PCT/US2019/026353, which corresponds with U.S. Appl. No. 16/142,599, 19 pages.
International Search Report and Written Opinion, dated Aug. 7, 2019, received in International Patent Application No. PCT/US2019/026353, which corresponds with U.S. Appl. No. 16/142,599, 26 pages.
International Search Report and Written Opinion, dated May 28, 2019, received in International Patent Application No. PCT/US2019/026349, which corresponds with U.S. Appl. No. 16/145,068, 16 pages.
Invitation to Pay Additional Fees, dated Aug. 6, 2021, received in International Patent Application No. PCT/US2021/031131, which corresponds with U.S. Appl. No. 16/948,370, 5 pages.
International Search Report and Written Opinion, dated Nov. 2, 2022, received in International Patent Application No. PCT/US2022028806, which corresponds with U.S. Appl. No. 17/483,751, 20 pages.
Notice of Allowance, dated Sep. 4, 2025, received in Korean Patent Application No. 2024-7000365 (7788KR), which corresponds with U.S. Appl. No. 17/831,377, 2 pages.
EESR, dated Oct. 1, 2025, received in European Patent Application No. 25193970.8 (8184EP), 9 pages.
Slavov, "Huawei's Harmoney OS-equipped MatePad tablets are official", dated Jun. 2, 2021, 7 pages.
Office Action, dated Nov. 20, 2025, received in U.S. Appl. No. 17/831,377 (7788), 22 pages.

* cited by examiner

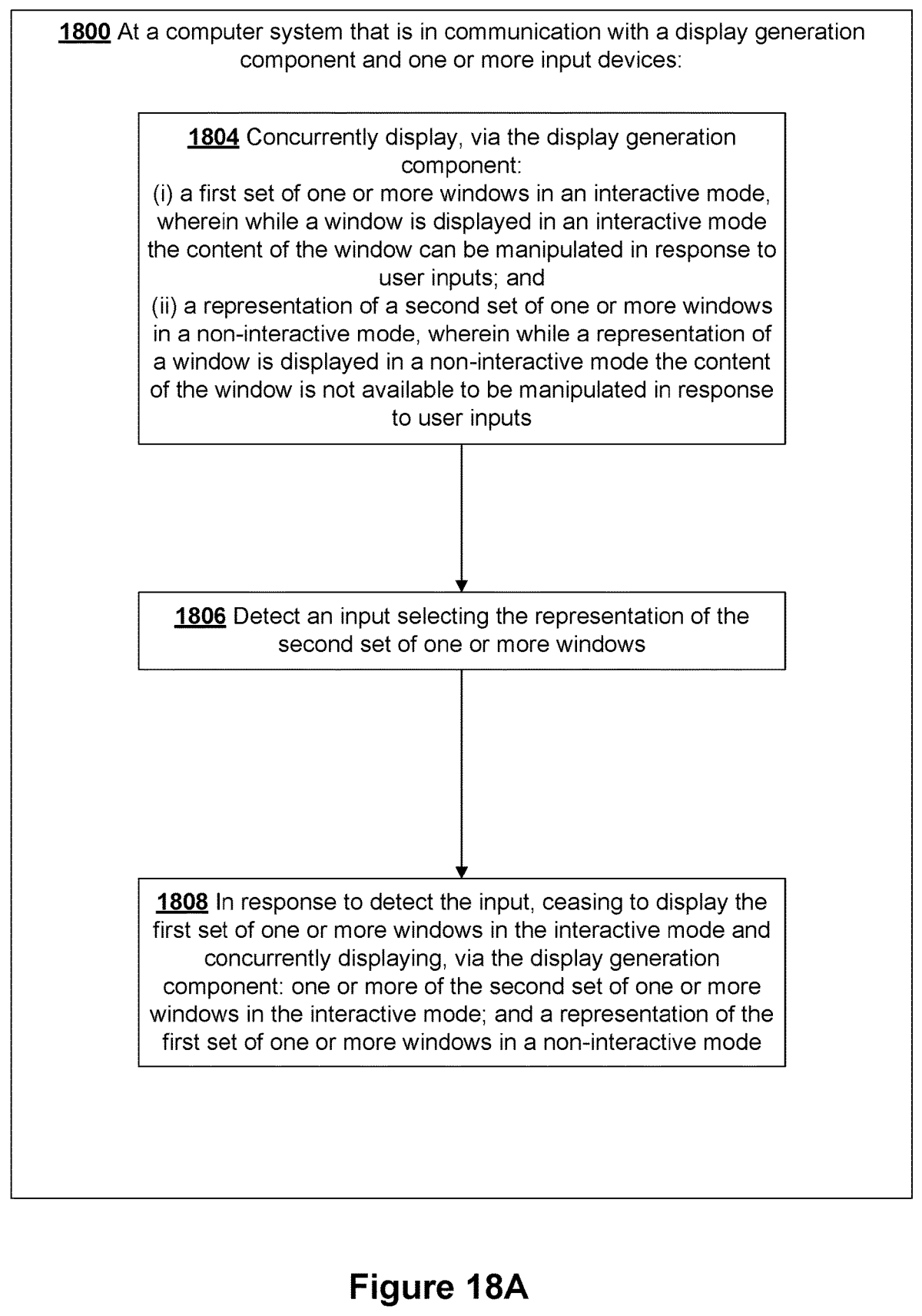

1800 At a computer system that is in communication with a display generation component and one or more input devices:

1804 Concurrently display, via the display generation component:
(i) a first set of one or more windows in an interactive mode, wherein while a window is displayed in an interactive mode the content of the window can be manipulated in response to user inputs; and
(ii) a representation of a second set of one or more windows in a non-interactive mode, wherein while a representation of a window is displayed in a non-interactive mode the content of the window is not available to be manipulated in response to user inputs

↓

1806 Detect an input selecting the representation of the second set of one or more windows

↓

1808 In response to detect the input, ceasing to display the first set of one or more windows in the interactive mode and concurrently displaying, via the display generation component: one or more of the second set of one or more windows in the interactive mode; and a representation of the first set of one or more windows in a non-interactive mode

Figure 18A

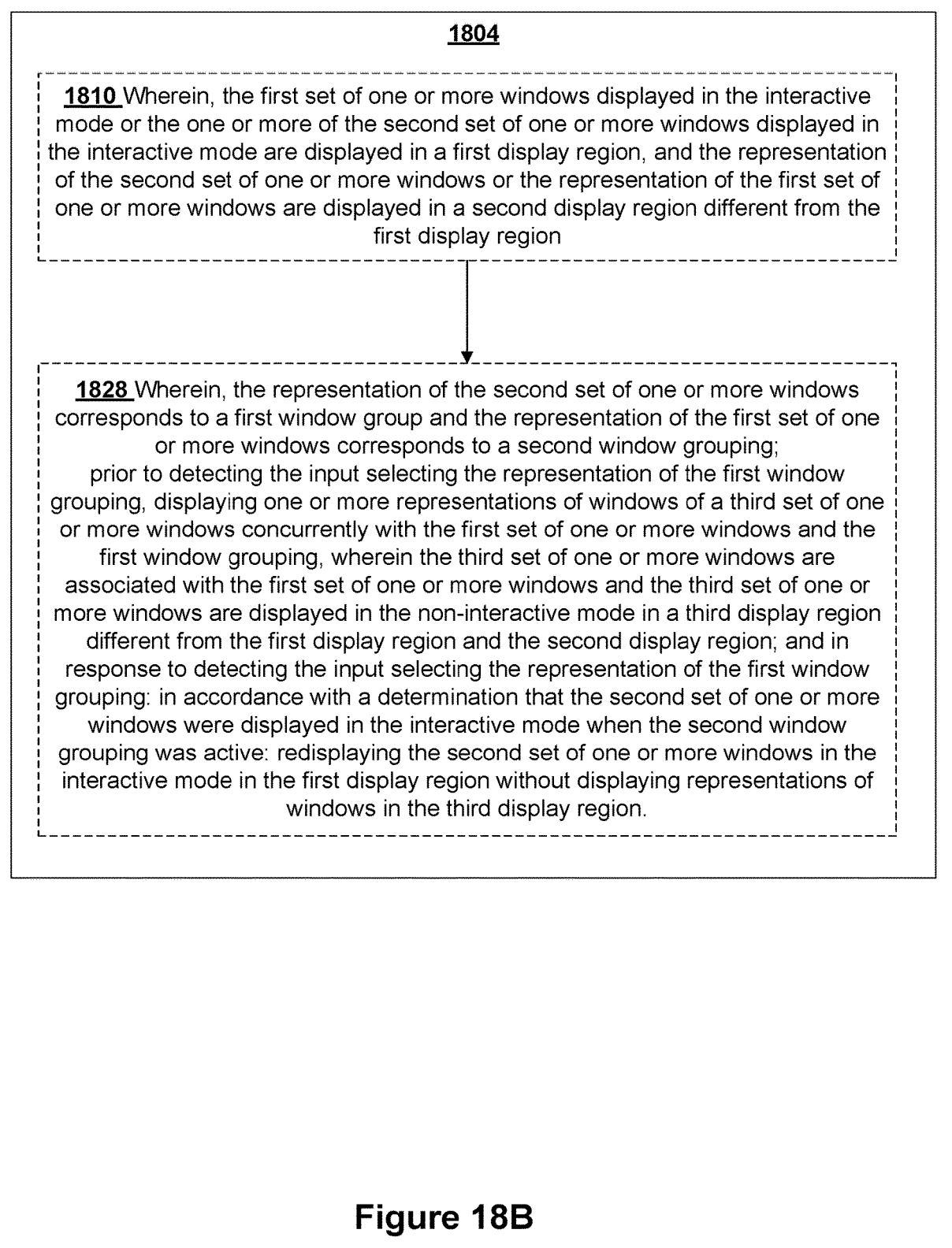

1804

1810 Wherein, the first set of one or more windows displayed in the interactive mode or the one or more of the second set of one or more windows displayed in the interactive mode are displayed in a first display region, and the representation of the second set of one or more windows or the representation of the first set of one or more windows are displayed in a second display region different from the first display region 1828 Wherein, the representation of the second set of one or more windows corresponds to a first window group and the representation of the first set of one or more windows corresponds to a second window grouping;
prior to detecting the input selecting the representation of the first window grouping, displaying one or more representations of windows of a third set of one or more windows concurrently with the first set of one or more windows and the first window grouping, wherein the third set of one or more windows are associated with the first set of one or more windows and the third set of one or more windows are displayed in the non-interactive mode in a third display region different from the first display region and the second display region; and in response to detecting the input selecting the representation of the first window grouping: in accordance with a determination that the second set of one or more windows were displayed in the interactive mode when the second window grouping was active: redisplaying the second set of one or more windows in the interactive mode in the first display region without displaying representations of windows in the third display region.

Figure 18B

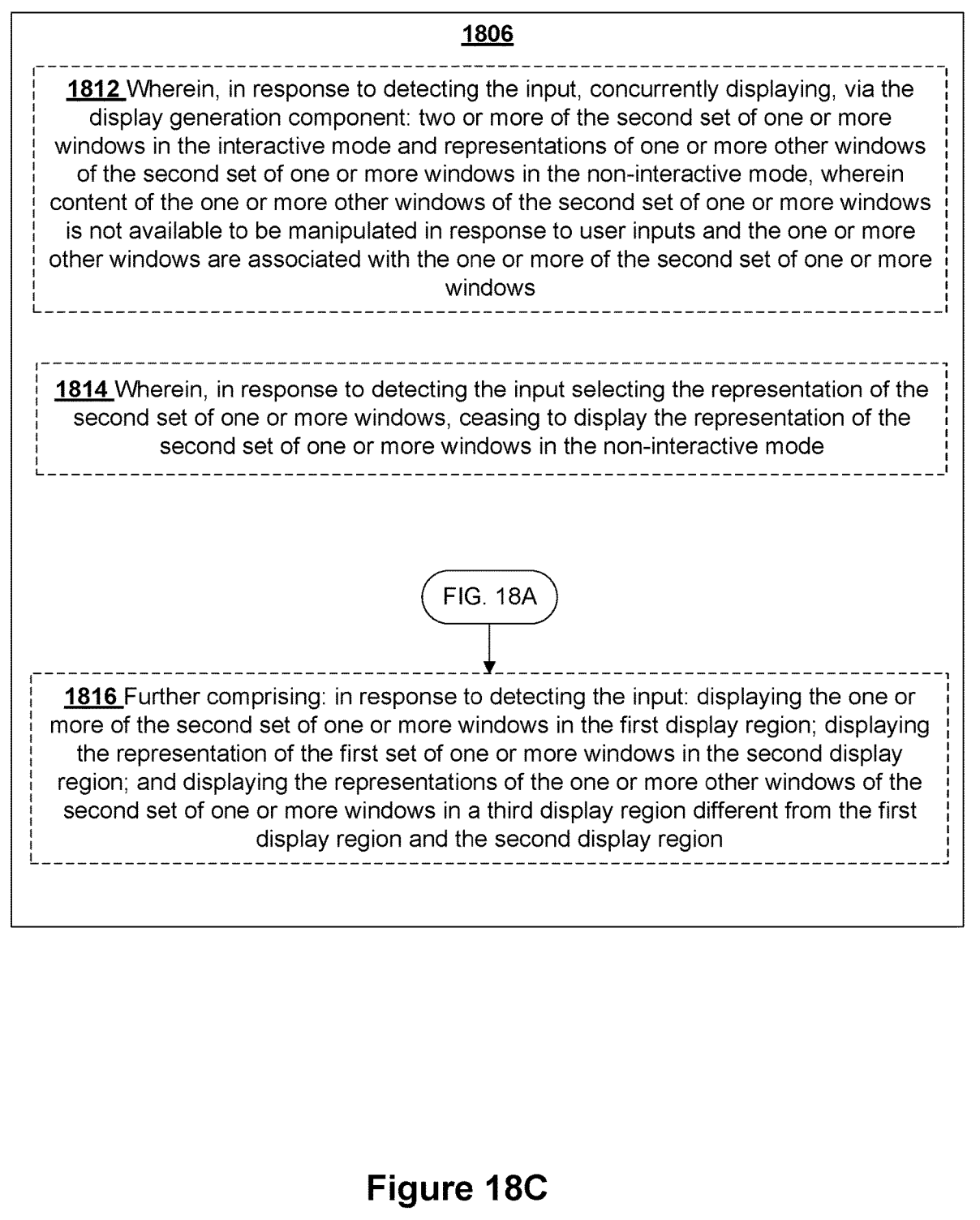

1806

1812 Wherein, in response to detecting the input, concurrently displaying, via the display generation component: two or more of the second set of one or more windows in the interactive mode and representations of one or more other windows of the second set of one or more windows in the non-interactive mode, wherein content of the one or more other windows of the second set of one or more windows is not available to be manipulated in response to user inputs and the one or more other windows are associated with the one or more of the second set of one or more windows

1814 Wherein, in response to detecting the input selecting the representation of the second set of one or more windows, ceasing to display the representation of the second set of one or more windows in the non-interactive mode

FIG. 18A

1816 Further comprising: in response to detecting the input: displaying the one or more of the second set of one or more windows in the first display region; displaying the representation of the first set of one or more windows in the second display region; and displaying the representations of the one or more other windows of the second set of one or more windows in a third display region different from the first display region and the second display region

Figure 18C

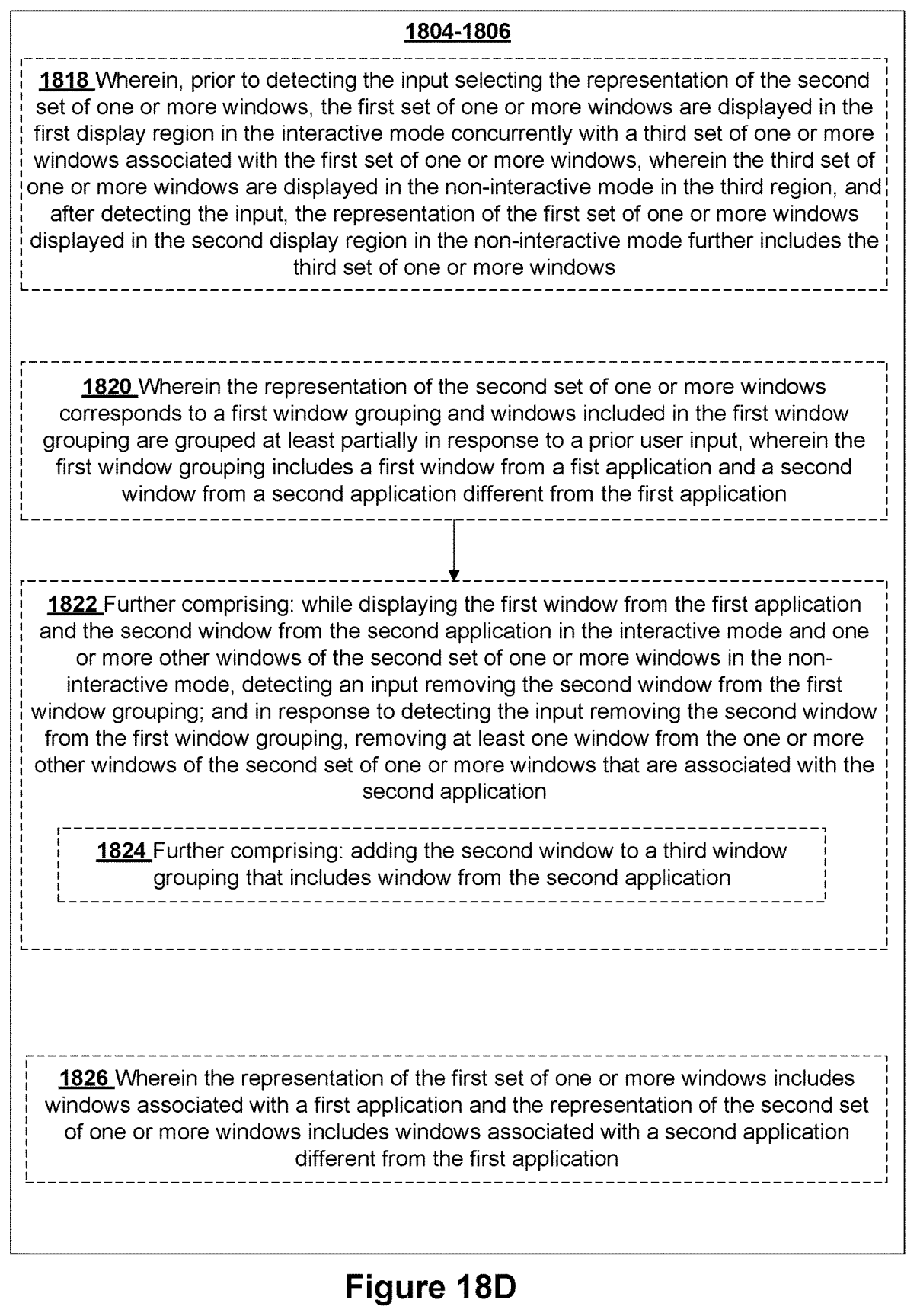

1804-1806

1818 Wherein, prior to detecting the input selecting the representation of the second set of one or more windows, the first set of one or more windows are displayed in the first display region in the interactive mode concurrently with a third set of one or more windows associated with the first set of one or more windows, wherein the third set of one or more windows are displayed in the non-interactive mode in the third region, and after detecting the input, the representation of the first set of one or more windows displayed in the second display region in the non-interactive mode further includes the third set of one or more windows

1820 Wherein the representation of the second set of one or more windows corresponds to a first window grouping and windows included in the first window grouping are grouped at least partially in response to a prior user input, wherein the first window grouping includes a first window from a fist application and a second window from a second application different from the first application

↓

1822 Further comprising: while displaying the first window from the first application and the second window from the second application in the interactive mode and one or more other windows of the second set of one or more windows in the non-interactive mode, detecting an input removing the second window from the first window grouping; and in response to detecting the input removing the second window from the first window grouping, removing at least one window from the one or more other windows of the second set of one or more windows that are associated with the second application

1824 Further comprising: adding the second window to a third window grouping that includes window from the second application

1826 Wherein the representation of the first set of one or more windows includes windows associated with a first application and the representation of the second set of one or more windows includes windows associated with a second application different from the first application

Figure 18D

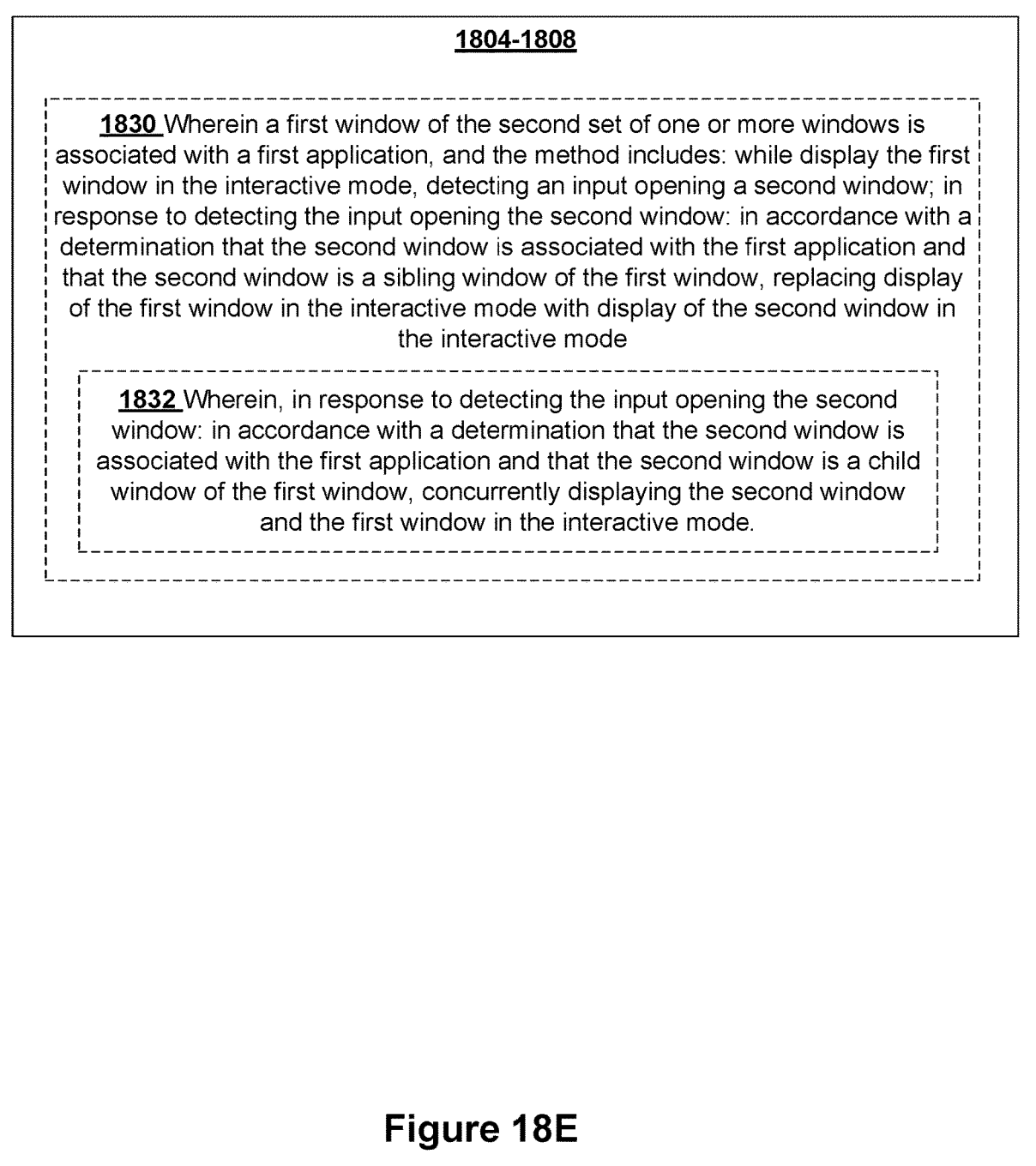

1804-1808

1830 Wherein a first window of the second set of one or more windows is associated with a first application, and the method includes: while display the first window in the interactive mode, detecting an input opening a second window; in response to detecting the input opening the second window: in accordance with a determination that the second window is associated with the first application and that the second window is a sibling window of the first window, replacing display of the first window in the interactive mode with display of the second window in the interactive mode

1832 Wherein, in response to detecting the input opening the second window: in accordance with a determination that the second window is associated with the first application and that the second window is a child window of the first window, concurrently displaying the second window and the first window in the interactive mode.

Figure 18E

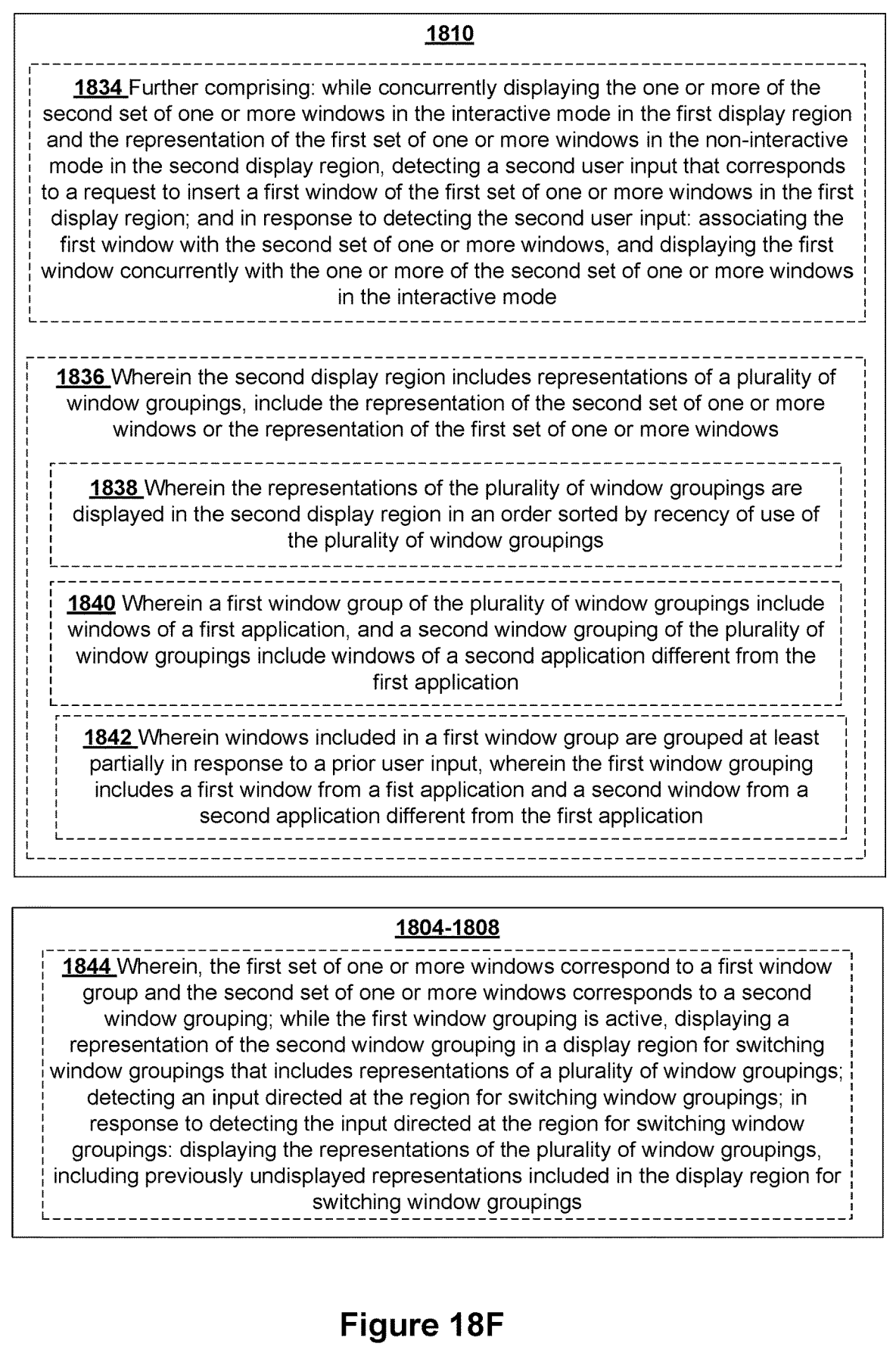

1810

1834 Further comprising: while concurrently displaying the one or more of the second set of one or more windows in the interactive mode in the first display region and the representation of the first set of one or more windows in the non-interactive mode in the second display region, detecting a second user input that corresponds to a request to insert a first window of the first set of one or more windows in the first display region; and in response to detecting the second user input: associating the first window with the second set of one or more windows, and displaying the first window concurrently with the one or more of the second set of one or more windows in the interactive mode

1836 Wherein the second display region includes representations of a plurality of window groupings, include the representation of the second set of one or more windows or the representation of the first set of one or more windows

1838 Wherein the representations of the plurality of window groupings are displayed in the second display region in an order sorted by recency of use of the plurality of window groupings

1840 Wherein a first window group of the plurality of window groupings include windows of a first application, and a second window grouping of the plurality of window groupings include windows of a second application different from the first application

1842 Wherein windows included in a first window group are grouped at least partially in response to a prior user input, wherein the first window grouping includes a first window from a fist application and a second window from a second application different from the first application

1804-1808

1844 Wherein, the first set of one or more windows correspond to a first window group and the second set of one or more windows corresponds to a second window grouping; while the first window grouping is active, displaying a representation of the second window grouping in a display region for switching window groupings that includes representations of a plurality of window groupings; detecting an input directed at the region for switching window groupings; in response to detecting the input directed at the region for switching window groupings: displaying the representations of the plurality of window groupings, including previously undisplayed representations included in the display region for switching window groupings

Figure 18F

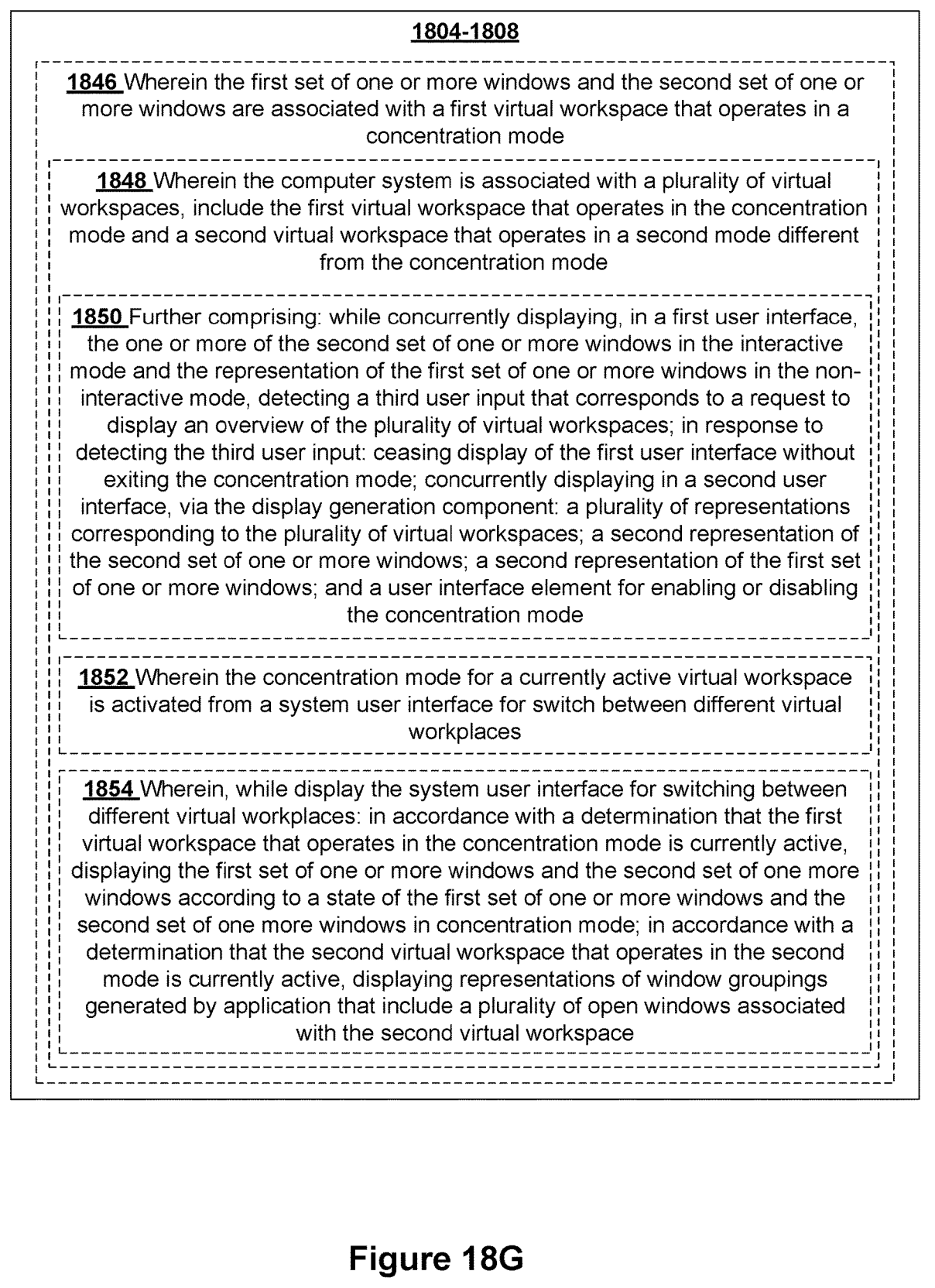

1804-1808

1846 Wherein the first set of one or more windows and the second set of one or more windows are associated with a first virtual workspace that operates in a concentration mode

1848 Wherein the computer system is associated with a plurality of virtual workspaces, include the first virtual workspace that operates in the concentration mode and a second virtual workspace that operates in a second mode different from the concentration mode

1850 Further comprising: while concurrently displaying, in a first user interface, the one or more of the second set of one or more windows in the interactive mode and the representation of the first set of one or more windows in the non-interactive mode, detecting a third user input that corresponds to a request to display an overview of the plurality of virtual workspaces; in response to detecting the third user input: ceasing display of the first user interface without exiting the concentration mode; concurrently displaying in a second user interface, via the display generation component: a plurality of representations corresponding to the plurality of virtual workspaces; a second representation of the second set of one or more windows; a second representation of the first set of one or more windows; and a user interface element for enabling or disabling the concentration mode

1852 Wherein the concentration mode for a currently active virtual workspace is activated from a system user interface for switch between different virtual workplaces

1854 Wherein, while display the system user interface for switching between different virtual workplaces: in accordance with a determination that the first virtual workspace that operates in the concentration mode is currently active, displaying the first set of one or more windows and the second set of one more windows according to a state of the first set of one or more windows and the second set of one more windows in concentration mode; in accordance with a determination that the second virtual workspace that operates in the second mode is currently active, displaying representations of window groupings generated by application that include a plurality of open windows associated with the second virtual workspace

Figure 18G

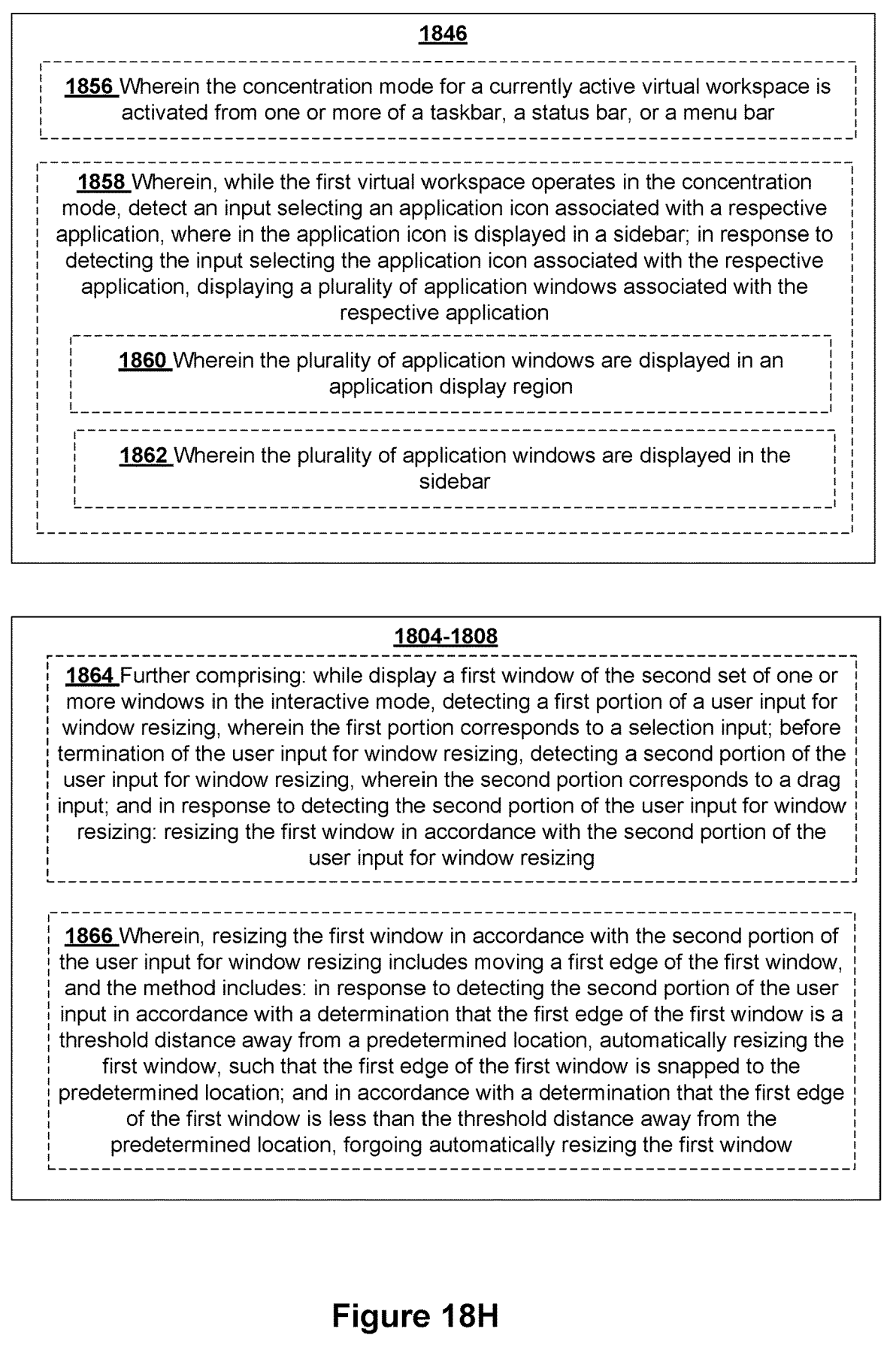

1846

1856 Wherein the concentration mode for a currently active virtual workspace is activated from one or more of a taskbar, a status bar, or a menu bar

1858 Wherein, while the first virtual workspace operates in the concentration mode, detect an input selecting an application icon associated with a respective application, where in the application icon is displayed in a sidebar; in response to detecting the input selecting the application icon associated with the respective application, displaying a plurality of application windows associated with the respective application

1860 Wherein the plurality of application windows are displayed in an application display region

1862 Wherein the plurality of application windows are displayed in the sidebar

1804-1808

1864 Further comprising: while display a first window of the second set of one or more windows in the interactive mode, detecting a first portion of a user input for window resizing, wherein the first portion corresponds to a selection input; before termination of the user input for window resizing, detecting a second portion of the user input for window resizing, wherein the second portion corresponds to a drag input; and in response to detecting the second portion of the user input for window resizing: resizing the first window in accordance with the second portion of the user input for window resizing

1866 Wherein, resizing the first window in accordance with the second portion of the user input for window resizing includes moving a first edge of the first window, and the method includes: in response to detecting the second portion of the user input in accordance with a determination that the first edge of the first window is a threshold distance away from a predetermined location, automatically resizing the first window, such that the first edge of the first window is snapped to the predetermined location; and in accordance with a determination that the first edge of the first window is less than the threshold distance away from the predetermined location, forgoing automatically resizing the first window

Figure 18H

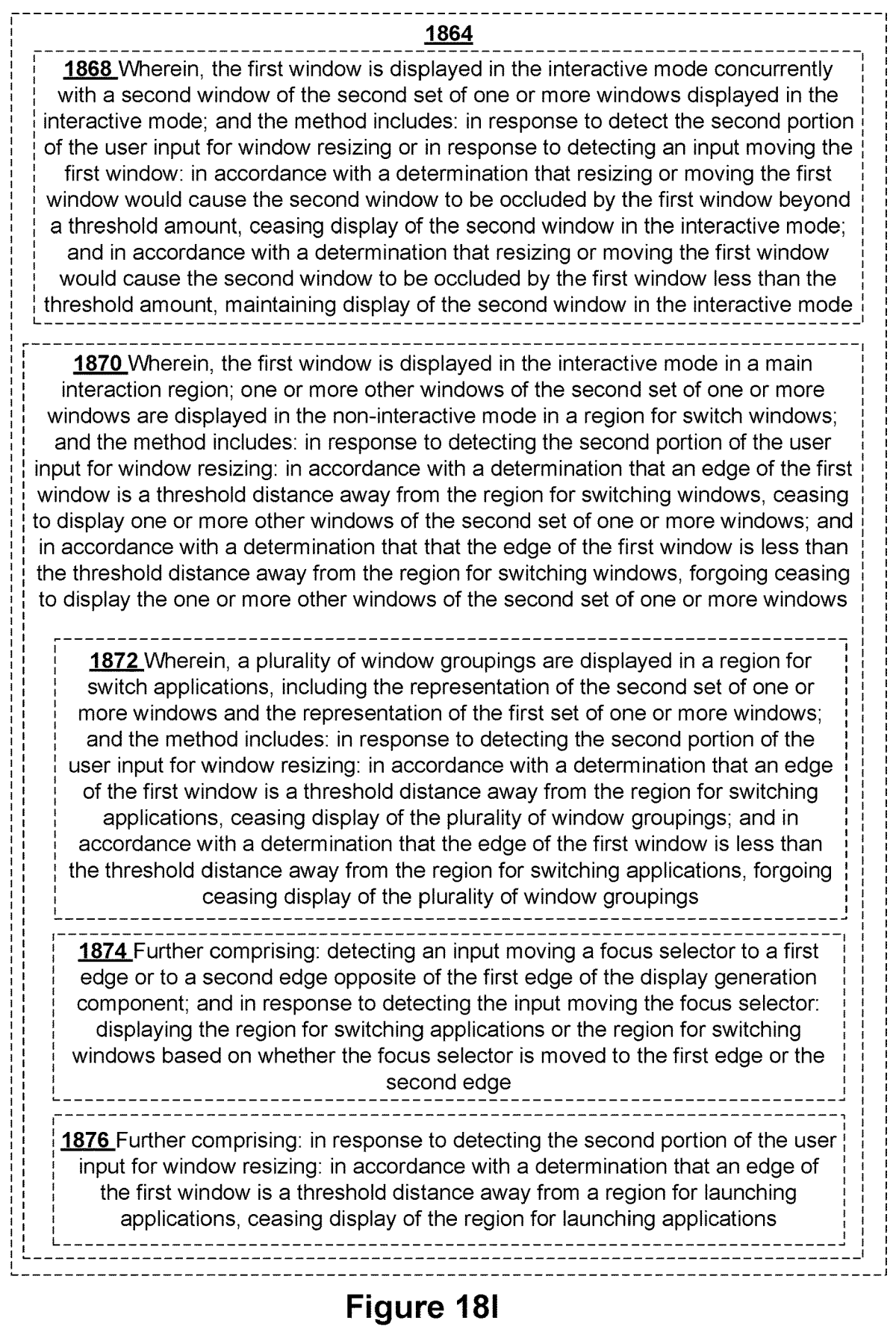

1864

1868 Wherein, the first window is displayed in the interactive mode concurrently with a second window of the second set of one or more windows displayed in the interactive mode; and the method includes: in response to detect the second portion of the user input for window resizing or in response to detecting an input moving the first window: in accordance with a determination that resizing or moving the first window would cause the second window to be occluded by the first window beyond a threshold amount, ceasing display of the second window in the interactive mode; and in accordance with a determination that resizing or moving the first window would cause the second window to be occluded by the first window less than the threshold amount, maintaining display of the second window in the interactive mode

1870 Wherein, the first window is displayed in the interactive mode in a main interaction region; one or more other windows of the second set of one or more windows are displayed in the non-interactive mode in a region for switch windows; and the method includes: in response to detecting the second portion of the user input for window resizing: in accordance with a determination that an edge of the first window is a threshold distance away from the region for switching windows, ceasing to display one or more other windows of the second set of one or more windows; and in accordance with a determination that that the edge of the first window is less than the threshold distance away from the region for switching windows, forgoing ceasing to display the one or more other windows of the second set of one or more windows

1872 Wherein, a plurality of window groupings are displayed in a region for switch applications, including the representation of the second set of one or more windows and the representation of the first set of one or more windows; and the method includes: in response to detecting the second portion of the user input for window resizing: in accordance with a determination that an edge of the first window is a threshold distance away from the region for switching applications, ceasing display of the plurality of window groupings; and in accordance with a determination that the edge of the first window is less than the threshold distance away from the region for switching applications, forgoing ceasing display of the plurality of window groupings

1874 Further comprising: detecting an input moving a focus selector to a first edge or to a second edge opposite of the first edge of the display generation component; and in response to detecting the input moving the focus selector: displaying the region for switching applications or the region for switching windows based on whether the focus selector is moved to the first edge or the second edge

1876 Further comprising: in response to detecting the second portion of the user input for window resizing: in accordance with a determination that an edge of the first window is a threshold distance away from a region for launching applications, ceasing display of the region for launching applications

Figure 18I

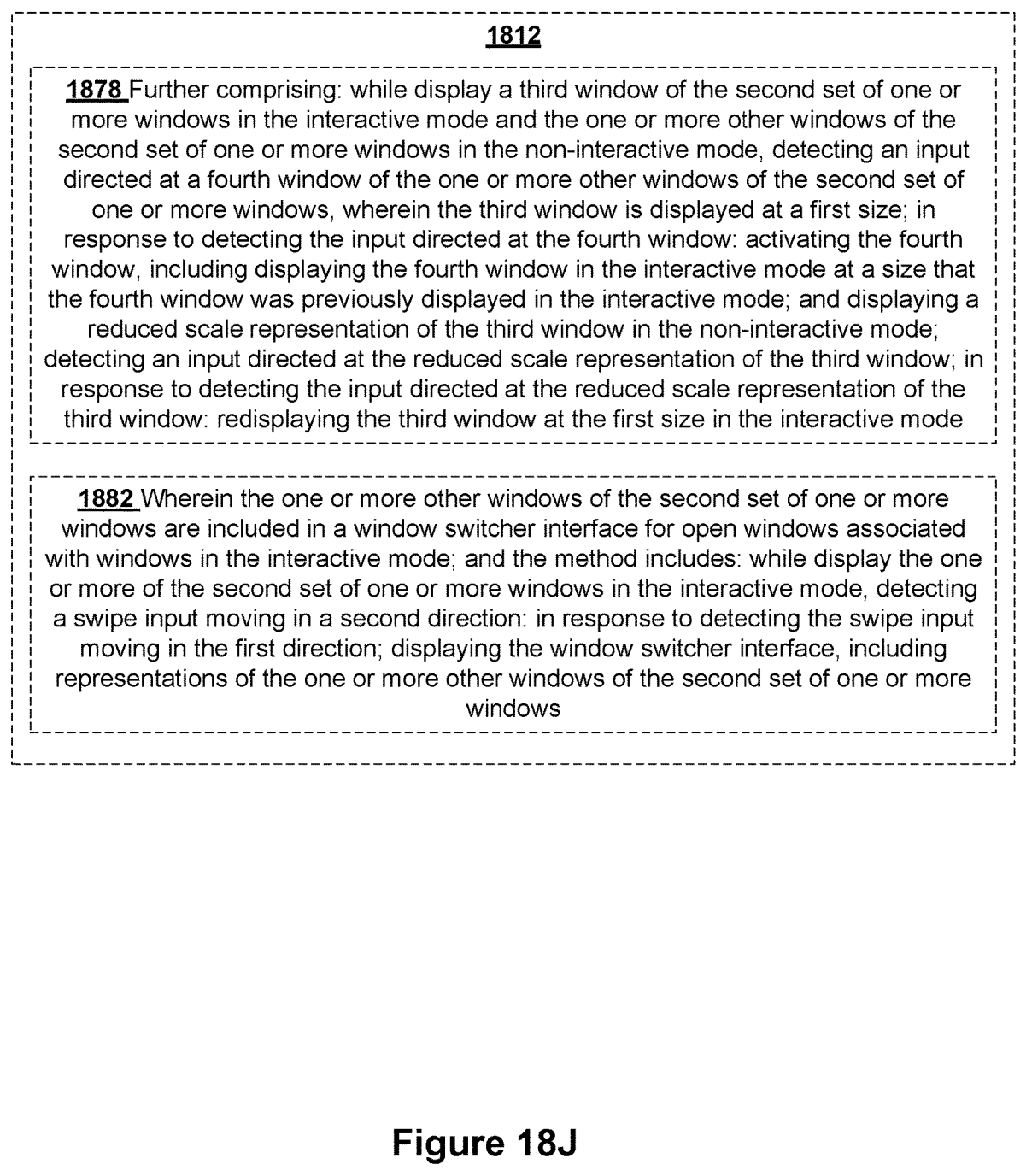

1812

1878 Further comprising: while display a third window of the second set of one or more windows in the interactive mode and the one or more other windows of the second set of one or more windows in the non-interactive mode, detecting an input directed at a fourth window of the one or more other windows of the second set of one or more windows, wherein the third window is displayed at a first size; in response to detecting the input directed at the fourth window: activating the fourth window, including displaying the fourth window in the interactive mode at a size that the fourth window was previously displayed in the interactive mode; and displaying a reduced scale representation of the third window in the non-interactive mode; detecting an input directed at the reduced scale representation of the third window; in response to detecting the input directed at the reduced scale representation of the third window: redisplaying the third window at the first size in the interactive mode

1882 Wherein the one or more other windows of the second set of one or more windows are included in a window switcher interface for open windows associated with windows in the interactive mode; and the method includes: while display the one or more of the second set of one or more windows in the interactive mode, detecting a swipe input moving in a second direction: in response to detecting the swipe input moving in the first direction; displaying the window switcher interface, including representations of the one or more other windows of the second set of one or more windows

Figure 18J

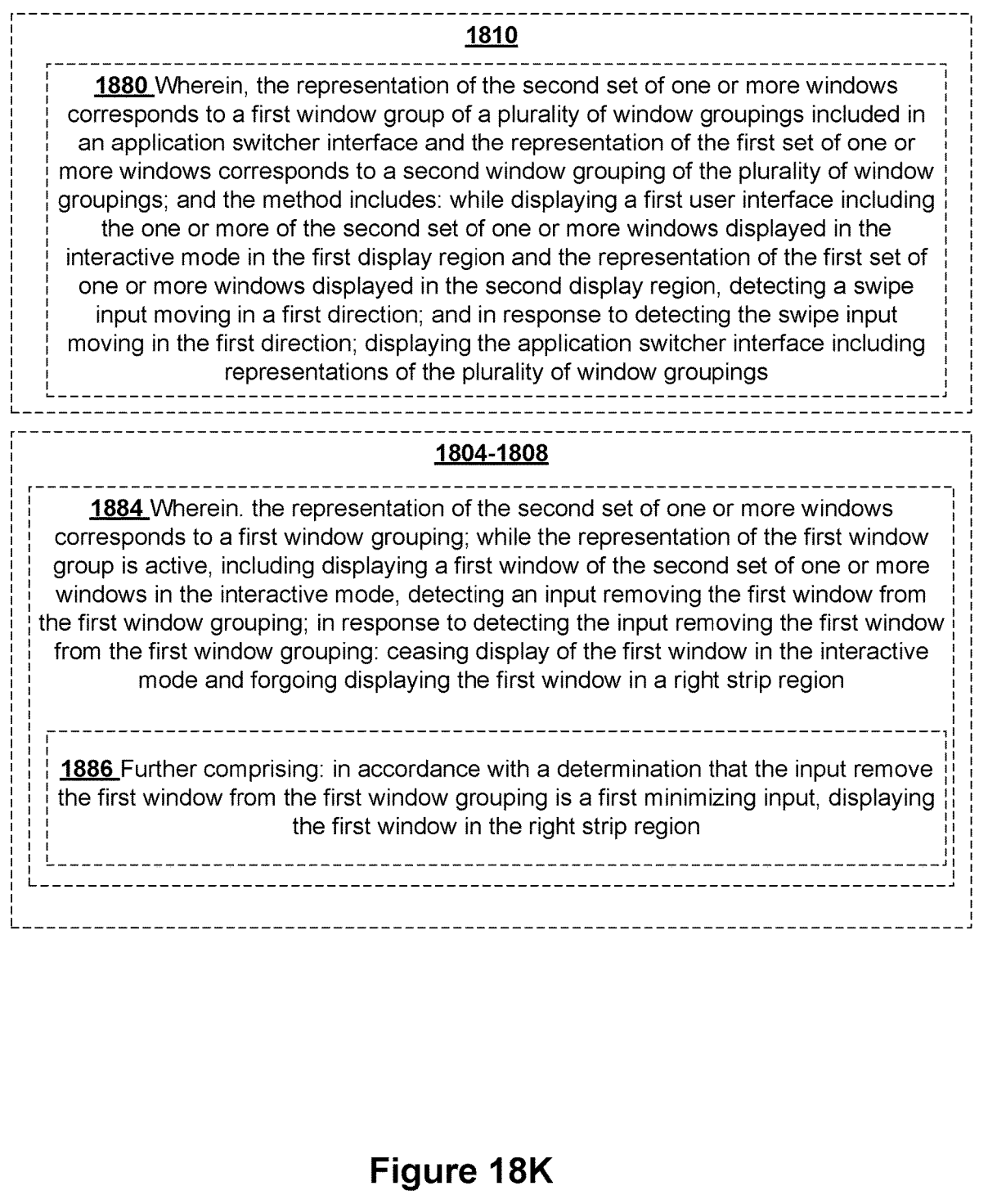

1810

1880 Wherein, the representation of the second set of one or more windows corresponds to a first window group of a plurality of window groupings included in an application switcher interface and the representation of the first set of one or more windows corresponds to a second window grouping of the plurality of window groupings; and the method includes: while displaying a first user interface including the one or more of the second set of one or more windows displayed in the interactive mode in the first display region and the representation of the first set of one or more windows displayed in the second display region, detecting a swipe input moving in a first direction; and in response to detecting the swipe input moving in the first direction; displaying the application switcher interface including representations of the plurality of window groupings

1804-1808

1884 Wherein. the representation of the second set of one or more windows corresponds to a first window grouping; while the representation of the first window group is active, including displaying a first window of the second set of one or more windows in the interactive mode, detecting an input removing the first window from the first window grouping; in response to detecting the input removing the first window from the first window grouping: ceasing display of the first window in the interactive mode and forgoing displaying the first window in a right strip region

1886 Further comprising: in accordance with a determination that the input remove the first window from the first window grouping is a first minimizing input, displaying the first window in the right strip region

Figure 18K

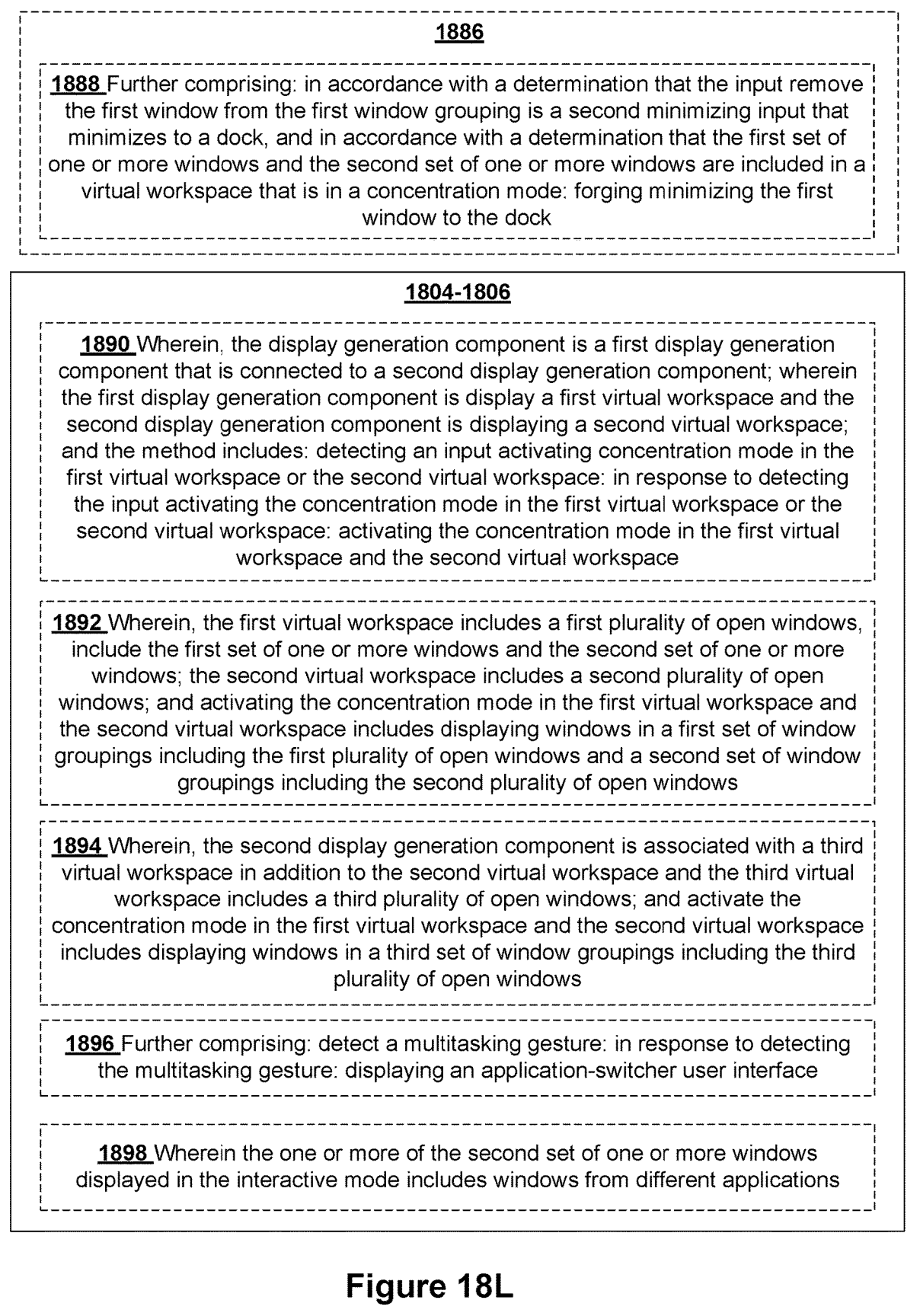

1886

1888 Further comprising: in accordance with a determination that the input remove the first window from the first window grouping is a second minimizing input that minimizes to a dock, and in accordance with a determination that the first set of one or more windows and the second set of one or more windows are included in a virtual workspace that is in a concentration mode: forging minimizing the first window to the dock

1804-1806

1890 Wherein, the display generation component is a first display generation component that is connected to a second display generation component; wherein the first display generation component is display a first virtual workspace and the second display generation component is displaying a second virtual workspace; and the method includes: detecting an input activating concentration mode in the first virtual workspace or the second virtual workspace: in response to detecting the input activating the concentration mode in the first virtual workspace or the second virtual workspace: activating the concentration mode in the first virtual workspace and the second virtual workspace

1892 Wherein, the first virtual workspace includes a first plurality of open windows, include the first set of one or more windows and the second set of one or more windows; the second virtual workspace includes a second plurality of open windows; and activating the concentration mode in the first virtual workspace and the second virtual workspace includes displaying windows in a first set of window groupings including the first plurality of open windows and a second set of window groupings including the second plurality of open windows

1894 Wherein, the second display generation component is associated with a third virtual workspace in addition to the second virtual workspace and the third virtual workspace includes a third plurality of open windows; and activate the concentration mode in the first virtual workspace and the second virtual workspace includes displaying windows in a third set of window groupings including the third plurality of open windows

1896 Further comprising: detect a multitasking gesture: in response to detecting the multitasking gesture: displaying an application-switcher user interface

1898 Wherein the one or more of the second set of one or more windows displayed in the interactive mode includes windows from different applications

Figure 18L

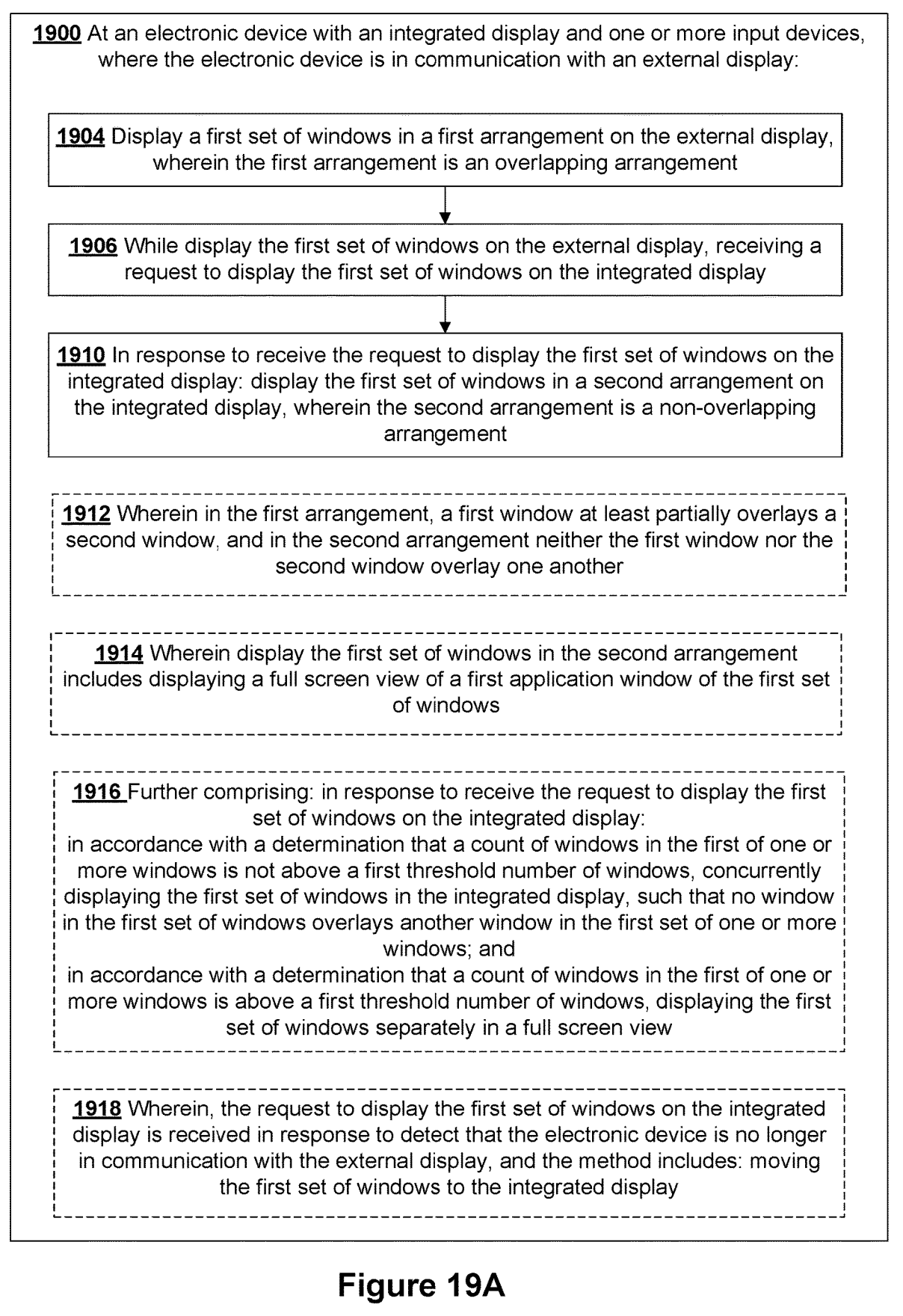

1900 At an electronic device with an integrated display and one or more input devices, where the electronic device is in communication with an external display:

1904 Display a first set of windows in a first arrangement on the external display, wherein the first arrangement is an overlapping arrangement

1906 While display the first set of windows on the external display, receiving a request to display the first set of windows on the integrated display

1910 In response to receive the request to display the first set of windows on the integrated display: display the first set of windows in a second arrangement on the integrated display, wherein the second arrangement is a non-overlapping arrangement

1912 Wherein in the first arrangement, a first window at least partially overlays a second window, and in the second arrangement neither the first window nor the second window overlay one another

1914 Wherein display the first set of windows in the second arrangement includes displaying a full screen view of a first application window of the first set of windows

1916 Further comprising: in response to receive the request to display the first set of windows on the integrated display:
in accordance with a determination that a count of windows in the first of one or more windows is not above a first threshold number of windows, concurrently displaying the first set of windows in the integrated display, such that no window in the first set of windows overlays another window in the first set of one or more windows; and
in accordance with a determination that a count of windows in the first of one or more windows is above a first threshold number of windows, displaying the first set of windows separately in a full screen view

1918 Wherein, the request to display the first set of windows on the integrated display is received in response to detect that the electronic device is no longer in communication with the external display, and the method includes: moving the first set of windows to the integrated display

Figure 19A

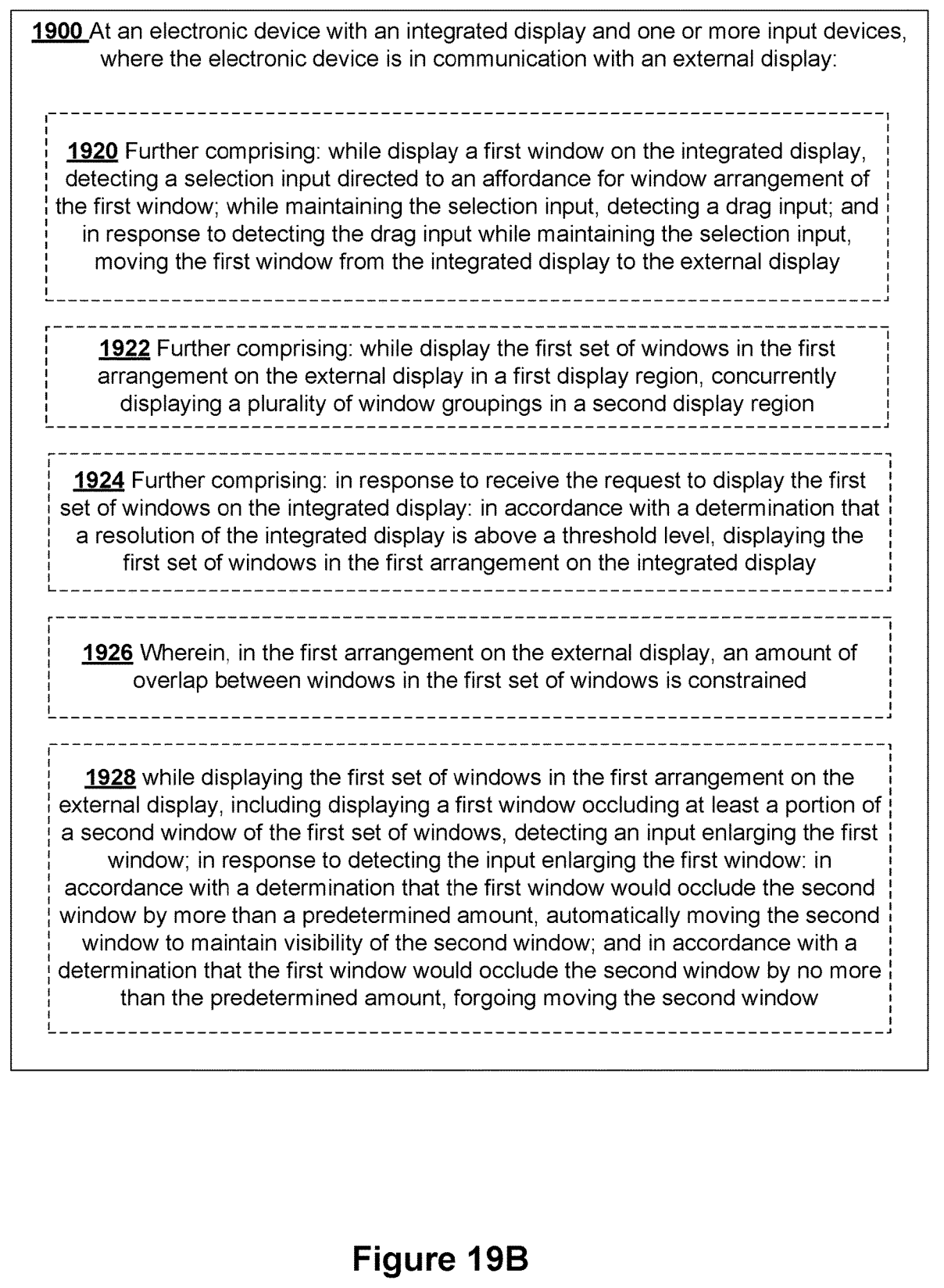

1900 At an electronic device with an integrated display and one or more input devices, where the electronic device is in communication with an external display:

1920 Further comprising: while display a first window on the integrated display, detecting a selection input directed to an affordance for window arrangement of the first window; while maintaining the selection input, detecting a drag input; and in response to detecting the drag input while maintaining the selection input, moving the first window from the integrated display to the external display

1922 Further comprising: while display the first set of windows in the first arrangement on the external display in a first display region, concurrently displaying a plurality of window groupings in a second display region

1924 Further comprising: in response to receive the request to display the first set of windows on the integrated display: in accordance with a determination that a resolution of the integrated display is above a threshold level, displaying the first set of windows in the first arrangement on the integrated display

1926 Wherein, in the first arrangement on the external display, an amount of overlap between windows in the first set of windows is constrained

1928 while displaying the first set of windows in the first arrangement on the external display, including displaying a first window occluding at least a portion of a second window of the first set of windows, detecting an input enlarging the first window; in response to detecting the input enlarging the first window: in accordance with a determination that the first window would occlude the second window by more than a predetermined amount, automatically moving the second window to maintain visibility of the second window; and in accordance with a determination that the first window would occlude the second window by no more than the predetermined amount, forgoing moving the second window

Figure 19B

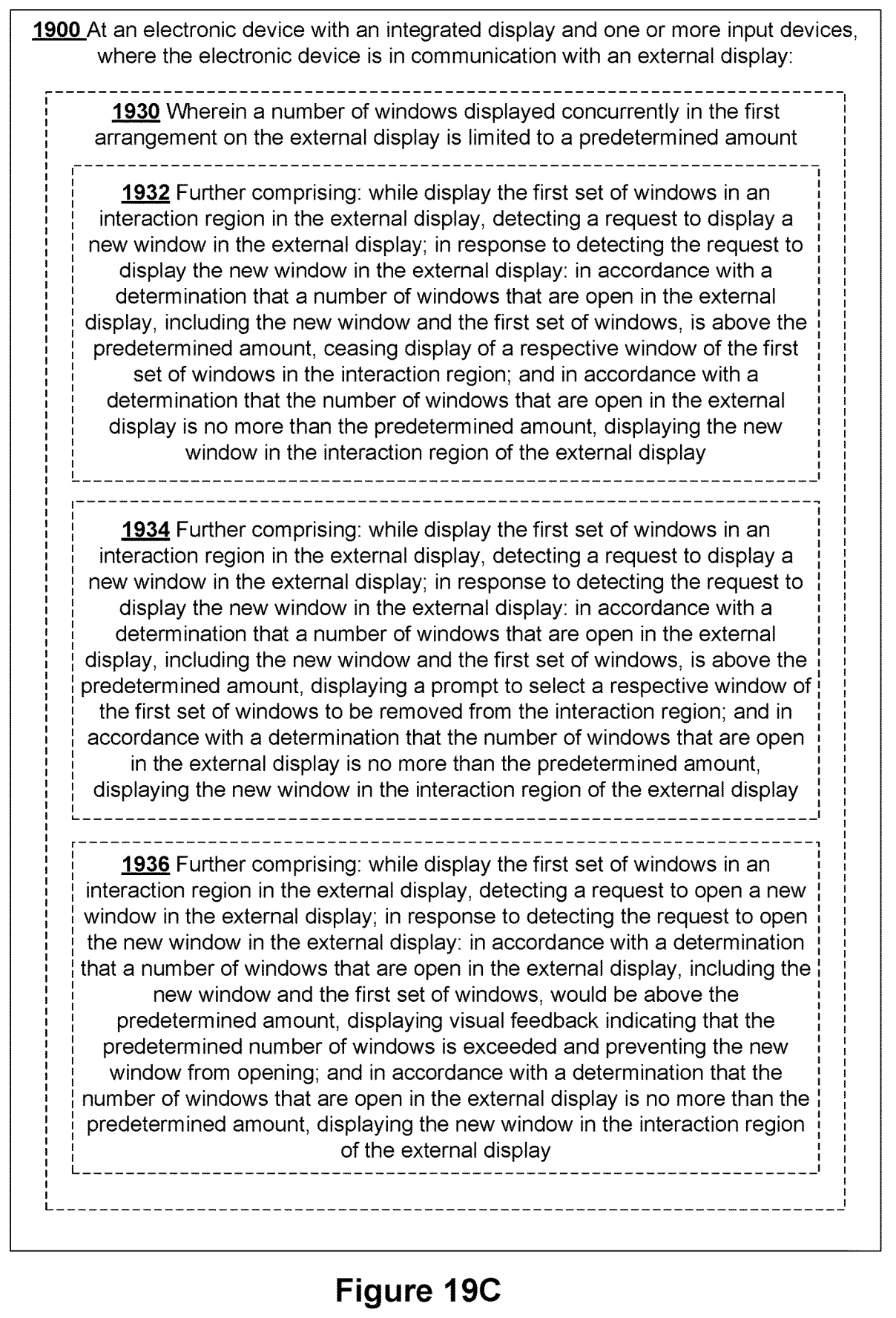

1900 At an electronic device with an integrated display and one or more input devices, where the electronic device is in communication with an external display:

1930 Wherein a number of windows displayed concurrently in the first arrangement on the external display is limited to a predetermined amount

1932 Further comprising: while display the first set of windows in an interaction region in the external display, detecting a request to display a new window in the external display; in response to detecting the request to display the new window in the external display: in accordance with a determination that a number of windows that are open in the external display, including the new window and the first set of windows, is above the predetermined amount, ceasing display of a respective window of the first set of windows in the interaction region; and in accordance with a determination that the number of windows that are open in the external display is no more than the predetermined amount, displaying the new window in the interaction region of the external display

1934 Further comprising: while display the first set of windows in an interaction region in the external display, detecting a request to display a new window in the external display; in response to detecting the request to display the new window in the external display: in accordance with a determination that a number of windows that are open in the external display, including the new window and the first set of windows, is above the predetermined amount, displaying a prompt to select a respective window of the first set of windows to be removed from the interaction region; and in accordance with a determination that the number of windows that are open in the external display is no more than the predetermined amount, displaying the new window in the interaction region of the external display

1936 Further comprising: while display the first set of windows in an interaction region in the external display, detecting a request to open a new window in the external display; in response to detecting the request to open the new window in the external display: in accordance with a determination that a number of windows that are open in the external display, including the new window and the first set of windows, would be above the predetermined amount, displaying visual feedback indicating that the predetermined number of windows is exceeded and preventing the new window from opening; and in accordance with a determination that the number of windows that are open in the external display is no more than the predetermined amount, displaying the new window in the interaction region of the external display

Figure 19C

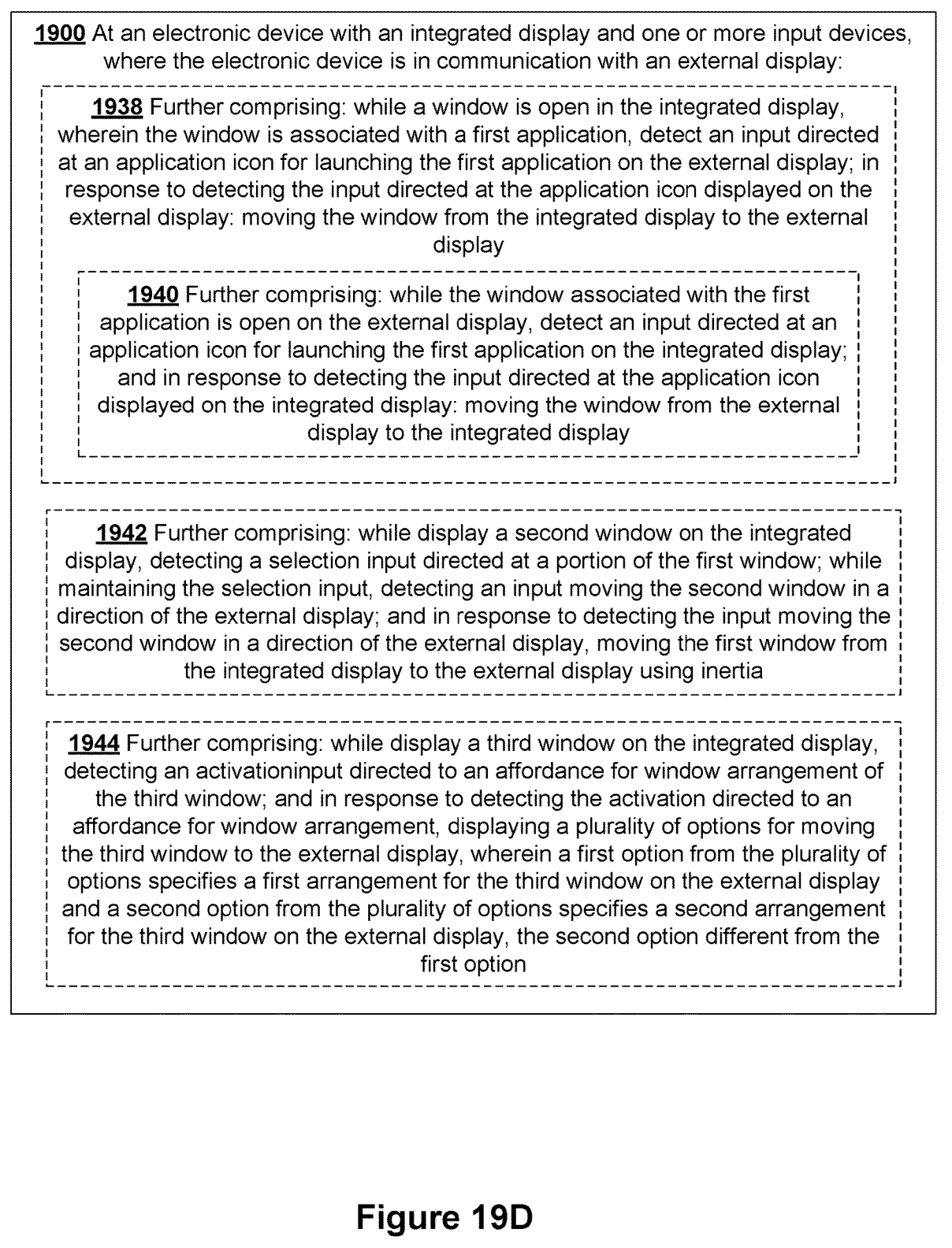

1900 At an electronic device with an integrated display and one or more input devices, where the electronic device is in communication with an external display:

1938 Further comprising: while a window is open in the integrated display, wherein the window is associated with a first application, detect an input directed at an application icon for launching the first application on the external display; in response to detecting the input directed at the application icon displayed on the external display: moving the window from the integrated display to the external display

1940 Further comprising: while the window associated with the first application is open on the external display, detect an input directed at an application icon for launching the first application on the integrated display; and in response to detecting the input directed at the application icon displayed on the integrated display: moving the window from the external display to the integrated display

1942 Further comprising: while display a second window on the integrated display, detecting a selection input directed at a portion of the first window; while maintaining the selection input, detecting an input moving the second window in a direction of the external display; and in response to detecting the input moving the second window in a direction of the external display, moving the first window from the integrated display to the external display using inertia

1944 Further comprising: while display a third window on the integrated display, detecting an activationinput directed to an affordance for window arrangement of the third window; and in response to detecting the activation directed to an affordance for window arrangement, displaying a plurality of options for moving the third window to the external display, wherein a first option from the plurality of options specifies a first arrangement for the third window on the external display and a second option from the plurality of options specifies a second arrangement for the third window on the external display, the second option different from the first option

Figure 19D

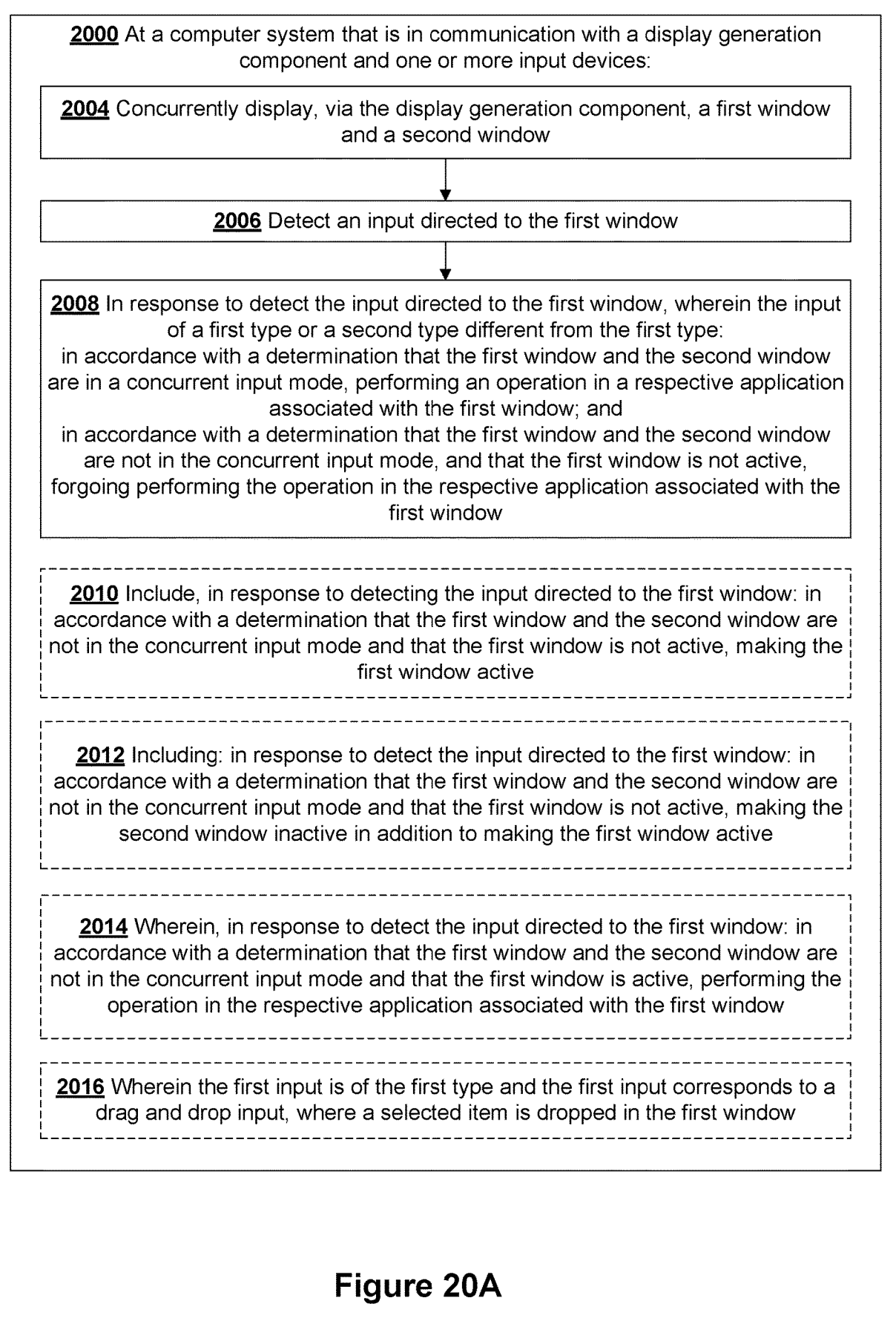

2000 At a computer system that is in communication with a display generation component and one or more input devices:

2004 Concurrently display, via the display generation component, a first window and a second window

↓

2006 Detect an input directed to the first window

↓

2008 In response to detect the input directed to the first window, wherein the input of a first type or a second type different from the first type:
in accordance with a determination that the first window and the second window are in a concurrent input mode, performing an operation in a respective application associated with the first window; and
in accordance with a determination that the first window and the second window are not in the concurrent input mode, and that the first window is not active, forgoing performing the operation in the respective application associated with the first window

2010 Include, in response to detecting the input directed to the first window: in accordance with a determination that the first window and the second window are not in the concurrent input mode and that the first window is not active, making the first window active

2012 Including: in response to detect the input directed to the first window: in accordance with a determination that the first window and the second window are not in the concurrent input mode and that the first window is not active, making the second window inactive in addition to making the first window active

2014 Wherein, in response to detect the input directed to the first window: in accordance with a determination that the first window and the second window are not in the concurrent input mode and that the first window is active, performing the operation in the respective application associated with the first window

2016 Wherein the first input is of the first type and the first input corresponds to a drag and drop input, where a selected item is dropped in the first window

Figure 20A

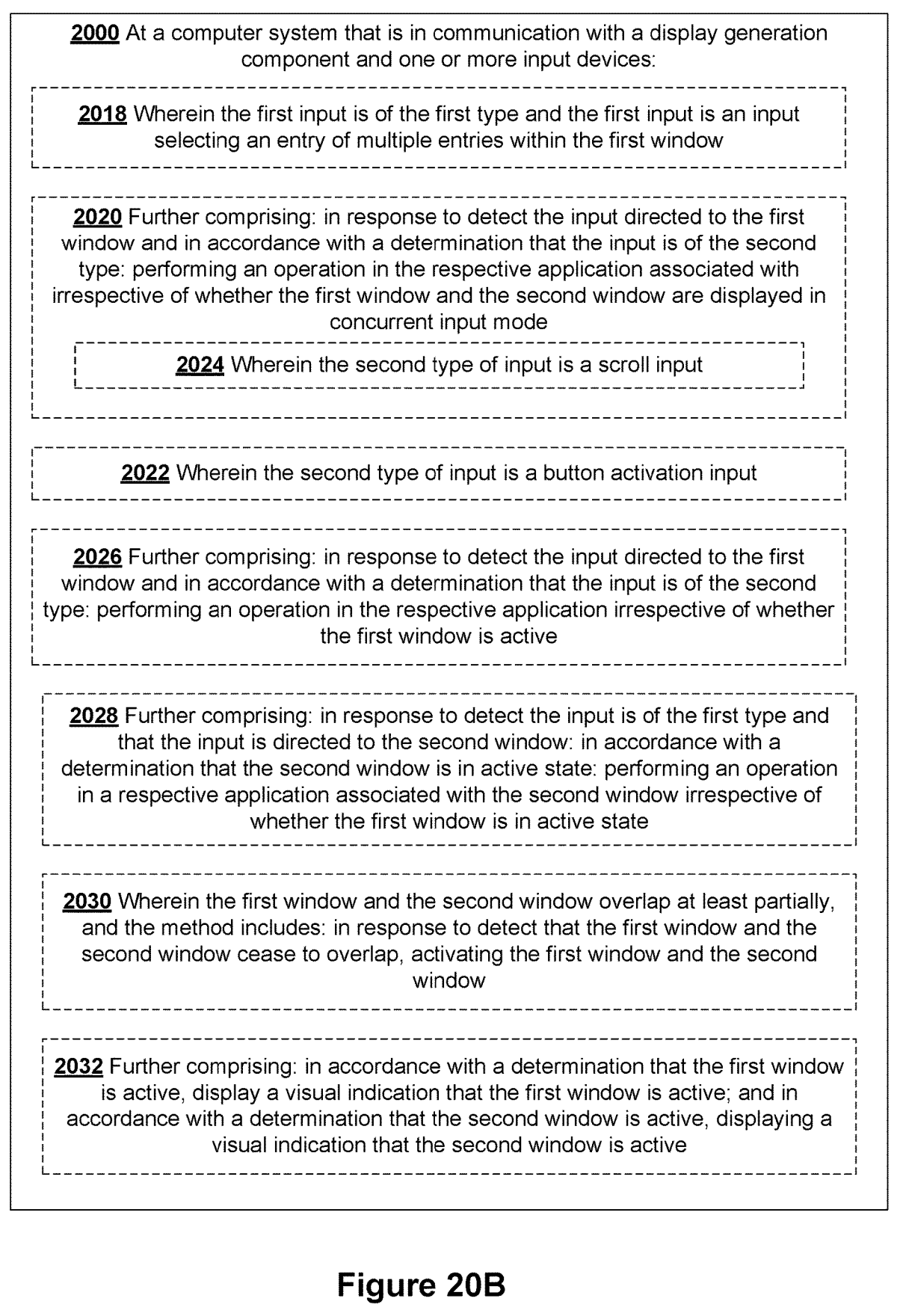

2000 At a computer system that is in communication with a display generation component and one or more input devices:

2018 Wherein the first input is of the first type and the first input is an input selecting an entry of multiple entries within the first window

2020 Further comprising: in response to detect the input directed to the first window and in accordance with a determination that the input is of the second type: performing an operation in the respective application associated with irrespective of whether the first window and the second window are displayed in concurrent input mode

2024 Wherein the second type of input is a scroll input

2022 Wherein the second type of input is a button activation input

2026 Further comprising: in response to detect the input directed to the first window and in accordance with a determination that the input is of the second type: performing an operation in the respective application irrespective of whether the first window is active

2028 Further comprising: in response to detect the input is of the first type and that the input is directed to the second window: in accordance with a determination that the second window is in active state: performing an operation in a respective application associated with the second window irrespective of whether the first window is in active state

2030 Wherein the first window and the second window overlap at least partially, and the method includes: in response to detect that the first window and the second window cease to overlap, activating the first window and the second window

2032 Further comprising: in accordance with a determination that the first window is active, display a visual indication that the first window is active; and in accordance with a determination that the second window is active, displaying a visual indication that the second window is active

Figure 20B

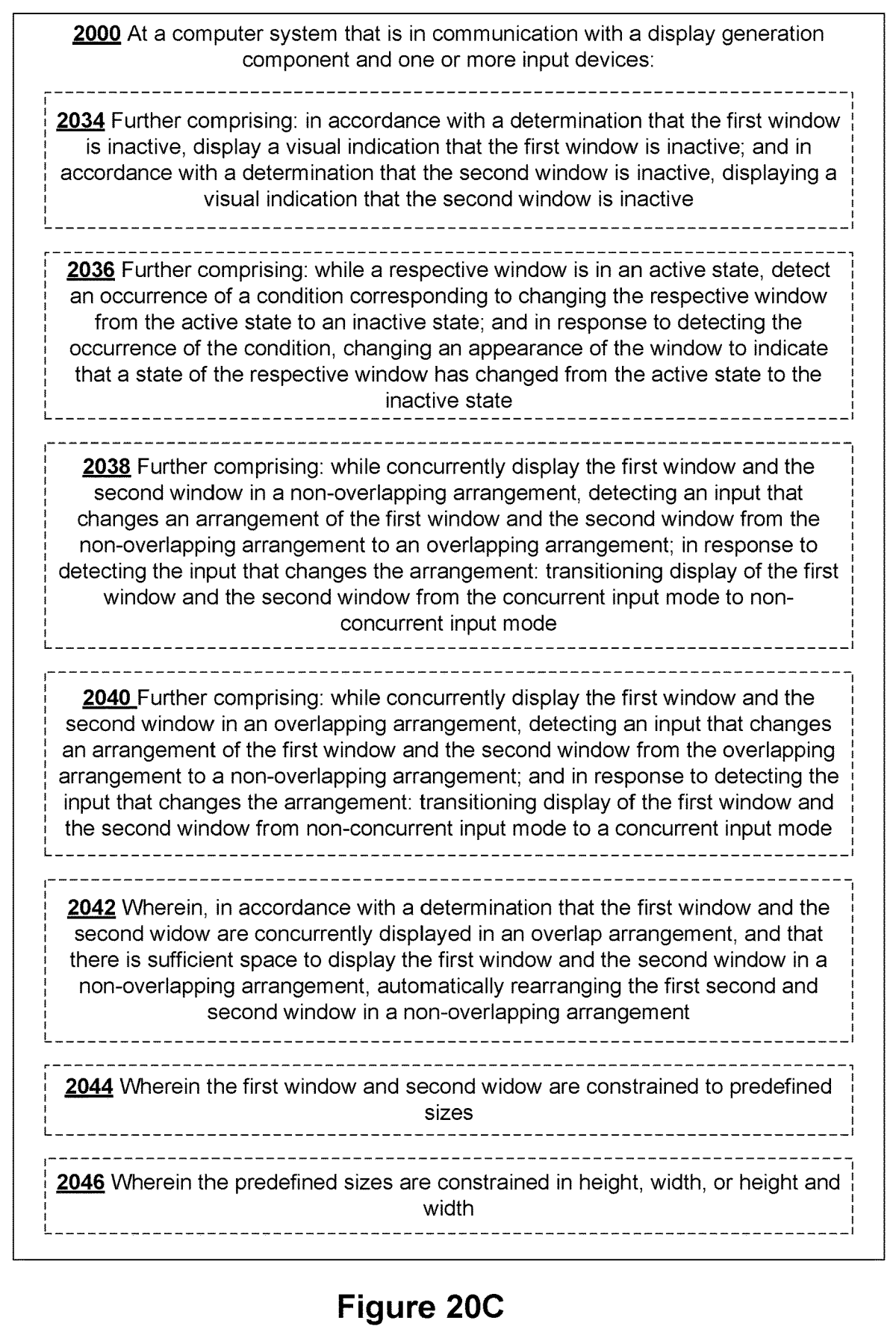

2000 At a computer system that is in communication with a display generation component and one or more input devices:

2034 Further comprising: in accordance with a determination that the first window is inactive, display a visual indication that the first window is inactive; and in accordance with a determination that the second window is inactive, displaying a visual indication that the second window is inactive

2036 Further comprising: while a respective window is in an active state, detect an occurrence of a condition corresponding to changing the respective window from the active state to an inactive state; and in response to detecting the occurrence of the condition, changing an appearance of the window to indicate that a state of the respective window has changed from the active state to the inactive state

2038 Further comprising: while concurrently display the first window and the second window in a non-overlapping arrangement, detecting an input that changes an arrangement of the first window and the second window from the non-overlapping arrangement to an overlapping arrangement; in response to detecting the input that changes the arrangement: transitioning display of the first window and the second window from the concurrent input mode to non-concurrent input mode

2040 Further comprising: while concurrently display the first window and the second window in an overlapping arrangement, detecting an input that changes an arrangement of the first window and the second window from the overlapping arrangement to a non-overlapping arrangement; and in response to detecting the input that changes the arrangement: transitioning display of the first window and the second window from non-concurrent input mode to a concurrent input mode

2042 Wherein, in accordance with a determination that the first window and the second widow are concurrently displayed in an overlap arrangement, and that there is sufficient space to display the first window and the second window in a non-overlapping arrangement, automatically rearranging the first second and second window in a non-overlapping arrangement

2044 Wherein the first window and second widow are constrained to predefined sizes

2046 Wherein the predefined sizes are constrained in height, width, or height and width

Figure 20C

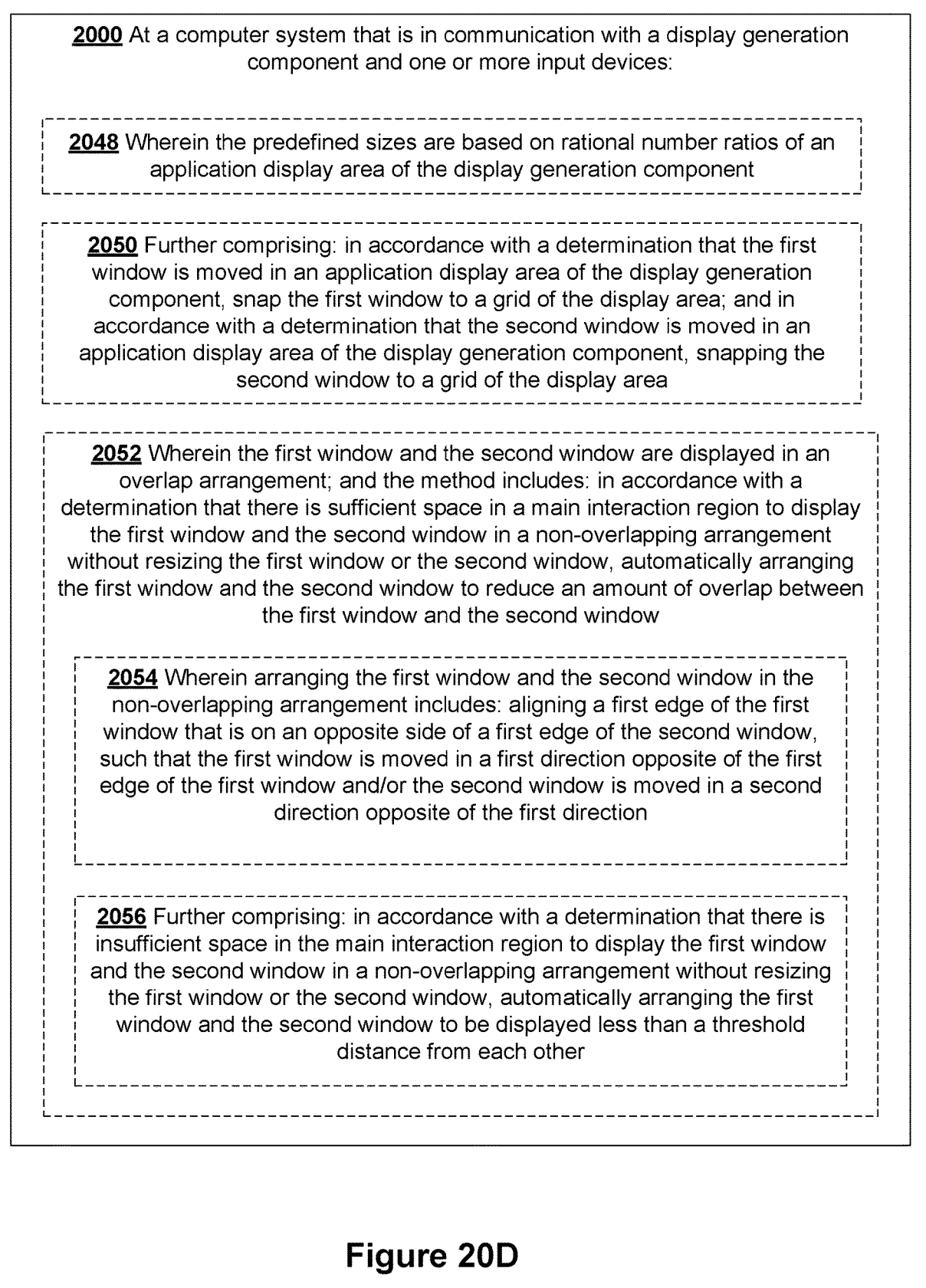

2000 At a computer system that is in communication with a display generation component and one or more input devices:

2048 Wherein the predefined sizes are based on rational number ratios of an application display area of the display generation component

2050 Further comprising: in accordance with a determination that the first window is moved in an application display area of the display generation component, snap the first window to a grid of the display area; and in accordance with a determination that the second window is moved in an application display area of the display generation component, snapping the second window to a grid of the display area

2052 Wherein the first window and the second window are displayed in an overlap arrangement; and the method includes: in accordance with a determination that there is sufficient space in a main interaction region to display the first window and the second window in a non-overlapping arrangement without resizing the first window or the second window, automatically arranging the first window and the second window to reduce an amount of overlap between the first window and the second window

2054 Wherein arranging the first window and the second window in the non-overlapping arrangement includes: aligning a first edge of the first window that is on an opposite side of a first edge of the second window, such that the first window is moved in a first direction opposite of the first edge of the first window and/or the second window is moved in a second direction opposite of the first direction

2056 Further comprising: in accordance with a determination that there is insufficient space in the main interaction region to display the first window and the second window in a non-overlapping arrangement without resizing the first window or the second window, automatically arranging the first window and the second window to be displayed less than a threshold distance from each other

Figure 20D

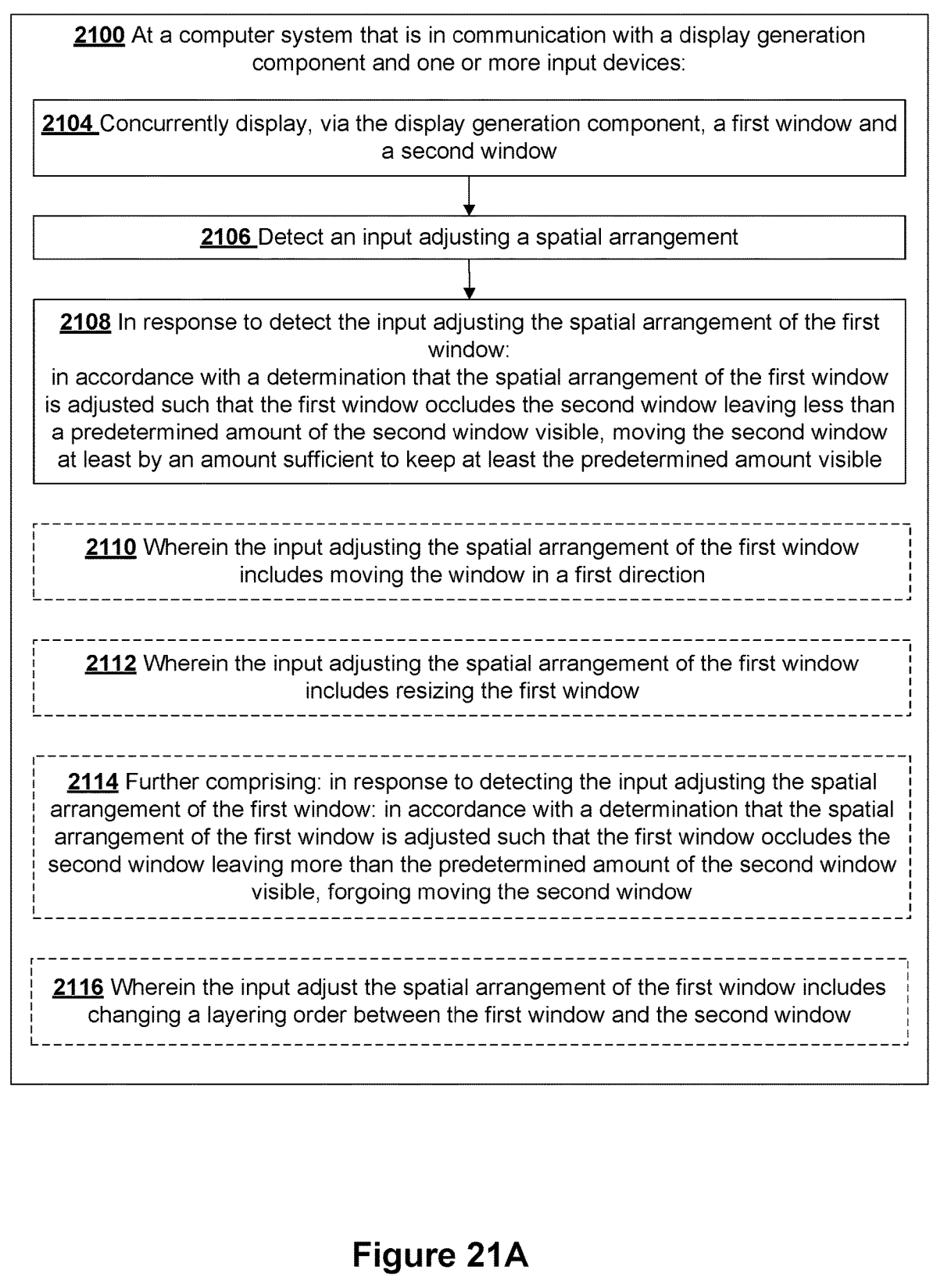

2100 At a computer system that is in communication with a display generation component and one or more input devices:

2104 Concurrently display, via the display generation component, a first window and a second window

2106 Detect an input adjusting a spatial arrangement

2108 In response to detect the input adjusting the spatial arrangement of the first window:
in accordance with a determination that the spatial arrangement of the first window is adjusted such that the first window occludes the second window leaving less than a predetermined amount of the second window visible, moving the second window at least by an amount sufficient to keep at least the predetermined amount visible

2110 Wherein the input adjusting the spatial arrangement of the first window includes moving the window in a first direction

2112 Wherein the input adjusting the spatial arrangement of the first window includes resizing the first window

2114 Further comprising: in response to detecting the input adjusting the spatial arrangement of the first window: in accordance with a determination that the spatial arrangement of the first window is adjusted such that the first window occludes the second window leaving more than the predetermined amount of the second window visible, forgoing moving the second window

2116 Wherein the input adjust the spatial arrangement of the first window includes changing a layering order between the first window and the second window

Figure 21A

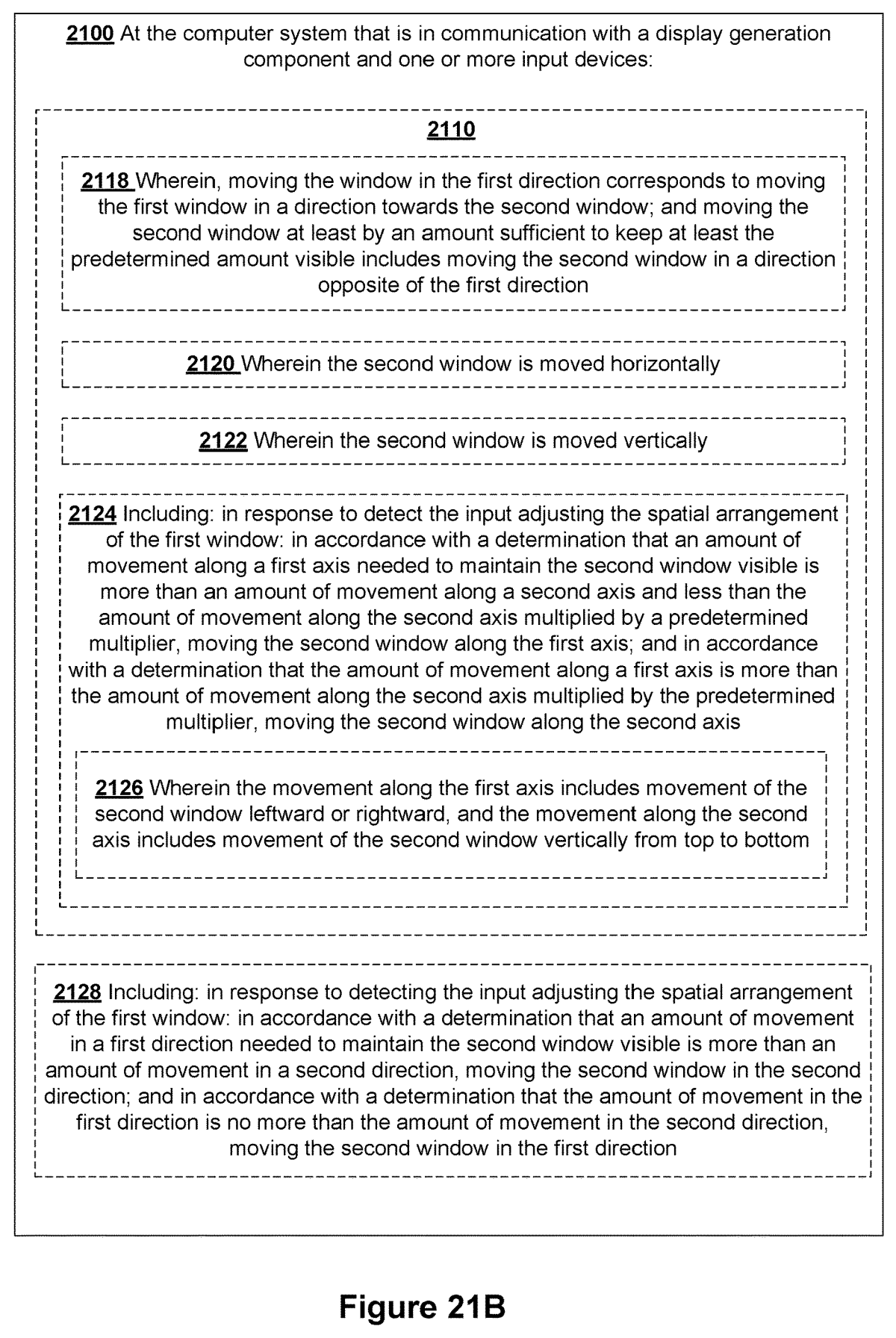

2100 At the computer system that is in communication with a display generation component and one or more input devices:

2110

2118 Wherein, moving the window in the first direction corresponds to moving the first window in a direction towards the second window; and moving the second window at least by an amount sufficient to keep at least the predetermined amount visible includes moving the second window in a direction opposite of the first direction

2120 Wherein the second window is moved horizontally

2122 Wherein the second window is moved vertically

2124 Including: in response to detect the input adjusting the spatial arrangement of the first window: in accordance with a determination that an amount of movement along a first axis needed to maintain the second window visible is more than an amount of movement along a second axis and less than the amount of movement along the second axis multiplied by a predetermined multiplier, moving the second window along the first axis; and in accordance with a determination that the amount of movement along a first axis is more than the amount of movement along the second axis multiplied by the predetermined multiplier, moving the second window along the second axis

2126 Wherein the movement along the first axis includes movement of the second window leftward or rightward, and the movement along the second axis includes movement of the second window vertically from top to bottom

2128 Including: in response to detecting the input adjusting the spatial arrangement of the first window: in accordance with a determination that an amount of movement in a first direction needed to maintain the second window visible is more than an amount of movement in a second direction, moving the second window in the second direction; and in accordance with a determination that the amount of movement in the first direction is no more than the amount of movement in the second direction, moving the second window in the first direction

Figure 21B

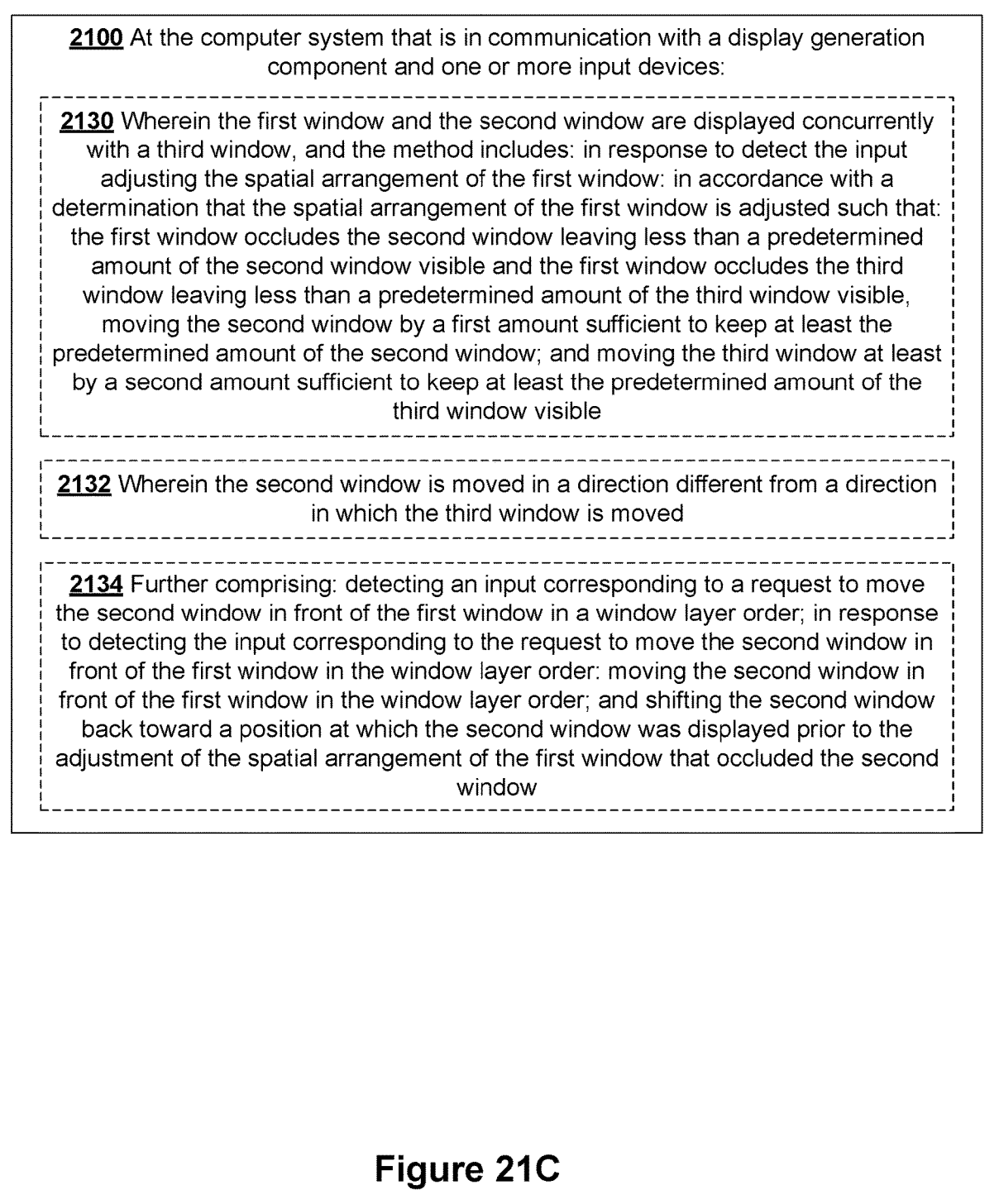

2100 At the computer system that is in communication with a display generation component and one or more input devices:

2130 Wherein the first window and the second window are displayed concurrently with a third window, and the method includes: in response to detect the input adjusting the spatial arrangement of the first window: in accordance with a determination that the spatial arrangement of the first window is adjusted such that: the first window occludes the second window leaving less than a predetermined amount of the second window visible and the first window occludes the third window leaving less than a predetermined amount of the third window visible, moving the second window by a first amount sufficient to keep at least the predetermined amount of the second window; and moving the third window at least by a second amount sufficient to keep at least the predetermined amount of the third window visible

2132 Wherein the second window is moved in a direction different from a direction in which the third window is moved

2134 Further comprising: detecting an input corresponding to a request to move the second window in front of the first window in a window layer order; in response to detecting the input corresponding to the request to move the second window in front of the first window in the window layer order: moving the second window in front of the first window in the window layer order; and shifting the second window back toward a position at which the second window was displayed prior to the adjustment of the spatial arrangement of the first window that occluded the second window

Figure 21C

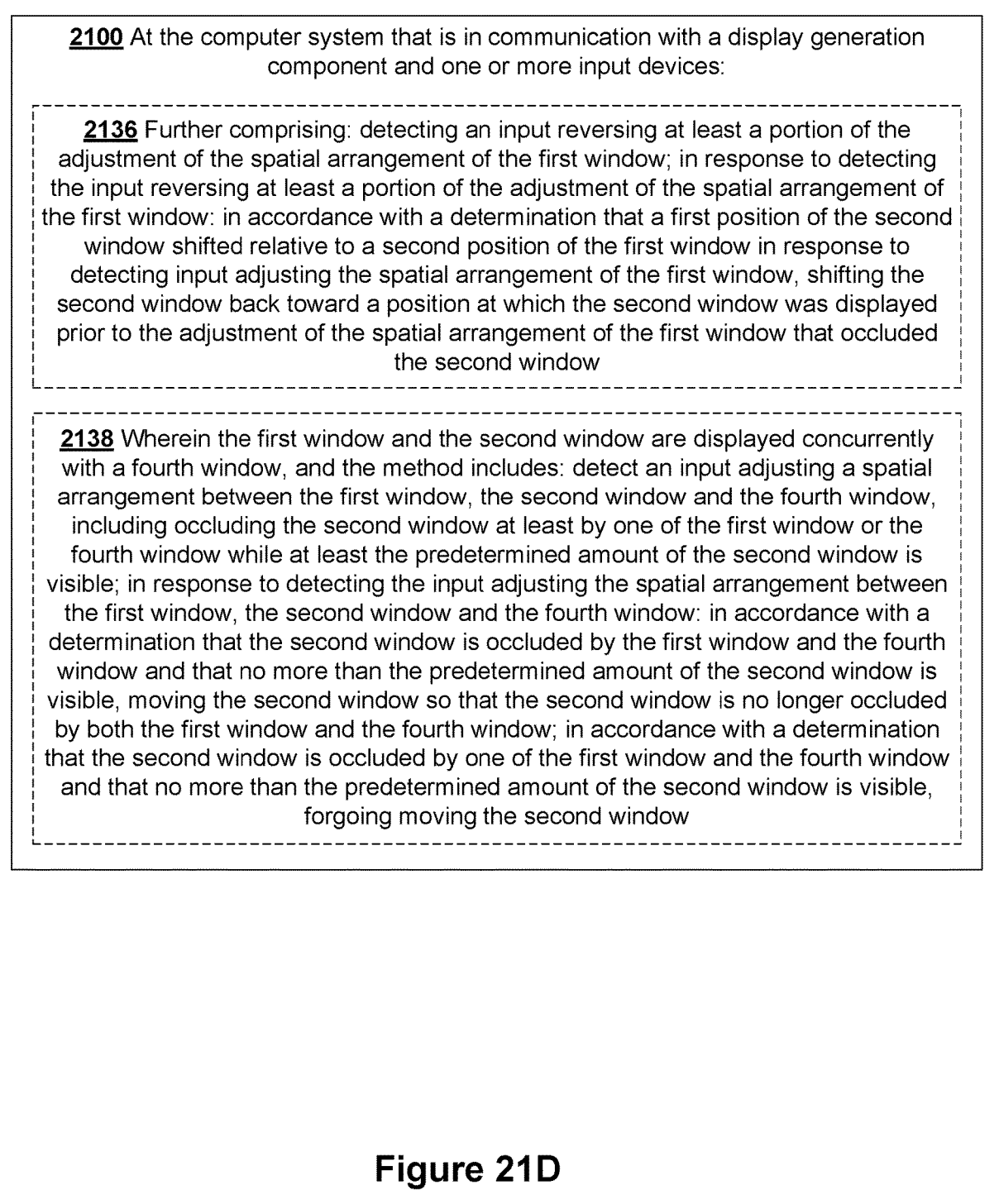

2100 At the computer system that is in communication with a display generation component and one or more input devices:

2136 Further comprising: detecting an input reversing at least a portion of the adjustment of the spatial arrangement of the first window; in response to detecting the input reversing at least a portion of the adjustment of the spatial arrangement of the first window: in accordance with a determination that a first position of the second window shifted relative to a second position of the first window in response to detecting input adjusting the spatial arrangement of the first window, shifting the second window back toward a position at which the second window was displayed prior to the adjustment of the spatial arrangement of the first window that occluded the second window

2138 Wherein the first window and the second window are displayed concurrently with a fourth window, and the method includes: detect an input adjusting a spatial arrangement between the first window, the second window and the fourth window, including occluding the second window at least by one of the first window or the fourth window while at least the predetermined amount of the second window is visible; in response to detecting the input adjusting the spatial arrangement between the first window, the second window and the fourth window: in accordance with a determination that the second window is occluded by the first window and the fourth window and that no more than the predetermined amount of the second window is visible, moving the second window so that the second window is no longer occluded by both the first window and the fourth window; in accordance with a determination that the second window is occluded by one of the first window and the fourth window and that no more than the predetermined amount of the second window is visible, forgoing moving the second window

Figure 21D

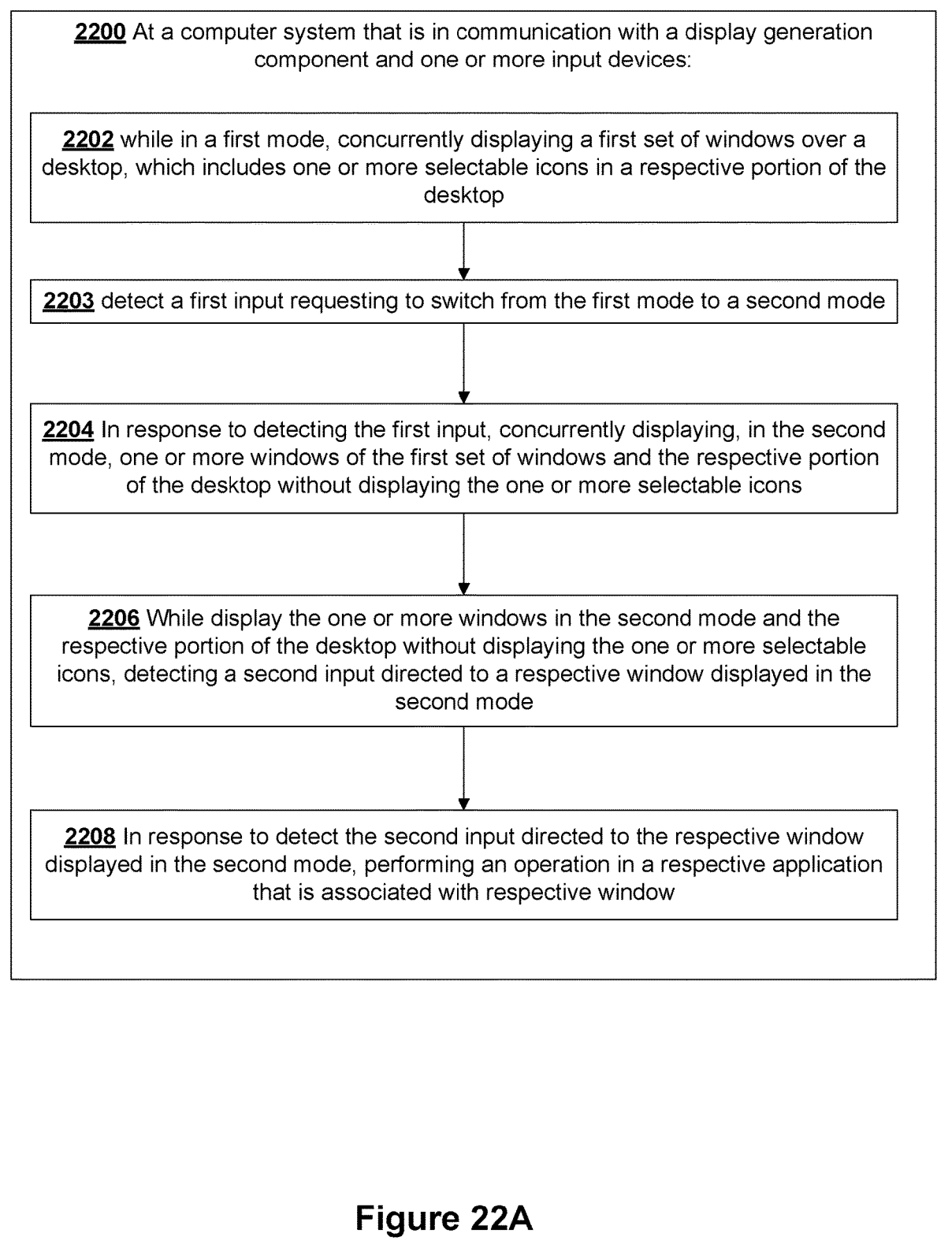

2200 At a computer system that is in communication with a display generation component and one or more input devices:

2202 while in a first mode, concurrently displaying a first set of windows over a desktop, which includes one or more selectable icons in a respective portion of the desktop

↓

2203 detect a first input requesting to switch from the first mode to a second mode

↓

2204 In response to detecting the first input, concurrently displaying, in the second mode, one or more windows of the first set of windows and the respective portion of the desktop without displaying the one or more selectable icons

↓

2206 While display the one or more windows in the second mode and the respective portion of the desktop without displaying the one or more selectable icons, detecting a second input directed to a respective window displayed in the second mode

↓

2208 In response to detect the second input directed to the respective window displayed in the second mode, performing an operation in a respective application that is associated with respective window

Figure 22A

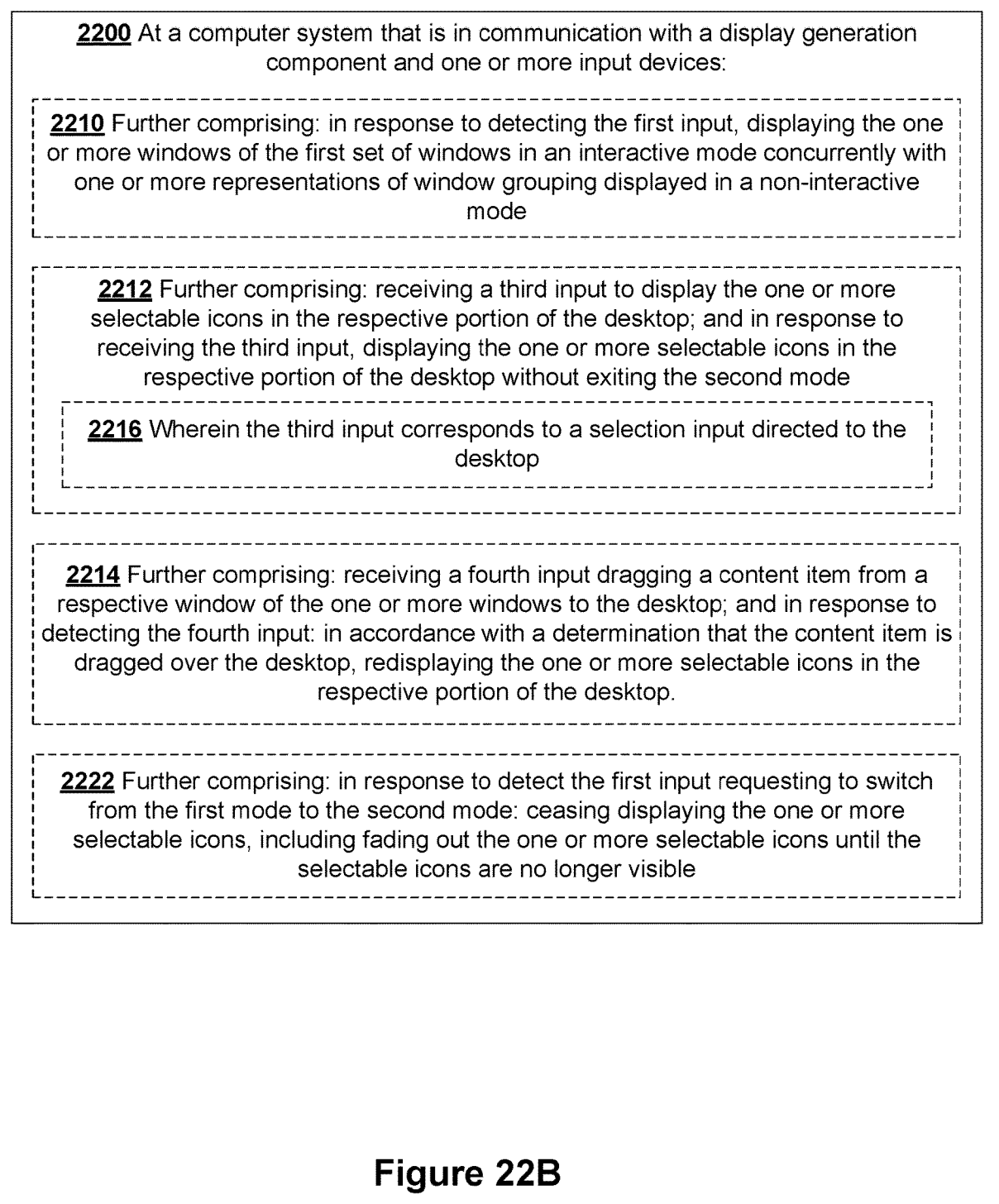

2200 At a computer system that is in communication with a display generation component and one or more input devices:

2210 Further comprising: in response to detecting the first input, displaying the one or more windows of the first set of windows in an interactive mode concurrently with one or more representations of window grouping displayed in a non-interactive mode

2212 Further comprising: receiving a third input to display the one or more selectable icons in the respective portion of the desktop; and in response to receiving the third input, displaying the one or more selectable icons in the respective portion of the desktop without exiting the second mode

2216 Wherein the third input corresponds to a selection input directed to the desktop

2214 Further comprising: receiving a fourth input dragging a content item from a respective window of the one or more windows to the desktop; and in response to detecting the fourth input: in accordance with a determination that the content item is dragged over the desktop, redisplaying the one or more selectable icons in the respective portion of the desktop.

2222 Further comprising: in response to detect the first input requesting to switch from the first mode to the second mode: ceasing displaying the one or more selectable icons, including fading out the one or more selectable icons until the selectable icons are no longer visible

Figure 22B

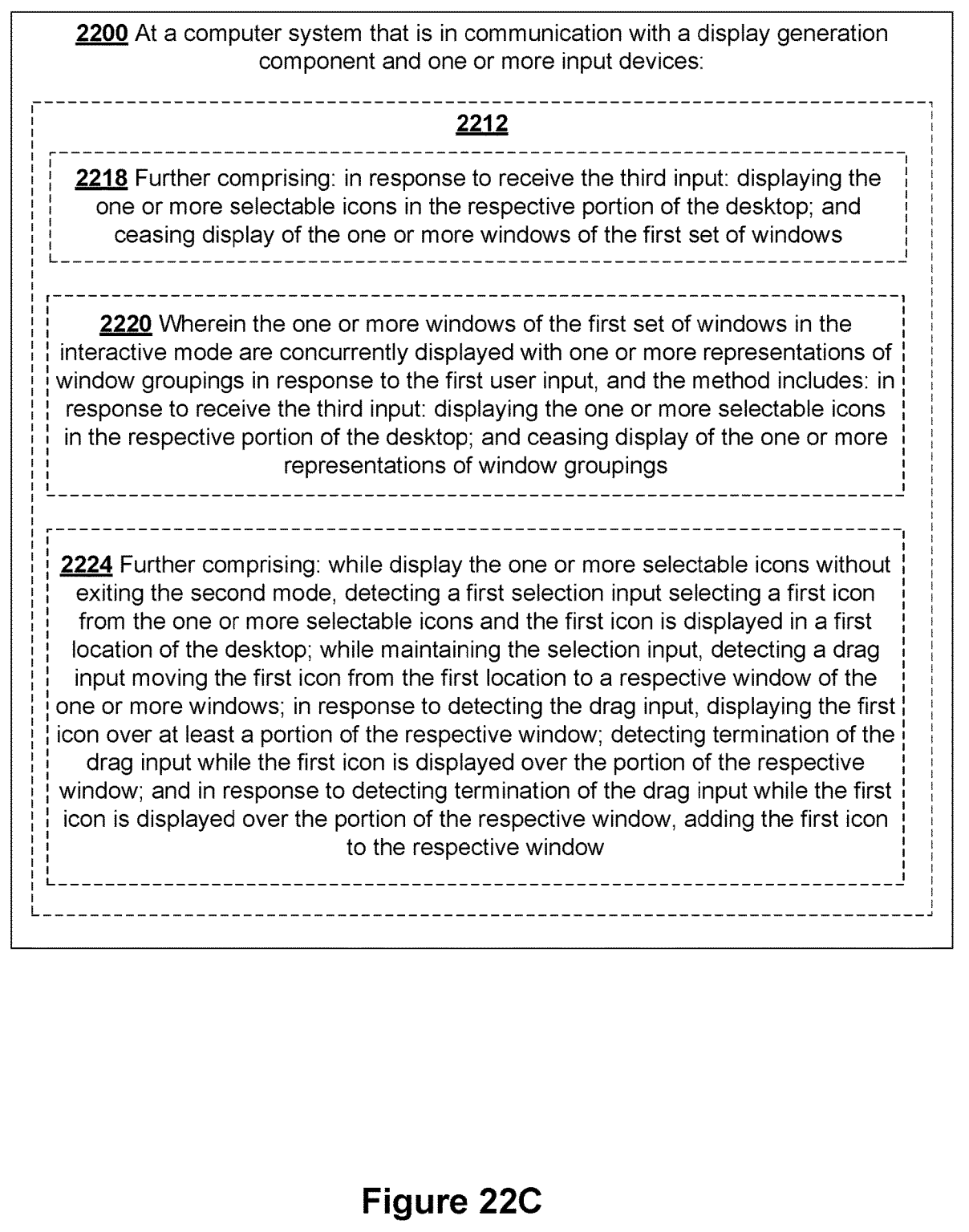

2200 At a computer system that is in communication with a display generation component and one or more input devices:

2212

2218 Further comprising: in response to receive the third input: displaying the one or more selectable icons in the respective portion of the desktop; and ceasing display of the one or more windows of the first set of windows

2220 Wherein the one or more windows of the first set of windows in the interactive mode are concurrently displayed with one or more representations of window groupings in response to the first user input, and the method includes: in response to receive the third input: displaying the one or more selectable icons in the respective portion of the desktop; and ceasing display of the one or more representations of window groupings

2224 Further comprising: while display the one or more selectable icons without exiting the second mode, detecting a first selection input selecting a first icon from the one or more selectable icons and the first icon is displayed in a first location of the desktop; while maintaining the selection input, detecting a drag input moving the first icon from the first location to a respective window of the one or more windows; in response to detecting the drag input, displaying the first icon over at least a portion of the respective window; detecting termination of the drag input while the first icon is displayed over the portion of the respective window; and in response to detecting termination of the drag input while the first icon is displayed over the portion of the respective window, adding the first icon to the respective window

Figure 22C

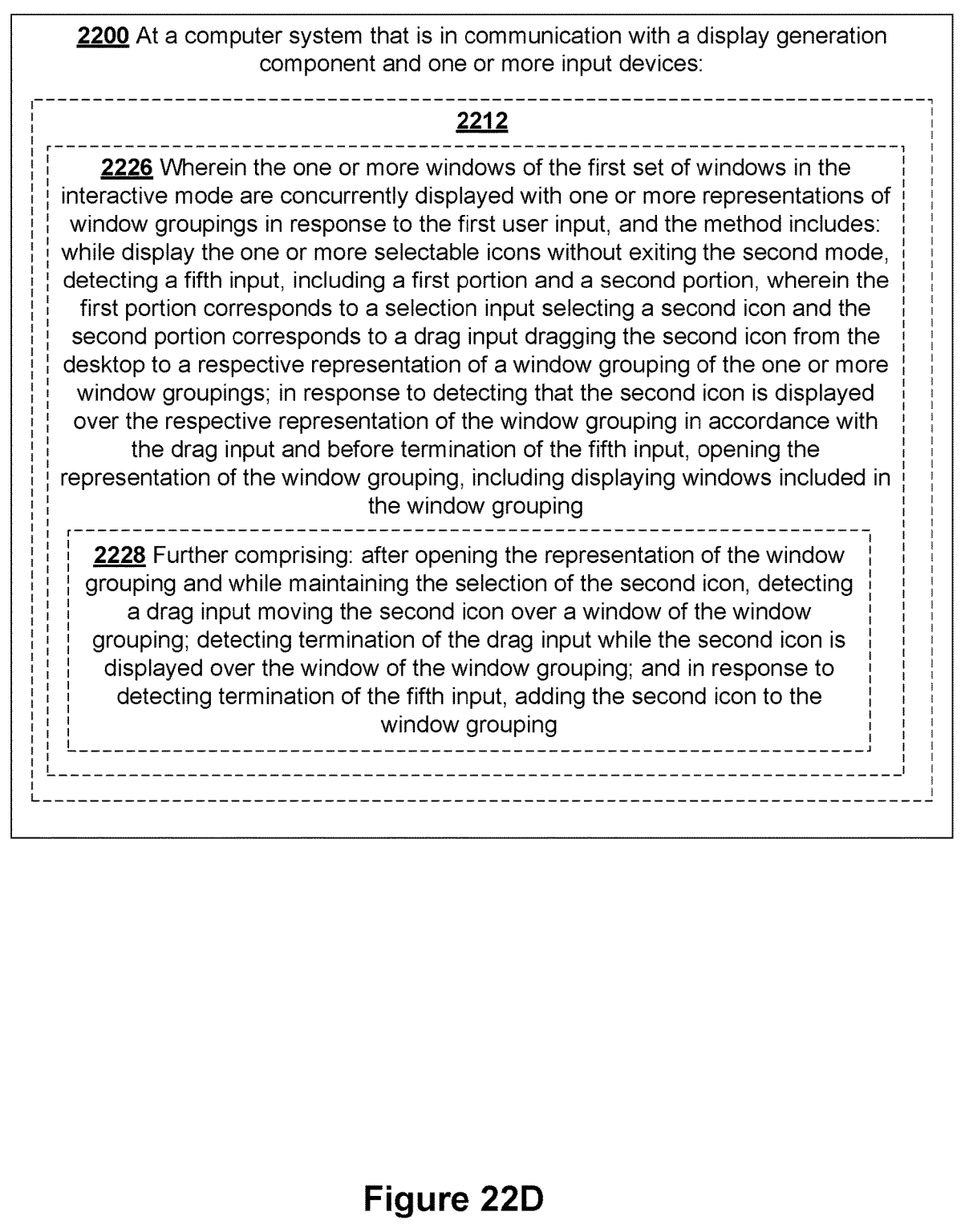

2200 At a computer system that is in communication with a display generation component and one or more input devices:

2212

2226 Wherein the one or more windows of the first set of windows in the interactive mode are concurrently displayed with one or more representations of window groupings in response to the first user input, and the method includes: while display the one or more selectable icons without exiting the second mode, detecting a fifth input, including a first portion and a second portion, wherein the first portion corresponds to a selection input selecting a second icon and the second portion corresponds to a drag input dragging the second icon from the desktop to a respective representation of a window grouping of the one or more window groupings; in response to detecting that the second icon is displayed over the respective representation of the window grouping in accordance with the drag input and before termination of the fifth input, opening the representation of the window grouping, including displaying windows included in the window grouping

2228 Further comprising: after opening the representation of the window grouping and while maintaining the selection of the second icon, detecting a drag input moving the second icon over a window of the window grouping; detecting termination of the drag input while the second icon is displayed over the window of the window grouping; and in response to detecting termination of the fifth input, adding the second icon to the window grouping

Figure 22D

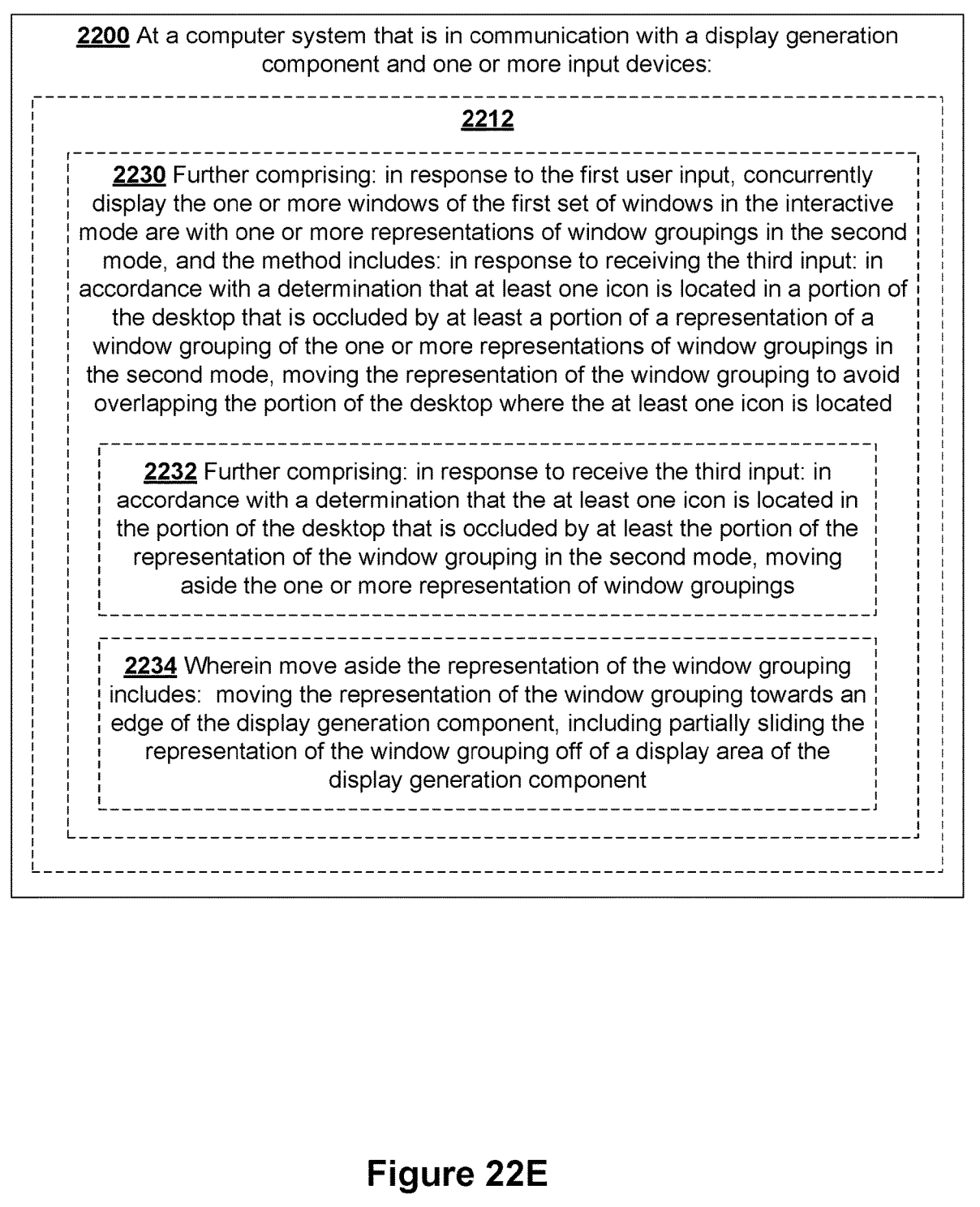

2200 At a computer system that is in communication with a display generation component and one or more input devices:

2212

2230 Further comprising: in response to the first user input, concurrently display the one or more windows of the first set of windows in the interactive mode are with one or more representations of window groupings in the second mode, and the method includes: in response to receiving the third input: in accordance with a determination that at least one icon is located in a portion of the desktop that is occluded by at least a portion of a representation of a window grouping of the one or more representations of window groupings in the second mode, moving the representation of the window grouping to avoid overlapping the portion of the desktop where the at least one icon is located

2232 Further comprising: in response to receive the third input: in accordance with a determination that the at least one icon is located in the portion of the desktop that is occluded by at least the portion of the representation of the window grouping in the second mode, moving aside the one or more representation of window groupings

2234 Wherein move aside the representation of the window grouping includes: moving the representation of the window grouping towards an edge of the display generation component, including partially sliding the representation of the window grouping off of a display area of the display generation component

Figure 22E

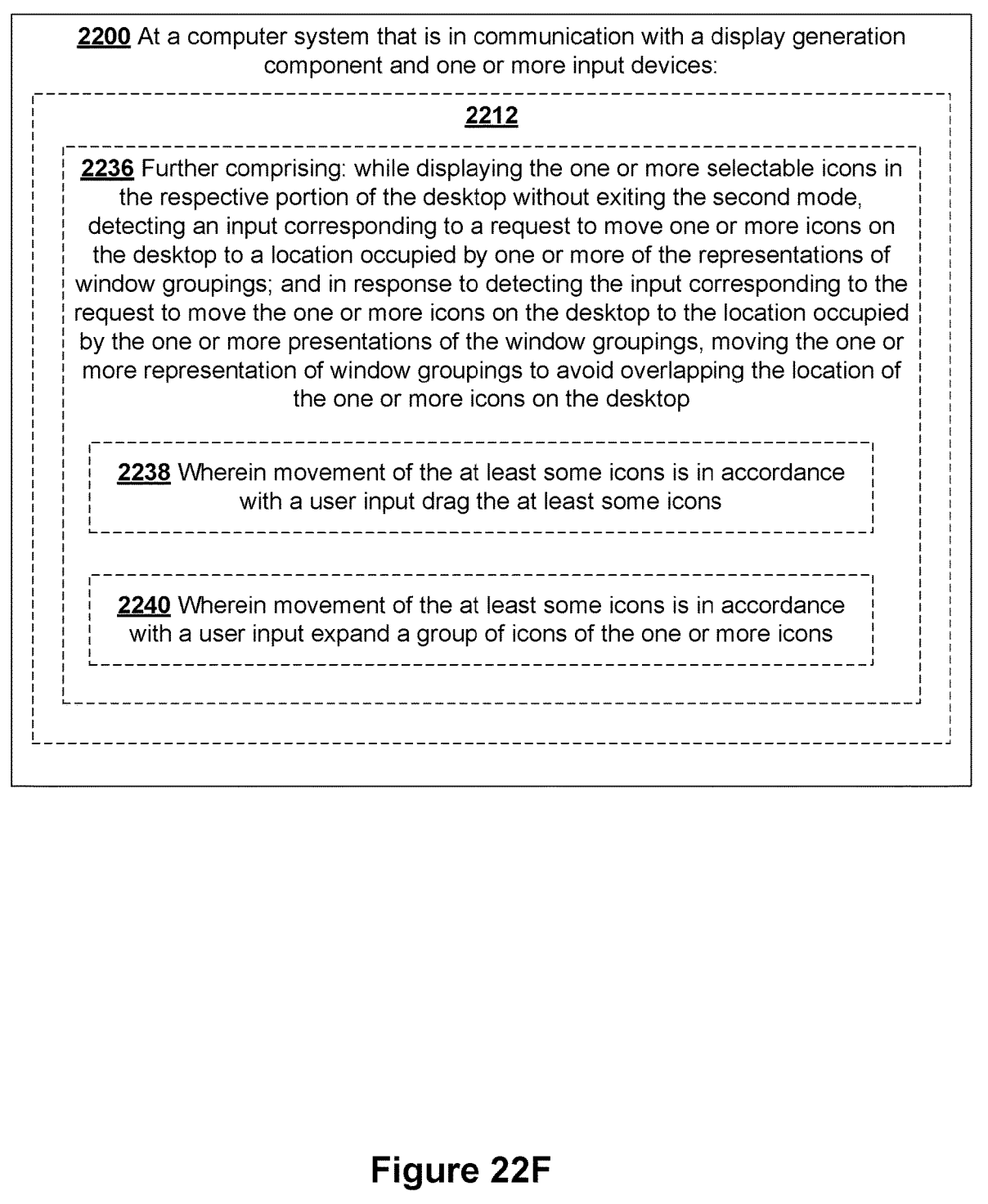

2200 At a computer system that is in communication with a display generation component and one or more input devices:

2212

2236 Further comprising: while displaying the one or more selectable icons in the respective portion of the desktop without exiting the second mode, detecting an input corresponding to a request to move one or more icons on the desktop to a location occupied by one or more of the representations of window groupings; and in response to detecting the input corresponding to the request to move the one or more icons on the desktop to the location occupied by the one or more presentations of the window groupings, moving the one or more representation of window groupings to avoid overlapping the location of the one or more icons on the desktop

2238 Wherein movement of the at least some icons is in accordance with a user input drag the at least some icons

2240 Wherein movement of the at least some icons is in accordance with a user input expand a group of icons of the one or more icons

Figure 22F

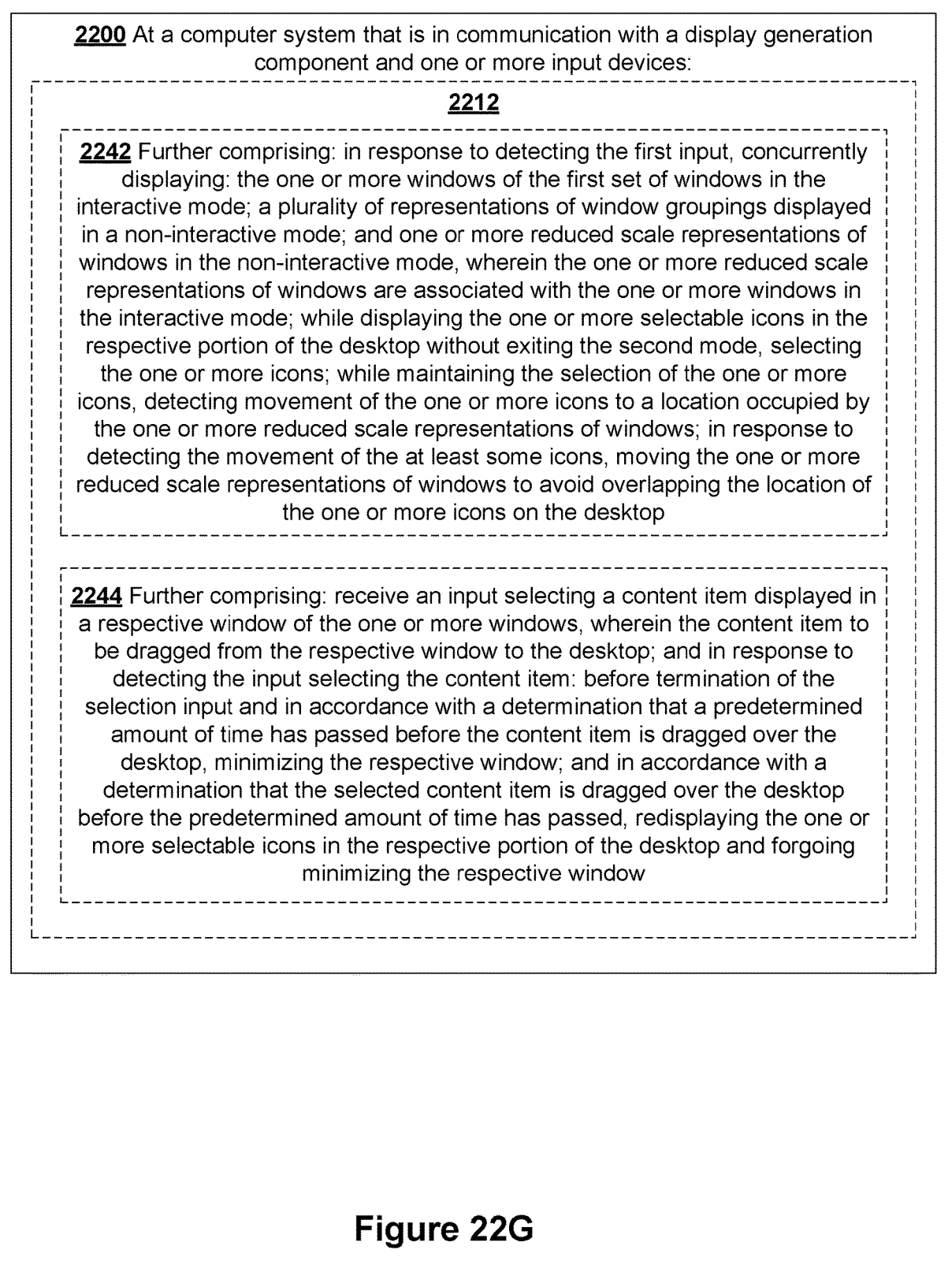

2200 At a computer system that is in communication with a display generation component and one or more input devices:

2212

2242 Further comprising: in response to detecting the first input, concurrently displaying: the one or more windows of the first set of windows in the interactive mode; a plurality of representations of window groupings displayed in a non-interactive mode; and one or more reduced scale representations of windows in the non-interactive mode, wherein the one or more reduced scale representations of windows are associated with the one or more windows in the interactive mode; while displaying the one or more selectable icons in the respective portion of the desktop without exiting the second mode, selecting the one or more icons; while maintaining the selection of the one or more icons, detecting movement of the one or more icons to a location occupied by the one or more reduced scale representations of windows; in response to detecting the movement of the at least some icons, moving the one or more reduced scale representations of windows to avoid overlapping the location of the one or more icons on the desktop

2244 Further comprising: receive an input selecting a content item displayed in a respective window of the one or more windows, wherein the content item to be dragged from the respective window to the desktop; and in response to detecting the input selecting the content item: before termination of the selection input and in accordance with a determination that a predetermined amount of time has passed before the content item is dragged over the desktop, minimizing the respective window; and in accordance with a determination that the selected content item is dragged over the desktop before the predetermined amount of time has passed, redisplaying the one or more selectable icons in the respective portion of the desktop and forgoing minimizing the respective window

Figure 22G

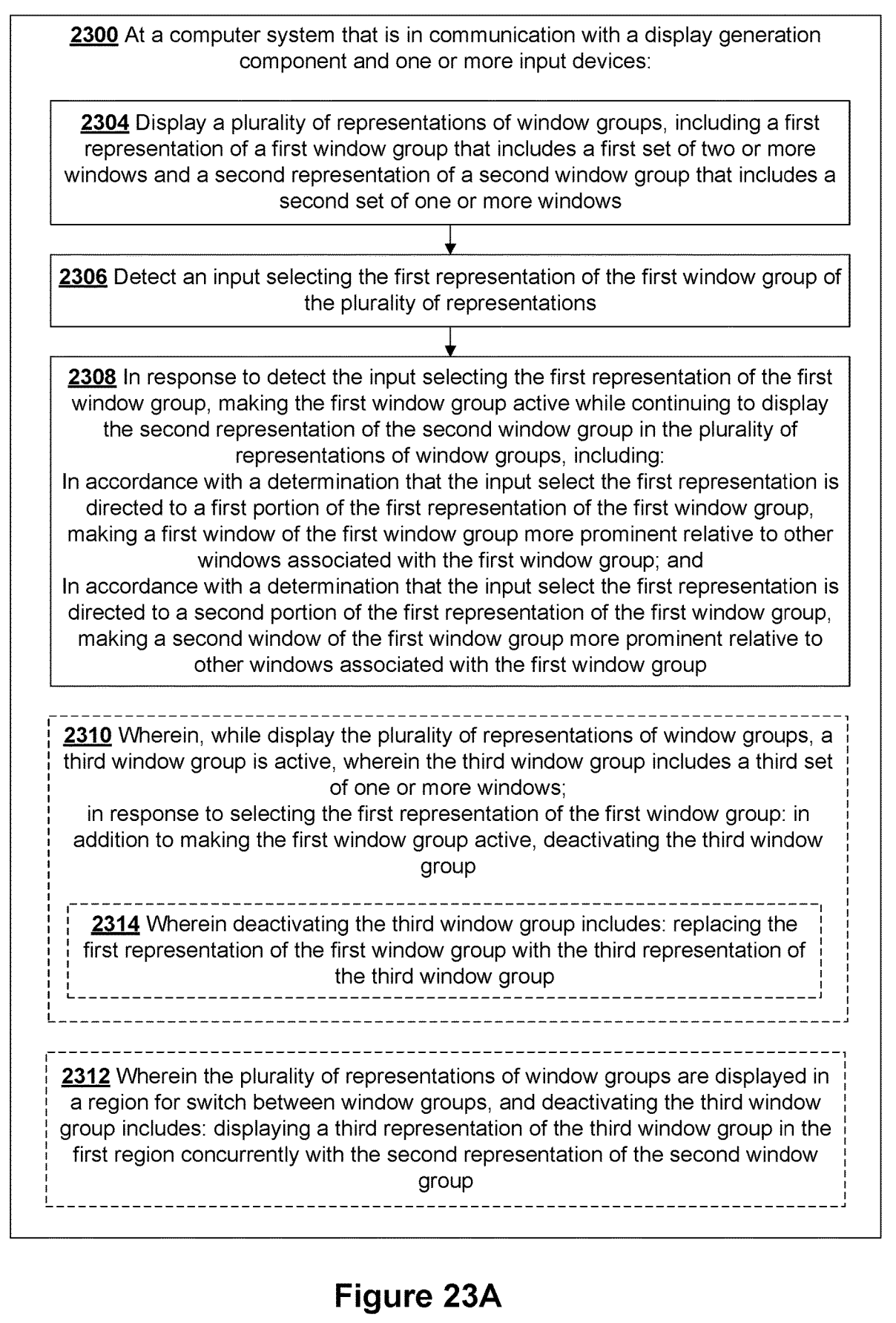

2300 At a computer system that is in communication with a display generation component and one or more input devices:

2304 Display a plurality of representations of window groups, including a first representation of a first window group that includes a first set of two or more windows and a second representation of a second window group that includes a second set of one or more windows

2306 Detect an input selecting the first representation of the first window group of the plurality of representations

2308 In response to detect the input selecting the first representation of the first window group, making the first window group active while continuing to display the second representation of the second window group in the plurality of representations of window groups, including:
In accordance with a determination that the input select the first representation is directed to a first portion of the first representation of the first window group, making a first window of the first window group more prominent relative to other windows associated with the first window group; and
In accordance with a determination that the input select the first representation is directed to a second portion of the first representation of the first window group, making a second window of the first window group more prominent relative to other windows associated with the first window group

2310 Wherein, while display the plurality of representations of window groups, a third window group is active, wherein the third window group includes a third set of one or more windows;
in response to selecting the first representation of the first window group: in addition to making the first window group active, deactivating the third window group

2314 Wherein deactivating the third window group includes: replacing the first representation of the first window group with the third representation of the third window group

2312 Wherein the plurality of representations of window groups are displayed in a region for switch between window groups, and deactivating the third window group includes: displaying a third representation of the third window group in the first region concurrently with the second representation of the second window group

Figure 23A

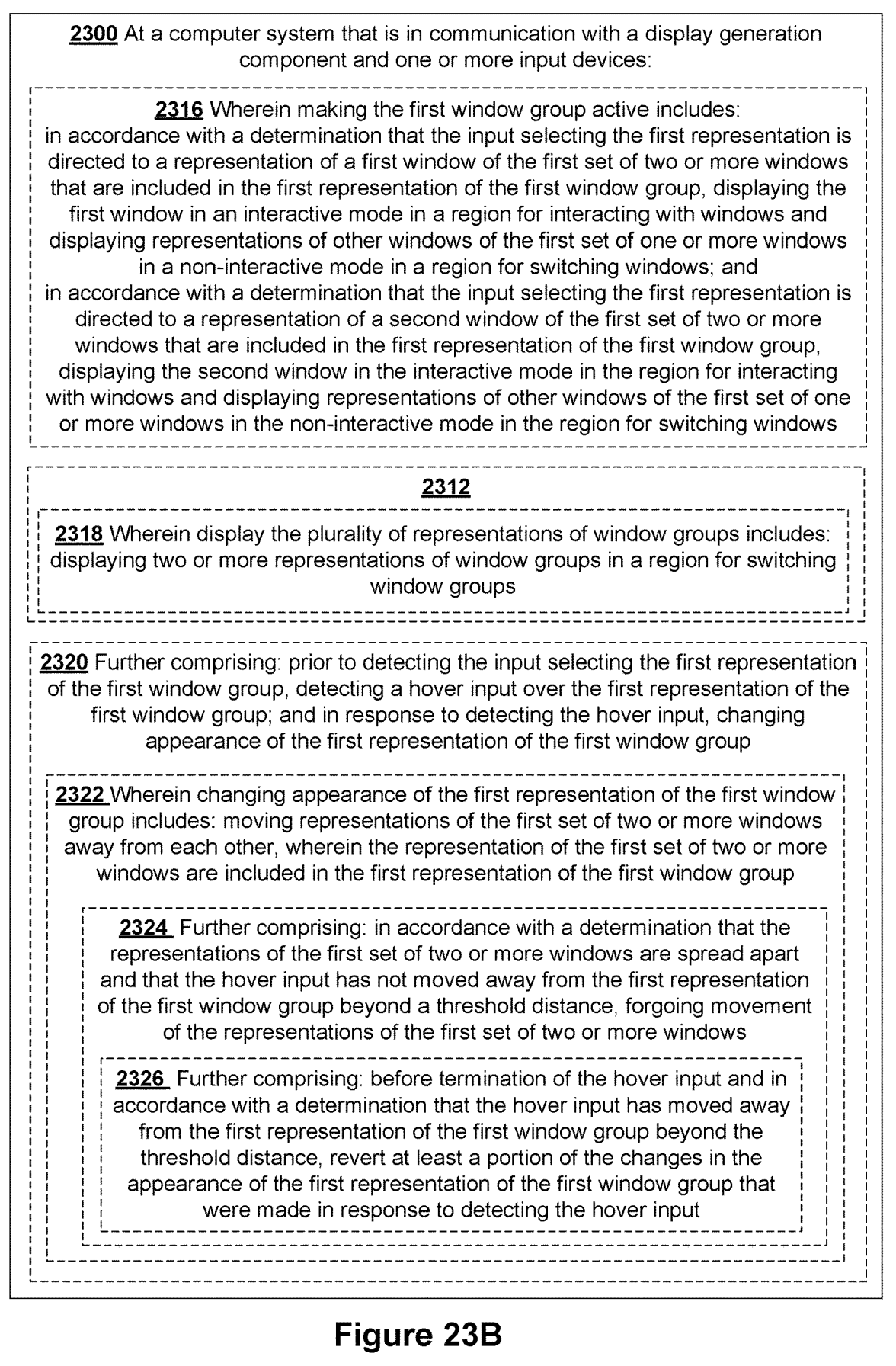

2300 At a computer system that is in communication with a display generation component and one or more input devices:

2316 Wherein making the first window group active includes:
in accordance with a determination that the input selecting the first representation is directed to a representation of a first window of the first set of two or more windows that are included in the first representation of the first window group, displaying the first window in an interactive mode in a region for interacting with windows and displaying representations of other windows of the first set of one or more windows in a non-interactive mode in a region for switching windows; and
in accordance with a determination that the input selecting the first representation is directed to a representation of a second window of the first set of two or more windows that are included in the first representation of the first window group, displaying the second window in the interactive mode in the region for interacting with windows and displaying representations of other windows of the first set of one or more windows in the non-interactive mode in the region for switching windows

2312

2318 Wherein display the plurality of representations of window groups includes: displaying two or more representations of window groups in a region for switching window groups

2320 Further comprising: prior to detecting the input selecting the first representation of the first window group, detecting a hover input over the first representation of the first window group; and in response to detecting the hover input, changing appearance of the first representation of the first window group

2322 Wherein changing appearance of the first representation of the first window group includes: moving representations of the first set of two or more windows away from each other, wherein the representation of the first set of two or more windows are included in the first representation of the first window group

2324 Further comprising: in accordance with a determination that the representations of the first set of two or more windows are spread apart and that the hover input has not moved away from the first representation of the first window group beyond a threshold distance, forgoing movement of the representations of the first set of two or more windows

2326 Further comprising: before termination of the hover input and in accordance with a determination that the hover input has moved away from the first representation of the first window group beyond the threshold distance, revert at least a portion of the changes in the appearance of the first representation of the first window group that were made in response to detecting the hover input

Figure 23B

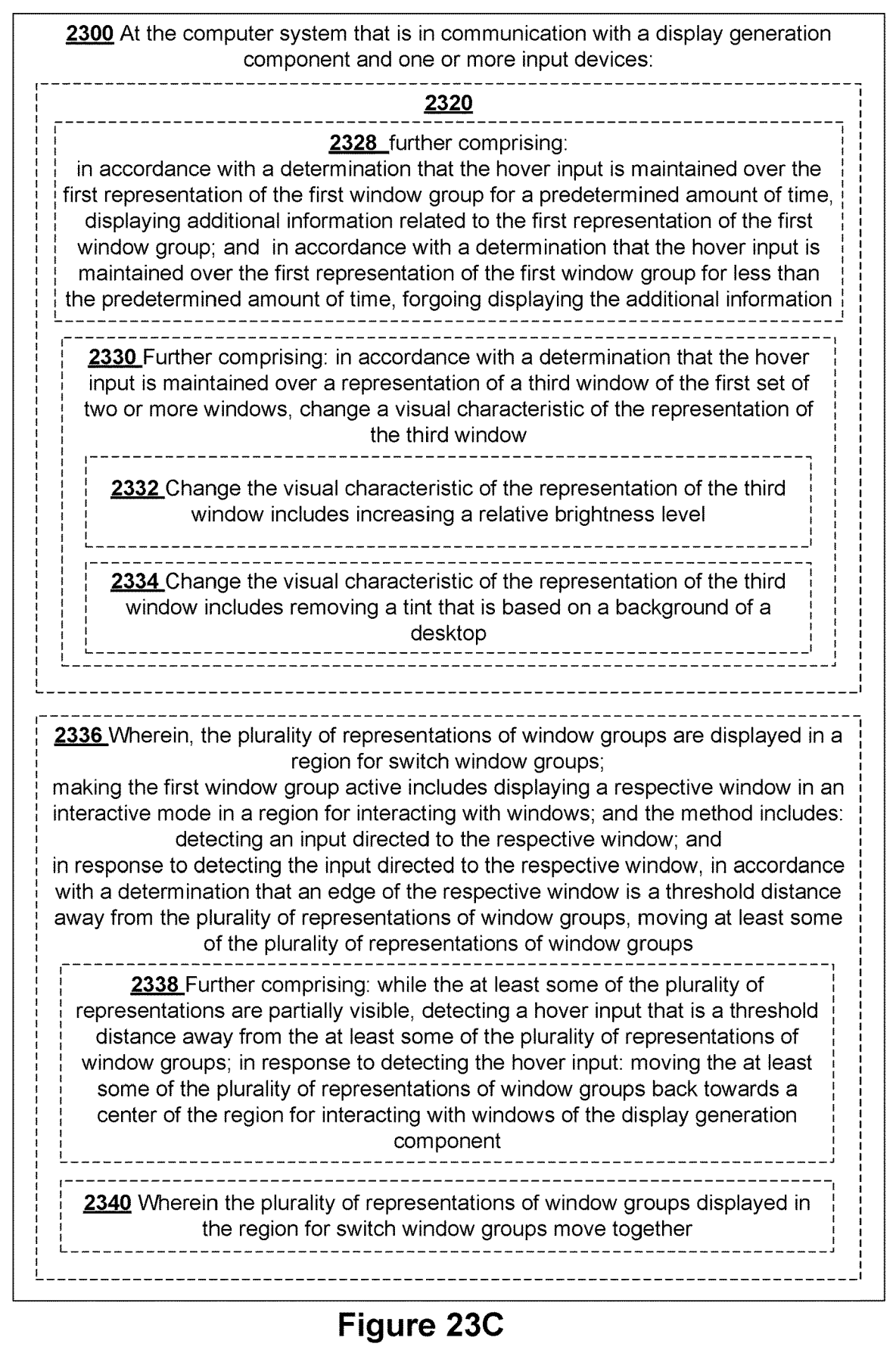

2300 At the computer system that is in communication with a display generation component and one or more input devices:

2320

2328 further comprising:
in accordance with a determination that the hover input is maintained over the first representation of the first window group for a predetermined amount of time, displaying additional information related to the first representation of the first window group; and in accordance with a determination that the hover input is maintained over the first representation of the first window group for less than the predetermined amount of time, forgoing displaying the additional information

2330 Further comprising: in accordance with a determination that the hover input is maintained over a representation of a third window of the first set of two or more windows, change a visual characteristic of the representation of the third window

2332 Change the visual characteristic of the representation of the third window includes increasing a relative brightness level

2334 Change the visual characteristic of the representation of the third window includes removing a tint that is based on a background of a desktop

2336 Wherein, the plurality of representations of window groups are displayed in a region for switch window groups;
making the first window group active includes displaying a respective window in an interactive mode in a region for interacting with windows; and the method includes: detecting an input directed to the respective window; and
in response to detecting the input directed to the respective window, in accordance with a determination that an edge of the respective window is a threshold distance away from the plurality of representations of window groups, moving at least some of the plurality of representations of window groups

2338 Further comprising: while the at least some of the plurality of representations are partially visible, detecting a hover input that is a threshold distance away from the at least some of the plurality of representations of window groups; in response to detecting the hover input: moving the at least some of the plurality of representations of window groups back towards a center of the region for interacting with windows of the display generation component

2340 Wherein the plurality of representations of window groups displayed in the region for switch window groups move together

Figure 23C

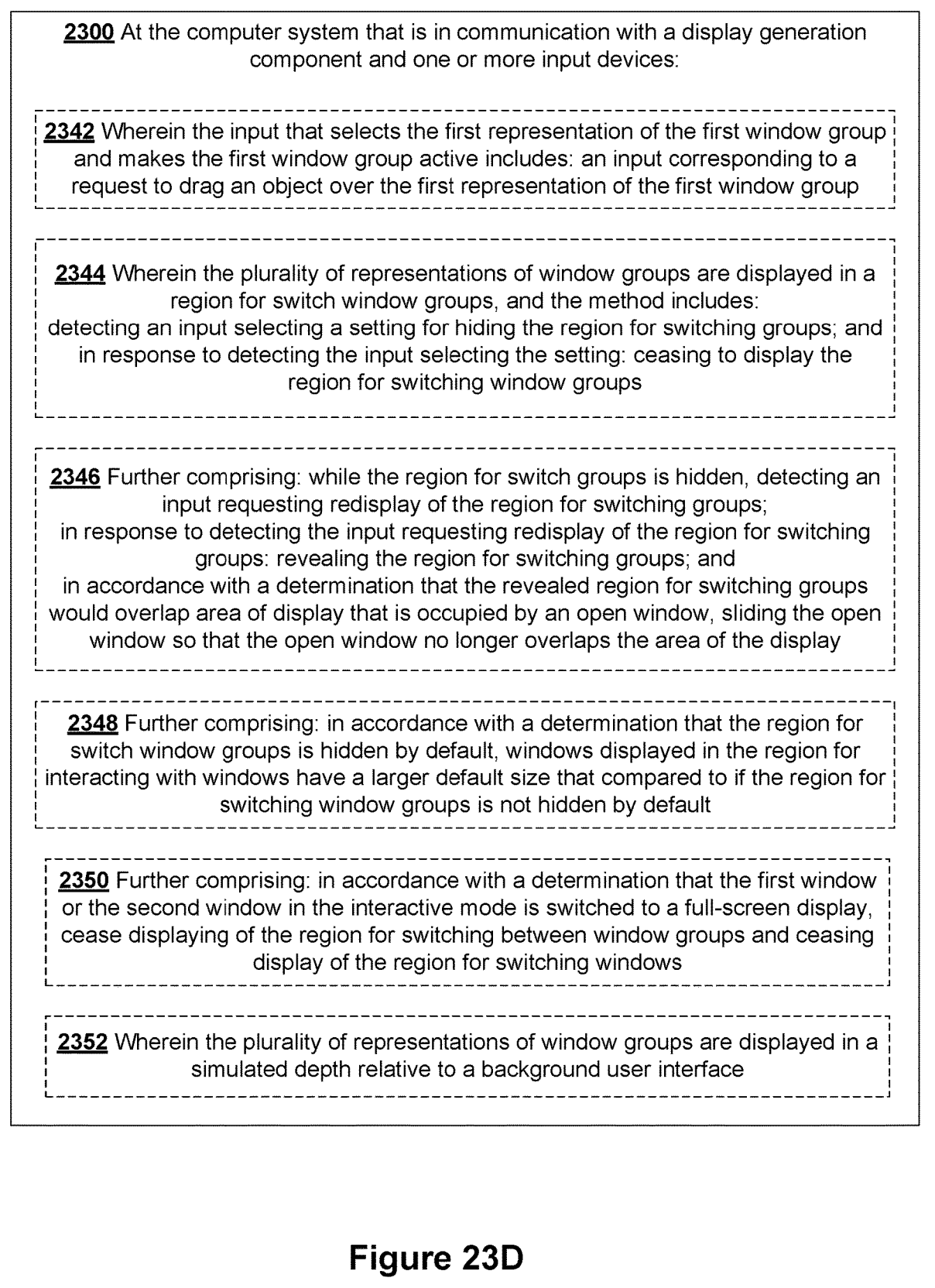

2300 At the computer system that is in communication with a display generation component and one or more input devices:

2342 Wherein the input that selects the first representation of the first window group and makes the first window group active includes: an input corresponding to a request to drag an object over the first representation of the first window group

2344 Wherein the plurality of representations of window groups are displayed in a region for switch window groups, and the method includes:
detecting an input selecting a setting for hiding the region for switching groups; and in response to detecting the input selecting the setting: ceasing to display the region for switching window groups

2346 Further comprising: while the region for switch groups is hidden, detecting an input requesting redisplay of the region for switching groups;
in response to detecting the input requesting redisplay of the region for switching groups: revealing the region for switching groups; and
in accordance with a determination that the revealed region for switching groups would overlap area of display that is occupied by an open window, sliding the open window so that the open window no longer overlaps the area of the display

2348 Further comprising: in accordance with a determination that the region for switch window groups is hidden by default, windows displayed in the region for interacting with windows have a larger default size that compared to if the region for switching window groups is not hidden by default

2350 Further comprising: in accordance with a determination that the first window or the second window in the interactive mode is switched to a full-screen display, cease displaying of the region for switching between window groups and ceasing display of the region for switching windows

2352 Wherein the plurality of representations of window groups are displayed in a simulated depth relative to a background user interface

Figure 23D

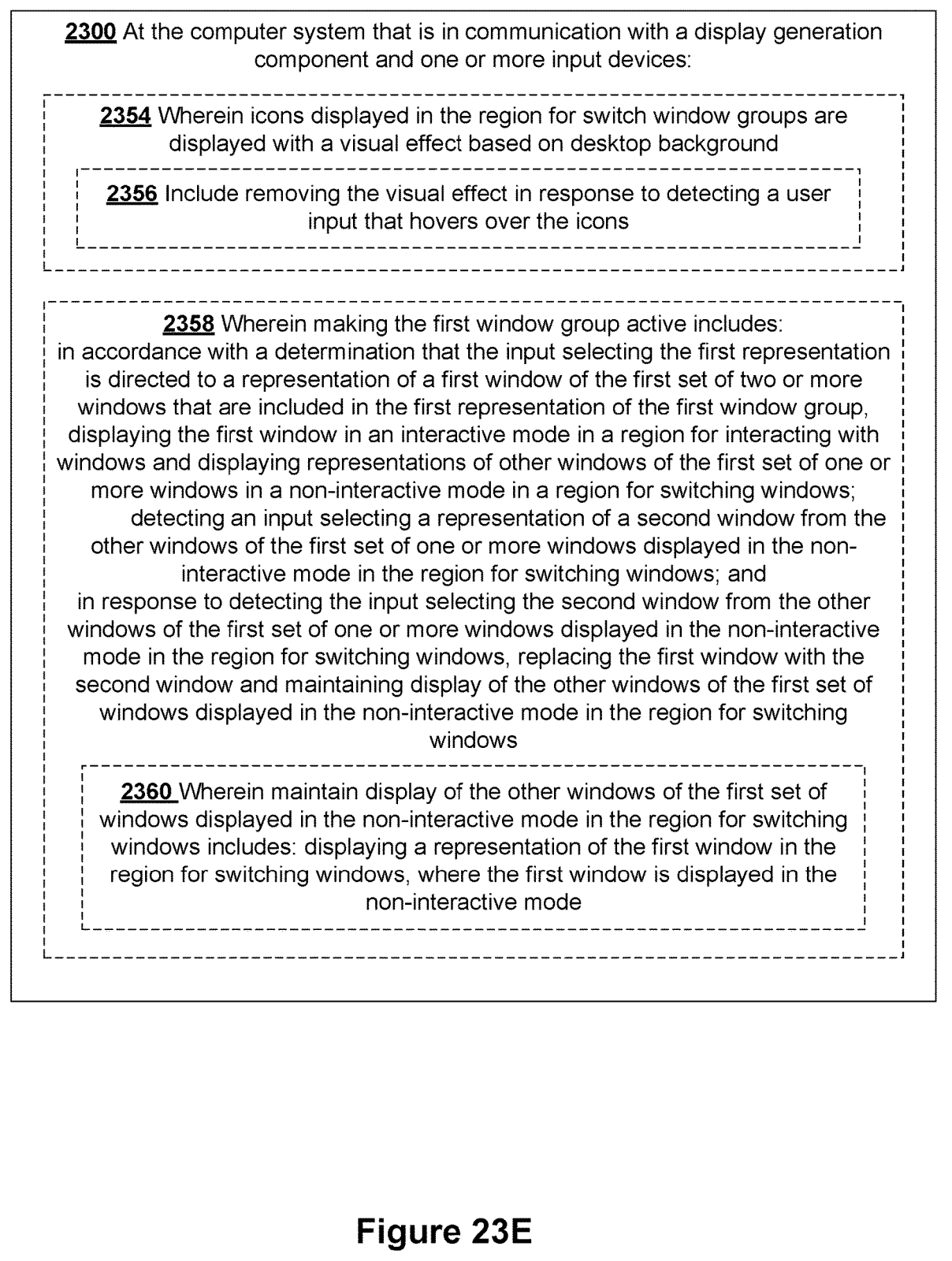

2300 At the computer system that is in communication with a display generation component and one or more input devices:

2354 Wherein icons displayed in the region for switch window groups are displayed with a visual effect based on desktop background

2356 Include removing the visual effect in response to detecting a user input that hovers over the icons

2358 Wherein making the first window group active includes:
in accordance with a determination that the input selecting the first representation is directed to a representation of a first window of the first set of two or more windows that are included in the first representation of the first window group, displaying the first window in an interactive mode in a region for interacting with windows and displaying representations of other windows of the first set of one or more windows in a non-interactive mode in a region for switching windows;
detecting an input selecting a representation of a second window from the other windows of the first set of one or more windows displayed in the non-interactive mode in the region for switching windows; and
in response to detecting the input selecting the second window from the other windows of the first set of one or more windows displayed in the non-interactive mode in the region for switching windows, replacing the first window with the second window and maintaining display of the other windows of the first set of windows displayed in the non-interactive mode in the region for switching windows

2360 Wherein maintain display of the other windows of the first set of windows displayed in the non-interactive mode in the region for switching windows includes: displaying a representation of the first window in the region for switching windows, where the first window is displayed in the non-interactive mode

Figure 23E

SYSTEMS AND METHODS FOR INTERACTING WITH MULTIPLE APPLICATIONS ON AN ELECTRONIC DEVICE

RELATED APPLICATIONS

This application claims priority to U.S. Provisional Patent Application No. 63/349,130, filed Jun. 5, 2022, which is hereby incorporated by reference in its entirety.

TECHNICAL FIELD

The disclosed embodiments relate to interacting with multiple applications on an electronic device.

BACKGROUND

Users of computing devices often interact with multiple applications concurrently. Each of the multiple applications may even be associated with multiple windows. In addition to displaying multiple windows of multiple applications, computing devices may also concurrently display other user interface elements, including icons, toolbars, and other such affordances that often cause the display of the computing device to become cluttered and inefficient for users to navigate, making it difficult to concentrate on the task at hand. As such, there is a need for a system and method that more easily allows users to interact with multiple applications.

Moreover, operating systems for computing devices that support the concurrent display of multiple application windows typically expend processing power in order to support the display configurability of each open window and responsiveness of user interface elements associated with each open window. Limiting these configurability options or responsiveness may save processing power and increase performance, but this comes at the expense of navigation efficiency. As such, there is a need for a system and method that more easily allows users to interact with multiple applications in an efficient manner while optimizing processing performance.

SUMMARY

The embodiments described herein address the above shortcomings by providing display devices and methods that allow users to efficiently interact with and switch between multiple applications on the same display of a computing device (e.g., a desktop electronic device, a laptop electronic device, or a tablet electronic device). Such devices and methods require few inputs to interact multiple application windows that are open on the display, switch between the different applications, and share content between the different applications. Such display devices and methods also provide feedback to assist the user in different display modes. Such display devices and methods also provide improved human-machine interfaces, e.g., by emphasizing information to make it more discernable on the display and by requiring fewer interactions from users to achieve the users' desired results. For these reasons and those discussed below, the devices and methods described herein reduce power usage and improve battery life of electronic devices.

In accordance with some embodiments, a method is performed at a computer system that is in communication with a display generation component and one or more input devices. The method includes concurrently displaying, via the display generation component a first set of one or more windows in an interactive mode, wherein while a window is displayed in an interactive mode the content of the window can be manipulated in response to user inputs and a representation of a second set of one or more windows in a non-interactive mode. While a representation of a window is displayed in a non-interactive mode the content of the window is not available to be manipulated in response to user inputs. The method further includes detecting an input selecting the representation of the second set of one or more windows. In response to detecting the input, ceasing to display the first set of one or more windows in the interactive mode. The method further includes, in response to detecting the input, concurrently displaying, via the display generation component: one or more of the second set of one or more windows in the interactive mode and a representation of the first set of one or more windows in a non-interactive mode.

In accordance with some embodiments, a method is performed at an electronic device with an integrated display and one or more input devices. The electronic device is in communication with an external display. The method includes displaying a first set of windows in a first arrangement on the external display. The first arrangement is an overlapping arrangement. The method includes while displaying the first set of windows on the external display, receiving a request to display the first set of windows on the integrated display. The method includes, in response to receiving the request to display the first set of windows on the integrated display displaying the first set of windows in a second arrangement on the integrated display. The second arrangement is a non-overlapping arrangement.

In accordance with some embodiments, a method is performed at a computer system that is in communication with a display generation component and one or more input devices. The method includes, concurrently displaying, via the display generation component, a first window and a second window. The method includes, detecting an input directed to the first window. In response to detecting the input directed to the first window and in accordance with a determination that the first window and the second window are in a concurrent input mode, performing an operation in a respective application associated with the first window. The method includes, in response to detecting the input directed to the first window and in accordance with a determination that the first window and the second window are not in the concurrent input mode, and that the first window is not active, forgoing performing the operation in the respective application associated with the first window. The input is of a first type or a second type different from the first type.

In accordance with some embodiments, a method is performed at a computer system that is in communication with a display generation component and one or more input devices. The method includes concurrently displaying, via the display generation component, a first window and a second window. The method includes, detecting an input adjusting a spatial arrangement of the first window. In response to detecting the input adjusting the spatial arrangement of the first window and in accordance with a determination that the spatial arrangement of the first window is adjusted such that the first window occludes the second window leaving less than a predetermined amount of the second window visible, moving the second window at least by an amount sufficient to keep at least the predetermined amount visible.

In accordance with some embodiments, a method is performed at a computer system that is in communication with a display generation component and one or more input devices. The method includes, while in a first mode, concurrently displaying a first set of windows over a desktop. The desktop includes one or more selectable icons in a respective portion of the desktop. The method includes, detecting a first input requesting to switch from the first mode to a second mode. In response to detecting the first input, concurrently displaying, in the second mode, one or more windows of the first set of windows and the respective portion of the desktop without displaying the one or more selectable icons. The method includes, while displaying the one or more windows in the second mode and the respective portion of the desktop without displaying the one or more selectable icons, detecting a second input directed to a respective window displayed in the second mode. The method includes, in response to detecting the second input directed to the respective window displayed in the second mode, performing an operation in a respective application that is associated with respective window.

In accordance with some embodiments, a method is performed at a computer system that is in communication with a display generation component and one or more input devices. The method includes, displaying a plurality of representations of window groups, including a first representation of a first window group that includes a first set of two or more windows and a second representation of a second window group that includes a second set of one or more windows. The method includes, detecting an input selecting the first representation of the first window group of the plurality of representations. In response to detecting the input selecting the first representation of the first window group, making the first window group active while continuing to display the second representation of the second window group in the plurality of representations of window groups, including: in accordance with a determination that the input selecting the first representation is directed to a first portion of the first representation of the first window group, making a first window of the first window group more prominent relative to other windows associated with the first window group; and in accordance with a determination that the input selecting the first representation is directed to a second portion of the first representation of the first window group, making a second window of the first window group more prominent relative to other windows associated with the first window group.

The systems and methods described herein improve ways of operating devices with multiple displays concurrently efficiently.

BRIEF DESCRIPTION OF DRAWINGS

For a better understanding of the various described embodiments, reference should be made to the Description of Embodiments below, in conjunction with the following drawings in which like reference numerals refer to corresponding parts throughout the figures.

FIGS. 18A-18L, 19A-19D, 20A-20D, 21A-21D, 22A-22G, and 23A-23E are flowcharts of methods for displaying and processing interactions with multiple application windows in accordance with some embodiments.

DESCRIPTION OF EMBODIMENTS

Figure 1A:
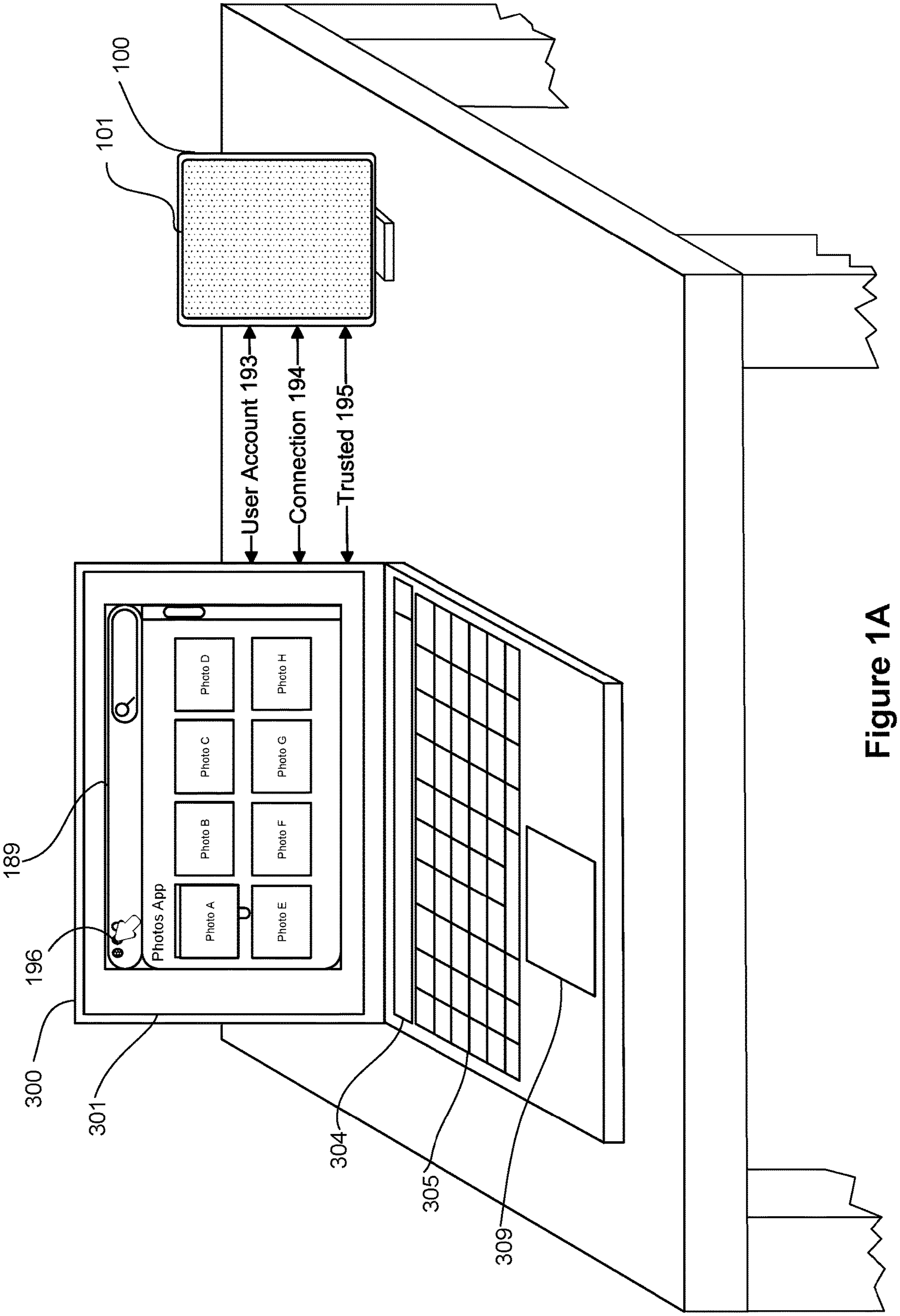
FIGS. 1A-1B illustrate example systems in which a first electronic device operates in communication with a second electronic device and/or a third electronic device (e.g., a combination of two or three of a desktop computer, a laptop computer and a tablet computer), in accordance with some embodiments.

FIGS. 1A-4B show example devices on which the methods described herein are implemented and performed. FIGS. 5A-17O are schematics of display devices used to illustrate example user interfaces for interacting with multiple applications, and additional descriptions for these user interface figures are also provided with reference to the methods 18000, 19000, 18000, 19000, 20000, 21000, 22000, and 23000 below.

Example Devices and Systems

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1B:
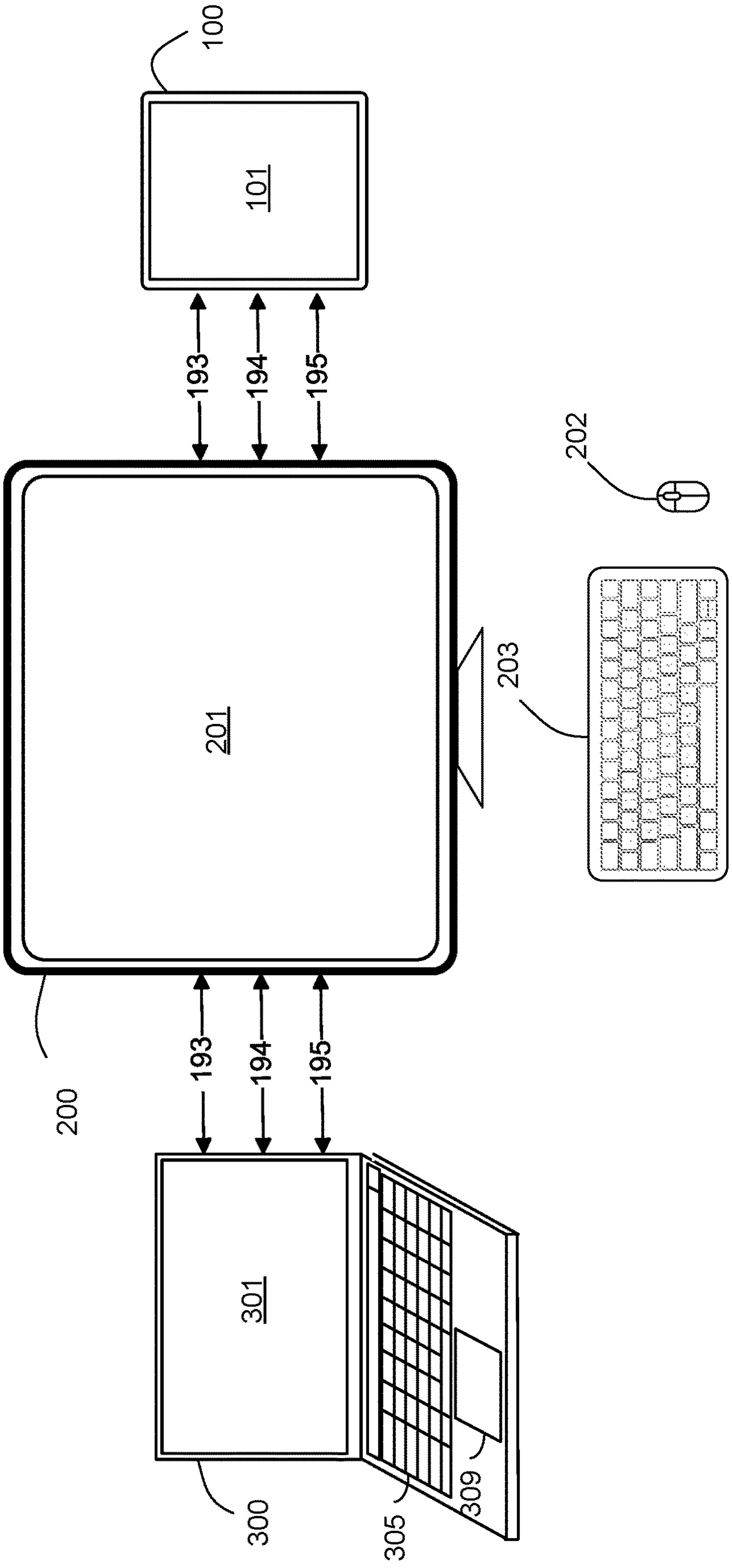

FIG. 1A shows an example system in which a first display device (e.g., the illustrated laptop display device 300) operates in connection with a second display device (e.g., the illustrated tablet display device 100 or a desktop computer display device 200). FIG. 1B shows an example system in which a first display device (e.g., the illustrated desktop display device 200) operates in connection with a second display device (e.g., the illustrated tablet display device 100) and a third display device (e.g., the illustrated laptop device 200). The devices 100, 200, and 300 are all display devices that include respective display devices 101, 201, and 301 (also referred to as display generation components). In some embodiments, the displays are touch-sensitive displays (e.g., display 101 of tablet device 100 is a touch-sensitive display or a touch-screen). The first display device includes or is in communication with one or more input devices (e.g., the illustrated mouse input device 202, keyboard input devices 203 and 305, and touchpad 309 in FIG. 1B). In some embodiments, input devices are implemented on a device (e.g., touchpad 309 and keyboard 305 are part of laptop device 300). In some embodiments, input devices are in wireless or wired communication with a device (e.g., mouse 202 and keyboard 203 are in wireless communication with desktop device 200 in FIG. 1B). In some embodiments, the first display device is in communication with the second and/or third display device in a shared input device mode. In the shared input device mode, the first display device shares the one or more input devices (e.g., the illustrated mouse input device and/or keyboard input device) with the second display device and/or the third display device so that the one or more input devices can be used to operate the second display device or the third display device. In some embodiments, the first electronic detects inputs via the one or more input devices, that it is in wireless or wired communication with, and provides information regarding the detected inputs to the second computer system and/or the third computer system. In some embodiments, the first computer system and the second and/or third computer system are all in communication with the same one or more input devices and detect inputs via the one or more input devices. For example, the detected inputs are processed by the computer system that is currently active (e.g., the input is directed to a keyboard, mouse, or touchpad of the currently active computer system). In some embodiments, a computer system is currently active if it is displaying the cursor (e.g., in a shared input mode, the different computers have a common cursor). Alternatively, the first display device may be in communication with the second and/or the third display device in a companion display mode. In the companion display mode, a respective display of the second display device or the third display device displays content provided by the first display device. For example, the respective display of the second display device or the third display device operates as a mirror display or an extended display for the display of the first display device. Additional details regarding the shared input mode and the companion display mode are provided below.

It is also noted that various references are made to first, second, and third display devices. In certain instances, the first, second, and third display devices can be selected from any type of display devices, e.g., electronic devices with respective displays (e.g., a mobile phone, a tablet, a laptop, a wearable, or a desktop display device). Also, references to tablet, laptop, desktop, wearable, and mobile phone display devices are illustrative examples only. The descriptions herein regarding tablet display devices also apply to other portable display devices running mobile operating systems (e.g., a smartphone such as the IPHONE from APPLE INC. of Cupertino, CA that is running the IOS operating system), and the descriptions herein regarding laptop display device also apply to other desktop-like devices running a desktop/laptop operating system.

Figure 2:
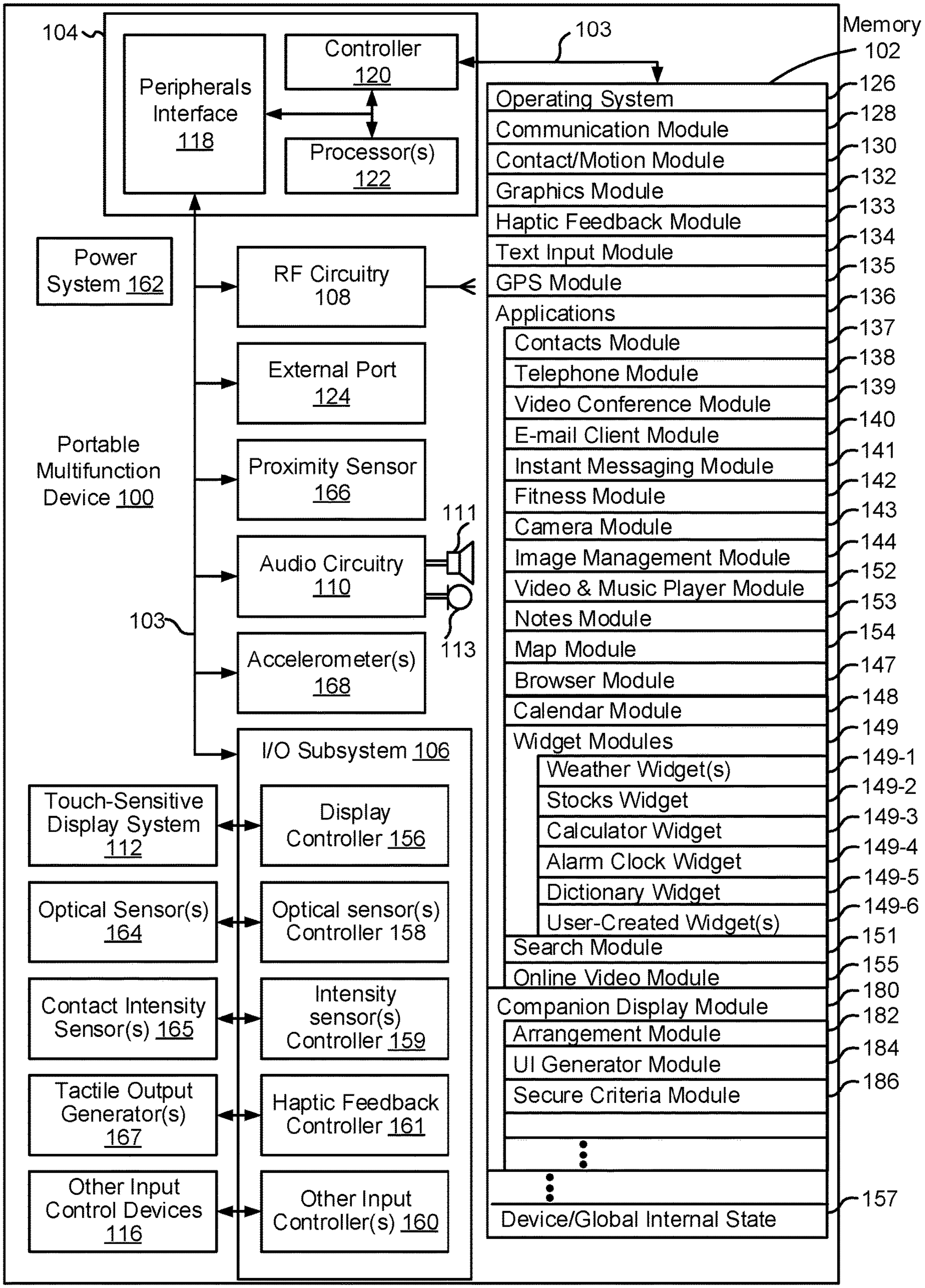
FIG. 2 is a block diagram of an electronic device (e.g., a device running a mobile operating system), in accordance with some embodiments.
Figure 3A:
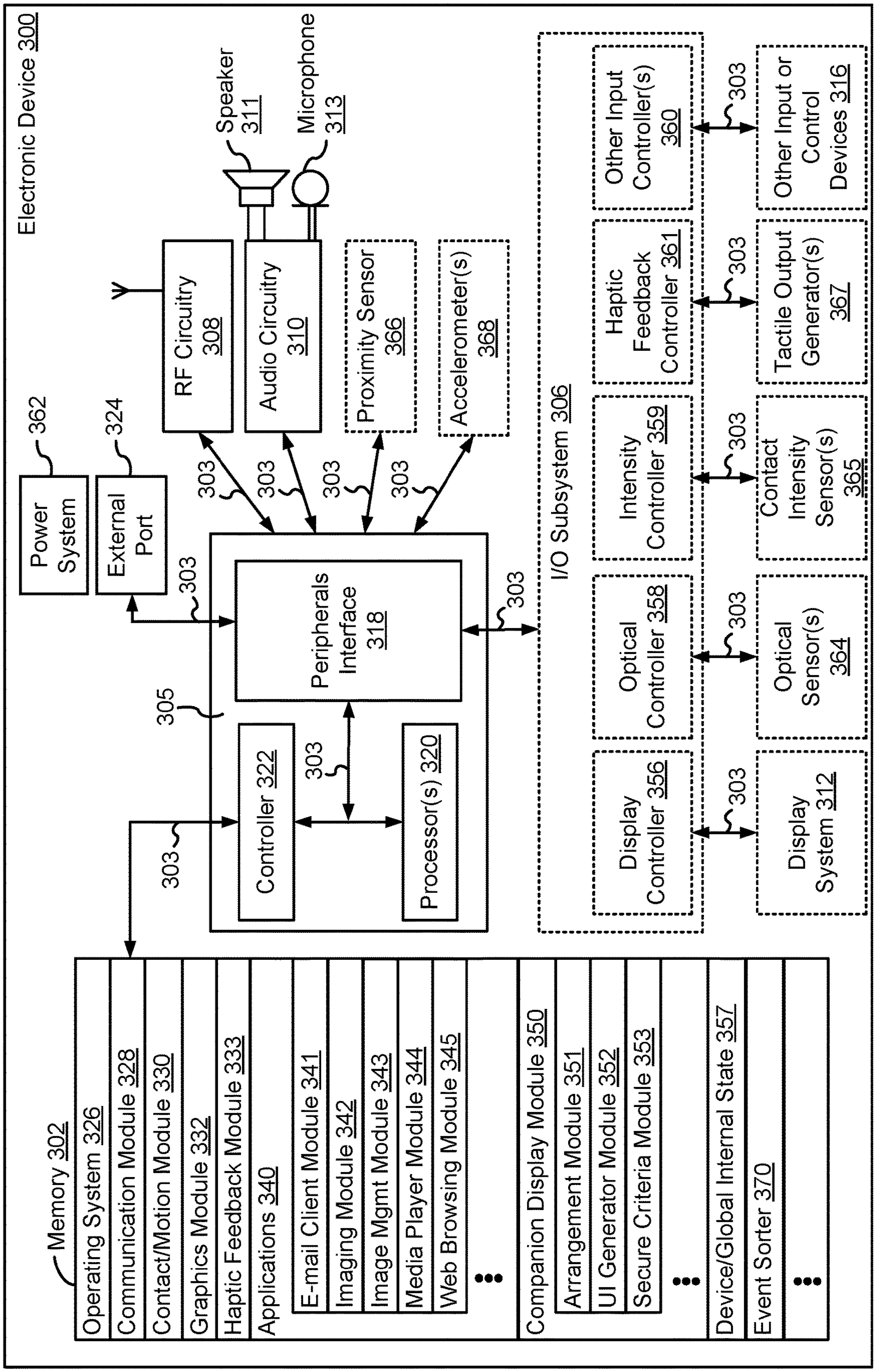
FIG. 3A is a block diagram of an electronic device (e.g., a device running a desktop or a laptop operating system), in accordance with some embodiments.
Figure 3B:
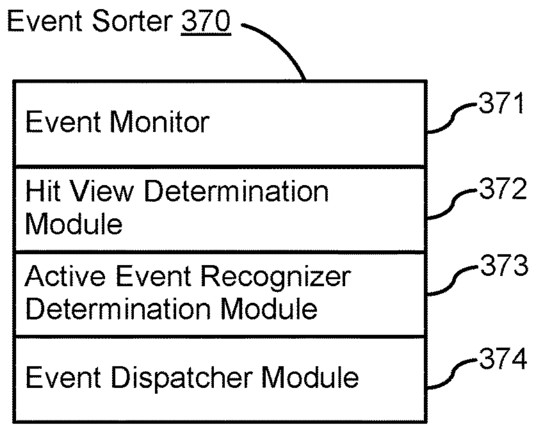
FIG. 3B is a block diagram of components for event handling of FIG. 3A, in accordance with some embodiments.
Figure 3B:
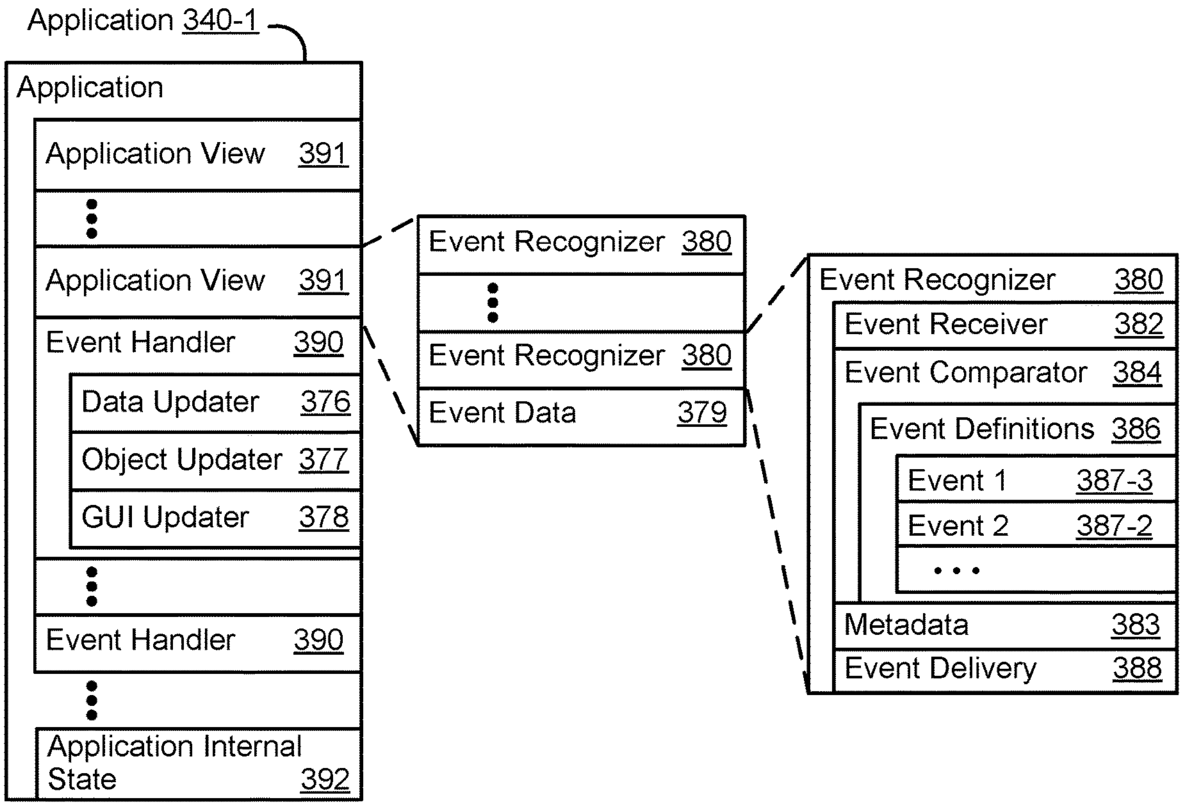

Block diagrams illustrating various components of the first and second electronic devices are shown in FIGS. 2 and 3A-3B.

Attention is now directed toward embodiments of portable electronic devices with touch-sensitive displays. FIG. 2 is a block diagram illustrating portable multifunction device 100 (also referred to interchangeably herein as electronic device 100 or device 100) with touch-sensitive display 112 in accordance with some embodiments. Touch-sensitive display 112 is sometimes called a "touch screen" for convenience, and is sometimes known as or called a touch-sensitive display system. Device 100 includes memory 102 (which optionally includes one or more computer-readable storage mediums), controller 120, one or more processing units (CPU's) 122, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or a touchpad of device 100). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1 are implemented in hardware, software, or a combination of both hardware and software, including one or more signal processing and/or application specific integrated circuits.

Memory 102 optionally includes high-speed random access memory (e.g., DRAM, SRAM, DDR RAM or other random access solid state memory devices) and optionally also includes non-volatile memory, such as one or more magnetic disk storage devices, flash memory devices, or other non-volatile solid-state memory devices. Memory 102 optionally includes one or more storage devices remotely located from processor(s) 122. Access to memory 102 by other components of device 100, such as CPU 122 and the peripherals interface 118, is, optionally, controlled by controller 120.

Peripherals interface 118 can be used to couple input and output peripherals of the device to CPU 122 and memory 102. The one or more processors 122 run or execute various software programs and/or sets of instructions stored in memory 102 to perform various functions for device 100 and to process data.

In some embodiments, peripherals interface 118, processor(s) or CPU(s) 122, and controller 120 are, optionally, implemented on a single chip, such as chip 104. In some embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, and/or Wireless Fidelity (Wi-Fi) (e.g., IEEE 802.11a, IEEE 802.11b, IEEE 802.11g and/or IEEE 802.11n).

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 connects input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons optionally include an up/down button for volume control of speaker 111 and/or microphone 113. The one or more buttons optionally include a push button.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, a sensor or a set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an example embodiment, a point of contact between touch screen 112 and the user corresponds to an area under a finger of the user.

Touch screen 112 optionally uses LCD (liquid crystal display) technology, LPD (light emitting polymer display) technology, or LED (light emitting diode) technology, or OLED (organic light emitting diode) technology, although other display technologies are used in some embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an example embodiment, projected mutual capacitance sensing technology is used, such as that found in the IPHONE®, IPOD TOUCH®, and IPAD® from APPLE Inc. of Cupertino, California.

Touch screen 112 optionally has a video resolution in excess of 400 dpi. In some embodiments, touch screen 112 has a video resolution of at least 600 dpi. In some embodiments, touch screen 112 has a video resolution of at least 1000 dpi. The user optionally makes contact with touch screen 112 using any suitable object or digit, such as a stylus or a finger. In some embodiments, the user interface is designed to work primarily with finger-based contacts and gestures. In some embodiments, the device translates the finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indication (e.g., a light-emitting diode (LED)), and any other components associated with the generation, management and distribution of power in portable devices.

Device 100 optionally also includes one or more optical sensors 164. FIG. 1 shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen 112 on the front of the device, so that the touch-sensitive display is enabled for use as a viewfinder for still and/or video image acquisition. In some embodiments, another optical sensor is located on the front of the device so that the user's image is, optionally, obtained for videoconferencing while the user views the other video conference participants on the touch-sensitive display.

Device 100 optionally also includes one or more contact intensity sensors 165. FIG. 1 shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen 112 which is located on the front of device 100.

Device 100 optionally also includes one or more proximity sensors 166. FIG. 1 shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1 shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display 112 which is located on the front of device 100.

Device 100 optionally also includes one or more accelerometers 168. FIG. 1 shows accelerometer 168 coupled to peripherals interface 118. Alternately, accelerometer 168 is, optionally, coupled to an input controller 160 in I/O subsystem 106. In some embodiments, information is displayed on the touch-sensitive display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 stores device/global internal state 157, as shown in FIG. 1. Device/global internal state 157 includes one or more of: active application state, indicating which applications, if any, are currently active; display state, indicating what applications, views or other information occupy various regions of touch-sensitive display 112; sensor state, including information obtained from the device's various sensors and input control devices 116; and location information concerning the device's location and/or attitude (e.g., orientation of the device).

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on some embodiments of IPOD devices from APPLE Inc. In some embodiments, the external port is a multi-pin (e.g., 8-pin) connector that is the same as, or similar to and/or compatible with the 8-pin connector used in LIGHTNING connectors from APPLE Inc.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-sensitive display can be set to any of a large range of predefined thresholds values without changing the trackpad or touch-sensitive display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and, in some embodiments, subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinating data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications ("apps") 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- fitness module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, website creation applications, disk authoring applications, spreadsheet applications, JAVA-enabled applications, encryption, digital rights management, voice recognition, widget creator module for making user-created widgets 149-6, and voice replication.

In conjunction with touch screen 112, display controller 156, contact module 130, graphics module 132, and text input module 134, contacts module 137 is, optionally, used to manage an address book or contact list (e.g., stored in contacts module 137 in memory 102 or memory 302), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact module 130, graphics module 132, and text input module 134, telephone module 138 is, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files, and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and video and music player module 146, fitness module 142 includes executable instructions to create workouts (e.g., with time, distance, and/or calorie burning goals), communicate with workout sensors (sports devices such as a watch or a pedometer), receive workout sensor data, calibrate sensors used to monitor a workout, select and play music for a workout, and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, a widget creator module (not pictured) is, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an IPOD from APPLE Inc.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 is, optionally, used to receive, display, modify, and store maps and data associated with maps (e.g., driving directions; data on stores and other points of interest at or near a particular location; and other location based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

As pictured in FIG. 2, portable multifunction device 100 also includes a companion display module 180 for managing operations associated with a companion-display mode multitasking on device 100. Companion display module 180 optionally includes the following modules (or sets of instructions), or a subset or superset thereof:

- Arrangement module 182 for determining an arrangement of displays for a laptop and a tablet device next to one another in conjunction with the companion-display mode described herein;
- UI Generator Module 184 for generating user interfaces and sharing data related to those user interfaces between different devices in conjunction with companion-display and annotation modes; and
- Secure criteria module 186 for monitoring whether devices have satisfied a set of secure-connection criterion that is used to determine when a companion-display mode is available for use between different devices (e.g., a laptop and a tablet device).

In conjunction with touch screen 112, display controller 156, contact module 130, graphics module 132, and contact intensity sensor(s) 165, PIP module 186 includes executable instructions to determine reduced sizes for video content and to determine an appropriate location on touch screen 112 for displaying the reduced size video content (e.g., a location that avoids important content within an active application that is overlaid by the reduced size video content).

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

FIG. 3A is a block diagram of an electronic device 300, in accordance with some embodiments. In some embodiments, electronic device 300 is a laptop or desktop computer that is running a desktop operating system that is distinct from a mobile operating system.

Electronic device 300 typically supports a variety of applications, such as one or more of the following: a drawing application, a presentation application, a word processing application, a website creation application, a disk authoring application, a spreadsheet application, a gaming application, a video conferencing application, an e-mail application, an instant messaging application, an image management application, a digital camera application, a digital video camera application, a web browser application, and/or a media player application.

The various applications that are executed on electronic device 300 optionally use at least one common physical user-interface device, such as the touch-sensitive surface. One or more functions of the touch-sensitive surface as well as corresponding information displayed by electronic device 300 are, optionally, adjusted and/or varied from one application to the next and/or within an application. In this way, a common physical architecture (such as the touch-sensitive surface) of electronic device 300 optionally supports the variety of applications with user interfaces that are intuitive and transparent to the user.

Electronic device 300 includes memory 302 (which optionally includes one or more computer readable storage mediums), memory controller 322, one or more processing units (CPU(s)) 320, peripherals interface 318, RF circuitry 308, audio circuitry 310, speaker 311, microphone 313, input/output (I/O) subsystem 306, other input or control devices 316, and external port 324. Electronic device 300 optionally includes a display system 312, which may be a touch-sensitive display (sometimes also herein called a "touch screen" or a "touch screen display"). Electronic device 300 optionally includes one or more optical sensors 364. Electronic device 300 optionally includes one or more intensity sensors 365 for detecting intensity of contacts on a touch-sensitive surface such as touch-sensitive display or a touchpad. Electronic device 300 optionally includes one or more tactile output generators 367 for generating tactile outputs on a touch-sensitive surface such as touch-sensitive display or a touchpad. These components optionally communicate over one or more communication buses or signal lines 303.

As used in the specification, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or touch/track pad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that electronic device 300 is only an example and that electronic device 300 optionally has more or fewer components than shown, optionally combines two or more components, or optionally has a different configuration or arrangement of the components. The various components shown in FIG. 3A are implemented in hardware, software, firmware, or a combination thereof, including one or more signal processing and/or application specific integrated circuits.

Memory 302 optionally includes high-speed random access memory and optionally also includes non-volatile memory, such as one or more magnetic disk storage devices, flash memory devices, or other non-volatile solid-state memory devices. Access to memory 302 by other components of electronic device 300, such as CPU(s) 320 and peripherals interface 318, is, optionally, controlled by memory controller 322. Peripherals interface 318 can be used to couple input and output peripherals to CPU(s) 320 and memory 302. The one or more processing units 320 run or execute various software programs and/or sets of instructions stored in memory 302 to perform various functions for electronic device 300 and to process data. In some embodiments, peripherals interface 318, CPU(s) 320, and memory controller 322 are, optionally, implemented on a single chip, such as chip 305. In some embodiments, they are, optionally, implemented on separate chips.

RF (radio frequency) circuitry 308 receives and sends RF signals, also called electromagnetic signals. RF circuitry 308 converts electrical signals to/from electromagnetic signals and communicates with communications networks and other communications devices via the electromagnetic signals. RF circuitry 308 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 308 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g, and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 310, speaker 311, and microphone 313 provide an audio interface between a user and electronic device 300. Audio circuitry 310 receives audio data from peripherals interface 318, converts the audio data to an electrical signal, and transmits the electrical signal to speaker 311. Speaker 311 converts the electrical signal to human-audible sound waves. Audio circuitry 310 also receives electrical signals converted by microphone 313 from sound waves. Audio circuitry 310 converts the electrical signals to audio data and transmits the audio data to peripherals interface 318 for processing. Audio data is, optionally, retrieved from and/or transmitted to memory 302 and/or RF circuitry 308 by peripherals interface 318. In some embodiments, audio circuitry 310 also includes a headset jack. The headset jack provides an interface between audio circuitry 310 and removable audio input/output peripherals, such as output-only headphones or a headset with both output (e.g., a headphone for one or both ears) and input (e.g., a microphone).

I/O subsystem 306 couples the input/output peripherals of electronic device 300, such as display system 312 and other input or control devices 316, to peripherals interface 318. I/O subsystem 306 optionally includes display controller 356, optical sensor controller 358, intensity sensor controller 359, haptic feedback controller 361, and one or more other input controllers 360 for other input or control devices. The one or more other input controllers 360 receive/send electrical signals from/to other input or control devices 316. The other input or control devices 316 optionally include physical buttons (e.g., push buttons, rocker buttons, etc.), dials, slider switches, joysticks, click wheels, and so forth. In some alternate embodiments, other input controller(s) 360 are, optionally, coupled with any (or none) of the following: a keyboard, infrared port, USB port, and a pointer device such as a mouse. The one or more physical buttons optionally include an up/down button for volume control of speaker 311 and/or microphone 313.

Display system 312 provides an output interface (and, optionally, an input interface when it is a touch-sensitive display) between electronic device 300 and a user. Display controller 356 receives and/or sends electrical signals from/to display system 312. Display system 312 displays visual output to the user. The visual output optionally includes graphics, text, icons, video, and any combination thereof (collectively termed "graphics"). In some embodiments, some or all of the visual output corresponds to user-interface objects/elements.

In some embodiments, display system 312 is a touch-sensitive display with a touch-sensitive surface, sensor, or set of sensors that accepts input from the user based on haptic and/or tactile contact. As such, display system 312 and display controller 356 (along with any associated modules and/or sets of instructions in memory 302) detect contact (and any movement or breaking of the contact) on display system 312 and convert the detected contact into interaction with user-interface objects (e.g., one or more soft keys, icons, web pages, or images) that are displayed on display system 312. In one example embodiment, a point of contact between display system 312 and the user corresponds to an area under a finger of the user.

Display system 312 optionally uses LCD (liquid crystal display) technology, LPD (light emitting polymer display) technology, LED (light emitting diode) technology, or OLED (organic light emitting diode) technology, although other display technologies are used in some embodiments. In some embodiments, when display system 312 is a touch-sensitive display, display system 312 and display controller 356 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with display system 312. In one example embodiment, projected mutual capacitance sensing technology is used, such as that found in the iPHONE®, iPODTOUCH®, and iPAD® from Apple Inc. of Cupertino, California.

Display system 312 optionally has a video resolution in excess of 400 dpi (e.g., 500 dpi, 800 dpi, or greater). In some embodiments, display system 312 is a touch-sensitive display with which the user optionally makes contact using a stylus, a finger, and so forth. In some embodiments, the user interface is designed to work primarily with finger-based contacts and gestures. In some embodiments, electronic device 300 translates the rough finger-based input into a precise pointer/cursor position or command for performing the actions desired by the user.

In some embodiments, in addition to display system 312, electronic device 300 optionally includes a touchpad for activating or deactivating particular functions. In some embodiments, the touchpad is a touch-sensitive area of electronic device 300 that, unlike display system 312, does not display visual output. In some embodiments, when display system 312 is a touch-sensitive display, the touchpad is, optionally, a touch-sensitive surface that is separate from display system 312, or an extension of the touch-sensitive surface formed by display system 312.

Electronic device 300 also includes power system 362 for powering the various components. Power system 362 optionally includes a power management system, one or more power sources (e.g., battery, alternating current (AC), etc.), a recharging system, a power failure detection circuit, a power converter or inverter, a power status indication (e.g., a light-emitting diode (LED)) and any other components associated with the generation, management and distribution of power in portable devices.

Electronic device 300 optionally also includes one or more optical sensors 364 coupled with optical sensor controller 358 in I/O subsystem 306. Optical sensor(s) 364 optionally includes charge-coupled device (CCD) or complementary metal-oxide semiconductor (CMOS) phototransistors. Optical sensor(s) 364 receive light from the environment, projected through one or more lens, and converts the light to data representing an image. In conjunction with imaging module 343, optical sensor(s) 364 optionally capture still images or video. In some embodiments, an optical sensor is located on the front of electronic device 300 so that the user's image is, optionally, obtained for videoconferencing while the user views the other video conference participants on display system 312.

Electronic device 300 optionally also includes one or more contact intensity sensor(s) 365 coupled with intensity sensor controller 359 in I/O subsystem 306. Contact intensity sensor(s) 365 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 365 receives contact intensity information (e.g., pressure information or a proxy for pressure information) from the environment. In some embodiments, at least one contact intensity sensor is collocated with, or proximate to, a touch-sensitive surface.

Electronic device 300 optionally also includes one or more tactile output generators 367 coupled with haptic feedback controller 361 in I/O subsystem 306. Tactile output generator(s) 367 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor(s) 365 receives tactile feedback generation instructions from haptic feedback module 333 and generates tactile outputs that are capable of being sensed by a user of electronic device 300. In some embodiments, at least one tactile output generator is collocated with, or proximate to, a touch-sensitive surface and, optionally, generates a tactile output by moving the touch-sensitive surface vertically (e.g., in/out of a surface of electronic device 300) or laterally (e.g., back and forth in the same plane as a surface of electronic device 300).

Electronic device 300 optionally also includes one or more proximity sensors 366 coupled with peripherals interface 318. Alternately, proximity sensor(s) 366 are coupled with other input controller(s) 360 in I/O subsystem 306. Electronic device 300 optionally also includes one or more accelerometers 368 coupled with peripherals interface 318. Alternately, accelerometer(s) 368 are coupled with other input controller(s) 360 in I/O subsystem 306.

In some embodiments, the software components stored in memory 302 include operating system 326, communication module 328 (or set of instructions), contact/motion module 330 (or set of instructions), graphics module 332 (or set of instructions), applications 340 (or sets of instructions), and touch-bar management module 350 (or sets of instructions). Furthermore, in some embodiments, memory 302 stores device/global internal state 357 (or sets of instructions), as shown in FIG. 3A. Device/global internal state 357 includes one or more of: active application state, indicating which applications, if any, are currently active and/or in focus; display state, indicating what applications, views or other information occupy various regions of display system 312 and/or a peripheral display system; sensor state, including information obtained from various sensors and input or control devices 316 of electronic device 300; and location information concerning the location and/or attitude of electronic device 300.

Operating system 326 (e.g., DARWIN, RTXC, LINUX, UNIX, OS X, WINDOWS, or an embedded operating system such as VXWorks) includes various software components and/or drivers for controlling and managing general system tasks (e.g., memory management, storage device control, power management, etc.) and facilitates communication between various hardware and software components.

Communication module 328 facilitates communication with other devices over one or more external ports 324 and/or RF circuitry 308 and also includes various software components for sending/receiving data via RF circuitry 308 and/or external port 324. External port 324 (e.g., Universal Serial Bus (USB), FIREWIRE, etc.) is adapted for coupling directly to other devices or indirectly over a network (e.g., the Internet, wireless LAN, etc.). In some embodiments, external port 324 is a multi-pin (e.g., 30-pin) connector that is the same as, or similar to and/or compatible with the 30-pin connector used on iPod® devices.

Contact/motion module 330 optionally detects contact with display system 312 when it is a touch-sensitive display (in conjunction with display controller 356) and other touch sensitive devices (e.g., a touchpad or physical click wheel). Contact/motion module 330 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 330 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 330 also detects contact on a touchpad.

In some embodiments, contact/motion module 330 uses a set of one or more intensity thresholds to determine whether an operation has been performed by a user (e.g., to determine whether a user has selected or "clicked" on an affordance). In some embodiments at least a subset of the intensity thresholds are determined in accordance with software parameters (e.g., the intensity thresholds are not determined by the activation thresholds of particular physical actuators and can be adjusted without changing the physical hardware of electronic device 300). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 330 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap contact includes detecting a finger-down event followed by detecting a finger-up (a lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and in some embodiments also followed by detecting a finger-up (a lift off) event.

Graphics module 332 includes various known software components for rendering and causing display of graphics on primary display 301 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like. In some embodiments, graphics module 332 stores data representing graphics to be used. Each graphic is, optionally, assigned a corresponding code. Graphics module 332 receives, from applications etc., one or more codes specifying graphics to be displayed along with, if necessary, coordinate data and other graphic property data, and then generates screen image data to output to display controller 356.

Haptic feedback module 333 includes various software components for generating instructions used by tactile output generator(s) 367 to produce tactile outputs at one or more locations on electronic device 300 in response to user interactions with electronic device 300.

Applications 340 optionally include the following modules (or sets of instructions), or a subset or superset thereof:

- e-mail client module 341 (sometimes also herein called "mail app" or "e-mail app") for receiving, sending, composing, and viewing e-mails;
- imaging module 342 for capturing still and/or video images;
- image management module 343 (sometimes also herein called "photo app") for editing and viewing still and/or video images;
- media player module 344 (sometimes also herein called "media player app") for playback of audio and/or video; and
- web browsing module 345 (sometimes also herein called "web browser") for connecting to and browsing the Internet.

Examples of other applications 340 that are, optionally, stored in memory 302 include messaging and communications applications, word processing applications, other image editing applications, drawing applications, presentation applications, JAVA-enabled applications, encryption applications, digital rights management applications, voice recognition applications, and voice replication applications.

In conjunction with one or more of RF circuitry 308, display system 312, display controller 356, and contact module 330, graphics module 332, e-mail client module 341 includes executable instructions to create, send, receive, and manage e-mail in response to user instructions. In conjunction with image management module 343, e-mail client module 341 makes it very easy to create and send e-mails with still or video images taken with imaging module 342.

In conjunction with one or more of display system 312, display controller 356, optical sensor(s) 364, optical sensor controller 358, contact module 330, graphics module 332, and image management module 343, imaging module 342 includes executable instructions to capture still images or video (including a video stream) and store them into memory 302, modify characteristics of a still image or video, or delete a still image or video from memory 302.

In conjunction with one or more of display system 312, display controller 356, contact module 330, graphics module 332, and imaging module 342, image management module 343 includes executable instructions to arrange, modify (e.g., edit), or otherwise manipulate, label, delete, present (e.g., in a digital slide show or album), and store still and/or video images.

In conjunction with one or more of display system 312, display controller 356, contact module 330, graphics module 332, audio circuitry 310, speaker 311, RF circuitry 308, and web browsing module 345, media player module 344 includes executable instructions that allow the user to download and play back recorded music and other sound files stored in one or more file formats, such as MP3 or AAC files, and executable instructions to display, present or otherwise play back videos.

In conjunction with one or more of RF circuitry 308, display system 312, display controller 356, contact module 330, and graphics module 332, web browsing module 345 includes executable instructions to browse the Internet in accordance with user instructions, including searching, linking to, receiving, and displaying web pages or portions thereof, as well as attachments and other files linked to web pages.

As pictured in FIG. 3A, the device 300 can also include a companion display module 350 for managing operations associated with a companion-display mode multitasking on device 100. Companion display module 350 optionally includes the following modules (or sets of instructions), or a subset or superset thereof:

- Arrangement module 351 for determining an arrangement of displays for a laptop and a tablet device next to one another in conjunction with the companion-display mode described herein;
- UI Generator Module 352 for generating user interfaces and sharing data related to those user interfaces between different devices in conjunction with companion-display and annotation modes; and
- Secure criteria module 353 for monitoring whether devices have satisfied a set of secure-connection criterion that is used to determine when a companion-display mode is available for use between different devices (e.g., a laptop and a tablet device).

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 302 optionally stores a subset of the modules and data structures identified above. Furthermore, memory 302 optionally stores additional modules and data structures not described above.

FIG. 3B is a block diagram of components for event handling of FIG. 3A, in accordance with some embodiments. In some embodiments, memory 302 (FIG. 3A) includes event sorter 370 (e.g., in operating system 326) and an application 340-1 (e.g., any of the aforementioned applications 341, 342, 343, 344, or 345).

Event sorter 370 receives event information and determines the application 340-1 and application view 391 of application 340-1 to which to deliver the event information. Event sorter 370 includes event monitor 371 and event dispatcher module 374. In some embodiments, application 340-1 includes application internal state 392, which indicates the current application view(s) displayed on display system 312 when the application is active or executing. In some embodiments, device/global internal state 357 is used by event sorter 370 to determine which application(s) is (are) currently active or in focus, and application internal state 392 is used by event sorter 370 to determine application views 391 to which to deliver event information.

In some embodiments, application internal state 392 includes additional information, such as one or more of: resume information to be used when application 340-1 resumes execution, user interface state information that indicates information being displayed or that is ready for display by application 340-1, a state queue for enabling the user to go back to a prior state or view of application 340-1, and a redo/undo queue of previous actions taken by the user.

Event monitor 371 receives event information from peripherals interface 318. Event information includes information about a sub-event (e.g., a user touch on display system 312 when it is a touch-sensitive display, as part of a multi-touch gesture). Peripherals interface 318 transmits information it receives from I/O subsystem 306 or a sensor, such as proximity sensor(s) 366, accelerometer(s) 368, and/or microphone 313 (through audio circuitry 310). Information that peripherals interface 318 receives from I/O subsystem 306 includes information from display system 312 when it is a touch-sensitive display or another touch-sensitive surface.

In some embodiments, event monitor 371 sends requests to the peripherals interface 318 at predetermined intervals. In response, peripherals interface 318 transmits event information. In some embodiments, peripheral interface 318 transmits event information only when there is a significant event (e.g., receiving an input above a predetermined noise threshold and/or for more than a predetermined duration).

In some embodiments, event sorter 370 also includes a hit view determination module 372 and/or an active event recognizer determination module 373.

Hit view determination module 372 provides software procedures for determining where a sub-event has taken place within one or more views, when display system 312 displays more than one view, where views are made up of controls and other elements that a user can see on the display.

Another aspect of the user interface associated with an application is a set of views, sometimes herein called application views or user interface windows, in which information is displayed and touch-based gestures occur. The application views (of an application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 372 receives information related to sub-events of a touch-based gesture. When an application has multiple views organized in a hierarchy, hit view determination module 372 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 373 determines which view or views within a view hierarchy should receive a particular sequence of sub-events. In some embodiments, active event recognizer determination module 373 determines that only the hit view should receive a particular sequence of sub-events. In some embodiments, active event recognizer determination module 373 determines that all views that include the physical location of a sub-event are actively involved views, and therefore determines that all actively involved views should receive a particular sequence of sub-events. In some embodiments, even if touch sub-events were entirely confined to the area associated with one particular view, views higher in the hierarchy would still remain as actively involved views.

Event dispatcher module 374 dispatches the event information to an event recognizer (e.g., event recognizer 380). In embodiments including active event recognizer determination module 373, event dispatcher module 374 delivers the event information to an event recognizer determined by active event recognizer determination module 373. In some embodiments, event dispatcher module 374 stores in an event queue the event information, which is retrieved by a respective event receiver 382.

In some embodiments, operating system 326 includes event sorter 370. Alternatively, application 340-1 includes event sorter 370. In some embodiments, event sorter 370 is a stand-alone module, or a part of another module stored in memory 302, such as contact/motion module 330.

In some embodiments, application 340-1 includes a plurality of event handlers 390 and one or more application views 391, each of which includes instructions for handling touch events that occur within a respective view of the application's user interface. Each application view 391 of the application 340-1 includes one or more event recognizers 380. Typically, an application view 391 includes a plurality of event recognizers 380. In some embodiments, one or more of event recognizers 380 are part of a separate module, such as a user interface kit or a higher level object from which application 340-1 inherits methods and other properties. In some embodiments, a respective event handler 390 includes one or more of: data updater 376, object updater 377, GUI updater 378, and/or event data 379 received from event sorter 370. Event handler 390 optionally utilizes or calls data updater 376, object updater 377 or GUI updater 378 to update the application internal state 392. Alternatively, one or more of the application views 391 includes one or more respective event handlers 390. Also, in some embodiments, one or more of data updater 376, object updater 377, and GUI updater 378 are included in an application view 391.

A respective event recognizer 380 receives event information (e.g., event data 379) from event sorter 370, and identifies an event from the event information. Event recognizer 380 includes event receiver 382 and event comparator 384. In some embodiments, event recognizer 380 also includes at least a subset of: metadata 383, and event delivery instructions 388 (which optionally include sub-event delivery instructions).

Event receiver 382 receives event information from event sorter 370. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 384 compares the event information to predefined event or sub-event definitions and, based on the comparison, determines an event or sub-event, or determines or updates the state of an event or sub-event. In some embodiments, event comparator 384 includes event definitions 386. Event definitions 386 contain definitions of events (e.g., predefined sequences of sub-events), for example, event 1 (387-1), event 2 (387-2), and others. In some embodiments, sub-events in an event 387 include, for example, touch begin, touch end, touch movement, touch cancellation, and multiple touching. In one example, the definition for event 1 (387-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (387-2) is a dragging on a displayed object. The dragging, for example, comprises a touch (or contact) on the displayed object for a predetermined phase, a movement of the touch across display system 312 when it is a touch-sensitive display, and lift-off of the touch (touch end). In some embodiments, the event also includes information for one or more associated event handlers 390.

In some embodiments, event definition 387 includes a definition of an event for a respective user-interface object. In some embodiments, event comparator 384 performs a hit test to determine which user-interface object is associated with a sub-event. For example, in an application view in which three user-interface objects are displayed on display system 312, when a touch is detected on display system 312 when it is a touch-sensitive display, event comparator 384 performs a hit test to determine which of the three user-interface objects is associated with the touch (sub-event). If each displayed object is associated with a respective event handler 390, the event comparator uses the result of the hit test to determine which event handler 390 should be activated. For example, event comparator 384 selects an event handler associated with the sub-event and the object triggering the hit test.

In some embodiments, the definition for a respective event 387 also includes delayed actions that delay delivery of the event information until after it has been determined whether the sequence of sub-events does or does not correspond to the event recognizer's event type.

When a respective event recognizer 380 determines that the series of sub-events do not match any of the events in event definitions 386, the respective event recognizer 380 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 380 includes metadata 383 with configurable properties, flags, and/or lists that indicate how the event delivery system should perform sub-event delivery to actively involved event recognizers. In some embodiments, metadata 383 includes configurable properties, flags, and/or lists that indicate how event recognizers interact, or are enabled to interact, with one another. In some embodiments, metadata 383 includes configurable properties, flags, and/or lists that indicate whether sub-events are delivered to varying levels in the view or programmatic hierarchy.

In some embodiments, a respective event recognizer 380 activates event handler 390 associated with an event when one or more particular sub-events of an event are recognized. In some embodiments, a respective event recognizer 380 delivers event information associated with the event to event handler 390. Activating an event handler 390 is distinct from sending (and deferred sending) sub-events to a respective hit view. In some embodiments, event recognizer 380 throws a flag associated with the recognized event, and event handler 390 associated with the flag catches the flag and performs a predefined process.

In some embodiments, event delivery instructions 388 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 376 creates and updates data used in application 340-1. For example, data updater 376 stores a video file used by media player module 344. In some embodiments, object updater 377 creates and updates objects used by application 340-1. For example, object updater 376 creates a new user-interface object or updates the position of a user-interface object. GUI updater 378 updates the GUI. For example, GUI updater 378 prepares display information and sends it to graphics module 332 for display on display system 312.

In some embodiments, event handler(s) 390 includes or has access to data updater 376, object updater 377, and GUI updater 378. In some embodiments, data updater 376, object updater 377, and GUI updater 378 are included in a single module of an application 340-1 or application view 391. In some embodiments, they are included in two or more software modules.

It shall be understood that the foregoing discussion regarding event handling of user touches on touch-sensitive displays also applies to other forms of user inputs to operate electronic device 300 with input-devices, not all of which are initiated on touch screens. For example, mouse movement and mouse button presses, optionally coordinated with single or multiple keyboard presses or holds; contact movements such as taps, drags, scrolls, etc., on touchpads; pen stylus inputs; movement of the device; oral instructions; detected eye movements; biometric inputs; and/or any combination thereof are optionally utilized as inputs corresponding to sub-events which define an event to be recognized.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of the portable computing device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

In some embodiments one or more predefined intensity thresholds are used to determine whether a particular input satisfies an intensity-based criterion. For example, the one or more predefined intensity thresholds include a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$). In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

Figure 4A:
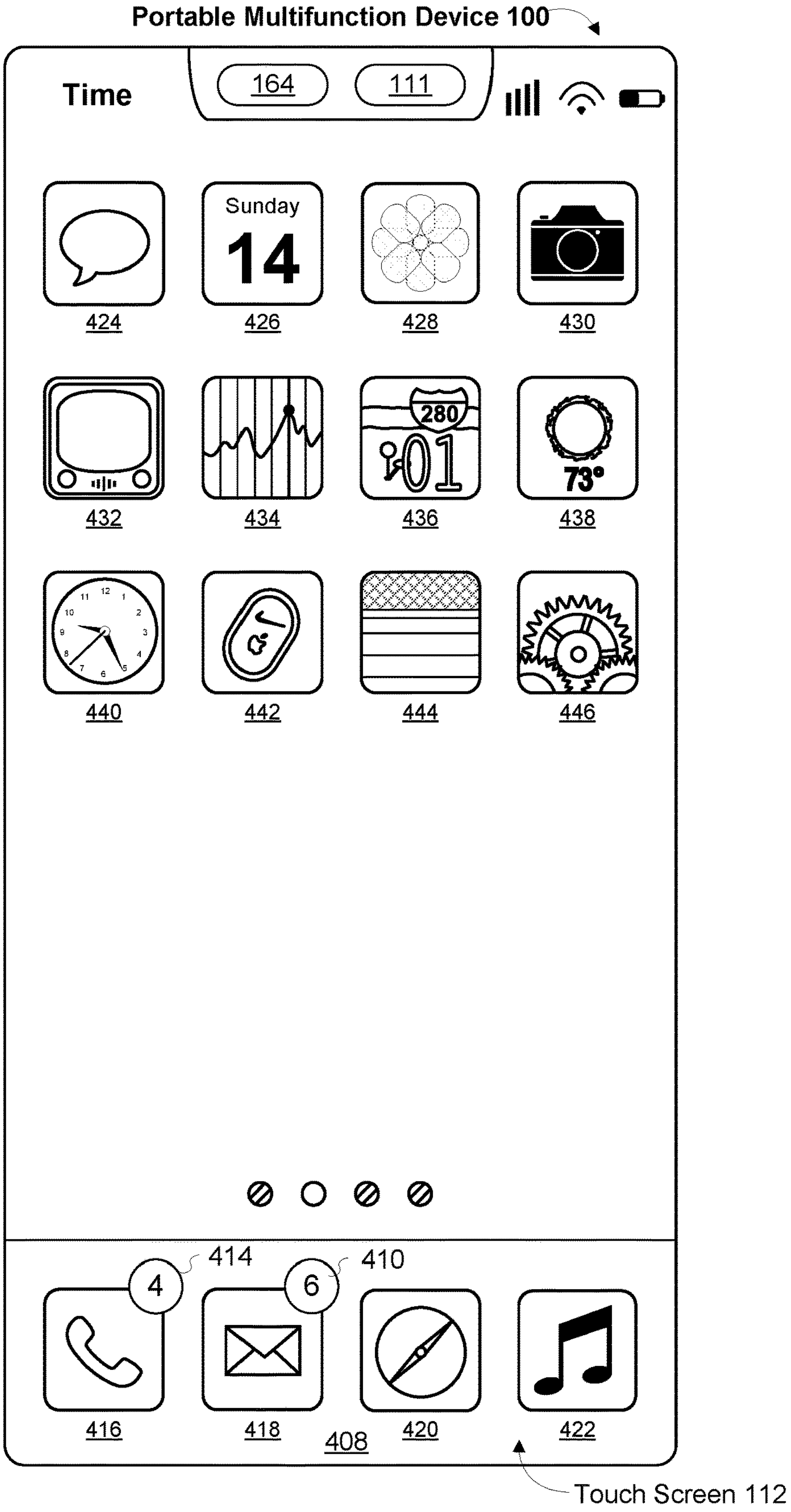
FIG. 4A illustrates an example user interface for a menu of applications on a portable multifunction device, in accordance with some embodiments.

FIG. 4A illustrates an example user interface 400 for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indication(s) for wireless communication(s), such as cellular and Wi-Fi signals;
- Time;
- a Bluetooth indication;
- a Battery status indication;
- Tray 408 with icons for frequently used applications, such as:
- Icon 416 for telephone module 138, labeled "Phone," which optionally includes an indication 414 of the number of missed calls or voicemail messages;
- Icon 418 for e-mail client module 140, labeled "Mail," which optionally includes an indication 410 of the number of unread e-mails;
- Icon 420 for browser module 147, labeled "Browser;" and
- Icon 422 for video and music player module 152, labeled "Music;" and
- Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
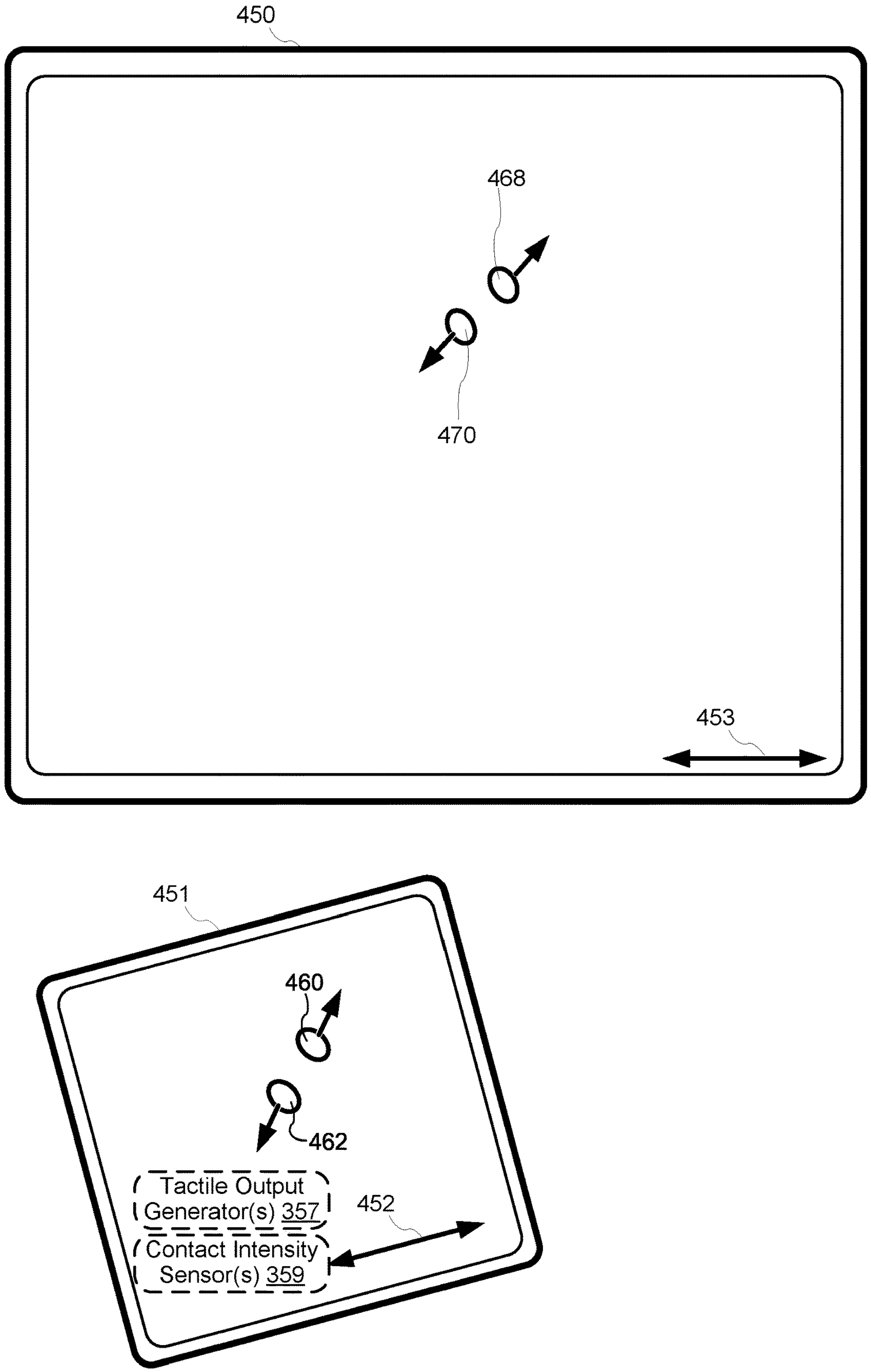
FIG. 4B illustrates an example user interface for a multifunction device with a touch-sensitive surface that is separate from the display, in accordance with some embodiments.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or the touch screen in FIG. 4A) that enables direct interaction with user interface elements on the touch screen display, a detected contact on the touch screen acts as a "focus selector," so that when an input (e.g., a press input by the contact) is detected on the touch screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds is determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting lift-off of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, a value produced by low-pass filtering the intensity of the contact over a predefined period or starting at a predefined time, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $IT_L$), and/or one or more other intensity thresholds (e.g., an intensity threshold $IT_H$ that is lower than $IT_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

User Interfaces and Associated Processes

Attention is now directed towards embodiments of user interfaces ("UIs") and associated processes that may be implemented on a system that includes a laptop device 300 (FIGS. 1A-1B), tablet device 100 (FIGS. 1A-1B) and/or a desktop device 200 (e.g., FIG. 1B). The system may operate in different modes, including a shared input mode and a companion display mode. In the shared input mode, user interfaces generated by each device (e.g., laptop device 300, tablet device 100, or desktop device 200) are presented on respective displays of the devices (e.g., displays 301, 101, and 201 of laptop device 300, tablet device 100, or desktop device 200, respectively) so that the devices share the same input devices (e.g., mouse 202, and keyboard 203 or keyboard 305 and/or touchpad 309). In the companion display mode, user interfaces generated by one device (e.g., laptop device 300 in FIG. 1A) are presented at another device (e.g., tablet device 100 in FIG. 1A). The devices described here (e.g., a desktop, a laptop, a tablet, a mobile phone) are used as illustrative examples in the descriptions that follow, and one of skill in the art would readily understand that the techniques described here are equally applicable to any device that is running a desktop/laptop/tablet operating system, or in some instances, the operations that are described as being performed on the laptop can also be performed by a tablet device or a desktop, and vice versa. The examples that follow depict one or more embodiments.

FIG. 1A illustrates that laptop device 300 has a connection 194 (e.g., a wired or wireless connection), is associated with (e.g., logged into) a same user account as the tablet device 100, and has established a trusted connection with the tablet device (e.g., a trust prompt, such as that described below has been accepted by a user of the devices). The laptop includes a display 301, which can also be a touch-sensitive display. Additionally, in some embodiments, the laptop can also include a dynamic function row 304, for displaying additional information (additional details regarding such a dynamic function row 304 are provided in U.S. patent application Ser. No. 15/655,707, which application is hereby incorporated by reference in its entirety). Furthermore, the laptop also includes a keyboard 305 and touchpad 309. With respect to the tablet device 100, tablet device 100 includes a touch-sensitive display 101, which can be capacitive sensing, and the device 100 is also able to receive inputs from input devices such as a stylus or a user's finger. FIG. 1A also illustrates performing a selection operation with a cursor (e.g., by hovering or performing a right click) on a maximize button 196 (e.g., a button that is displayed in between two other buttons in a corner of a user interface window, and that maximize button can also be presented in a green color) of photos application window 189.

In some embodiments, when in the shared input mode, both devices 100 and 300 run their own respective operating systems while sharing the input devices (e.g., keyboard 305 and touchpad 309) implemented on device 300. In some embodiments, when in the companion-display mode, device 100 will continue to run its operating system, but will then receive information from the device 300 that allows the device 100 to display user interfaces generated by the device 300 (in some instances, the device 100 also ceases to display any user interface elements associated with its operating system when the companion-display mode is initiated). The companion-display mode includes an extended display mode and a mirroring display mode. In the extended display mode, the displays of devices 100 and 300 display a continuous view of content generated by device 300 (e.g., the display of device 100 extends the display of device 300). In the mirroring display mode, the display of device 100 displays a mirror image of display of device 300 where the content on the display is generated by device 300. In some embodiments, two or three or more devices can be running the same operating system (e.g., two tablet devices running a mobile operating system or two laptop devices running a desktop operating system). For example, in FIG. 1B, device 200 is in a trusted 195 connection 194 with device 300 and device 100 and shares the same user account 193. The device 200 may in the shared input mode or in the companion-display mode with either or both of the devices 300 and 100.

FIG. 1A illustrates two devices, the laptop device 300, and the tablet device 100, that are both signed into the same user account 193 (e.g., a same ICLOUD account from APPLE INC. of Cupertino, CA, on both of the displays for the two devices), and have an established connection 194 (e.g., a wired or wireless connection). When the two devices are logged into the same user account and have the established connection, the companion-display mode or the share input mode may not yet be available until the devices have a trusted connection (e.g., 195). The laptop device 300 and the tablet device 100 are both connected to the same Wi-Fi wireless network, to show that the devices have an established connection 194. In some embodiments, the user may not need to be on the same Wi-Fi network, and other forms of connection between the two devices may be possible, such as Near Field Communication (NFC), Bluetooth, or other short-range communication protocols.

FIGS. 5A-17O are schematics of the laptop's display 301, desktop's display 201, and the tablet device's touch-sensitive display 101, which are used to illustrate example user interfaces in accordance with some embodiments. The user interfaces in these figures are used to illustrate the methods and/or processes described below. One of ordinary skill in the art will appreciate that the following user interfaces are merely examples and that the user interfaces depicted in each of the figures can be invoked in any particular order. Moreover, one of ordinary skill in the art will appreciate that different layouts with additional or fewer affordances, user interface elements, or graphics can be used in various circumstances. It should also be understood that any one of the following example user interfaces can correspond to separate embodiments, and do not need to follow any particular order. The user interfaces in these figures are used to illustrate the processes described below, including the processes in FIGS. 18A-23E.

FIGS. 5A-17O illustrate various user interfaces depicting display configurations for multiple application windows on the same display, in accordance with some embodiments. The user interfaces in FIGS. 5A-17O may be implemented on a tablet display device 100; a desktop computer display device 200; a laptop display device 300; an external monitor communicatively coupled to any of devices 100, 200, or 300; or any combination thereof.

FIGS. 5A-5K illustrate user inputs that cause application windows to be transferred from a first display device 500 (e.g., a tablet, laptop, or desktop display device) to a second display device 502 (e.g., an external monitor) in accordance with some embodiments. The first display device 500 may be a touch-screen tablet device that, in some embodiments, is communicatively coupled to an external keyboard (with or without a trackpad) and/or mouse.

Figure 5A:
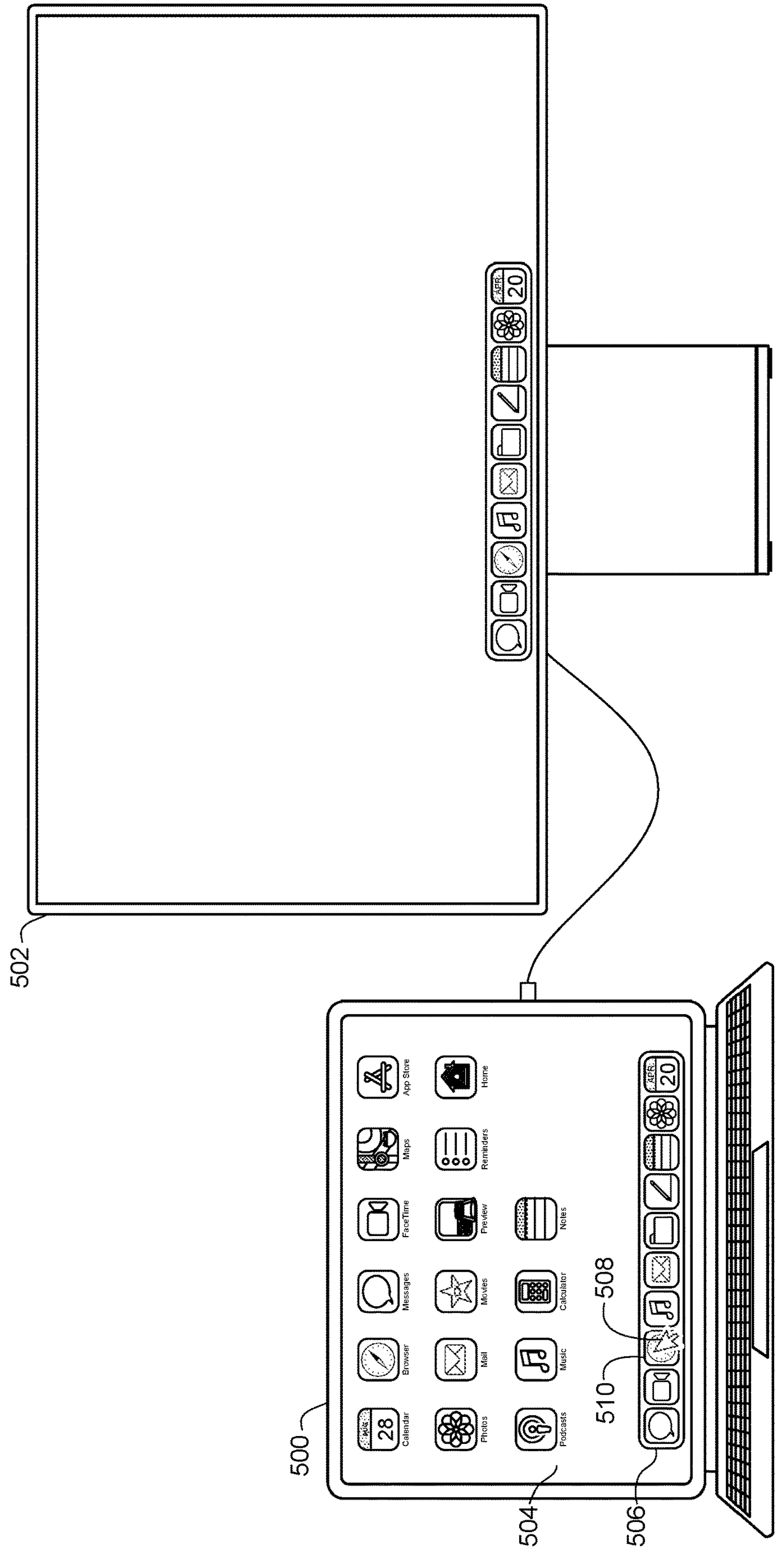
FIGS. 5A-5K, 6A-6H, 7A-7U, 8A-8L, 9A-9L, 10A-10G, 11A-11H, 12A-12X, 13A-13P, 14A-14AE, 15A-15S, 16A-16O, and 17A-17O, are schematics of display devices used to illustrate example user interfaces for interacting with multiple applications. Additional details regarding these figures are also provided below with reference to the descriptions of methods 18000, 19000, 20000, 21000, 22000, and 23000.
Figure 5B:
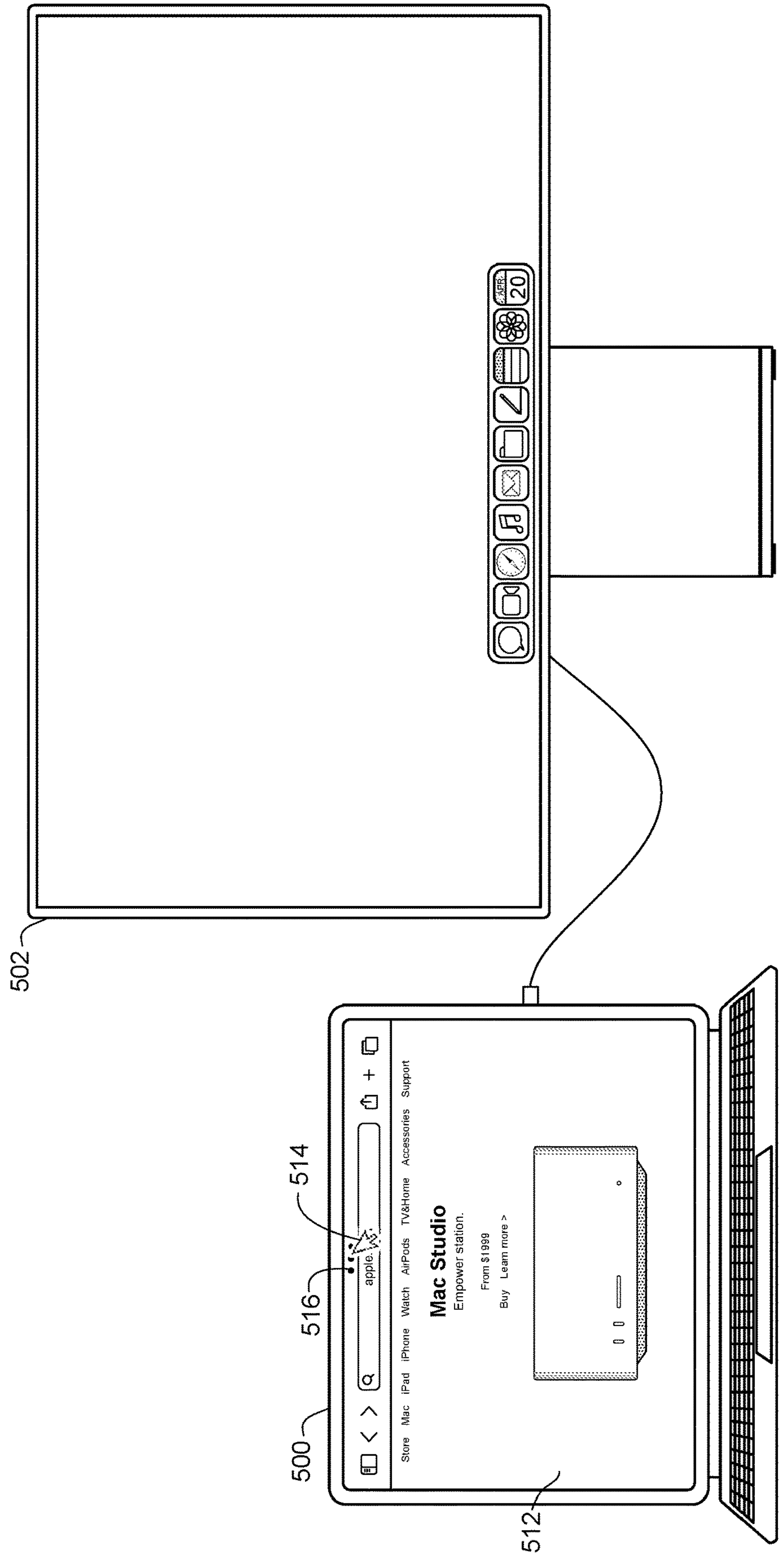

In FIGS. 5A-5D, a window is transferred from the first display device 500 to a predetermined location on the second display device 502 by user selection of a menu option. Specifically, in FIG. 5A, the first display device 500 displays a plurality of application icons (e.g., icons, affordances, or any other user interface elements that, upon selection, launch or select applications). The application icons are displayed on a home screen 504 (also referred to as a desktop) and a dock 506. In some embodiments, at least some application icons in the dock correspond to recently viewed applications, frequently used applications, and/or applications based on a user's preference or selection. User input 508 selects a first application icon 510 in the dock 506, which causes an application 512 (e.g., a web browser) corresponding to the first application icon to be displayed on the first display device 500 as shown in FIG. 5B.

Figure 5C:
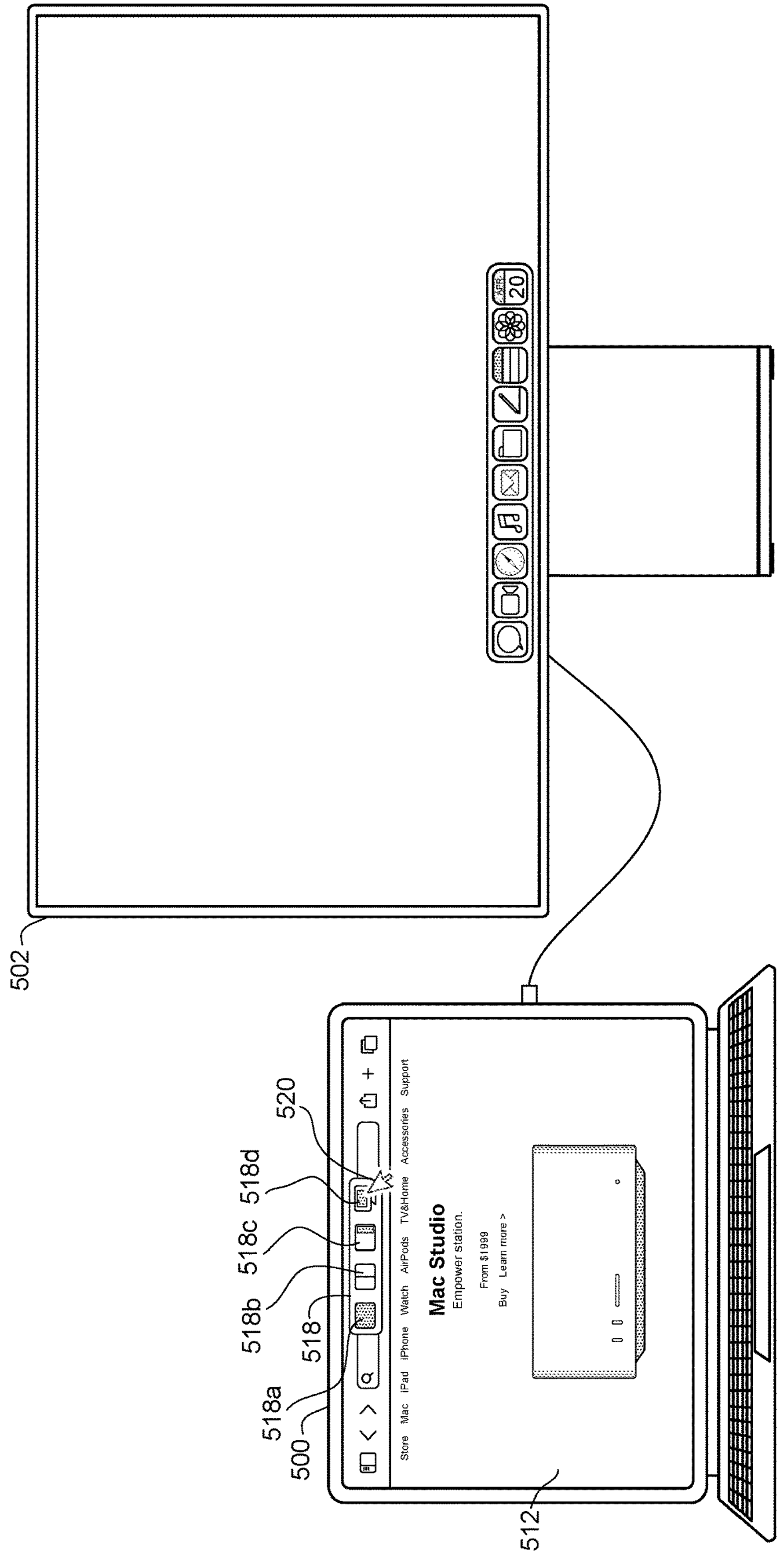

In FIG. 5B, user input 514 selects a menu affordance 516, which causes display configuration options 518 to be displayed as shown in FIG. 5C. Referring to Figure the display configuration options 518 include a full screen option 518*a*, a split screen option 518*b*, a window overlay option 518*c*, and a window transfer option 518*d* for transferring the window 512 to the second display device 502. In some embodiments, additional or fewer display configuration options may be shown. User input 520 selects the window transfer option 518*d*, which causes the window 512 to be transferred to the second display device 502, as shown in FIG. 5D.

Figure 5D:
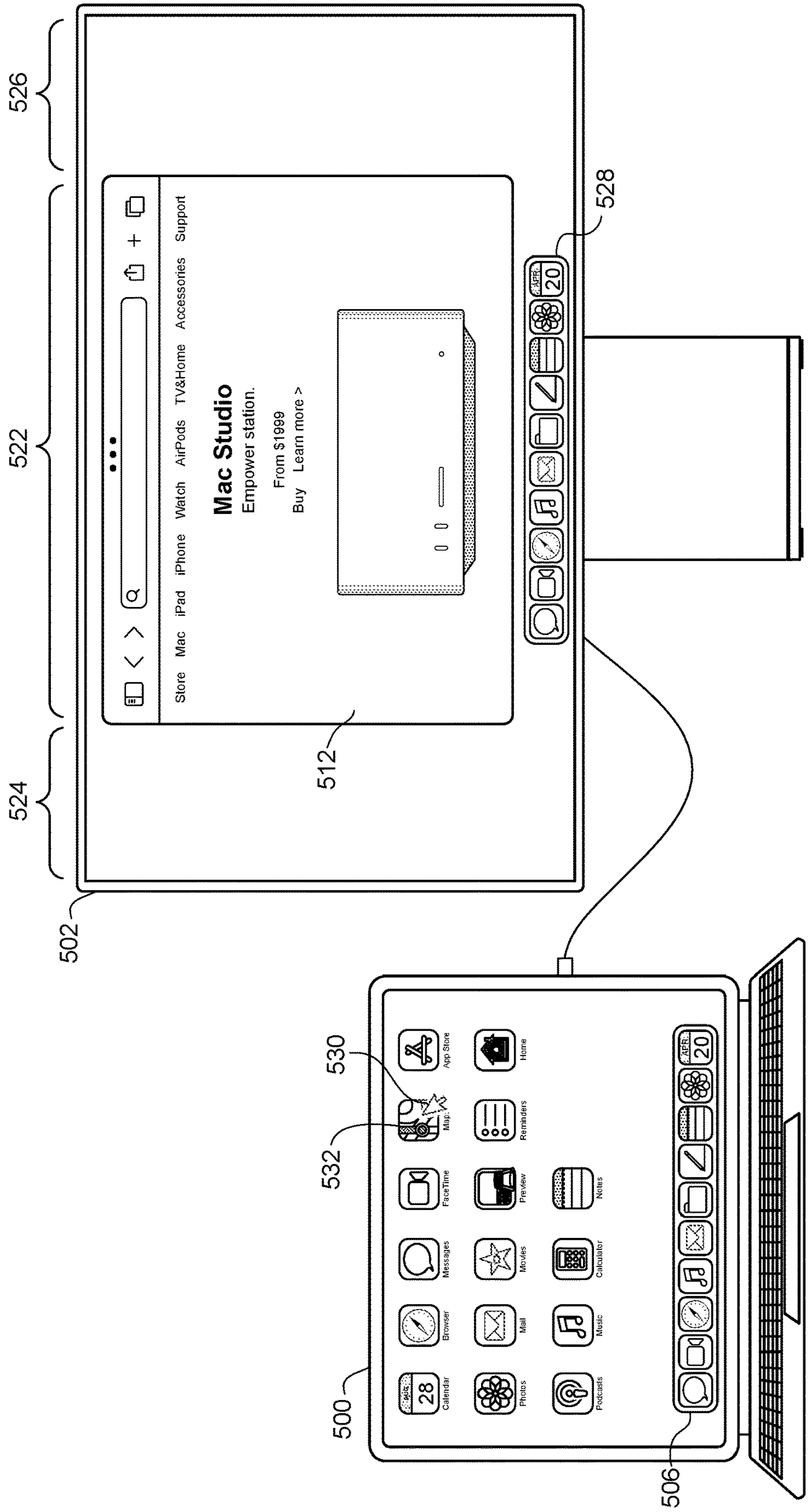

Referring to FIG. 5D, window 512, upon having been transferred to the second display device 502, is automatically (without user input) sized and positioned in a stage region 522 (also referred to as a stage region area, a main interaction region, an interaction region, or an application display region) of the display of the second display device. In some embodiments, the stage region 522 is centered on the display (or has a central position), optionally leaving spaces on a plurality of or all four sides of the window for other user interface elements to be displayed (e.g., a left strip, a right strip, or a dock). In some embodiments, these spaces include margins 524 and 526 on each side of the window 512. In some embodiments, these spaces include a space for a dock 528 of the second display device 502, which, in some embodiments, includes the same application icons as those included in the dock 506 of the first display device 500. In some embodiments, the size and position of the stage region 522 is not adjustable by a user. In some embodiments, the size and position of the stage region 522 is not adjustable by a user. In some embodiments, sizes, positions, layering order, and other changes to the spatial arrangement of windows displayed within the stage region are user adjustable. In some embodiments, changes to sizes, positions, and other spatial arrangements of window(s) displayed in stage region 522 are constrained, including constrained in height, width, number of windows displayed, and/or occlusion between the windows. By constraining the adjustment of spatial aspects of window(s) in the stage region 522, the display device 502 provides an uncluttered and efficient user interface that optimizes performance.

Figure 5E:
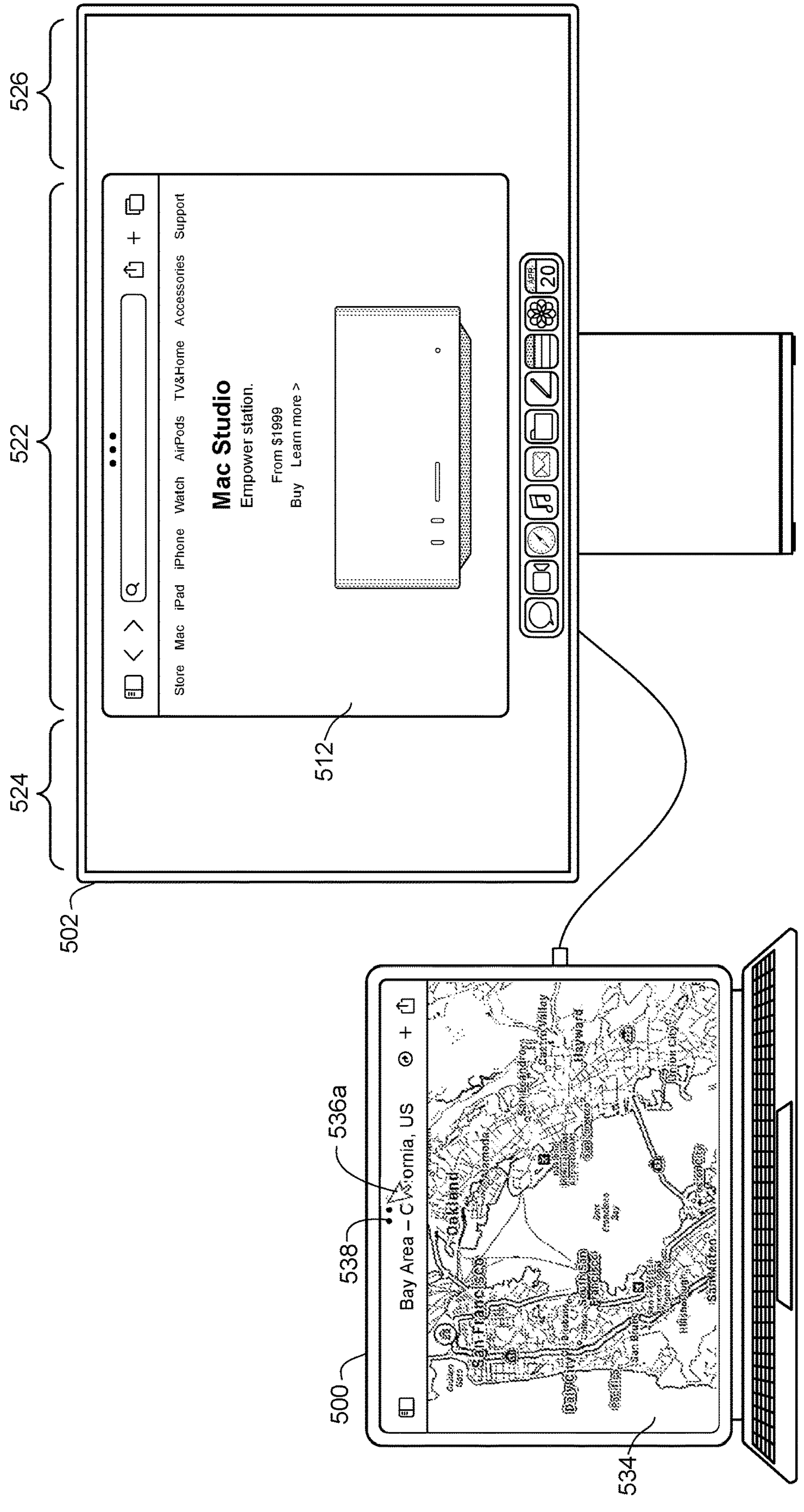
Figure 5F:
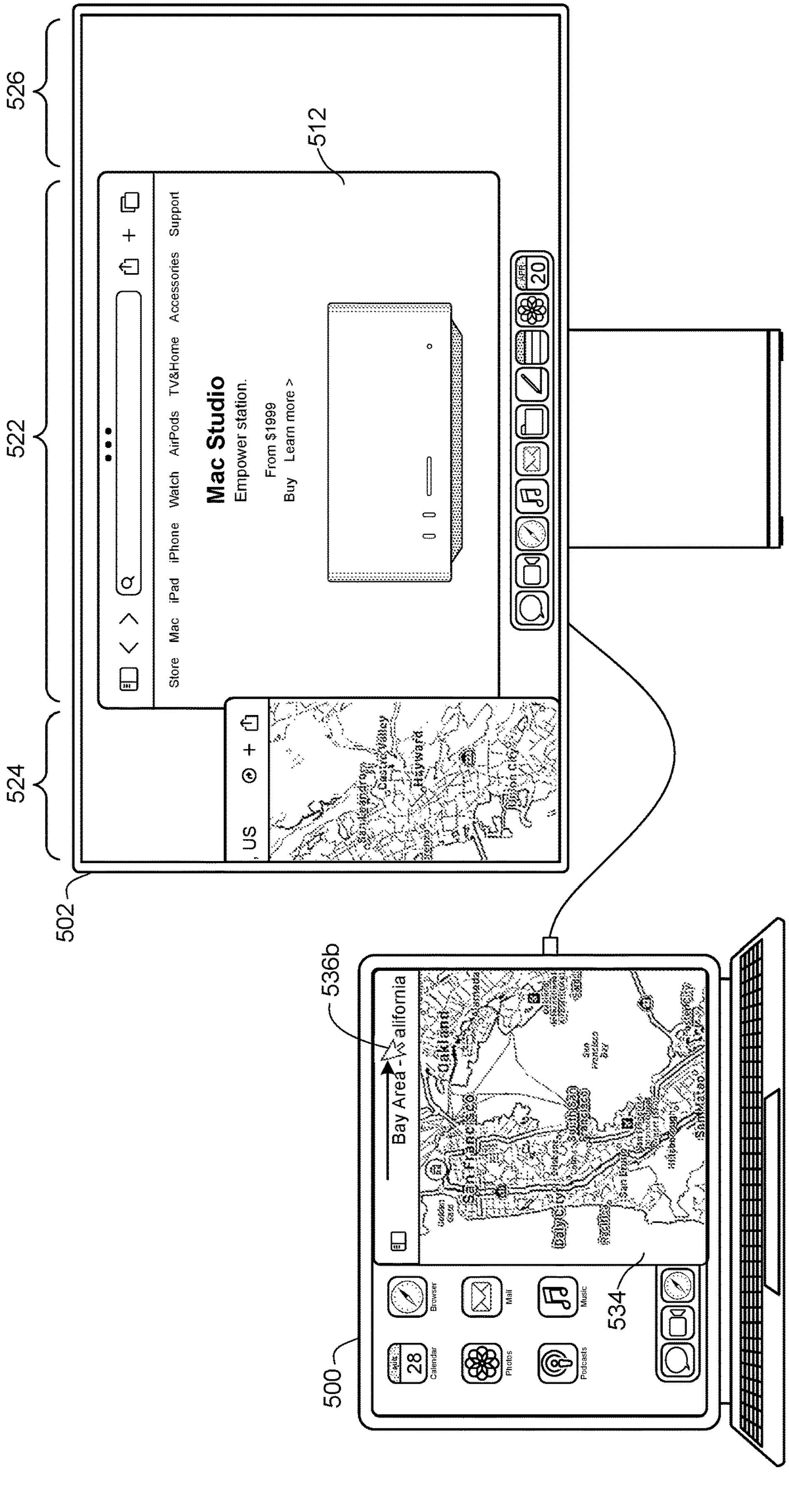
Figure 5G:
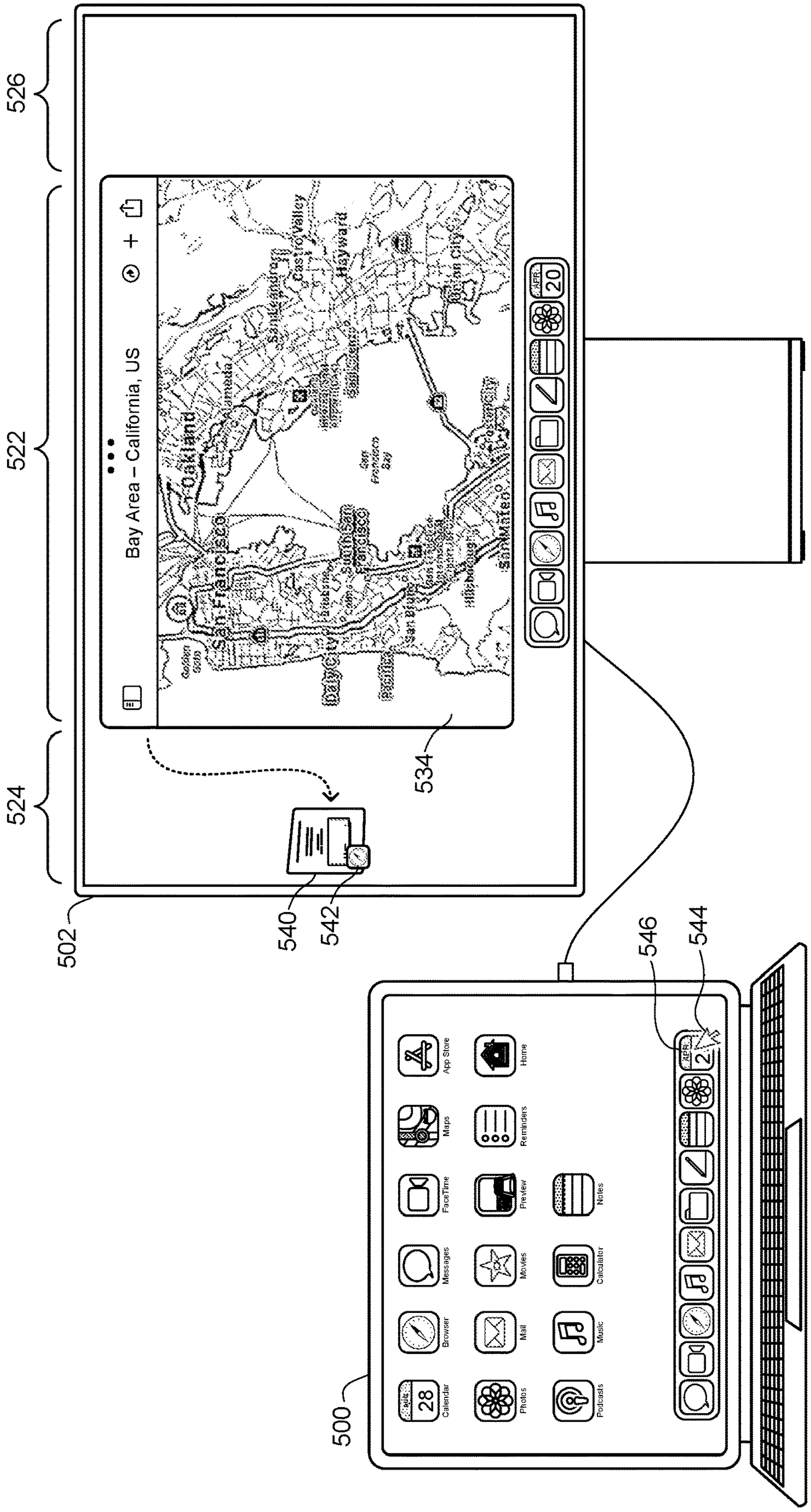

In FIGS. 5D-5G, a window is transferred from the first display device 500 to a predetermined location on the second display device 502 by user selection of a drag-and-drop user input. Specifically, in FIG. 5D, user input 530 selects an application icon 532 on the home screen of the first display device 500, corresponding to a second application (e.g., a maps application), which causes a window 534 of the second application to open on the first display device 500, as shown in FIG. 5E. In FIG. 5E, user input 536*a* selects an affordance 538 (e.g., an affordance for window arrangement) on window 534 and drags window 534 by the affordance 538 in the direction of the second display device 502, as shown in FIG. 5F. In FIG. 5F, user input 536*b* is released, which causes the window 534 to be transferred to the stage region 522 of the second display device 502, as shown in FIG. 5G. In some embodiments, user inputs 536*a* and 536*b* do not require the affordance to be dragged to the stage region 522 of the second display device 502. Instead, if the input moving window 534 between user inputs 536*a* and 536*b* meets a threshold (e.g., enough of the window, e.g., ~30%, is dragged onto the display device 102), the window 534 snaps the rest of the way to its assigned position in the stage region 522 of the second display device 502. For example, if the input moving window 534 in the direction of the second display device 502 has a higher speed, velocity, or acceleration compared to a drag input. For example, a user can "throw" the second window to second display device 502 as opposed to dragging it to the second display device 502.

Referring to FIG. 5G, in some embodiments, the transferring of the second window 534 to the stage region 522 of the second display device 502 causes the first window 512 (FIG. 5F) to be shrunk (or a representation of the window generated) and automatically (without user input) moved to margin region 524 (e.g., a sidebar region left of stage region 522). By moving to margin region 524, the window 512 changes to a reduced scale representation 540 of the window 512. The window representation 540 is selectable, and it includes a portion of the currently displayed graphical elements of window 512 so as to make it recognizable to the user as corresponding to the window 512. In some embodiments, representation 540 also includes an application icon 542 indicating which application is associated with the window representation 540. Selecting the representation 540 causes the window 512 to be restored to the stage region 522, as described in more detail below. In some embodiments, the representation 540 is automatically (without user input) positioned in the middle of the margin 524, so that it is aligned in at least one dimension with the stage region 522 (here, aligned horizontally).

Figure 5H:
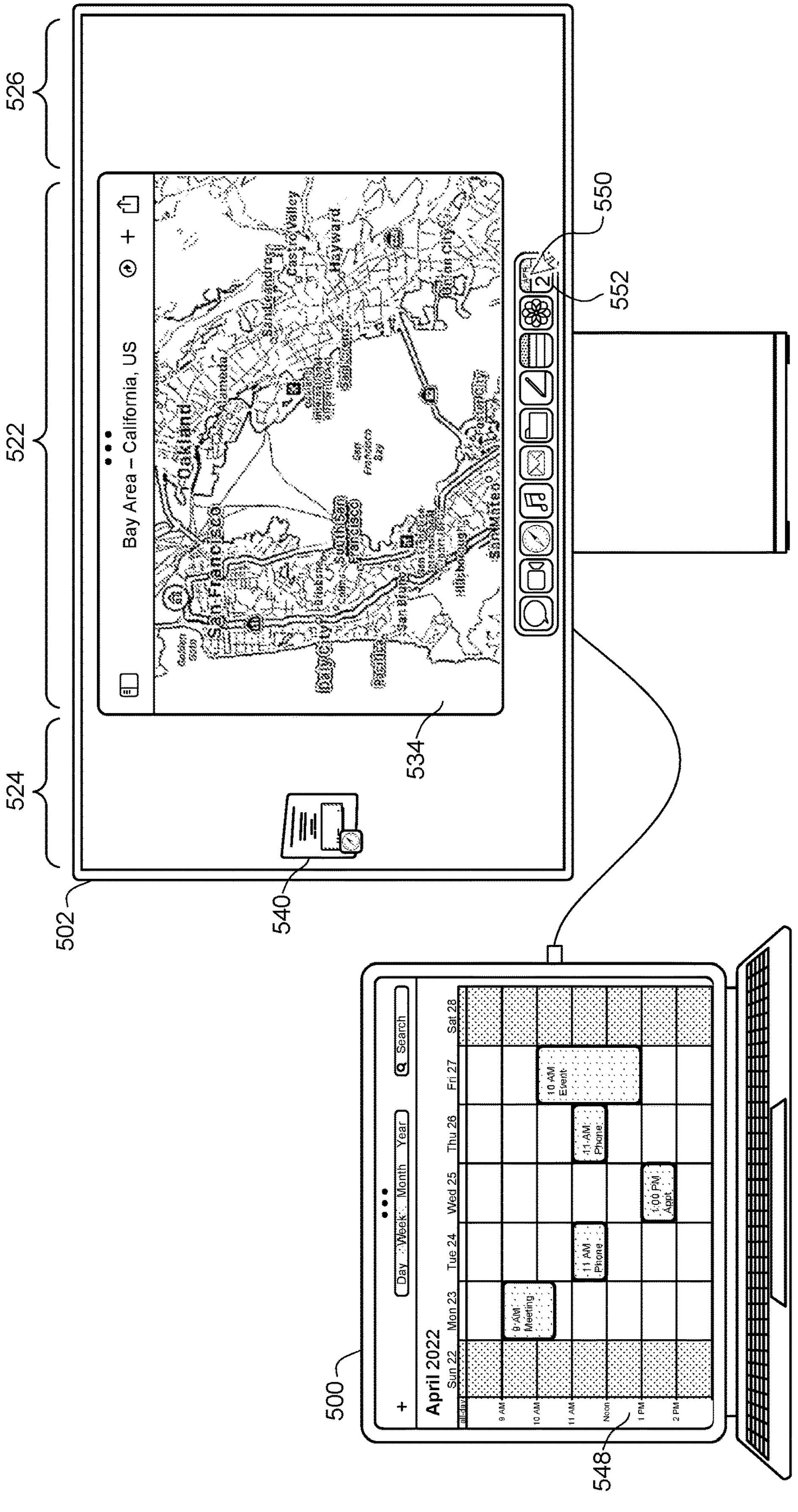
Figure 5I:
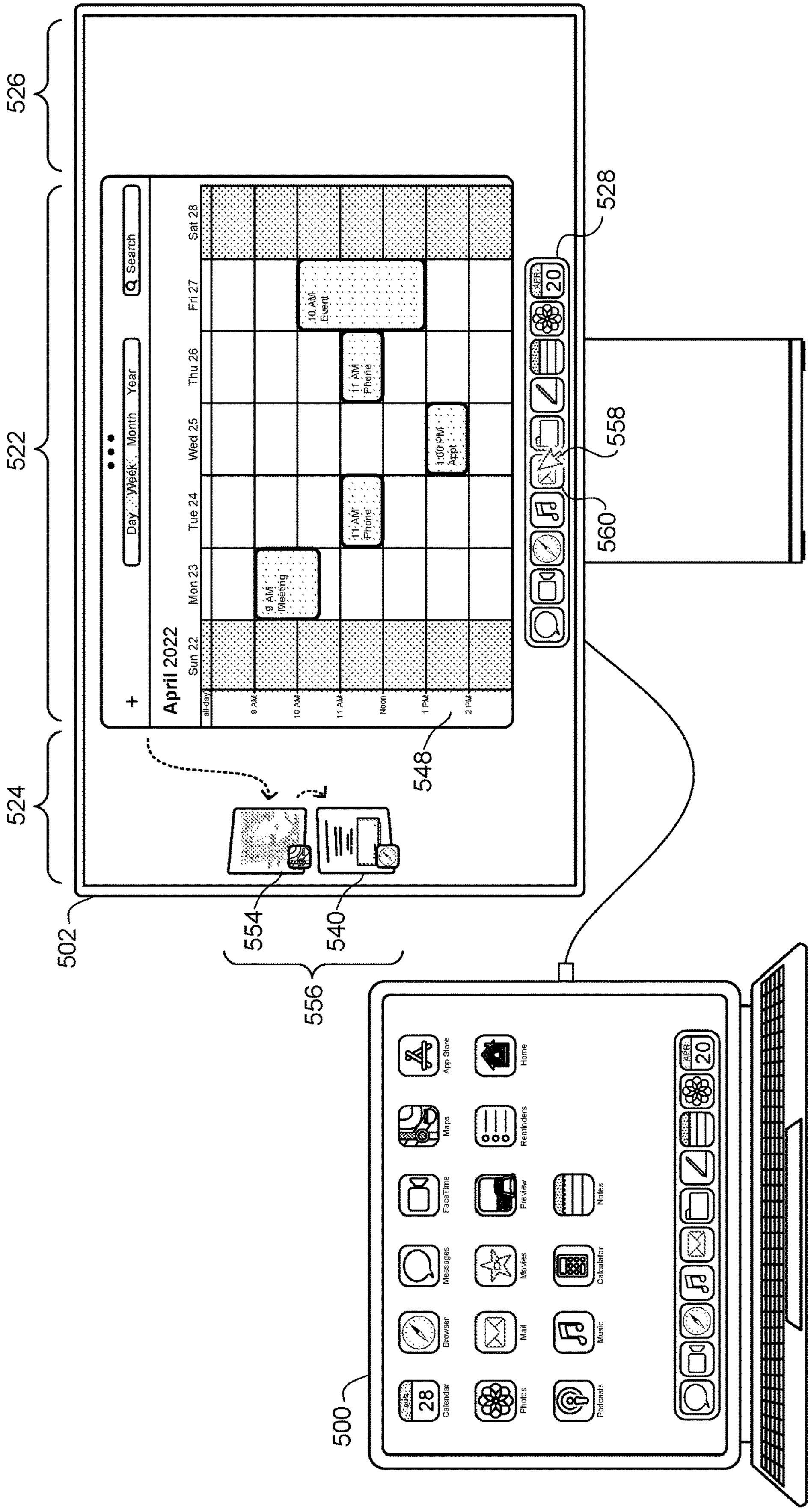

In FIGS. 5G-5I, a window is transferred from the first display device 500 to a predetermined location on the second display device 502 by user selection of a corresponding application icon in the dock of the second display device 502. For example, in FIG. 5G, user input 544 selects an application icon 546 for launching a calendar application on the first display device 500, which causes a window 548 corresponding to the calendar application to open on the first display device 500, as shown in FIG. 5H. In FIG. 5H, user input 550 selects an application icon 552 (another application icon for launching the calendar application) in the dock of the second display device 502, which causes the window 548 to open in (or be moved to) the stage region 522 of the second display device 502, as shown in FIG. 5I. Movement of window 548 to the stage region 522 of the second display device 502 causes window 534 (FIG. 5H) to be removed from stage region 522 and added automatically to a system-generated window grouping. For example, window 534 is transformed (e.g., including decreasing in size) to a representation 554, which is placed in a left strip 556 included in margin 524. In some embodiments, reduced scale representation 554 of window 534 also corresponds to a representation of a window grouping that includes one window, as shown in FIG. 5H. Other representations of window groupings are included in a left strip 556 of margin 524, as shown in FIGS. 5I-7D. In some embodiments, strip 556 is referred to as an application switcher, a group switcher, or other sidebar region and can be located in other margin regions, such as the top or the bottom margins). Strip 556 may be referred to as an application switcher region, or a region for switching window groups (if window groups are composed of windows of different applications). In some embodiments, a representation of a window grouping includes one or more reduced scale representations of windows. As new representations of window groupings are added to the strip 556, representations of other window groupings that are already in the strip 556 move (e.g., down, as shown in FIG. 5I) to make room for the new window representation.

Figure 5J:
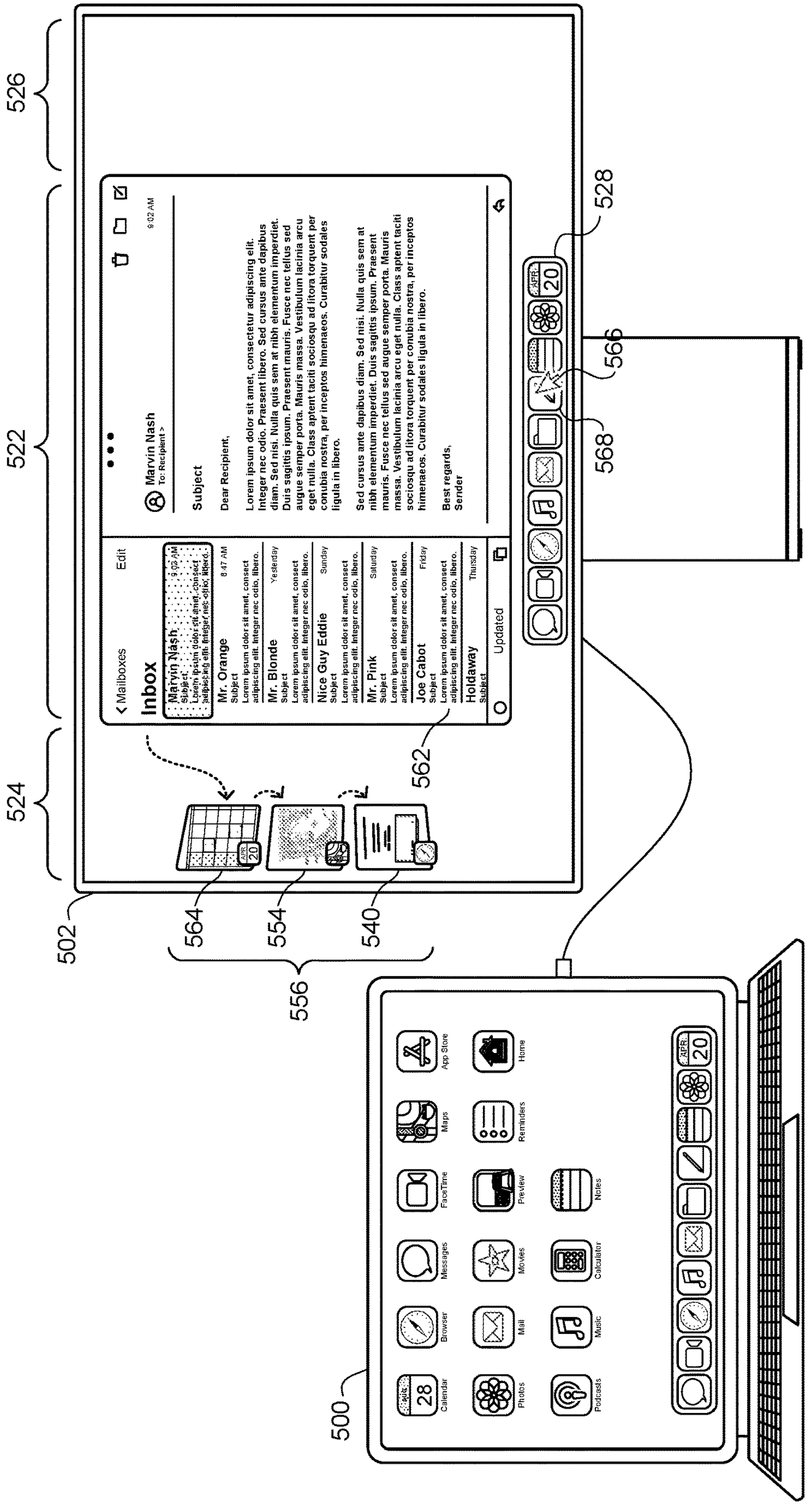
Figure 5K:
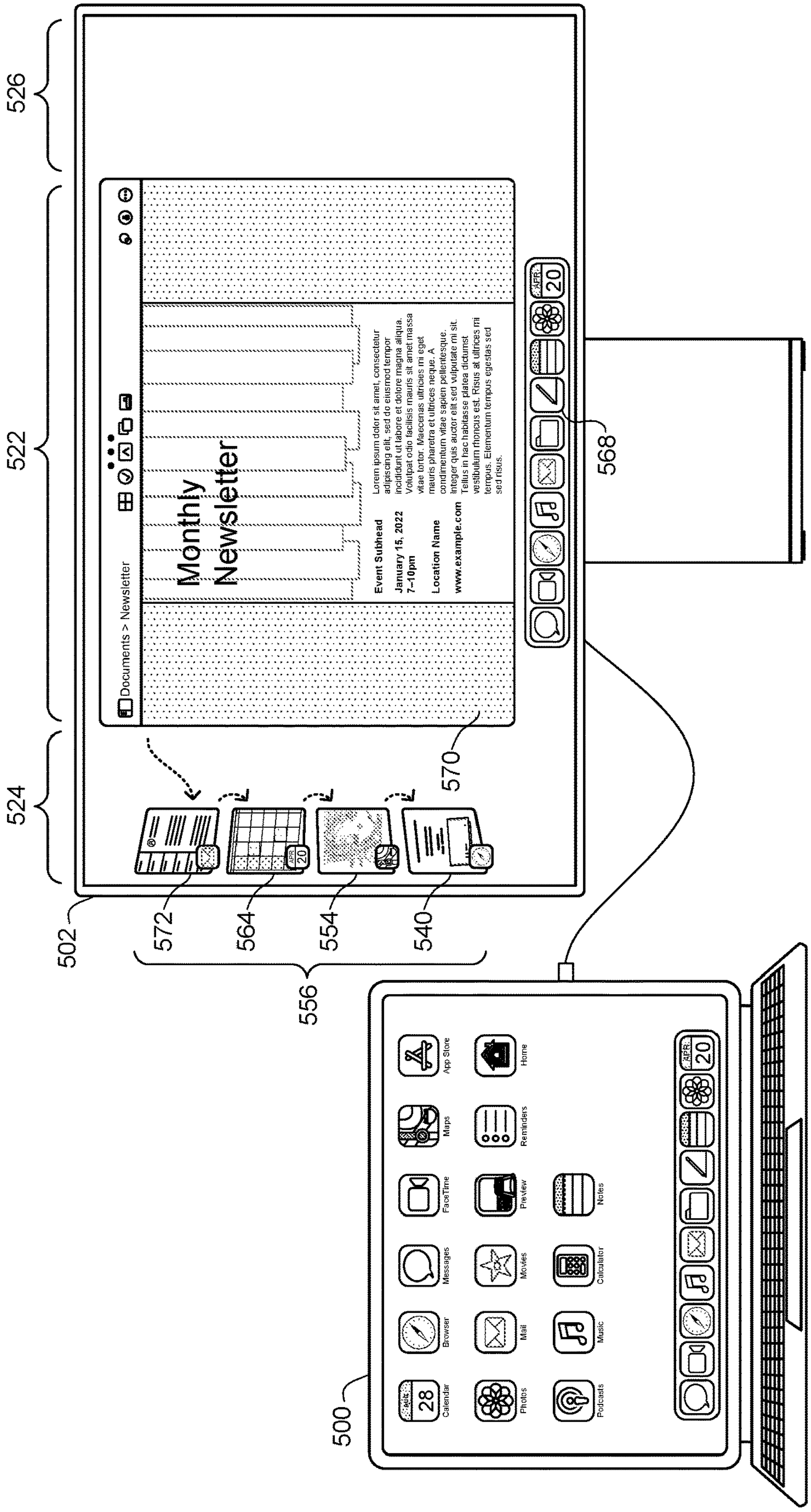

In FIGS. 5I-5K, windows are opened directly on the second display device 502 and displayed in a predetermined location on the display without having been first opened on the first display device 500. For example, in FIG. 5I, user input 558 selects an application icon 560 corresponding to an application (a mail application) in the dock 528 of the second display device 502, which causes a window 562, corresponding to the application icon 560, to directly open in the stage region 522 of the second display device 502. This causes window 548 (FIG. 5I) to be shrunk (as a reduced scale representation 564) and displayed in the strip 556, as shown in FIG. 5J. In FIG. 5J, user input 566 selects another application icon 568, corresponding to another application (a word processor application), in the dock 528 of the second display device 502, which causes a window 570 corresponding to the application icon 568 to directly open in the stage region 522 of the second display device 502. This causes window 562 to be shrunk (e.g., displayed by the display device as a reduced scale representation 572) and displayed in the strip 556, as shown in FIG. 5K. As illustrated in FIG. 5K, strip 566 includes four representations of window groupings. These representations of window groupings include, for example, a bottom or first representation 540 of window 512; a second representation 554 of window 534; a third representation 564 of window 548; and a top or fourth representation 572 of window 562. In the example illustrated in FIG. 5K, windows that are removed from the stage region 522, are automatically grouped by application, such as a mail application, a calendar application, a maps application, and a browser application (displayed in order from top to bottom) into respective representations of window groupings.

FIGS. 6A-6H illustrate user inputs that cause application windows to be automatically sized, positioned, and organized in predetermined groups and locations of a display device 502 (e.g., a tablet, laptop, or desktop display device) in accordance with some embodiments. The display mode in which application windows are displayed and organized in such a manner may be referred to as a concentration mode, as this mode assists the user in concentrating on a main window or group of windows while, at the same time, being able to ascertain the state of other applications and their corresponding windows that are not currently the main focus of the user.

Figure 6A:
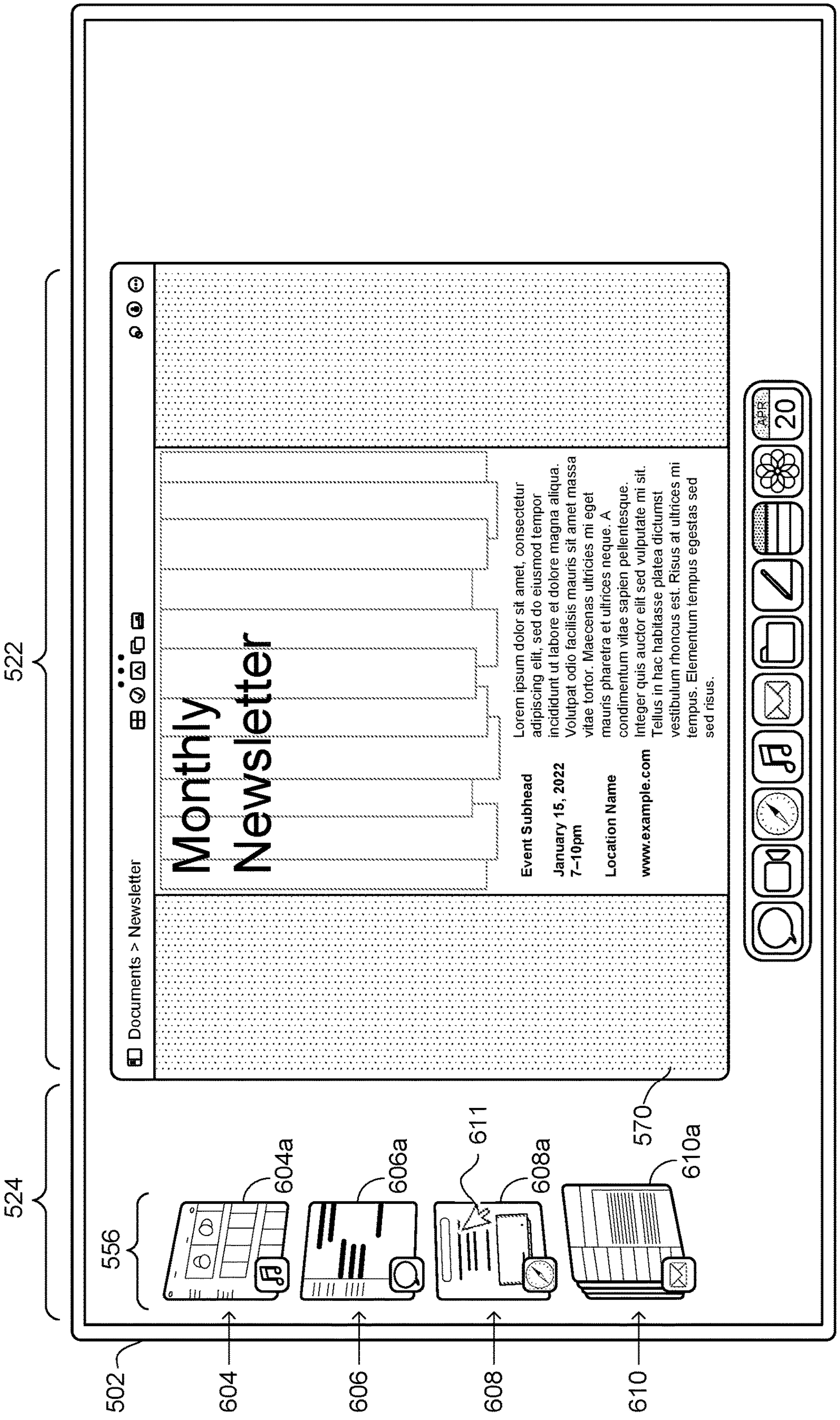

In FIG. 6A, the display includes a stage region 522 and a strip 556 (e.g., a left strip), as described above. Window 570 of the pages application is displayed in stage region 522, where a user can directly interact with window 570. For example, a user can manipulate content of the window 570, such as scroll, select, edit, and/or otherwise update the content. The strip 556 includes multiple positions or slots, e.g., here four slots. Groups of one or more reduced scale representations of windows (hereafter window groupings or representations of window groupings) are located at each position or slot of the multiple positions or slots. For example, a representation of a window grouping for a music application is located at the first (or top) position 604; a representation of a window grouping for a messages application is located at the second position 608; a representation of a window groupings for a browser application is located at the third position 610; and a representation of a window grouping of a mail application is located at the fourth (or bottom) position 612. As used herein, a representation of a window grouping (e.g., 610*a*) is also referred to as a window grouping or a cluster of window thumbnails. In some embodiments, strip 556 includes more than four positions, while in some embodiments, strip 556 includes less than four positions. The number of positions included in strip 556 may be based on the amount of space available in the margin region 524, size of the window representations or size of representations of window groupings, screen resolution, and other factors. The use of four positions throughout this application is for purposes of illustration and is not meant to be limiting. In addition, the location of strip 556 to the left of the stage region 522 throughout this application is for purposes of illustration and is not meant to be limiting. In some embodiments, the number of positions in the strip 556 is configurable by the user. In some embodiments, if there are more representations of window groupings than are available for inclusion in the strip 556, the extra representations of window groupings are removed from the strip and placed in an overflow interface (described in more detail below).

In some embodiments, the representations of window groupings in the strip 556 represent the most recently used applications, which are positioned or ordered according to one or more different policies, such as a “recency policy” (described in FIGS. 6A-6B), a “replacement policy” (described in FIGS. 6C-6D), or a “placeholder policy” (described in FIGS. 6E-6H).

Figure 6B:
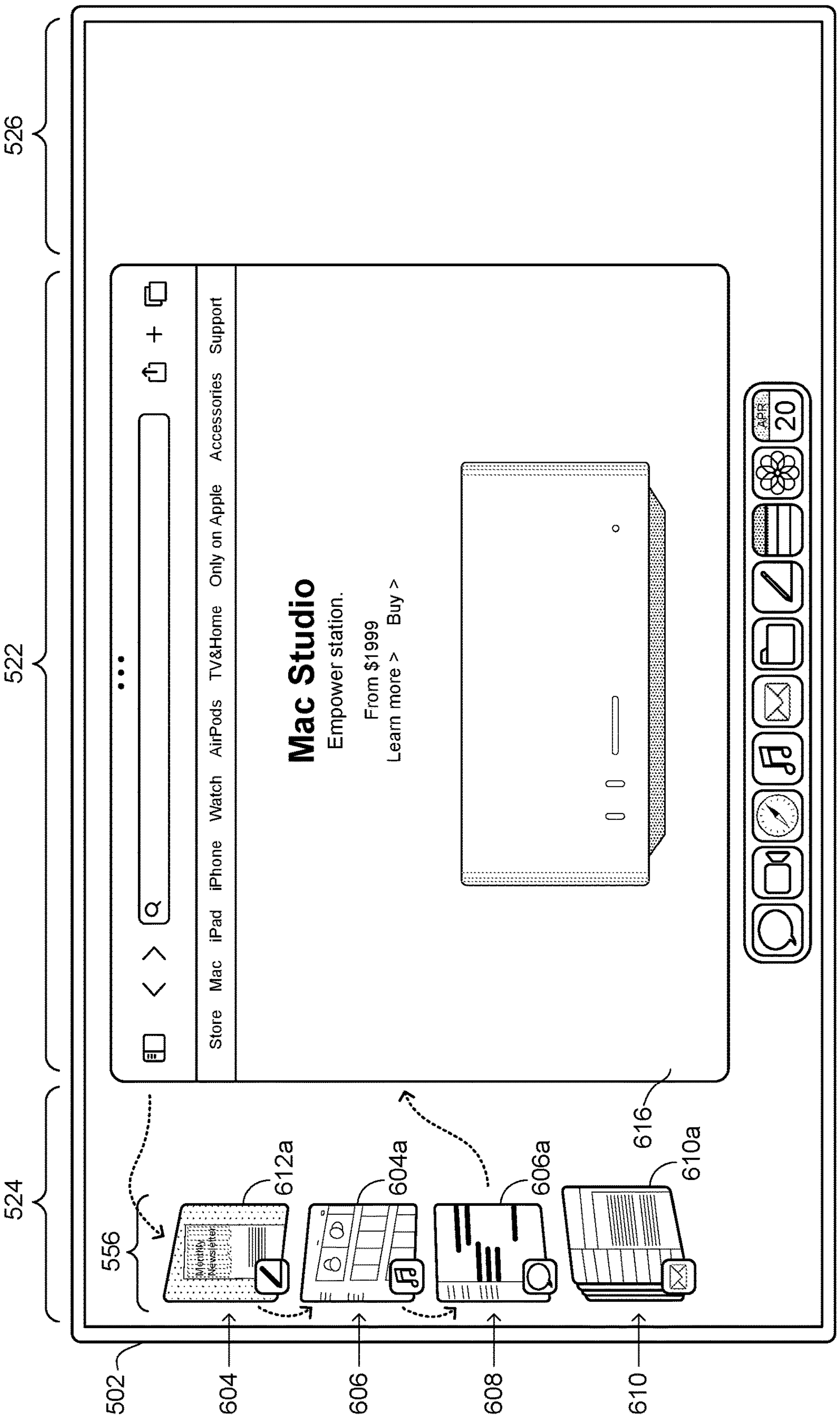

FIGS. 6A-6B illustrate ordering of representations of window groupings in the strip 556 according to the “recency policy.” Specifically, referring to FIG. 6A, user input 611 selects a windows grouping 608*a* for windows of the browser application. As shown in FIG. 6B, in response to the selection of the windows grouping 608*a*, browser window 616 is displayed in stage region 522, and word processor window 570 that was previously in the stage region is removed from stage region 522 to the strip 556 and replaced with browser window 616. In some embodiments, word processor window 570 is shrunk and added to the strip 556 as a window grouping 612*a* (which is a representation of a new system-generated window grouping), while other representations of window groupings, such as window groupings 604*a*, 606*a*, and 610*a* are shifted downward to fill in any remaining space in strip 556. As such, according to a “recency policy,” a representation of the most recently generated window grouping 612*a* is placed on top or in the first position in the strip 566 while window groupings 604*a*, 606*a*, and 610*a* are shifted down by one position (e.g., without changing order of window groupings 604*a*, 606*a*, and 610*a*). For example, window grouping 604*a* is moved from position 604 to position 606; window grouping 606*a* is moved from position 606 to position 608; and window grouping 610*a* is moved from position 608 to position 610.

Figure 6C:
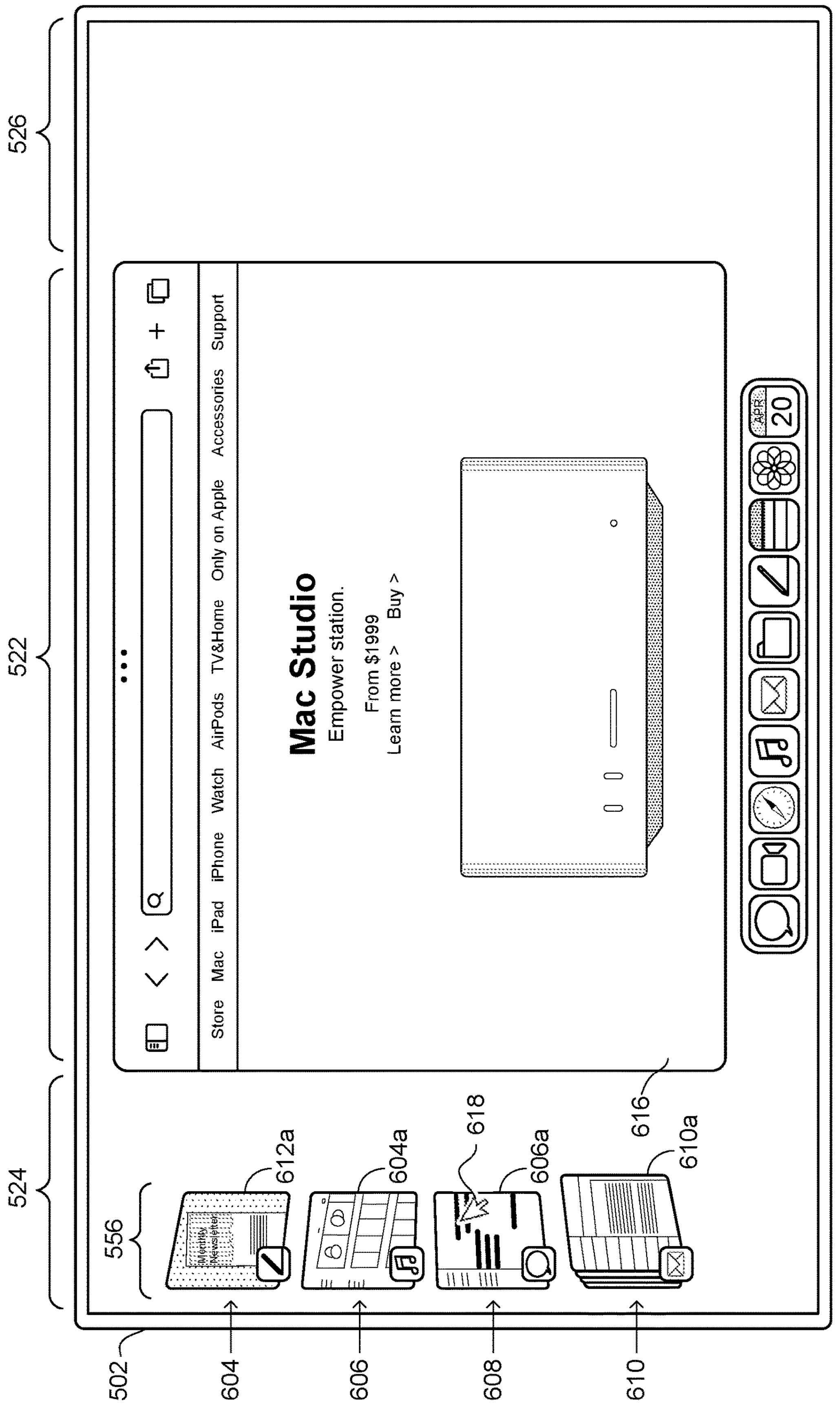
Figure 6D:
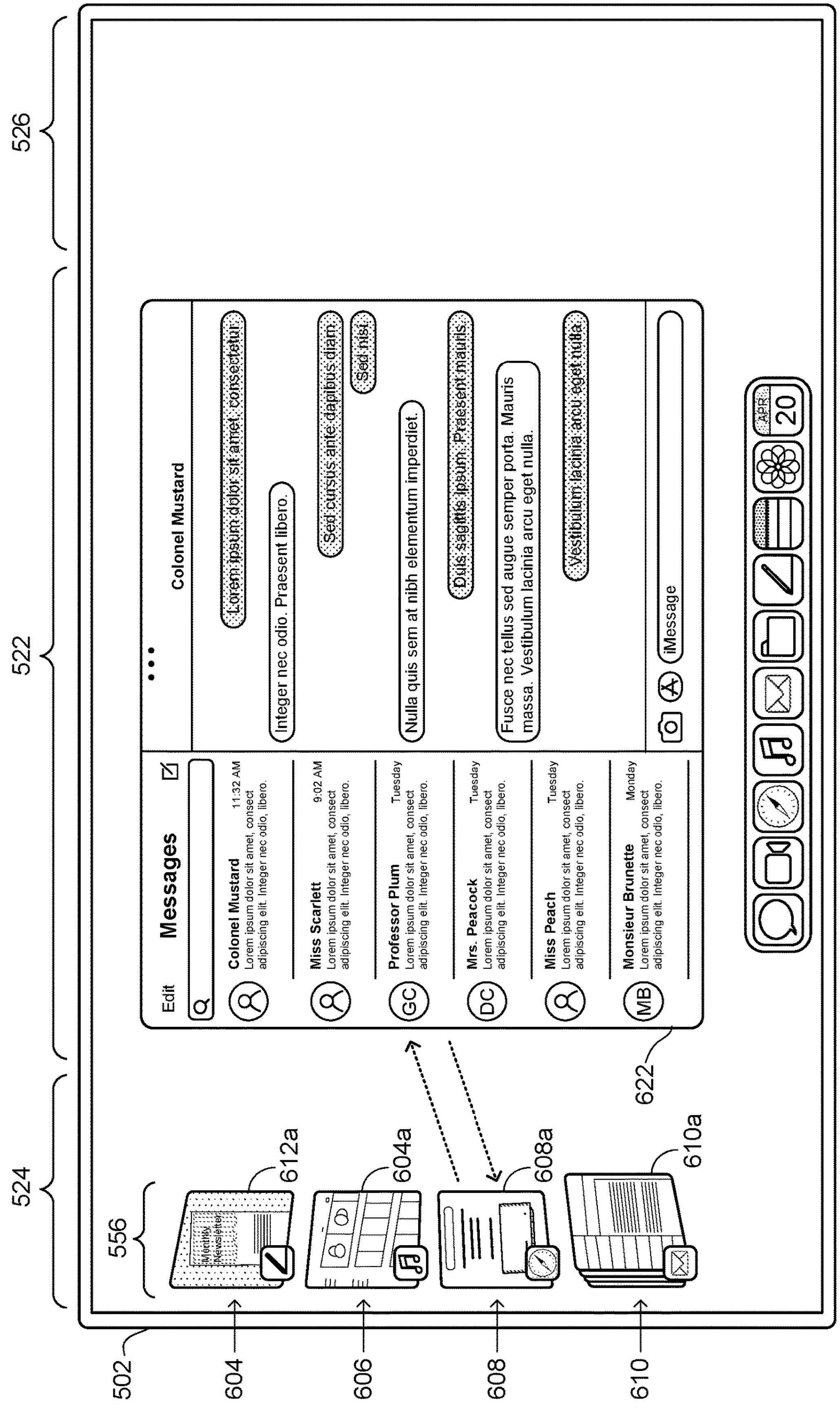

FIGS. 6C-6D illustrate ordering of representations of window groupings in the strip 556 according to the “replacement policy.” Specifically, referring to FIG. 6C, user input 618 selects window grouping 606*a*, including windows of the messages application. In response to the selection of window grouping 606*a*, messages window 622 is displayed in stage region 522, and browser window 616 is removed from stage region 522 and replaced with messages window 622, as shown in FIG. 6D. The browser window 616 is shrunk and added as a window grouping 608*a* (which is a representation of a system-generated window grouping for windows of the browser application), while other representations of window groupings, such as window groupings 612*a*, 604*a*, and 610*a*, remain at the same positions 604, 606, and 610, respectively. As such, according to a "replacement policy," windows that are removed from the stage region in response to selecting a window grouping 606*a*, which is displayed at position 608, are added into a window grouping 608*a*, also displayed in position 608. In other words, this policy swaps windows on the stage region with those selected in the strip.

Figure 6E:
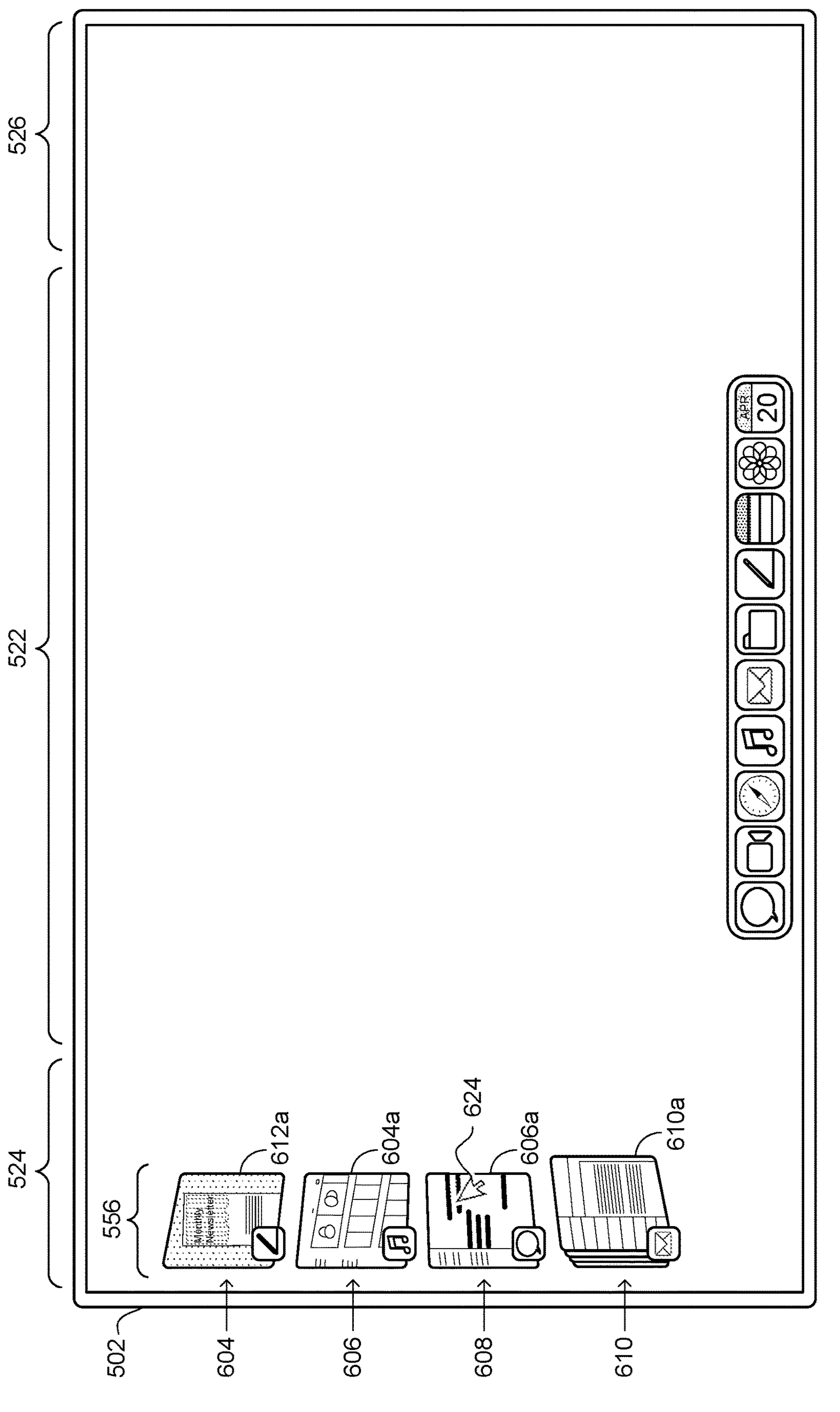
Figure 6F:
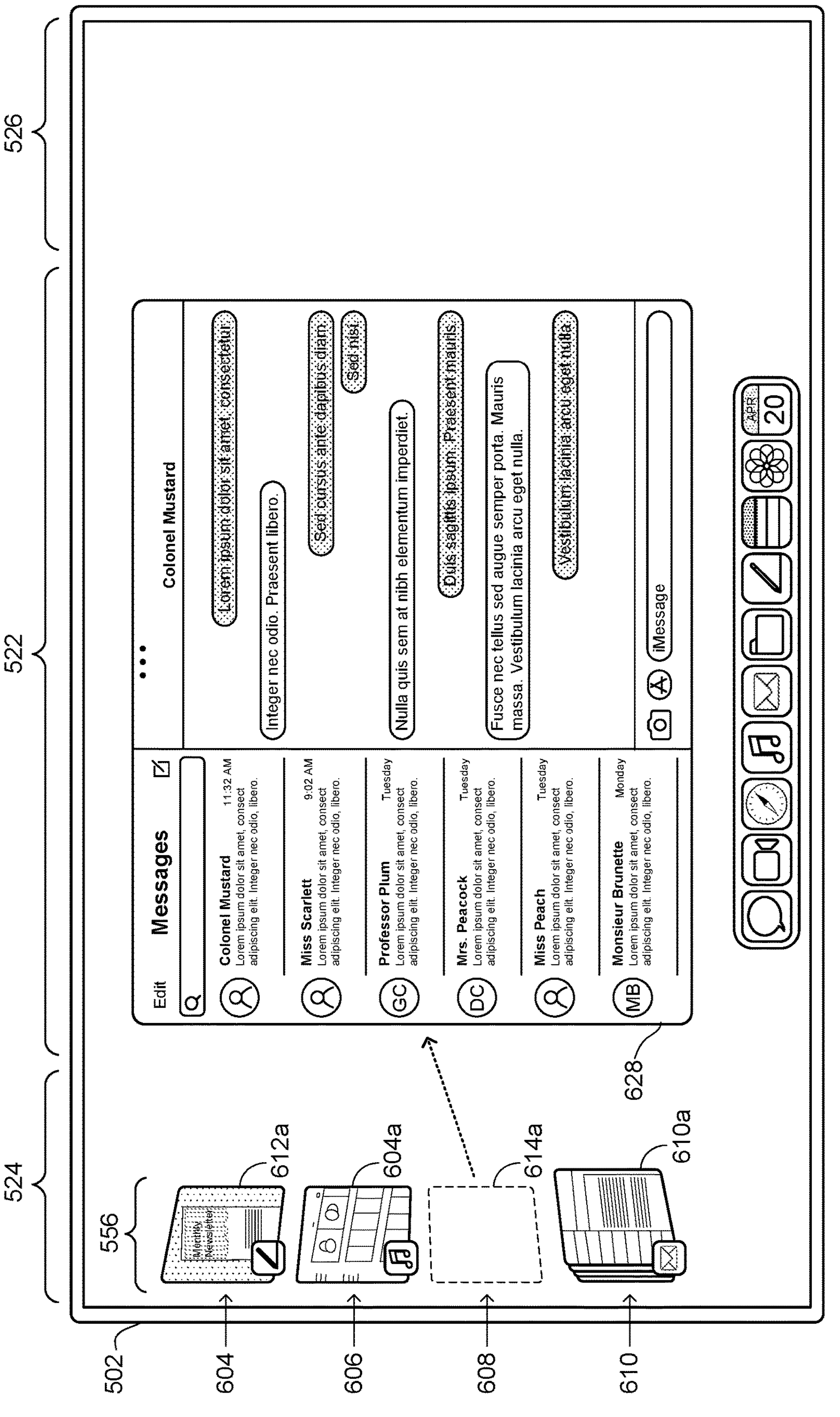
Figure 6G:
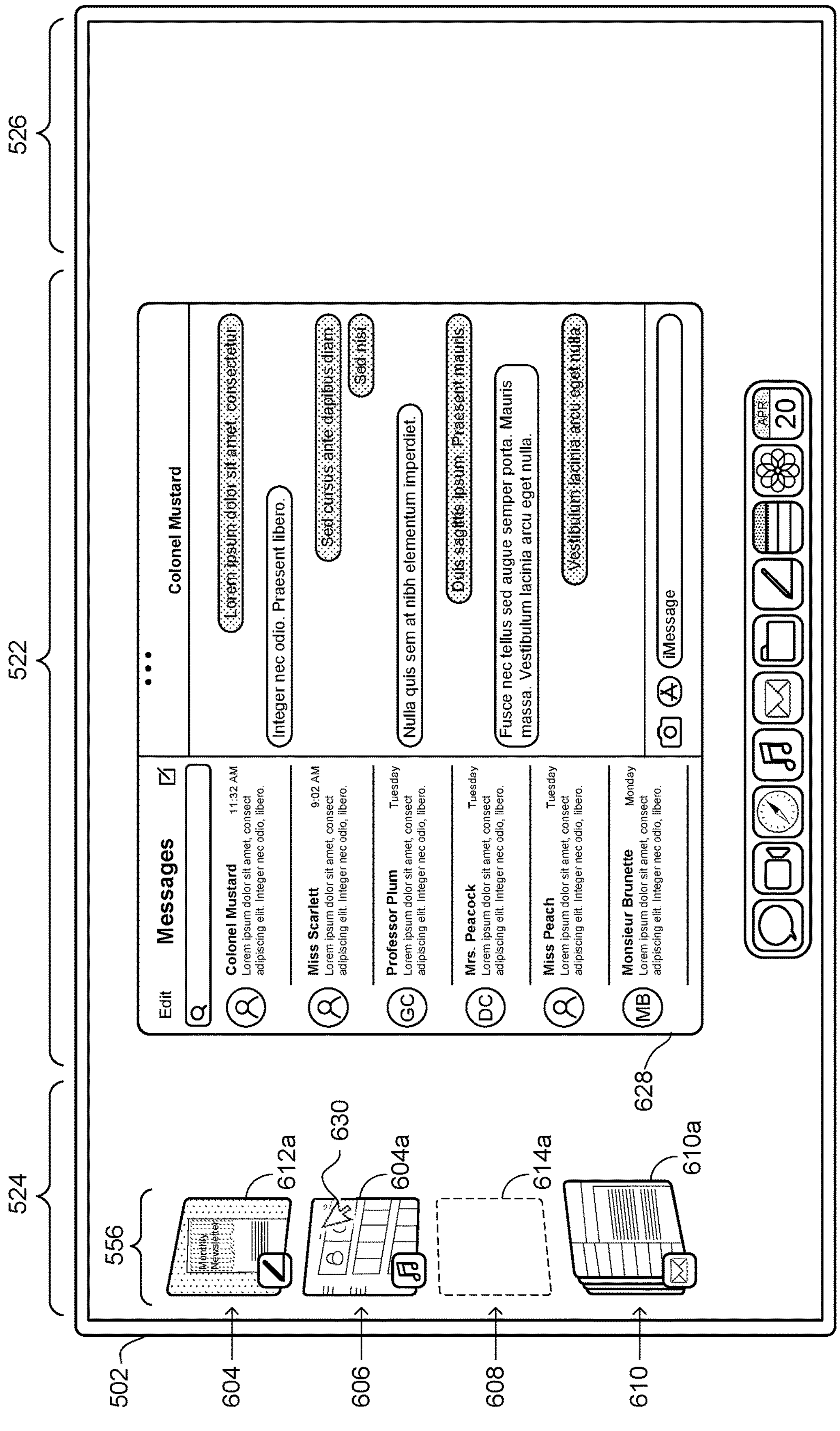
Figure 6H:
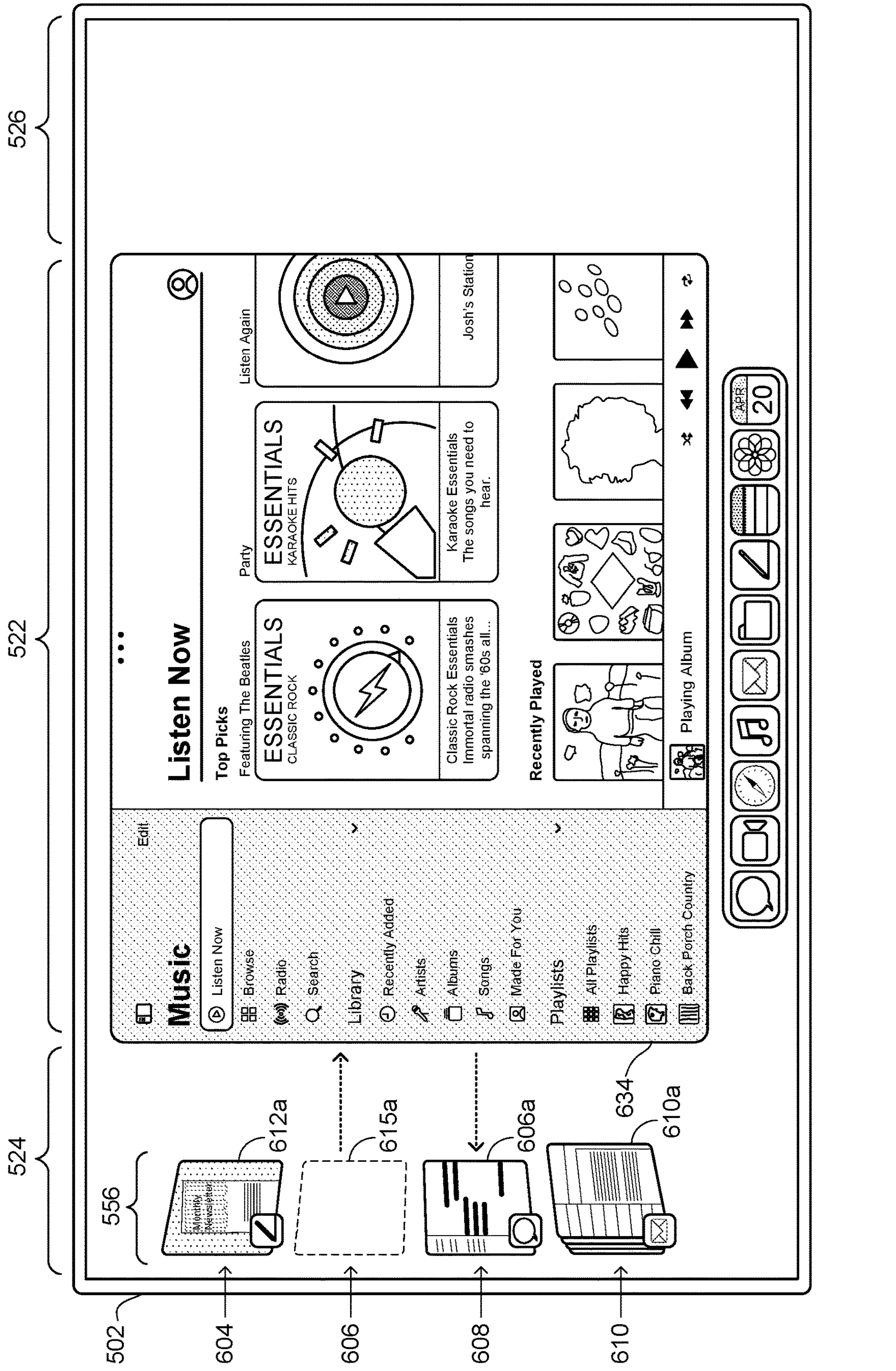

FIGS. 6E-6H illustrate ordering of representations of window groupings in the strip 556 according to the "placeholder policy." In FIG. 6E, window grouping 612*a* for windows of the word processor application is displayed at position 604; window grouping 604*a* for the music application is displayed at position 606; window grouping 606*a* for messages application is displayed at position 608; and window grouping 610*a* for the email application is displayed at position 610. In FIG. 6E, user input 624 selects window grouping 606*a* for the messages application. In response to user input 624, messages window 628 is displayed in the stage region 522, as shown in FIG. 6F. According to the "placeholder policy," in some embodiments, position 608 remains unfilled with other window groupings, and instead a placeholder representation 614*a* is displayed. In some embodiments, nothing is displayed in the region 608. In FIG. 6G, user input 630 selects window grouping 604*a* for the music application. In response to input 630, music window 634 is displayed in stage region 522 and messages window 628 is removed from the stage region 522, as shown in FIG. 6H. Reduced scale representation of messages window 628 is added to window grouping 606*a* displayed position 608, thereby replacing the placeholder representation 614*a* (or the empty space) and displaying placeholder representation 615*a* (or empty space) at position 606.

Figure 7A:
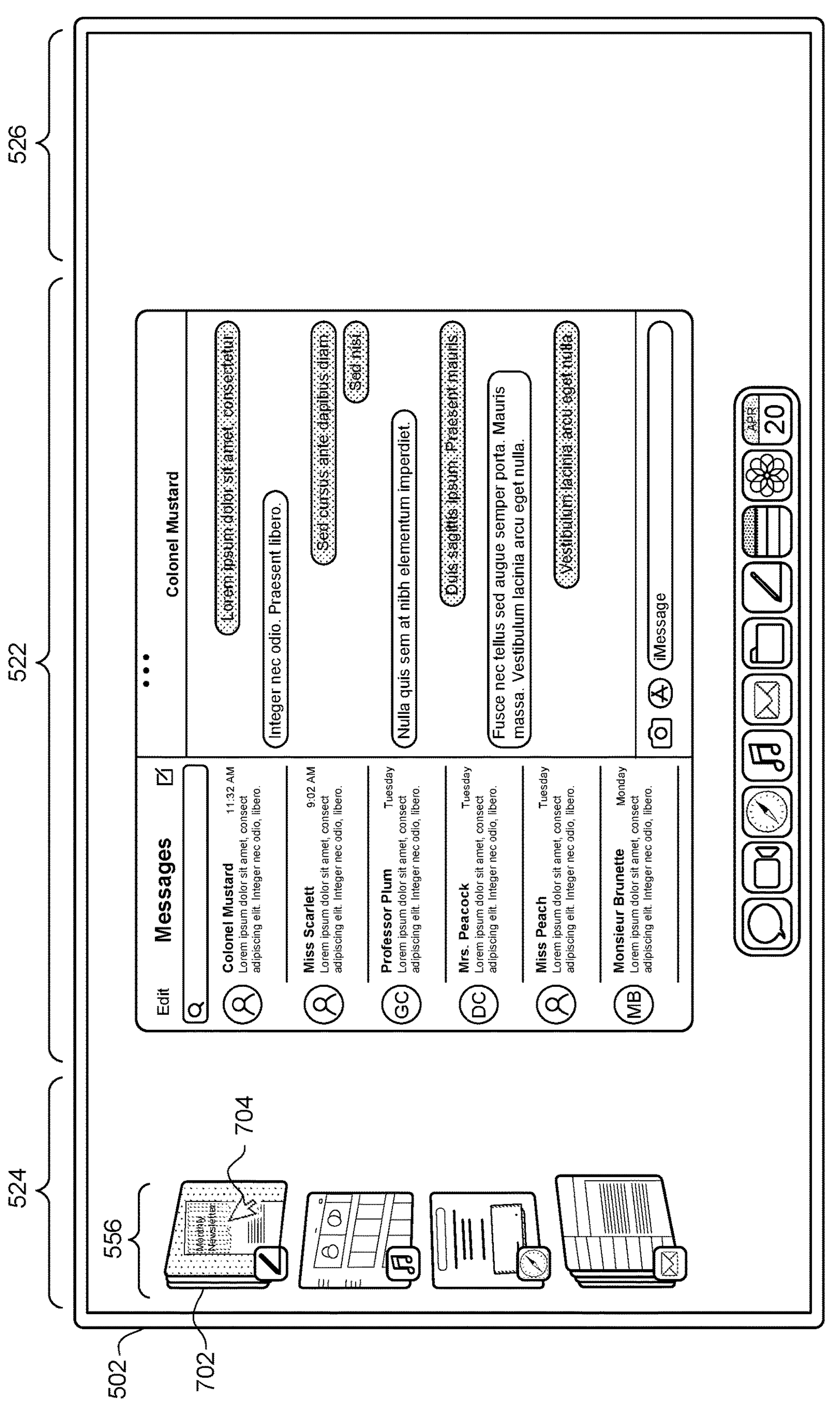
Figure 7B:
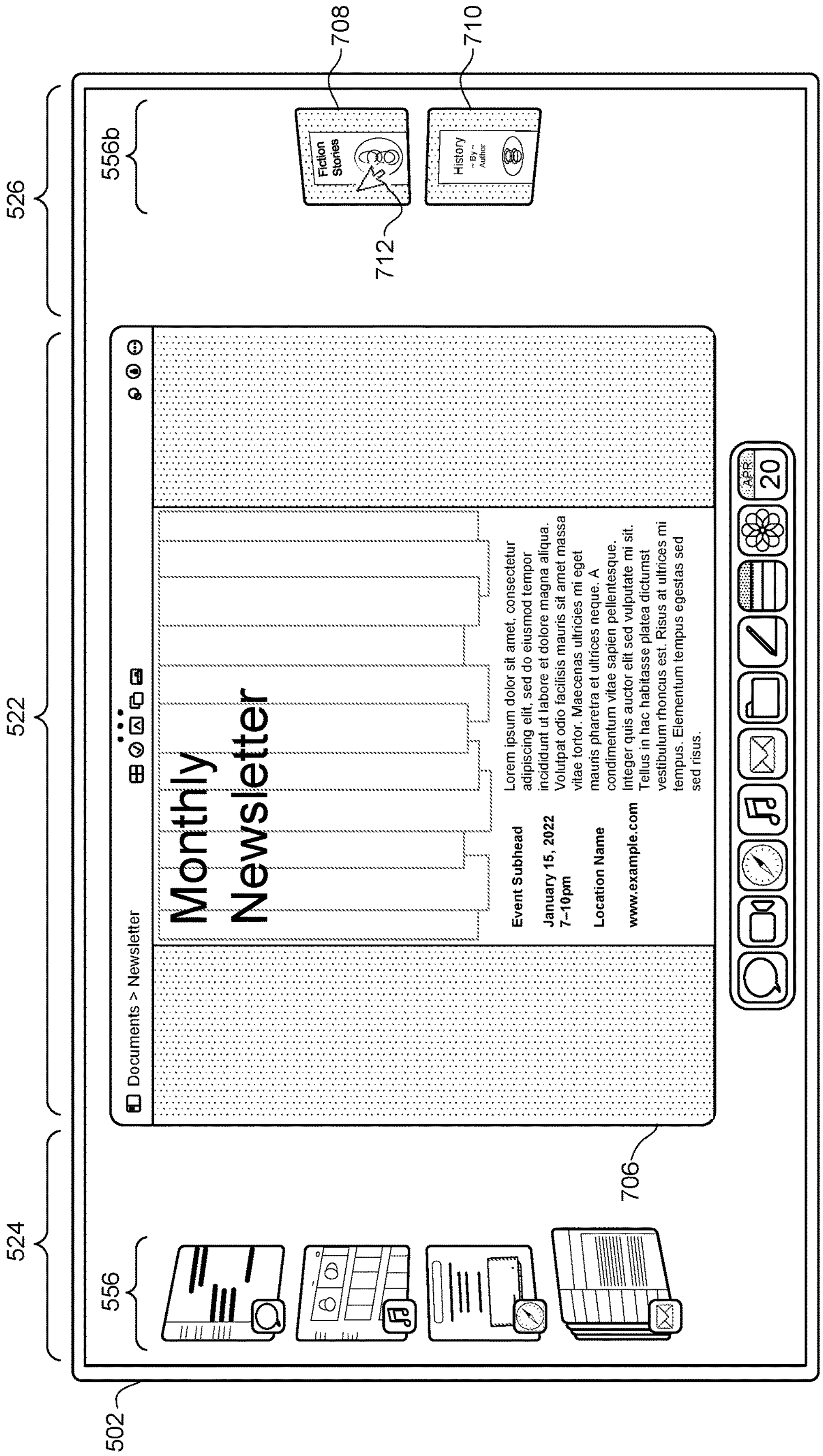
Figure 7C:
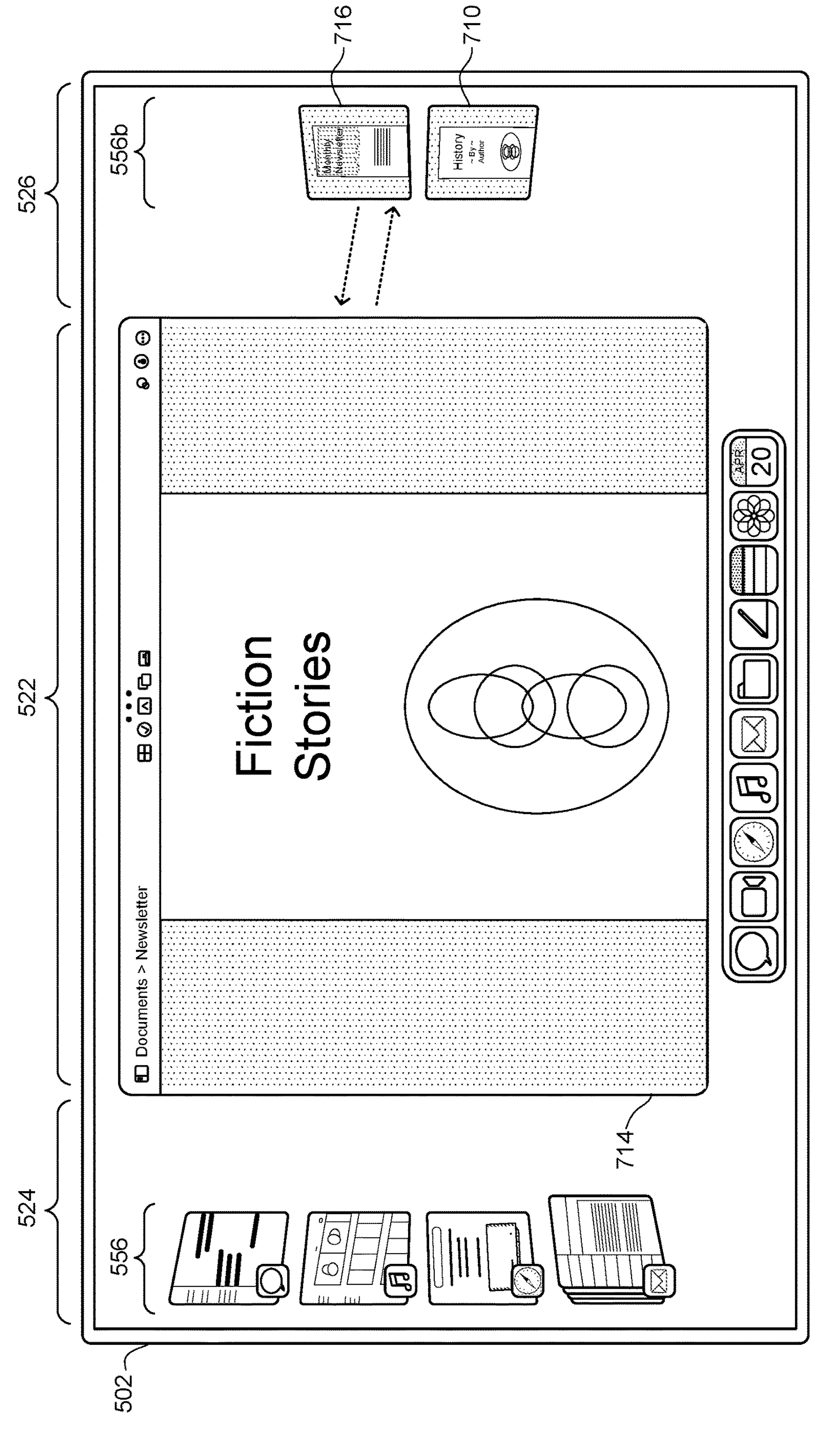
Figure 7D:
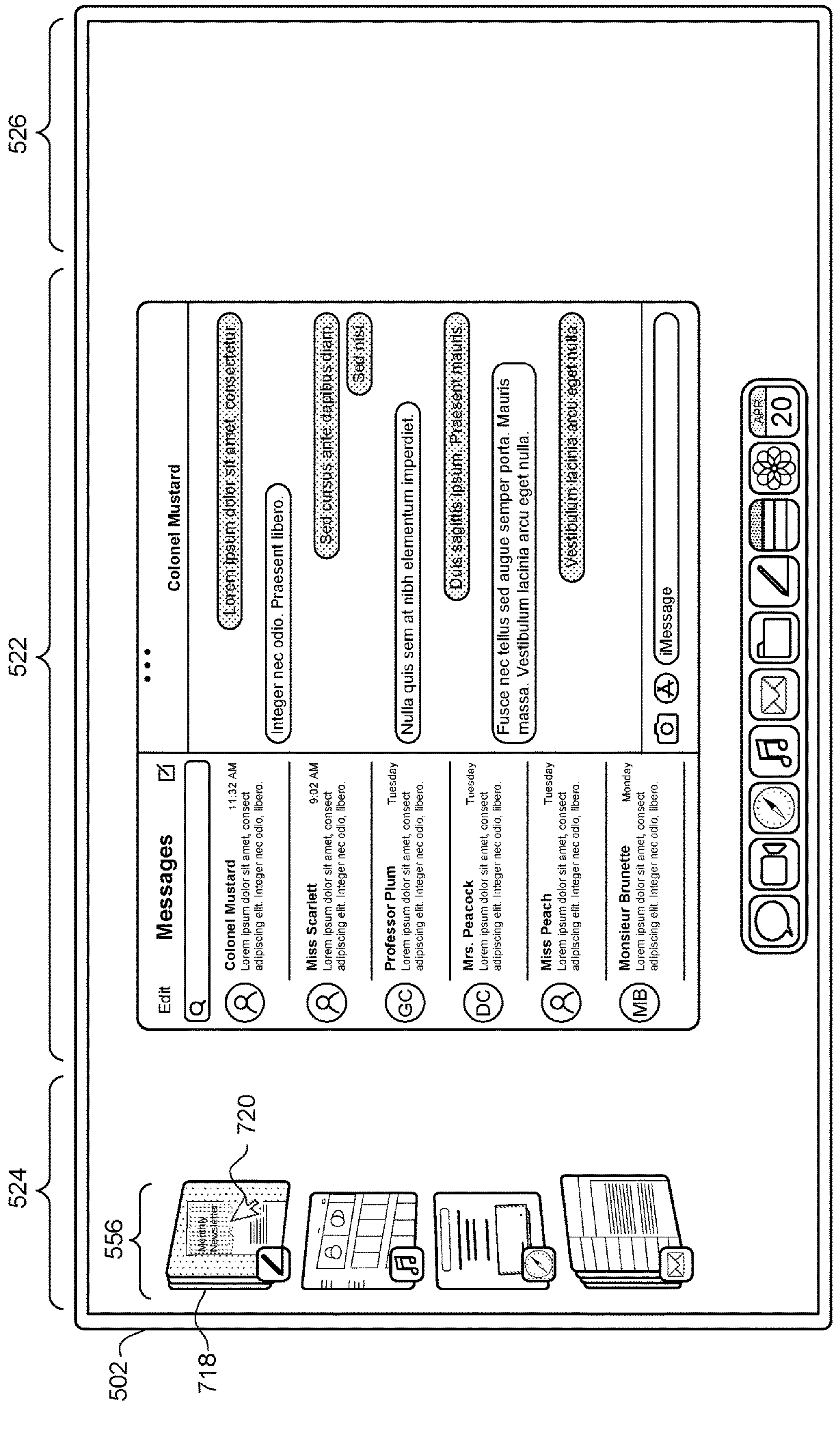
Figure 7E:
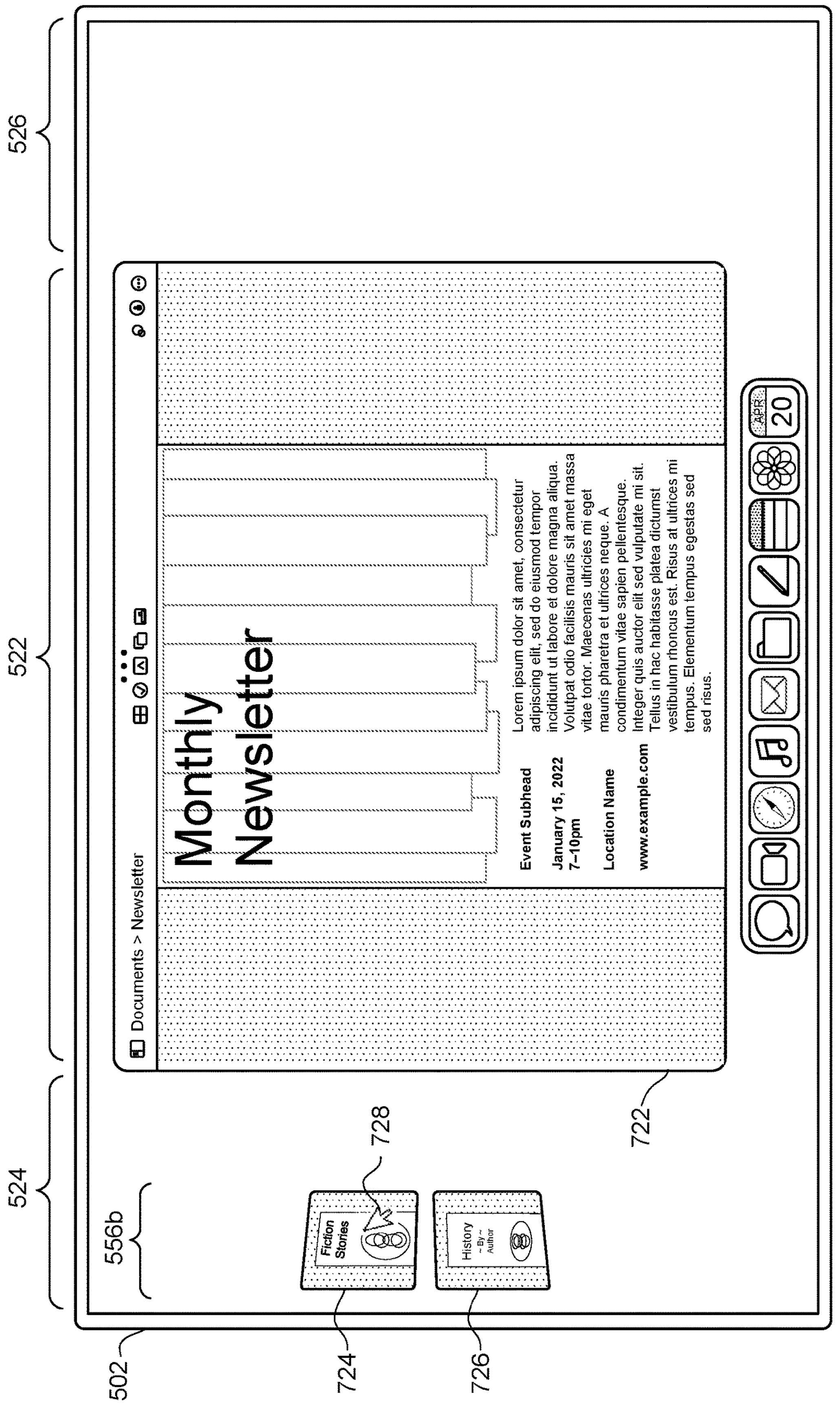
Figure 7F:
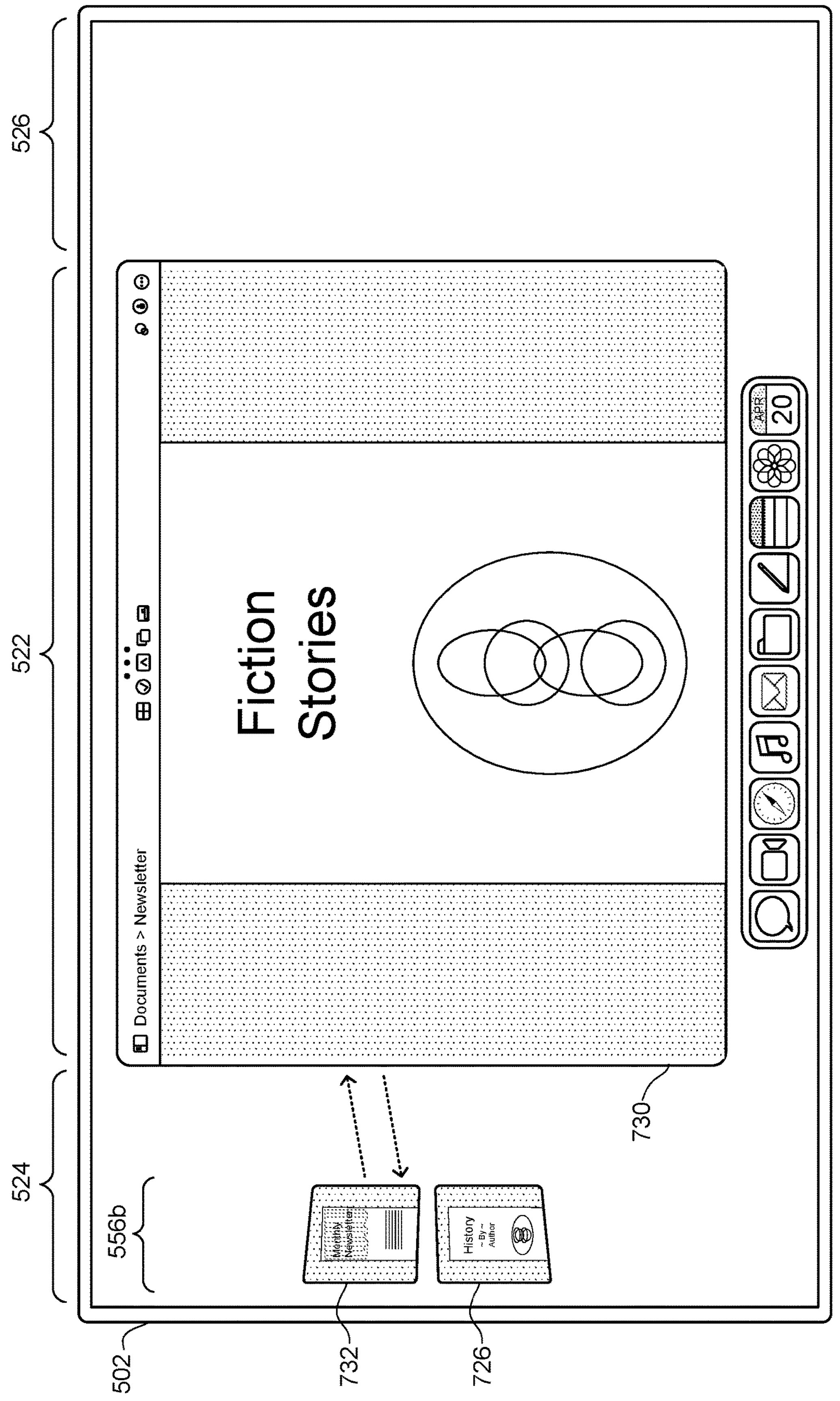
Figure 7G:
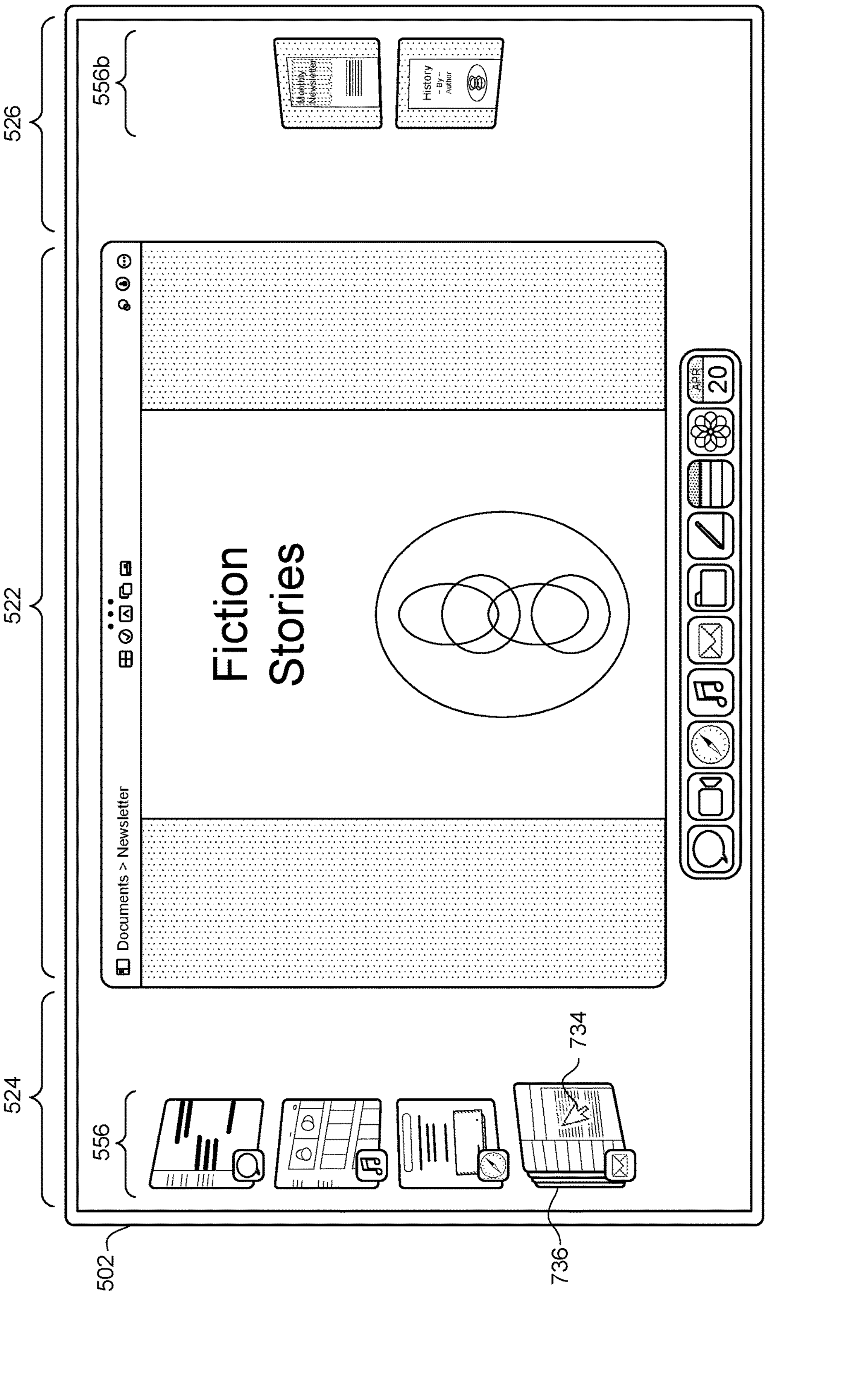
Figure 7H:
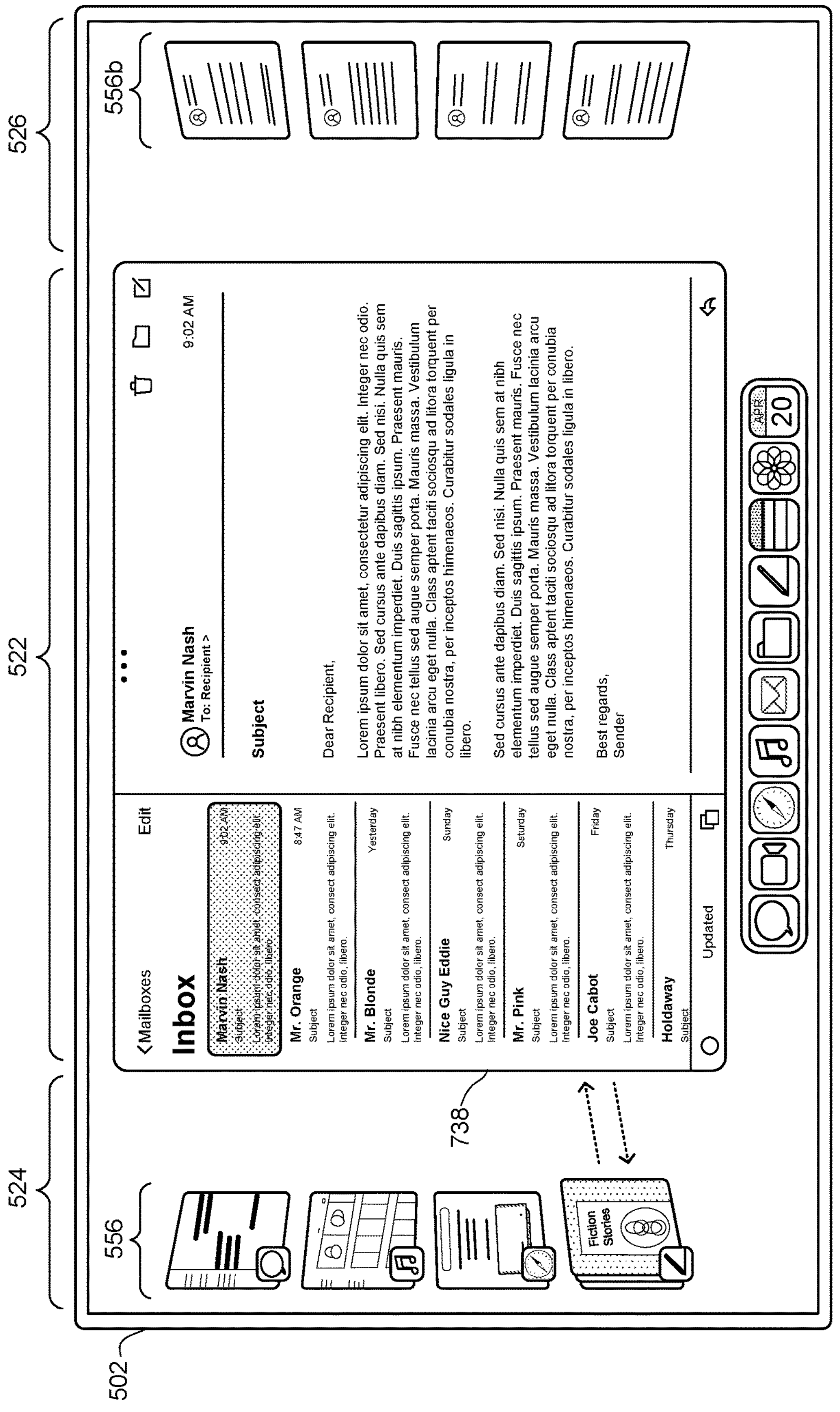
Figure 7I:
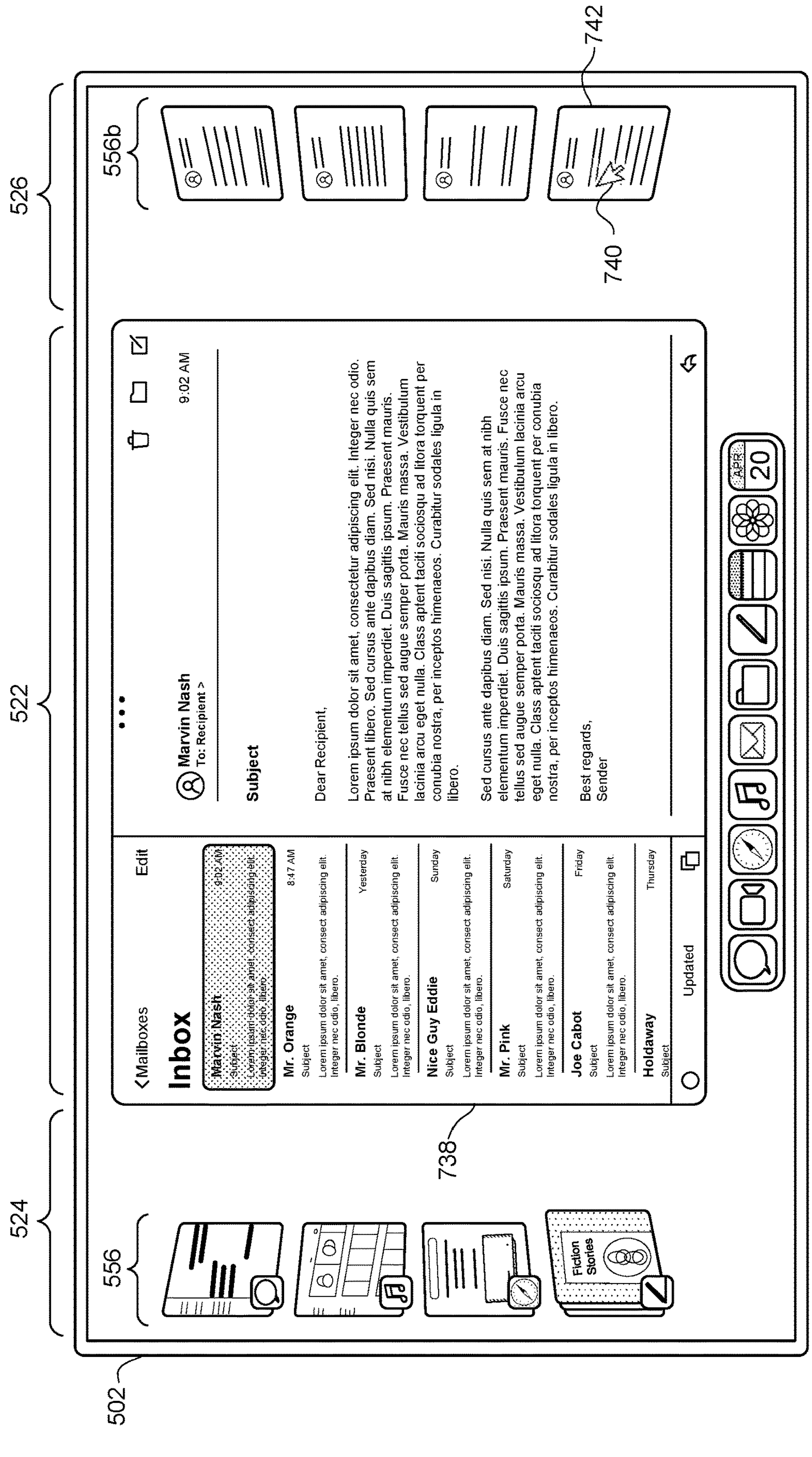
Figure 7J:
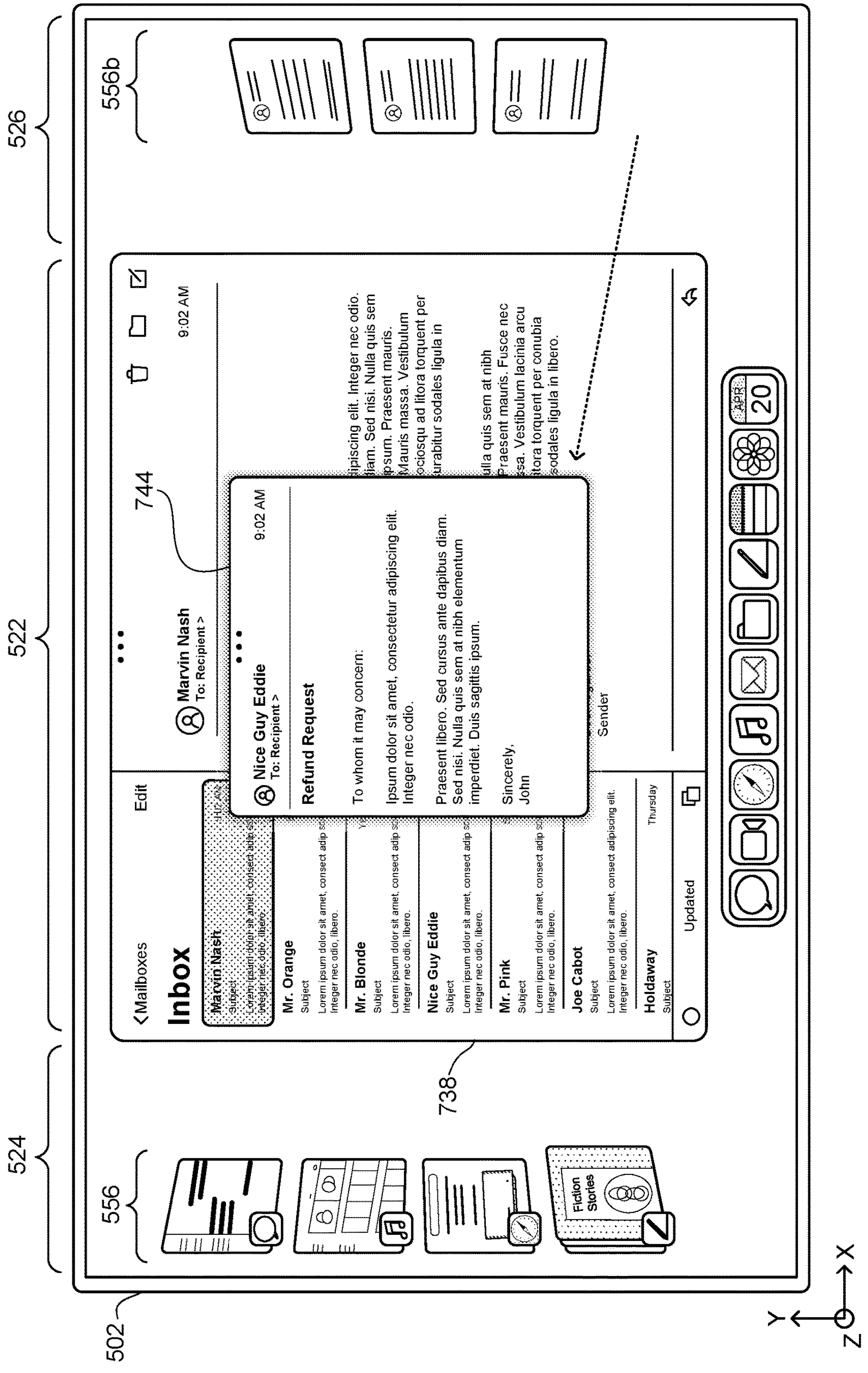
Figure 7K:
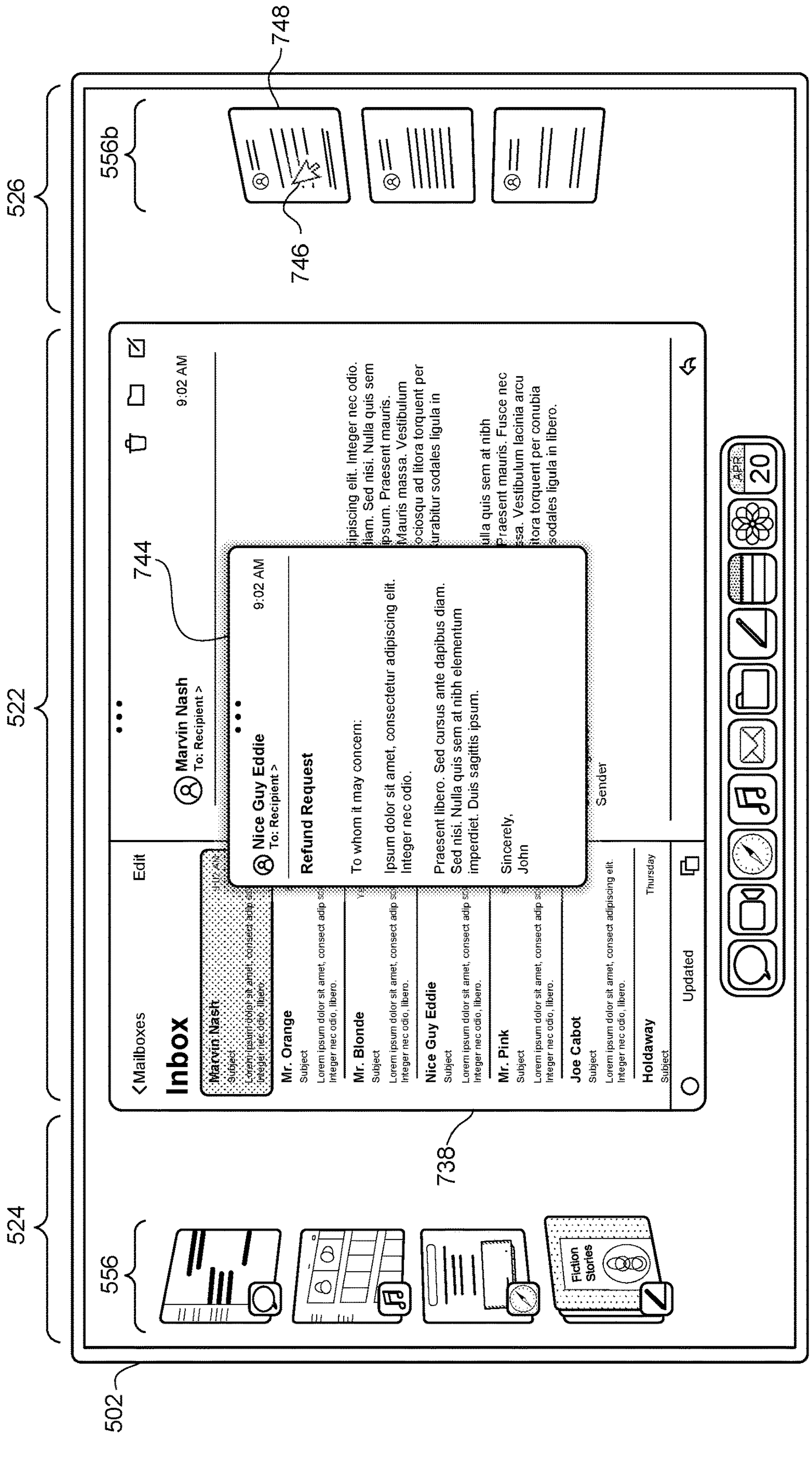
Figure 7L:
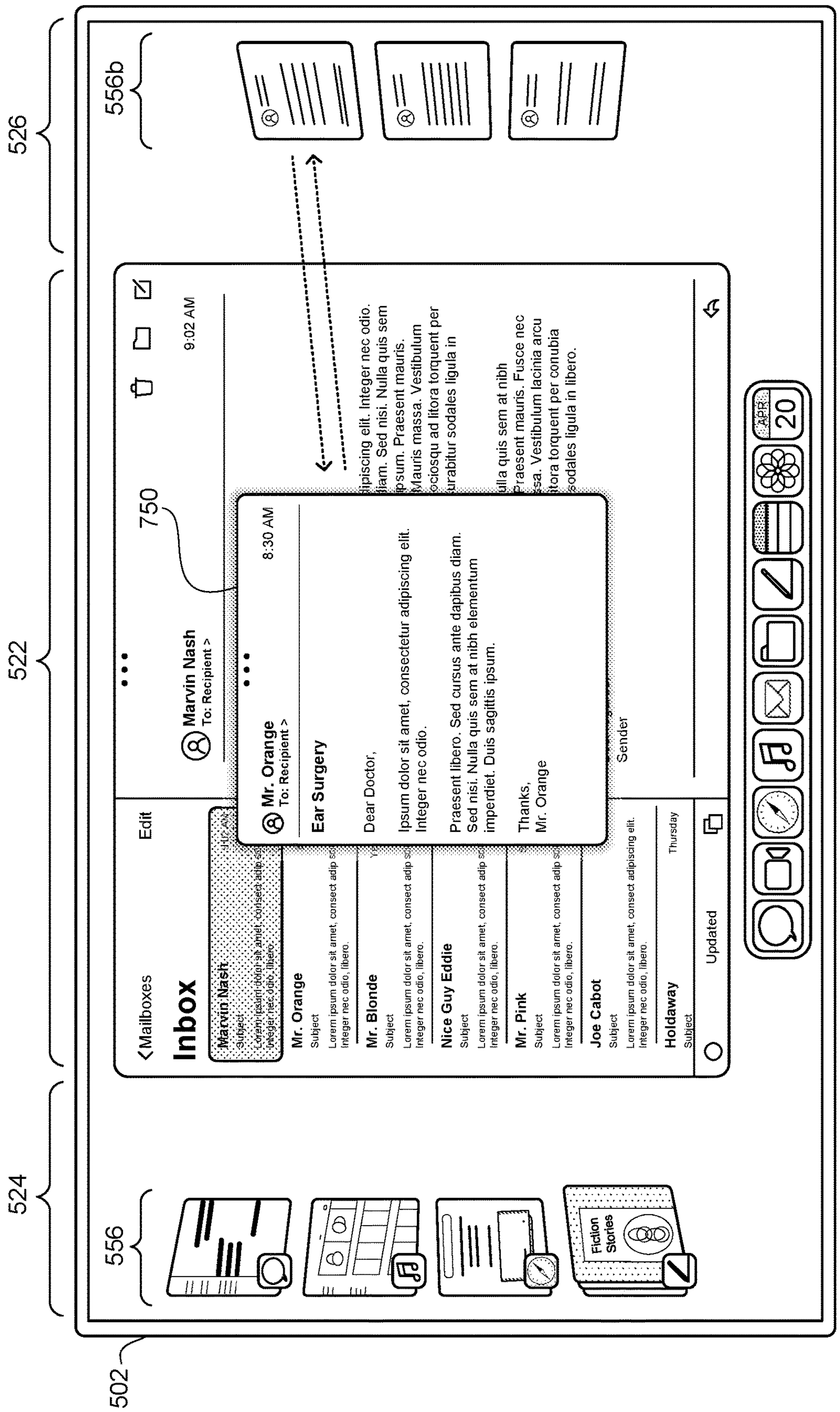
Figure 7M:
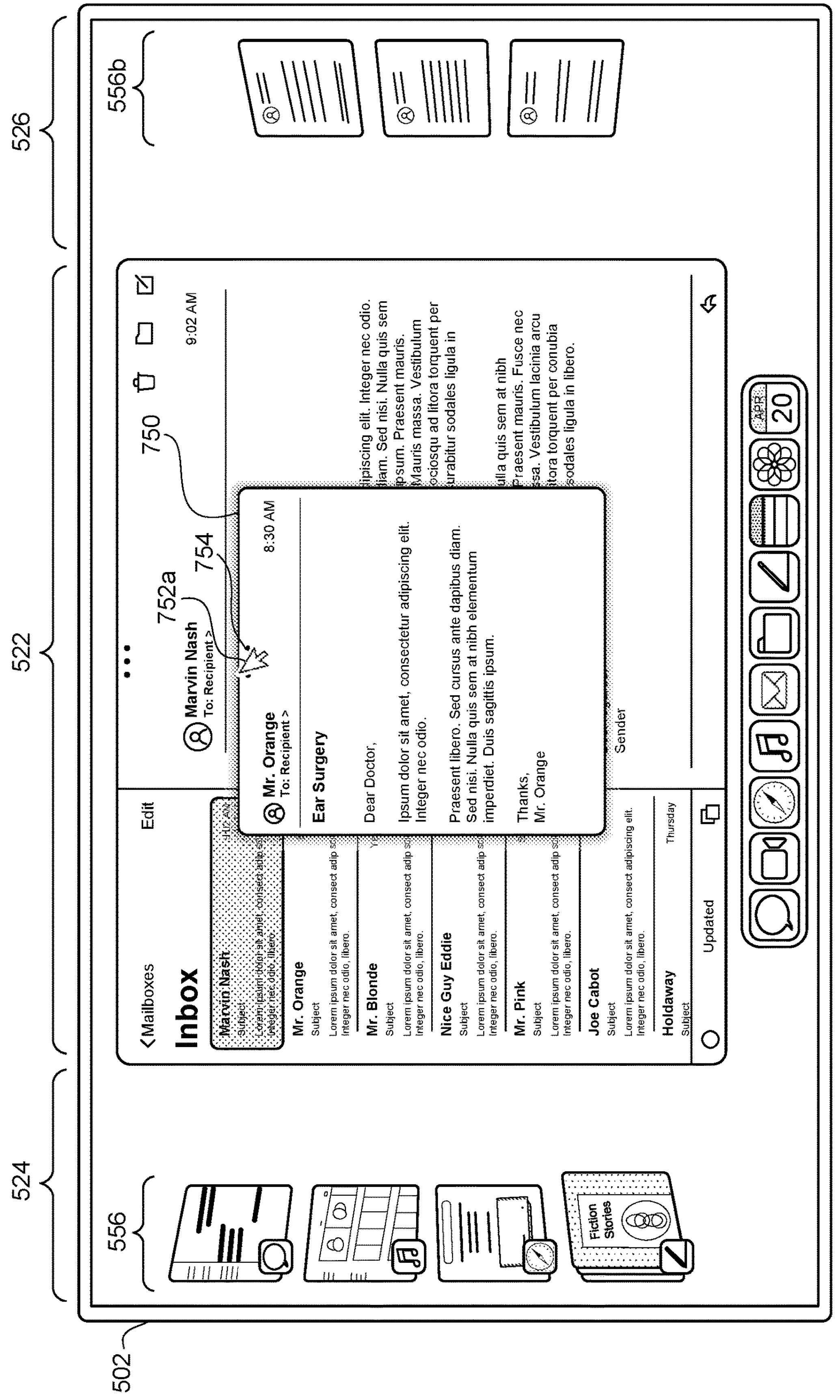
Figure 7N:
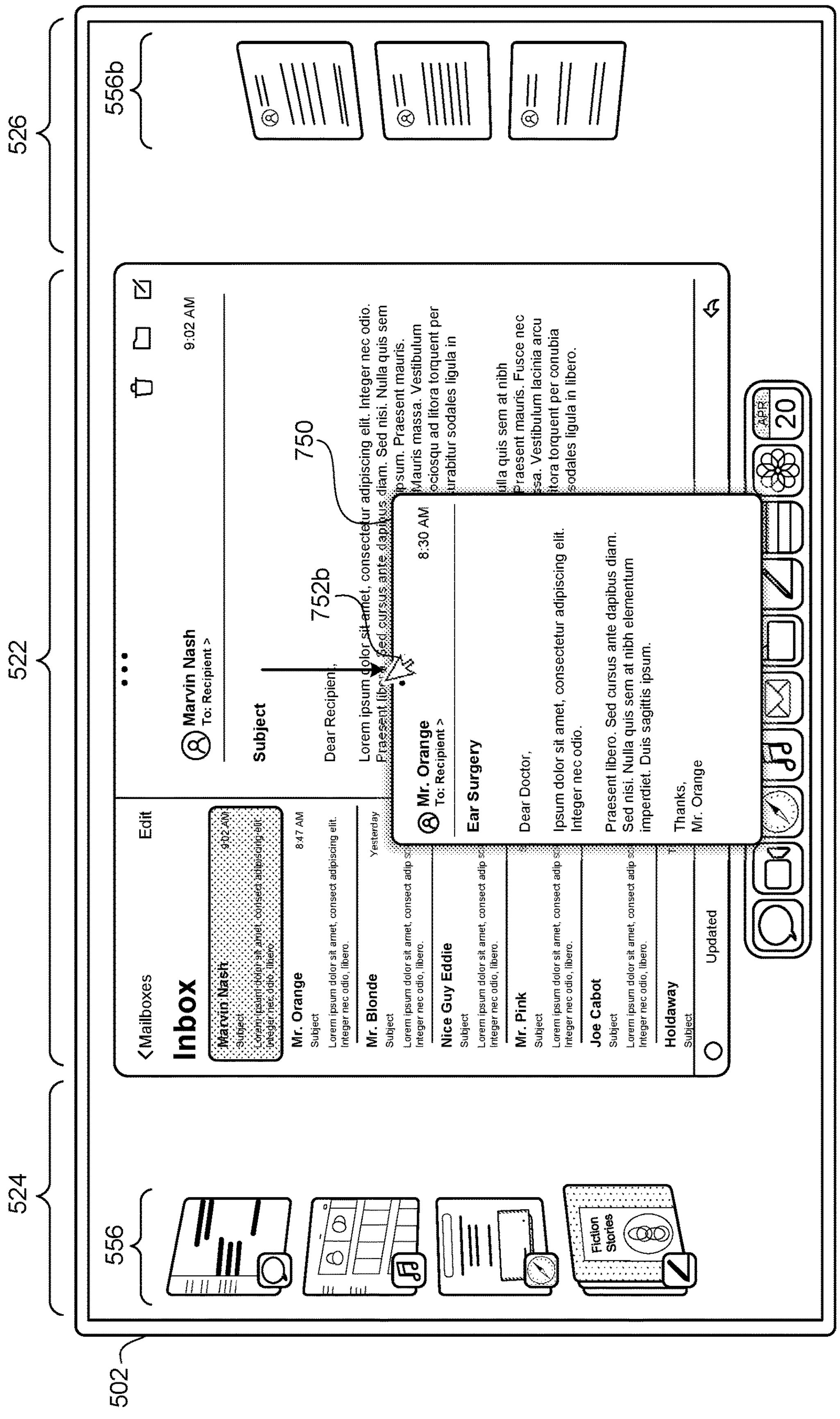
Figure 7O:
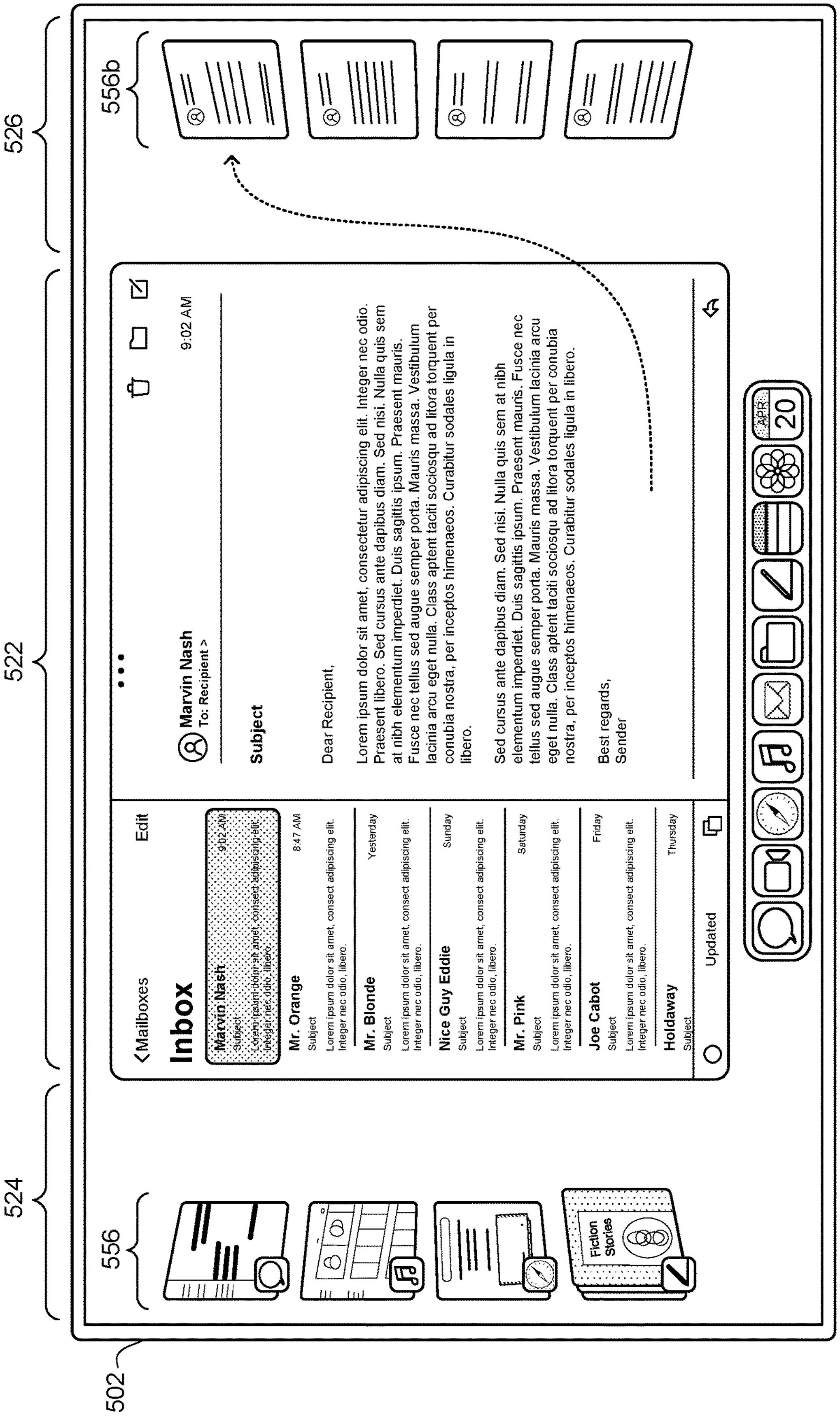
Figure 7P:
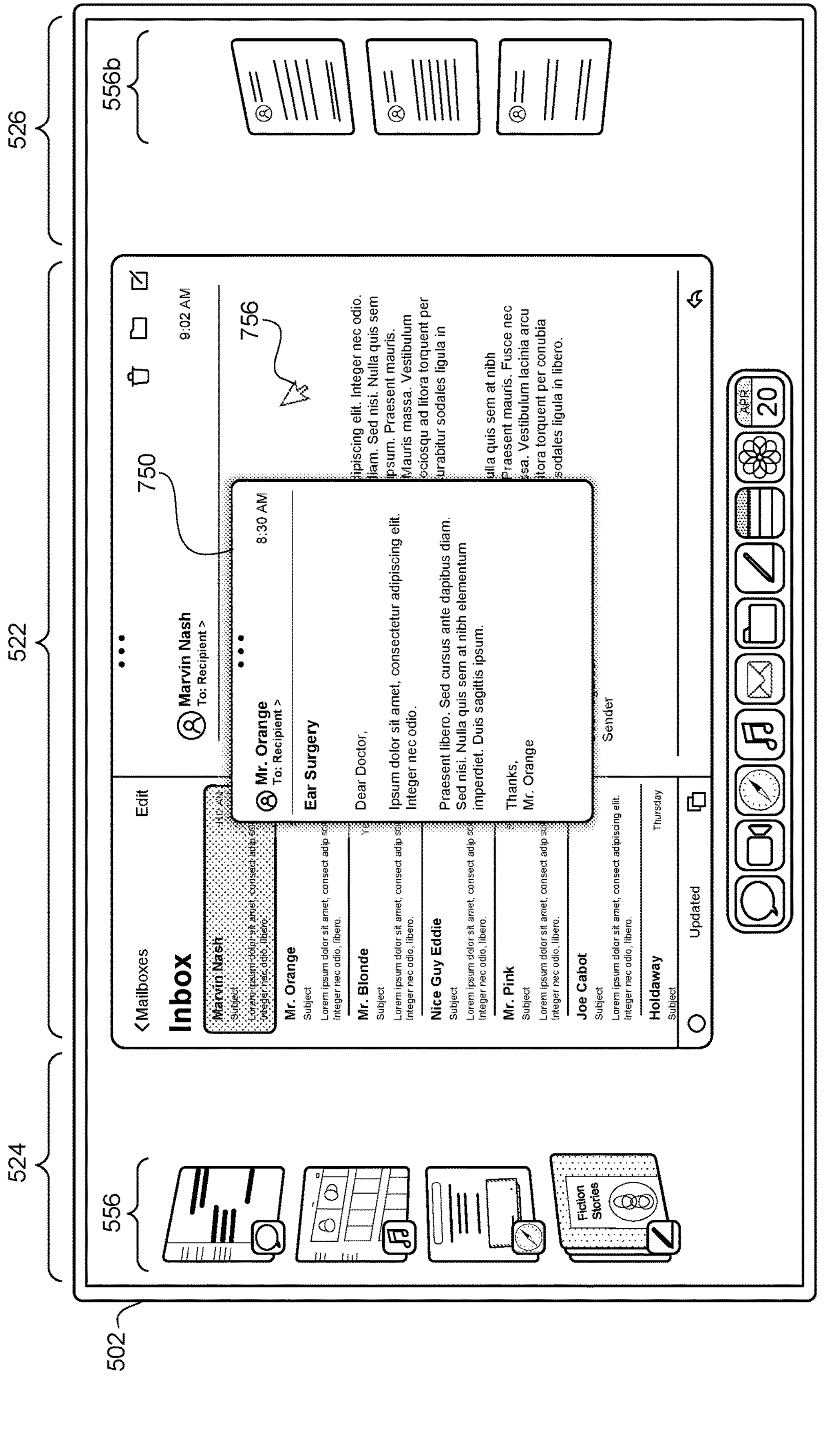
Figure 7Q:
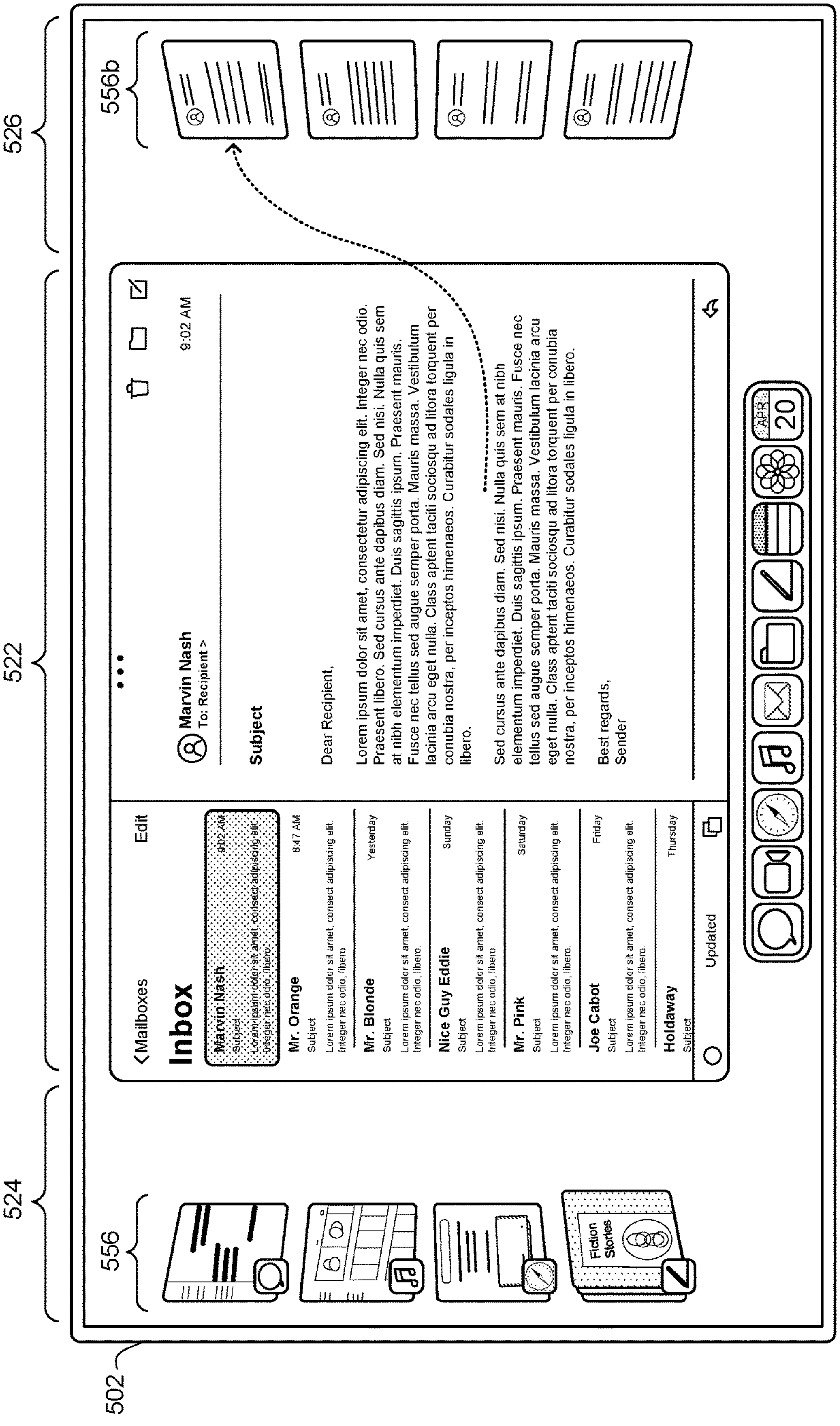
Figure 7R:
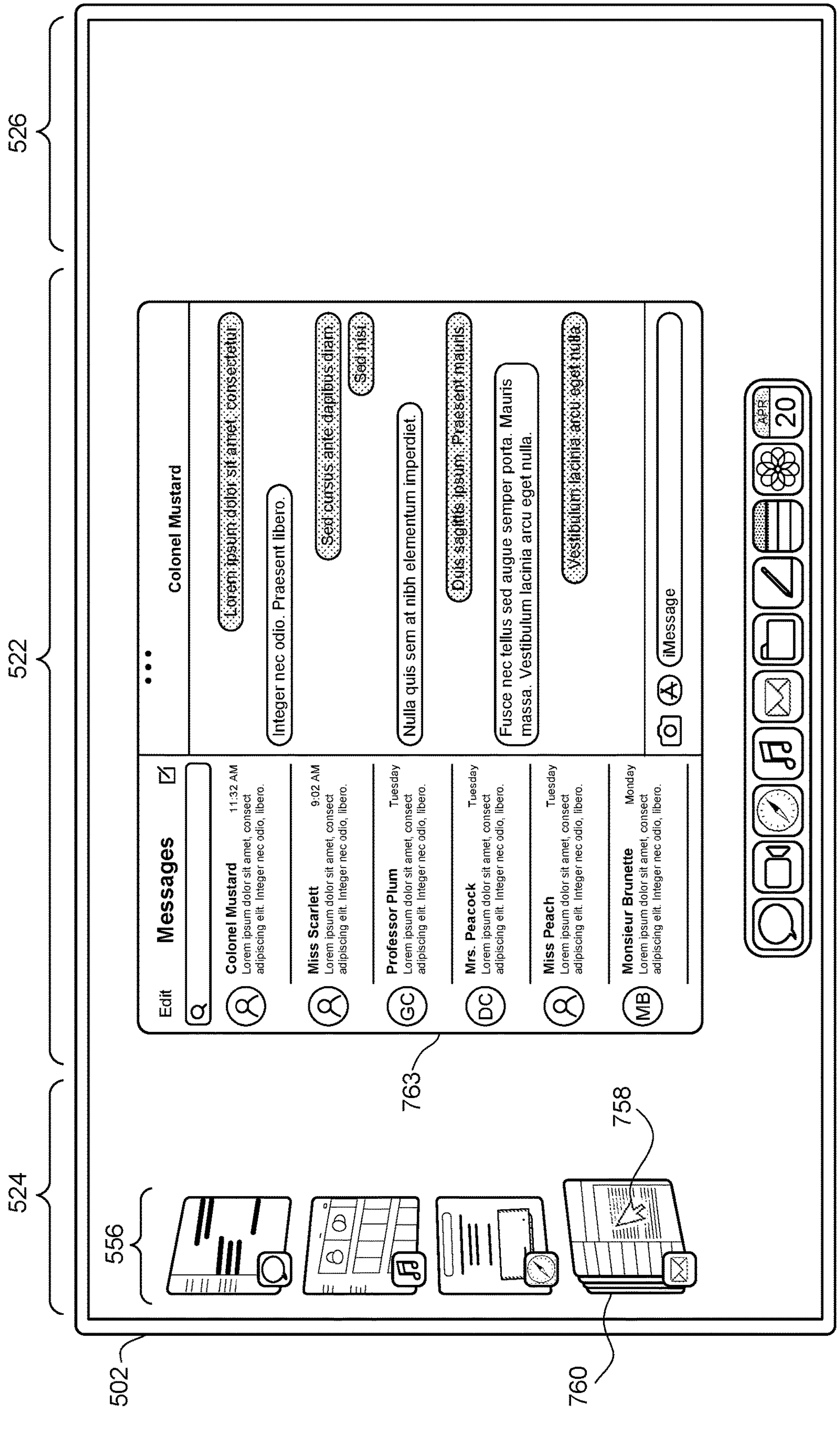
Figure 7S:
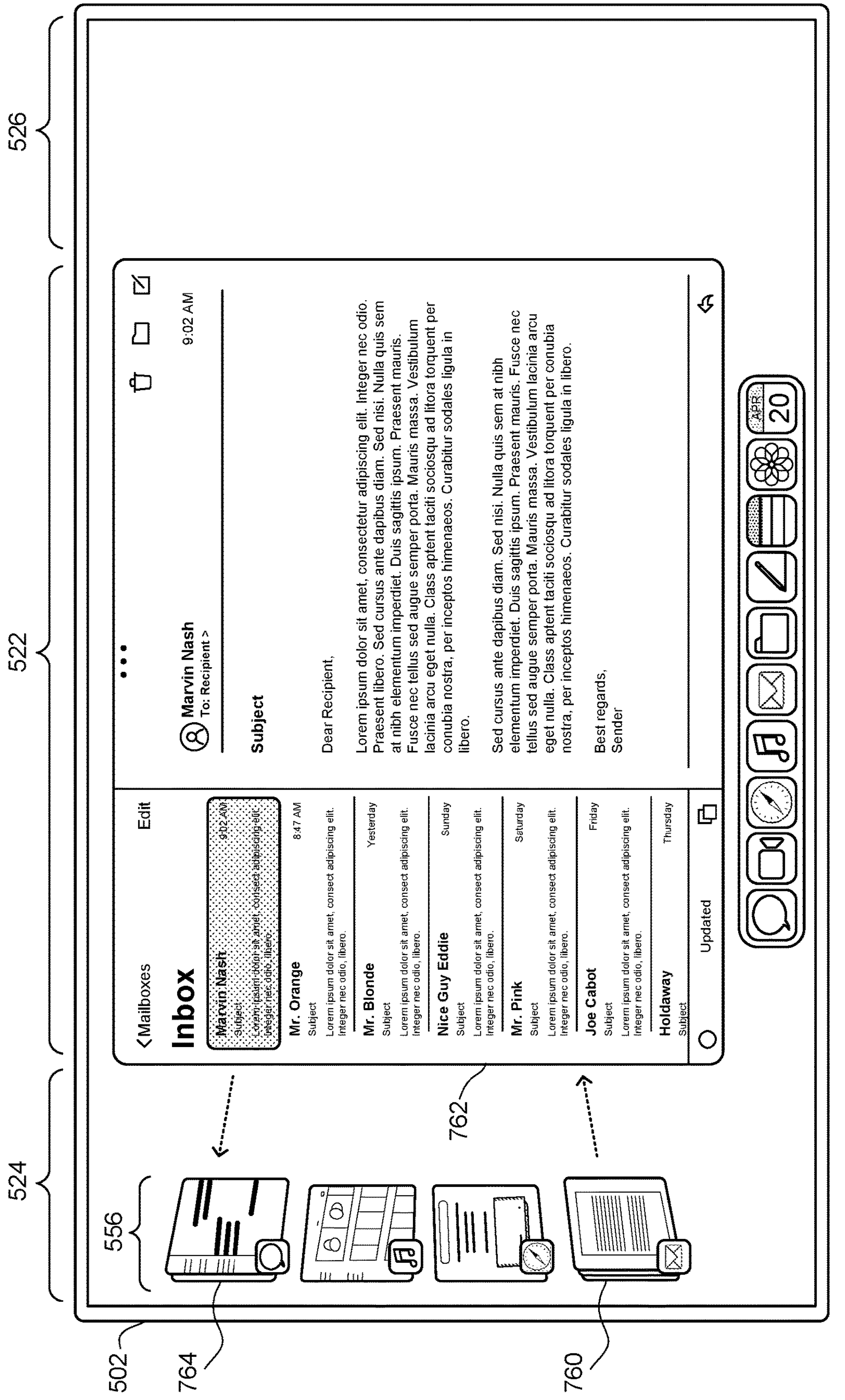
Figure 7T:
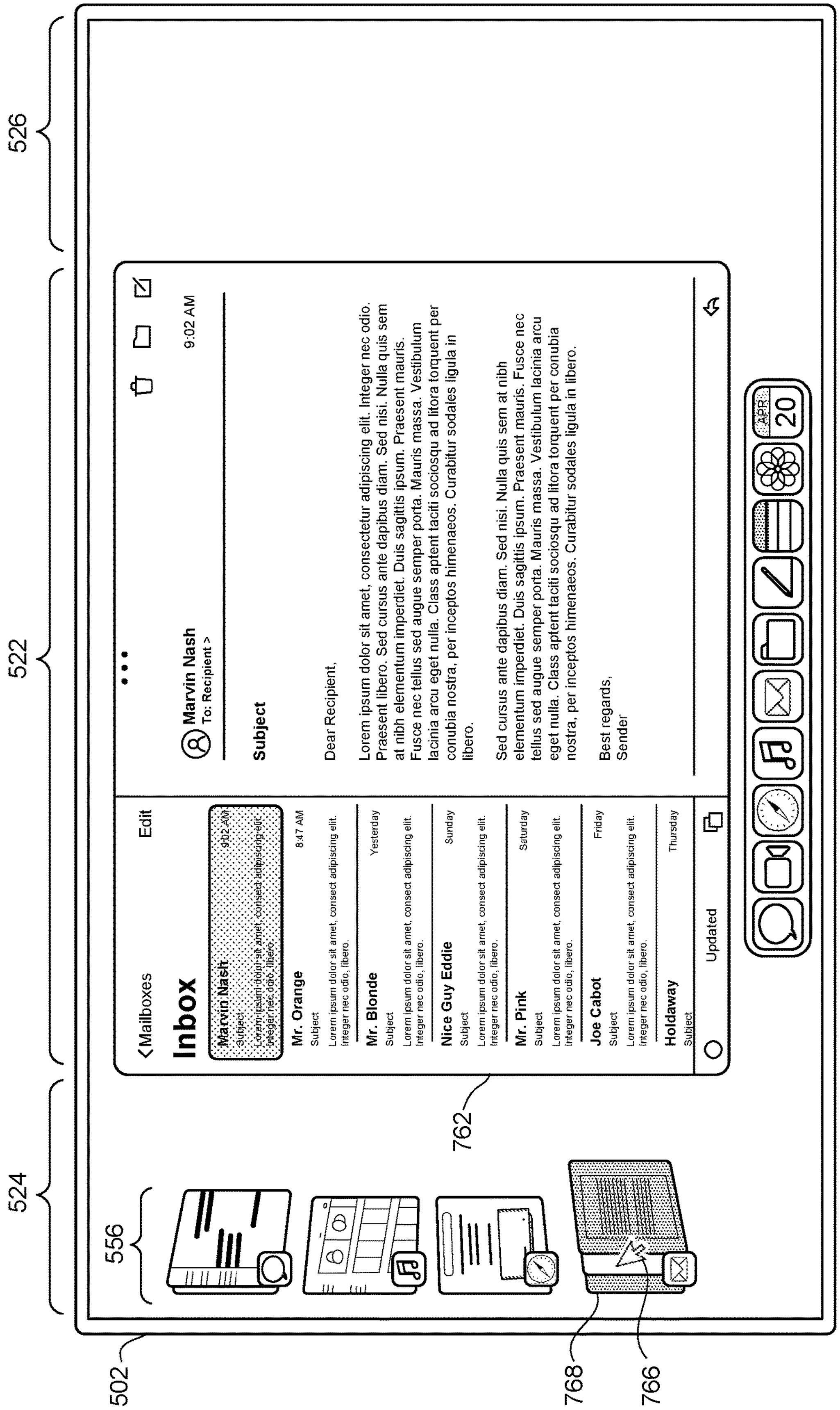
Figure 7U:
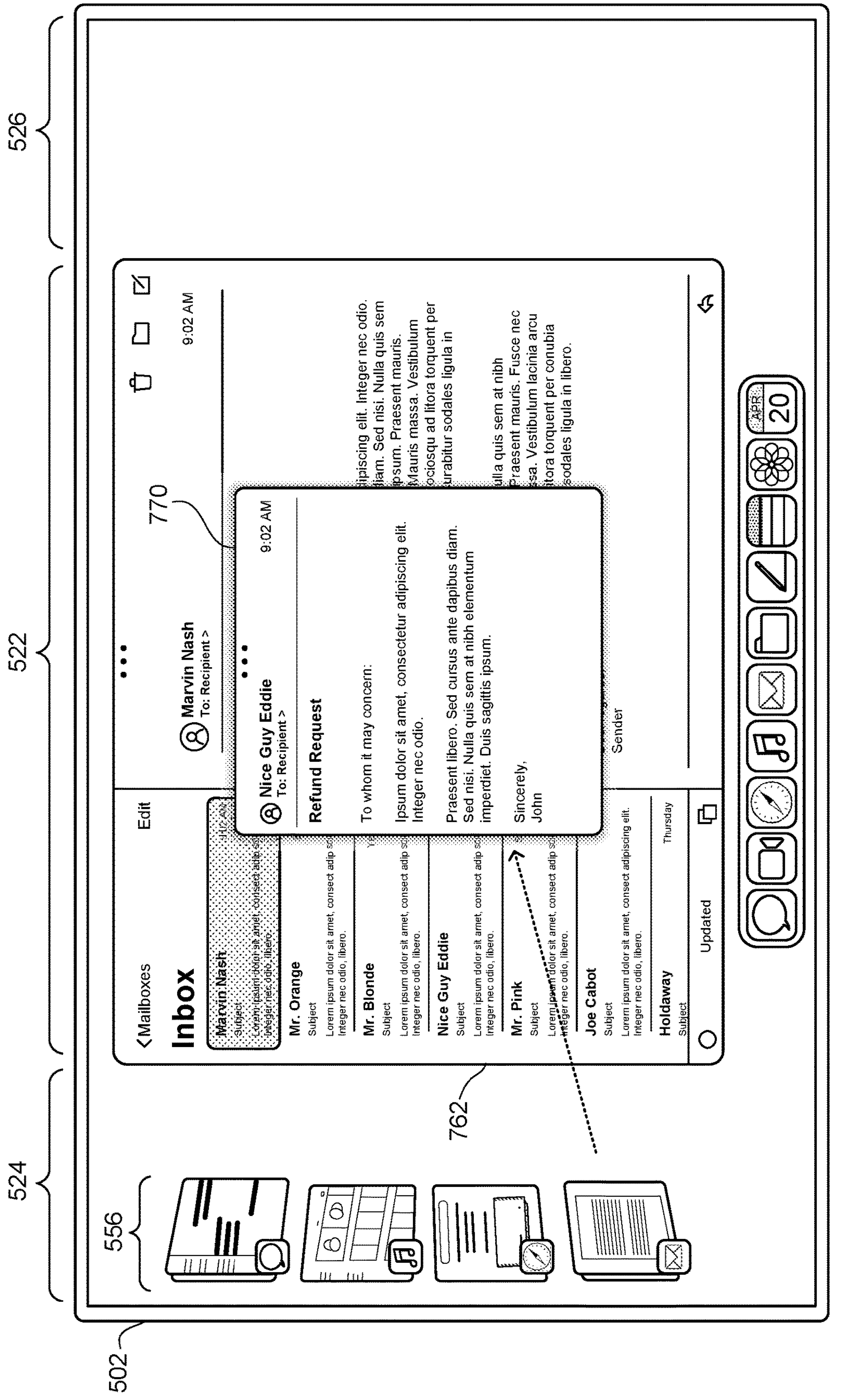

FIGS. 7A-7U illustrate concentration mode features involving application piles, in accordance with some embodiments.

In FIGS. 7A-7C, a representation of a window grouping is selected, causing a window to be opened in the stage region and representations of other windows in the window grouping to be opened in a secondary strip. Specifically, in FIG. 7A, a single position in the strip 556 includes a window grouping representation 702 of representations of word processor windows. In FIG. 7A, user input 704 selects the window grouping representation 702, which causes one word processing window 706 to open in the stage region and the other word processing windows to open as distinct window representations 708 and 710 in a secondary strip 556*b* positioned on the side of the stage region opposite strip 556, as shown in FIG. 7B. In some embodiments, the window that opens in the stage region is the most recently used window from the windows grouping selected. In some embodiments, the window that opens in the stage region is based on the last configuration of windows for the group of windows represented by the selected windows grouping. In some embodiments, the windows corresponding to window representations that would otherwise be shown in the secondary strip are opened in the stage region in addition to the window currently in the stage region. In some embodiments, windows corresponding to the window representations that are shown in the secondary strip replace the window currently in the stage region. For example, in FIG. 7B, user input 712 selects window representation 708 in the secondary strip 556*b*, which causes a second word processor window 714 to open in the stage region 522, replacing window 706, as shown in FIG. 7C. Window 706 automatically moves to the secondary strip 556*b*, in the form of a window representation 716, and in a position determined by any of the orders described above with reference to FIGS. 6A-6H. In some embodiments, more than one window represented in a window grouping may open in the stage region 522, depending on the last configuration of the group of windows represented by the selected window grouping.

In FIGS. 7D-7F, a representation of a window grouping is selected, causing a window to be opened in the stage region and representations of other windows in the window grouping to replace the other representations in the strip 556. In this embodiment, there is no secondary strip. Specifically, in FIG. 7D, a single position in the strip 556 includes a window grouping representation 718 of word processor windows. In FIG. 7D, user input 720 selects the window grouping representation 718, which causes one word processor window 722 to open in the stage region and the other word processor windows to open as distinct window representations 724 and 726 in secondary strip 556*b*, replacing the representations in strip 556 as shown in FIG. 7E. Stated another way, strip 556 is replaced with secondary strip 556*b*. In some embodiments, the window that opens in the stage region is the most recently used window. In some embodiments, the window that opens in the stage region is based on the last configuration of windows for the group of windows represented by the selected window grouping. The window grouping representations in the secondary strip may be opened in the stage region in addition to the window currently in the stage region, or by replacing the window currently in the stage region. For example, in FIG. 7E, user input 728 selects representation 724 in the secondary strip 556*b*, which causes a second word processor window 730 to open in the stage region 522, replacing window 722, as shown in FIG. 7F. Window 722 automatically moves to the secondary strip 556*b*, in the form of window representation 732, and in a position determined by any of the orders described above with reference to FIGS. 6A-6H. In some embodiments, more than one window represented in a window grouping may open in the stage region 522, depending on the last configuration of the group of windows associated with the window grouping representation.

In FIGS. 7G-7L, a window grouping representation of a parent window and child windows of an application is selected, causing the parent window to be opened in the stage region and representations of the child windows to be opened in the secondary strip, while subsequent selections of child windows causes the child windows to overlay the parent window. The parent window of a given application may be a primary application window, from which secondary windows may be opened, whereby the closing of a secondary window does not affect other windows of the given application, but the closing of the primary window would close a plurality of or all of the windows of the given application. In one example, the parent window is a primary mail application including a list of emails and status information, and the child windows are individual mail items or messages being composed. In another example, the parent window is a primary messages application including a list of messages and status information, and the child windows are individual message conversations.

In FIG. 7G, user input 734 selects a mail window grouping representation 736 in strip 556, causing primary mail window 738 to open in stage region 522 and secondary mail window representations to open in secondary strip 556*b*, as shown in FIG. 7H (and causing the previously open word processor windows in the stage region and secondary strip to be replaced, moving them to a word processor window grouping in the strip 556). In FIG. 7I, user input 740 selects one of the child mail window representations 742, causing a child window 744 to open in the stage region 522, overlaying the primary window 738, as shown in FIG. 7J. In some embodiments, the child window is graphically rendered to appear as if it is above the primary window in the Z axis (with the X and Y axes being the width and height of the display). In FIG. 7K, user input 746 selects another child window representation 748, causing a second child window 750 to replace the first child window 744 in stage region 522, as shown in FIG. 7L. In some embodiments, the second child window 750 does not replace the first child window 744; rather, both child windows remain in stage region 522.

FIGS. 7M-7Q illustrate embodiments for minimizing a child window back to the secondary strip. In some embodiments, the child window may be minimized with a click-and-drag user input. Specifically, in FIG. 7M, user input 752*a* selects an affordance 754 on child window 750, and in FIG. 7N, user input 752*b* drags (while selected) the child window toward the bottom of the display (or towards the secondary strip) and releases the affordance, causing the child window 750 to be moved (in the form of a window representation) back to the secondary strip, as shown in FIG. 7O (in a most recently used order or in a replacement order as described above). In some embodiments, referring to FIG. 7P, while child window 750 is open in stage region 522, user input 756 clicks, selects, taps, or otherwise interacts with any area of the display outside of child window 750, which causes child window 750 to be moved (in the form of a window representation) back to the secondary strip, as shown in FIG. 7Q (in a most recently used order or in a replacement order as described above).

FIGS. 7R-7U illustrate embodiments for interacting with groups of windows (e.g., parent and child windows) in concentration mode configurations in which there is no secondary strip opposite strip 556. In FIG. 7R, user input 758 selects a mail application window grouping representation 760, which causes one mail window 762 from window grouping 760 to open in stage region 522, while the rest of the windows in the window grouping remain in the window grouping, as shown in FIG. 7S. In addition, opening mail window 762 to the stage region 522 causes the window previously open in stage region 522 (window 763, FIG. 7R) to be moved back to its window grouping 764 in strip 556. In some embodiments, user input 758 in FIG. 7R causes more than one window from the window grouping to open in stage region 522, depending on the last window configuration associated with the window grouping. In some embodiments, user input 758 in FIG. 7R causes the most recently used window associated with the window grouping to open in stage region 522. In some embodiments, user input 758 in FIG. 7R causes the parent window to open in stage region 522, even if the parent window was not the most recently used window associated with the window grouping.

In FIG. 7T, user input 766 selects an individual window representation from the representation of the window grouping 768 (by, in some embodiments, hovering over the window grouping, waiting for the representations in the window grouping to expand, and then selecting the desired representation), which causes a child window 770 to open in stage region 522, overlaying window 762, as shown in FIG. 7U.

FIGS. 8A-8L illustrate user inputs for configuring window sizes in the concentration mode embodiments described above.

Figure 8A:
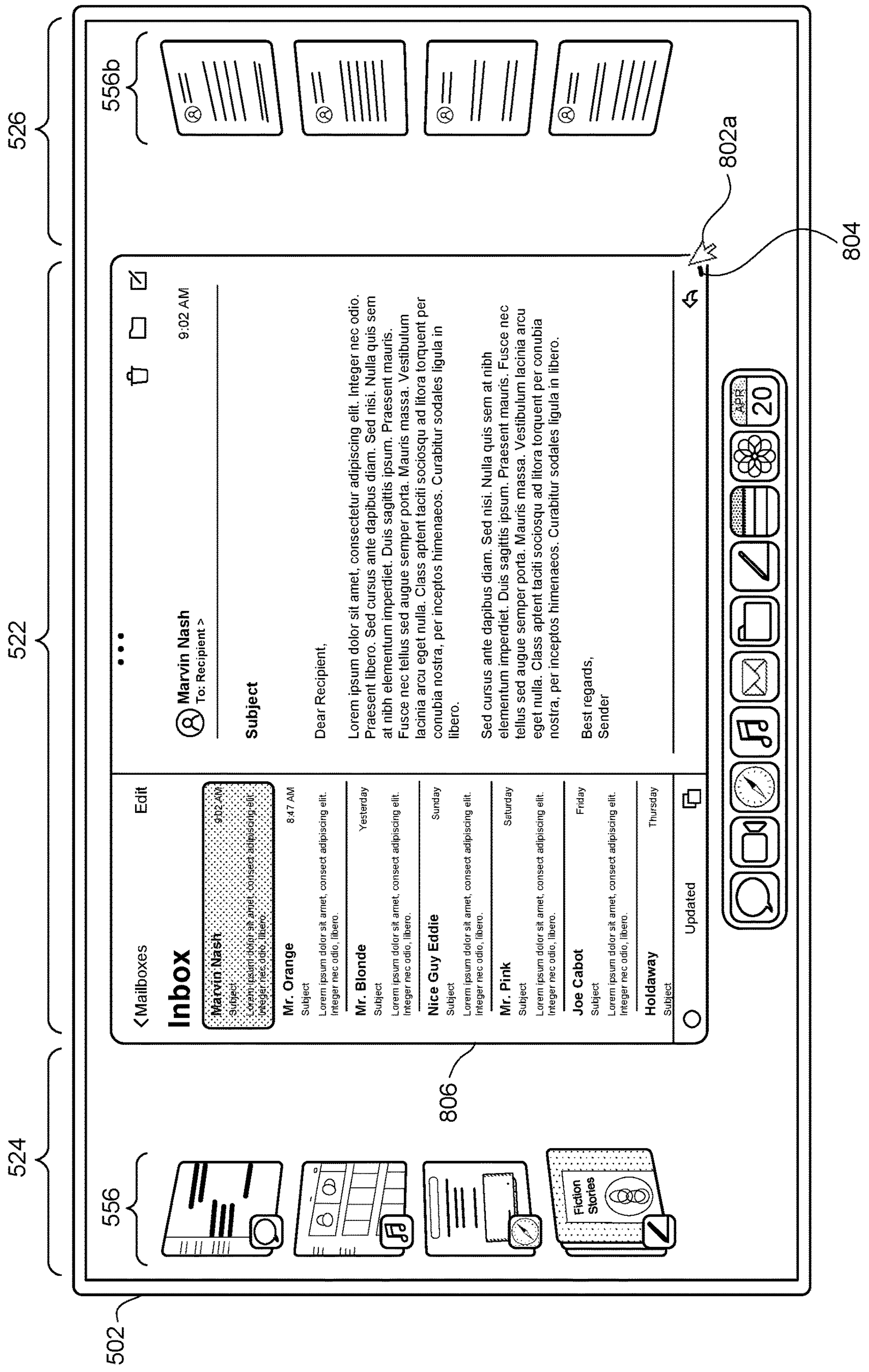
Figure 8B:
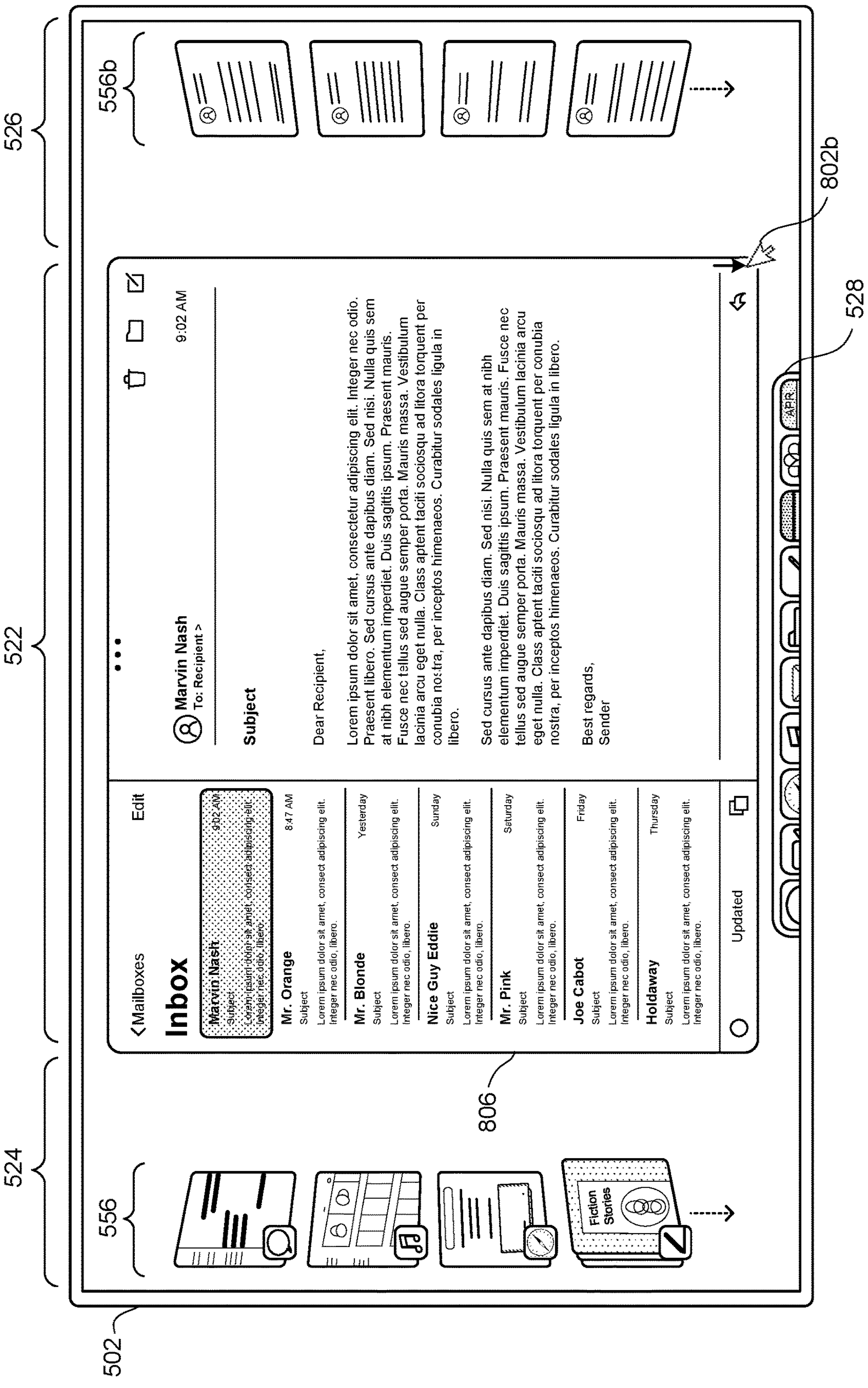
Figure 8C:
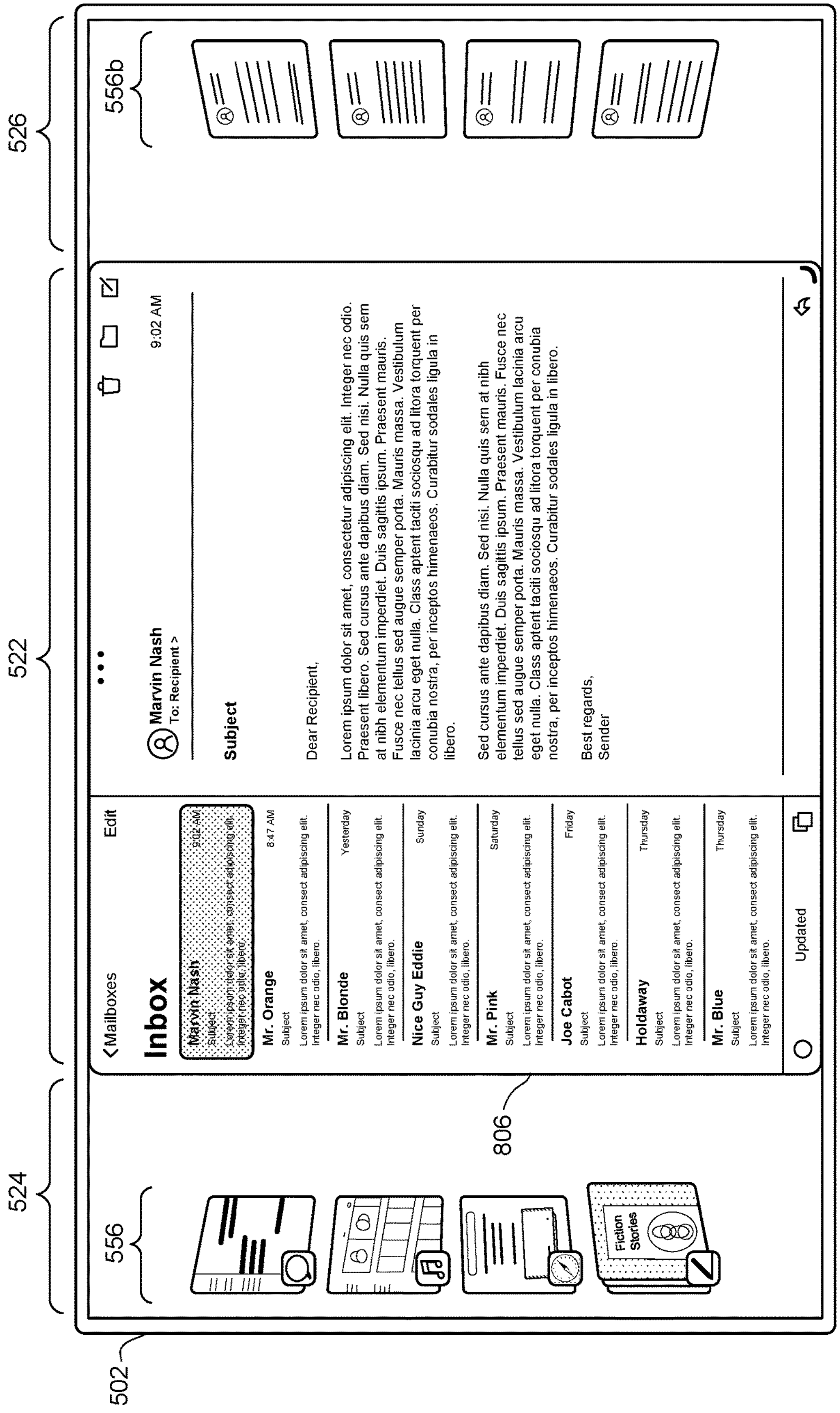

In FIGS. 8A-8G, the window in the stage region 522 may be resized in accordance with some embodiments. This allows the concentration mode to support window sizes that are optimized for different display devices, and window content in resized windows to scale or be rearranged as designed by a developer. Specifically, in FIG. 8A, user input 802*a* selects a window resize affordance 804 on window 806 in stage region 522. In some embodiments, window resize affordances may be located on one or more corners of a given window. In some embodiments, selection of an affordance is not required for resizing a given window; instead, any corner or edge of the window may be selectable for purposes of resizing the window. In FIG. 8B, user input 802 drags the window resize affordance down, which concurrently causes: the bottom of window 806 to move downward, the top of window 806 to move upward, main strip 556 and secondary strip 556*b* to move toward the midpoint of the display, and the dock 528 to move down and off the screen. In some embodiments, if the user input 802*b* in FIG. 8B is released before reaching the bottom of the display, and if the user input moves the resize affordance to within a threshold distance from the bottom of the display, then the bottom of window 806 snaps to the bottom of the display and the top of window 806 snaps to the top of the display, as shown in FIG. 8C. In some embodiments, the top and bottom of window 806 snap to respective positions that are closest to predetermined resize positions upon release of user input 802*b*. In some embodiments, the predetermined resize positions are determined based on a grid of resize points or lines. In some embodiments, the top and bottom of window 806 remain where they are upon release of the user input 802*b*. In some embodiments, the window contents of window 806 continuously rearrange and/or rescale as the window is being resized.

Figure 8D:
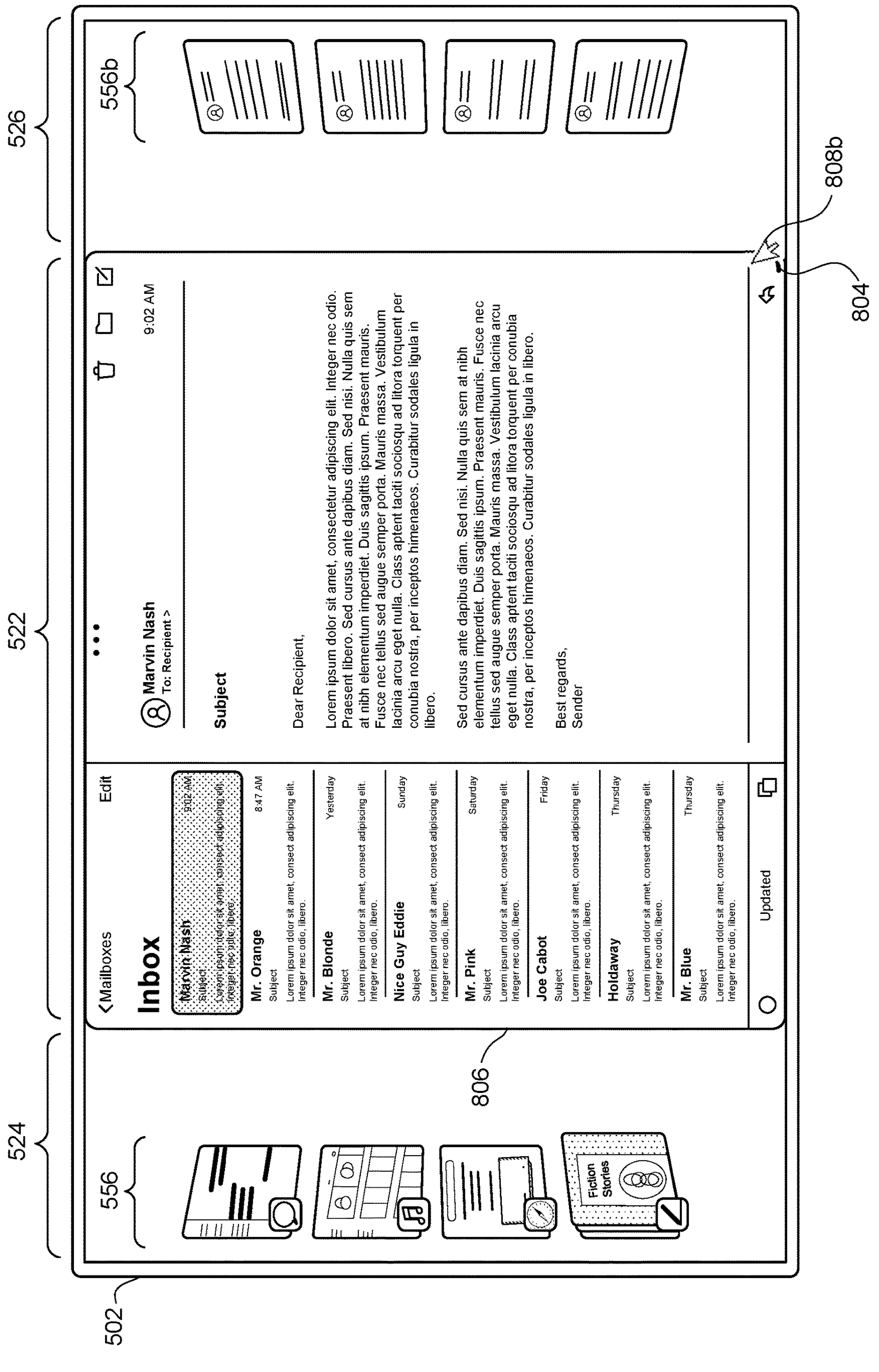
Figure 8E:
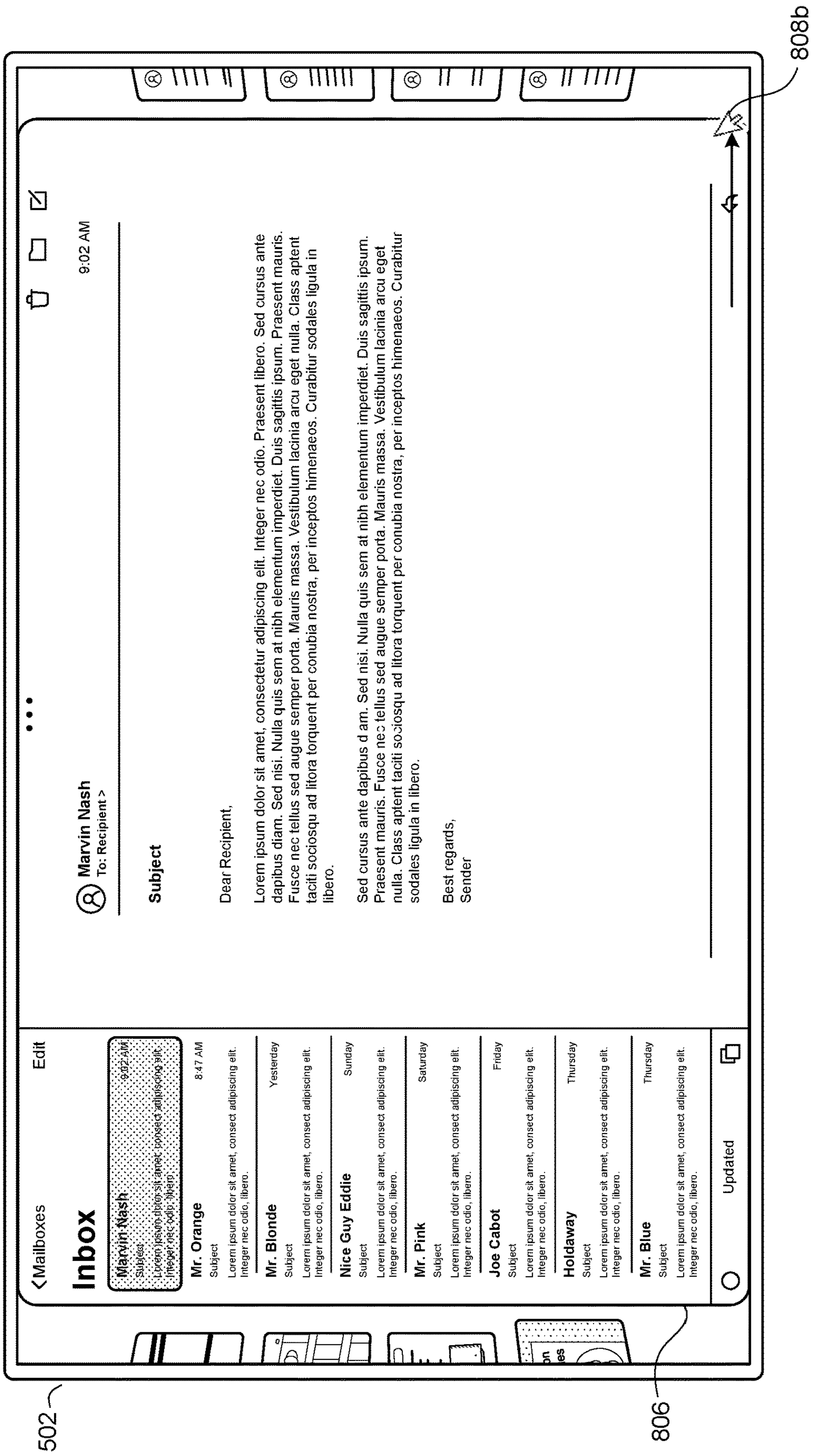
Figure 8F:
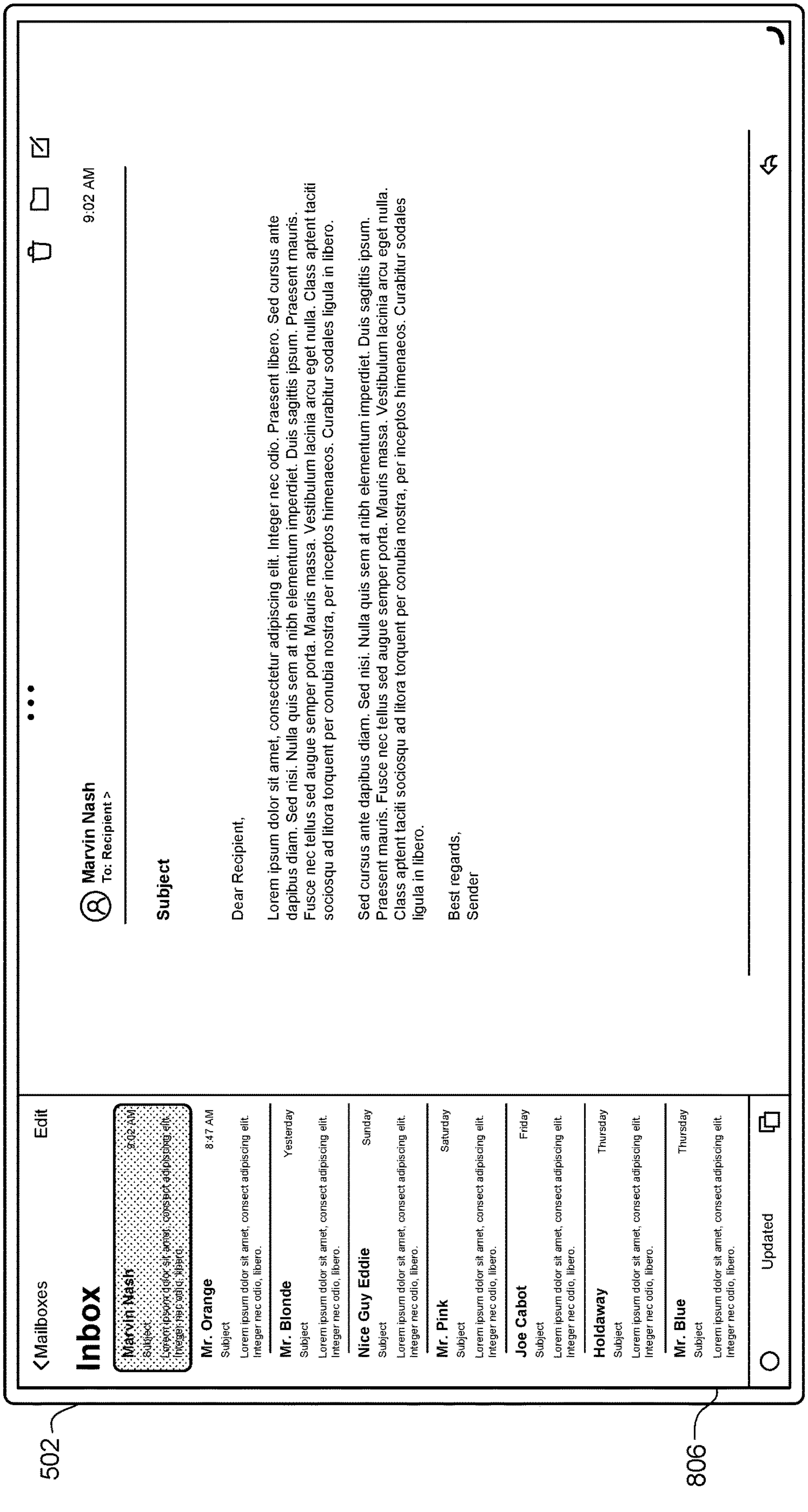

In FIG. 8D, user input 808*b* selects window resize affordance 804 (or any corner or edge) of window 806 in stage region 522. In FIG. 8E, user input 808*b* drags the window resize affordance (or corner or edge) horizontally toward the edge of the display, which concurrently causes: the right edge of window 806 to move to the right, the left edge of window 806 to move to the left, and the main strip 556 and secondary strip 556*b* to move toward the edges of the screen and eventually off the screen, as shown in FIG. 8F. In some embodiments, if the user input 808*b* in FIG. 8E is released before reaching the edge of the display, and if the user input moves the resize affordance to within a threshold of space from the edge of the display, then the side edges of window 806 snap to respective sides of the display, as shown in FIG. 8F. In some embodiments, the right and left edges of the window 806 snap to respective positions that are closest to predetermined resize positions upon release of user input 808*b*. The predetermined resize positions may be determined based on a grid of resize points or lines. In some embodiments, the right and left edges of the window 806 remain where they are upon release of the user input 808*b*. In some embodiments, the window contents of window 806 continuously rearrange and/or rescale as the window is being resized.

Upon reaching the right and left edges of the display, window 806 is now in a full-screen configuration, with the strips, dock, and any other open windows removed from the display. In some embodiments, while window 806 is in the full-screen configuration, child window representations in secondary strip 556*b* (FIG. 8D) are still visible and selectable. In some embodiments, the child window representations (FIG. 8D) are still visible and selectable until the first interaction with the full-screen window 806, at which time the child window representations move off the edge of the display and out of view. If a child window representation is selected while window 806 is in the full-screen configuration, the corresponding child window may replace window 806 or may overlay window 806.

Figure 8G:
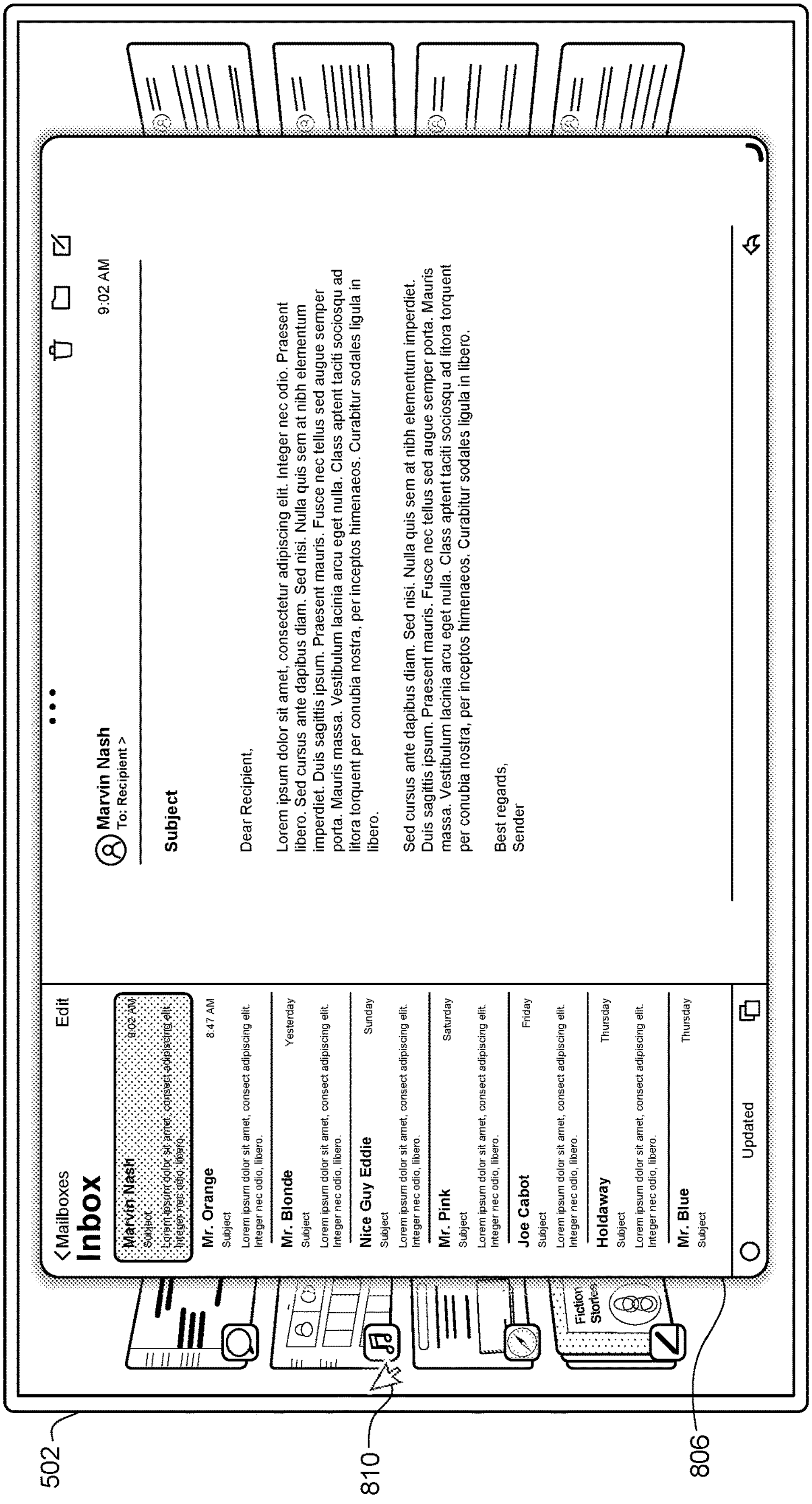
Figure 8H:
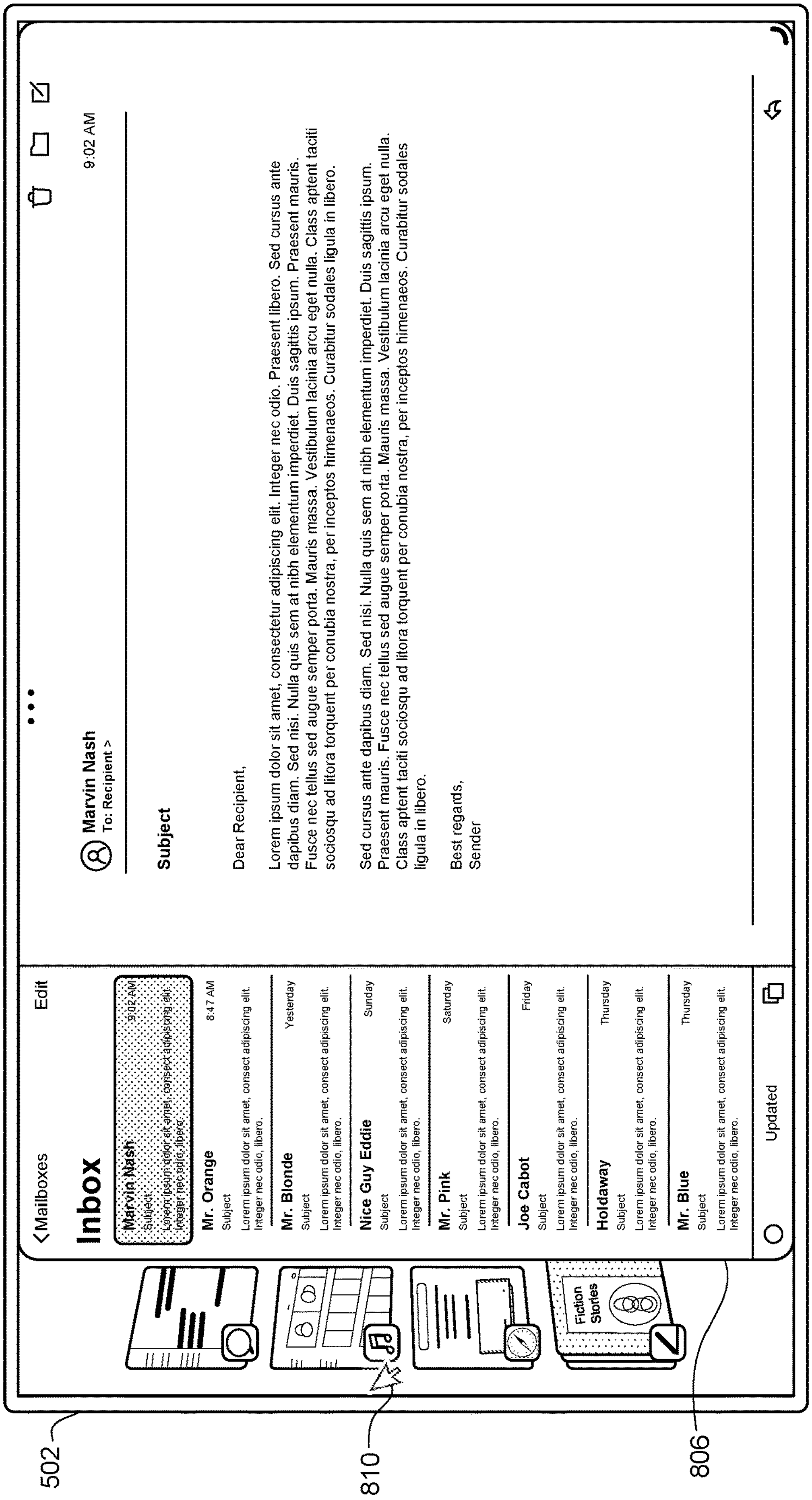
Figure 8I:
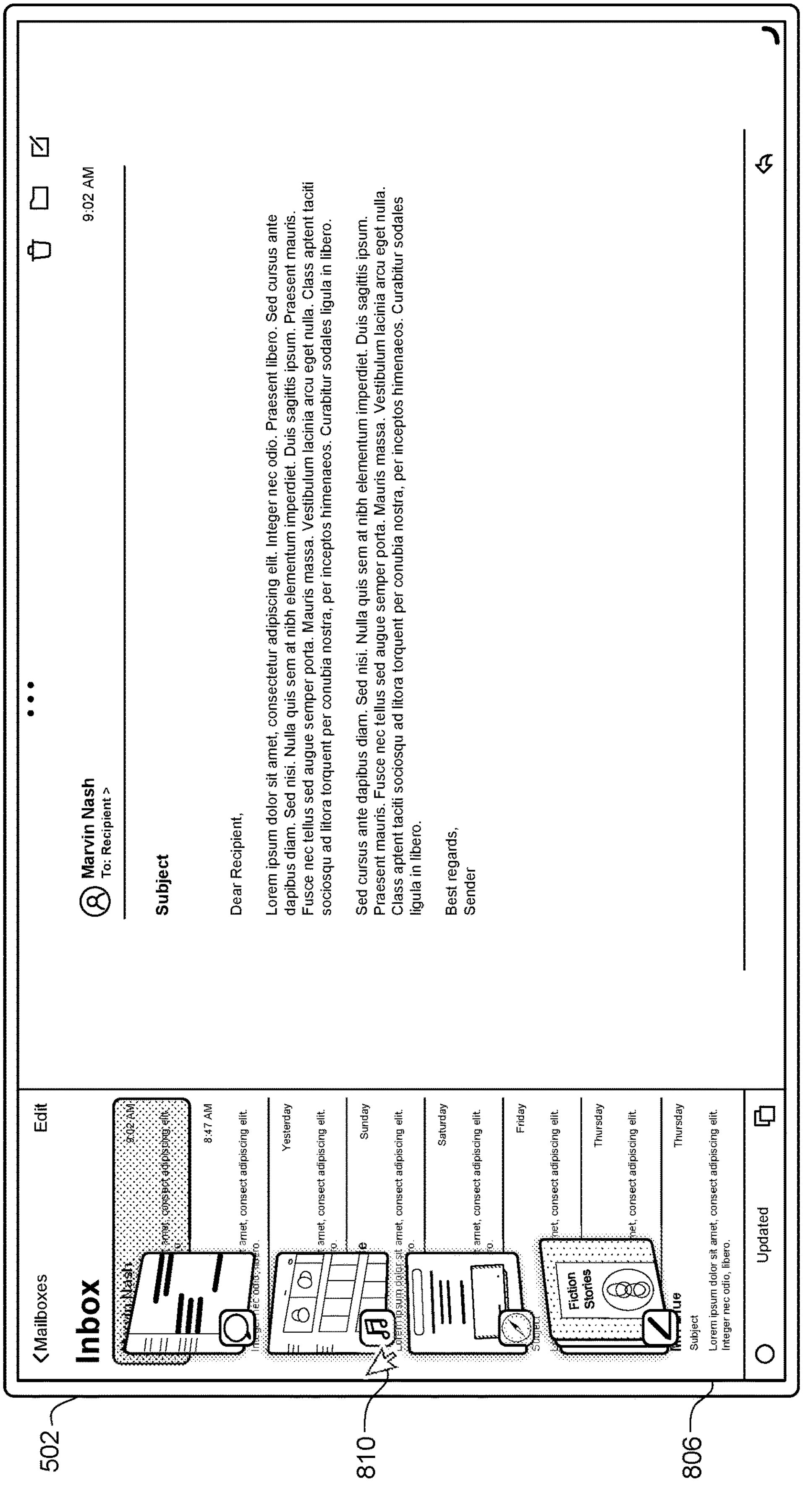
Figure 8J:
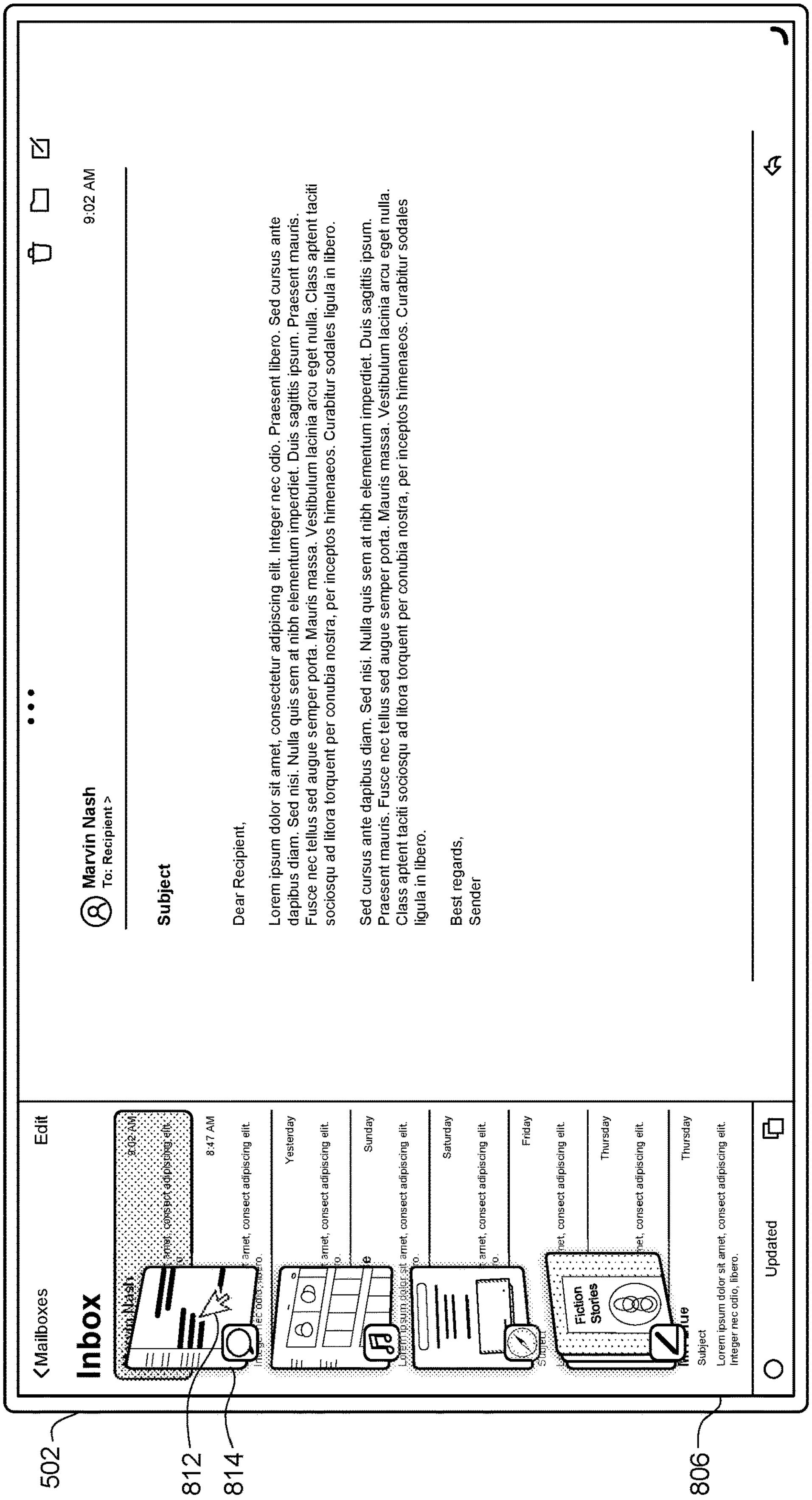

While window 806 is in the full-screen configuration, certain user inputs may reveal representations in the strip(s) in order to allow user interaction with other windows. Specifically, in FIG. 8G, user input 810 causes a pointer or cursor to reveal the strip(s) by moving the pointer or cursor close (e.g., within a threshold distance) to the edge of the display; all of the way to the edge of the display; or effectively past the edge of the display. In FIG. 8G, this causes the full-screen window 806 to decrease in size (and its contents to optionally scale down), revealing the strip(s). In FIG. 8H, this causes one edge of the full-screen window (the edge associated with the input) to move toward the center of the display in order to reveal the strip at that edge. In FIG. 8I, the input causes the strip associated with the edge of the display nearby the input to reveal itself by overlaying the full-screen window.

Figure 8K:
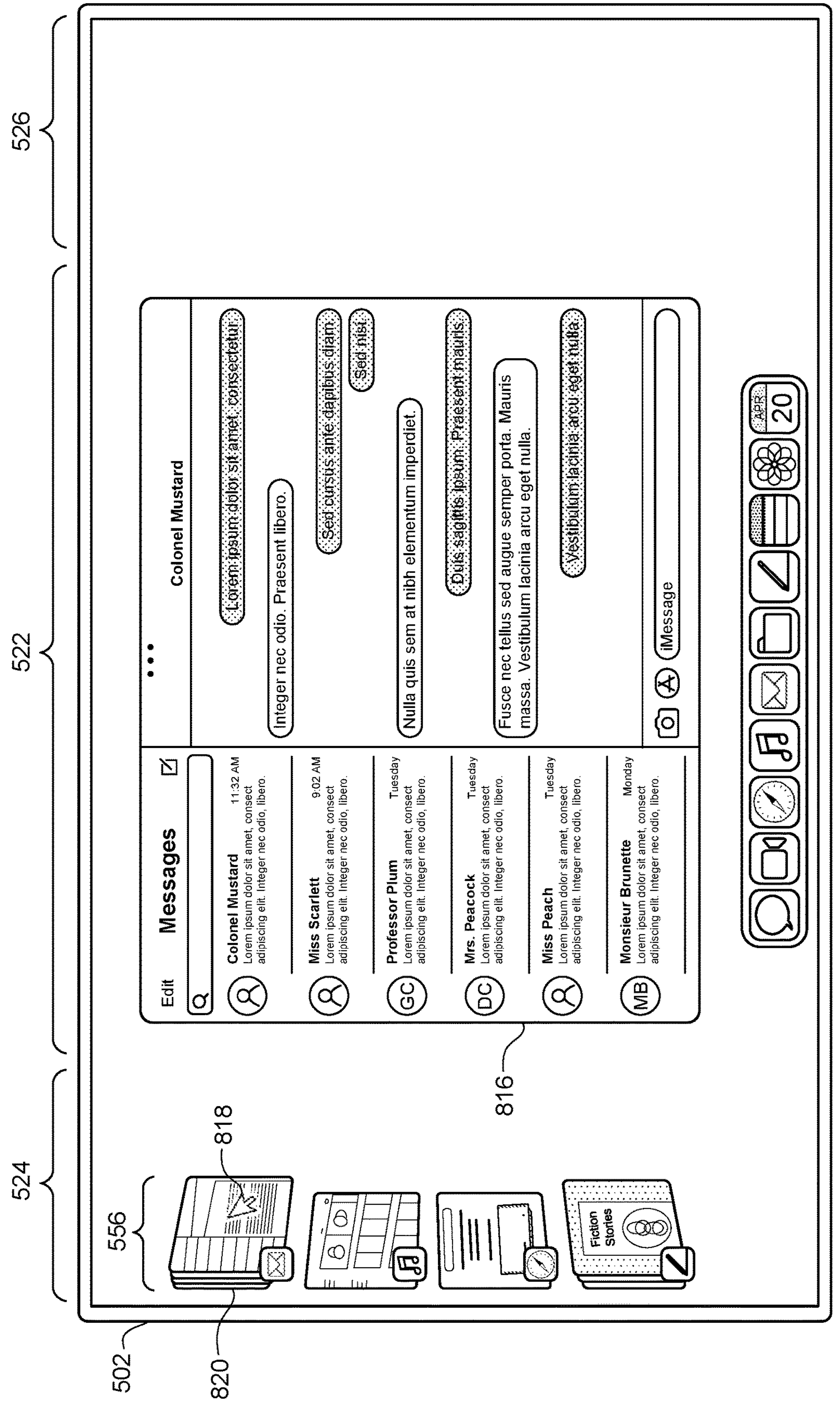
Figure 8L:
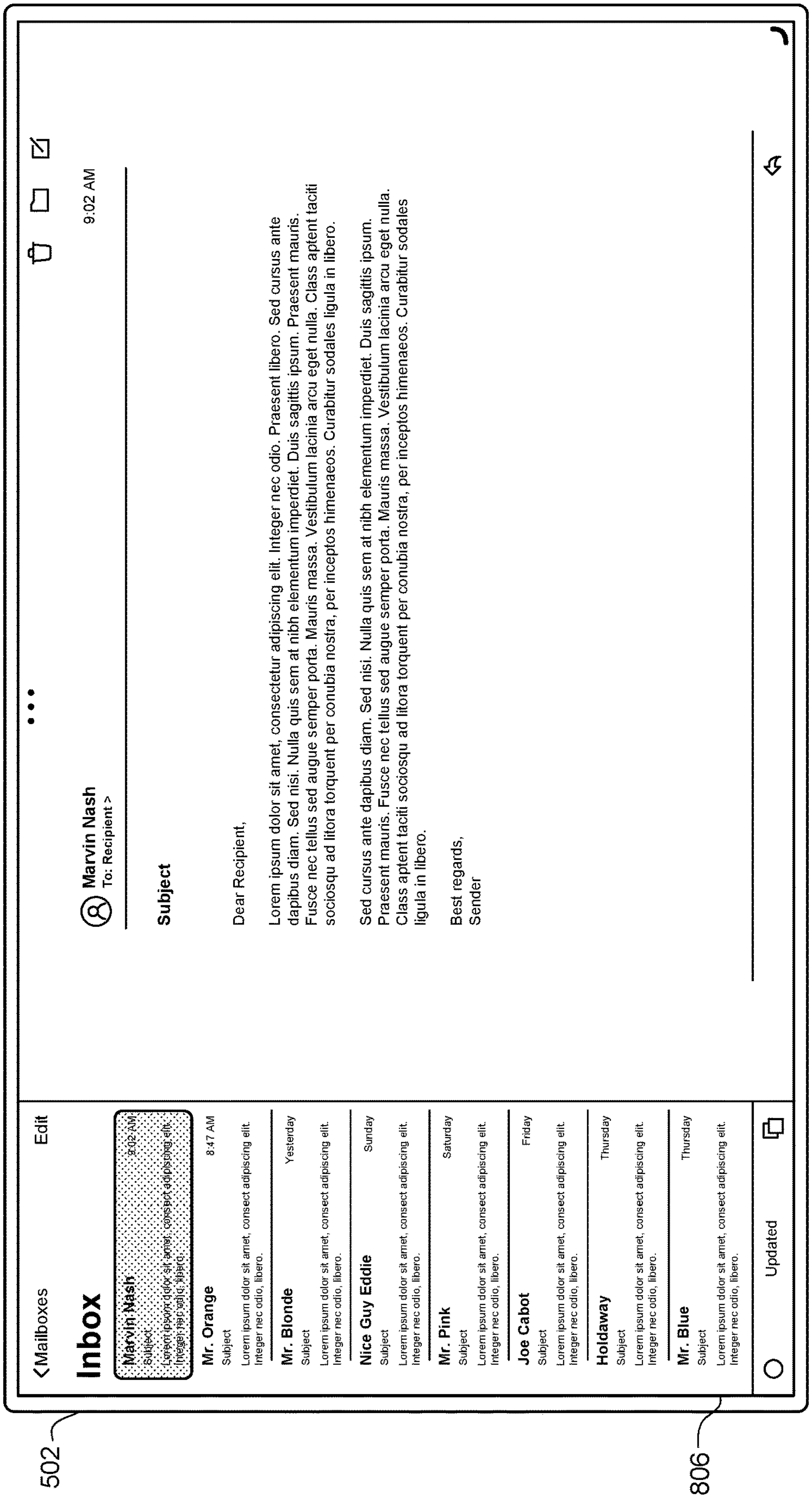

In some embodiments, the states of the window sizes are maintained after respective windows are removed from the stage region and then returned to that state later. For example, in FIG. 8J, user input 812 selects a messages window grouping representation 814 from strip 556, which causes a messages window 816 to replace full-screen mail window 806, as shown in FIG. 8K. In FIG. 8K, user input 818 selects the mail window grouping 820 in strip 556, which causes the full-screen mail window 806 to replace the messages window 816, as shown in FIG. 8L. Since the mail window 806 was in a full-screen configuration at the time it was closed in FIG. 8K, the mail window 806 opens in the full-screen configuration at the time it is opened again in FIG. 8L.

Figure 9A:
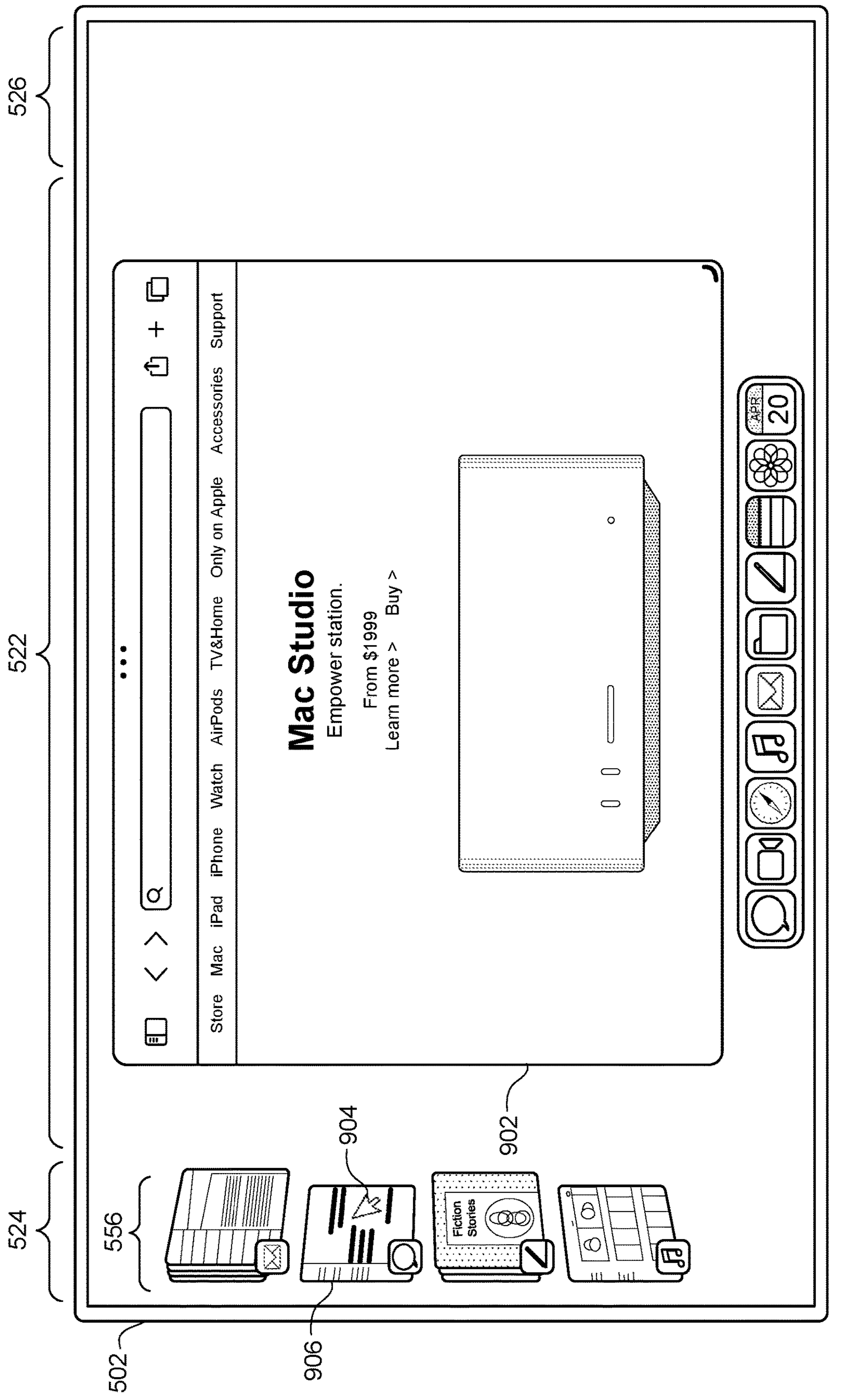
Figure 9B:
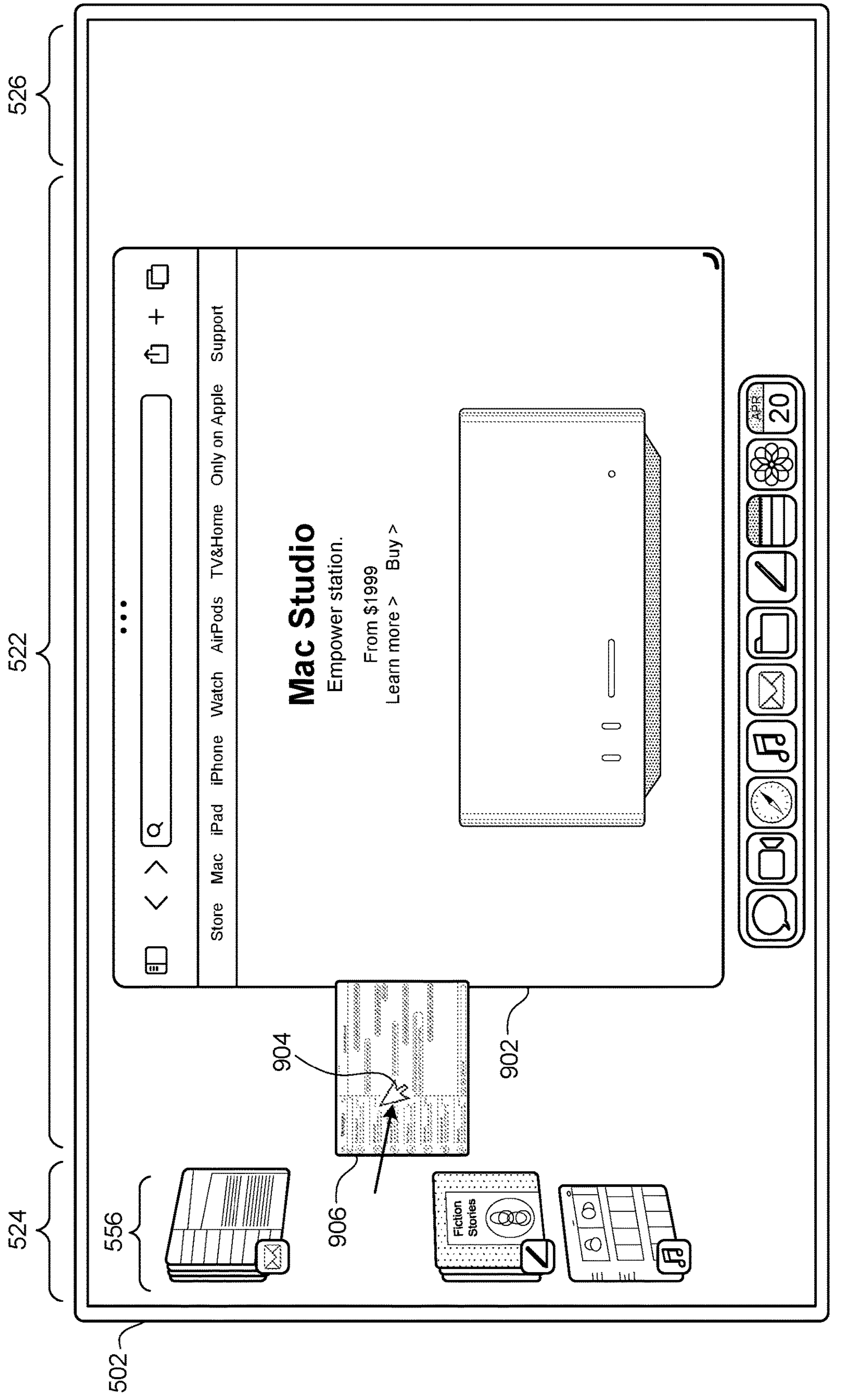
Figure 9C:
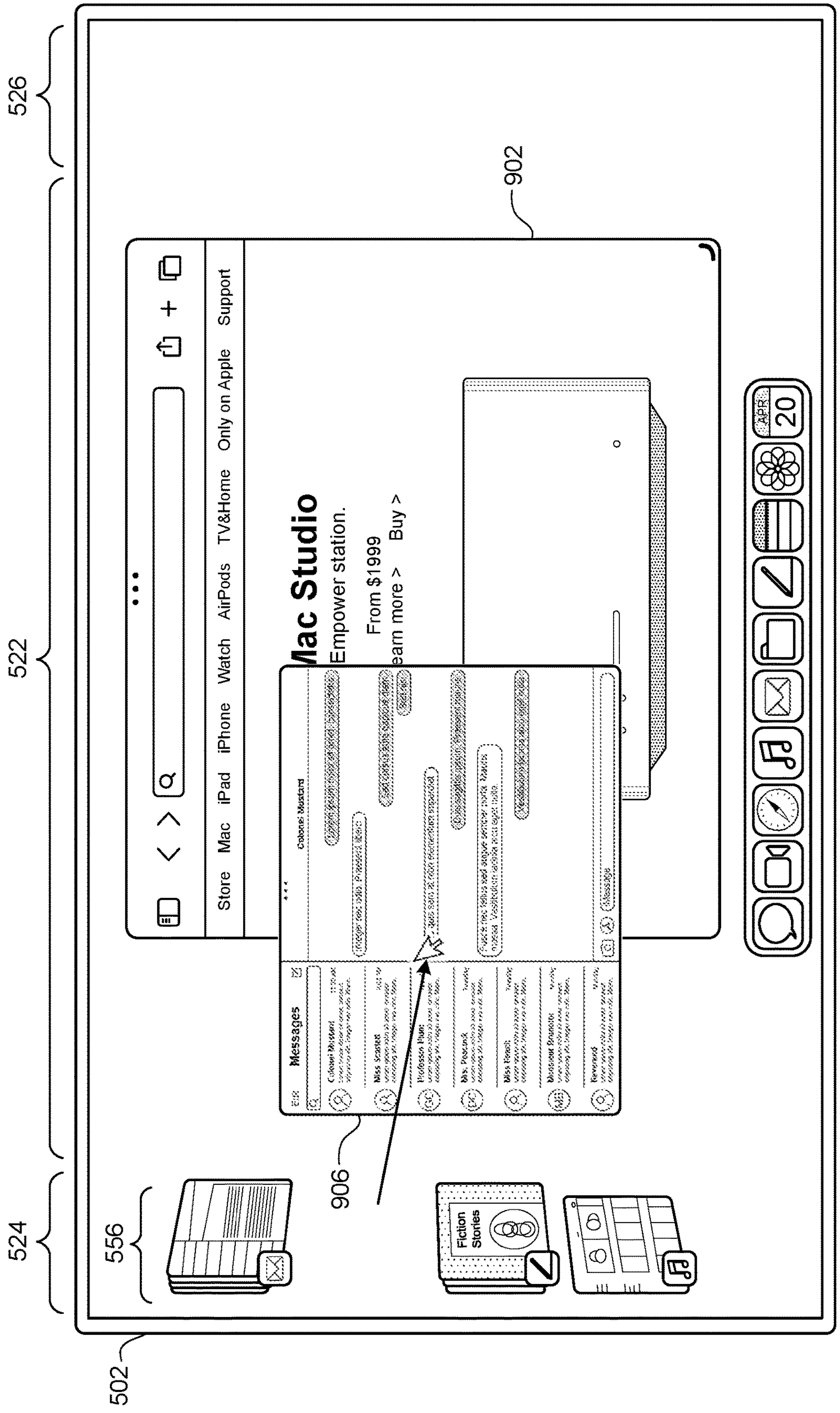
Figure 9D:
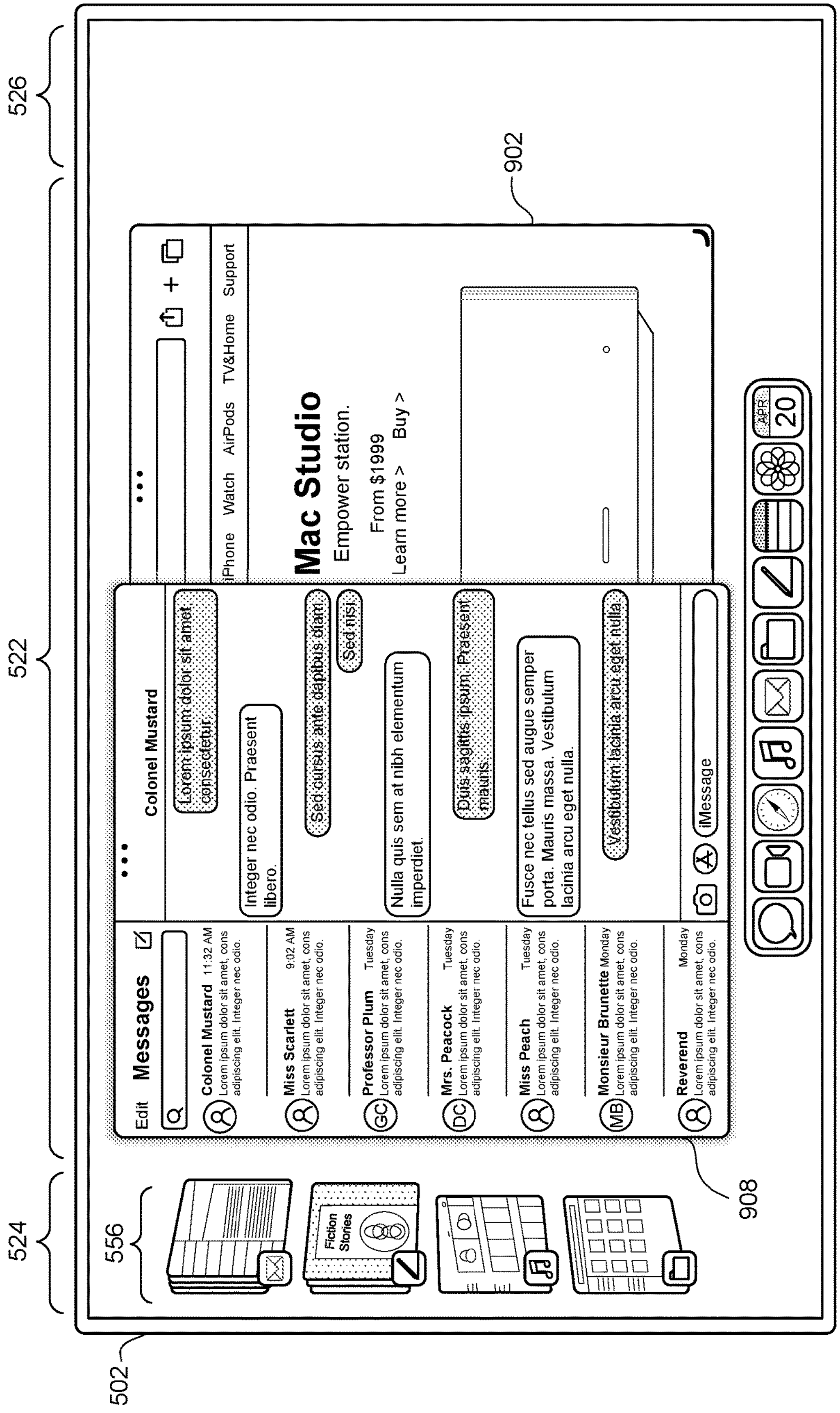

FIGS. 9A-9L illustrate multi-window features of the stage region of the concentration mode described above, in accordance with some embodiments. In some embodiments, more than one window may be displayed in the stage region 522. These windows may be referred to as a set or as the window grouping (e.g., not the representation of the window grouping). In FIG. 9A, a browser window 902 is displayed in the stage region 522. User input 904 selects a messages window representation 906 in the strip 556, and drags the representation to the stage region 522 (FIGS. 9B-9C) before releasing it, which causes a messages window 908 to open in the stage region 522 along with the browser window 902 in a multi-window configuration (FIG. 9D). In some embodiments, while the messages representation 906 is being dragged to the stage region 522, the browser window size decreases and its contents scale down, making the browser window 902 appear behind the messages window 908. Specifically, in response to detecting user input 904, device 502 moves and expands the messages window representation 906 while condensing browser window 902, as shown in FIG. 9B. In response to continued detection of user input 904, device 502 continues to move and expand the messages window representation 906 while further condensing browser window 902, as shown in FIG. 9C. In addition, the edges of the messages window may be graphically rendered so as to appear in the foreground, in front of the browser window 902 (closer to the user), as shown in FIG. 9D.

Figure 9E:
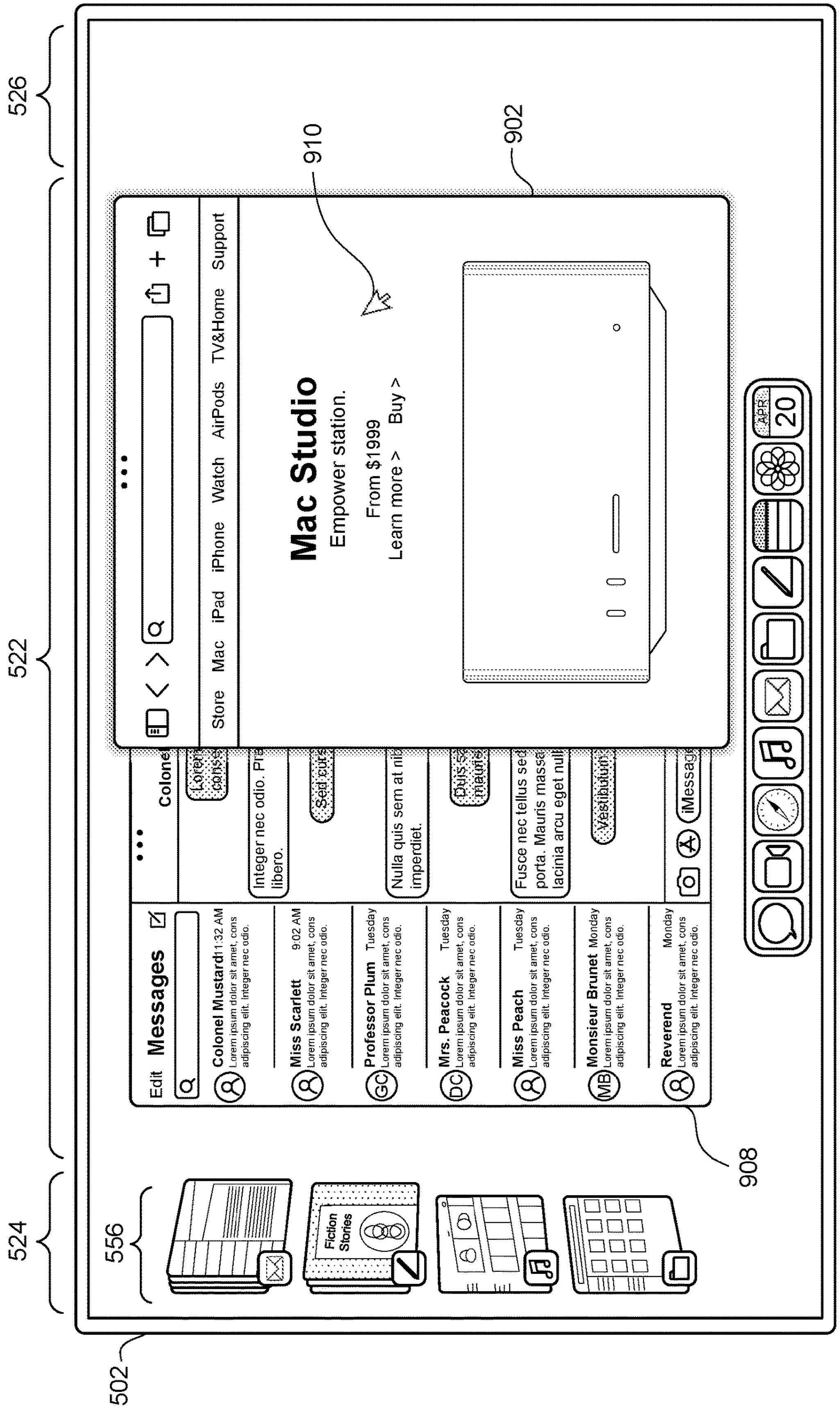
Figure 9F:
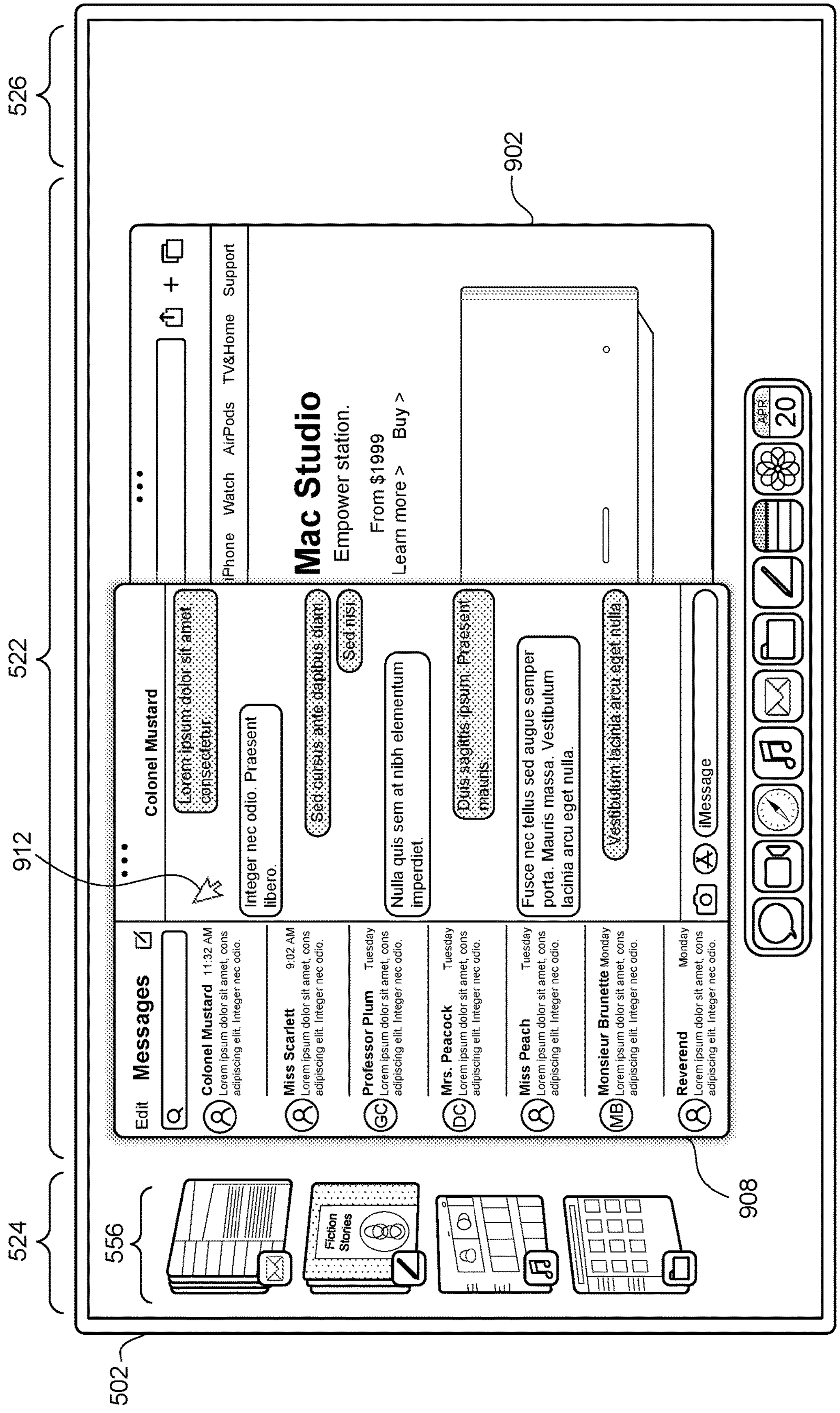

In some embodiments, the multi-window configuration causes windows in the stage region 522 to slightly overlap, in order to highlight an active window to the user. In FIG. 9D, messages window 908 is the active window in the foreground. In FIG. 9E, user input 910 selects any area of the browser window 902, causing the browser window 902 to move to the foreground and the messages window 908 to move to the background. In FIG. 9F, user input 912 selects any area of the messages window 908, restoring it to the foreground. While in the multi-window configuration, each window is movable and resizable as described above with reference to FIGS. 8A-8L (e.g., can be made wider with respect to other windows in the set, narrower with respect to other windows in the set, full-screen, and so forth).

Figure 9G:
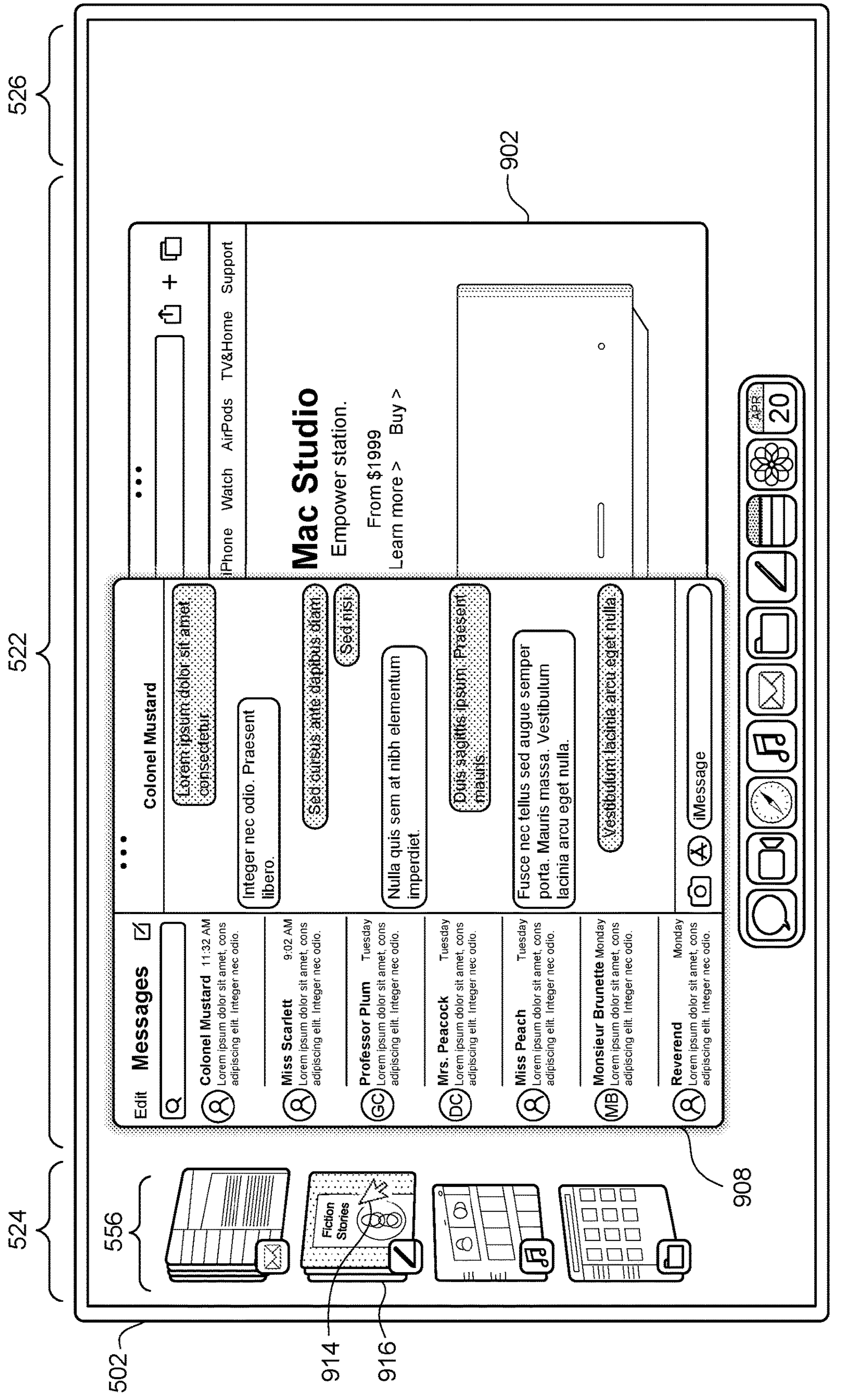
Figure 9H:
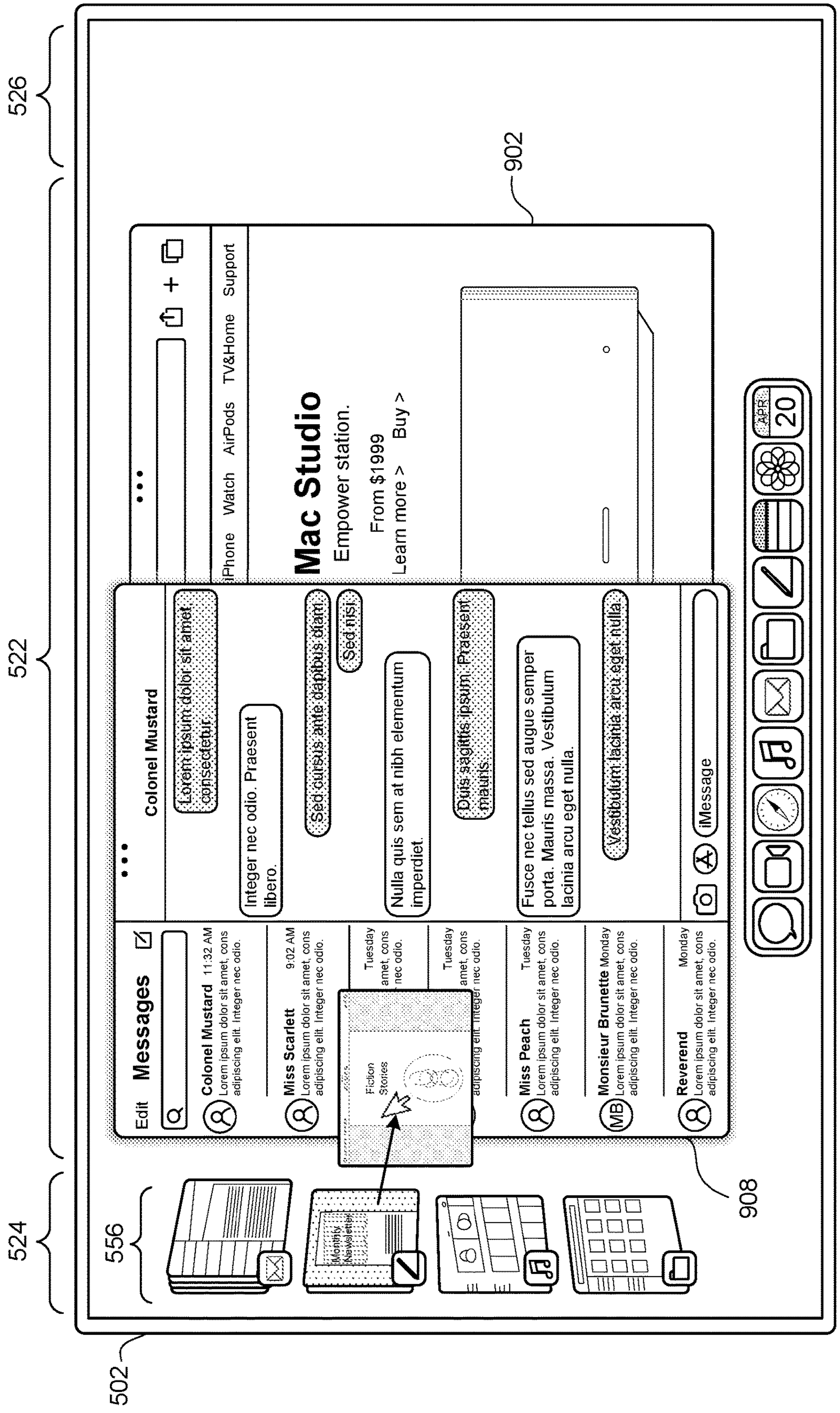
Figure 9I:
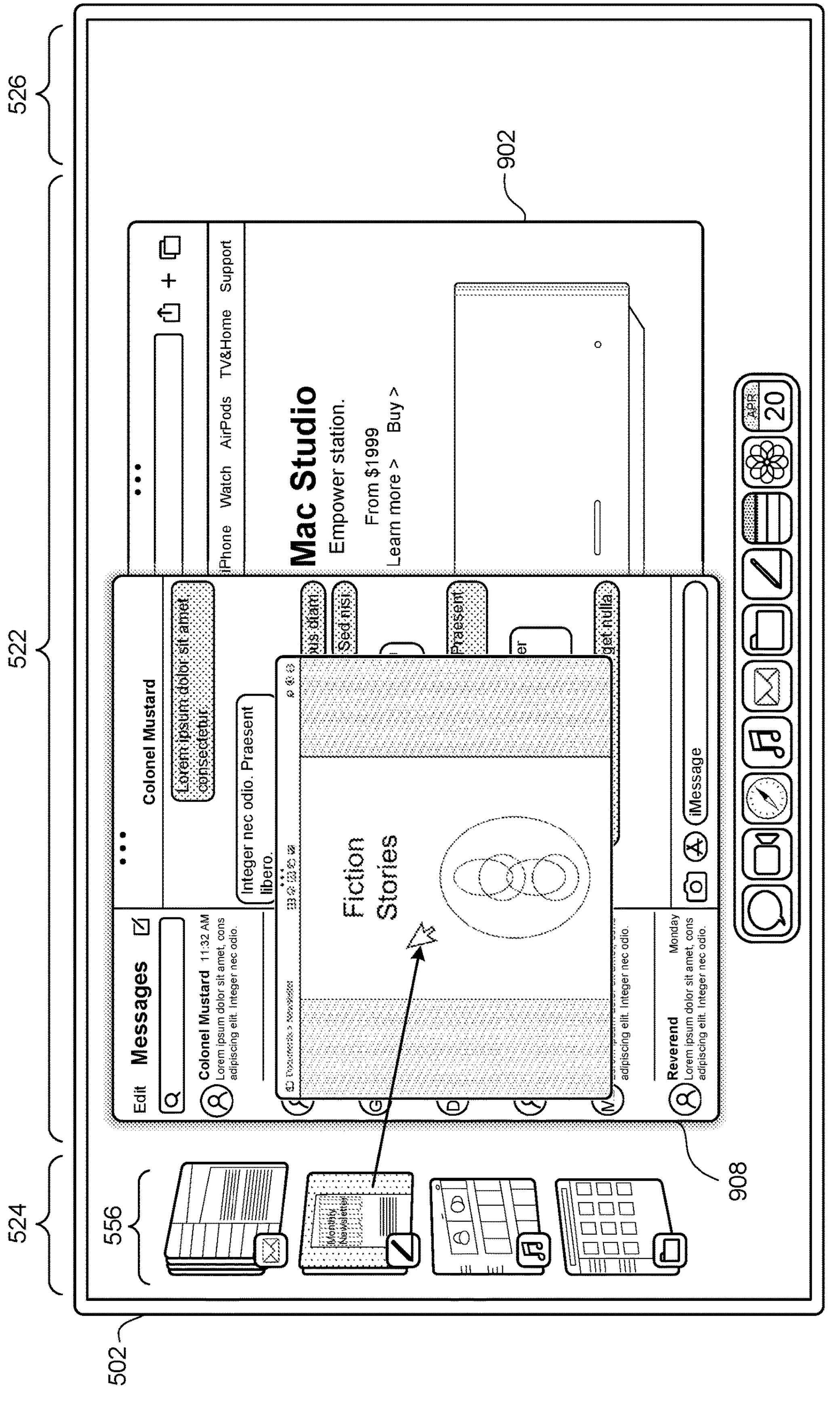
Figure 9J:
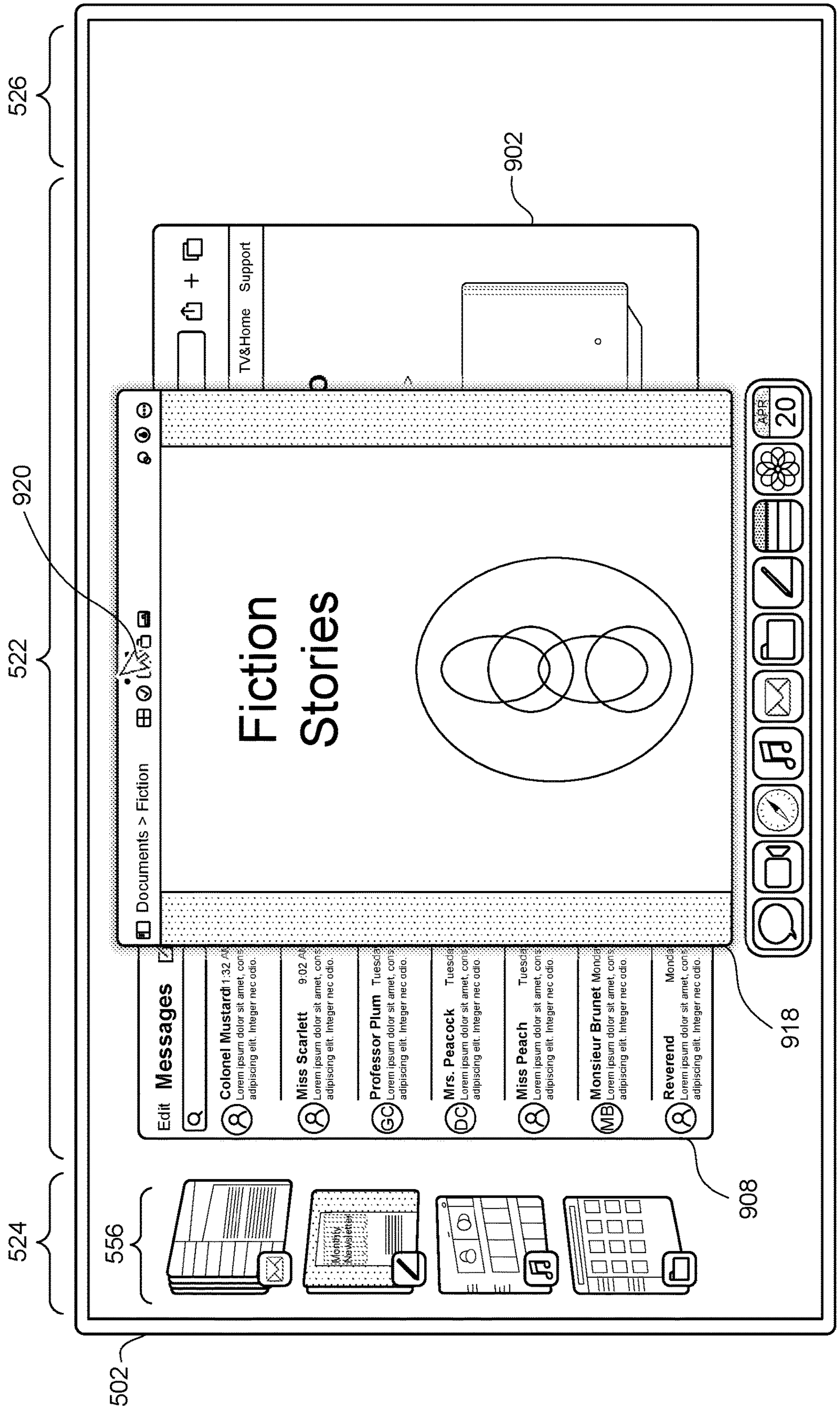
Figure 9K:
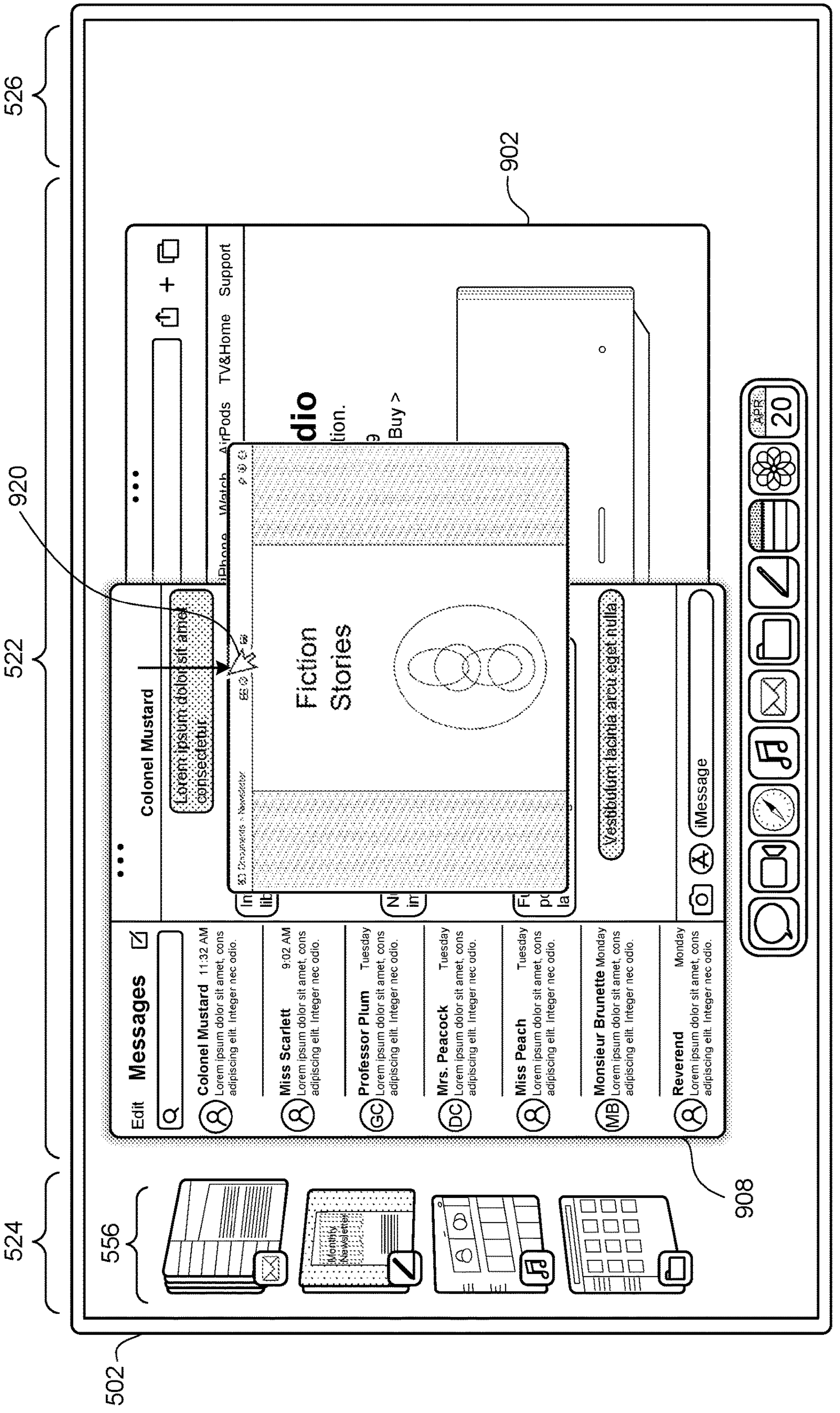

More than two windows may be displayed in the stage region 522 in the multi-window configuration, as shown in FIGS. 9G-9L. In FIG. 9G, with two windows already displayed in the stage region 522, device 502 detects user input 914, and in response to detecting user input 914, device 502 selects a word processor window representation 916 from the strip, and drags the representation to the stage region, as shown in FIG. 9H. In response to continued detection of user input 914, device 502 continues to move the representation to the stage region while further expanding the representation, as shown in FIG. 9I. In response to detecting a release of user input 914, device 502 opens a word processor window 918 in the stage region 522 along with the browser window 902 and messages window 908, as shown in FIG. 9J. This most recently opened window is displayed in the foreground, while the other two windows automatically decrease in size (e.g., are scaled down), so as to appear in the background.

Figure 9L:
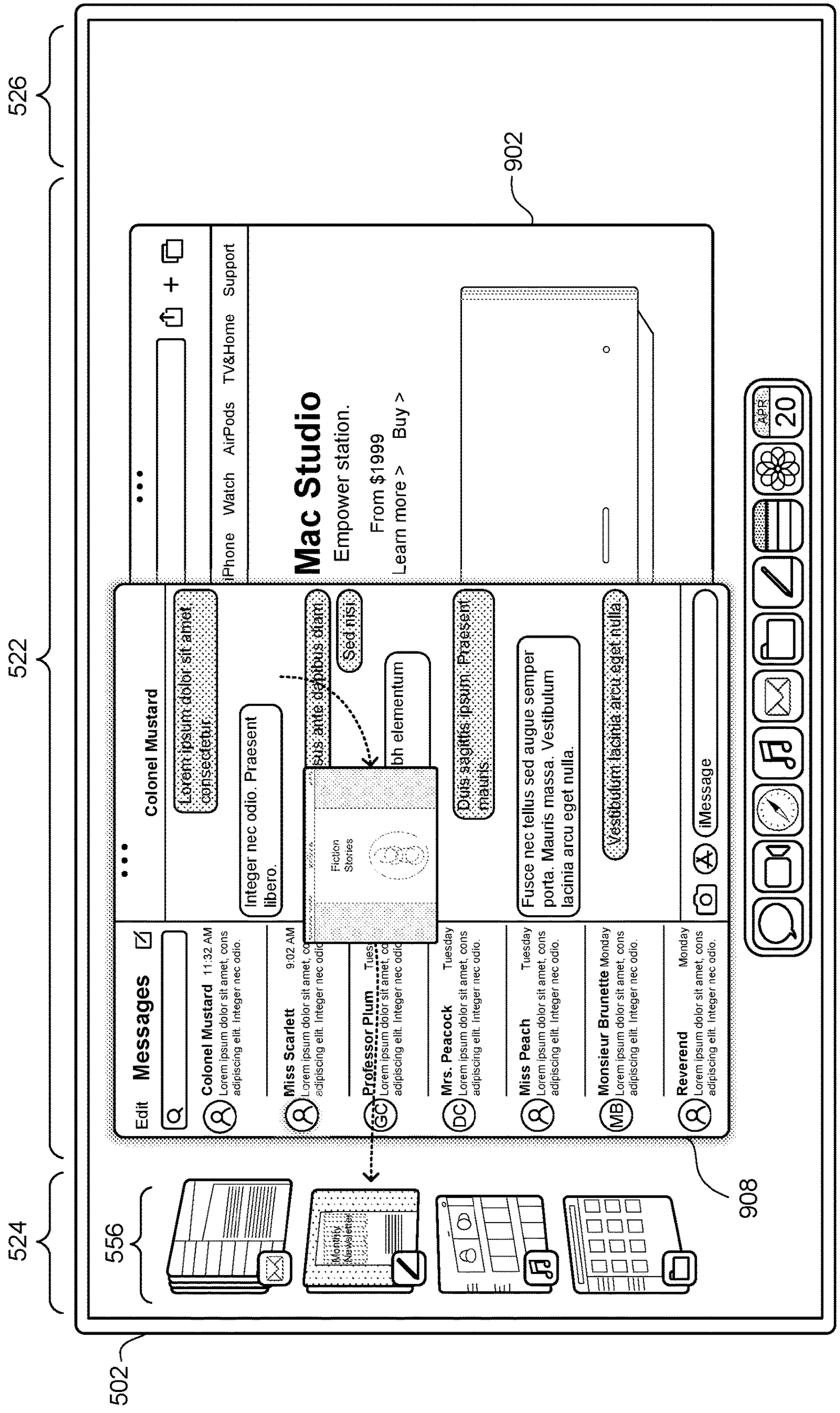

To remove a window from the stage region 522, a window may be dragged back to the strip. For example, in FIG. 9K, user input 920 selects word processor window 920 and drags it down (or to the left strip). User input 920 may drag the window to the dock or strip, or release the window after having dragged the window at least a threshold distance, which causes the word processor window 918 to turn into a window grouping representation and be restored in the strip, as shown in FIG. 9L.

FIGS. 10A-10G illustrate strip overflow user interfaces of the concentration mode described above, in accordance with some embodiments. As noted above, the number of window grouping representation positions in the strip(s) depends on the size of the representations, the amount of space available in each strip, and the amount of space each window grouping position in the strip requires. In some embodiments, if there are too many window grouping representations (e.g., each associated with one or more windows) to all be displayed in a strip at once, then one or more of the window grouping representations are moved to an overflow interface, which can be accessed by user selection of an overflow affordance or other user input (e.g., finger swipe from an edge of the display toward the center of the display, multi-finger swipe up from the stage region, and so forth).

Figure 10A:
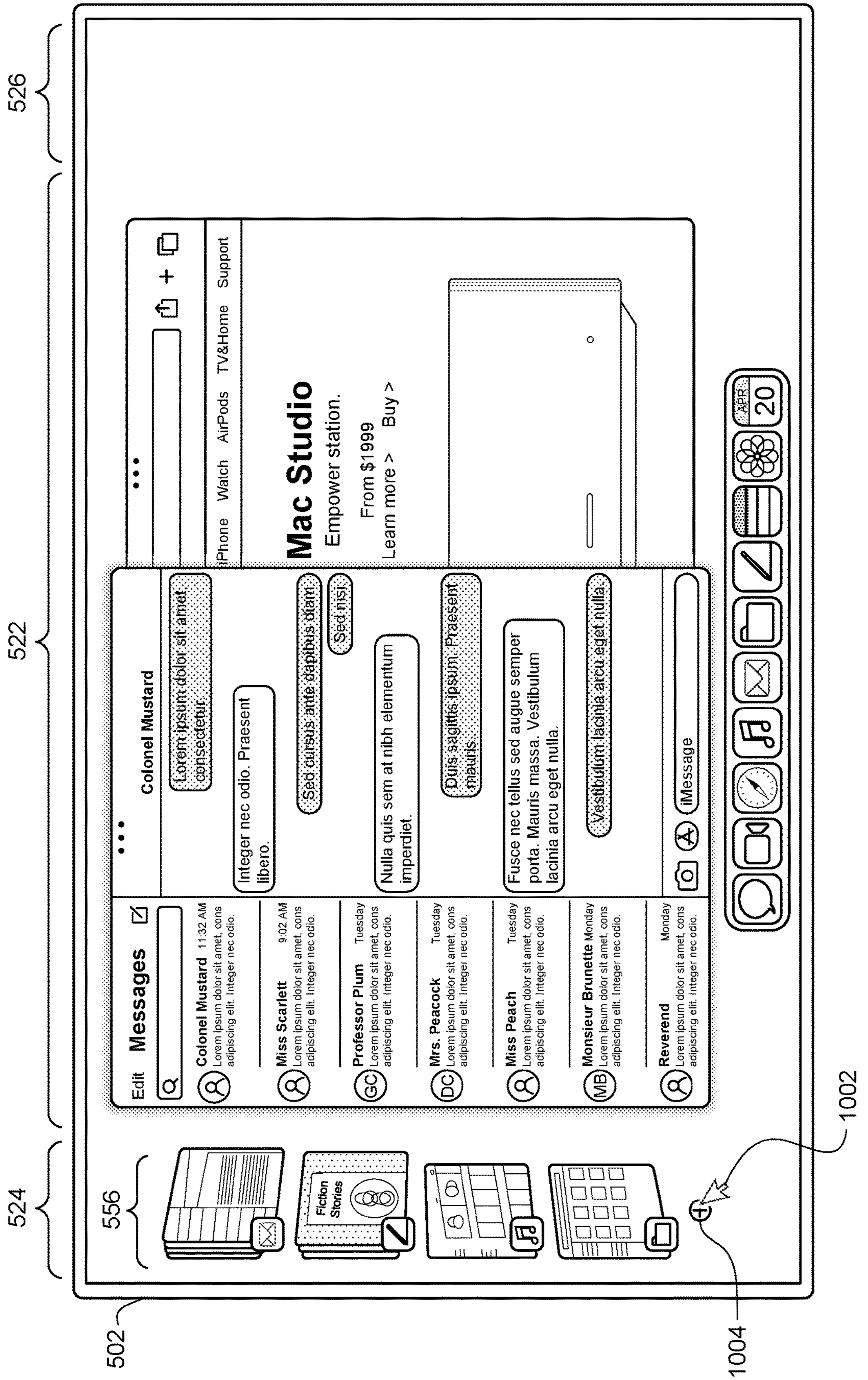
Figure 10B:
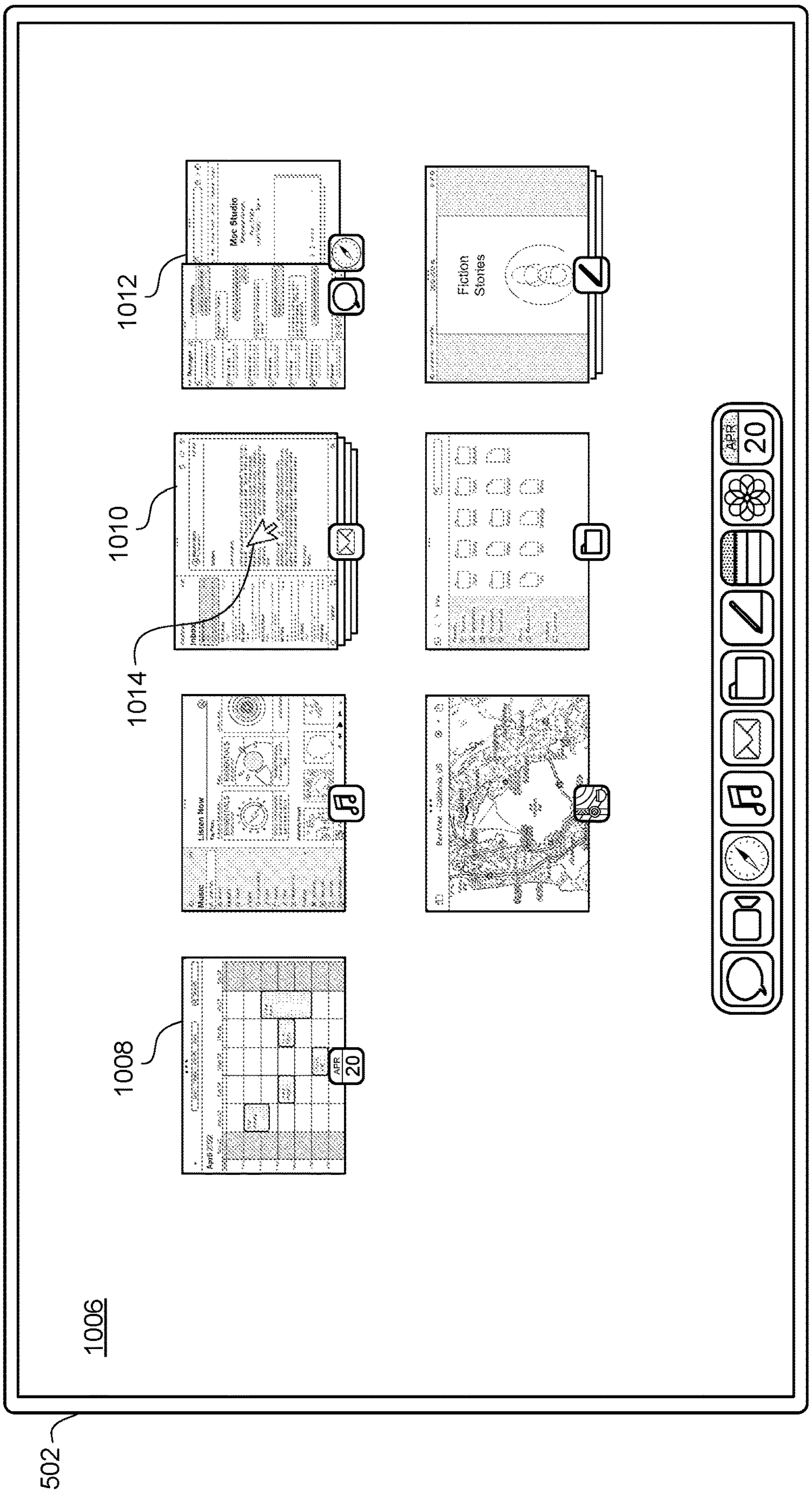
Figure 10C:
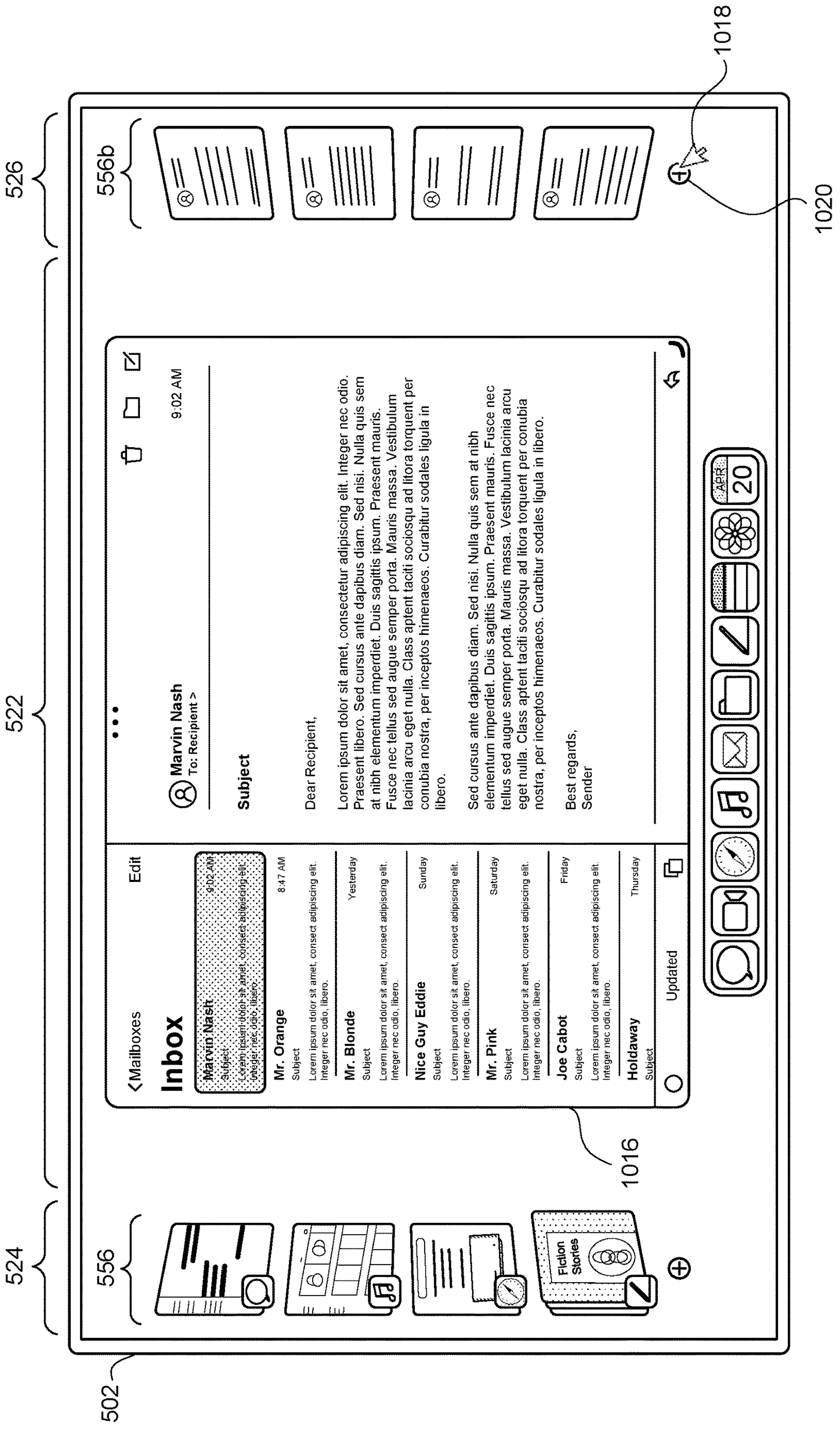

In FIG. 10A, user input 1002 selects an overflow affordance 1004, which causes an overflow interface 1006 to be displayed, as shown in FIG. 10B. Overflow interface 1006 includes one or more window grouping representations (e.g., calendar window grouping representation 1008, mail window grouping representation 1010 and messages/browser window grouping representation 1012). A specific window representation in a window grouping may be selected by a user input involving a long press (e.g., long finger press, mouse click-and-hold, long touchpad press, and so forth) or a hover anywhere on the window grouping representation, until the individual window representations fan out. This allows the user to select one of the window representations, causing the corresponding window grouping to open with the selected window open in the stage region and the non-selected window representations displayed in the secondary strip. Otherwise, a user input involving a short press (e.g., finger tap, mouse click-and-release, touchpad tap, and so forth) anywhere on the window grouping representation causes the set or window grouping to open with the window corresponding to the window associated with the top representation opening in the stage region and the windows associated with the other representations in the window grouping displayed in the secondary strip. For example, in FIG. 10B, user input 1014 selects (with a tap) the mail window grouping representation, causing mail window 1016 to open in the stage region and the other mail window representations to be displayed in secondary strip 556*b*, as shown in FIG. 10C.

Figure 10D:
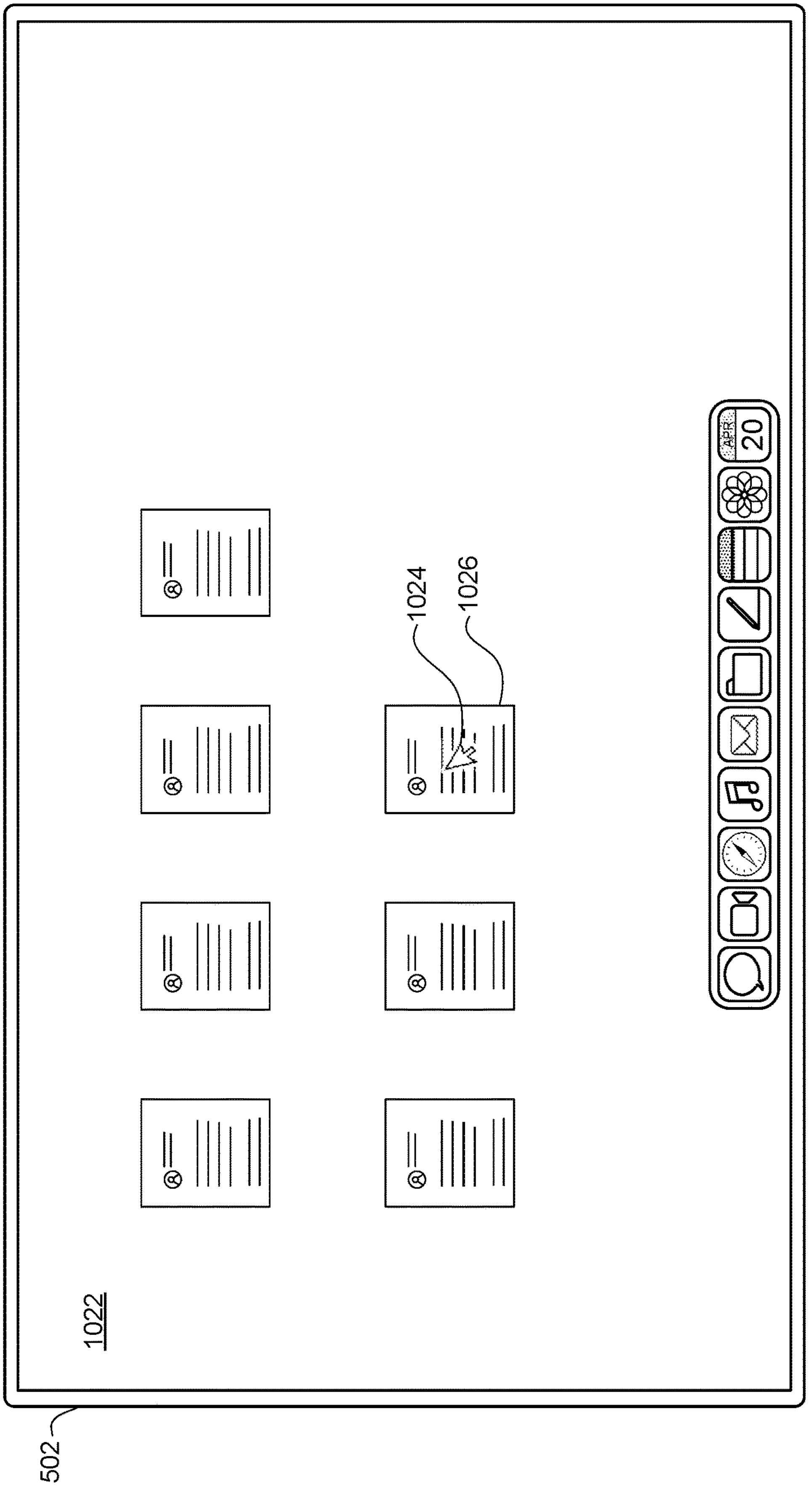
Figure 10E:
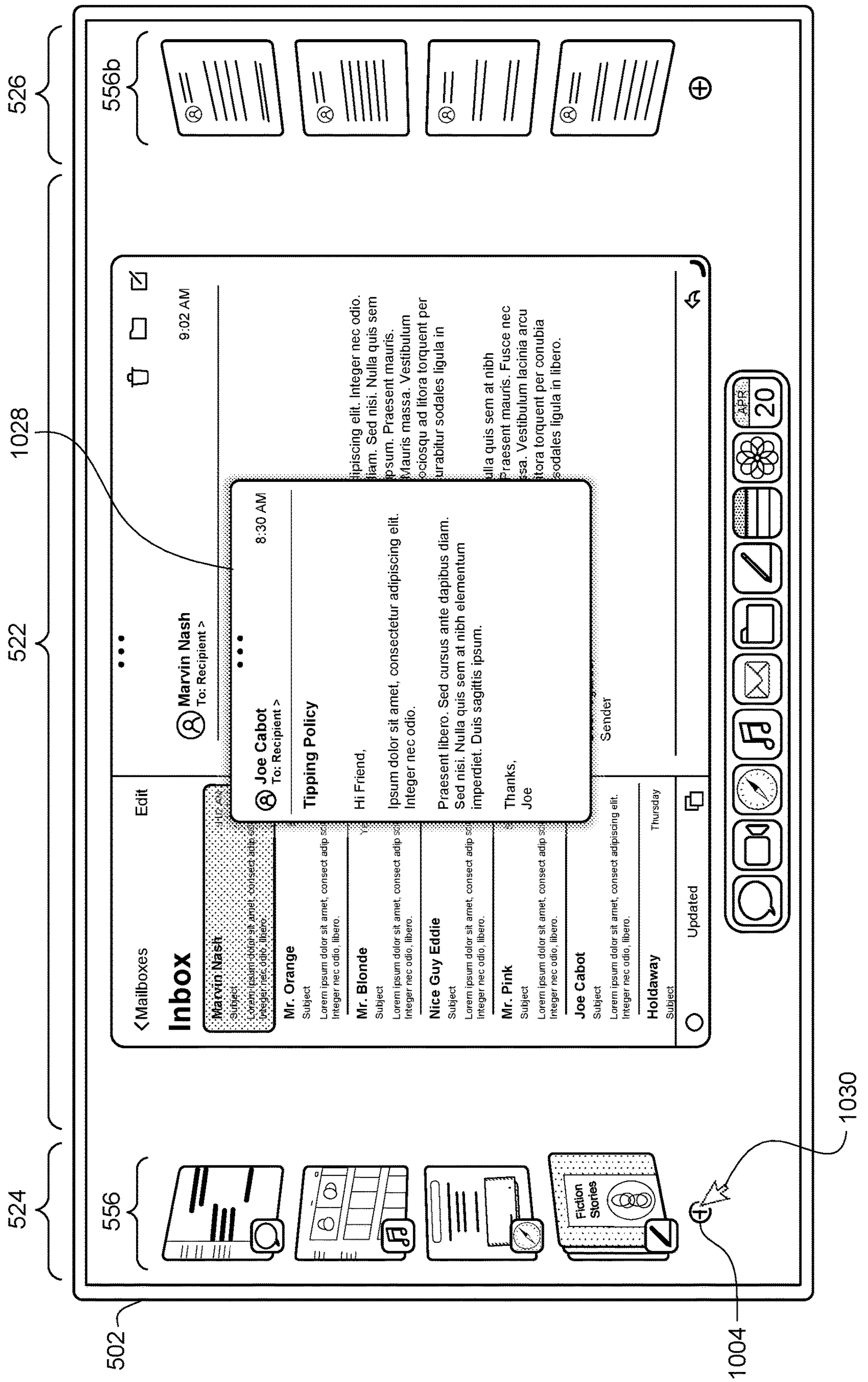

In some embodiments, secondary strip 556*b* also has an overflow interface, which may be accessed the same as primary strip 556. For example, in FIG. 10C, user input 1018 selects secondary overflow affordance 1020, which causes a secondary overflow interface 1022 to be displayed, as shown in FIG. 10D. Secondary overflow interface 1022 includes one or more child window representations or sibling window representations. In FIG. 10, user input 1024 selects a window representation 1026 in secondary overflow interface 1022, which causes a corresponding child window 1028 to be displayed in the stage region, as shown in FIG. 10E.

Figure 10F:
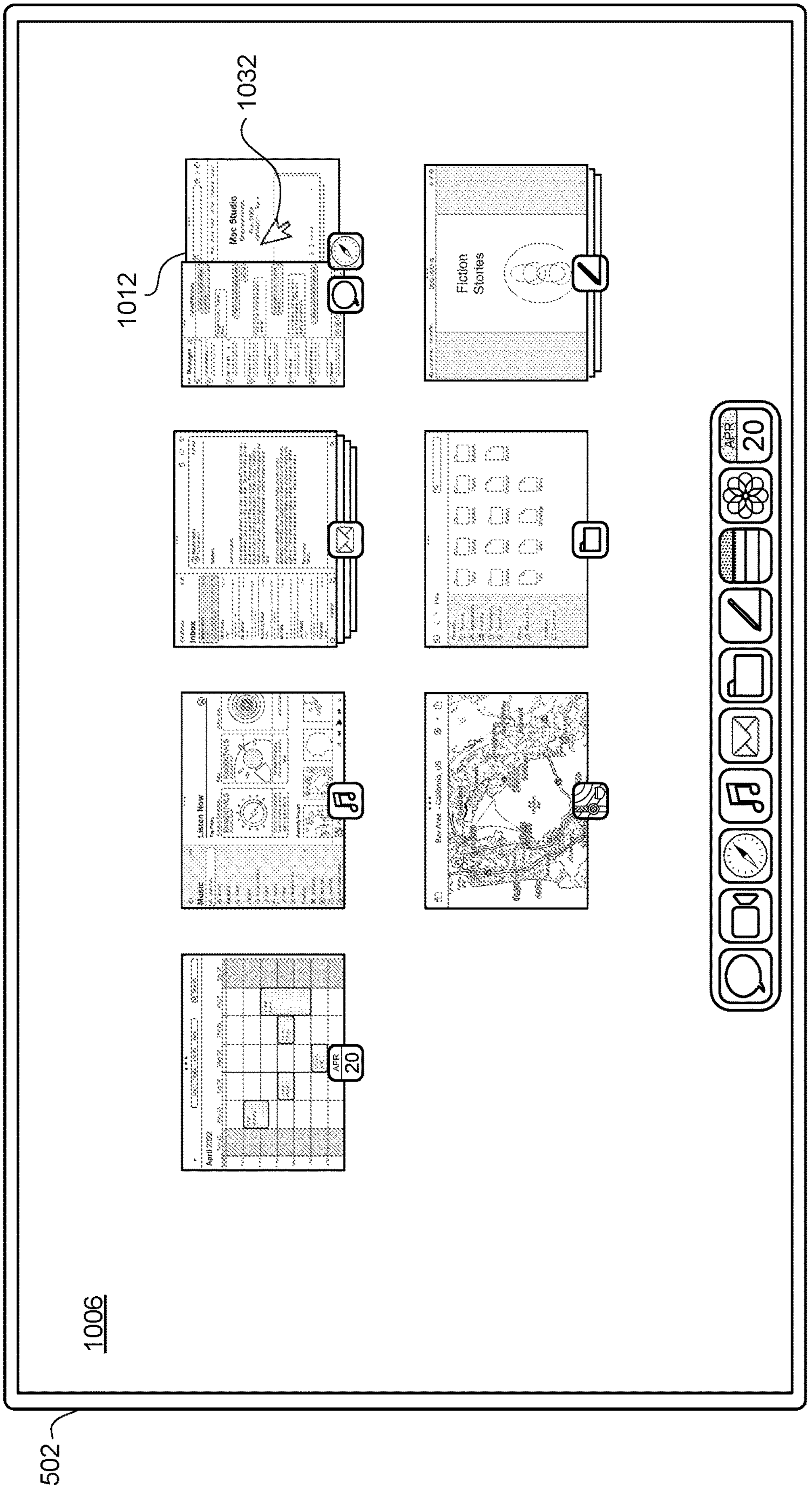
Figure 10G:
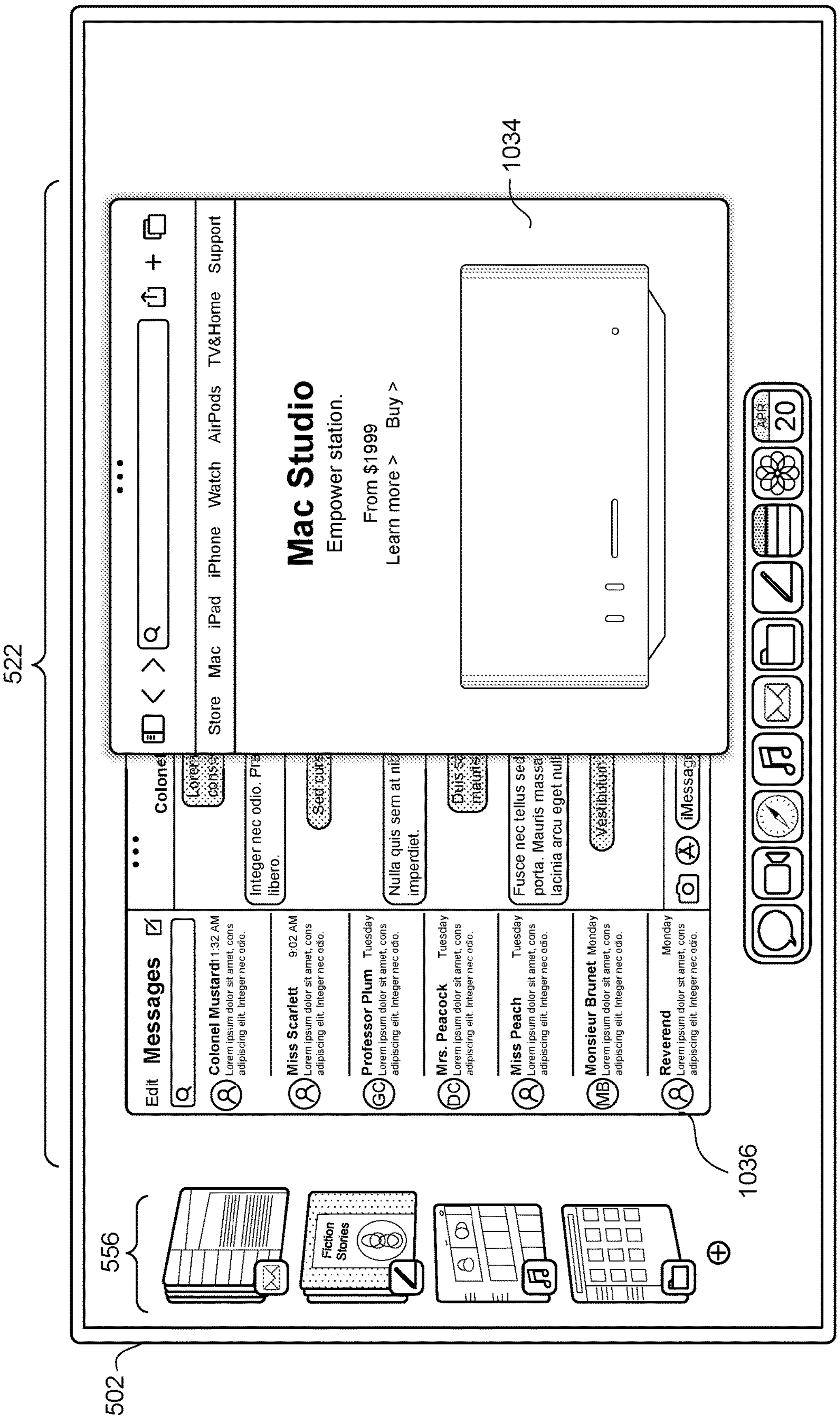

In some embodiments, a specific window representation in window grouping representation overflow interface 1006 (FIG. 10B) may be selected for display in the foreground of the stage region. For example, in FIG. 10E, user input 1030 selects overflow affordance 1004, which causes overflow interface 1006 to be displayed, as shown in FIG. 10F. In overflow interface 1006, window grouping representation 1012 includes a messages window representation and a browser window representation in a multi-window configuration, with the messages window representation in the foreground and the browser window representation in the background. In response to device 502 detecting user input 1032, device 502 selects the browser window representation in the background of set 1012, which causes the window grouping associates with the window grouping representation 1012 to open in the stage region with a corresponding browser window 1034 in the foreground of the stage region (due to the browser window representation having been selected) and a corresponding messages window 1036 in the background of the stage region, as shown in FIG. 10G. In some embodiments, any of the overflow interfaces may be closed by selection of an affordance (e.g., an "x" in the corner of the representation) or other user input (e.g., an upward finger swipe), without selecting a window representation to display in the stage region. In such a scenario, the window(s) displayed in the stage region at the time the user entered the overflow interface remain in the stage region when the user exits the overflow interface. Alternatively, if the window or all windows in the stage region are closed, the top or most recently used window group (after the one that was closed) is displayed in the stage region.

FIGS. 11A-11H illustrate concentration mode features associated with disconnection of an external monitor, in accordance with some embodiments. For embodiments in which display device 502 is an external monitor plugged into a tablet, laptop, or desktop computing device (in general, device 500), the concentration mode as described above may end when the display device 502 is unplugged from device 500, especially if device 500 does not support concentration mode on its included display. In other words, the concentration mode may be terminated when the external display device 502 is disconnected from the device 500, and then resume when the external display device 502 is again reconnected to the device 500.

Figure 11A:
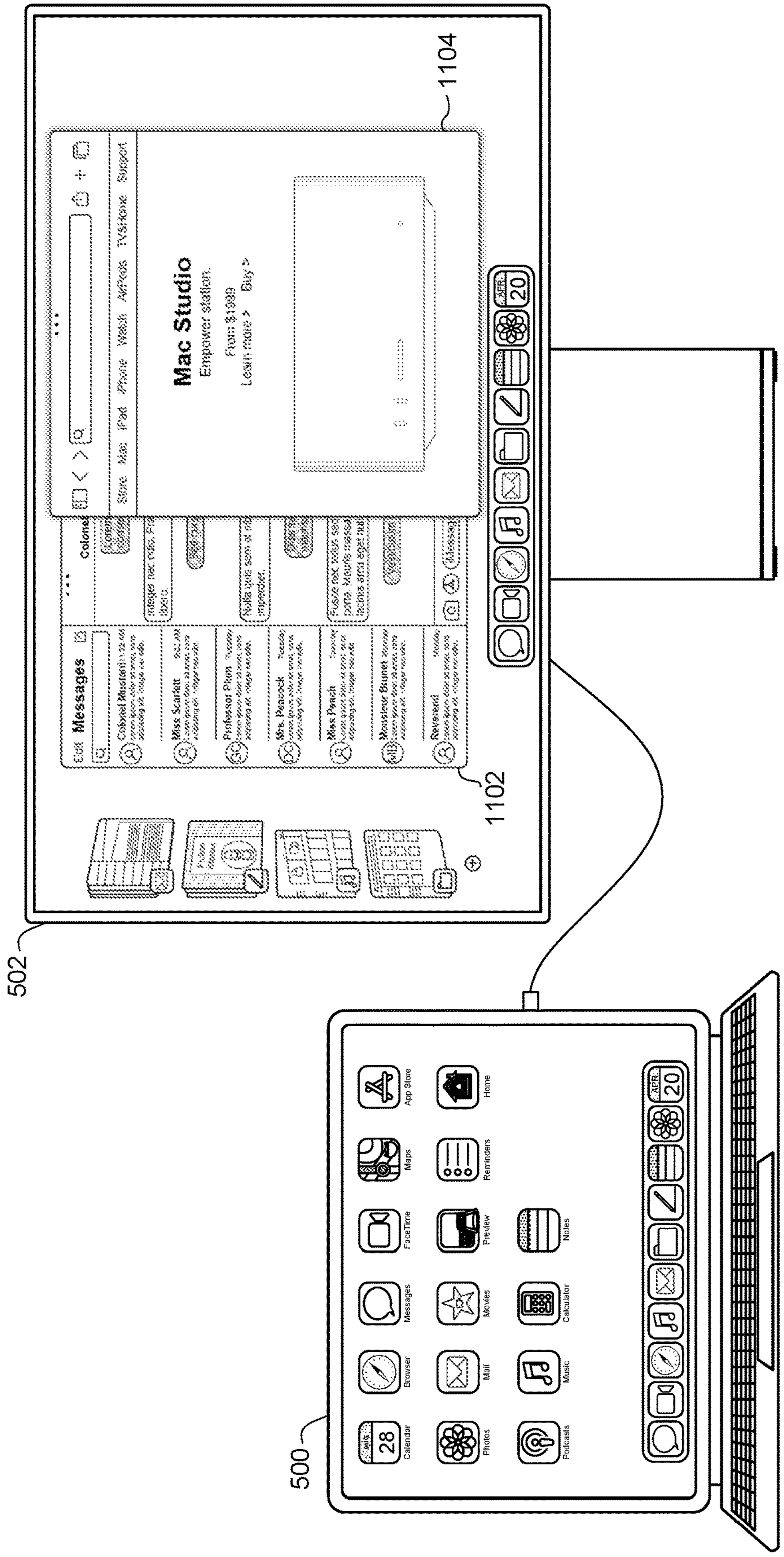
Figure 11B:
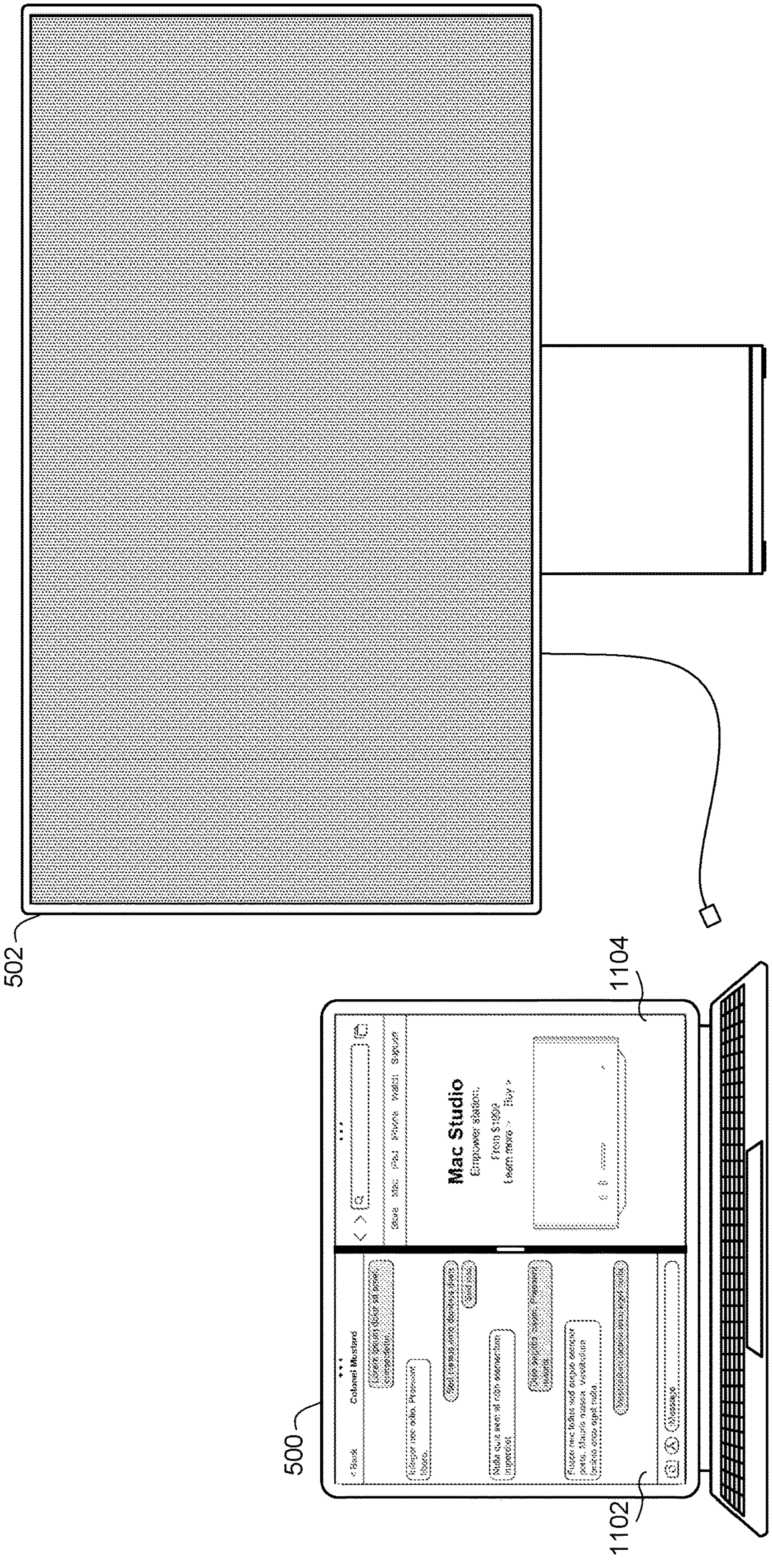

In FIG. 11A, on display device 502, two windows 1102 and 1104 of a windows grouping are displayed in the stage region 522 with four window grouping representations (each associated with one or more windows) in the strip 556. When display device 502 (the external monitor) is unplugged from device 500, as shown in FIG. 11B, the two windows 1102 and 1104 in the set that were displayed in the stage region move to the display of device 500 in a split-screen configuration, while the representations in the strip are no longer displayed. In some embodiments, if more than two windows are displayed in the stage region before the display device 502 is unplugged from device 500, then two of the windows (e.g., the last two windows the user interacted with) are displayed in the split-screen configuration while the remaining windows are decoupled from the set and selectable in an application switcher interface (described below) in full-screen configurations.

Figure 11C:
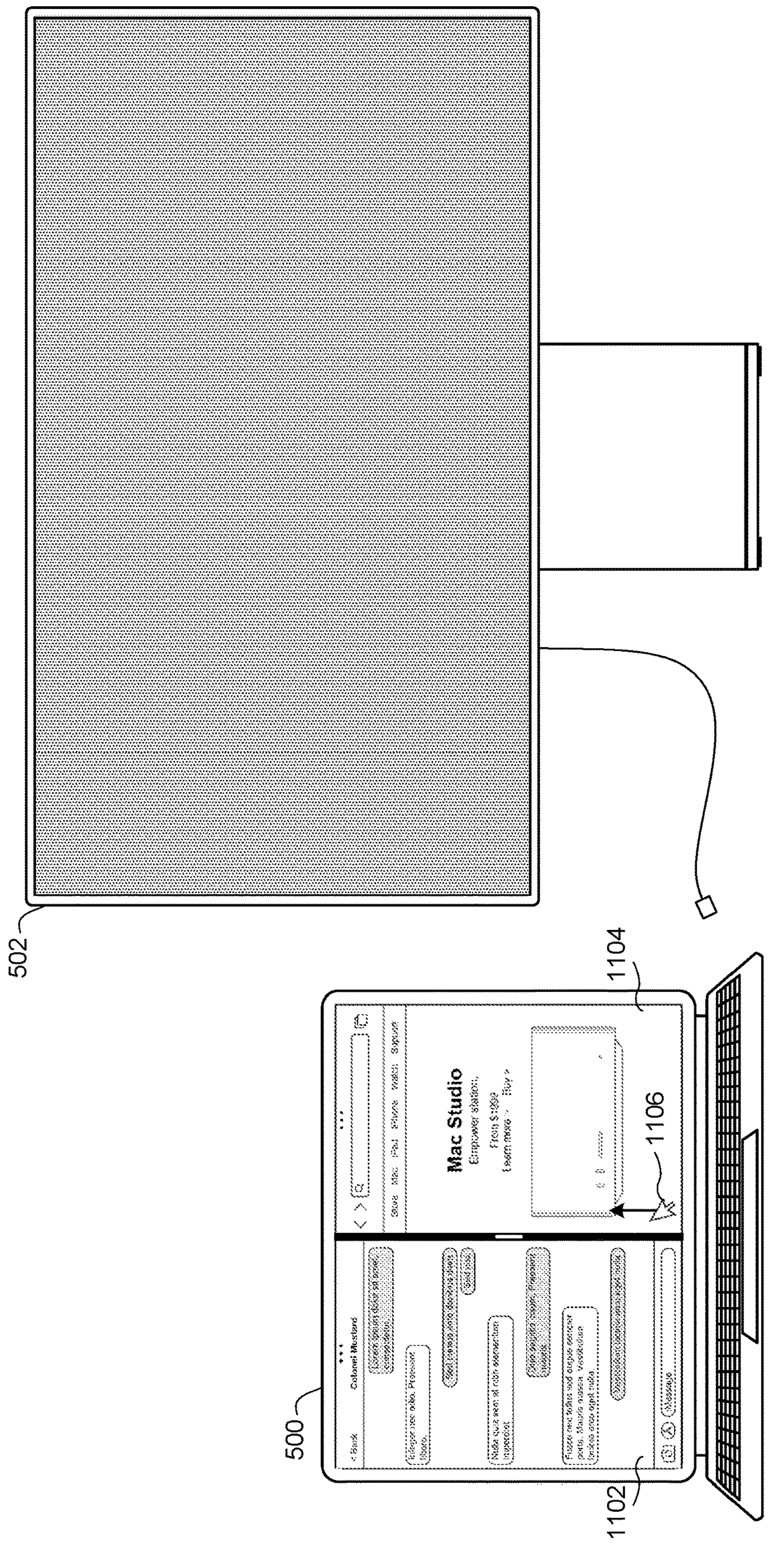
Figure 11D:
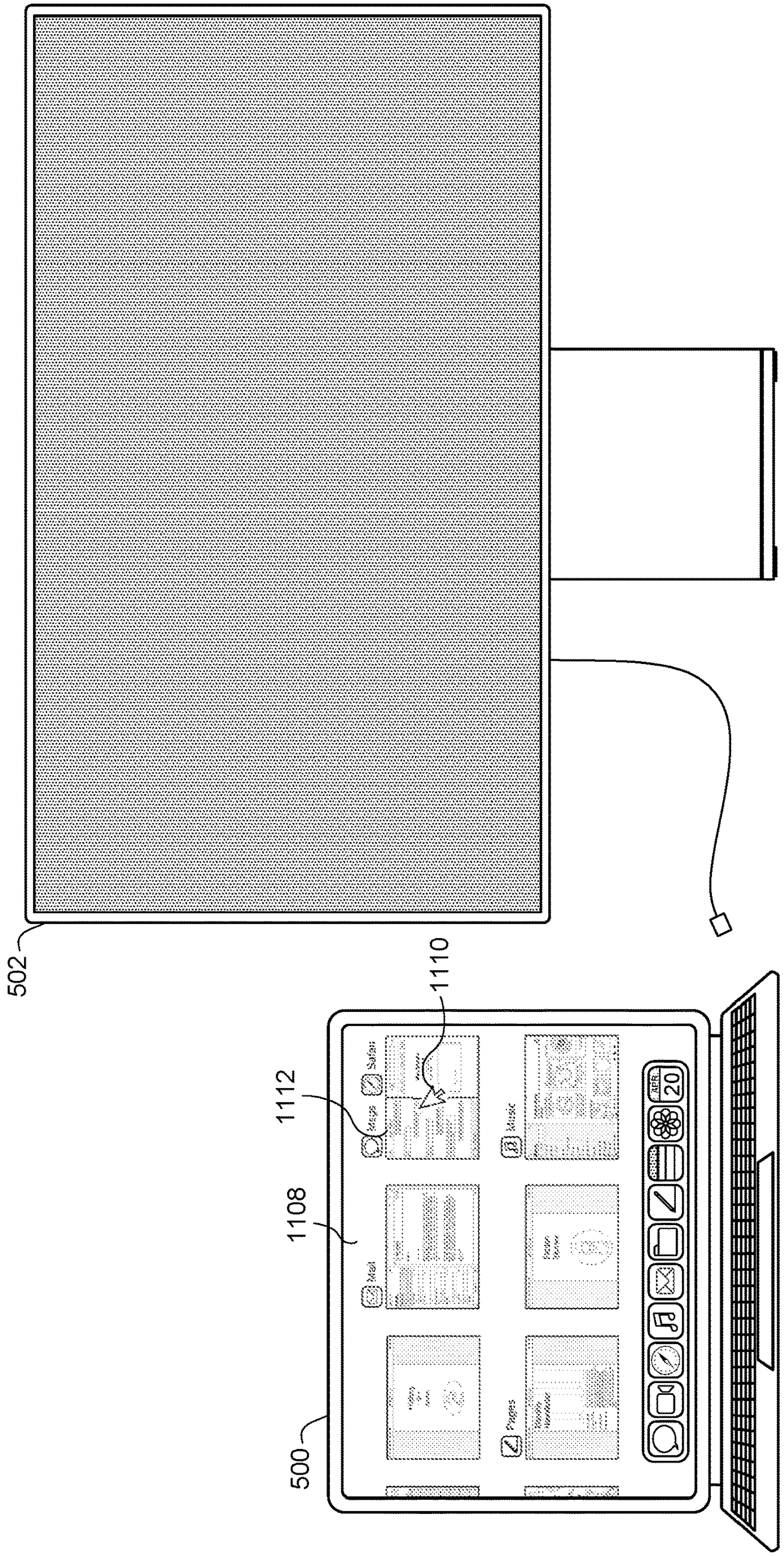

In FIG. 11C, user input 1106 (e.g., a finger swipe or a click-and-drag input) invokes an application switcher interface 1108, as shown in FIG. 11D. The application switcher interface includes a plurality of application windows in full-screen and split-screen configurations, and optionally other display configurations as long as device 500 can support such configurations. For scenarios in which device 500 supports full-screen and split-screen configurations, the state of the concentration mode is remembered (stored in memory of device 500) in the event that display device 502 is plugged back in (reconnected), so that the concentration mode may be resumed with the same state as before. In other words, the arrangements of windows, window groupings, and representations of both are remembered when the display device 502 is disconnected, and restored upon reconnection.

Figure 11E:
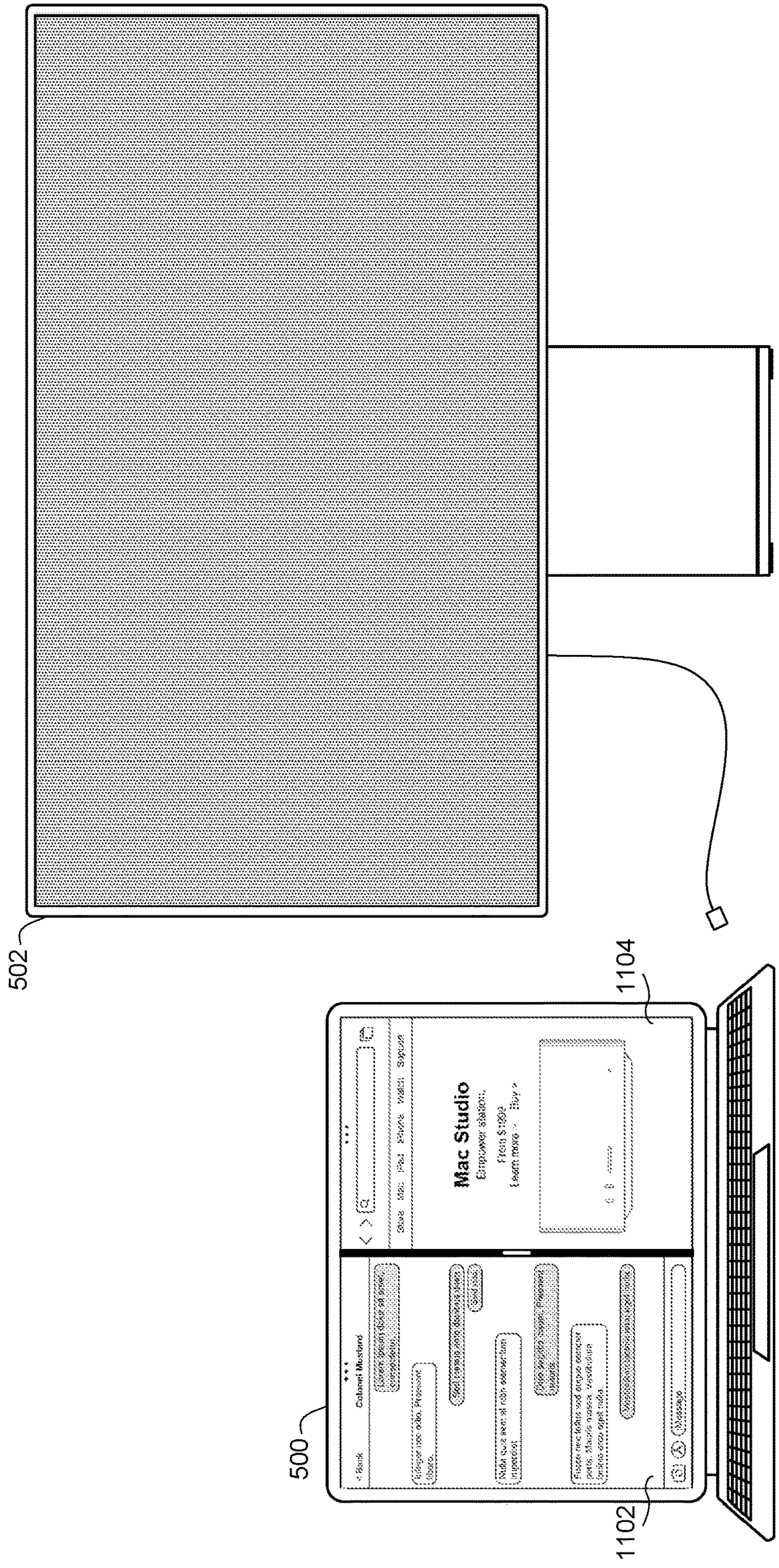
Figure 11F:
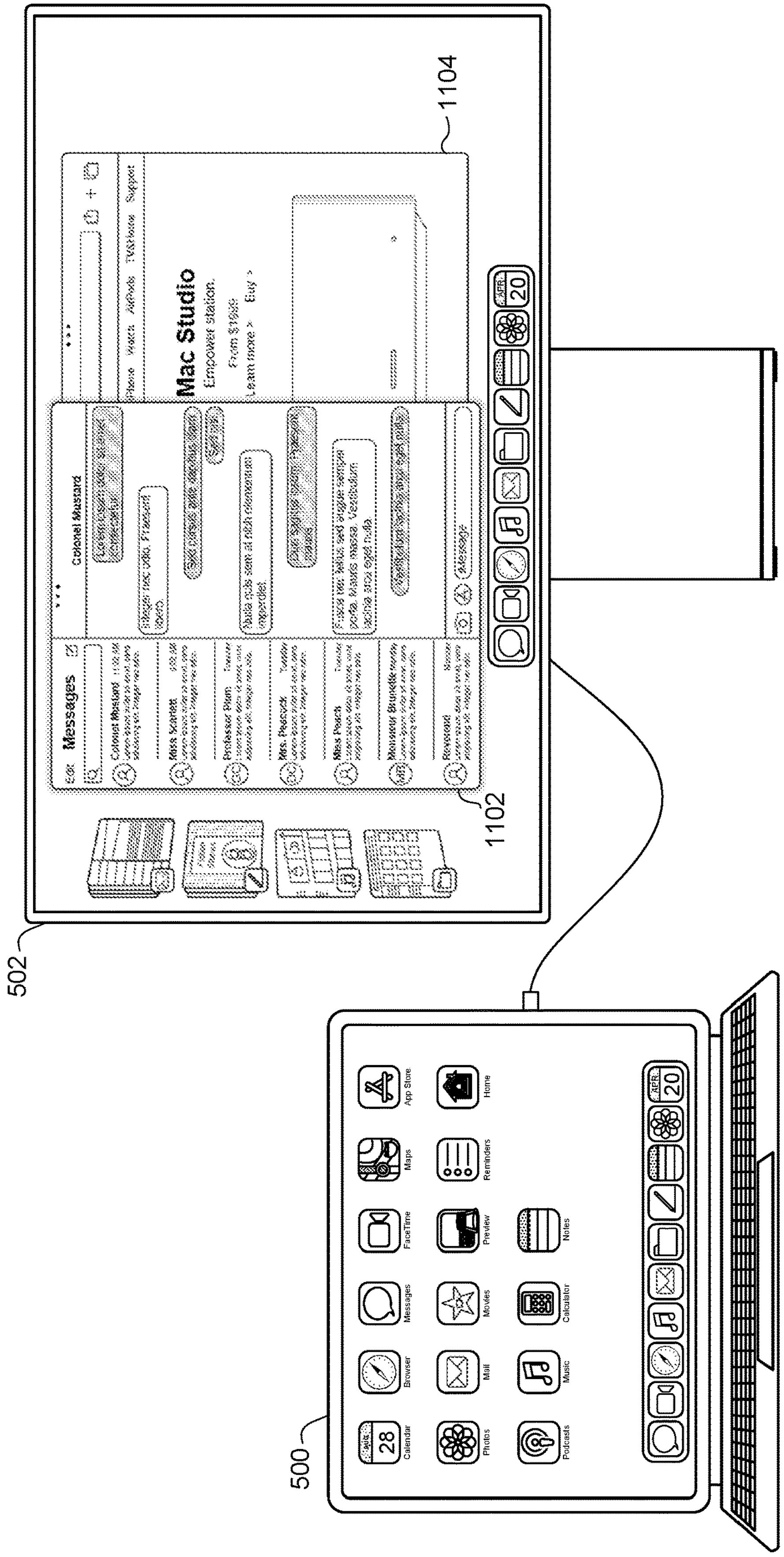
Figure 11G:
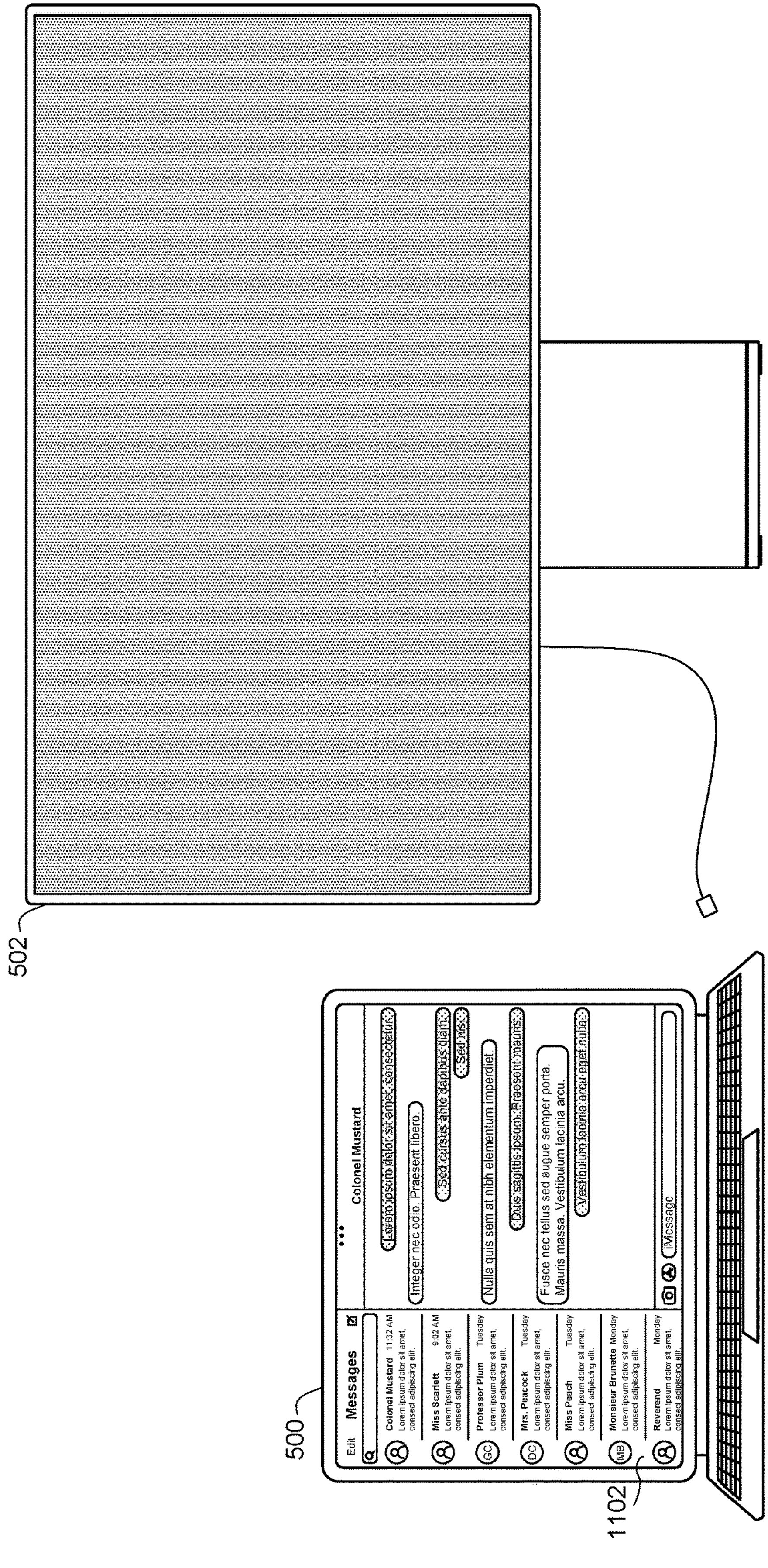
Figure 11H:
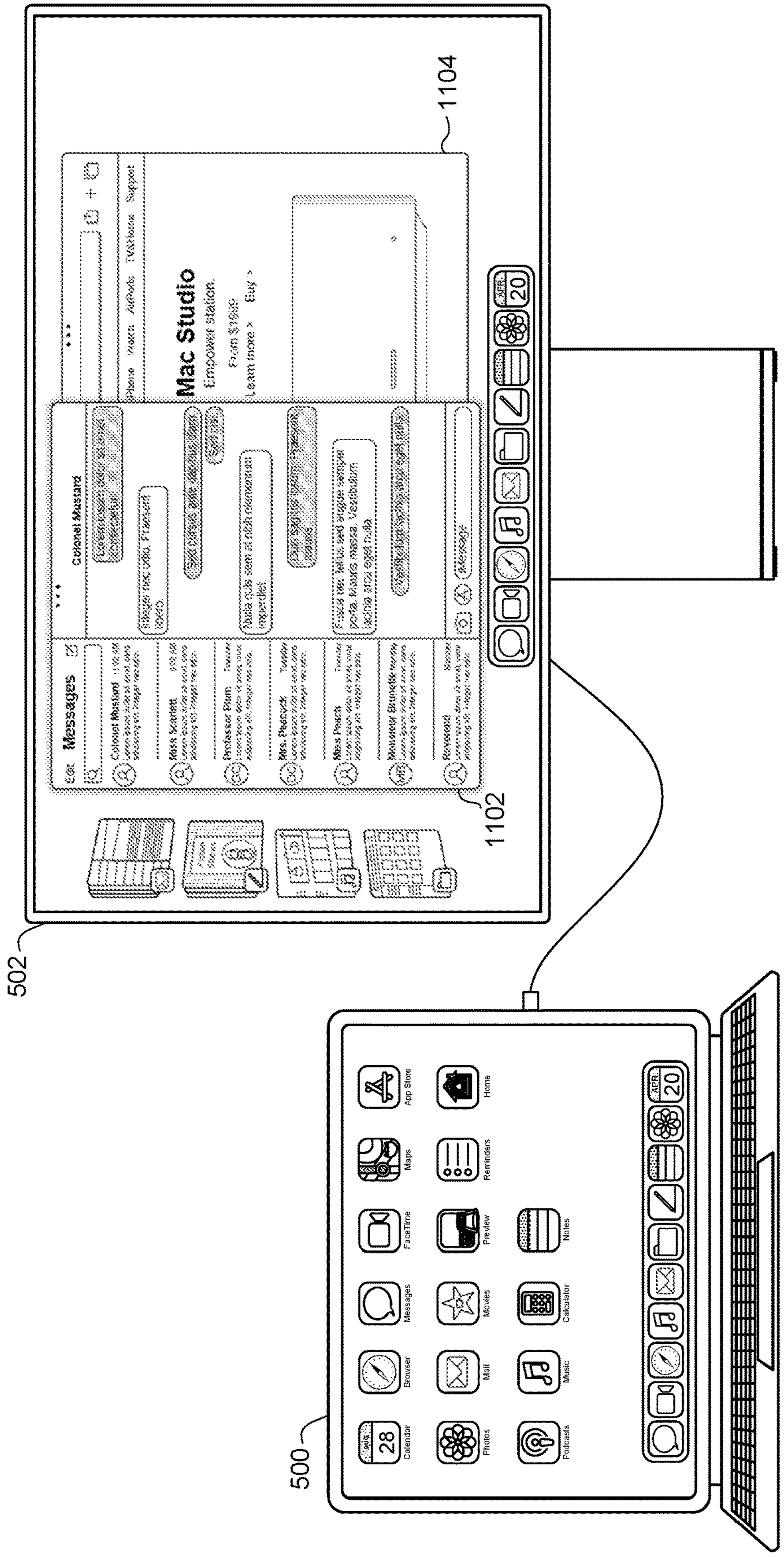

In FIG. 11D, user input 1110 selects a messages portion 1112 of a split-screen configuration for display on device 500, causing the messages application and browser application to once again be displayed in the split-screen view, as shown in FIG. 11E. However, since the messages application was selected, the messages application window 1102 is displayed in the foreground (or as active) when the display device is reconnected to device 500, as shown in FIG. 11F. As such, in some embodiments, when concentration mode is resumed, the window displayed in the foreground of the stage region is the last window to have been selected or interacted with on device 500.

For embodiments in which device 500 supports full-screen application windows, the display configuration of windows displayed in concentration mode is remembered and restored when the display device 502 is reconnected to device 500. For example, in FIG. 11F, a messages window and a browser window are displayed in the stage region on display device 502, with the messages window in the foreground. When display device 502 is disconnected (FIG. 11G), the messages window is displayed in a full-screen configuration on display device. However, when display device 502 is reconnected to device 500 (FIG. 11H), the messages and browser window are both restored to their previous multi-window overlapping configuration.

Figure 12A:
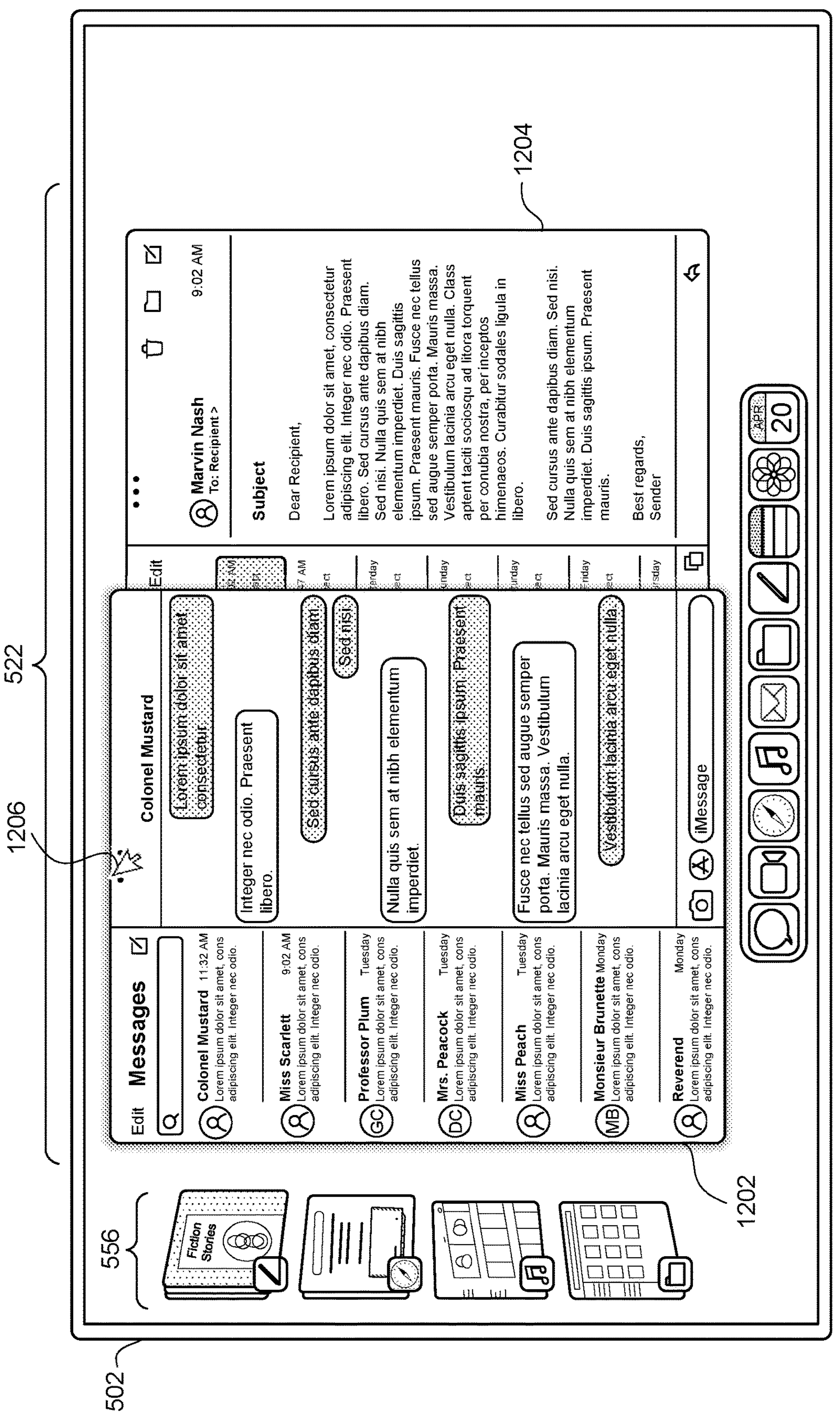
Figure 12B:
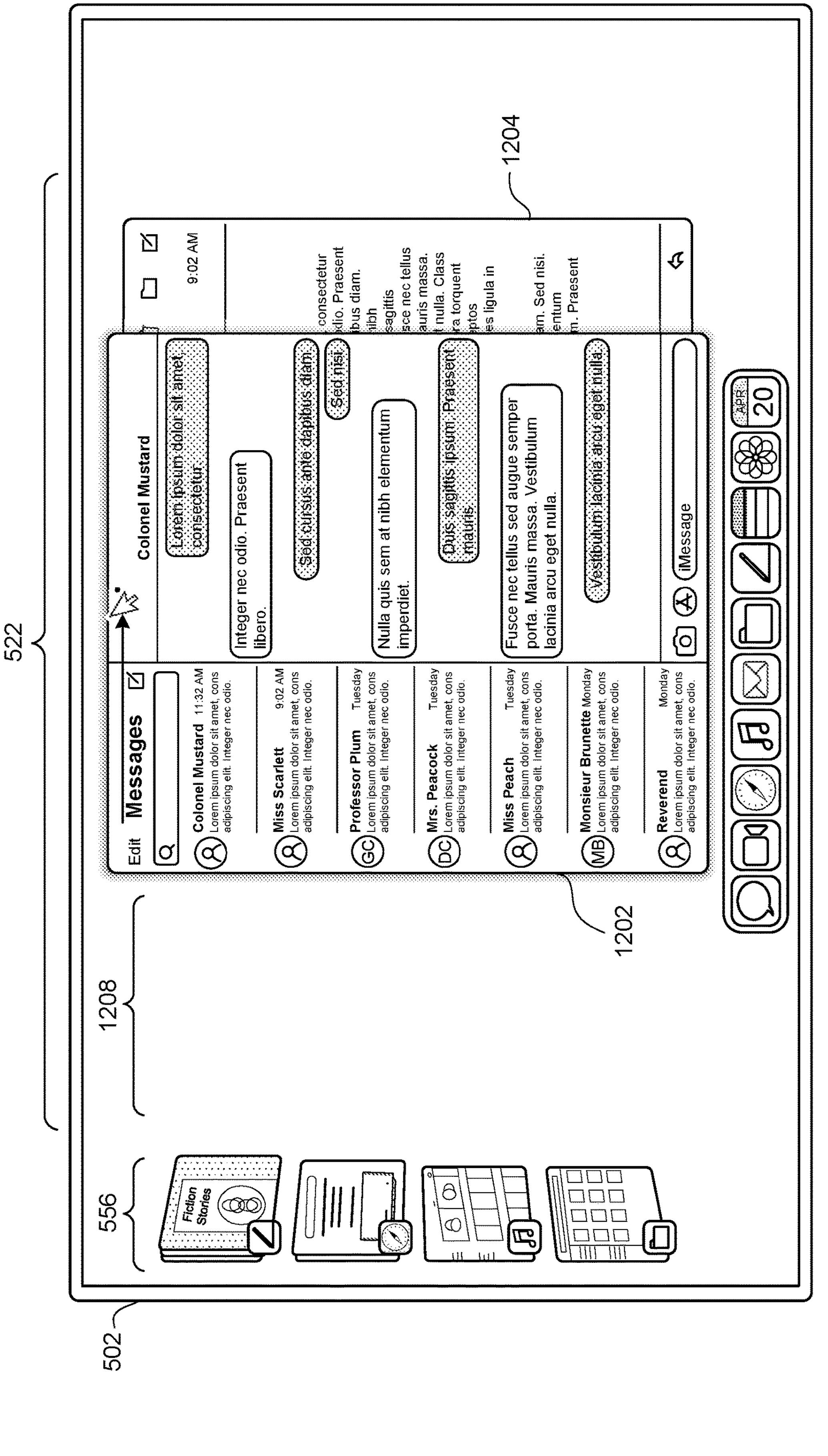
Figure 12C:
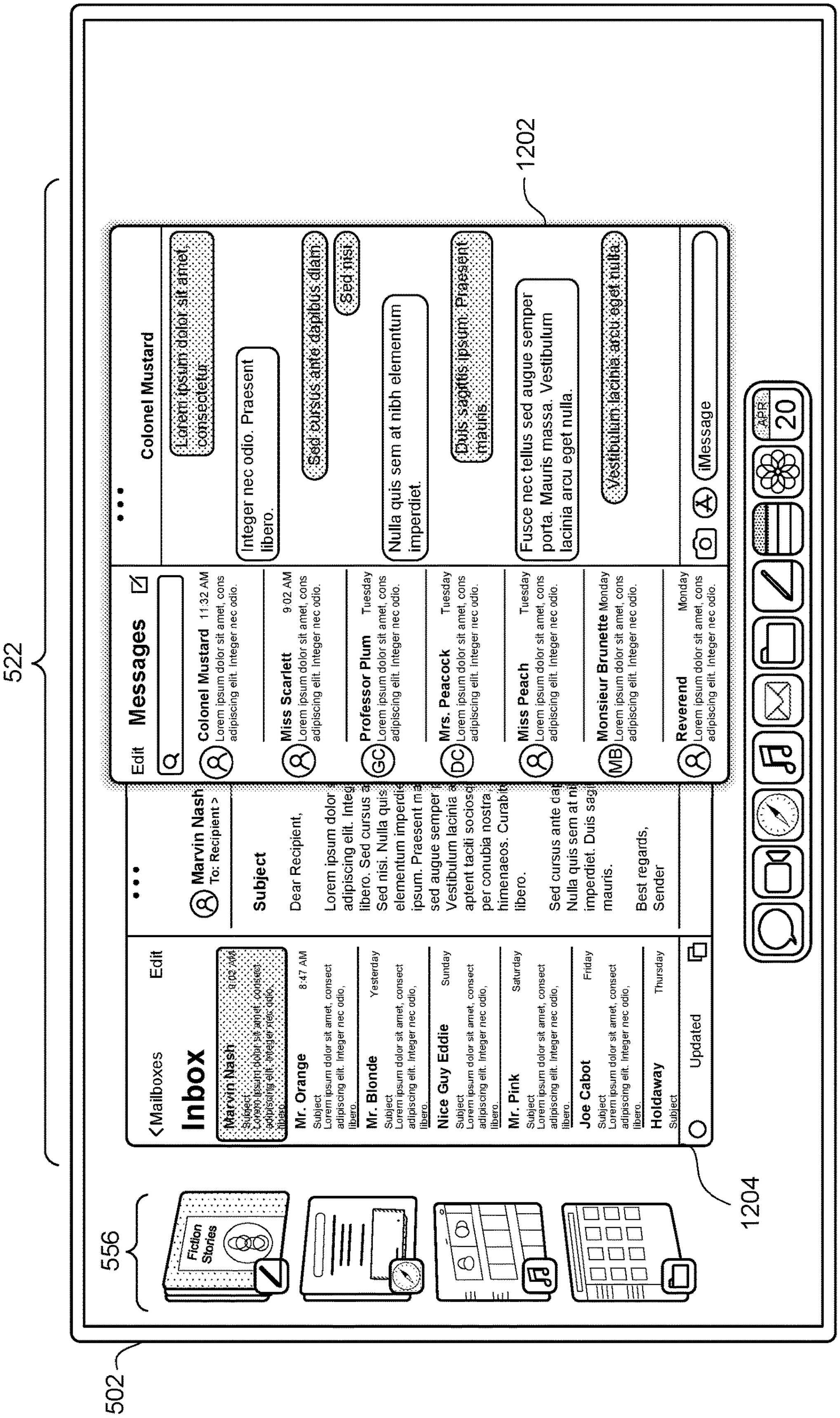
Figure 12D:
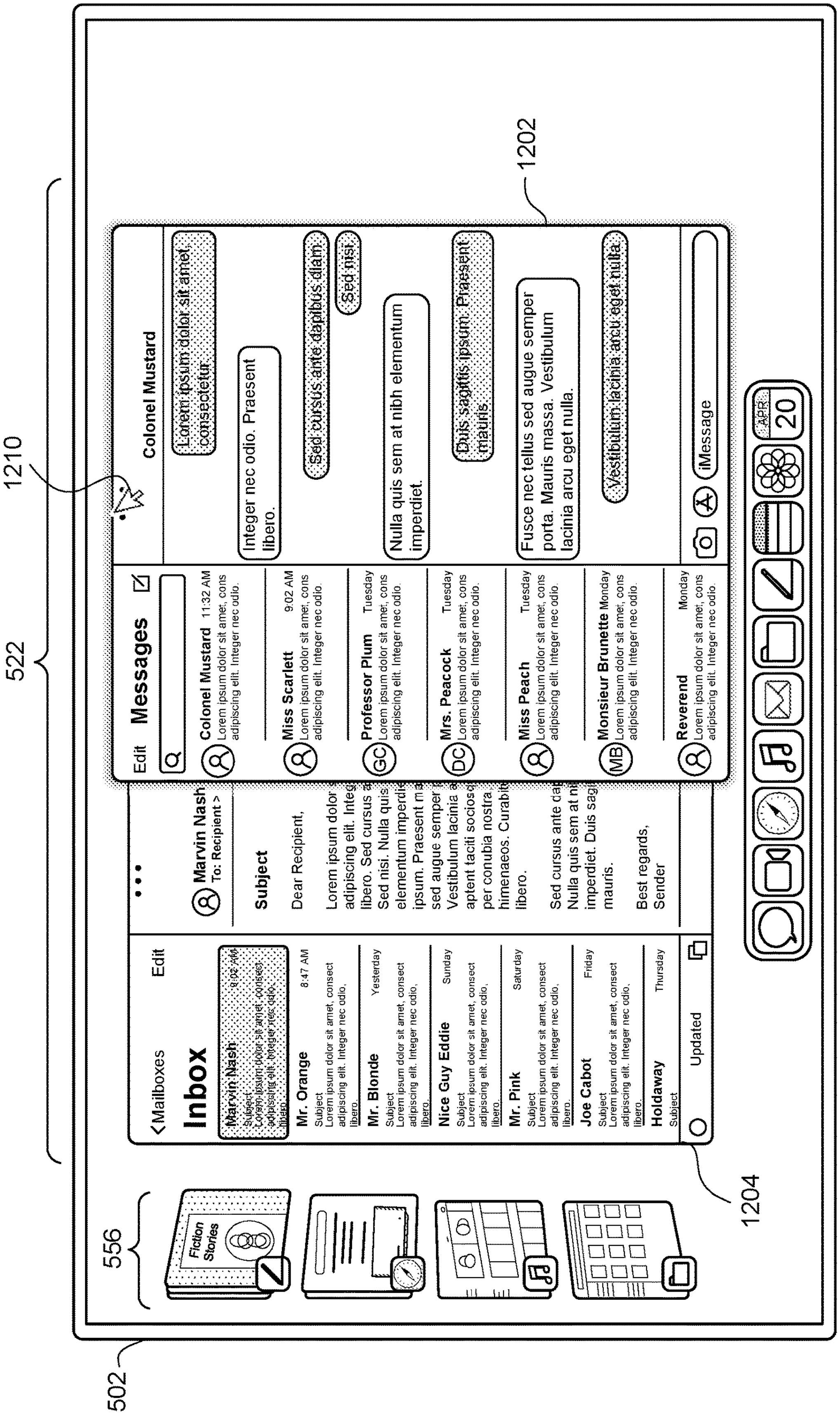
Figure 12E:
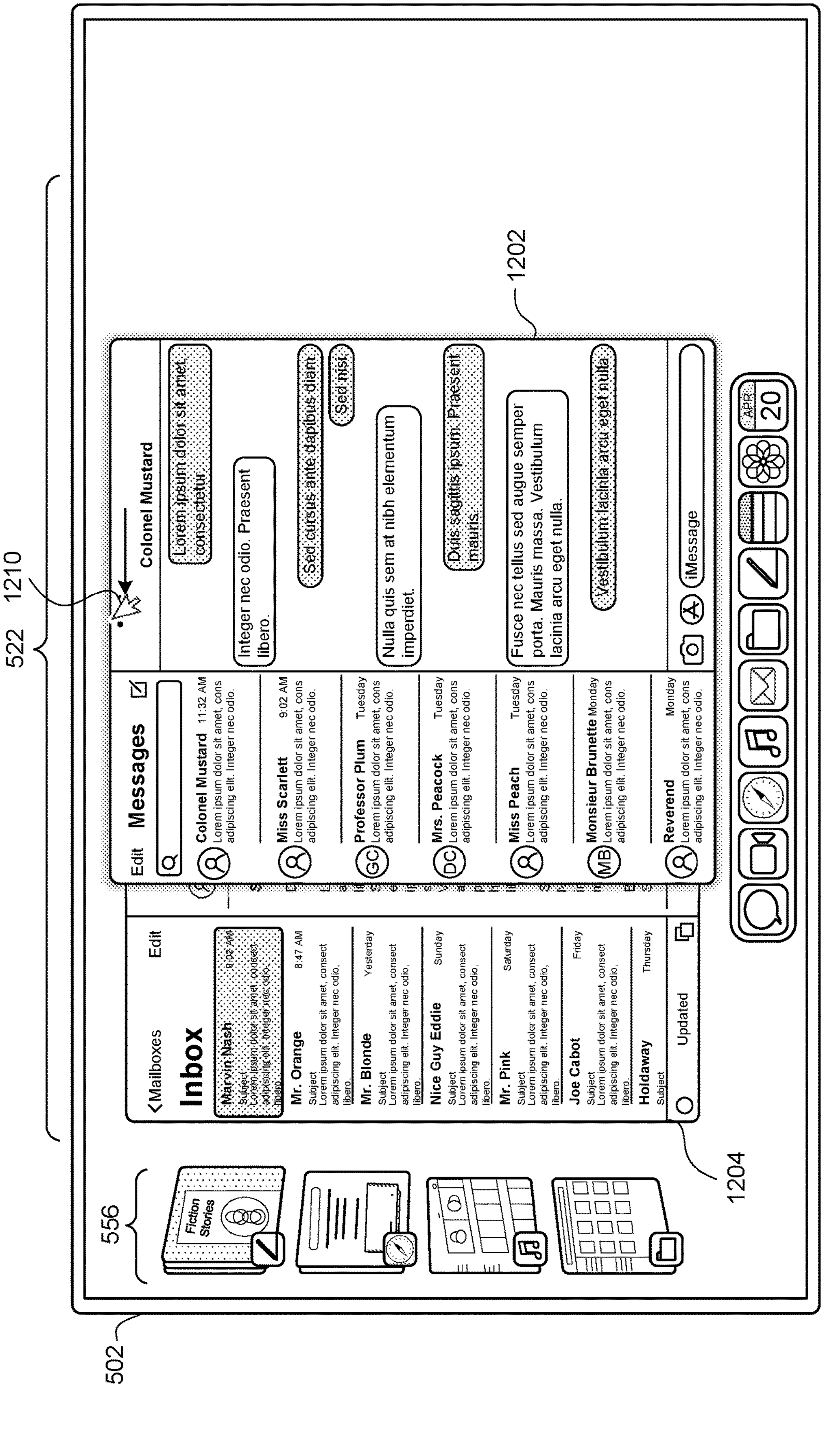
Figure 12F:
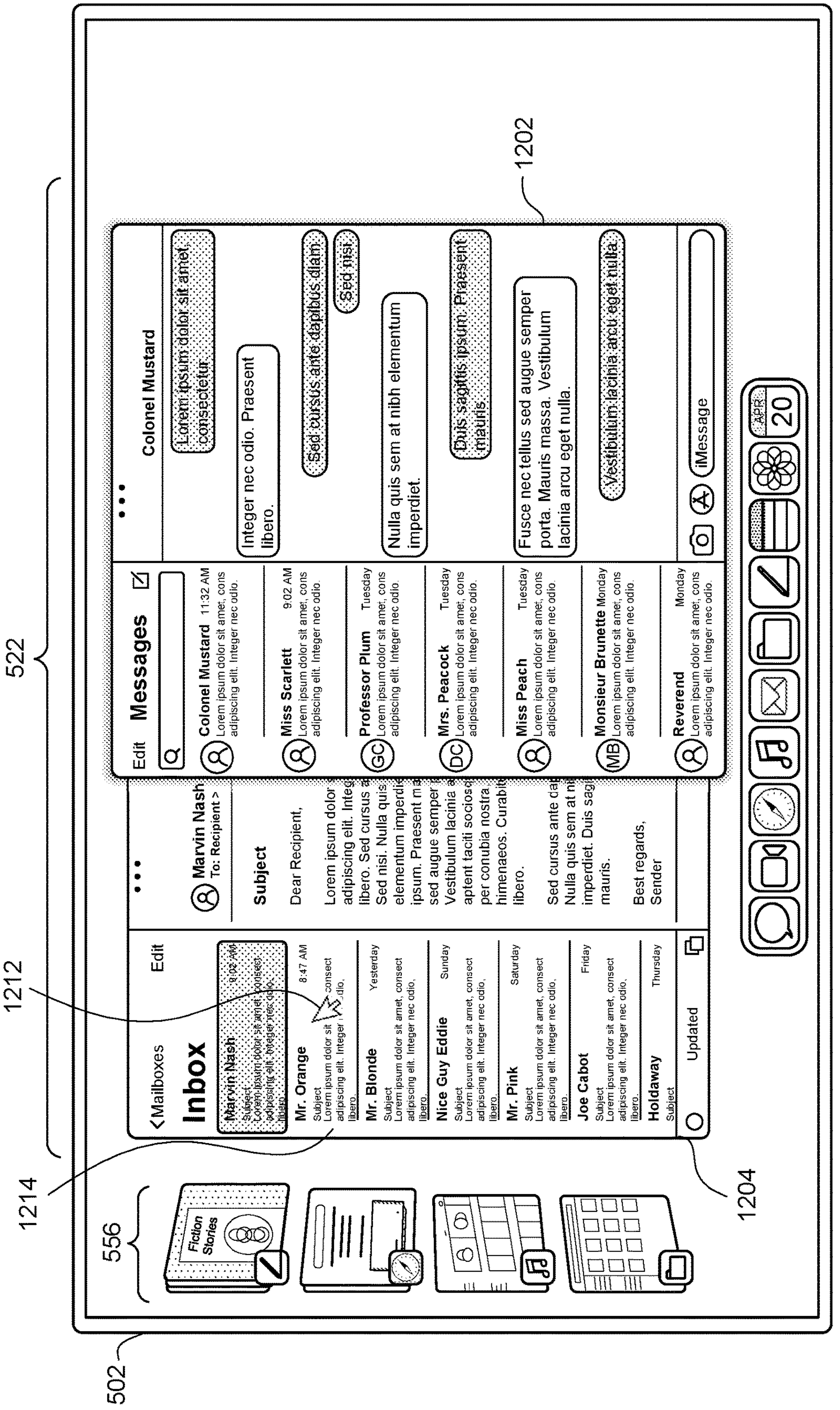
Figure 12G:
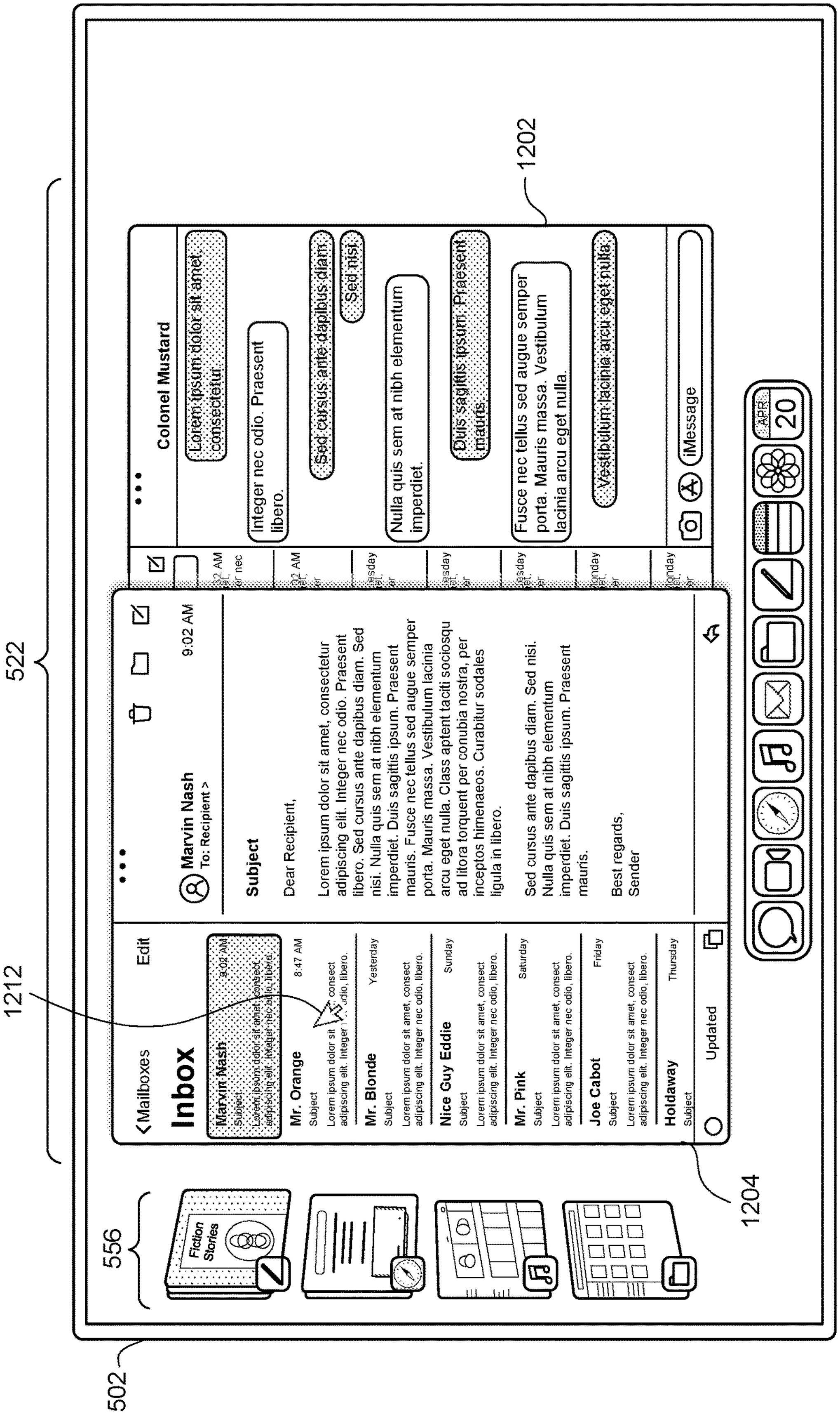
Figure 12H:
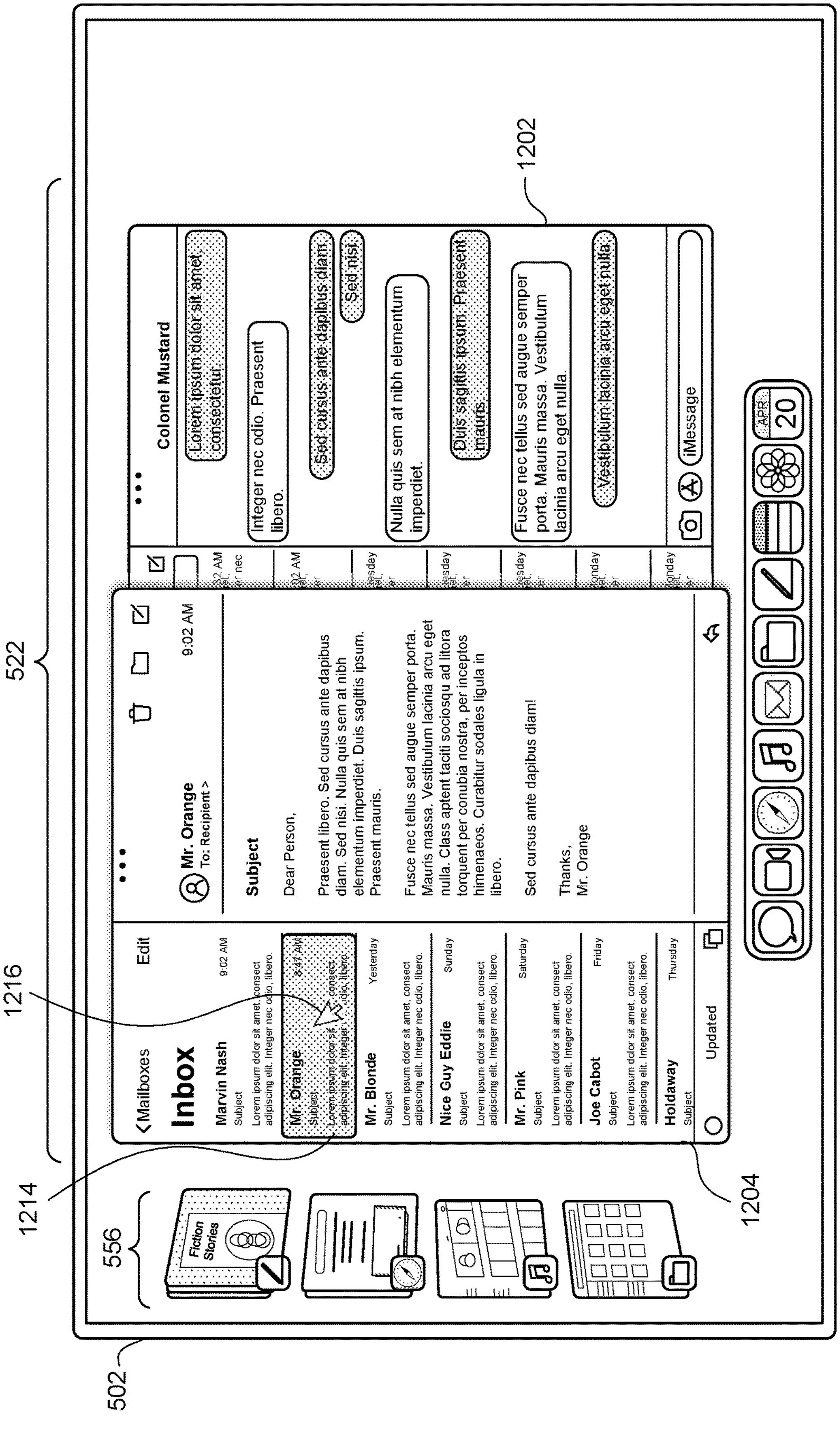
Figure 12I:
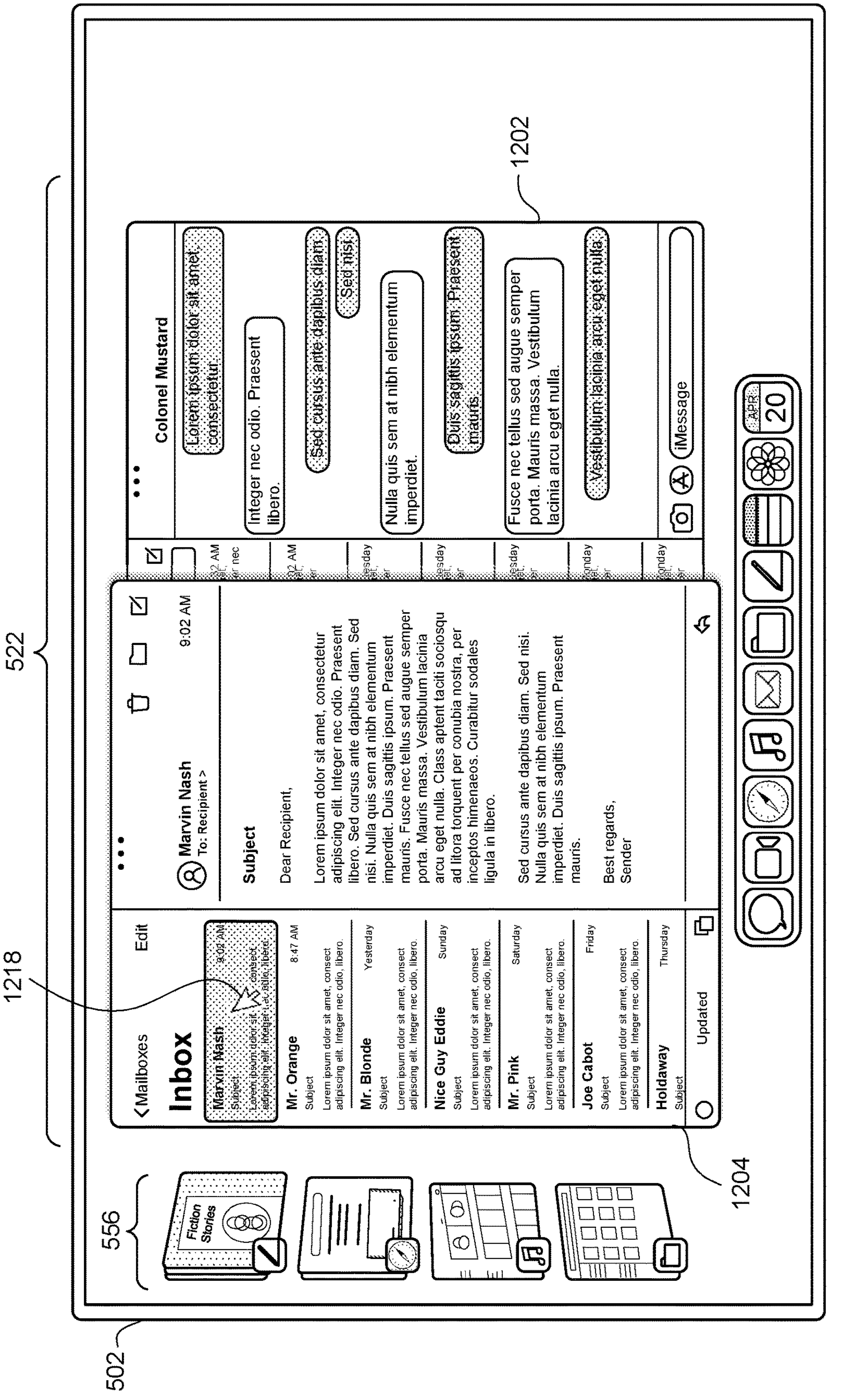
Figure 12J:
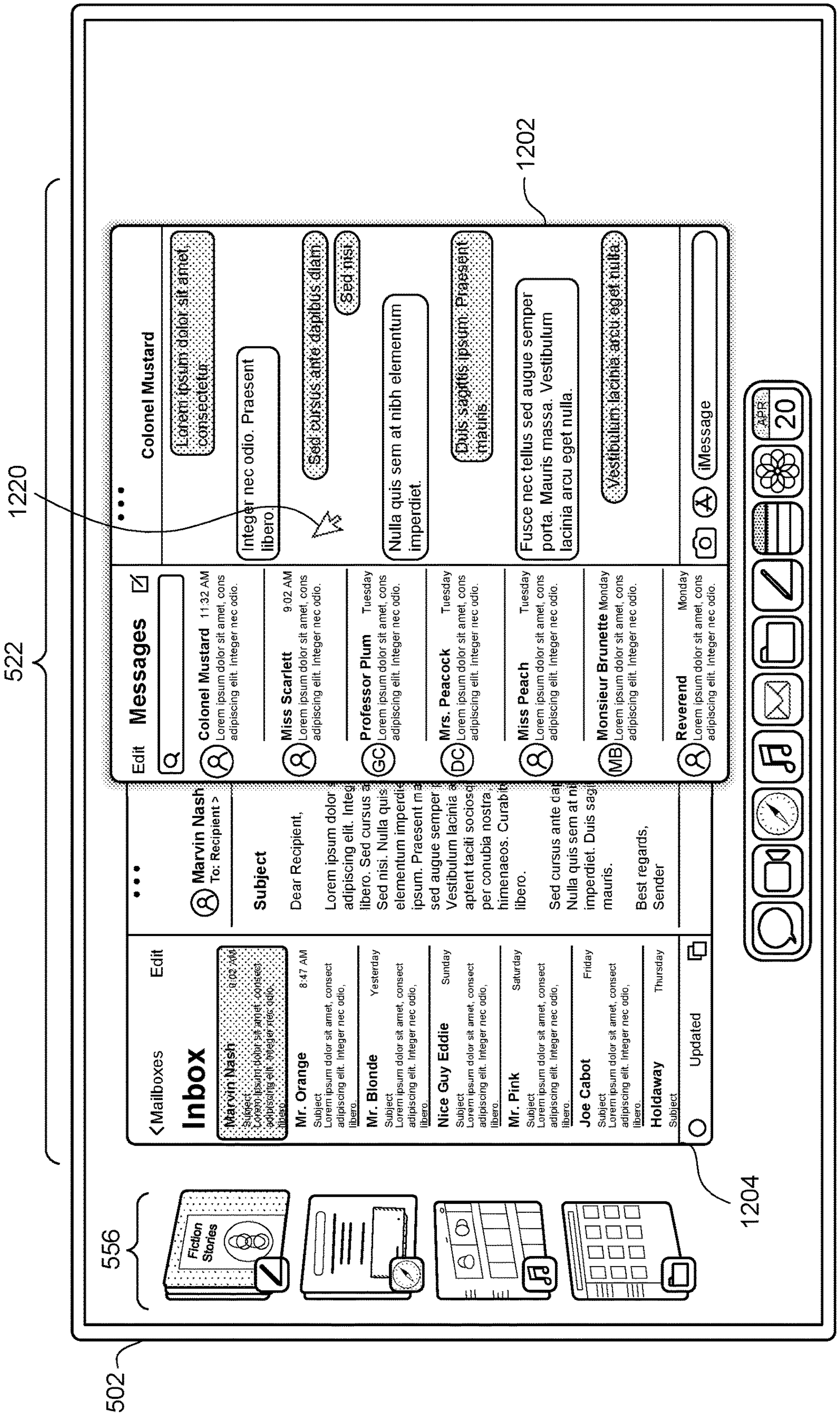
Figure 12K:
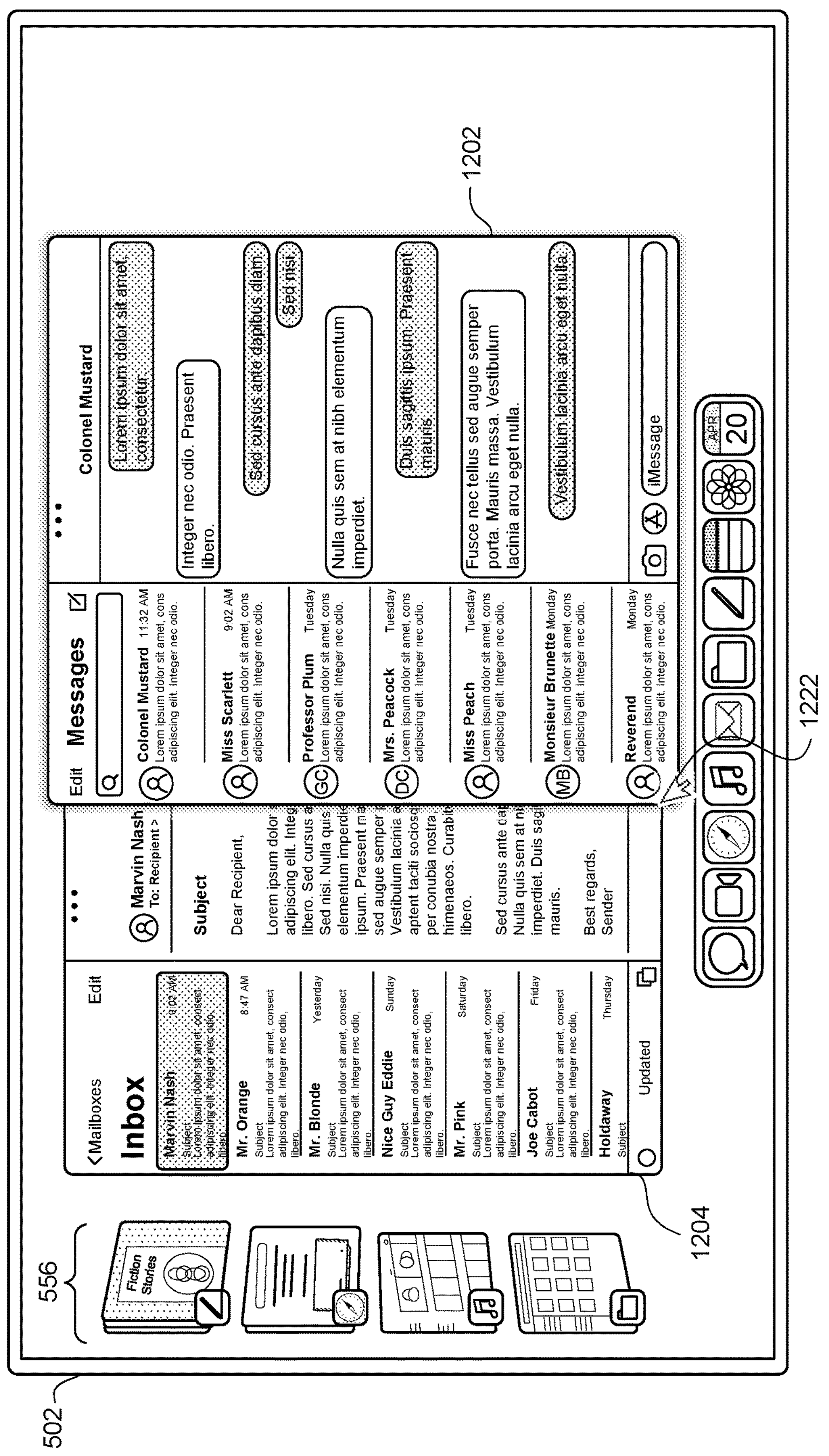
Figure 12L:
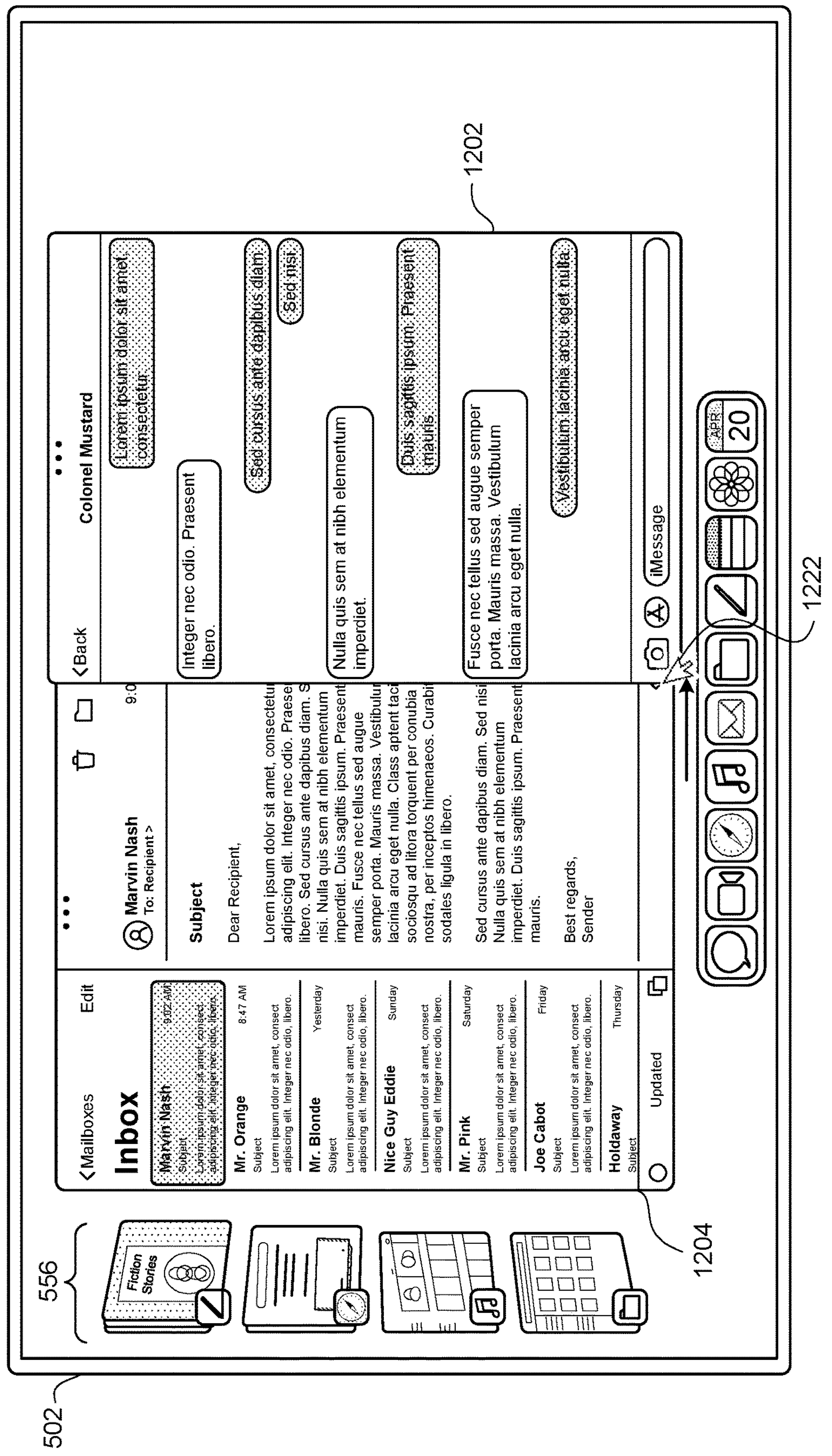
Figure 12M:
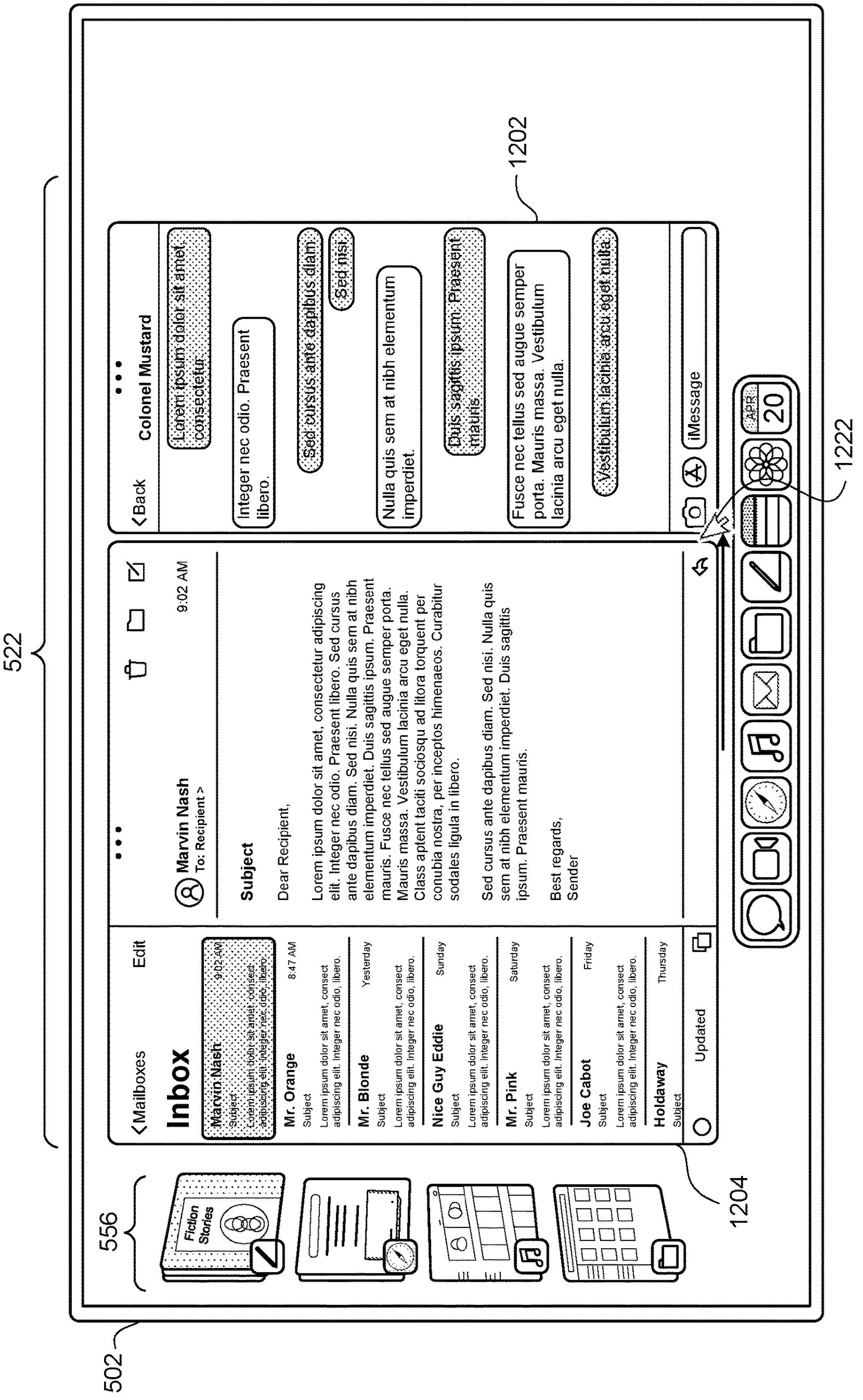
Figure 12N:
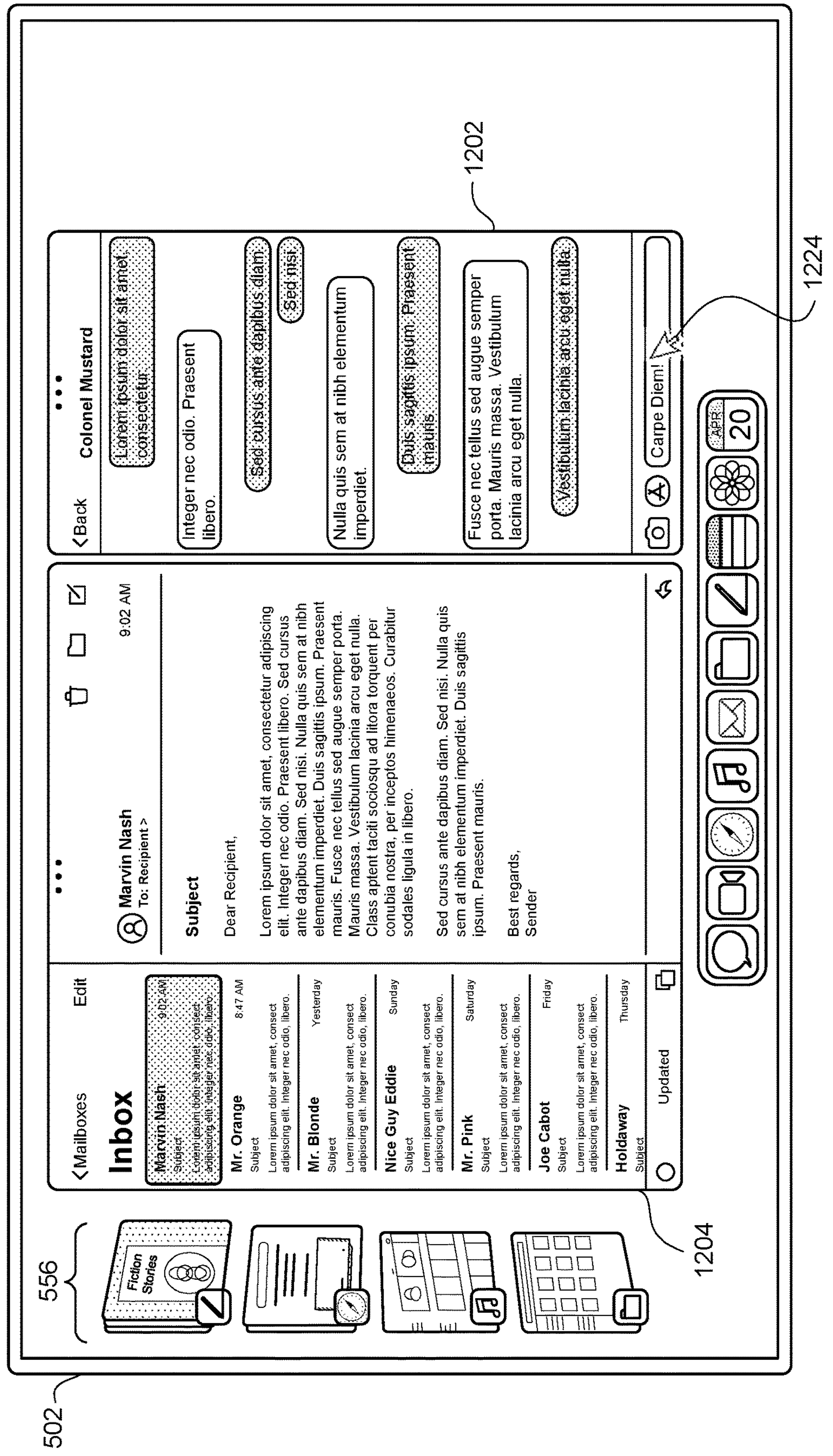
Figure 12O:
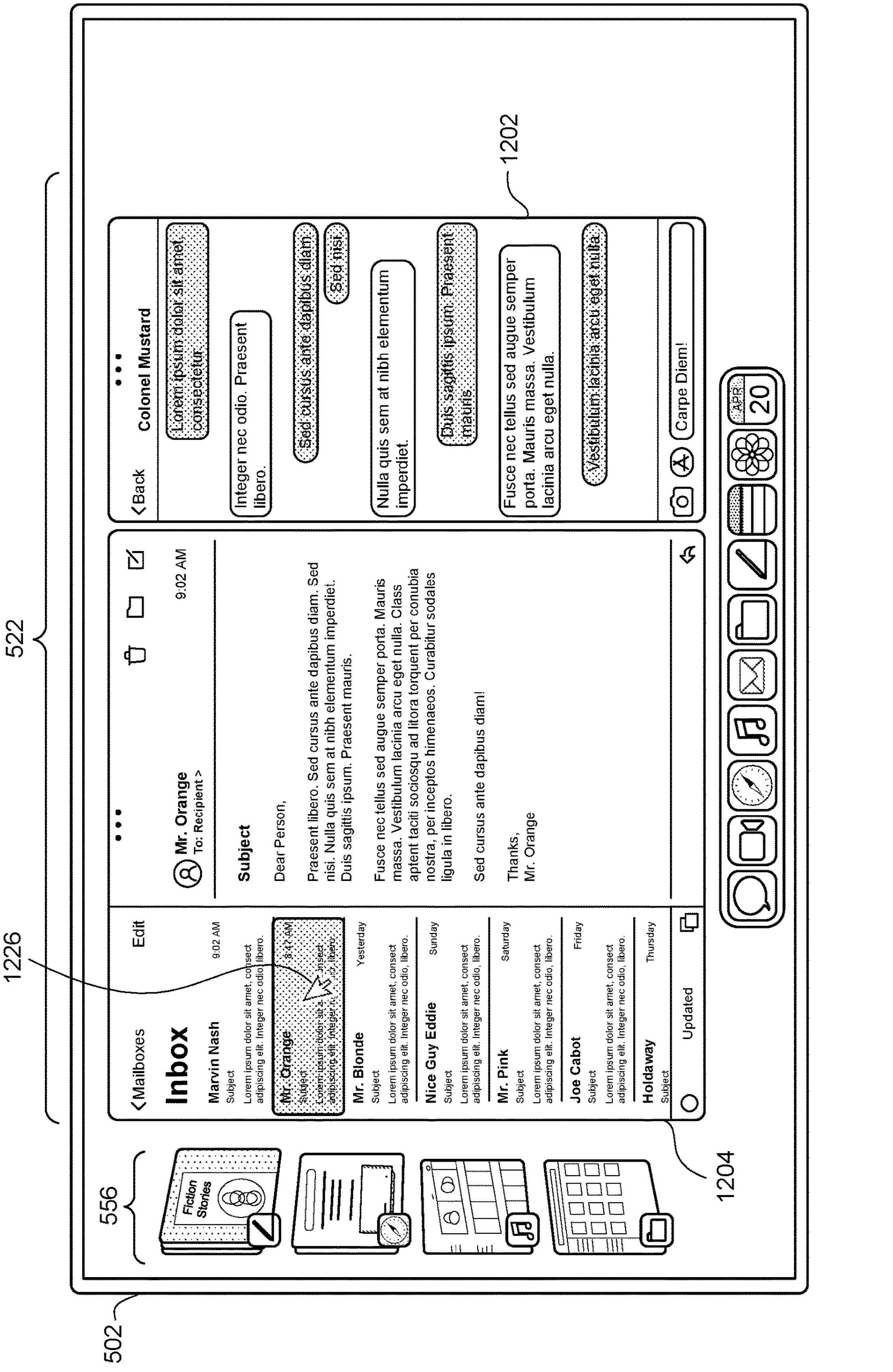
Figure 12P:
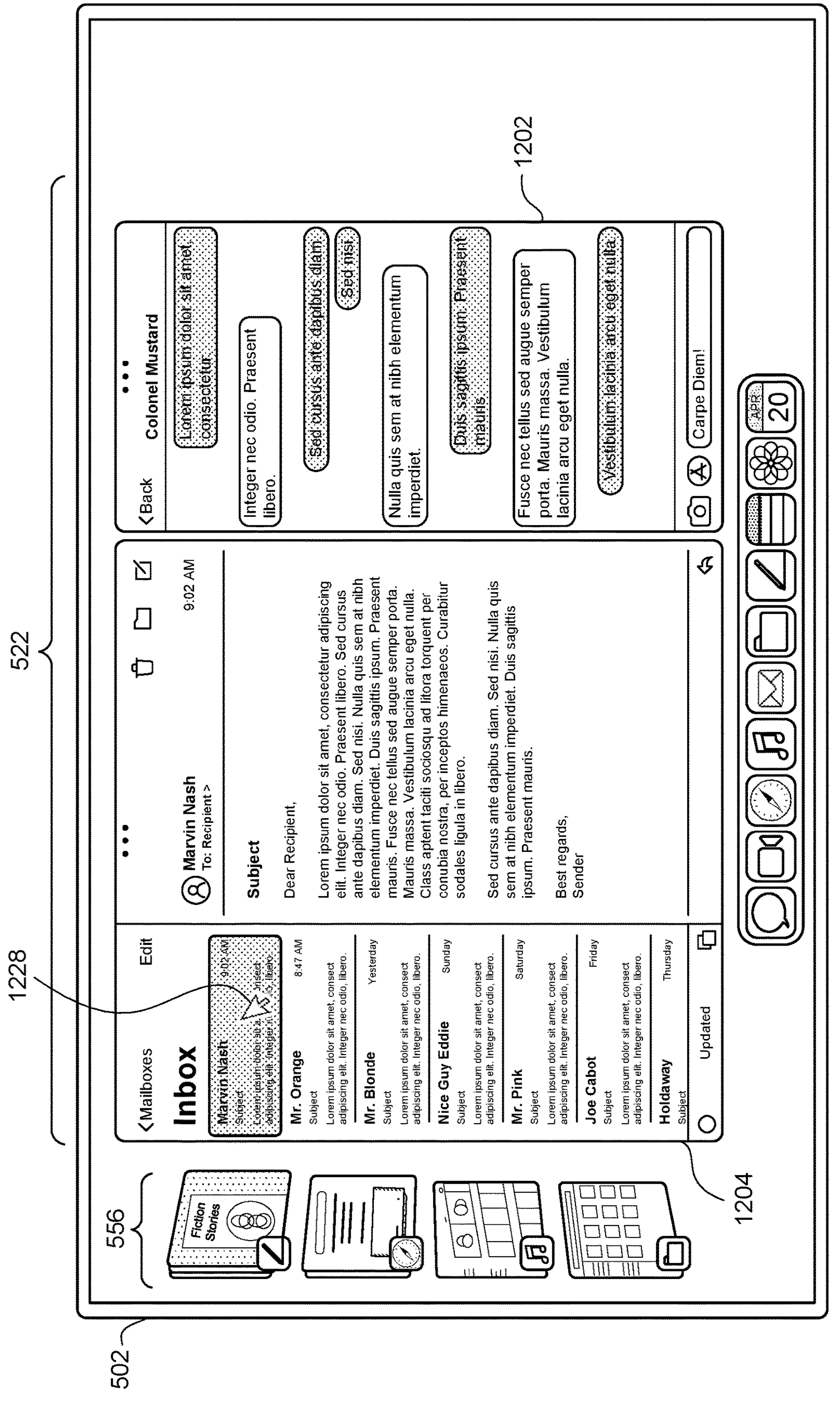
Figure 12Q:
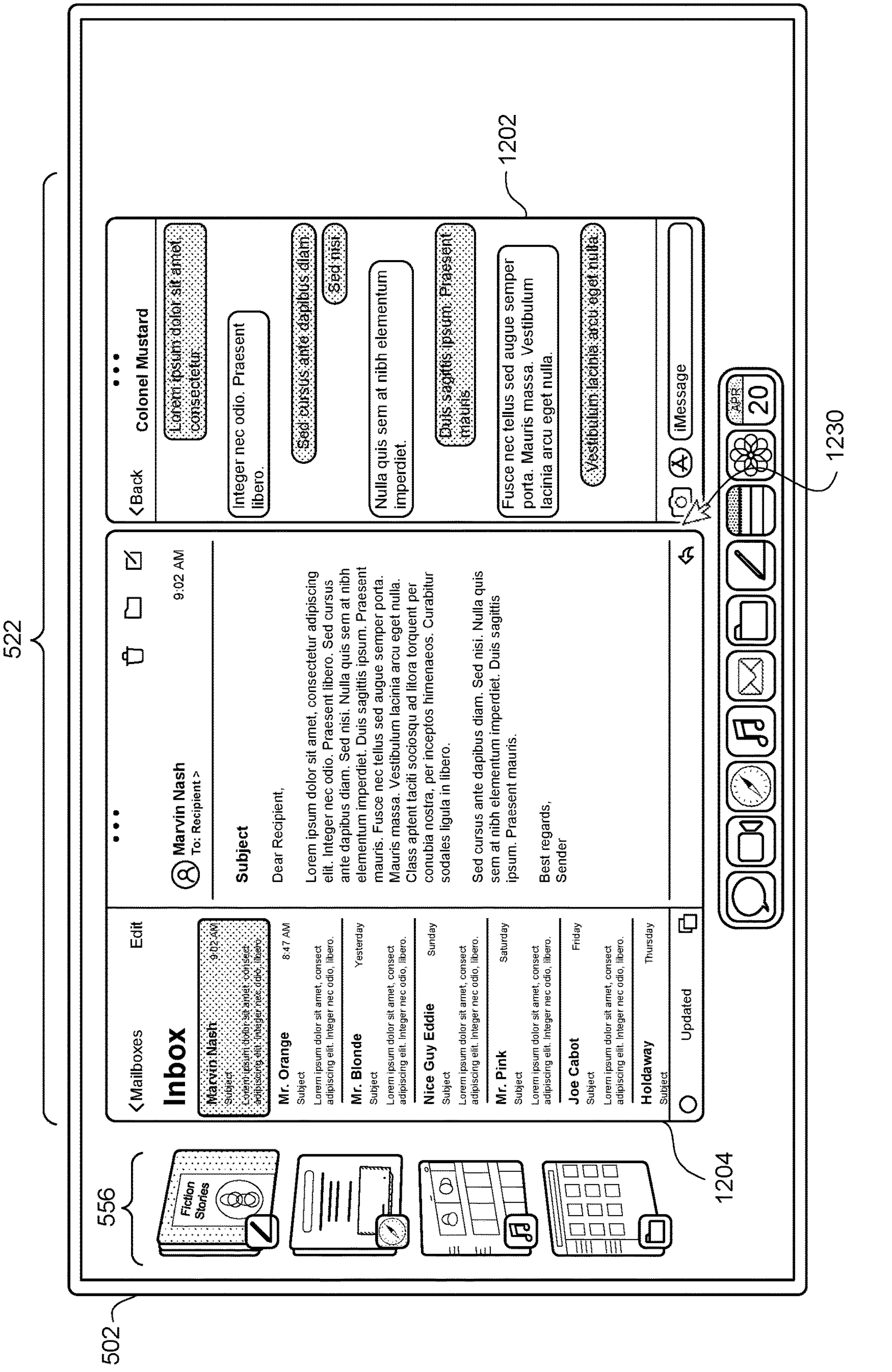
Figure 12R:
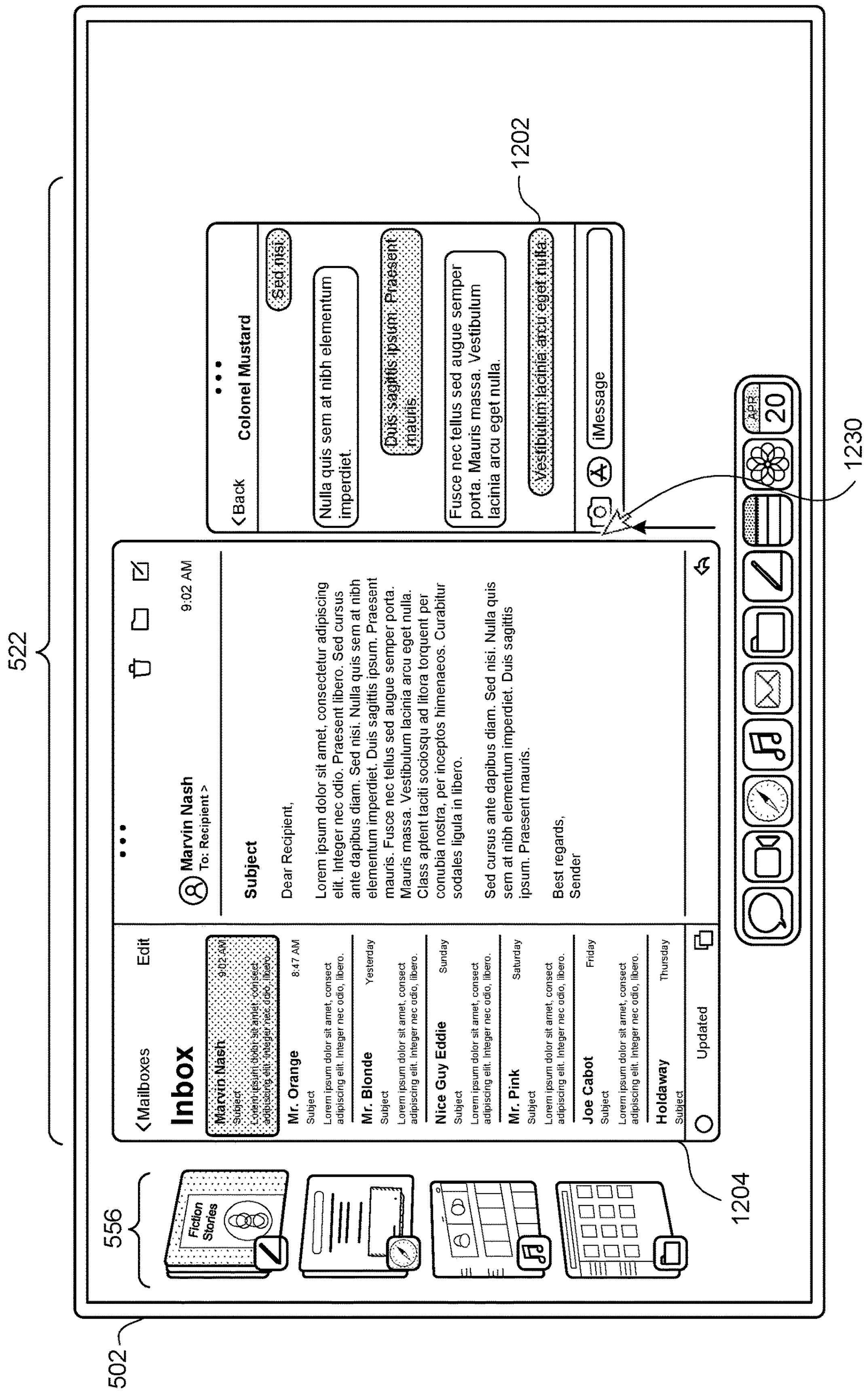
Figure 12S:
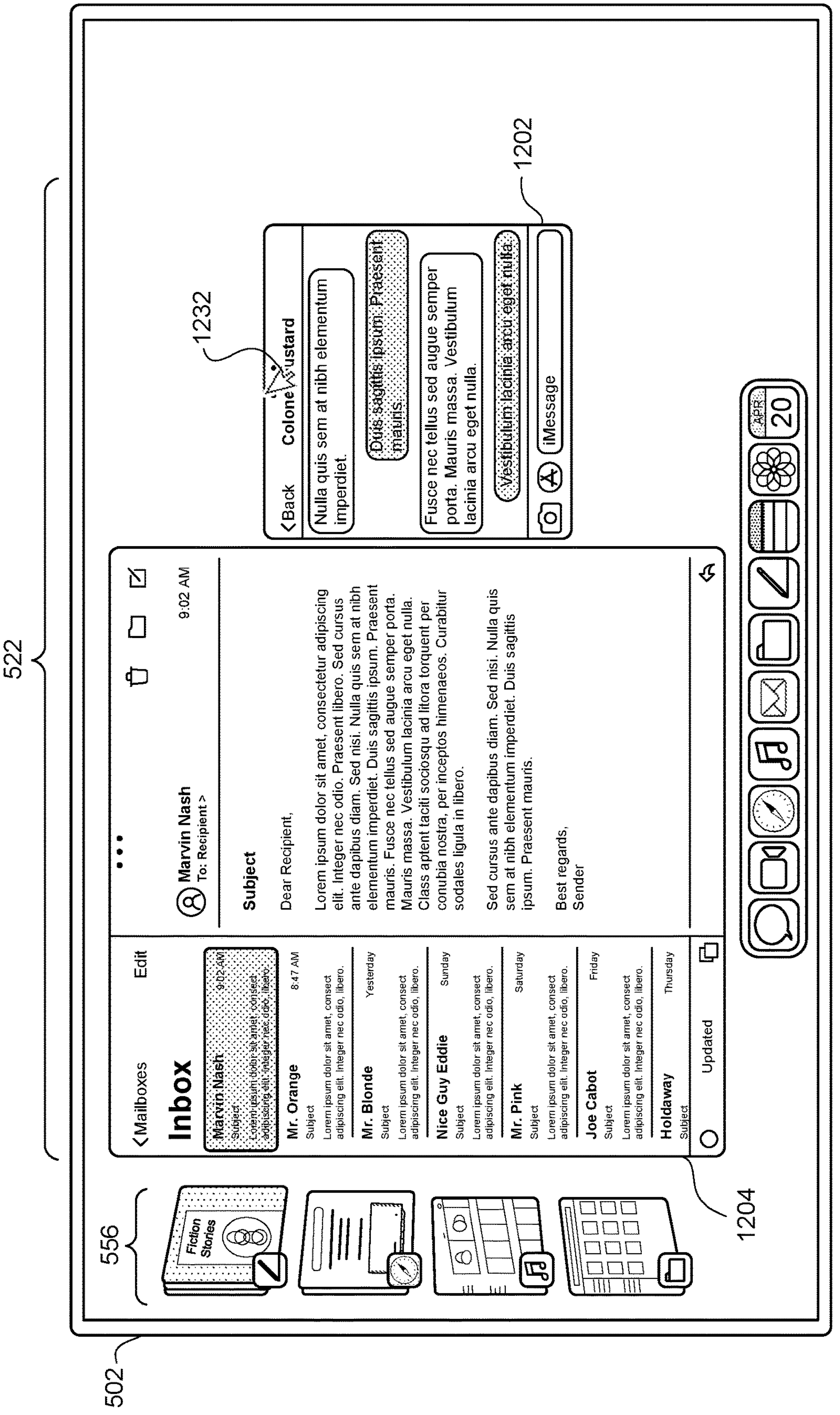
Figure 12T:
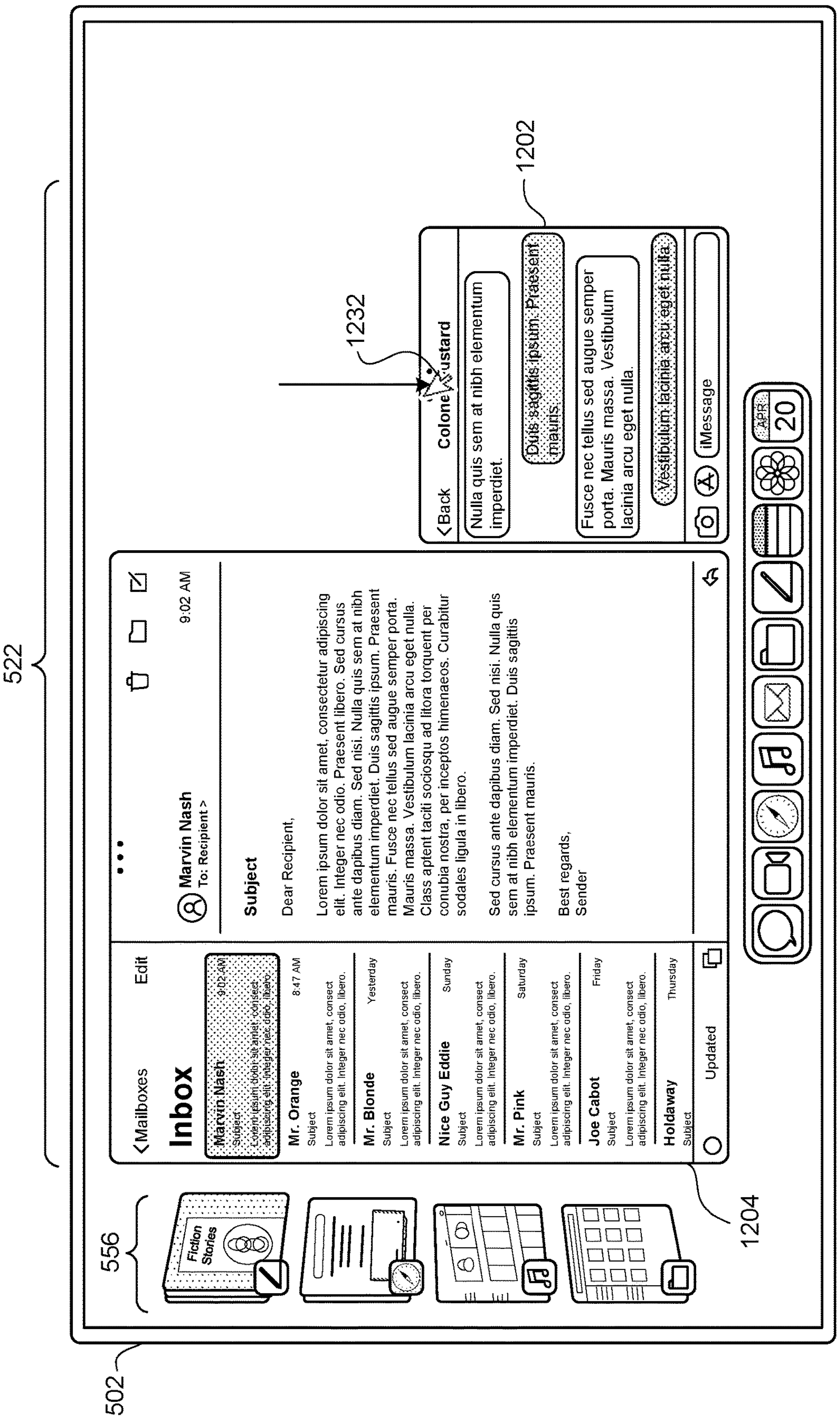
Figure 12U:
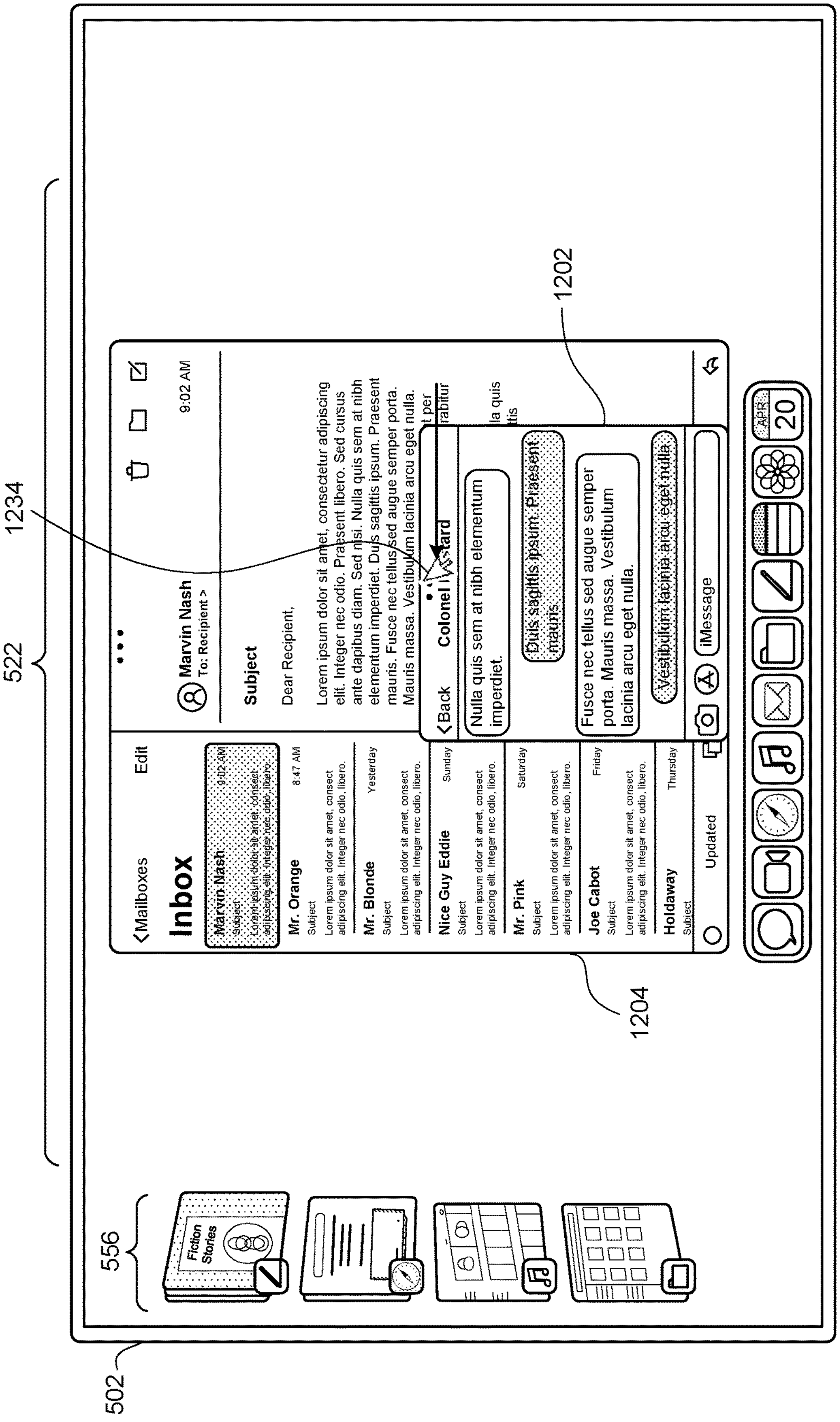
Figure 12V:
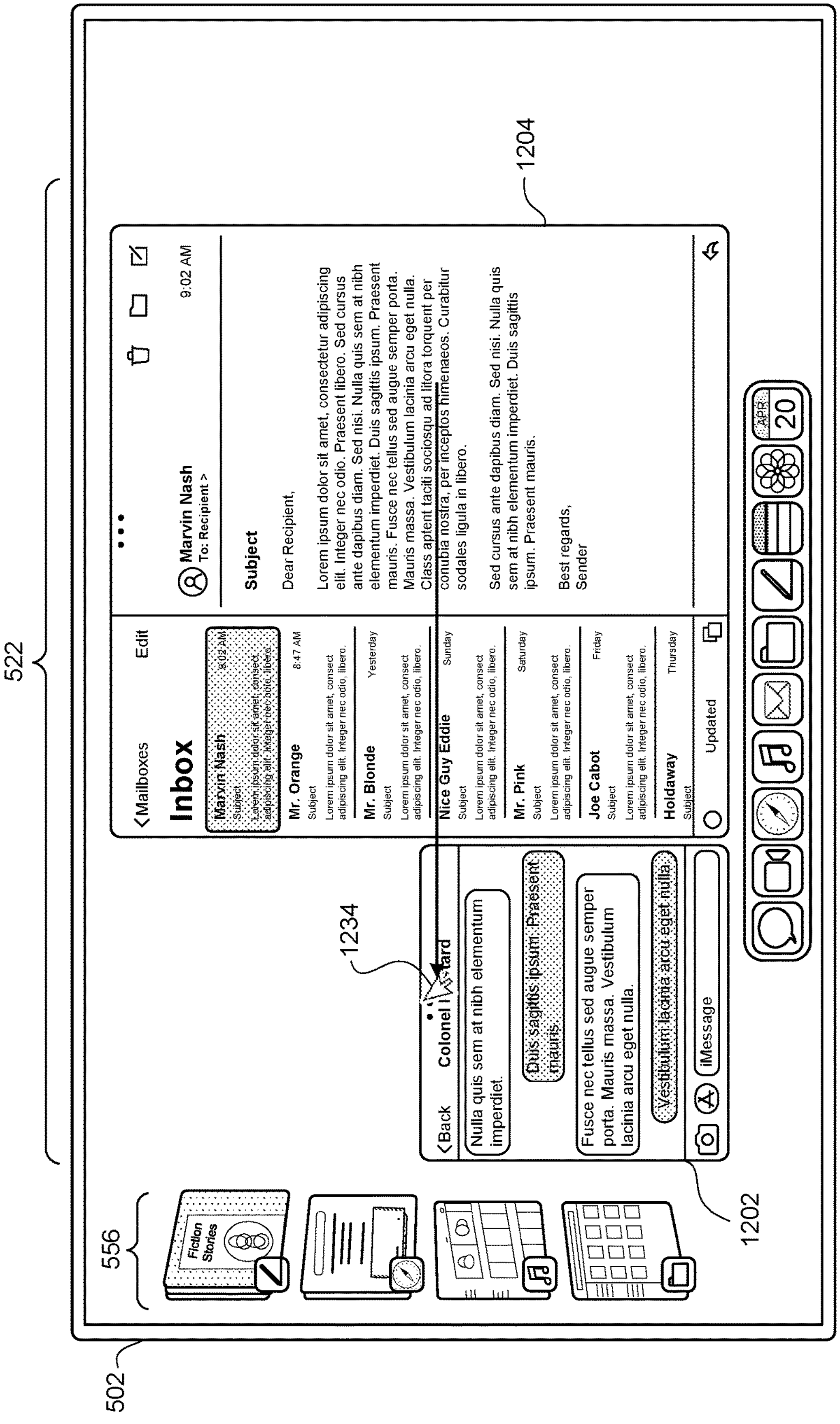
Figure 12W:
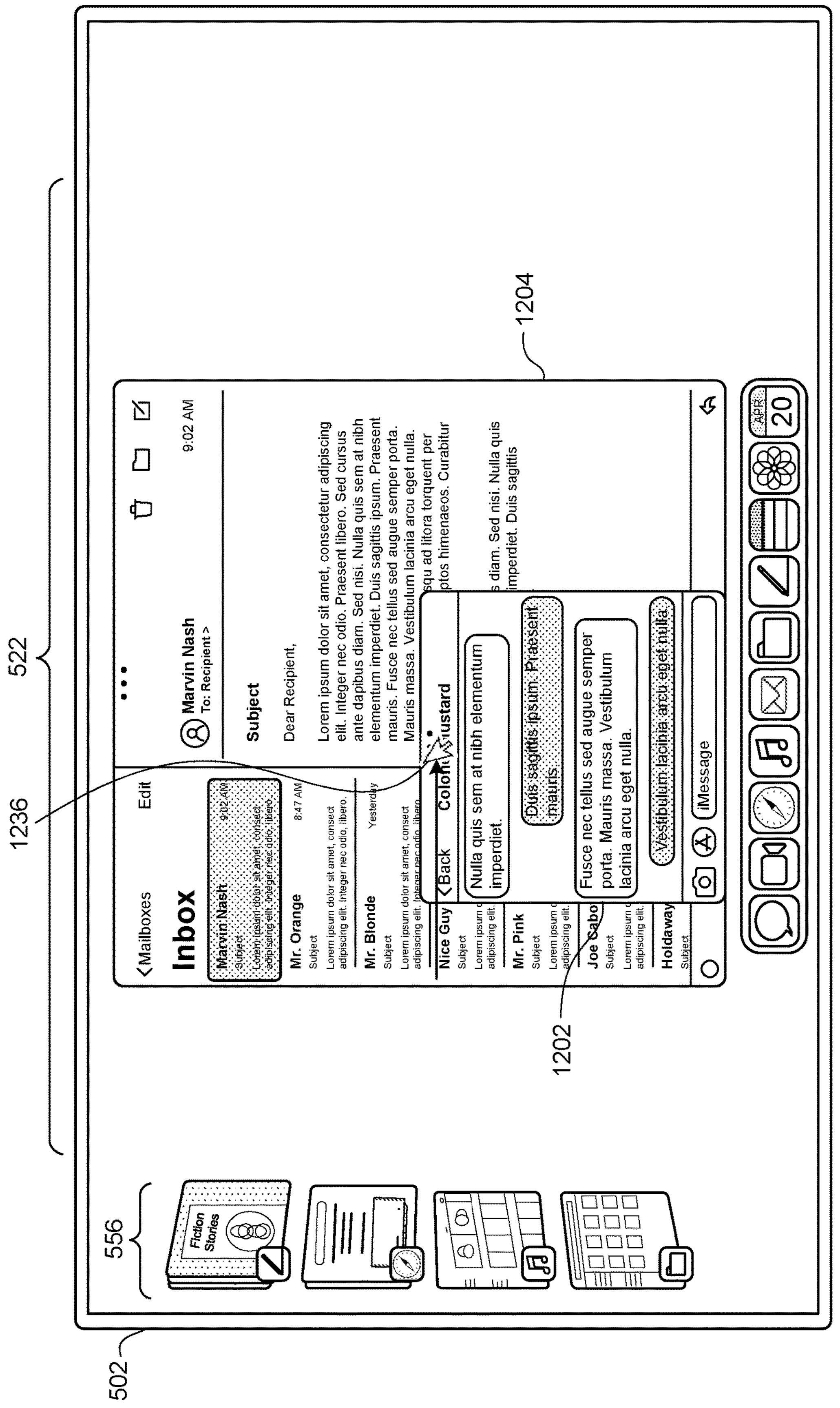
Figure 12X:
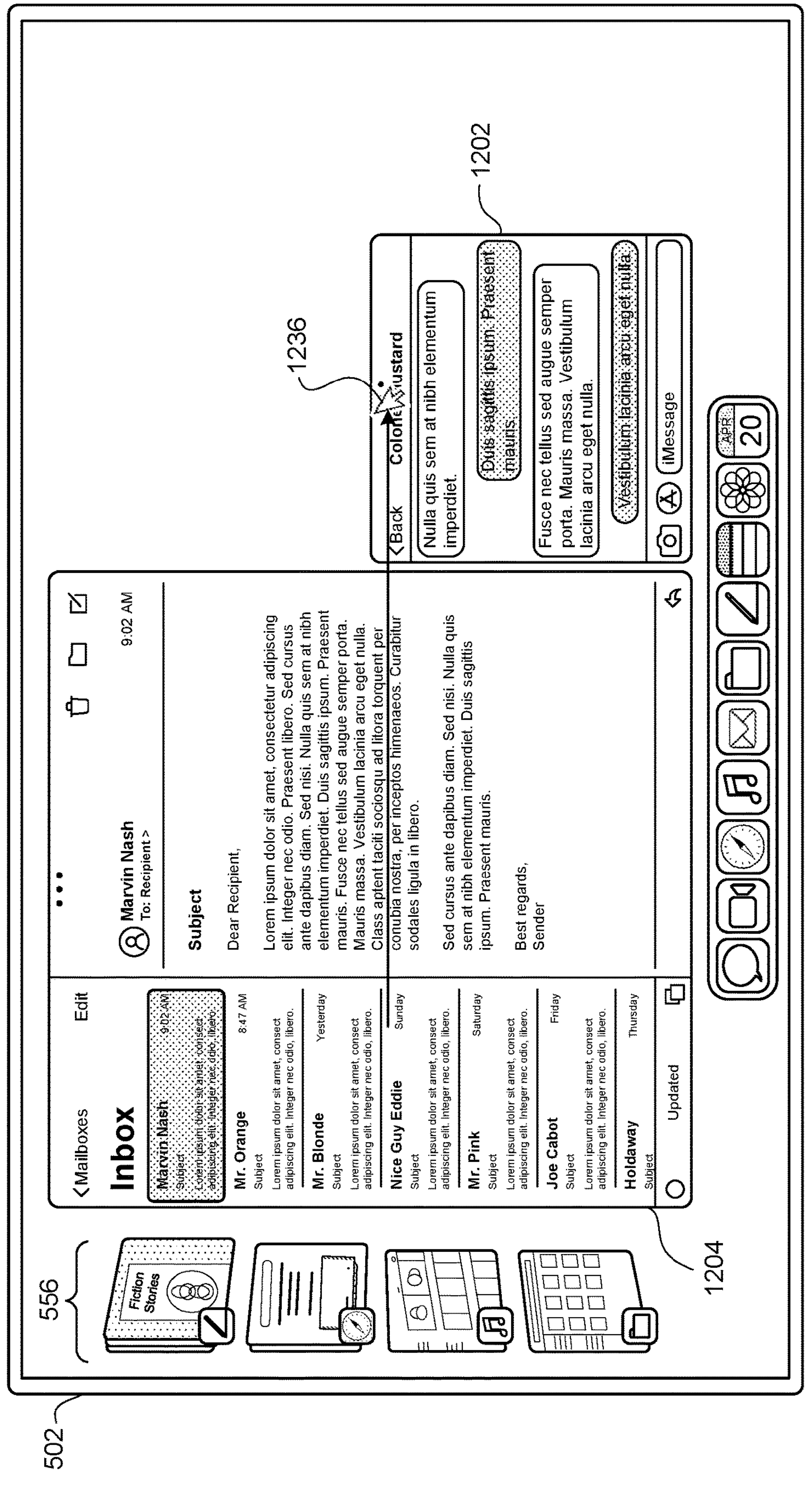

FIGS. 12A-12X illustrate window layout features of the concentration mode described above, in accordance with some embodiments. In some embodiments, windows in the stage region may be positioned in accordance with predetermined layout positions. Such embodiments help the user to easily position windows into useful layouts, without feeling too rigid or getting in the way of the user's productivity. By minimizing the amount of work the user must undertake to position windows in the stage region into a desired layout, such embodiments reduce user inputs while causing the stage region to be configured in a productive manner. Further, such embodiments allow for windows in the stage region to be automatically aligned without requiring user inputs to manually resize and reposition them.

In FIG. 12A, two overlapping windows are displayed in the stage region 522, including a messages window 1202 in the foreground and a mail window 1204 in the background. User input 1206 selects the messages window (e.g., by selecting a window positioning affordance of the window) and drags the messages window across the stage region in the direction of the mail window, as shown in FIG. 12B. When the movement of messages window 1202 passes a threshold distance, thereby leaving an empty region 1208 in the stage region, the mail window 1204 in the background automatically moves to the empty region, as shown in FIG. 12C. As such, the two overlapping windows 1202 and 1204 swap or switch positions, with the user input having moved one of the windows. In some embodiments, the threshold distance for automatic switching of windows is based on movement of the position of one window relative to the position of other windows in the stage region. For example, if a foreground window is moved so that it overlaps a background window by at least (for example) 50%, then the background window automatically switches positions with the original position of the foreground window. In some embodiments, the threshold may be less than 50% (e.g., 25%, 30%, 40%, and so forth) or more than 50% (e.g., 55%, 60%, 66%, 75%, and so forth). In some embodiments, if the threshold is not met, then the windows do not automatically switch. For example, in FIG. 12D, user input 1210 selects the messages window and drags the messages window towards the mail window, as shown in FIG. 12E. The user input 1210 is released at the position shown in FIG. 12E, which does not meet the threshold distance, thereby causing the messages window to return to its previous position in the stage region, as shown in FIG. 12F.

In some embodiments, size and/or position adjustments of windows in the stage region follow a resize and/or reposition grid, including a plurality of snap points. In some embodiments, the grid is a nonuniform grid. For example, one window may snap to take up ¼ of the width of the stage region, which causes another window to take up the remaining ¾ of the width of the stage region. In another example, one window may snap to take up ⅓ of the width of the stage region, which causes another window to take up the remaining ⅔ of the width of the stage region. In yet another example, one window may snap to take up ½ of the width of the stage region, which causes another window to take up the remaining ½ of the width of the stage region. In some embodiments, this feature may be toggled on/off by the user.

In some embodiments, windows in the stage region are resized so that they no longer overlap, and are instead displayed in a side-by-side split-screen configuration. In some embodiments, an inactive window (a window other than the last window to be interacted with) in the background of an overlapping configuration may be in a passive state (requiring the window to be selected before window contents may be interacted with), while an inactive window in a side-by-side non-overlapping split-screen configuration may be in an active state (allowing window contents to be interacted with even if the window was not the last window to be interacted with). For example, in FIG. 12F, mail window 1204 is in the background and is therefore inactive. User input 1212 selects a mail item 1214, but since the mail window 1204 is inactive, the mail item 1214 remains unselected. Instead, the mail window 1204 as a whole is selected and made active, thereby bringing the mail window 1204 to the foreground, as shown in FIG. 12G. While the mail window 1204 is active, user input 1216 selects the mail item 1214 (FIG. 12H) and subsequent user inputs (e.g., 1218, FIG. 12I) may further interact with the contents of the mail window 1204. In some embodiments, selecting an item in a background window with a single input both makes that window active and selects the item. In some embodiments, a background (inactive) window may include elements that are interactable (e.g., a scrolling function) and elements that are not interactable (e.g., selection of mail items in a list) when the window is in the background, e.g., at least partially behind (occluded by) another window. In some embodiments, clicking or tapping anywhere in a background window brings the background window to the foreground, thereby making the window contents interactable.

In FIG. 12J, user input 1220 causes the messages window 1202 to be selected (made active) and moved to the foreground. In FIG. 12K, user input 1222 resizes the messages window 1202, decreasing the window size and causing the window contents to automatically rescale to fit the smaller window. User input 1222 continues to decrease the size of the messages window 1202 (FIG. 12L), and when the messages window is small enough that it no longer overlaps (or close to being small enough, e.g., within a threshold), then the messages window snaps into a side-by-side non-overlapping split-screen configuration, as shown in FIG. 12M. In this example, the mail window 1204 snaps to take up ⅔ of the width of the stage region, and the messages window 1202 snaps to take up ⅓ of the width of the stage region.

While in the non-overlapping split-screen configuration, each window is active (the contents of each window are fully interactable). For example, in FIG. 12N, device 502 detects user input 1224 (a typing input), and in response to detecting user input 1224, device 502 displays a typed message in the messages window 1202, as shown in FIG. 12O. Device 502 subsequently detects user input 1226 (as shown in FIG. 12O) and user input 1228 (as shown in FIG. 12P), and in response to detecting user inputs 1226 and 1228, device 502 selects various mail items in the mail window 1204. These mail items may be selected without first having to select (make active) the mail window 1204 itself.

FIGS. 12Q-12X demonstrate resizing and repositioning of windows in the non-overlapping split-screen configuration. In FIG. 12Q, user input 1230 moves the bottom edge of a messages window in an upward direction, which causes the top edge of the messages window to move down, as shown in FIG. 12R. In FIG. 12S, user input 1232 selects the resized messages window 1202 and moves it down to the bottom (or close to the bottom) of the stage region, as shown in FIG. 12T. In FIG. 12U, user input 1234 moves messages window 1202 to the opposite side of the stage region, which causes mail window 1204 to switch places with the messages window, as shown in FIG. 12V. In FIG. 12W, user input 1236 moves the mail window back to its previous location in the stage region, which causes the messages window to switch places with the mail window again, as shown in FIG. 12X.

Figure 13A:
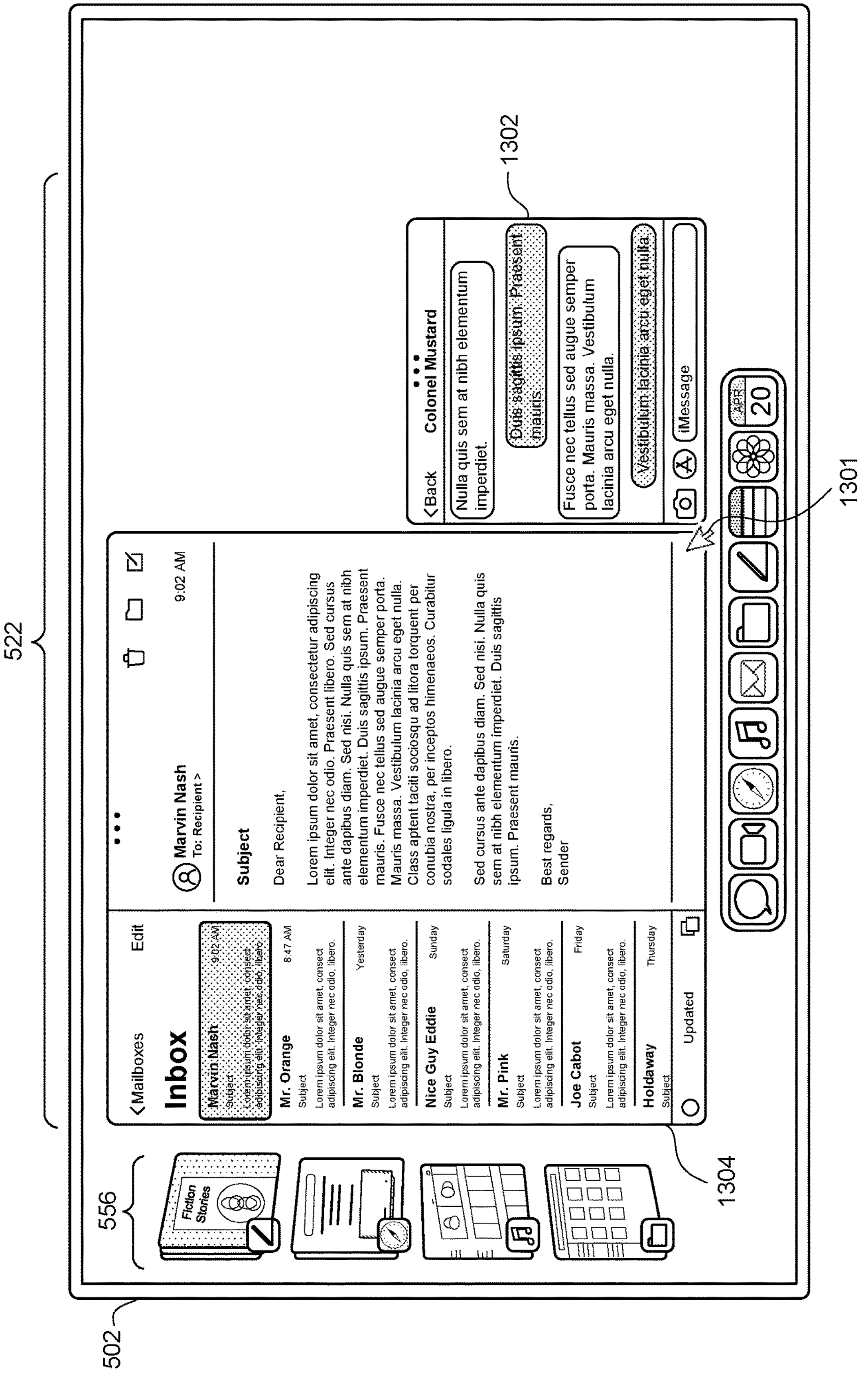
Figure 13B:
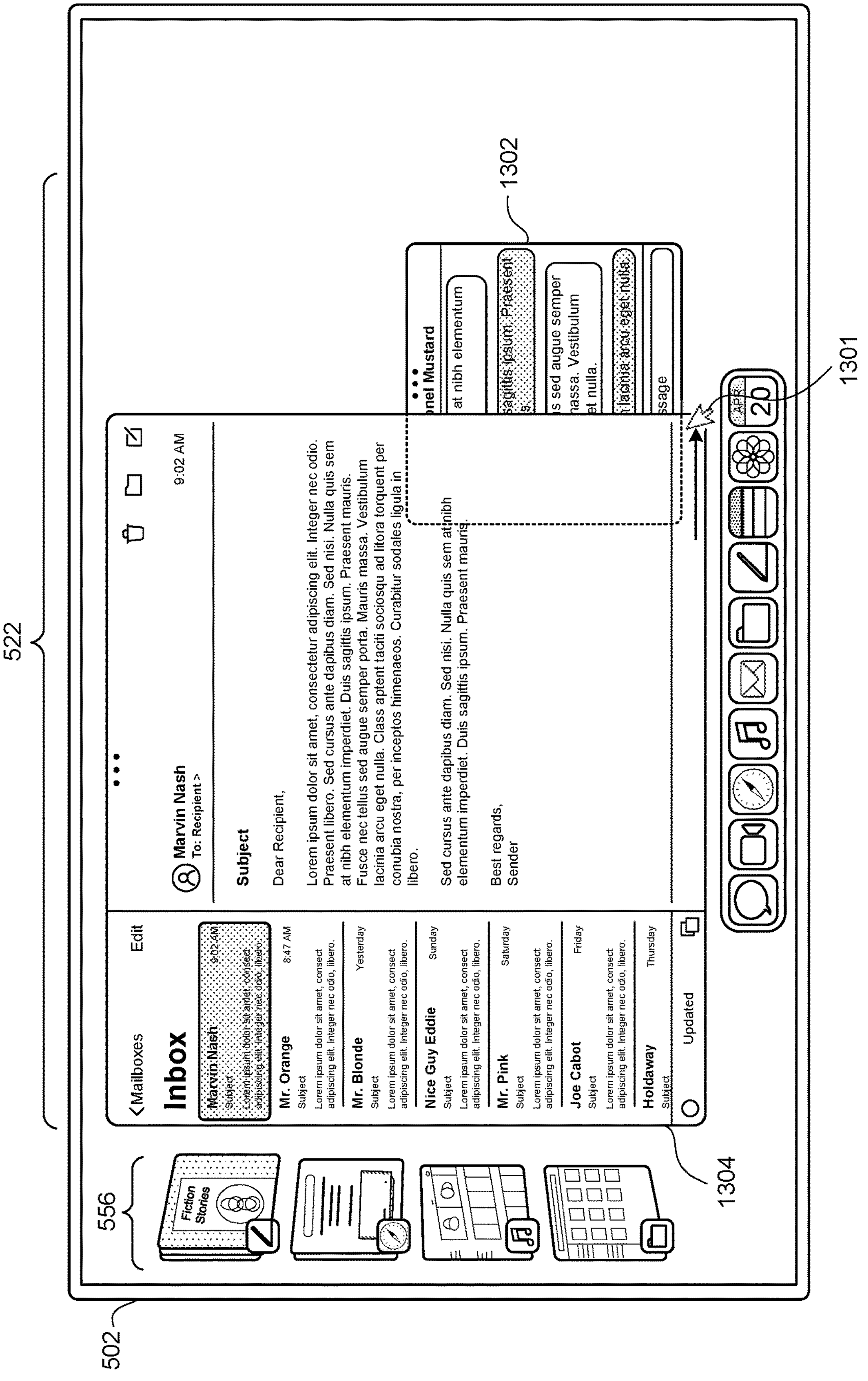
Figure 13C:
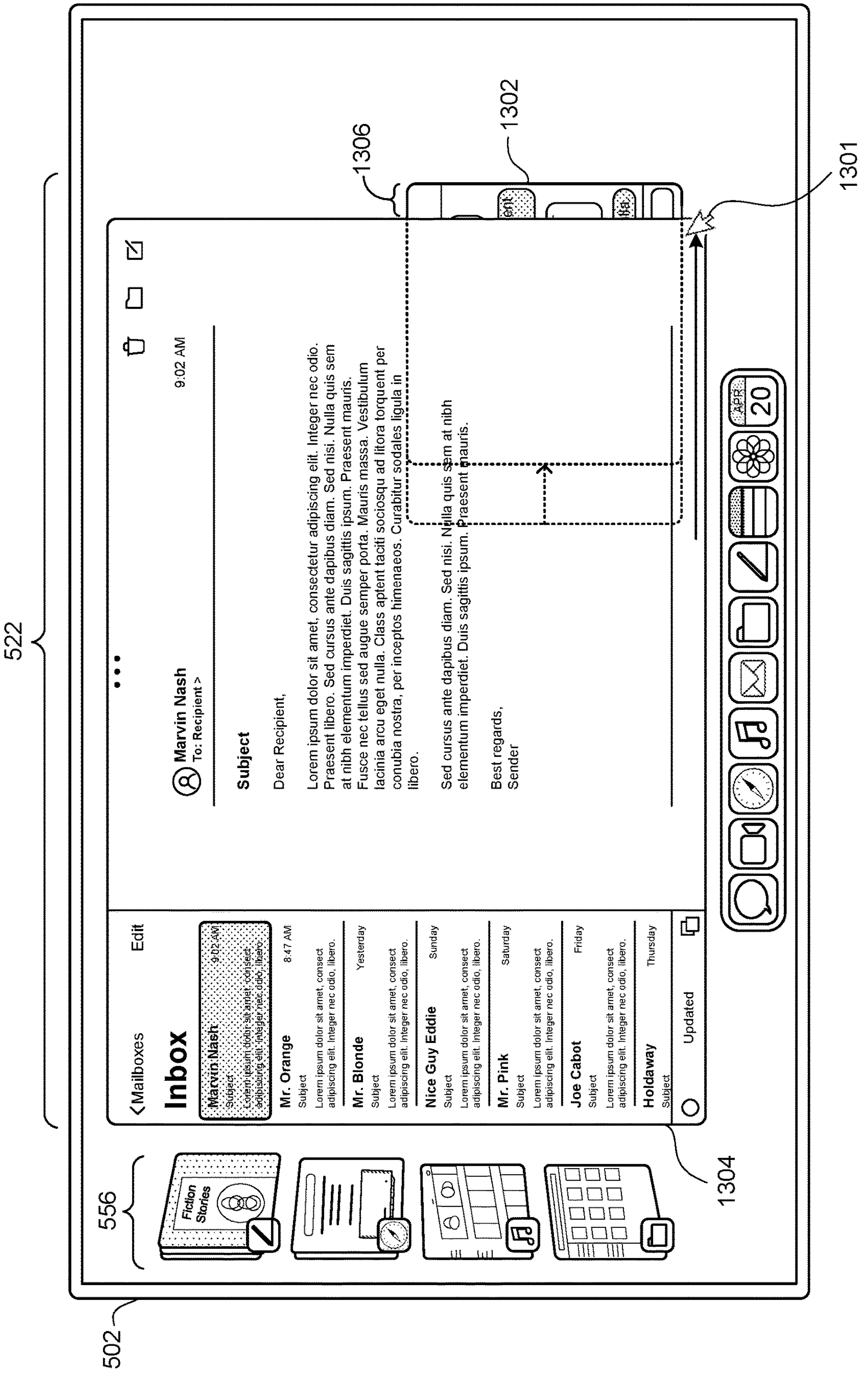
Figure 13D:
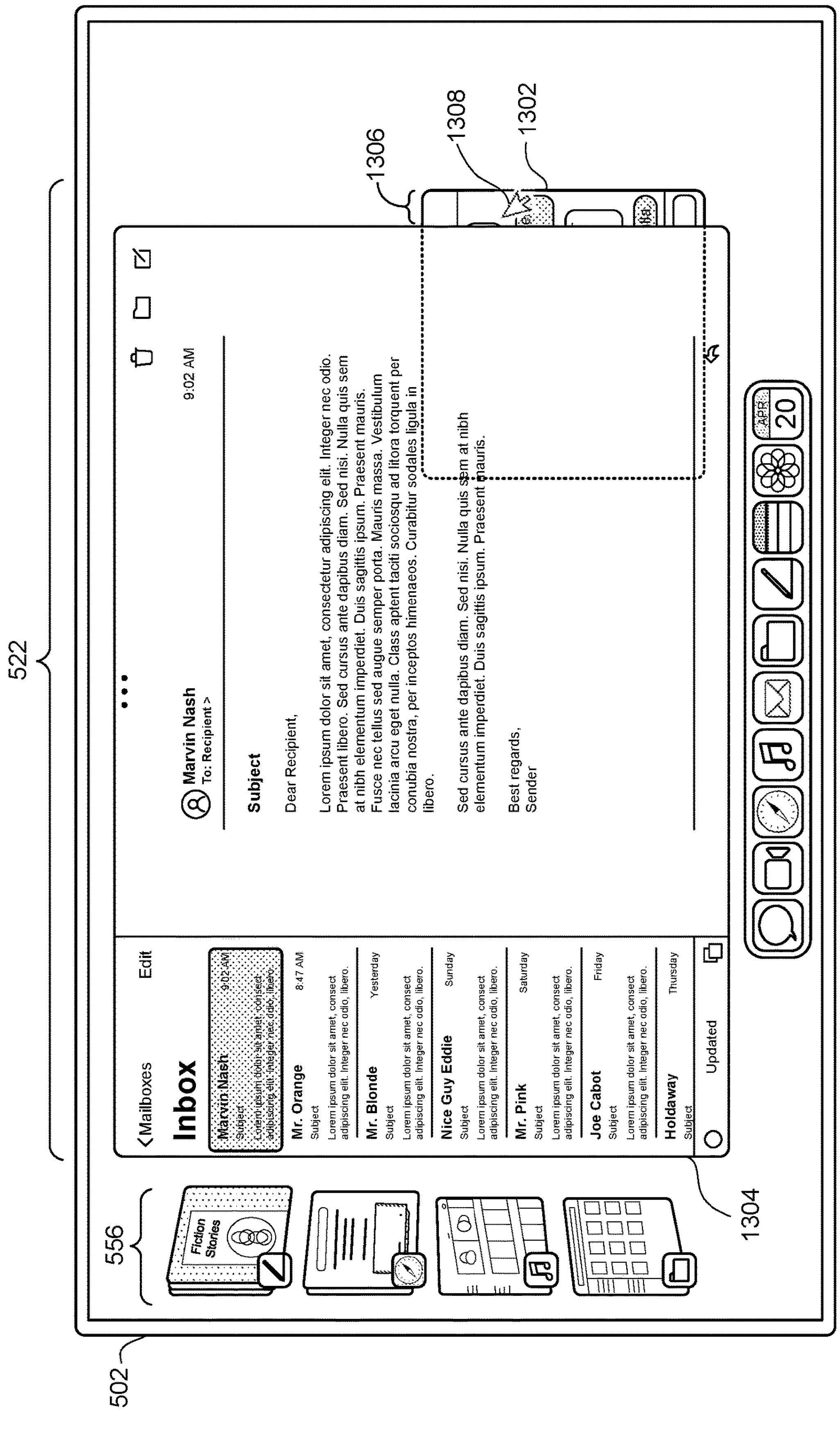
Figure 13E:
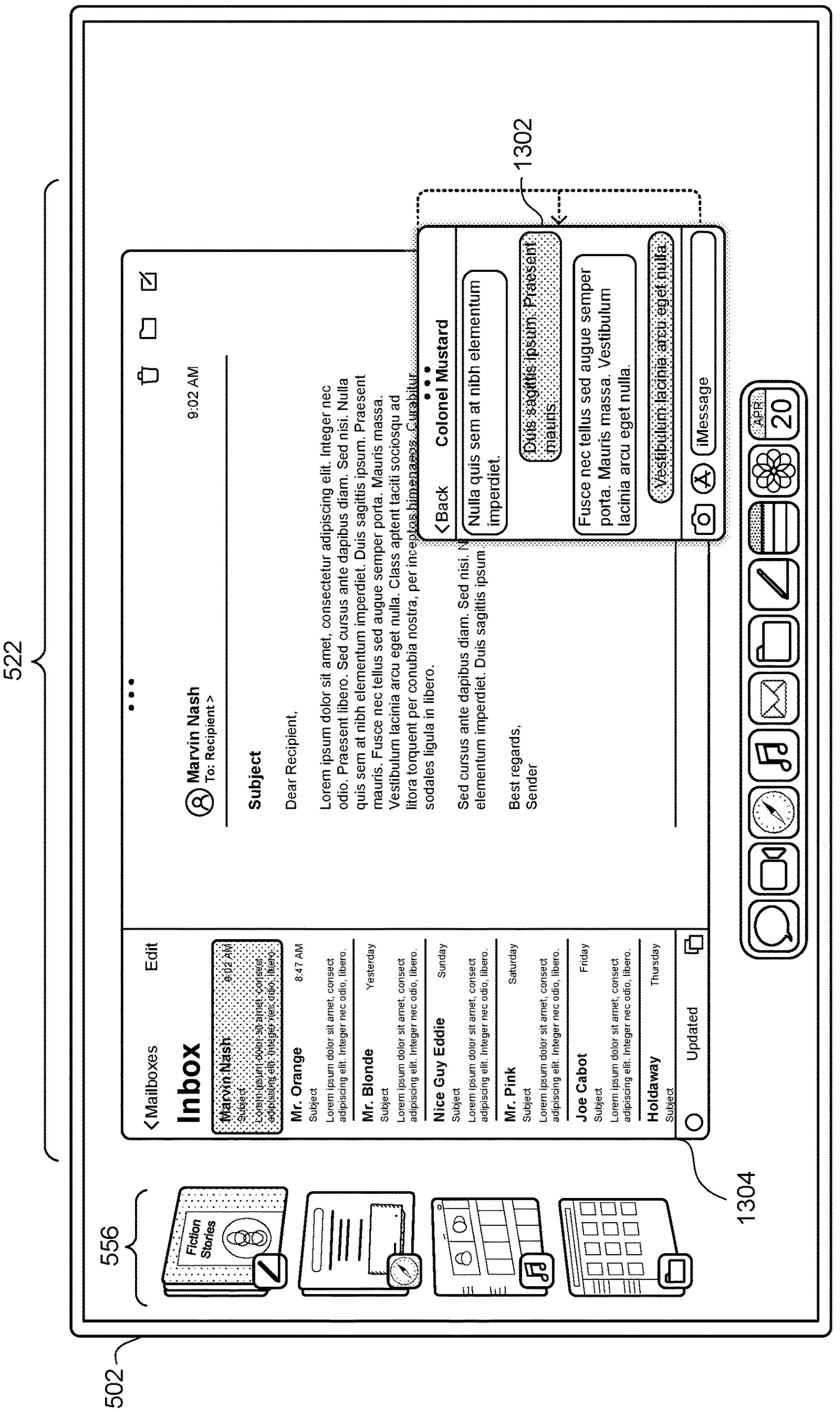
Figure 13F:
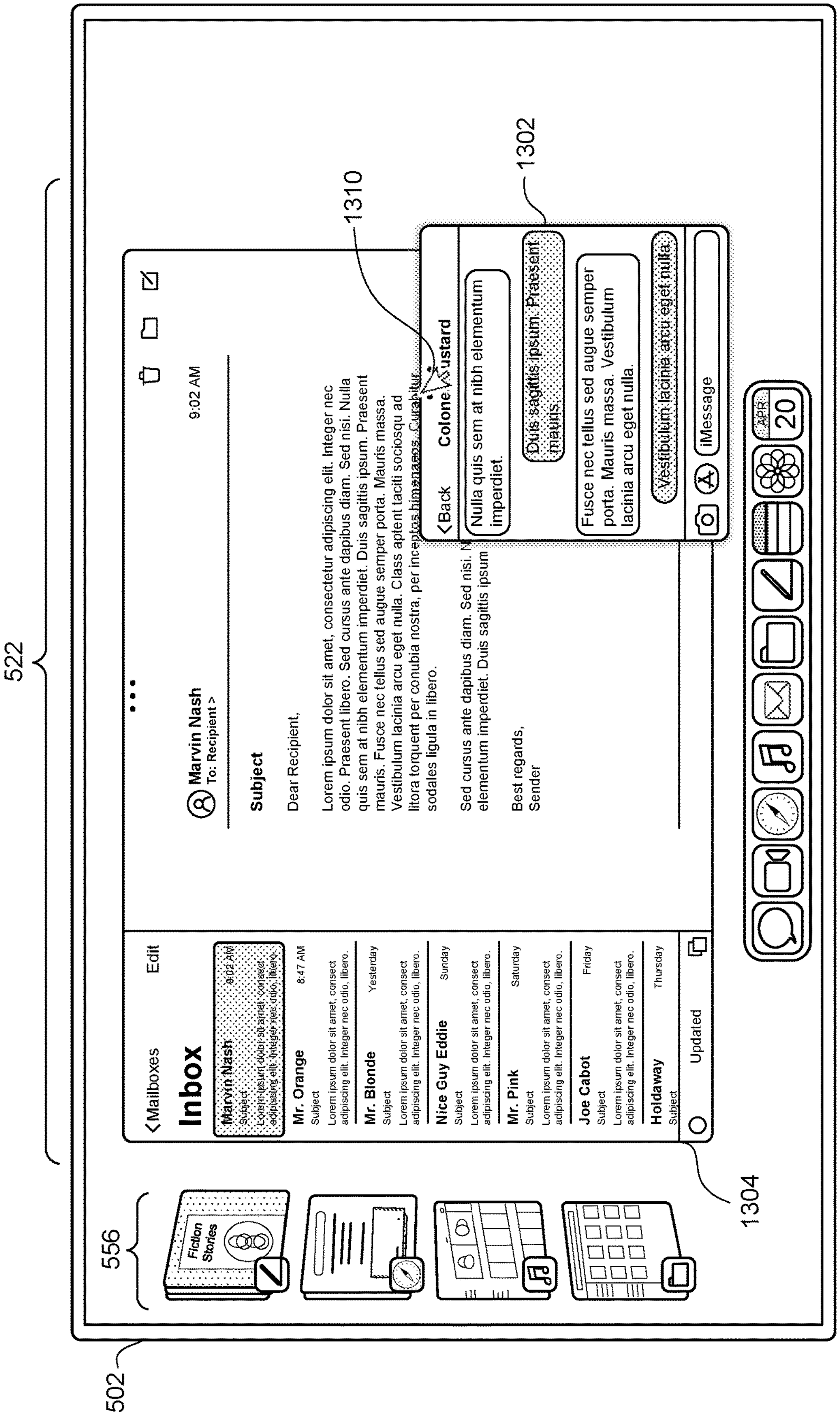
Figure 13G:
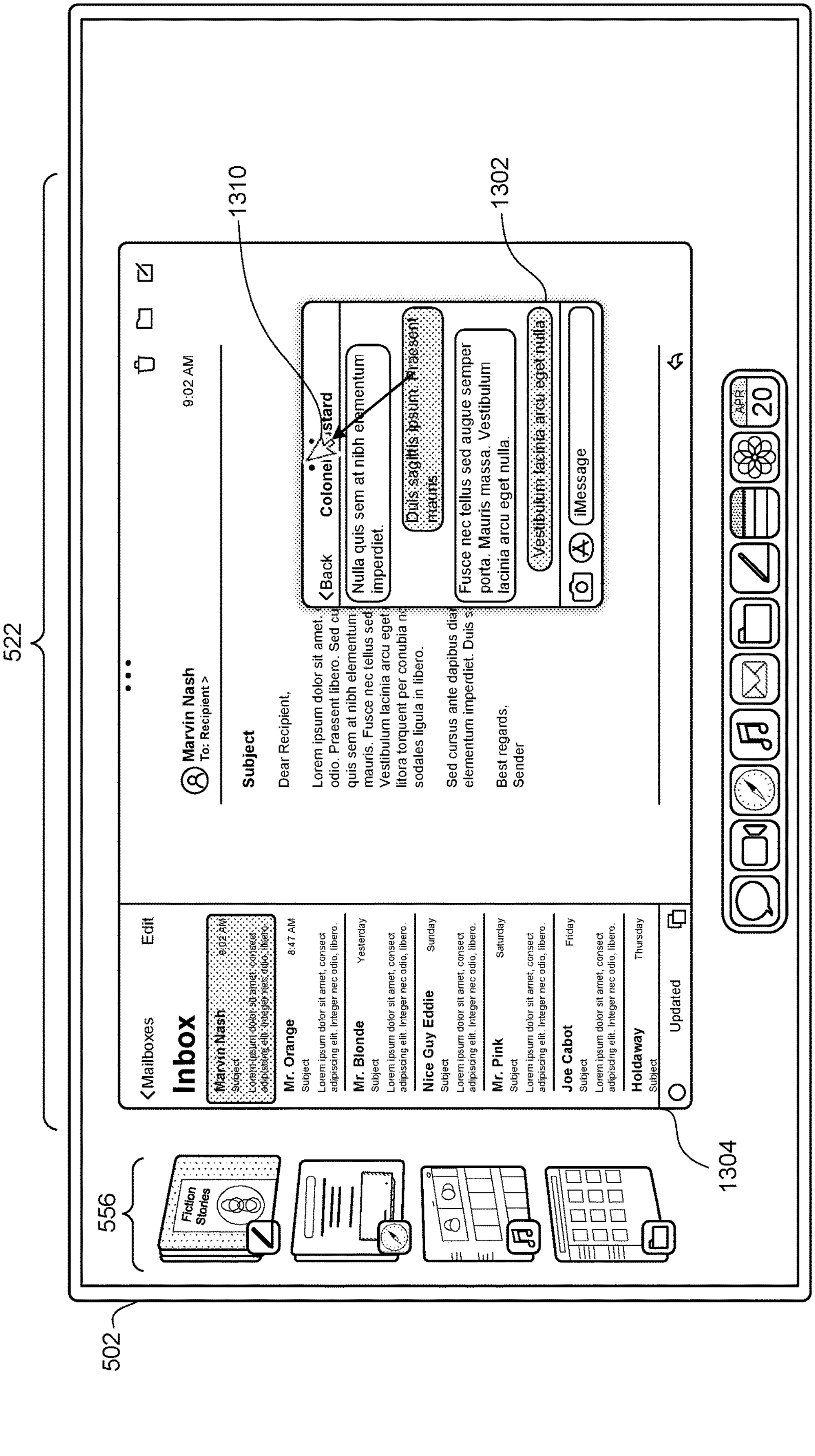
Figure 13H:
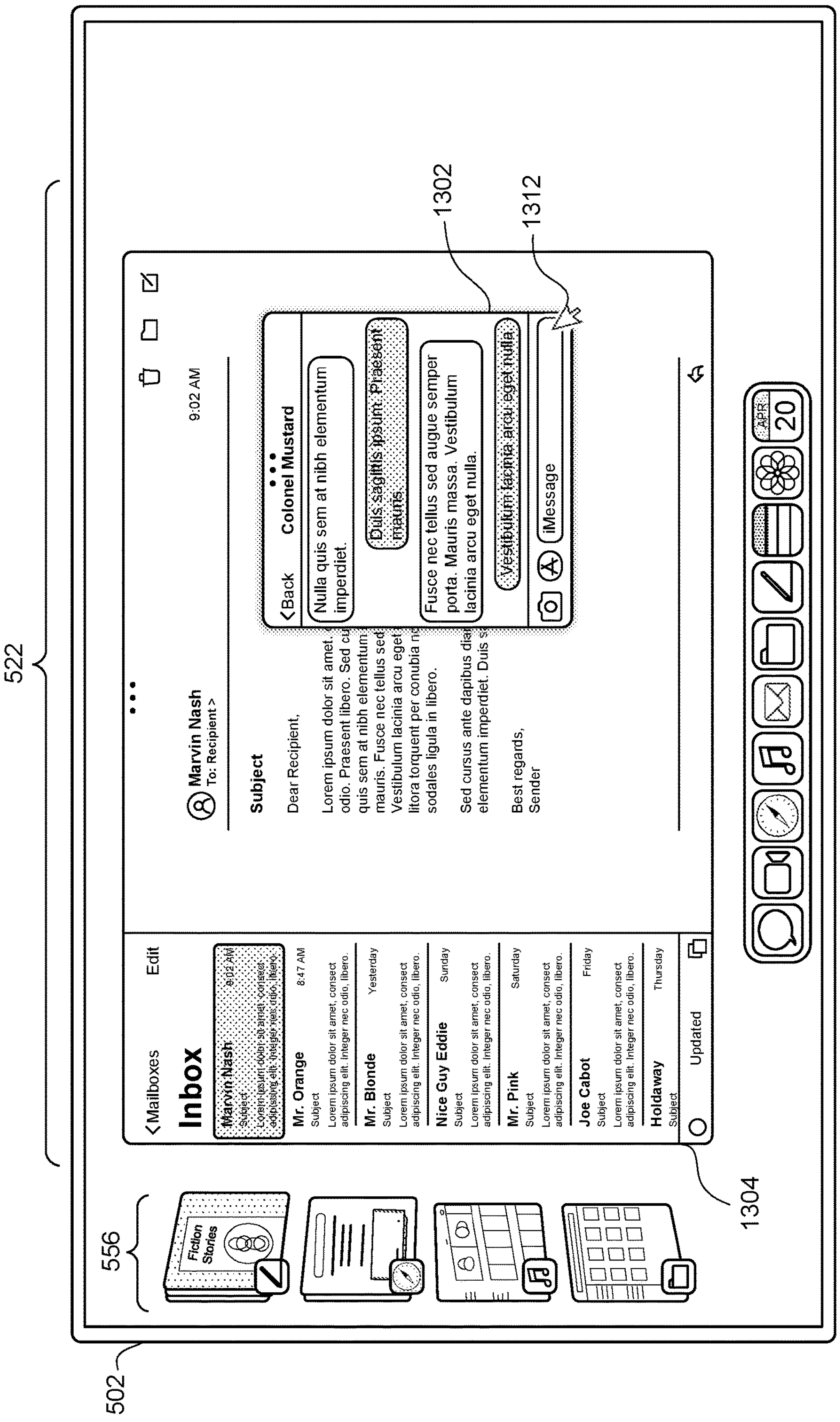
Figure 13I:
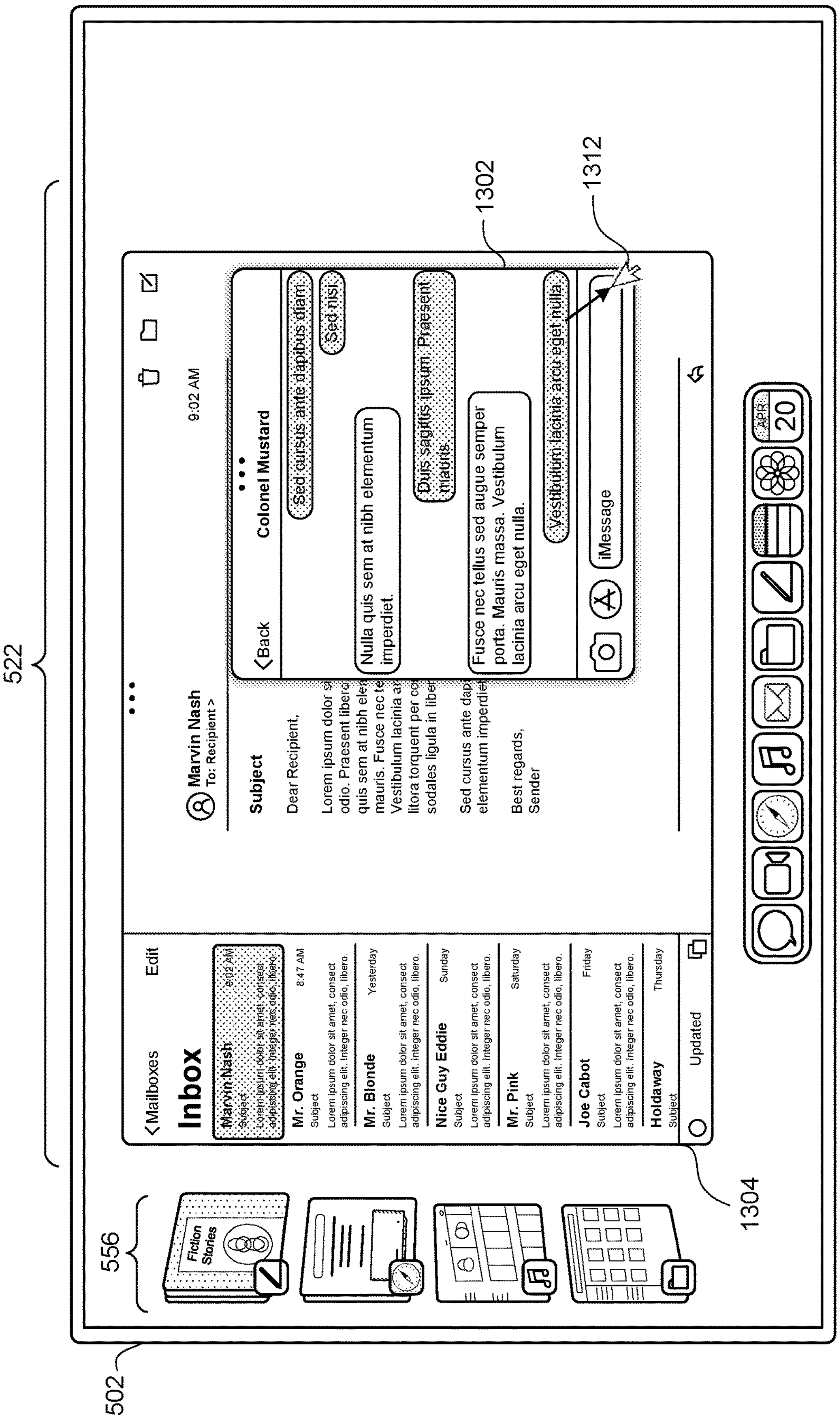
Figure 13J:
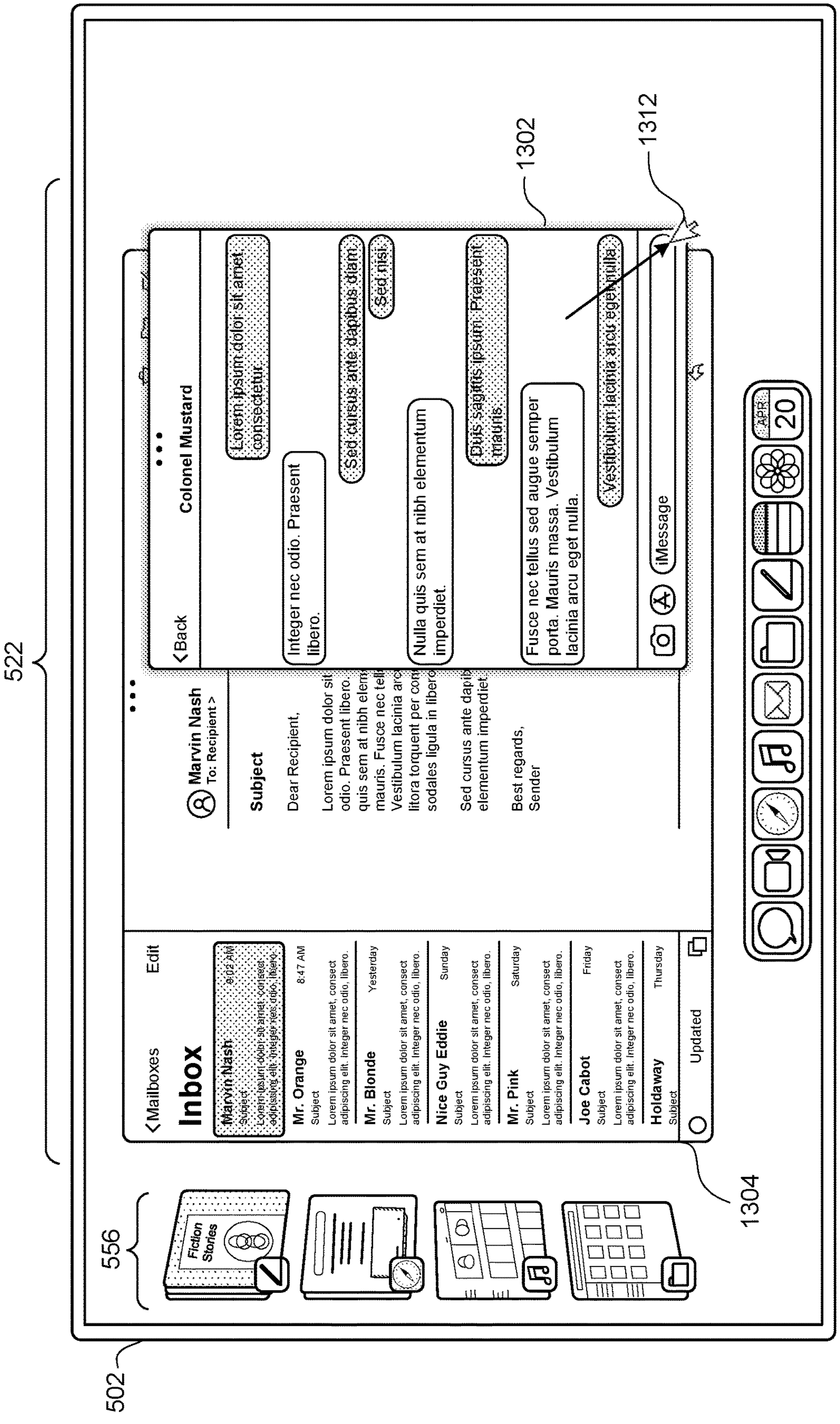
Figure 13K:
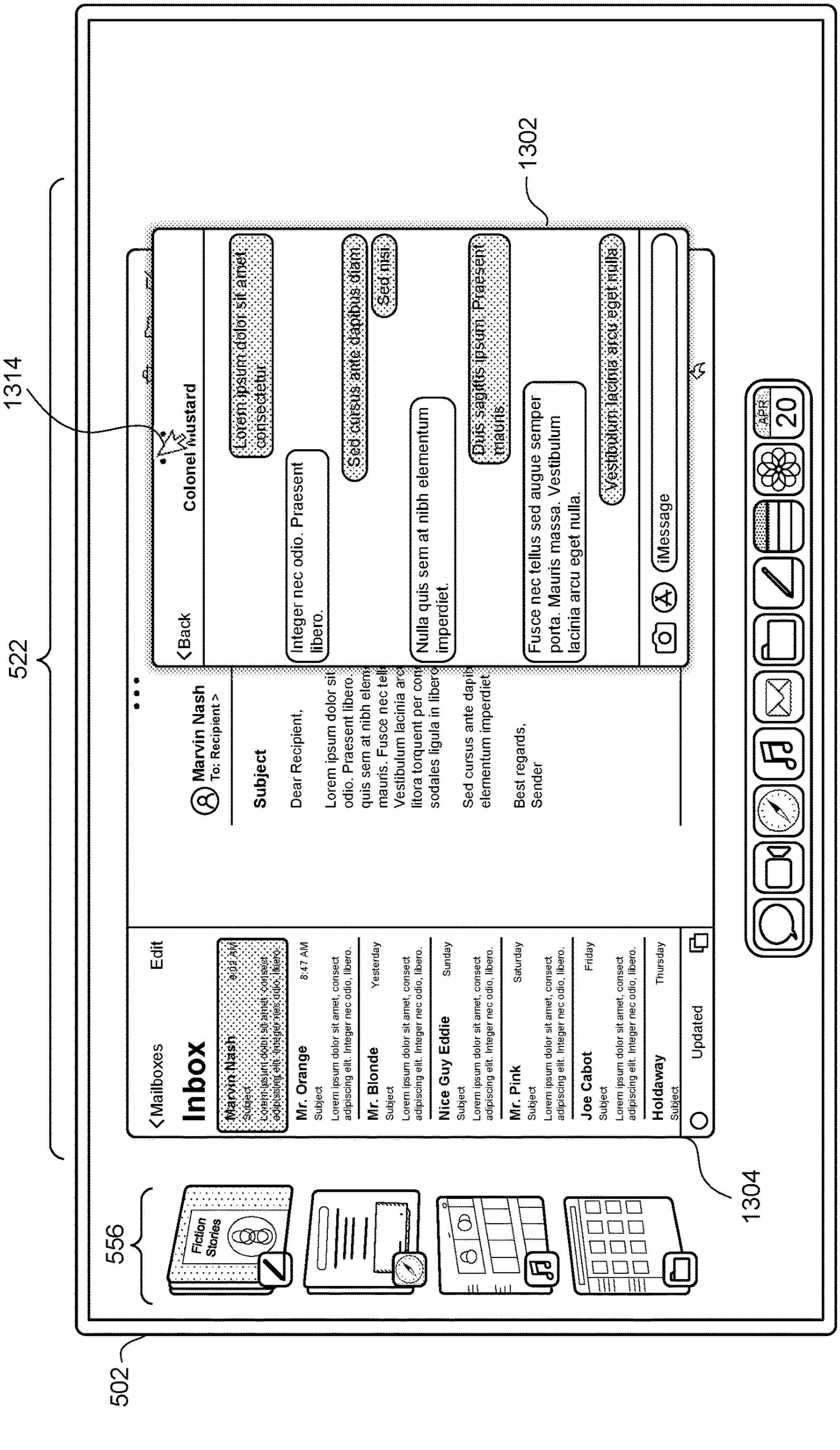
Figure 13L:
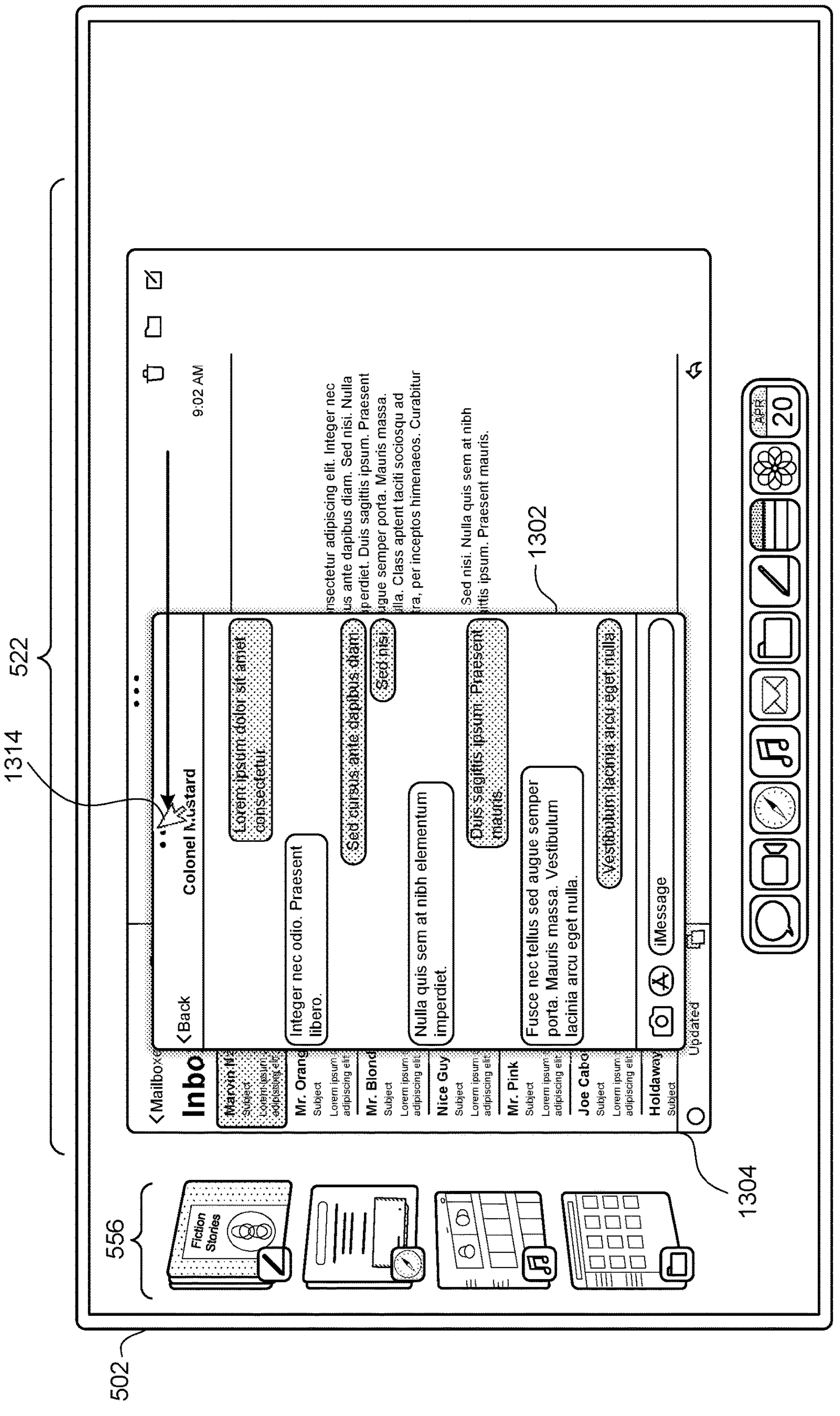
Figure 13M:
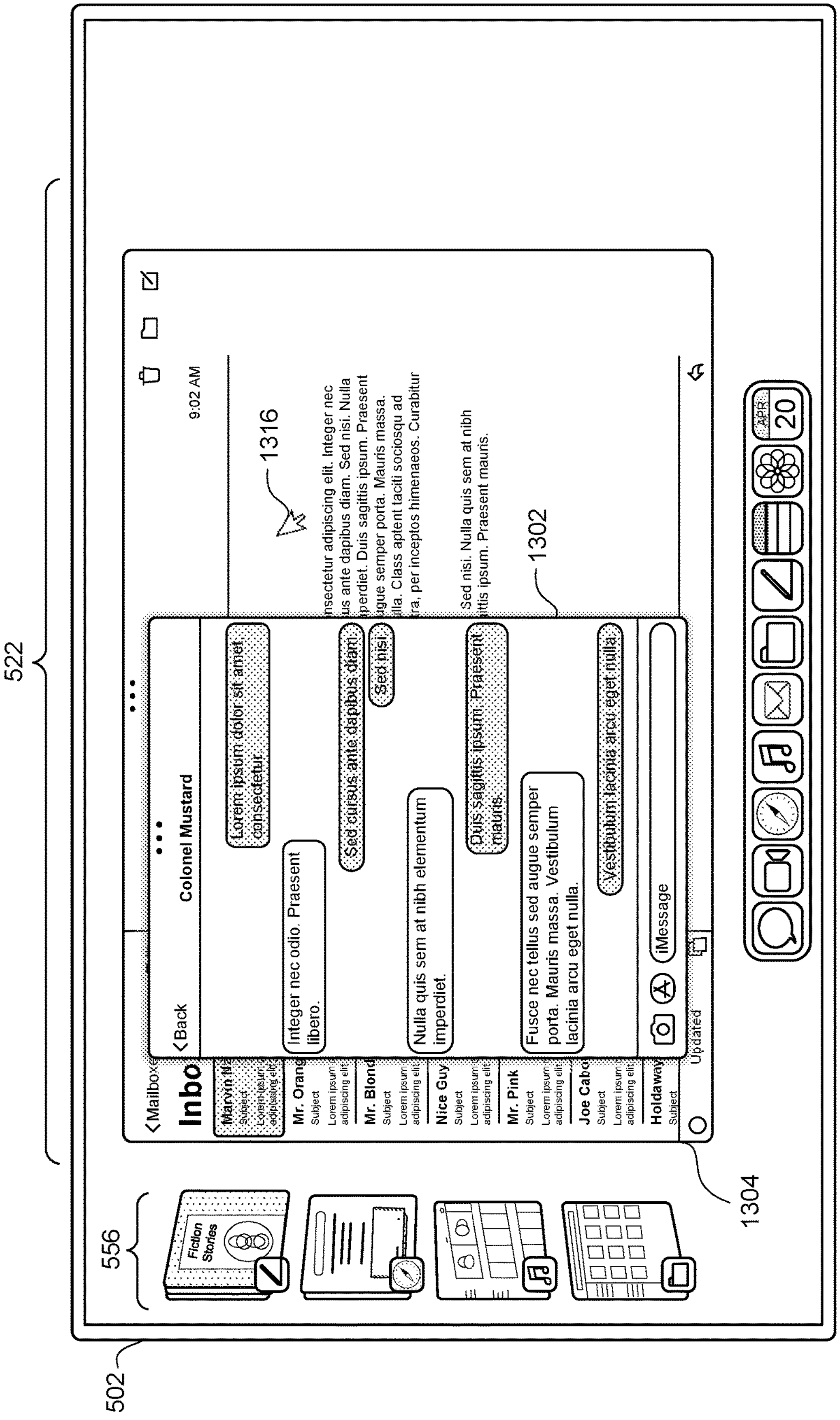
Figure 13N:
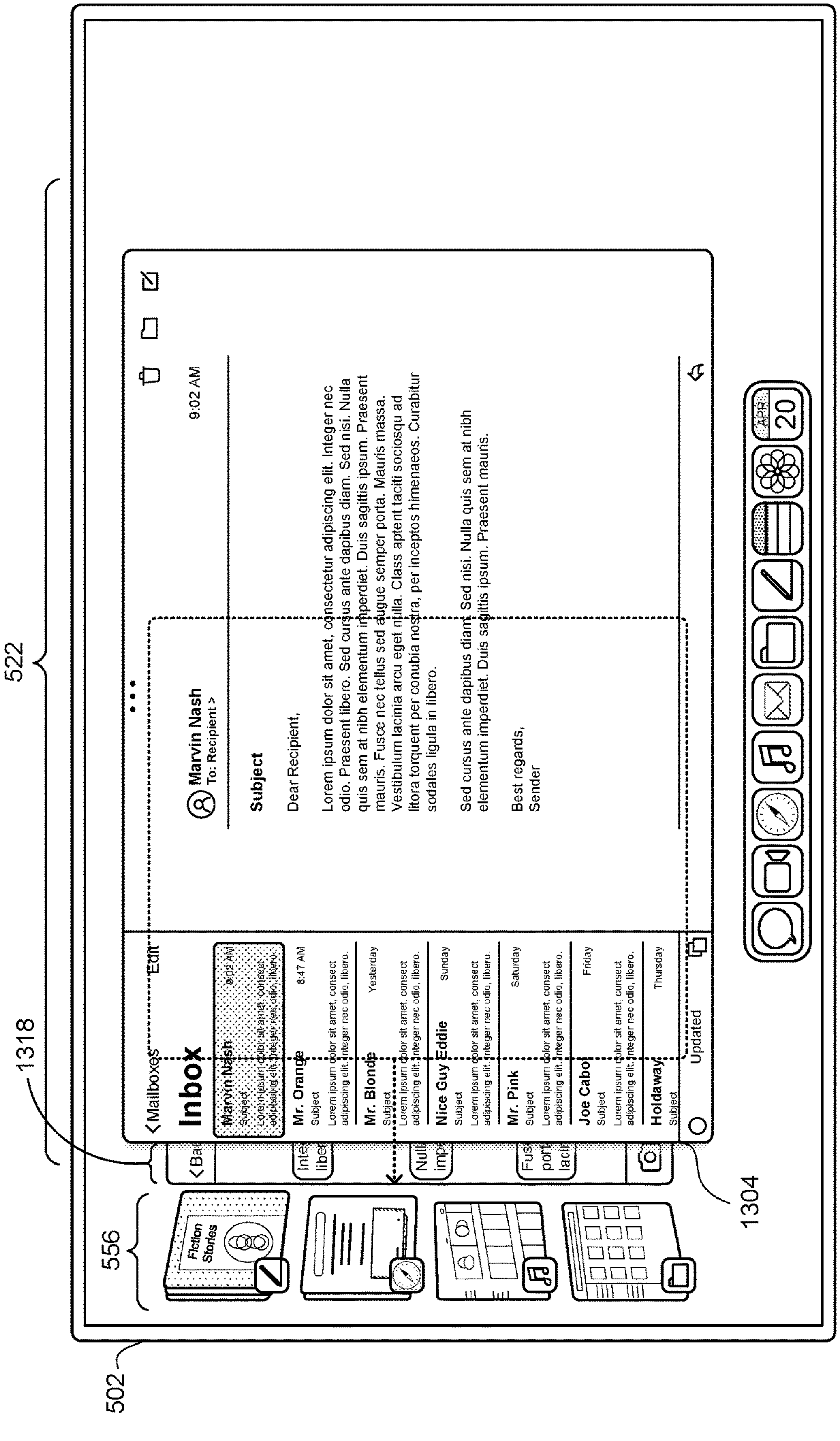
Figure 13O:
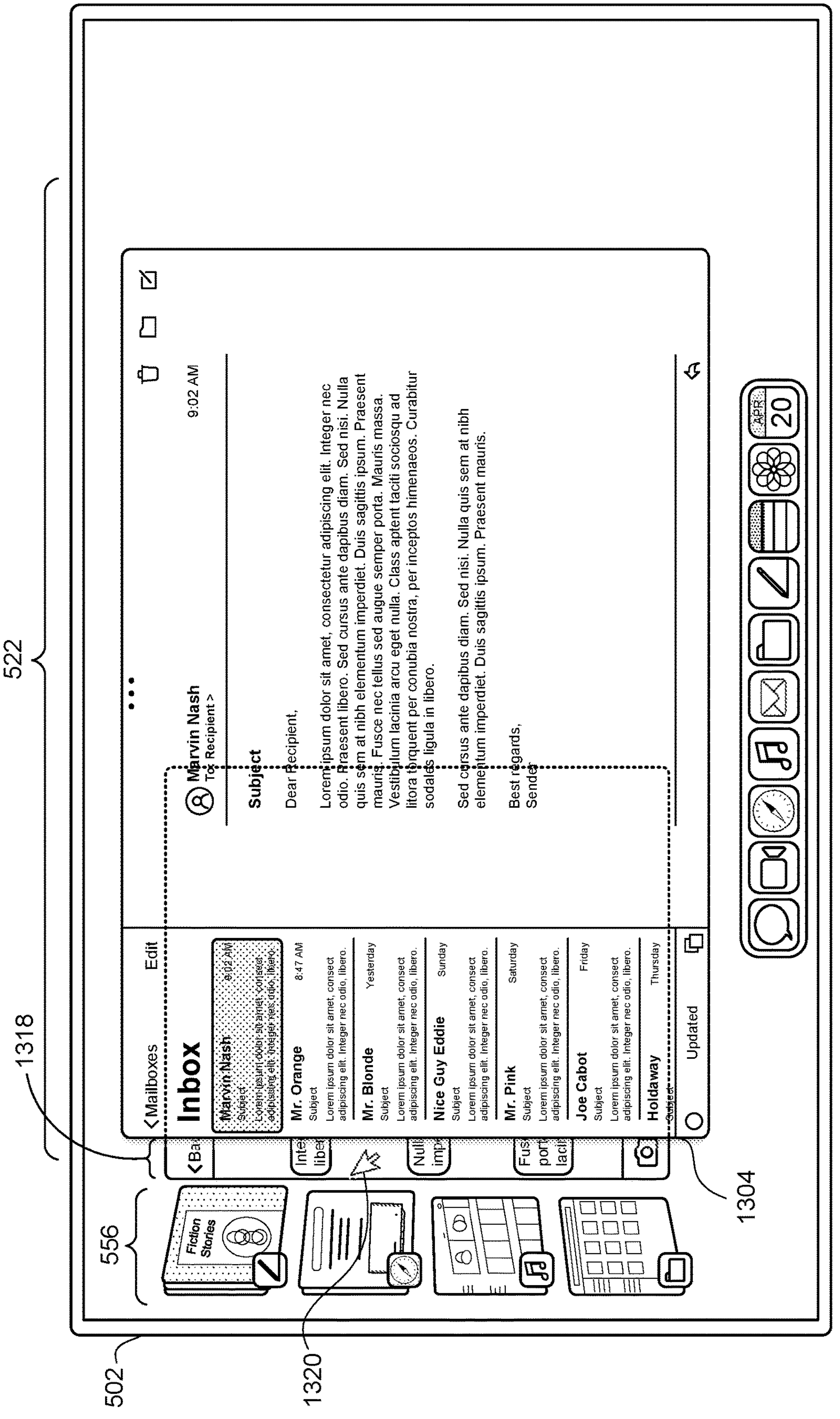
Figure 13P:
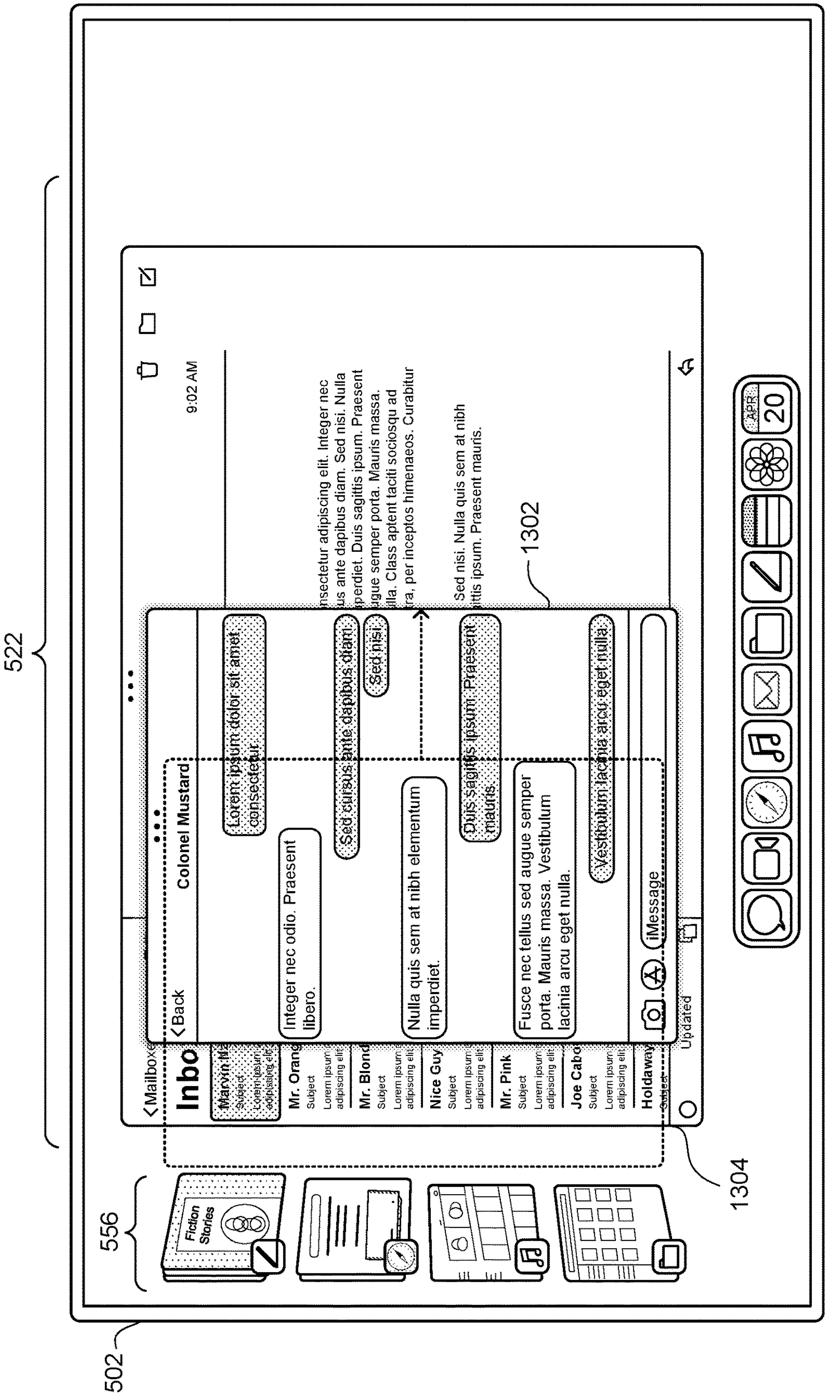

FIGS. 13A-13P illustrate occlusion handling features for the concentration mode described above, in accordance with some embodiments. Specifically, when a foreground window is completely positioned over a background window in the stage region, the background window automatically moves so that a portion of it remains visible, preventing the background window from being fully occluded.

In FIG. 13A, user input 1301 resizes mail window 1304 (corresponding to mail window 1204 described above) so that it begins to occlude messages window 1302 (corresponding to messages window 1202 described above). In FIG. 13B, as messages window 1302 is occluded by the resizing of mail window 1304, messages window decreases in size in order to move to a background layer of the stage region. In FIG. 13C, as mail window 1304 continues to be resized so that it begins to completely occlude messages window 1302, messages window 1302 automatically (without user input) moves toward the edge (and, in some embodiments, across the edge) of the stage region, leaving a portion 1306 visible. This portion is sometimes referred to as a sliver. No matter how far over the foreground window moves, the background window moves further in order to maintain a visible portion. However, in order to honor the user's intent in occluding the background window, most of the background window (included most, if not all, of the window's contents) is allowed to remain occluded, with the size of the portion just big enough to be selectable, and to indicate the presence of the window to the user (e.g., providing a selection target such as a click target or a tap target). In some embodiments, the occlusion handling behavior described above does not occur if a window is resized to a full-screen configuration.

The portion 1306 of the occluded window, upon being selected, causes the occluded window to move back to the foreground of the stage region. In FIG. 13D, user input 1308 selects portion 1306 of the messages window 1302, causing the messages window 1302 to move to the foreground of the stage region and the mail window 1304 to move to the background of stage region 522, as shown in FIG. 13E. As shown in FIG. 13E, upon portion 1306 of the messages window be selected, the messages window moves back to its previous position and size in the stage region (the position and size of the window before it was occluded), thereby moving back away from the edge of the stage region.

In some embodiments, the automatic movement of the occluded window toward the edge of the stage region may occur in any direction. In some embodiments, the automatic movement is in the direction of the closest edge of the center display. In some embodiments, the sides of the stage region are biased over the top and bottom of the stage region. For example, in such embodiments, even if a background window is closer to the bottom of the stage region, the background window may still be automatically moved to a side of the stage region. There may be a distance threshold for which this activity occurs. For example, if the distance from the occluded window to the bottom of the stage region is less than 50% of the distance from the occluded window to the side of the stage region, then the occluded window is moved to the side of the stage region (even though it is initially closer to the bottom of the stage region). This distance threshold may be less than 50% or greater than 50% in some embodiments.

In some embodiments, windows may be more freely positioned (with less snapping to a grid) in one direction than in the other direction. For example, windows may be positioned more freely in a horizontal direction than in a vertical direction, or vice versa. In FIG. 13F, in response to detecting user input 1310, device 502 moves messages window 1302 away from the edge of the stage region, as shown in FIG. 13G. Upon detecting release of user input 1310 as shown in FIG. 13G, device 502 moves messages window 1302 so that the window snaps in a vertical direction to the nearest point on the position grid, but remains in the same position in the horizontal direction, as shown in FIG. 13H. In FIG. 13H, in response to detecting user input 1312 (selection of a corner of messages window 1302 in FIG. 13H and dragging of the corner of the window in FIG. 13I), device 502 expands the size of messages window 1302, as shown in FIG. 13I. In FIG. 13J, in response to detecting further user input 1312 (more dragging of the corner of window 1302), device 502 continues to expand window 1302, including expanding a plurality of edges of window 1302. In FIG. 13K, in response to detecting user input 1314 (selection and moving of a repositioning affordance of window 1302), device 502 moves the messages window 1302 to the other side of the stage region, but not completely to the edge of the stage region, so that the messages window is completely overlapping the mail window, as shown in FIG. 13L. In FIG. 13M, user input 1316 selects the mail window 1304 in the background, thereby bringing the mail window 1304 to the foreground and the messages window 1302 to the background. Messages window 1302 also automatically moves to the side of the stage region, as shown in FIG. 13N, in order to expose a portion 1318 of the corresponding window. In FIG. 13O, user input 1320 selects portion 1318 of the corresponding window, which causes messages window 1302 to be restored to its previous position in the foreground, as shown in FIG. 13P.

Figure 14A:
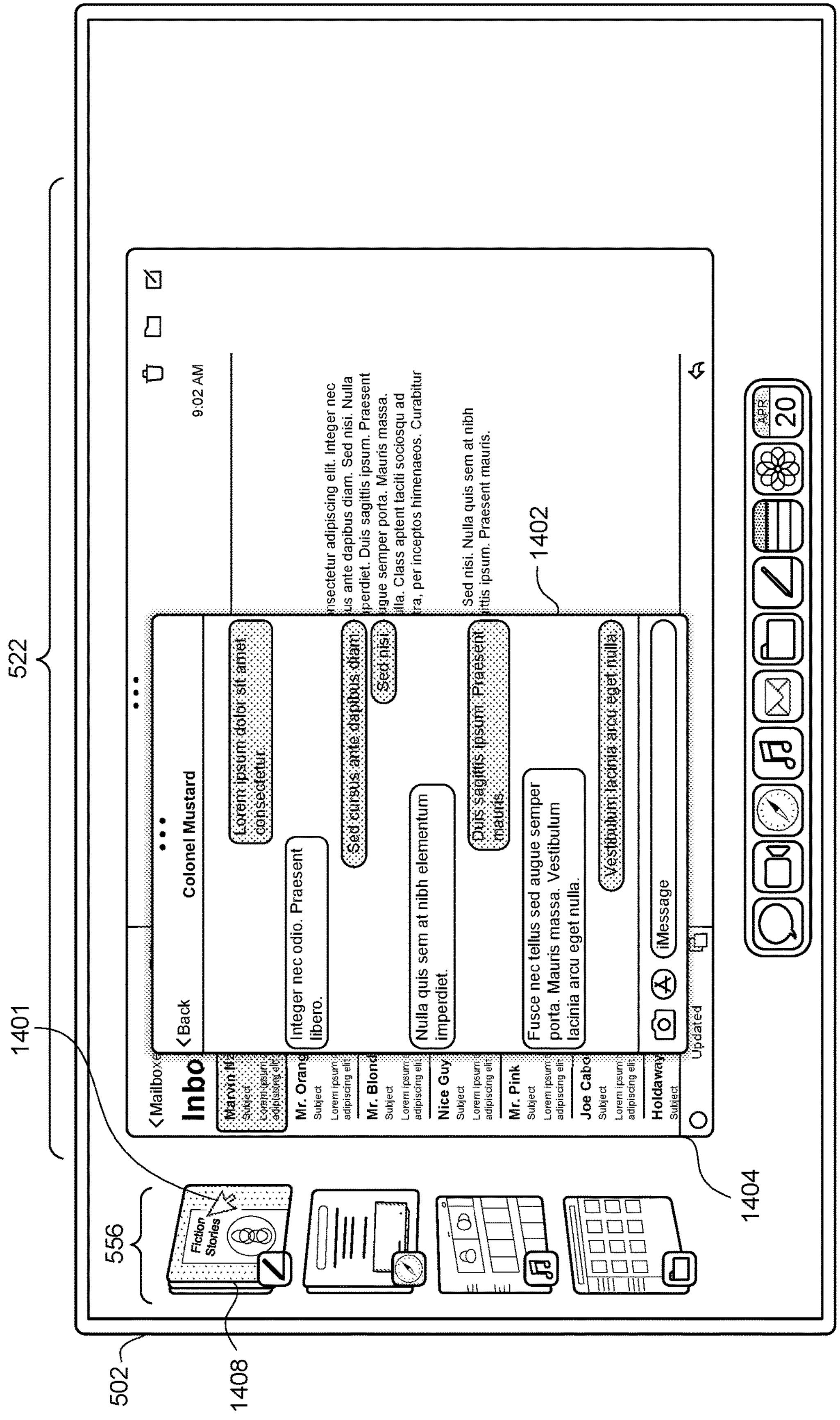
Figure 14B:
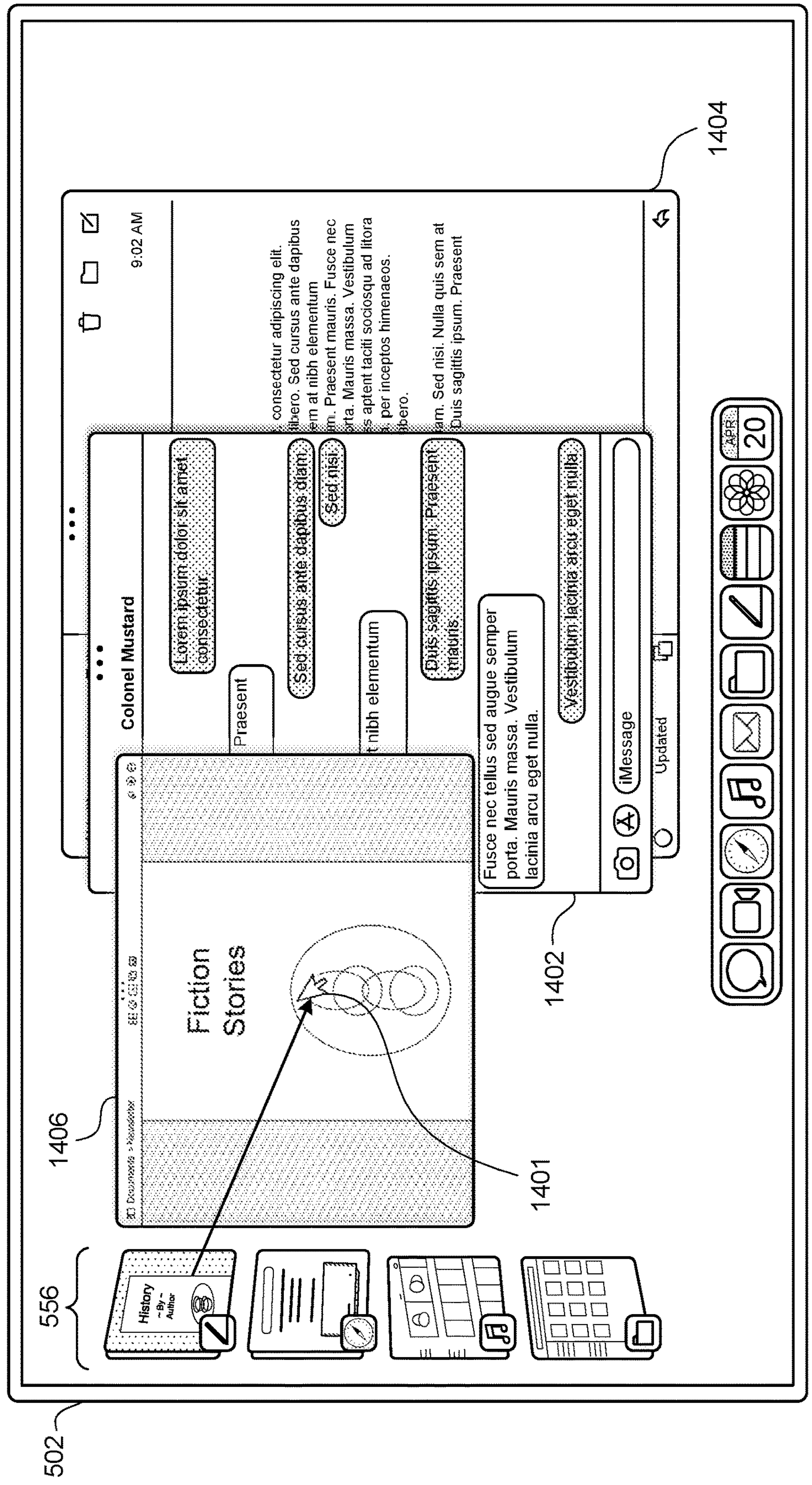
Figure 14C:
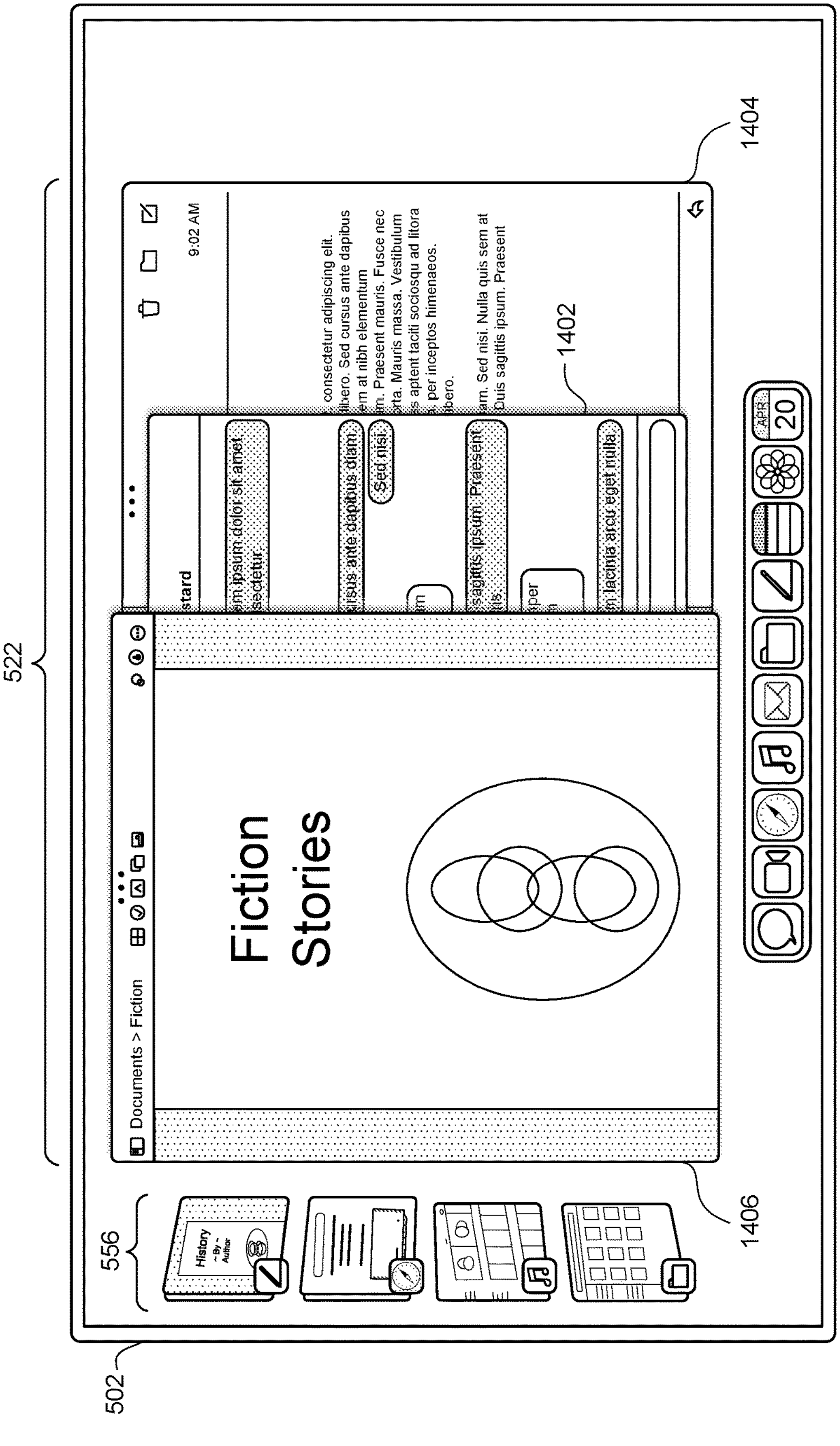

FIGS. 14A-14L illustrate window positioning in the concentration mode described above when there are more than two windows in the stage region and the windows are overlapped, in accordance with some embodiments. In FIG. 14A, with two windows already open in the stage region, user input 1401 opens a third window by selecting and dragging a word processor window representation 1408 from a window grouping representation in the strip (FIG. 14B), which causes a corresponding word processor window 1406 to open in the stage region (FIG. 14C). Since the word processor window is the last to be added to the stage region, the word processor window 1406 is in the foreground, overlapping the messages window 1402, which overlaps the mail window 1404. As such, there are multiple background layers (one for each background window).

Figure 14D:
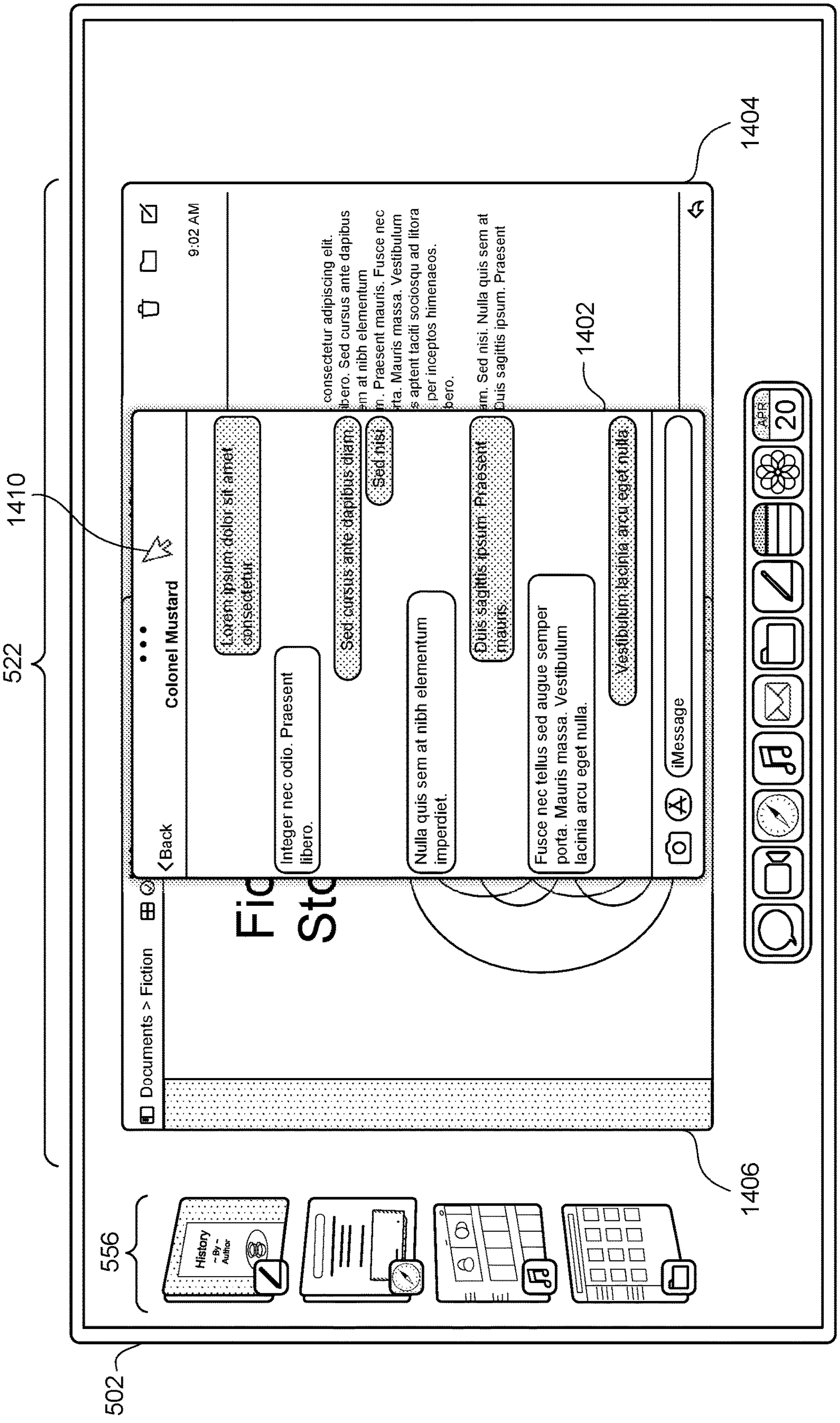
Figure 14E:
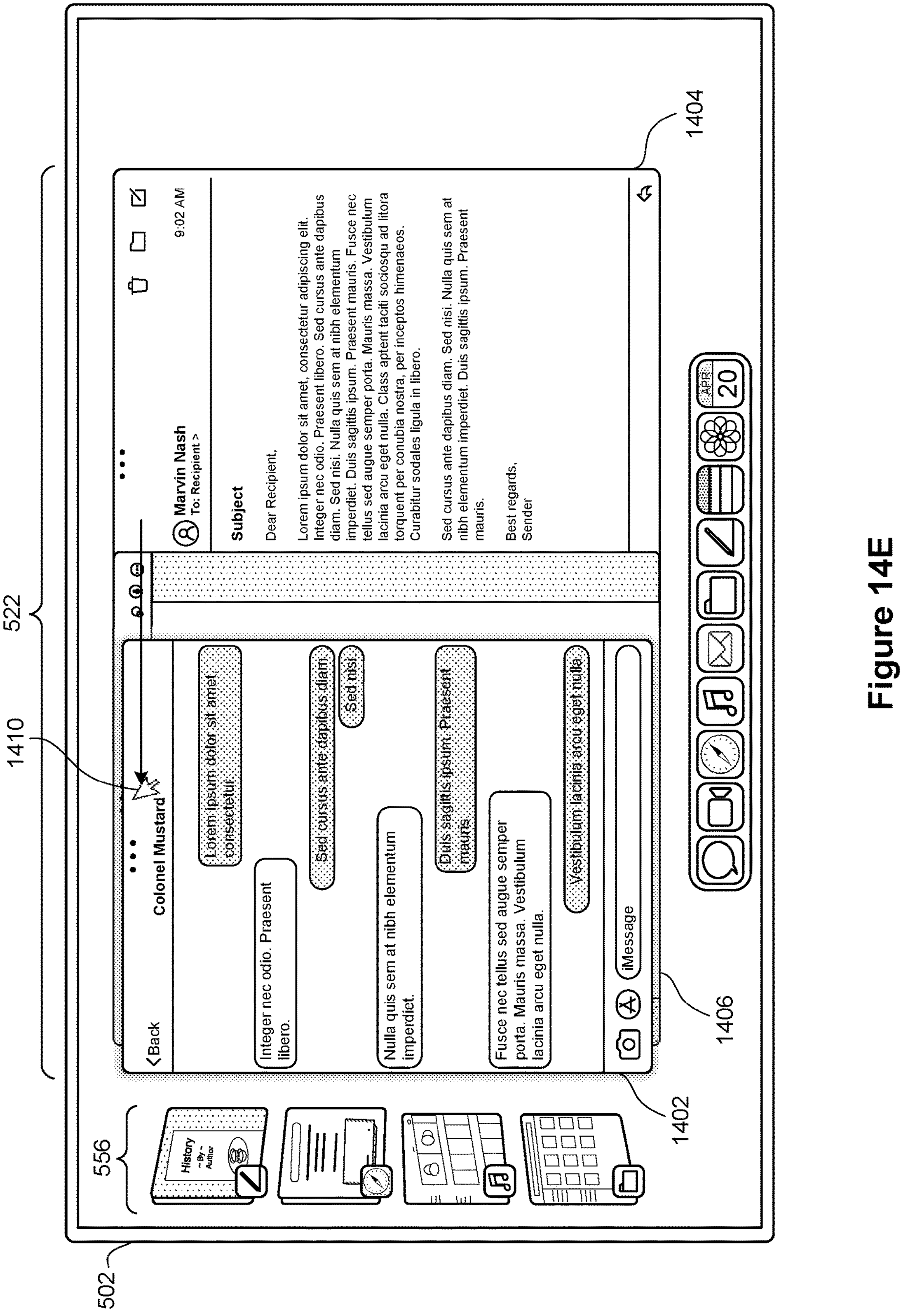
Figure 14F:
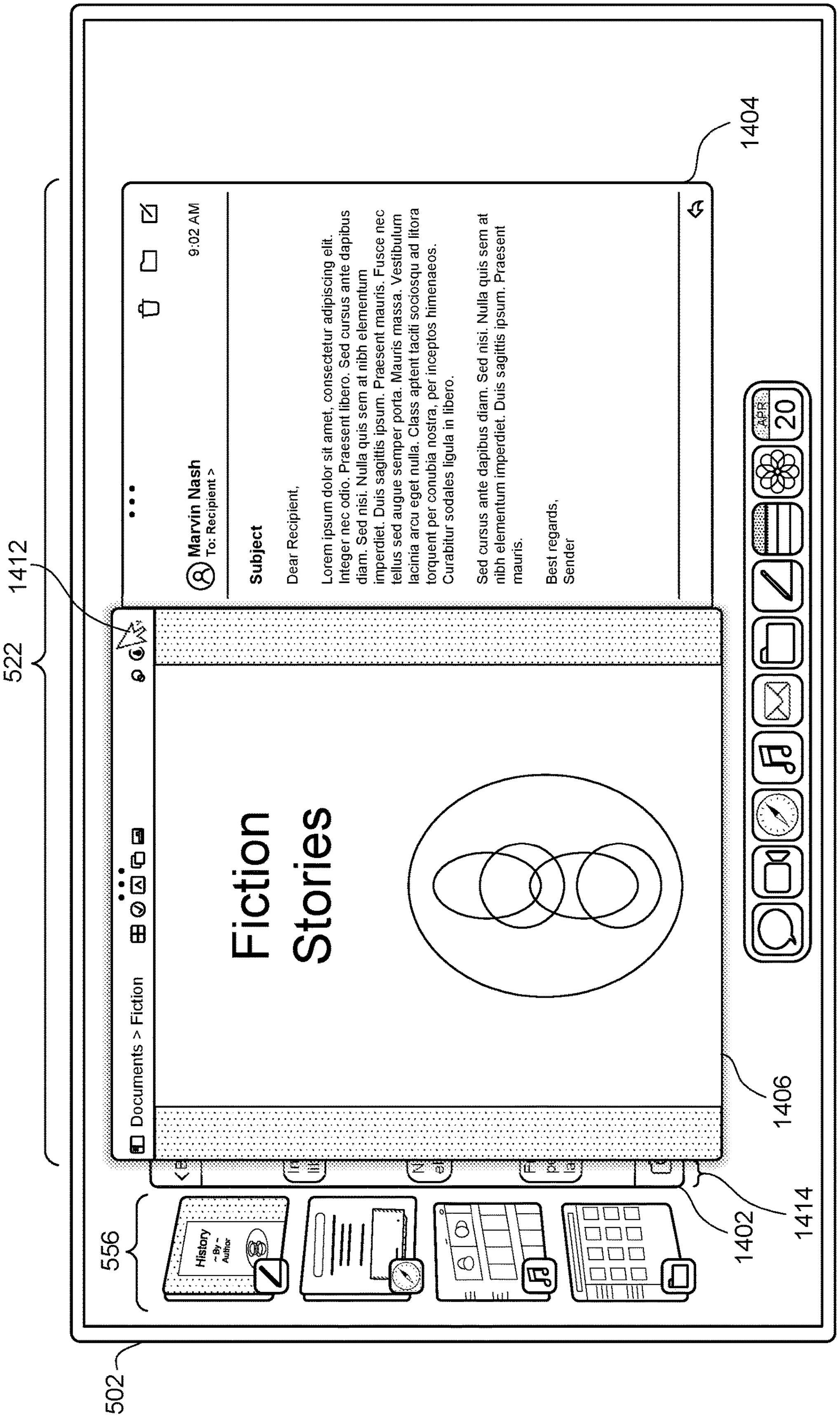
Figure 14G:
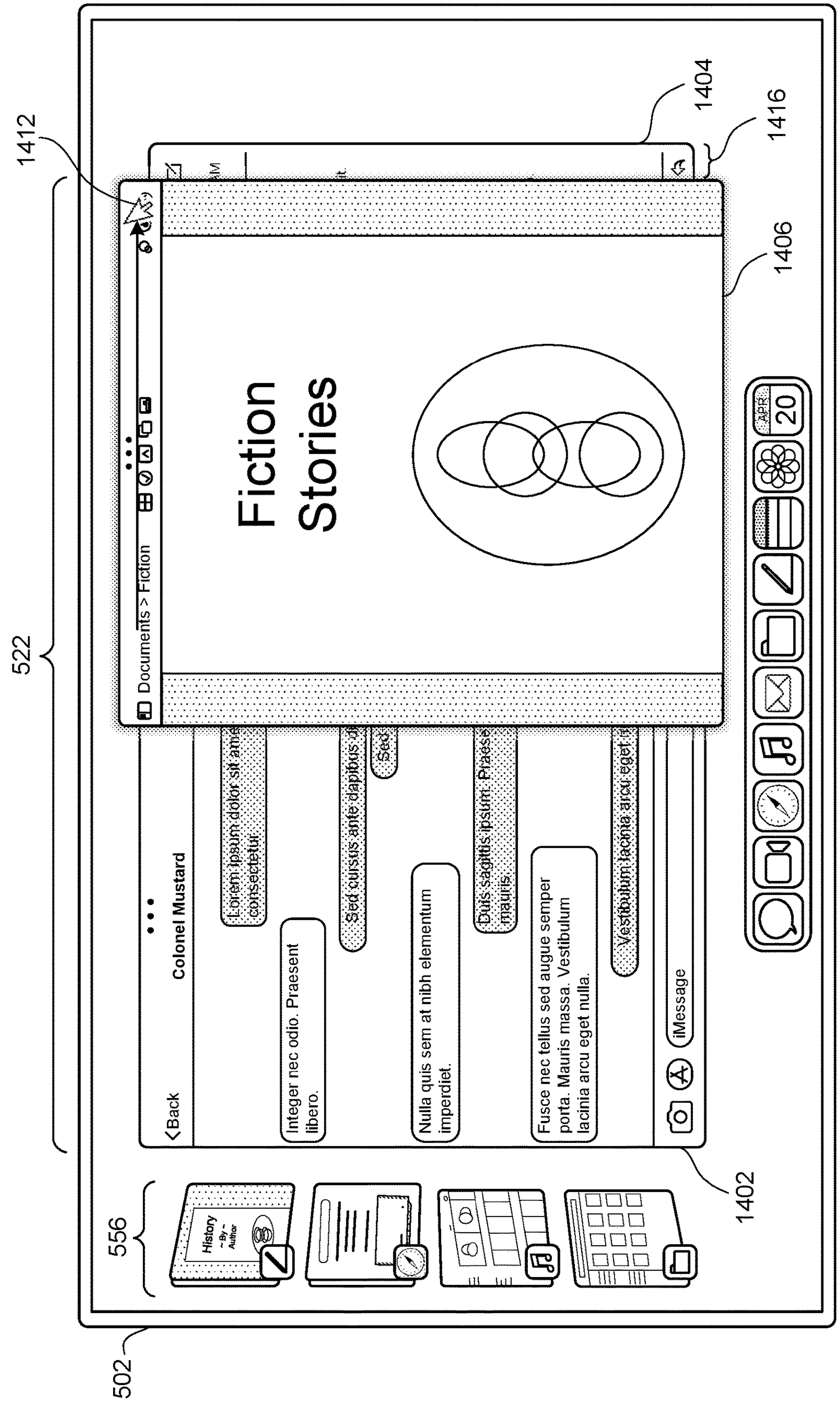
Figure 14H:
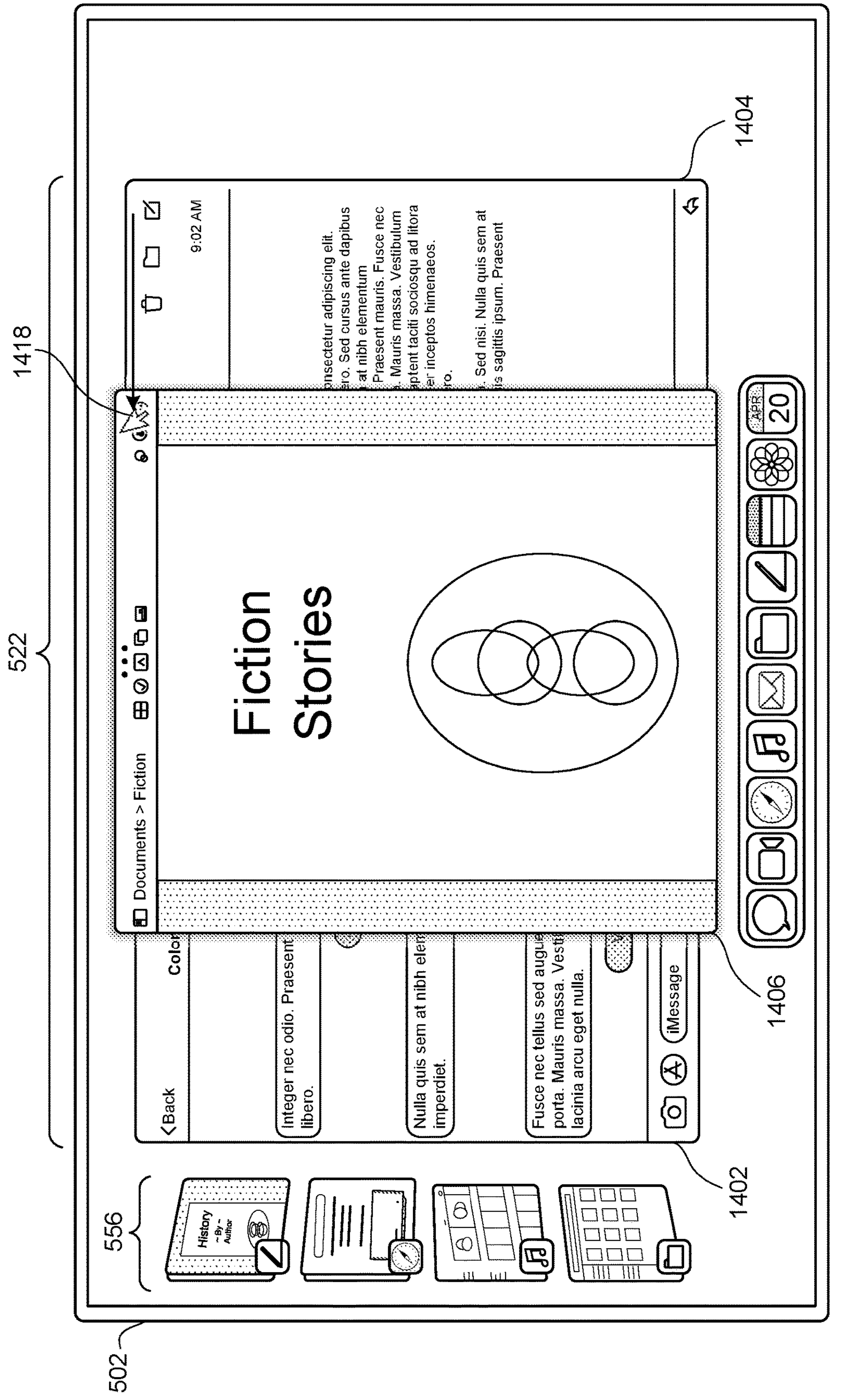
Figure 14I:
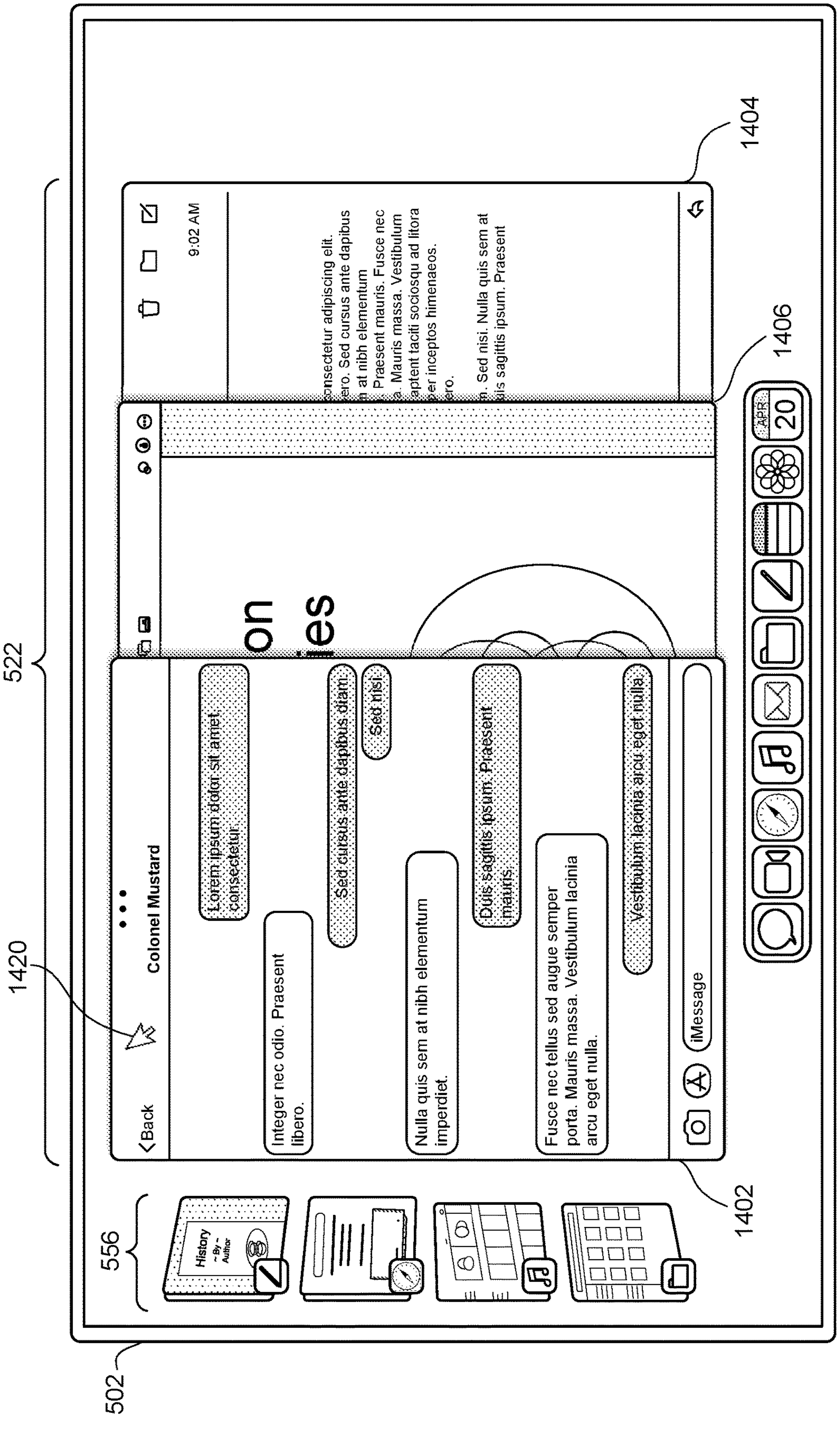

In FIG. 14D, in response to detecting user input 1410 (selecting and moving messages window 1402), device 502 moves window 1402 to the left side of the stage region, as shown in FIG. 14E. In FIG. 14F, in response to detecting user input 1412 (selecting word processor window 1406), device 502 moves messages window 1402 across the edge of the stage region (to the left) and reveals a portion 1414 of messages window 1402. Since word processor window 1406 is positioned mostly over messages window 1402, messages window 1402 is reduced in size, but mail window 1404 remains its original size. In FIG. 14F, in response to detecting user input 1412 (selecting and moving word processor window 1406), device 502 moves word processor window 1406 to the right side of the stage region, causing the mail window 1404 to move across the edge of the stage region and reveal a portion 1416, as shown in FIG. 14G. Since word processor window 1406 is positioned mostly over mail window 1404, mail window 1404 is reduced in size, but messages window 1402 is restored to its original size. In FIG. 14H, in response to detecting user input 1418 (selecting and moving word processor window 1406), device 502 moves word processor window 1406 to the middle of the stage region, occluding portions of both messages window 1402 and mail window 1404. Since a portion at least the size of a portion of each of the messages window 1402 and the mail window 1404 are still visible, the messages window 1402 and the mail window 1404 do not move any closer to the edge of the stage region. Stated another way, the occlusion handling features described above occur if a window would be occluded such that a portion smaller than a sliver portion (e.g., smaller than an area big enough to be visible to and selected by a user) would be visible if the window did not move to an edge of the stage region.

Figure 14J:
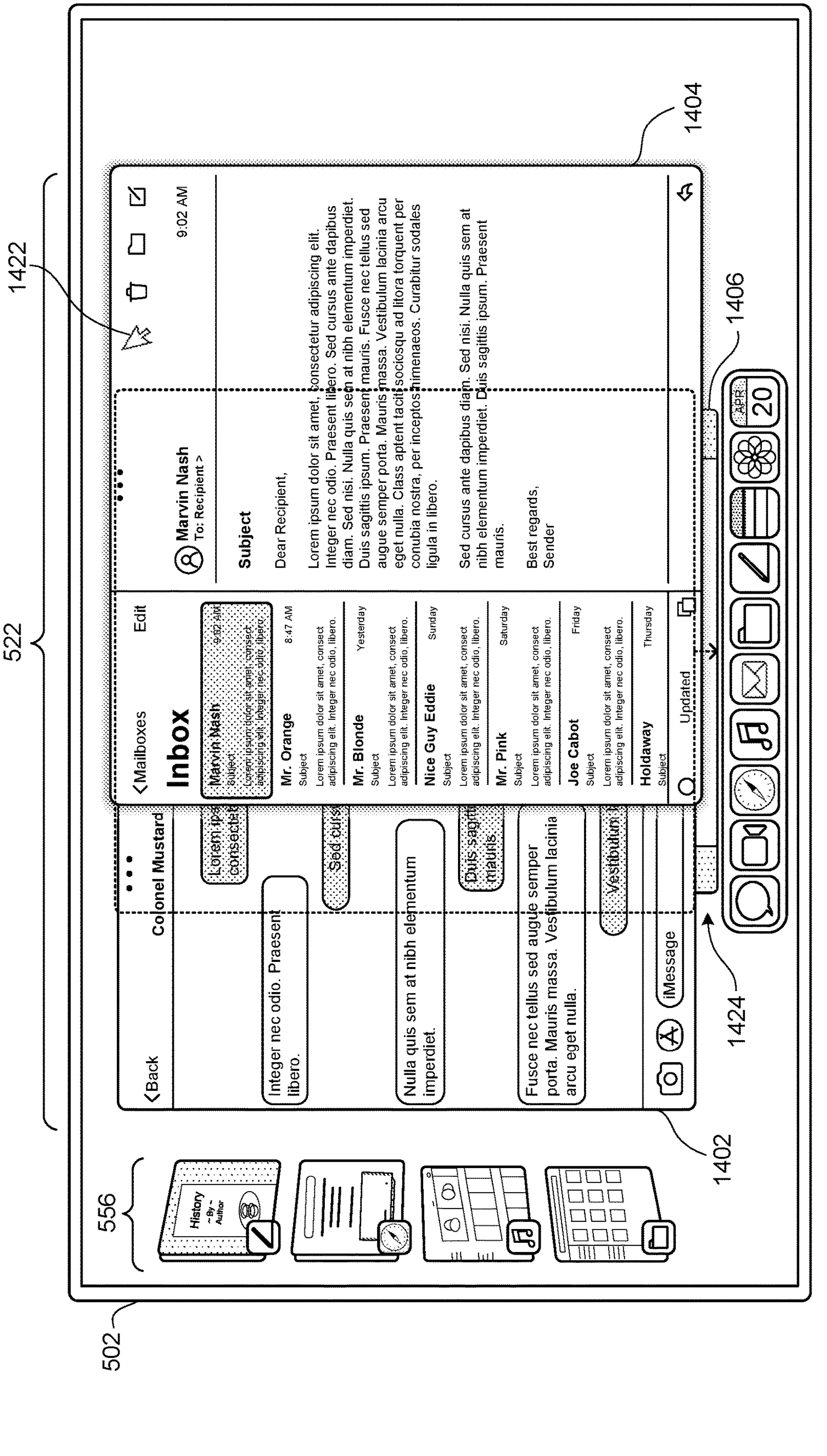
Figure 14K:
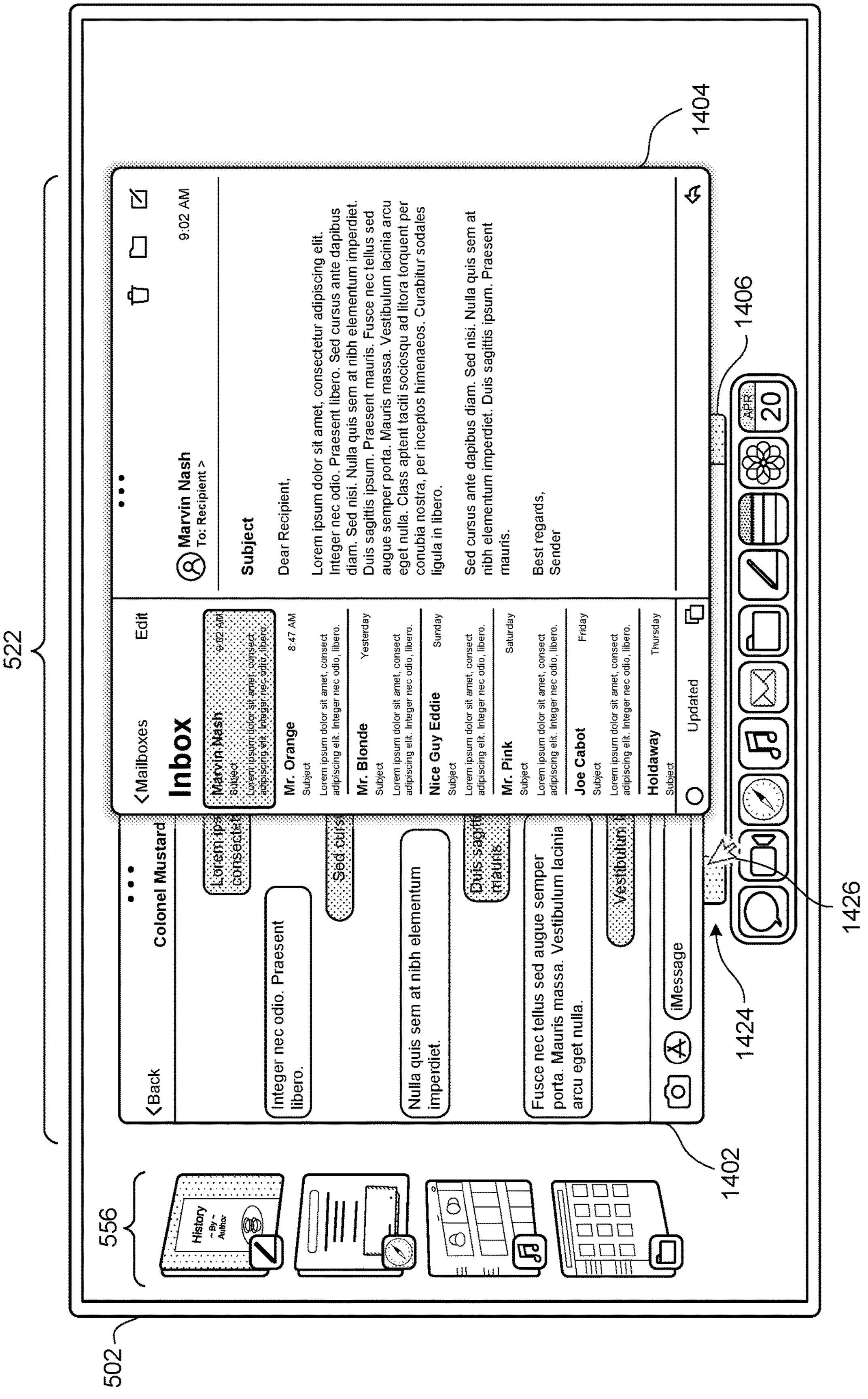
Figure 14L:
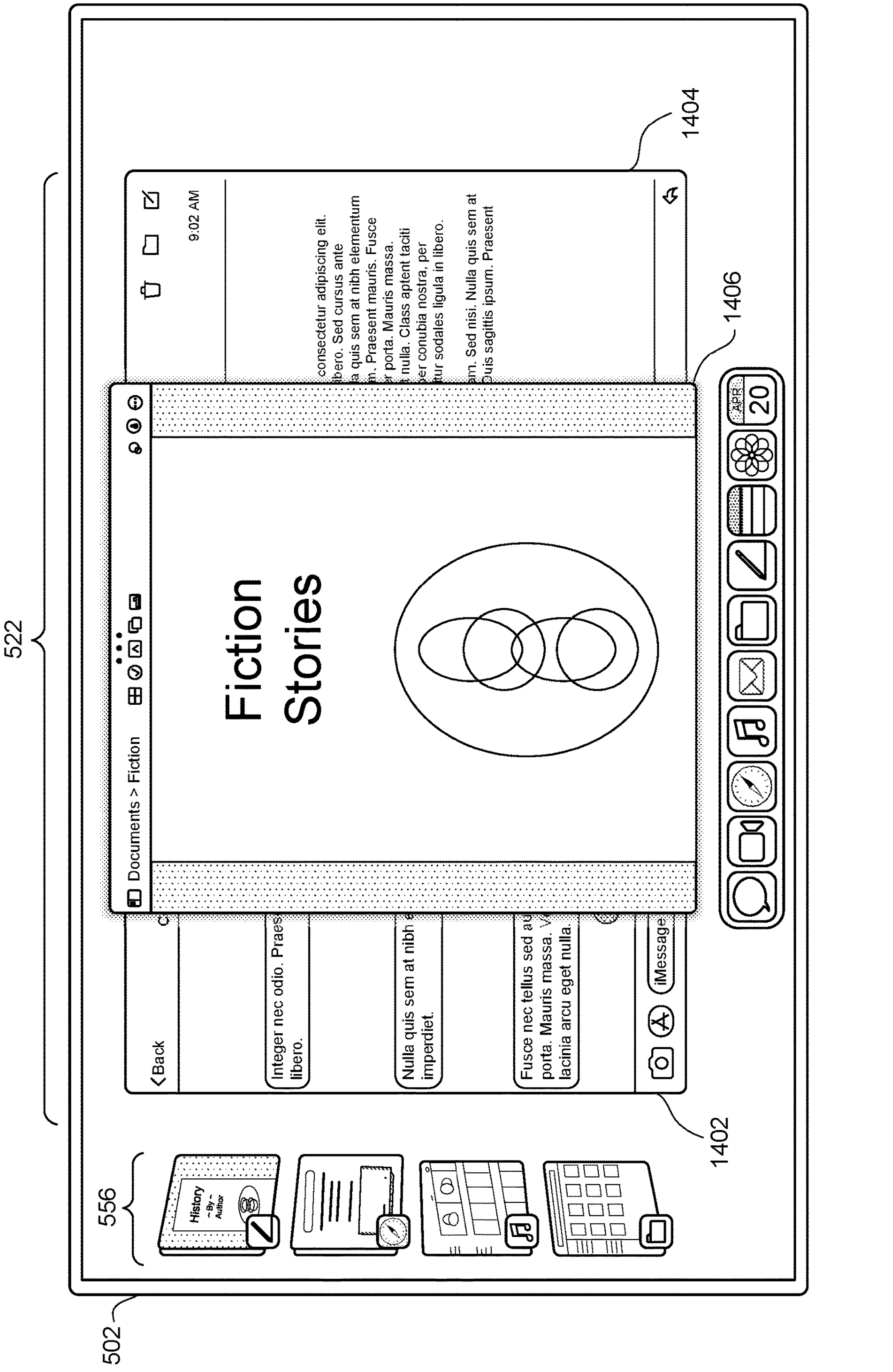

In certain scenarios, a window may be subject to the occlusion handling features described above even if it is not completely occluded by just one other window. For example, in FIG. 14I, user input 1420 selects messages window 1402, which occludes a portion of word processor window 1406, and in FIG. 14J, user input 1422 selects mail window 1404, which occludes the rest of word processor window 1406. As a result, word processor window 1406 is automatically moved down toward or across the bottom edge of the stage region, so that a portion 1424 of the word processor window is visible below the stage region. In FIG. 14K, user input 1426 selects portion 1424 of the word processor window 1406, causing the word processor window 1406 to be restored to the foreground, as shown in FIG. 14L.

Figure 14M:
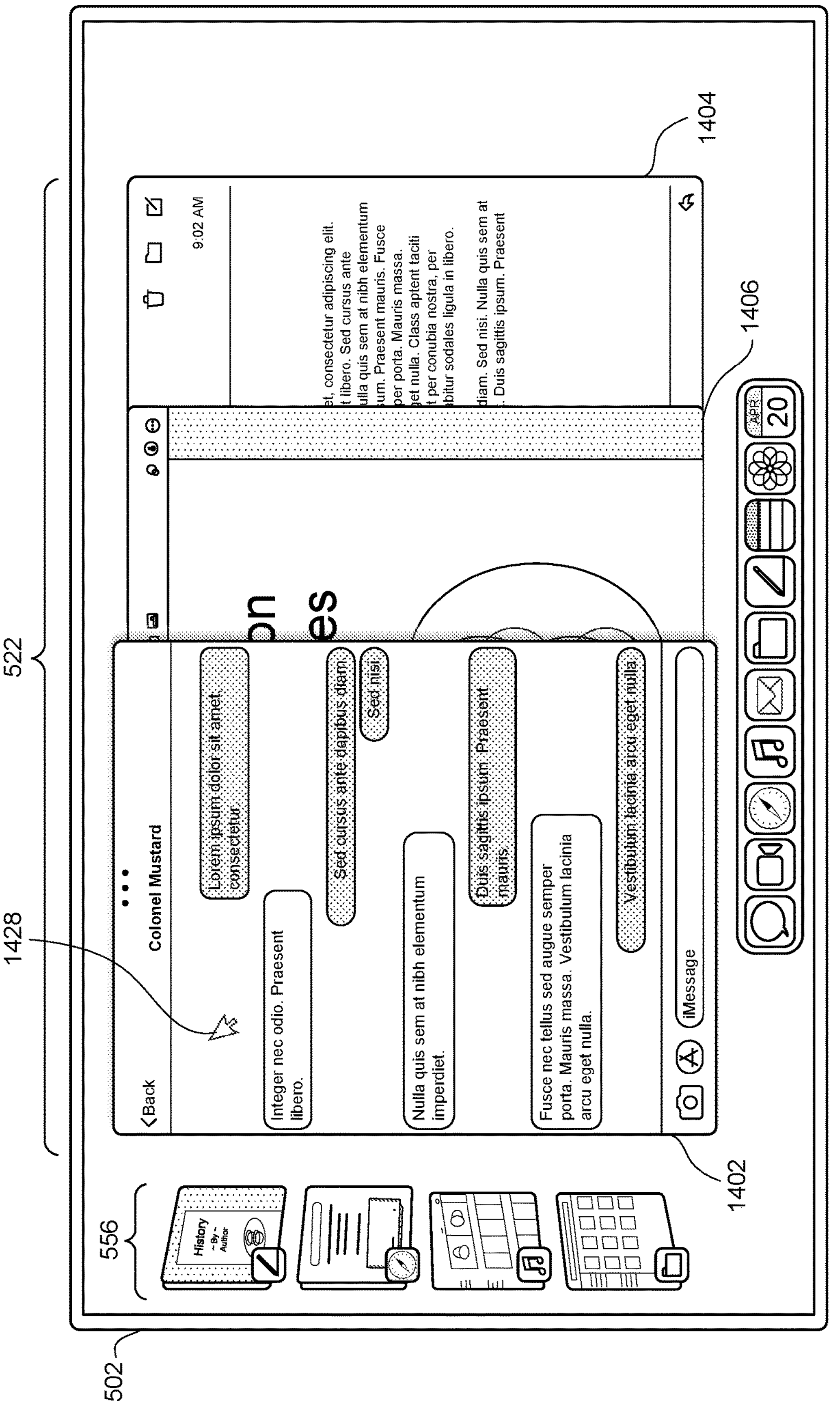
Figure 14N:
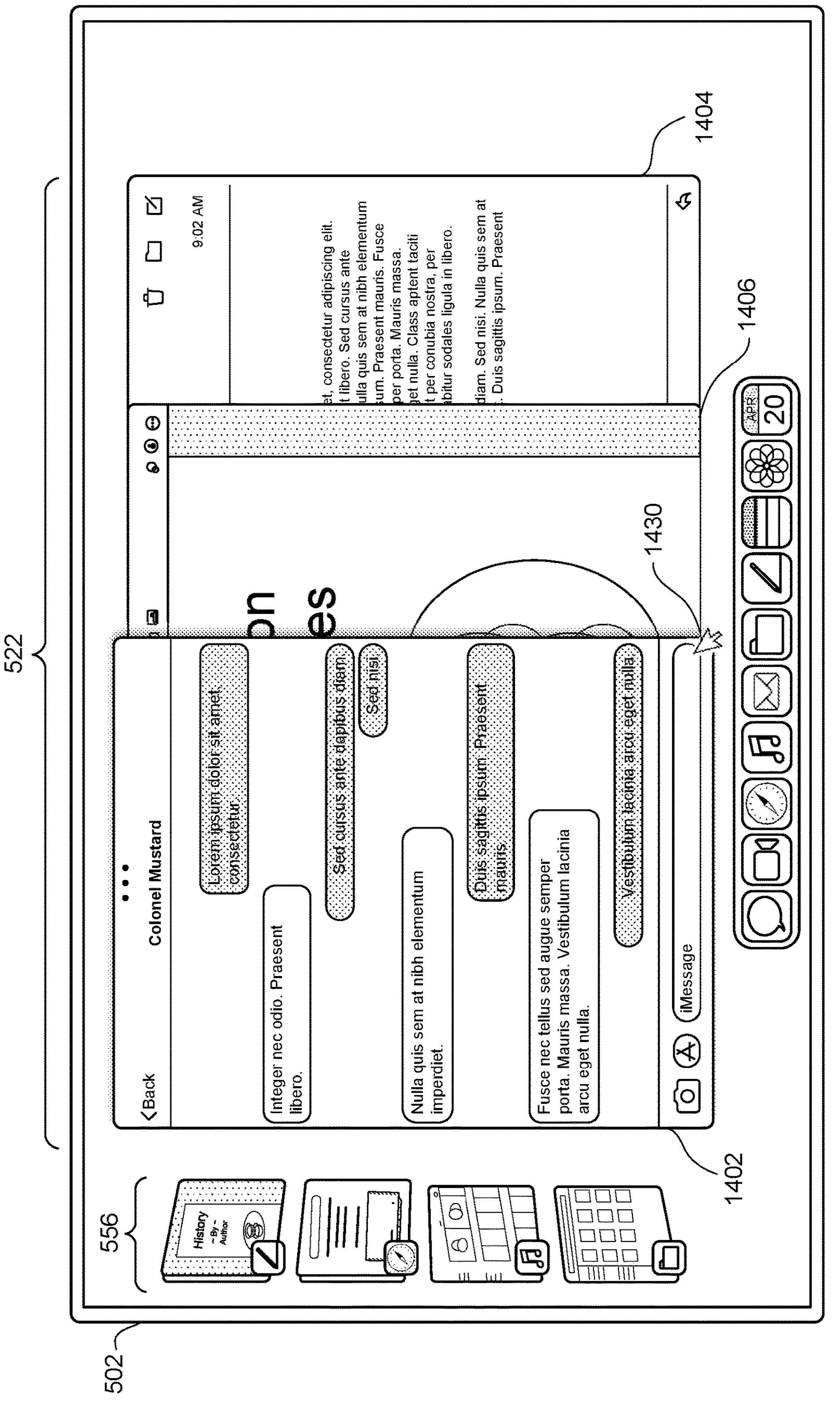
Figure 14O:
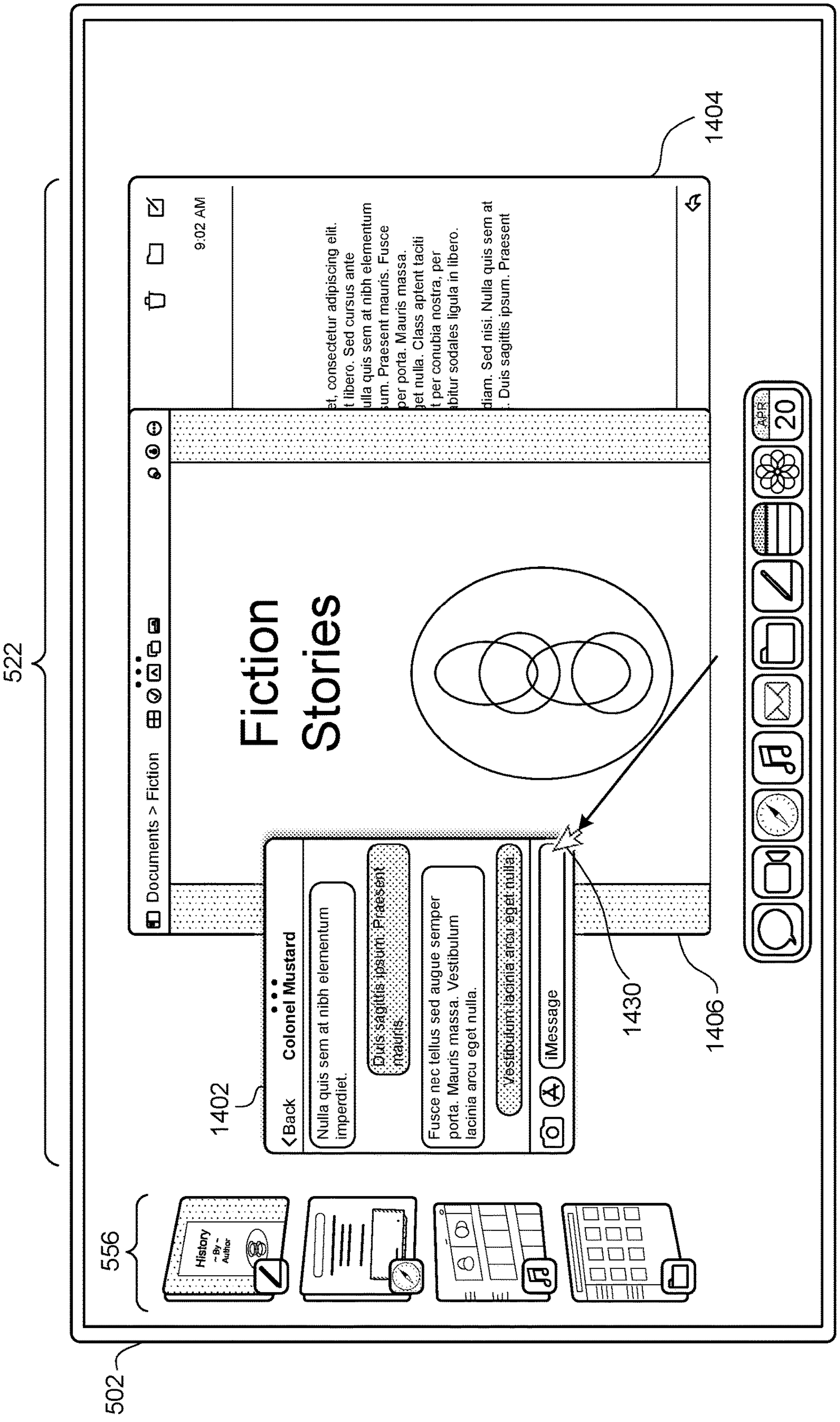
Figure 14P:
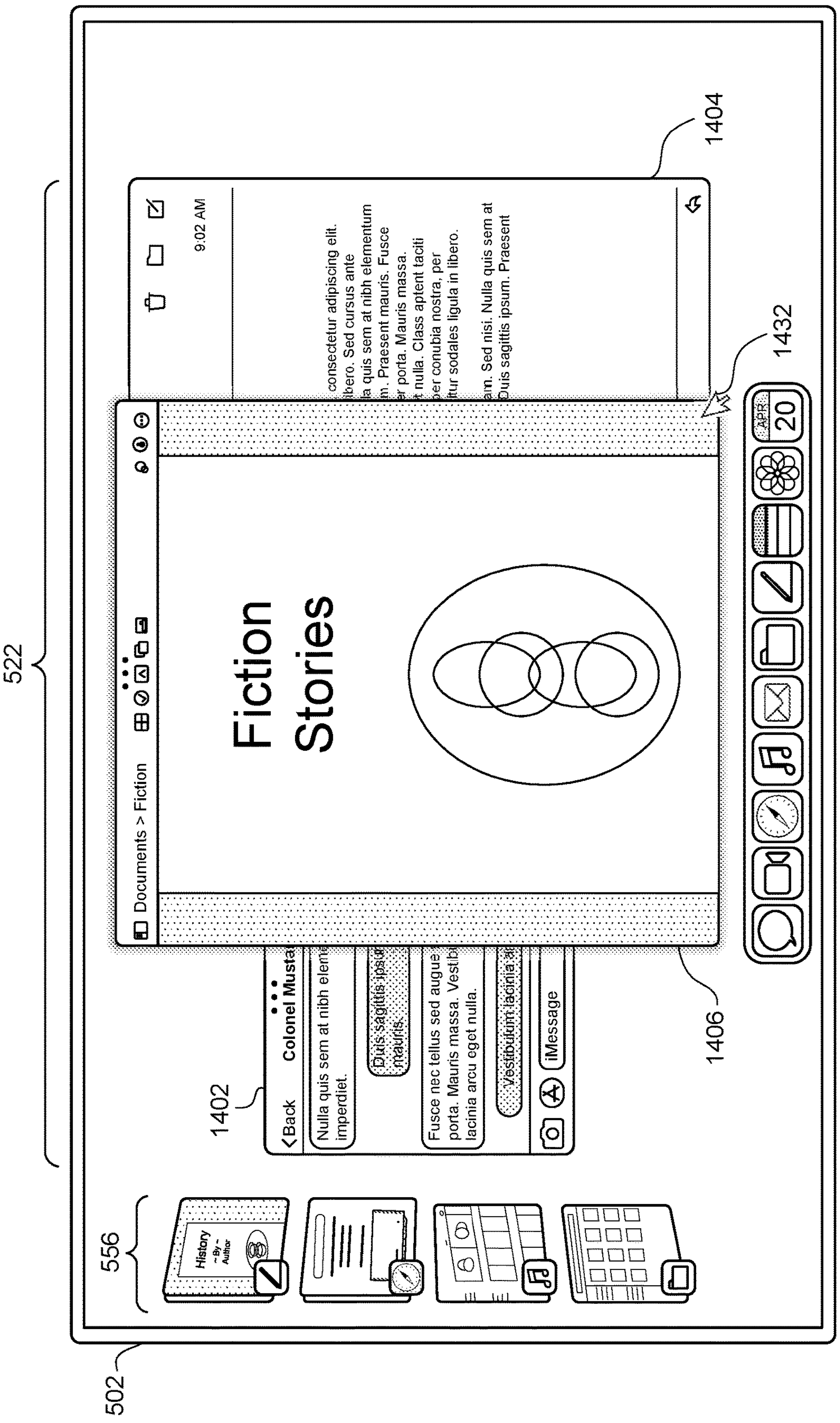
Figure 14Q:
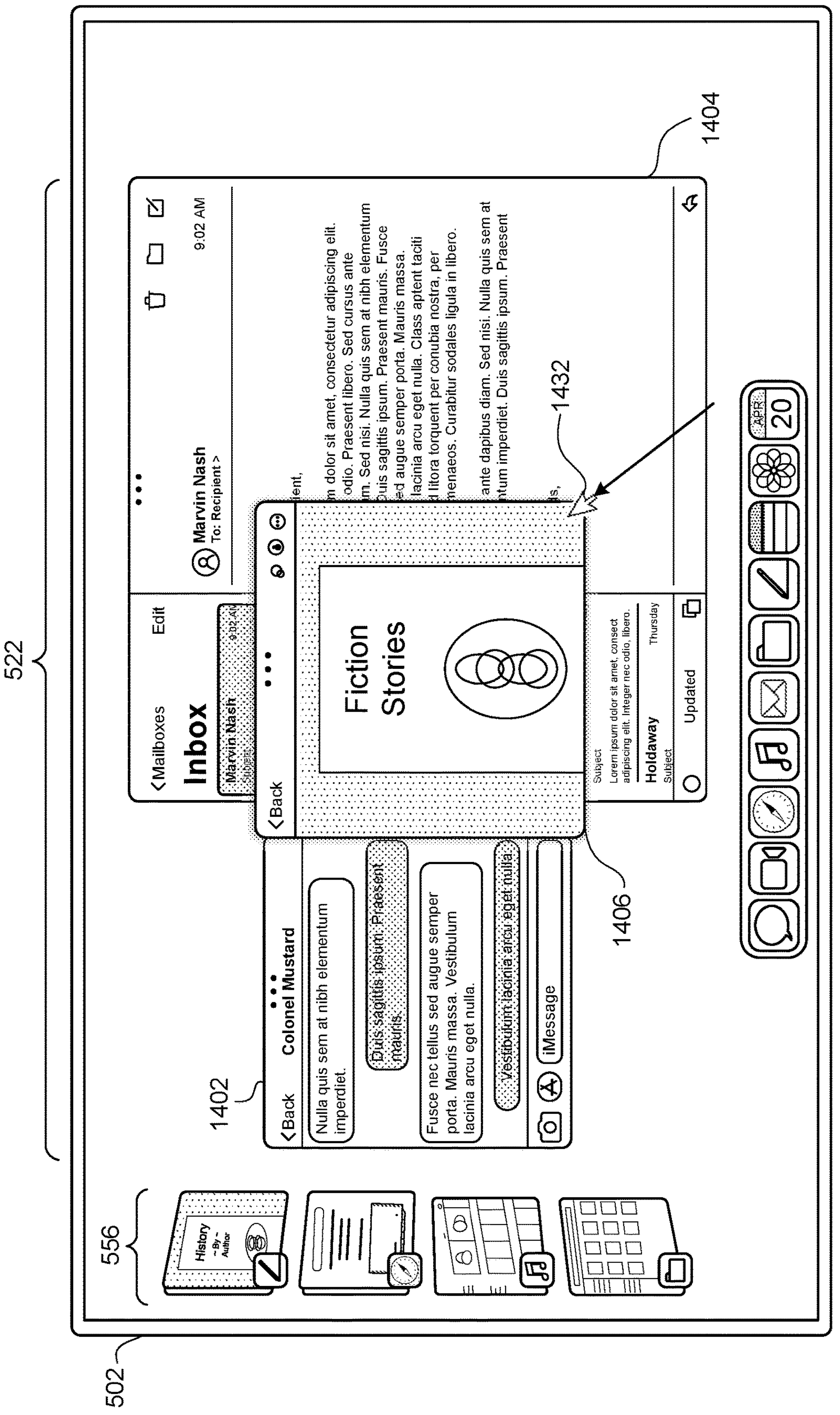
Figure 14R:
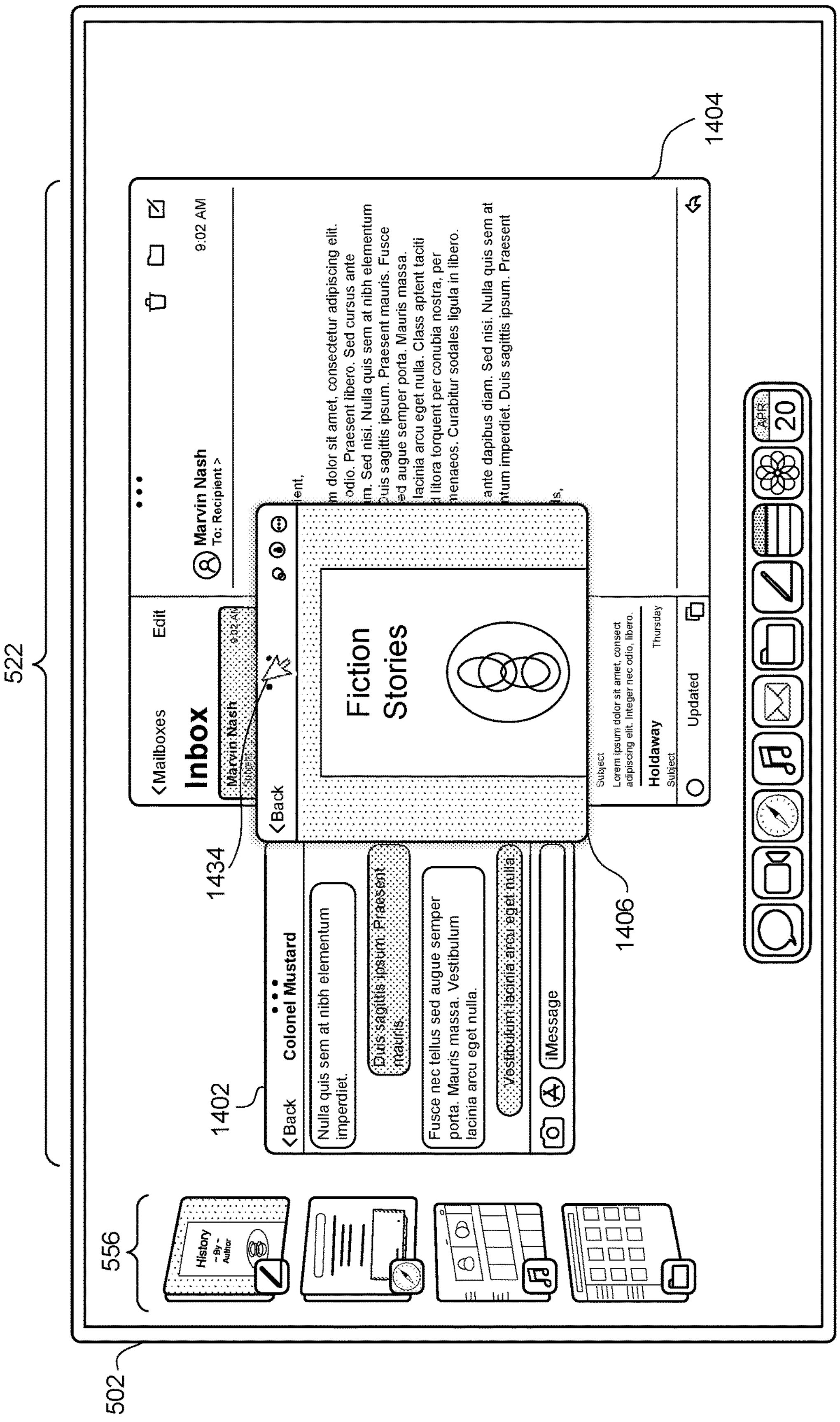
Figure 14S:
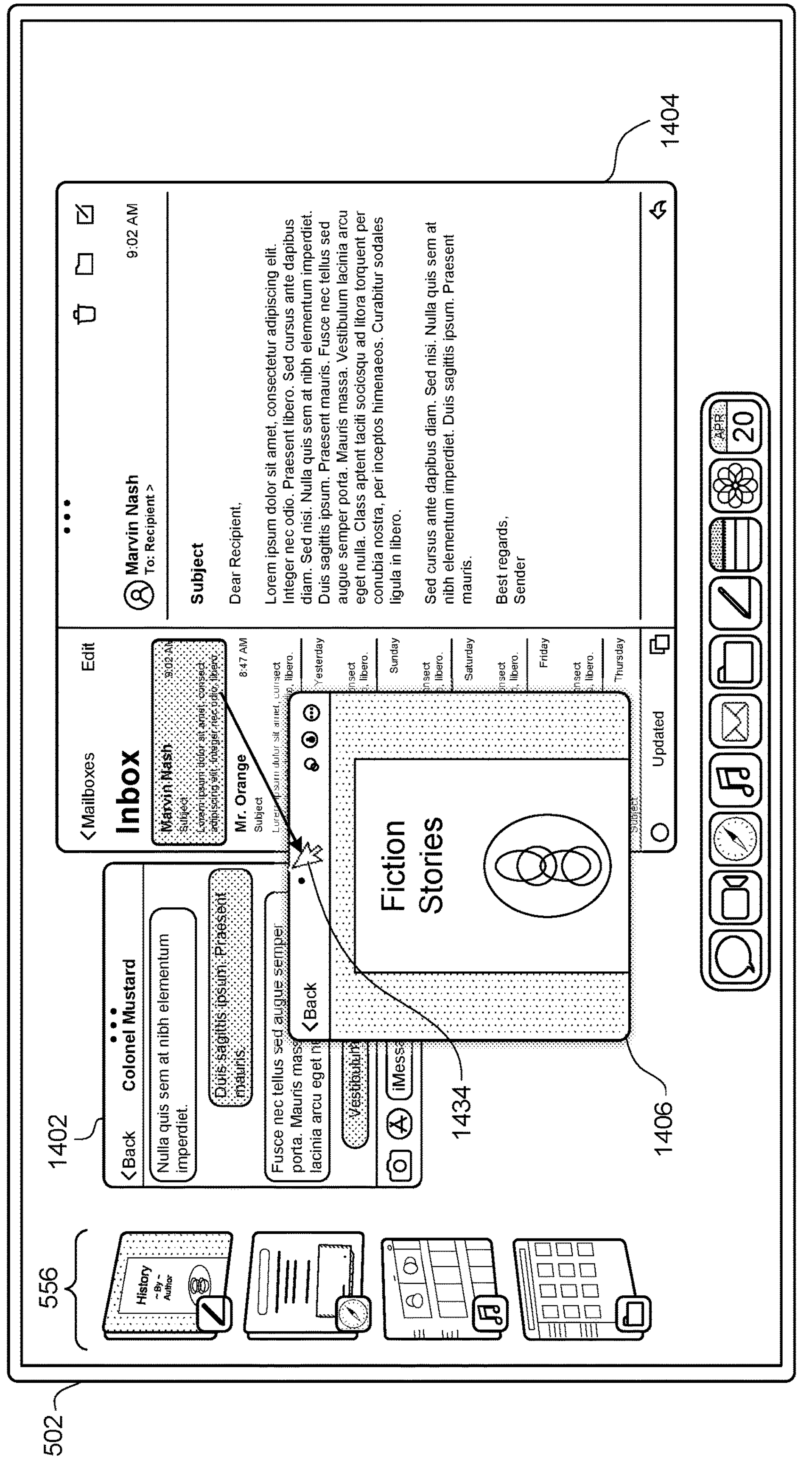
Figure 14T:
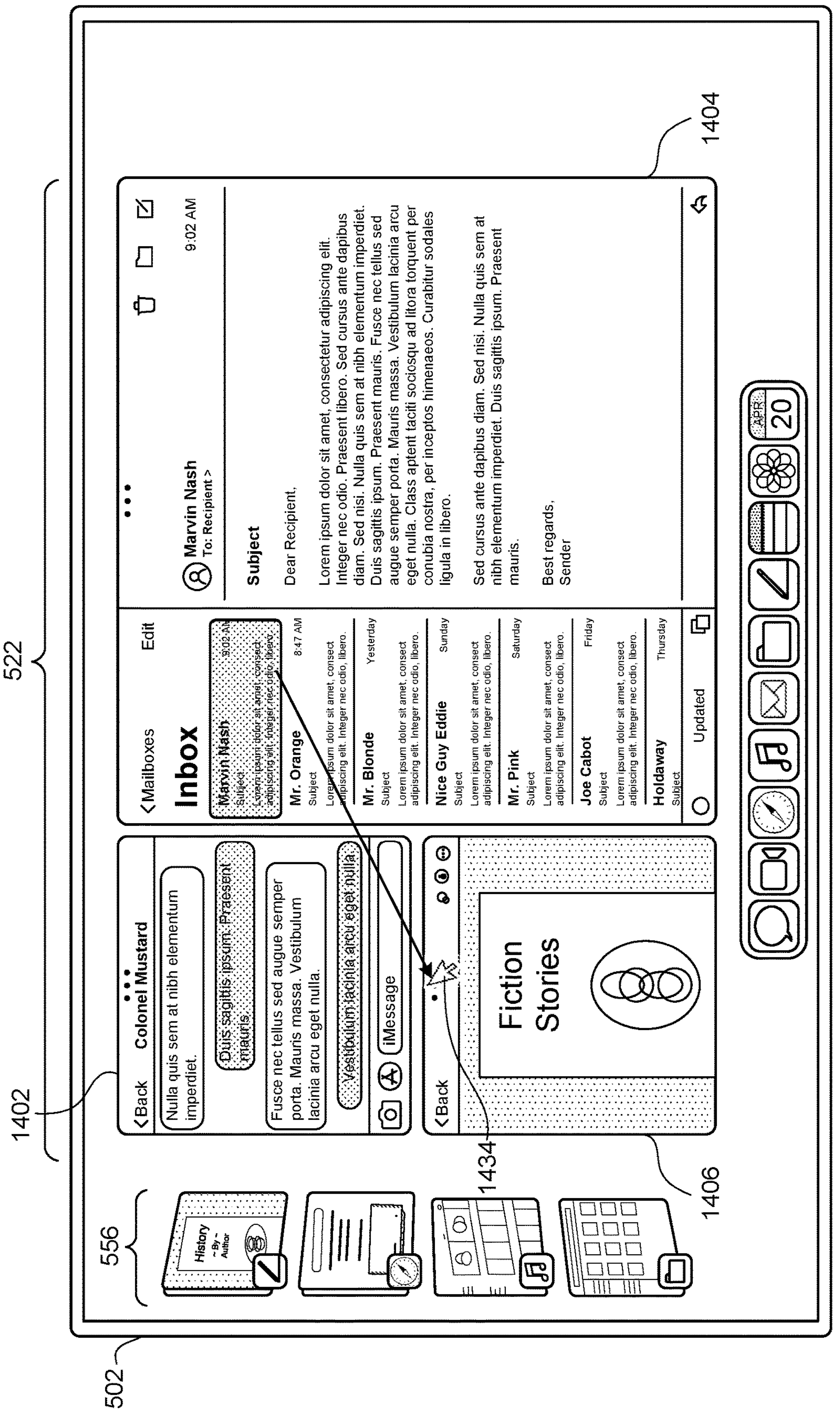

FIGS. 14M-14AE illustrate window positioning in the concentration mode described above when there are more than two windows in the stage region and the windows are in a non-overlapped, multi-way split view, in accordance with some embodiments. In FIG. 14M, in response to detecting user input 1428 selecting messages window 1402, device 502 moves messages window 1402 to the foreground. In FIG. 14N, in response to detecting input 1430, device 502 resizes messages window 1402 to a smaller window size, as shown in FIG. 14O. In FIG. 14P, in response to detecting user input 1432, device 502 resizes word processor window 1406 to a smaller window size, as shown in FIG. 14Q. In FIG. 14R, in response to detecting user input 1434 (selecting and moving window 1406), device 502 moves window 1406 towards the lower left corner of the stage region and window 1402 towards the upper left corner of the stage region, as shown in FIG. 14S. In response to detecting continued movement of user input 1434, device 502 continues to move window 1406 to the lower left corner of the stage region area and window 1402 to the upper left corner of the stage region area, as shown in FIG. 14T. Thus, user input 1434 causes device 502 to move word processor window 1406 to an empty portion of the stage region, which causes device 502 to automatically (without user input) reposition messages window 1402 and mail window 1404 to fill in a portion of or all of the empty space in the stage region. Since each window in the stage region is sized in such a manner as to allow the entire stage region to be filled without overlapping windows, the windows arrange themselves to fill the stage region in accordance with the latest user repositioning input (user input 1434 in FIGS. 14R, 14S, and 14T). Stated another way, when a window is repositioned by the user, the other windows reposition themselves to best fill in the area of the stage region. In some embodiments, this includes positioning windows (or groups of windows) with similar widths in the same vertical column and/or positioning windows (or groups of windows) with similar heights in the same horizontal row.

Figure 14U:
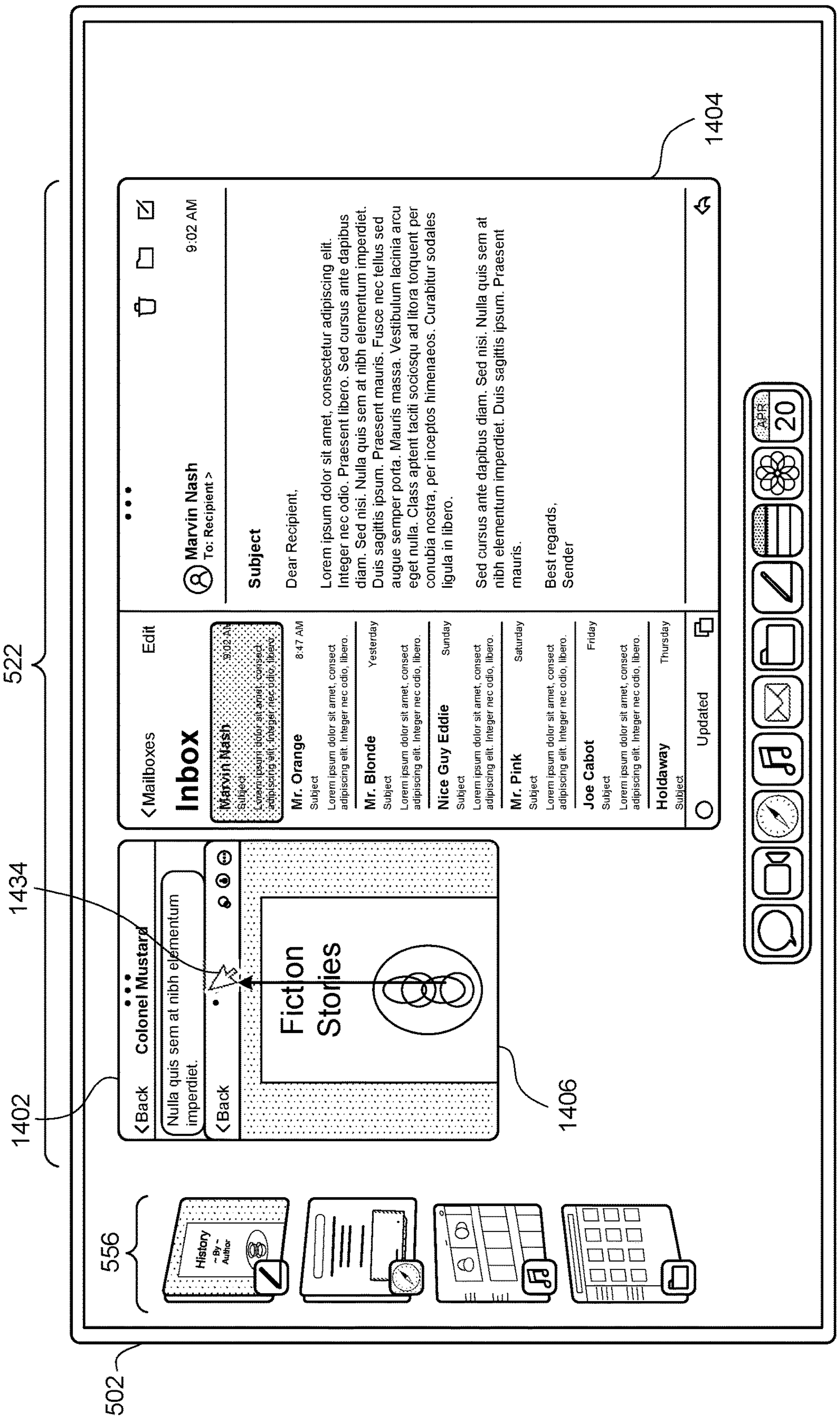
Figure 14V:
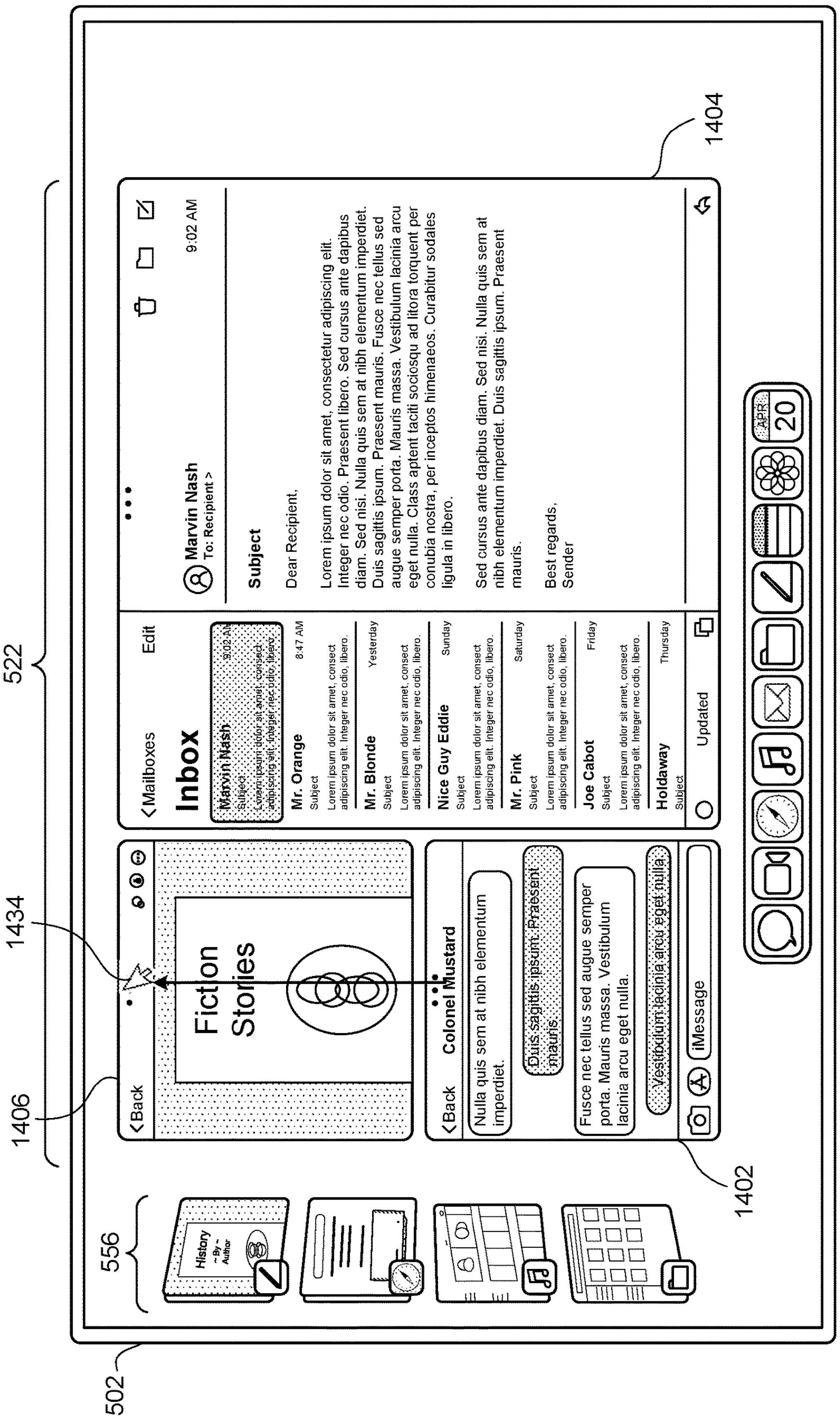
Figure 14W:
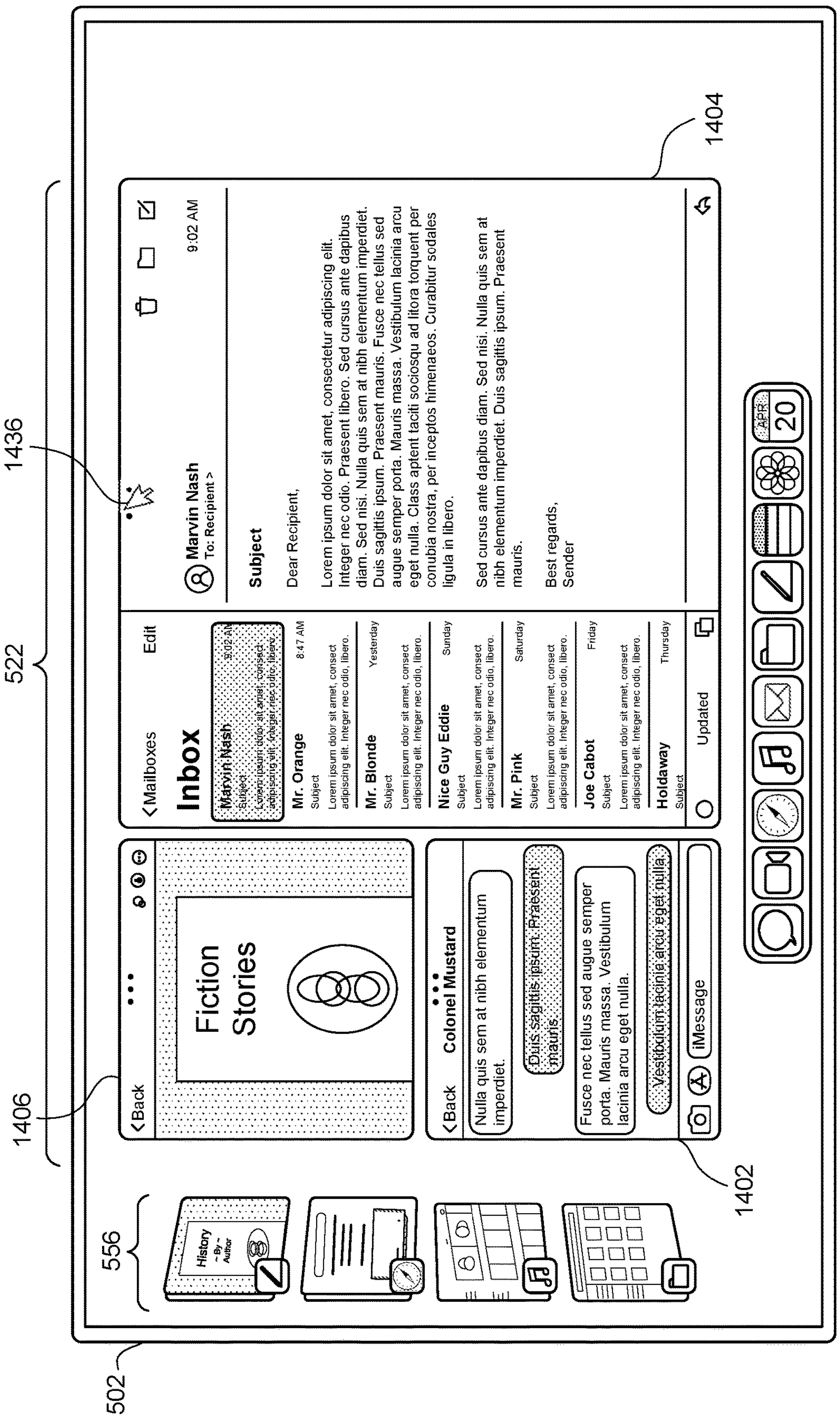
Figure 14X:
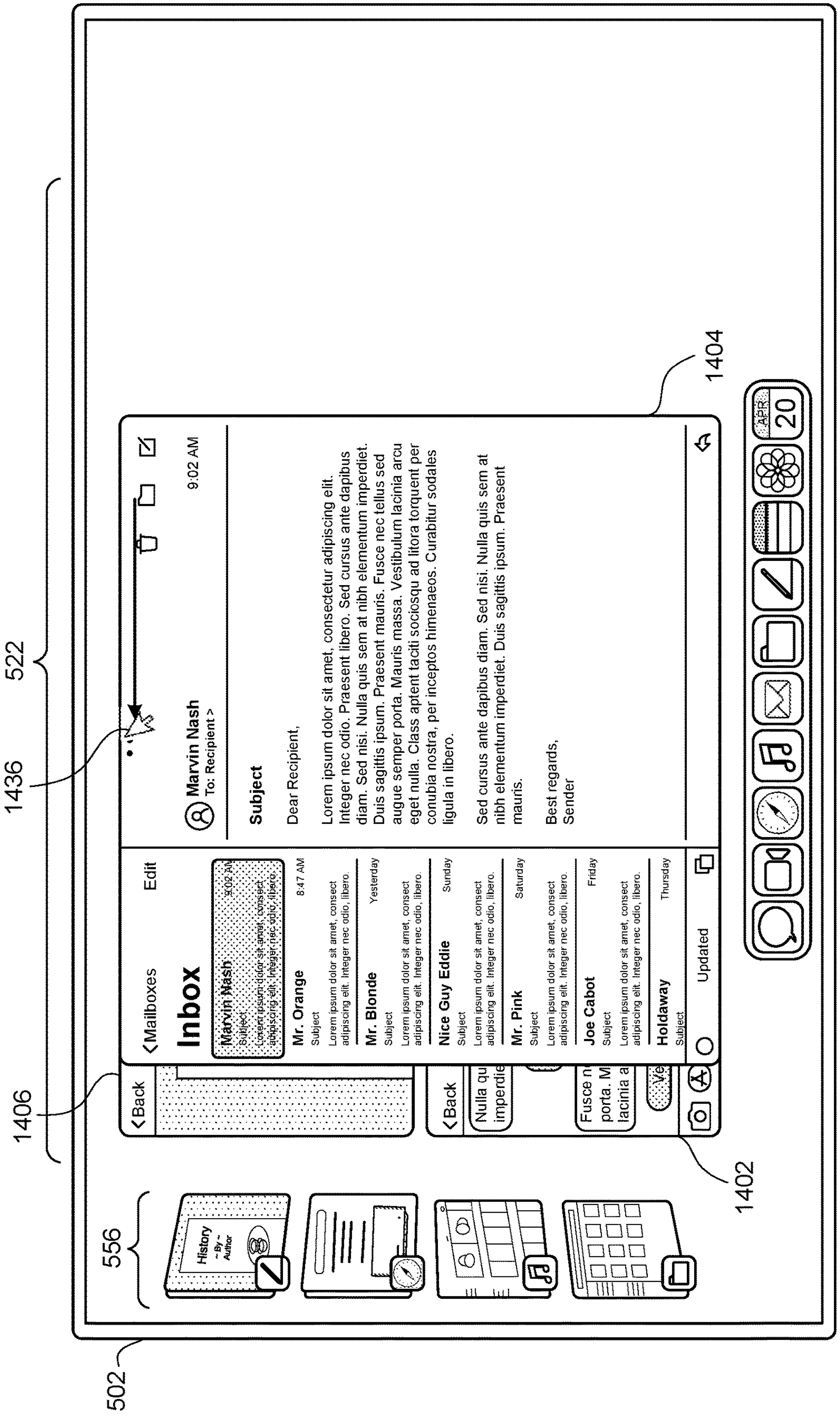
Figure 14Y:
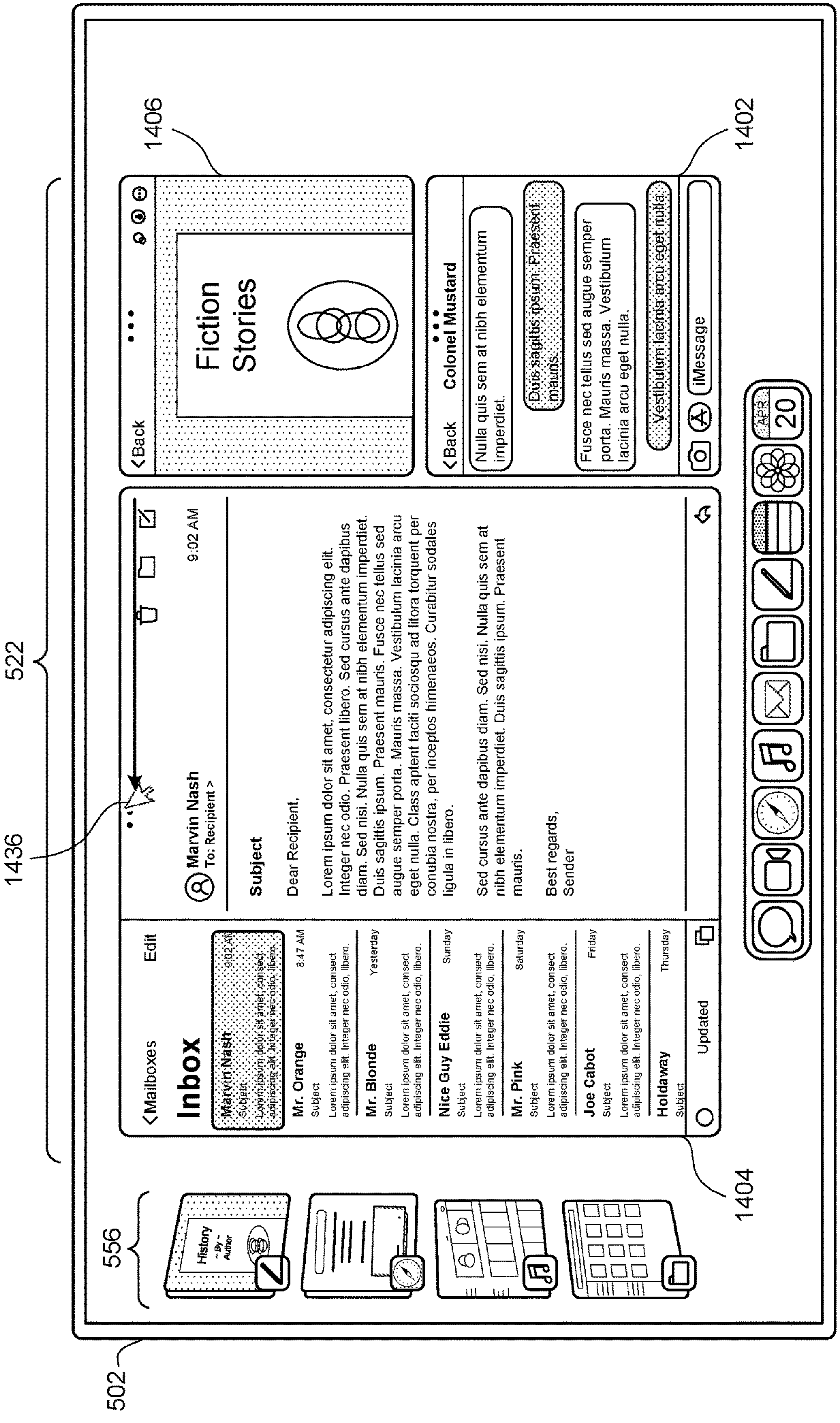
Figure 14Z:
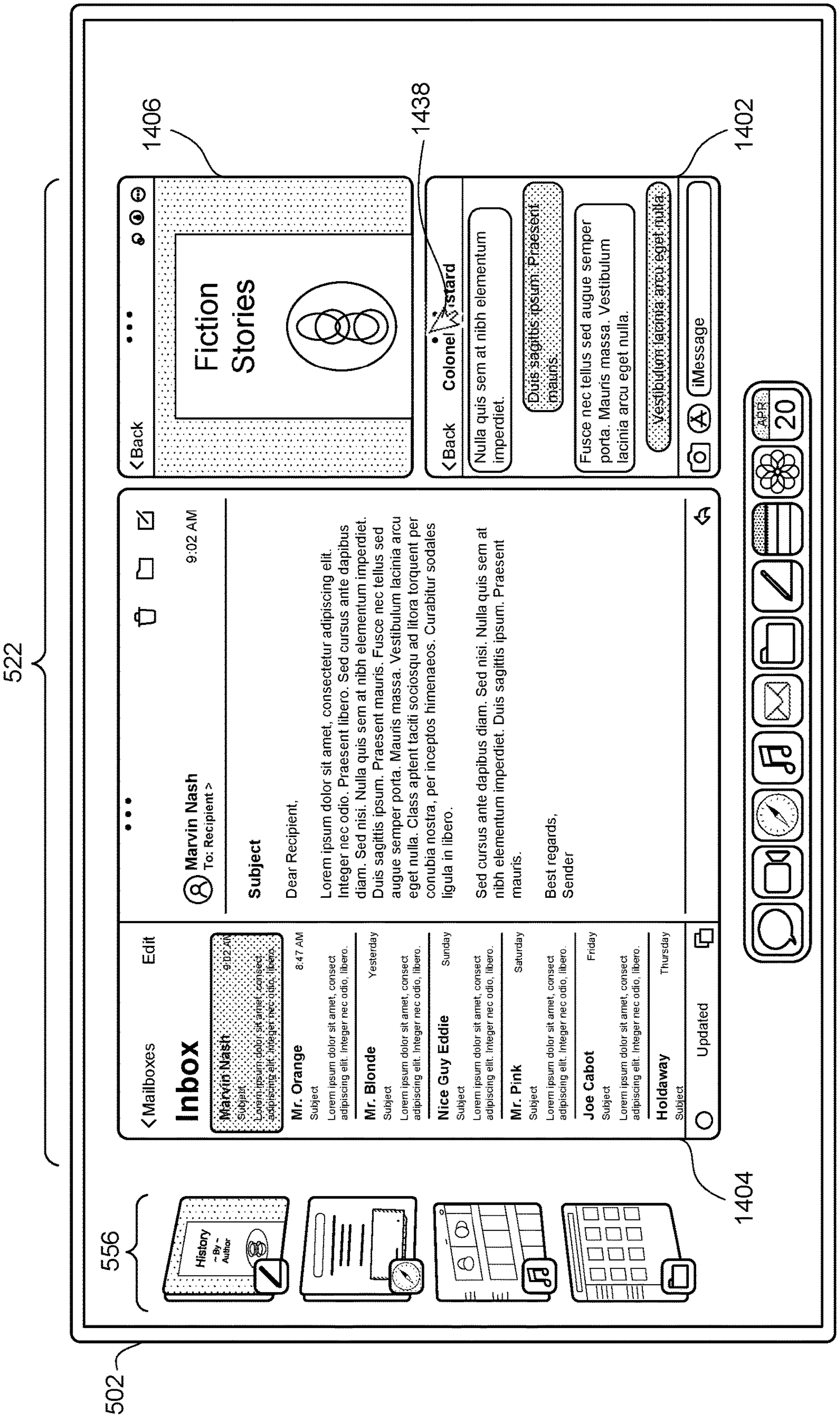
Figure 14A:
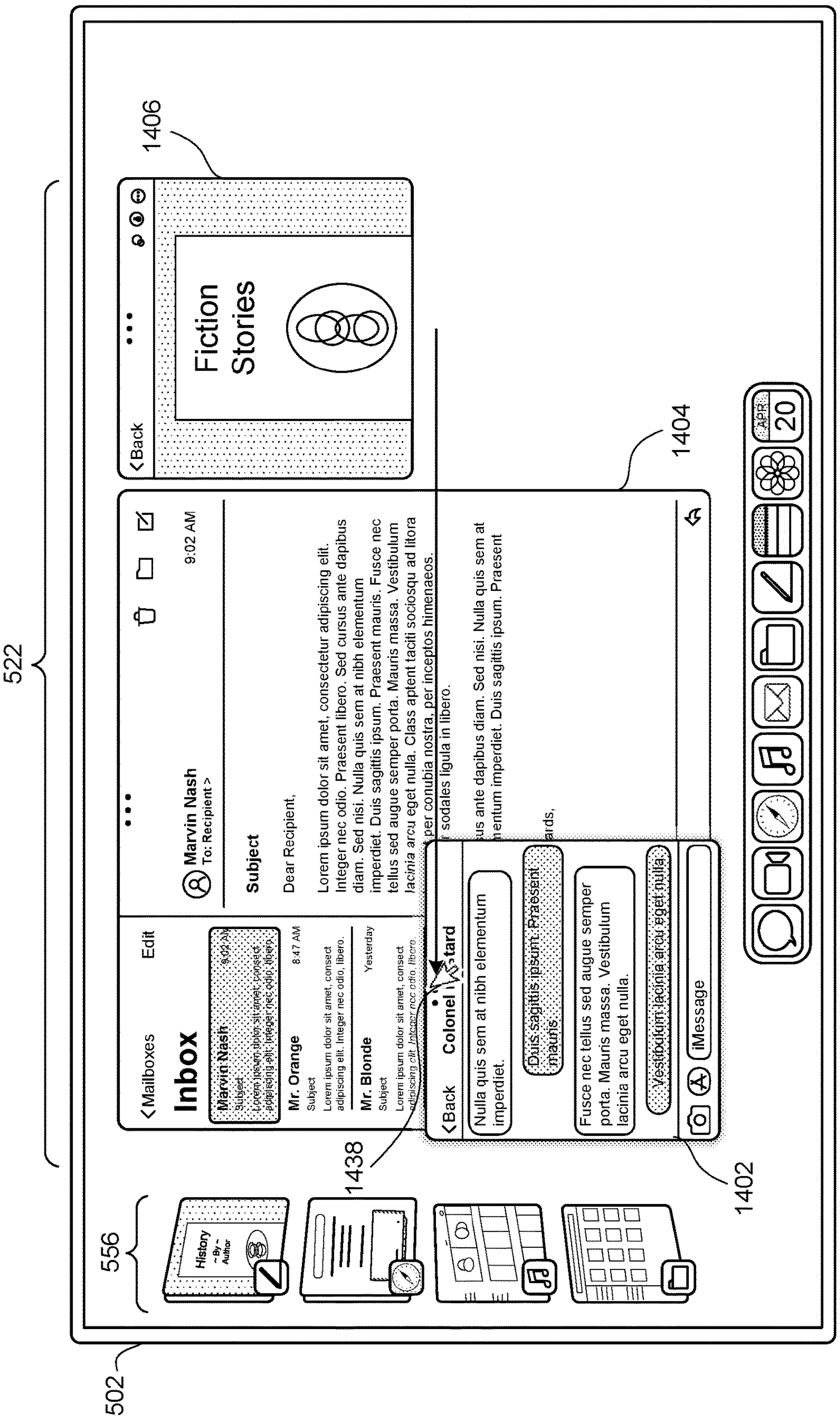
Figure 14A:
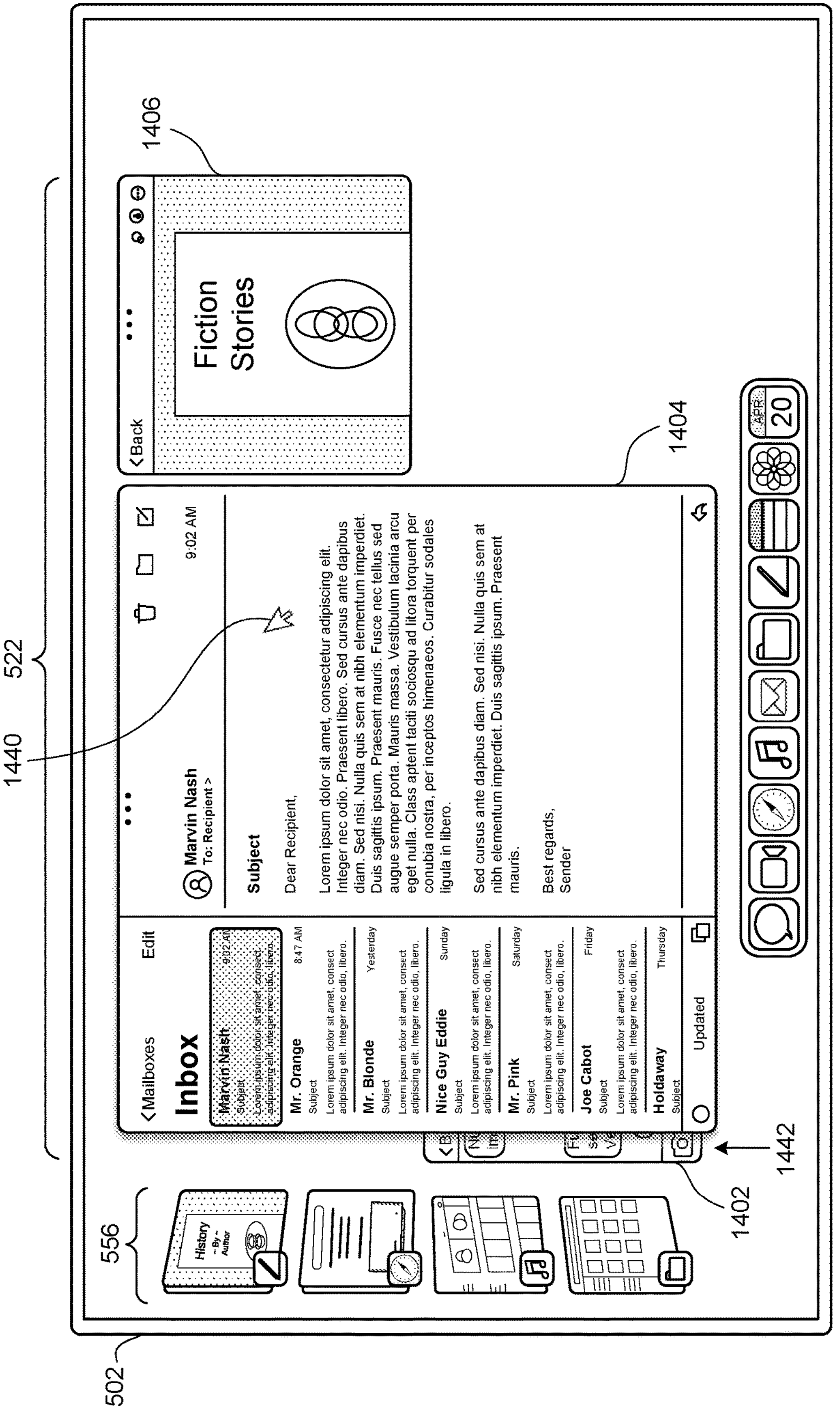
Figure 14A:
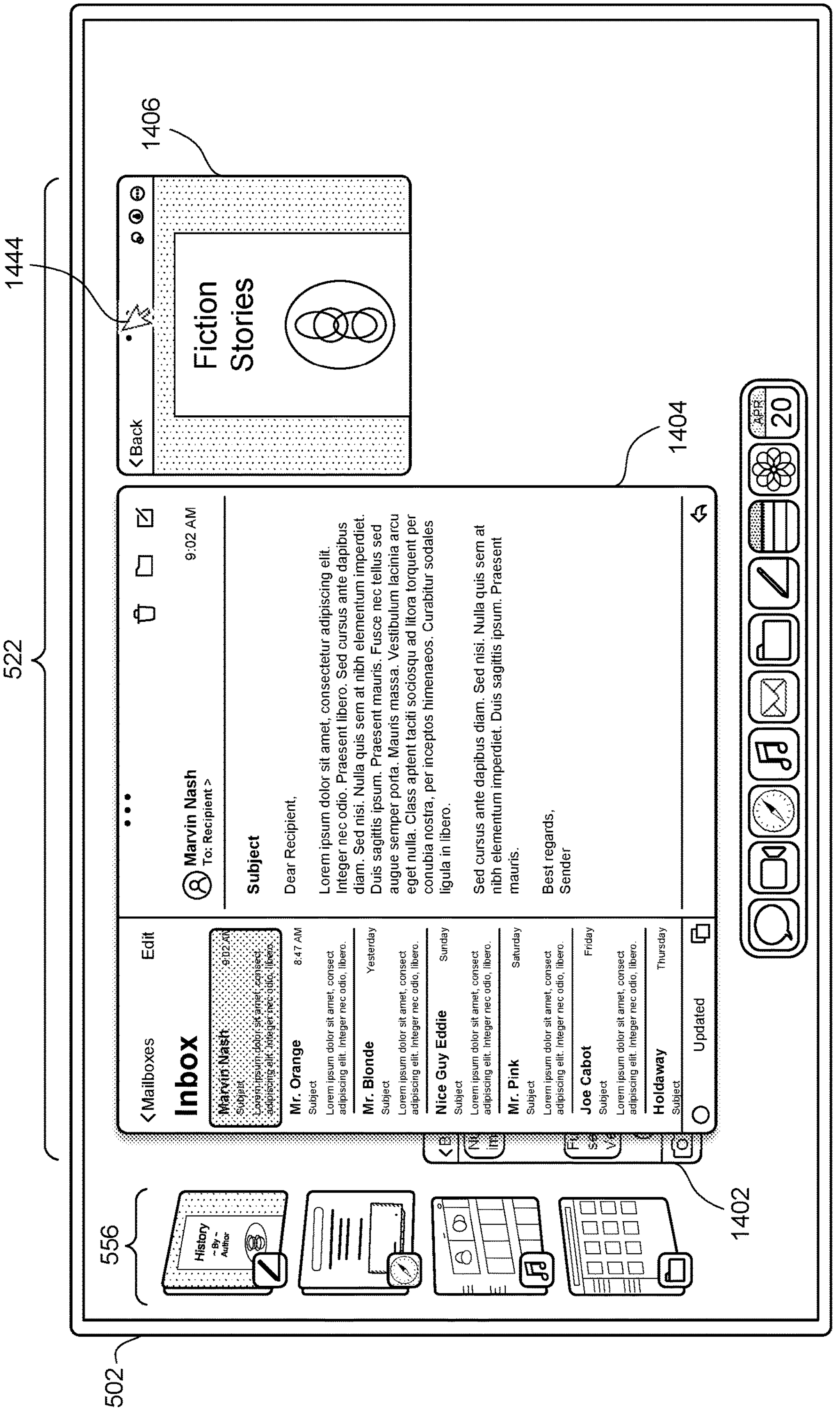
Figure 14A:
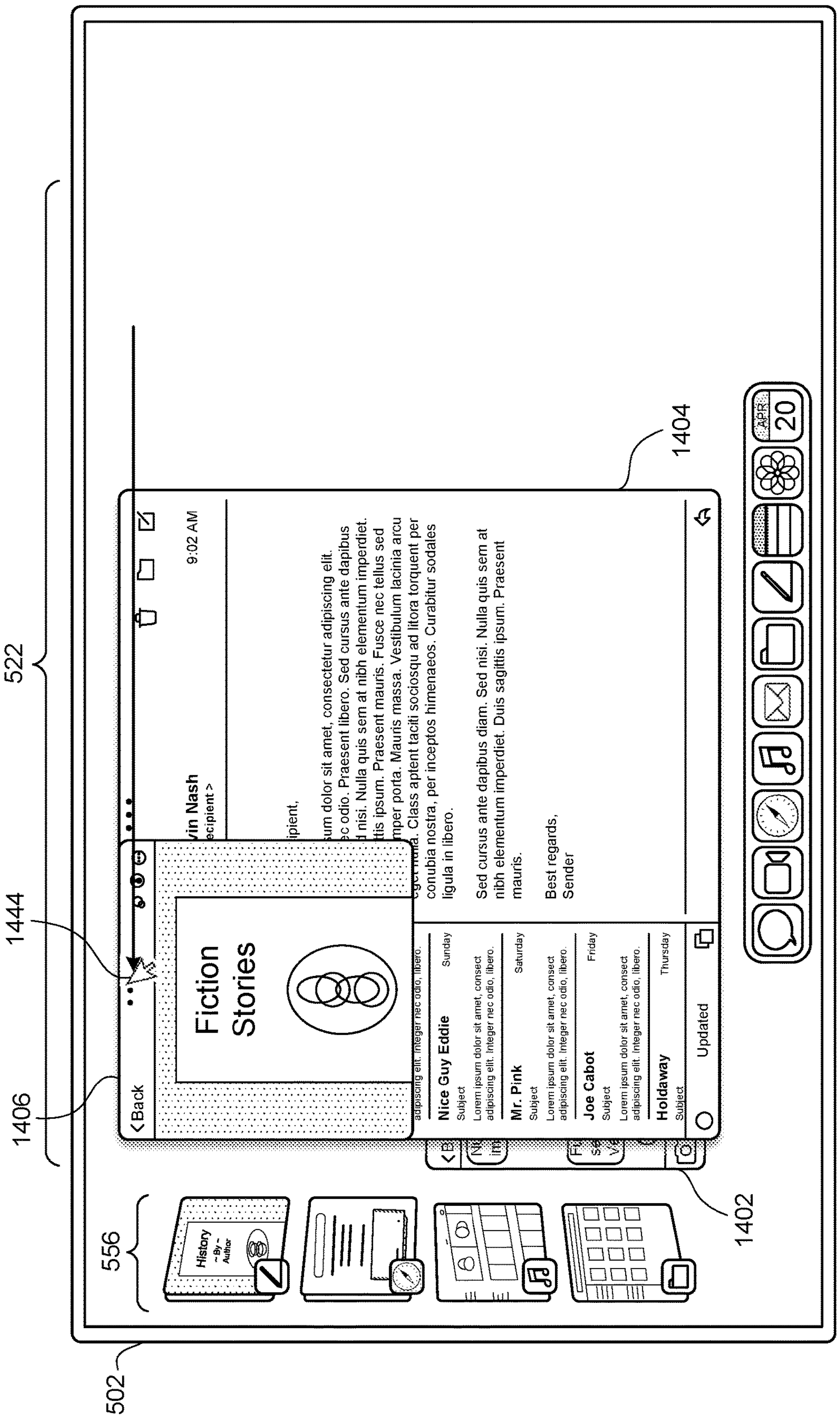
Figure 14A:
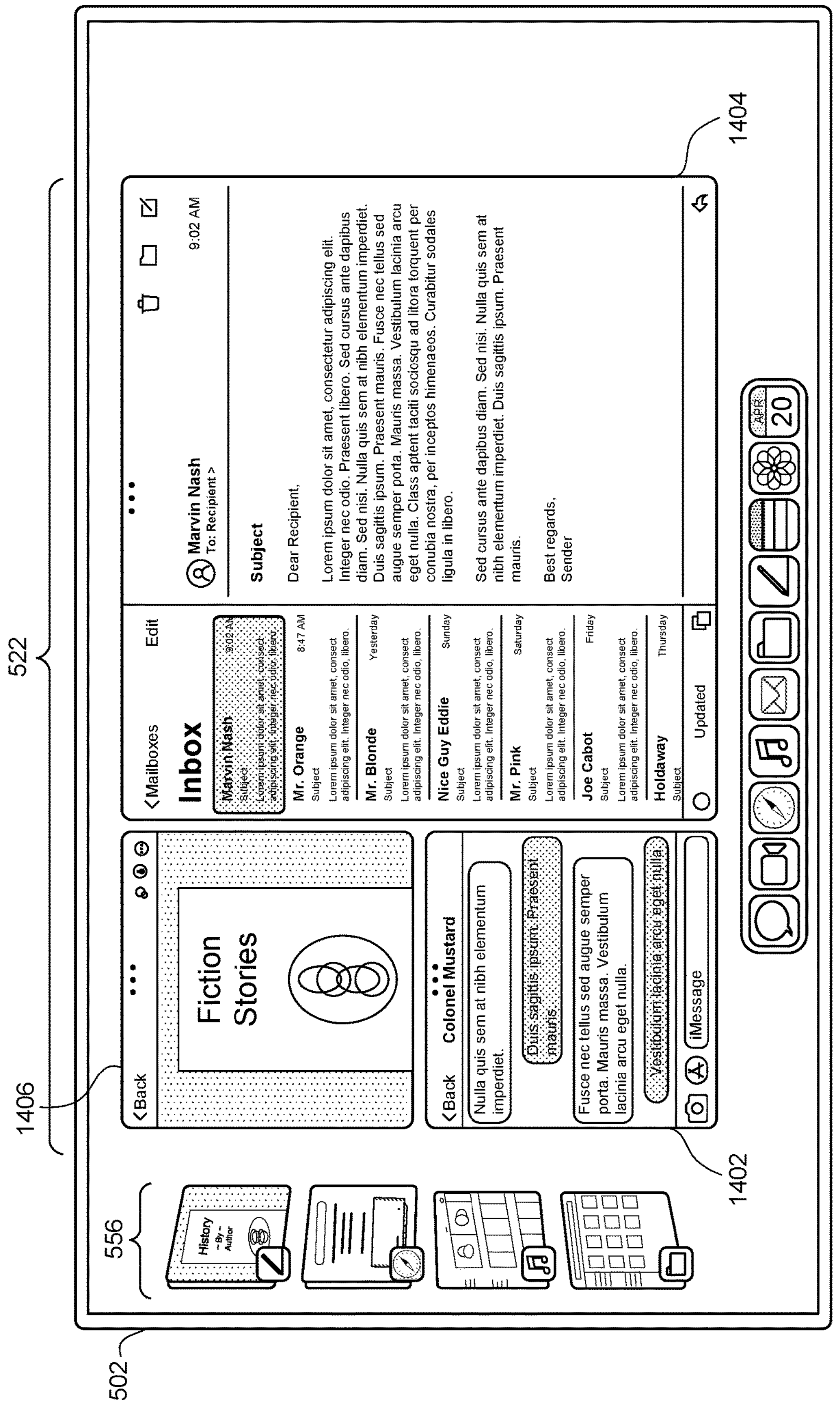

In FIG. 14U, in response to detecting user input 1436, device 502 moves word processor window 1406 up to the top of the stage region, causing messages window 1402 to automatically (without user input) move to the bottom of the stage region, filling in the empty space left behind by the word processor window 1406, as shown in FIG. 14V. In FIG. 14W, in response to detecting user input 1436, device 502 moves mail window 1404 to the left of the stage region, as shown in FIG. 14X, which causes device 502 to move word processor window 1406 and messages window 1402 to the right of the stage region, filling in the empty space left behind by the mail window 1404, as shown in FIG. 14Y.

In some embodiments, if windows cannot be rearranged in a manner that is in accordance with manual user positioning inputs for window positions with respect to each other, then windows are not automatically repositioned, even if there is space to do so. Instead, the window positions are preserved in accordance with user inputs. For example, in FIG. 14Z, in response to detecting user input 1438, device 502 moves messages window 1402 to the left of the stage region, as shown in FIG. 14AA. However, even though there is enough space to rearrange the windows by automatically moving word processor window 1406 to the left and mail window 1404 to the right, user intent regarding window positioning with respect to one another is preserved. Stated another way, since it is possible that the user wishes for the word processor window 1406 to remain to the right of the mail window 1404, the word processor and mail windows are not automatically rearranged, even if there is space to do so.

In FIG. 14AB, in response to detecting user input 1440 selecting mail window 1404, device 502 moves mail window 1404 to the foreground and messages window 1402 to the background with a portion 1442 remaining visible at the edge of the stage region. In FIG. 14AC, in response to detecting user input 1444, device 502 moves word processor window 1406 to the left of the stage region, leaving enough space for mail window 1404 to be automatically moved to the right of the stage region, as shown in FIG. 14AD. However, unlike the previous scenario in which windows were not rearranged in order to preserve user intent with relative window positions, in this scenario, the user intended for both messages window 1402 and word processor window 1406 to be positioned to the left of mail window 1404. Thus, since there is enough space for mail window 1404 to be automatically moved, and user intent with respect to relative window positions is preserved, then mail window 1404 is automatically moved to the right of the stage region, filling the empty space, as shown in FIG. 14AE.

Figure 15A:
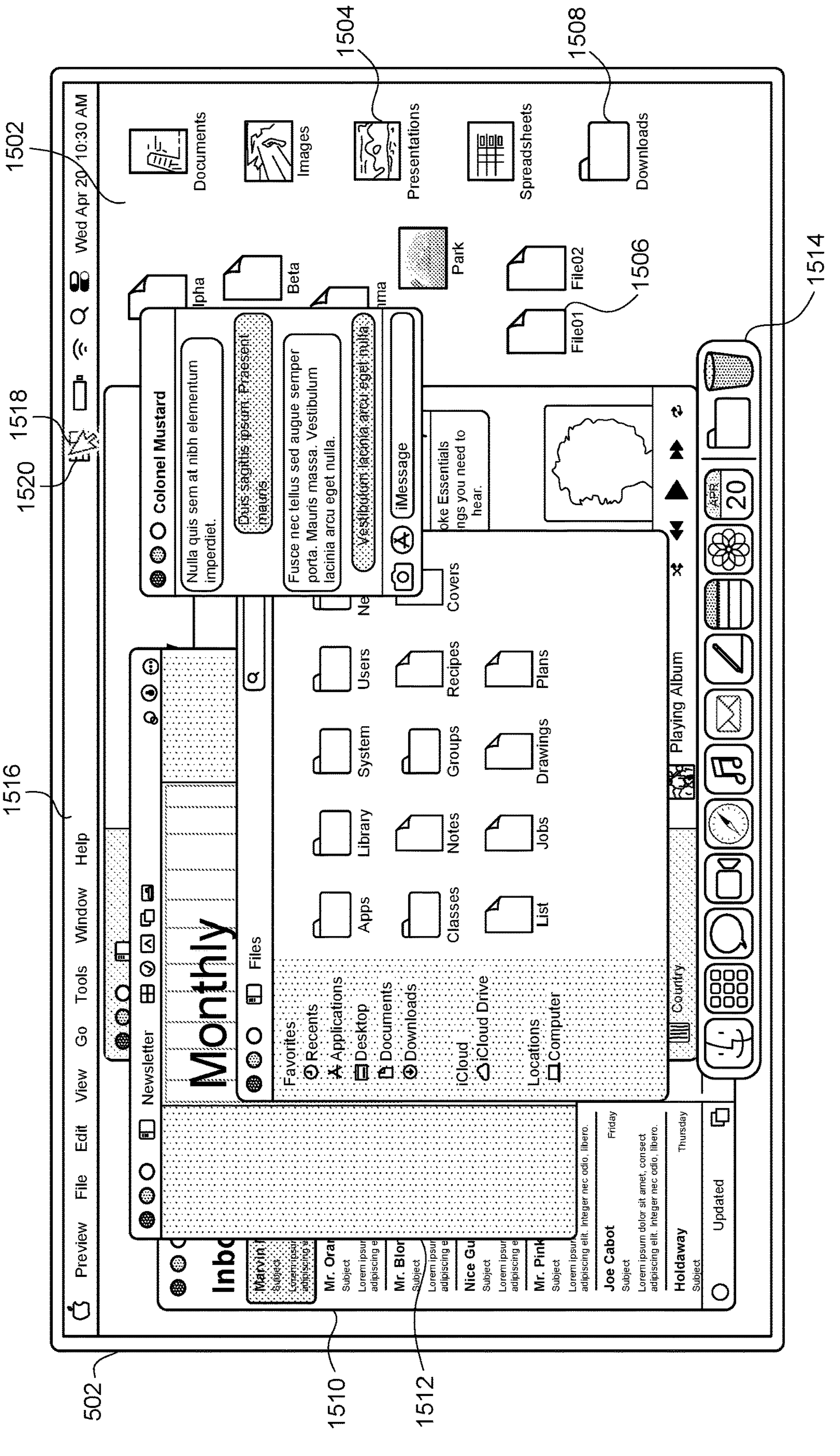

FIGS. 15A-15F illustrate user inputs for entering the concentration mode described above, in accordance with some embodiments. In FIG. 15A, a desktop 1502 of display device 502 includes a plurality of elements, including application icons (e.g., 1504), files (e.g., 1506), folders (e.g., 1508), overlapping windows (e.g., 1510 and 1512), dock 1514, and toolbar 1516. Computing device desktops such as the one shown in FIG. 15A tend to get cluttered with normal use, so that it becomes difficult to determine not only which applications and windows are open, but also the location of these elements on the desktop. In some embodiments, an affordance directly located in the desktop or in a navigable menu associated with a desktop element causes the desktop to be replaced by groups of windows and window representations in a concentration mode as described above, thereby providing the user with a more streamlined desktop that optimizes efficiency.

Figure 15B:
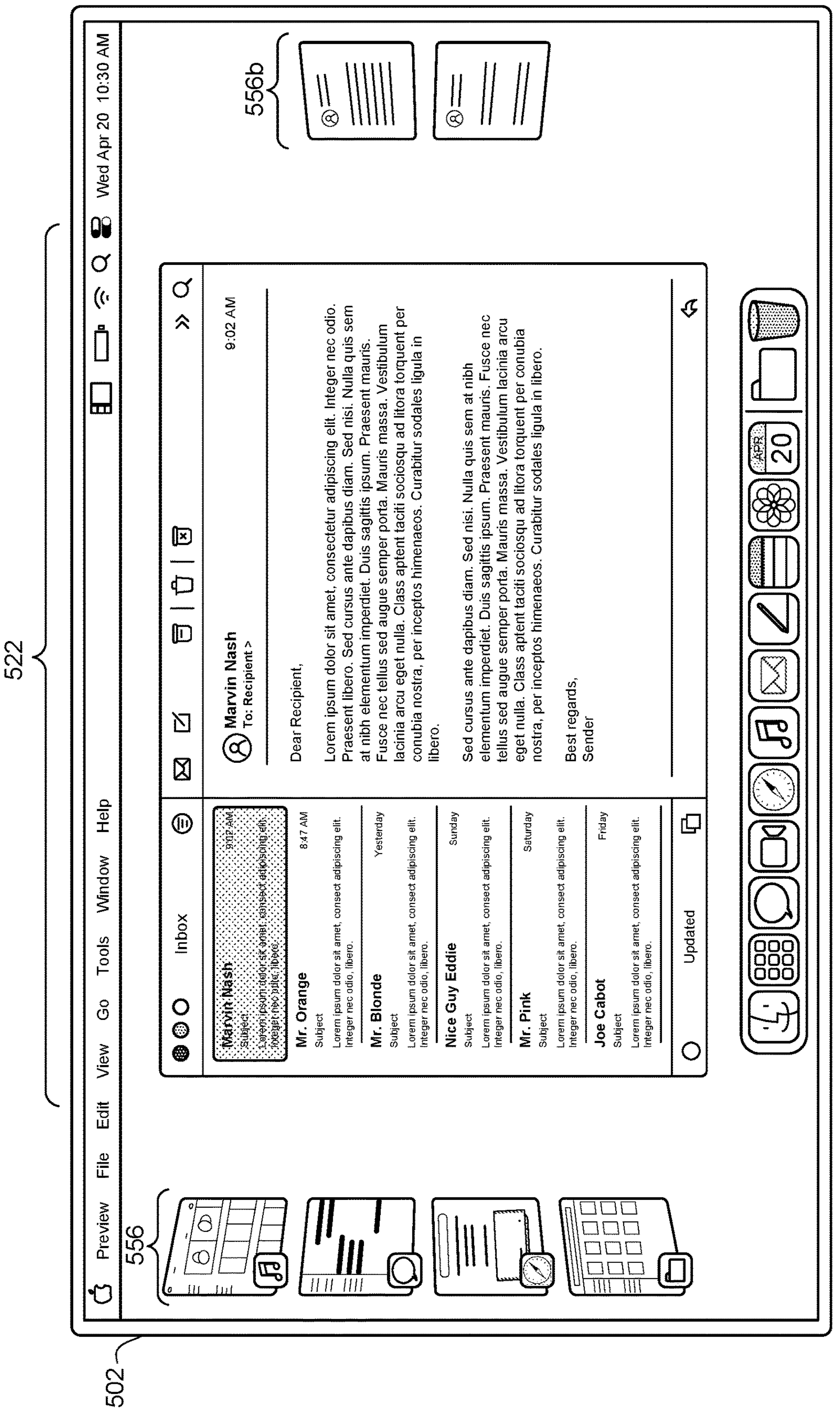

For example, in FIG. 15A, user input 1518 selects concentration mode affordance 1520 on the top toolbar 1516, which causes display device 502 to enter concentration mode, as shown in FIG. 15B. In some embodiments, when display device 502 is a desktop or laptop computing device, toolbar 1516, dock 1514, and/or other elements of the desktop (e.g., icons and files) may remain when concentration mode is entered. In another example, in FIG. 15C, user input 1522 selects a concentration mode menu item 1524, accessible from the toolbar 1516, which causes display device 502 to enter concentration mode, as shown in FIG. 15D. In yet another example, in FIG. 15E, in an application switcher interface 1527 (sometimes referred to as a virtual workspace switcher or a system user interface for switching between different virtual workspaces), user input 1526 selects a concentration mode affordance 1528, which causes display device 502 to enter concentration mode, as shown in FIG. 15F. In some embodiments, application switcher interface 1527 includes a plurality of window groups 1527*a*-1527*g*, and a plurality of these window groupings (e.g., according to most recent use) are displayed as window groupings in strip 556 (FIG. 15F) when display device 502 enters concentration mode. Referring to FIG. 15E, in some embodiments, application switcher interface 1527 includes a plurality of virtual workspaces 1527*h*-1527*i*. Each virtual workspace includes one or more windows or window groupings. For example, a first virtual workspace 1527*h* (Desktop 1) includes window groupings 1527*a*-1527*g*, while a second virtual workspace 1527*i* (Desktop 2) includes additional window groupings, and a third virtual workspace 1527*j* (Desktop 3) includes additional window groupings.

FIGS. 15F-15R illustrate user inputs for interacting with desktop items while in concentration mode, in accordance with some embodiments. In FIG. 15F, while in concentration mode, user input 1530 selects any area of the display that is not occupied by a window, a window representation, or any other affordance or element, causing the windows in the stage region to be minimized to the strip 556, and desktop items (e.g., files, icons, folders, and so forth) to be visible, as shown in FIG. 15G. This mode may be referred to as a desktop mode (or a hybrid concentration mode), while the concentration mode described above (with windows in a stage region along with window representations in a strip) may be referred to as a concentration mode (or a full concentration mode). In some embodiments, the empty portions of the desktop, a majority of the desktop, or the entire desktop is a selection target (e.g., a click target or tap target) for hiding the stage region and revealing desktop items previously hidden while in concentration mode. Stated another way, by clicking, tapping, or otherwise interacting with an empty portion of the desktop while in concentration mode, a state of the windowing environment of display device 502 is changed so that some of the benefits of concentration mode (e.g., organized groups of window representations) are retained while providing access to items in the full desktop in a way that does not overwhelm the user with too much clutter.

In some embodiments, to return to concentration mode from the desktop mode, the user interacts with any of the window representations in the strip. For example, in FIG. 15G, user input 1532 selects window grouping representation 1534, which causes concentration mode to resume (including the return of windows in the stage region and the hiding of other desktop items), as shown in FIG. 15H.

In some embodiments, while in the desktop mode, if any desktop items would have been occluded by the strip, then the strip may partially move off the screen. For example, in FIG. 15H, user input 1536 causes display device 502 to enter the desktop mode, as shown in FIG. 15I. Since desktop items 1534 occupy the same region as that occupied by the strip in concentration mode, the strip moves partially off screen so as not to occlude the desktop items. A selectable portion of each of the window grouping representations in the strip remains visible to the user, in order to provide the user with a selectable target for returning to the concentration mode, and in order to provide the user with a way to interact with the representations in the strip while in the desktop mode.

In some embodiments, while in the desktop mode, desktop items may be moved between concentration mode windows and the desktop. Specifically, in FIG. 15I, user input 1536 selects image icon 1538 on the desktop. In FIG. 15J, user input 1540 drags the image icon 1538 to a window grouping representation 1542 in the strip, which causes the window representation 1542 to graphically indicate that the application window corresponding to the window representation is capable of receiving or importing the image associated with the image icon 1538. In FIG. 15K, the user input hovers over the representation 1542, causing the strip to move back into full view, and concentration mode to be resumed, with the windows associated with the representation 1542 being displayed in the stage region, as shown in FIG. 15L. In FIG. 15M, user input 1540 maintains selection of the image icon and drags it toward the stage region, causing another window representation 1544 to enter the strip (e.g., the most recent representation from an overflow, as described above). In FIG. 15N, user input 1540 drags the image icon over mail window 1546 in the stage region, causing a graphical element 1548 to appear, indicating that the image icon may be dropped into that window upon release of the user input 1540, as shown in FIG. 15O. In FIG. 15P, while in concentration mode, user input 1550 selects the image from mail window 1546 in the stage region. In FIG. 15Q, user input 1550 drags the image, which turns into an image icon 1538, onto an empty portion of the desktop, which causes concentration mode to pause and desktop mode to resume, as shown in FIG. 15R. As shown in FIG. 15R, a graphical element 1548 appears, indicating that the image icon may be dropped onto the desktop upon release of the user input 1550. In FIG. 15S, the user input is released and the image icon 1538 has been moved back to the desktop.

Figure 16A:
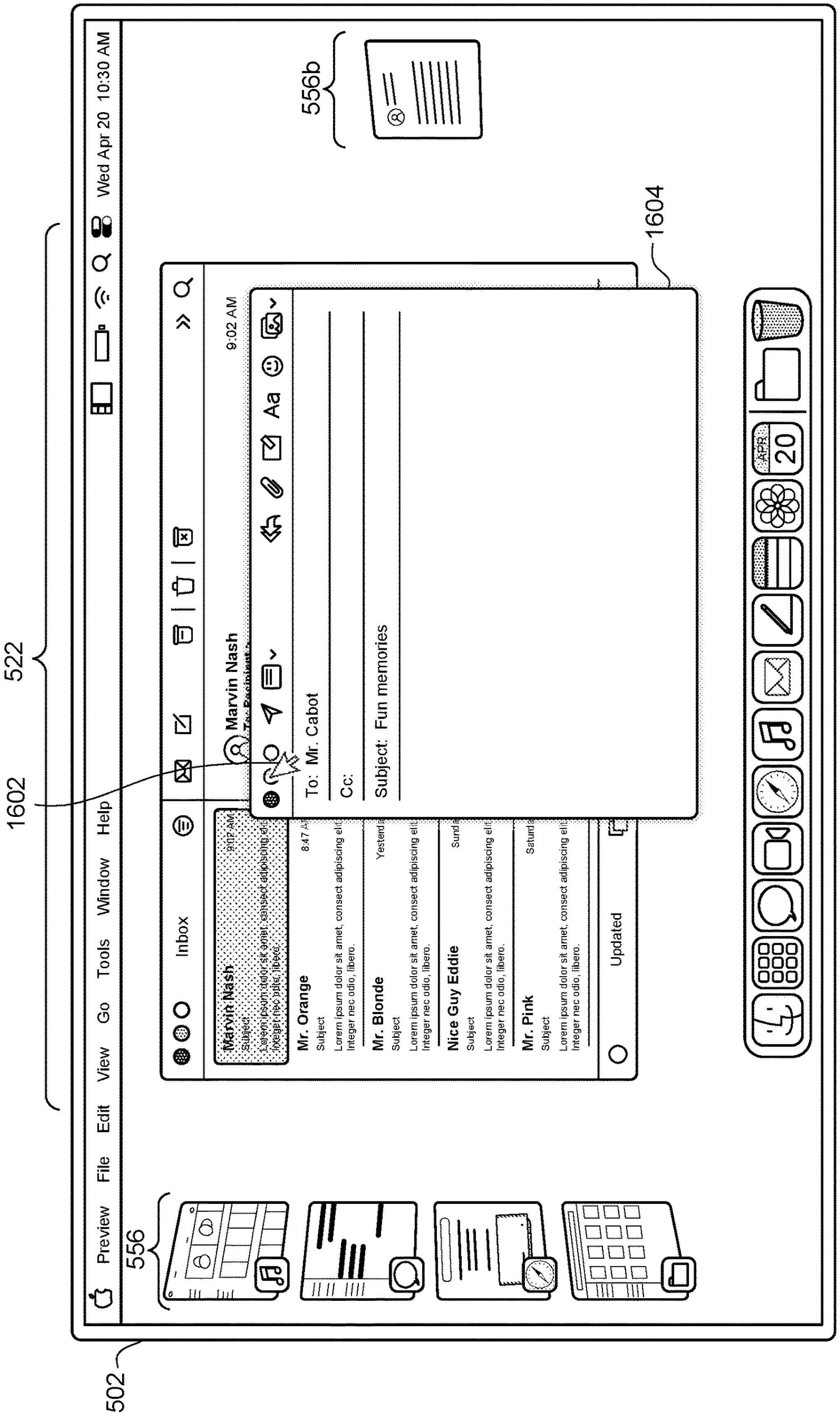
Figure 16B:
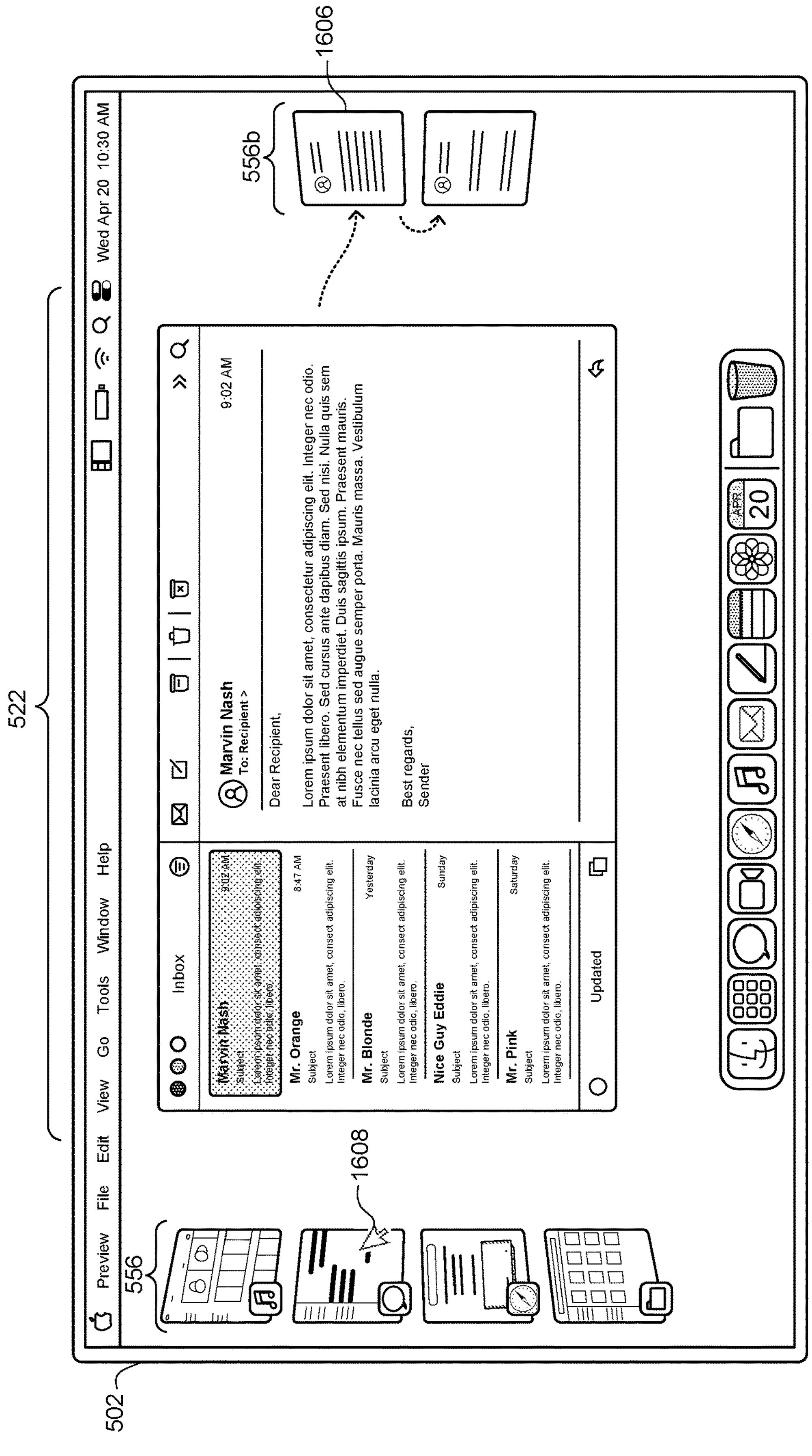
Figure 16C:
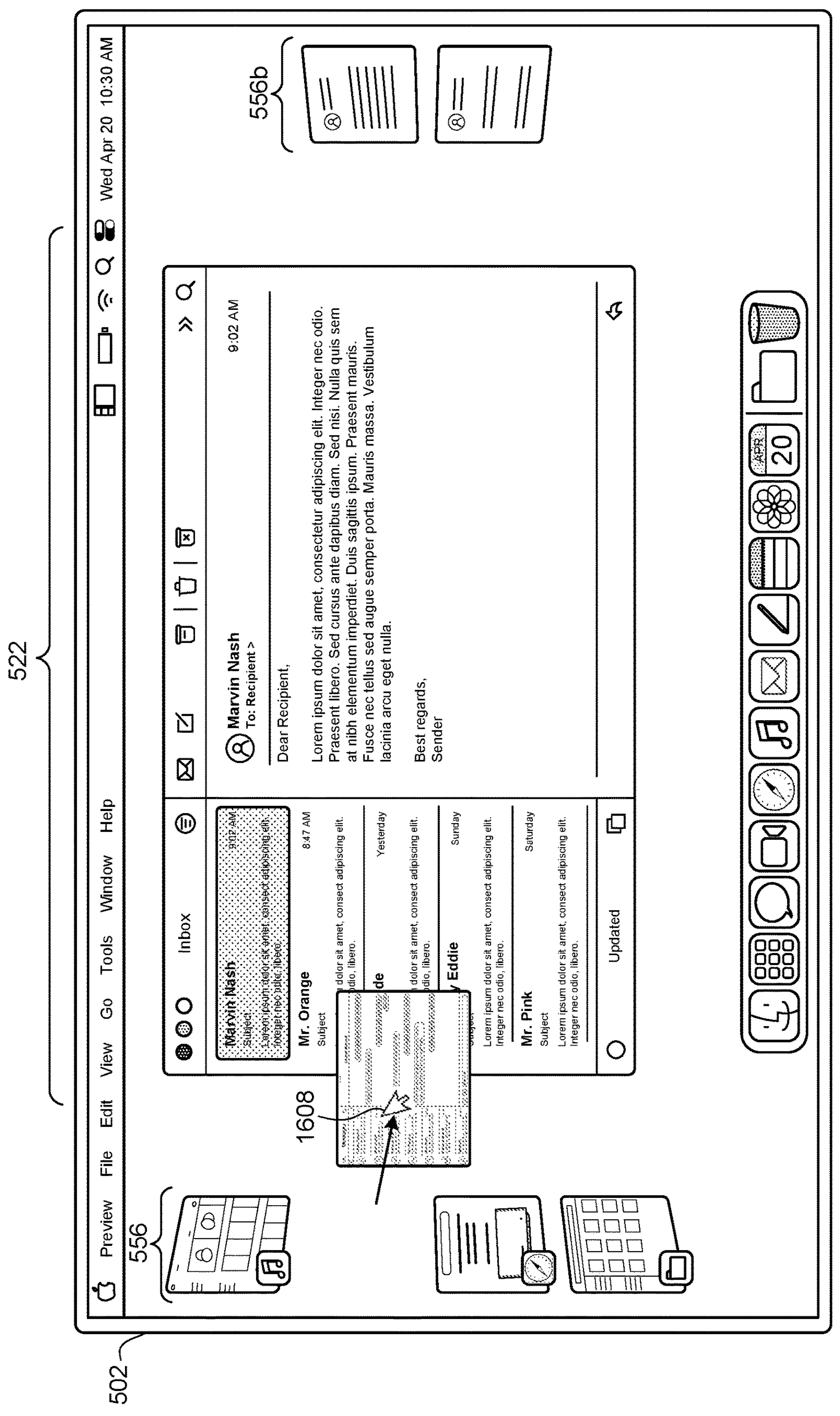
Figure 16D:
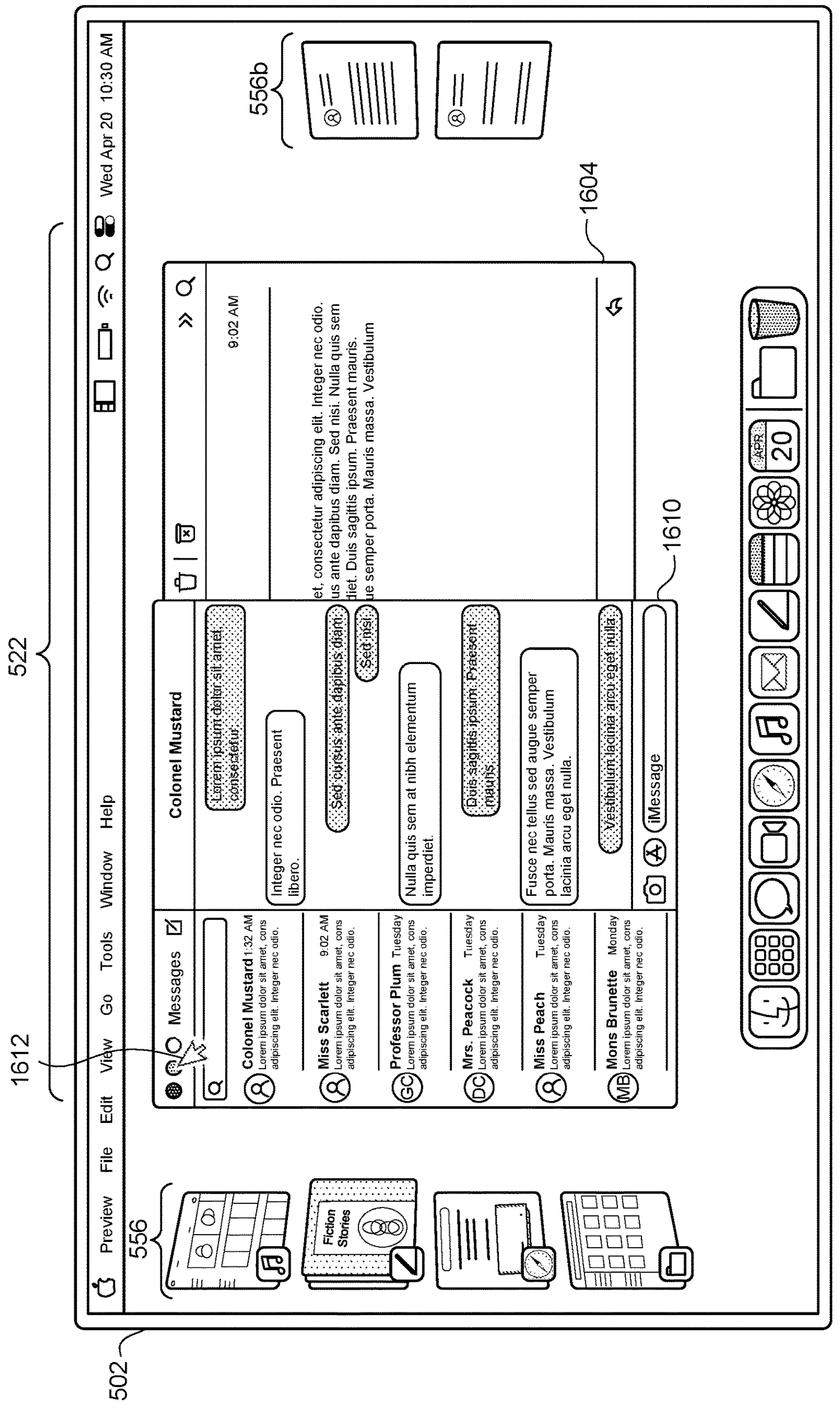
Figure 16E:
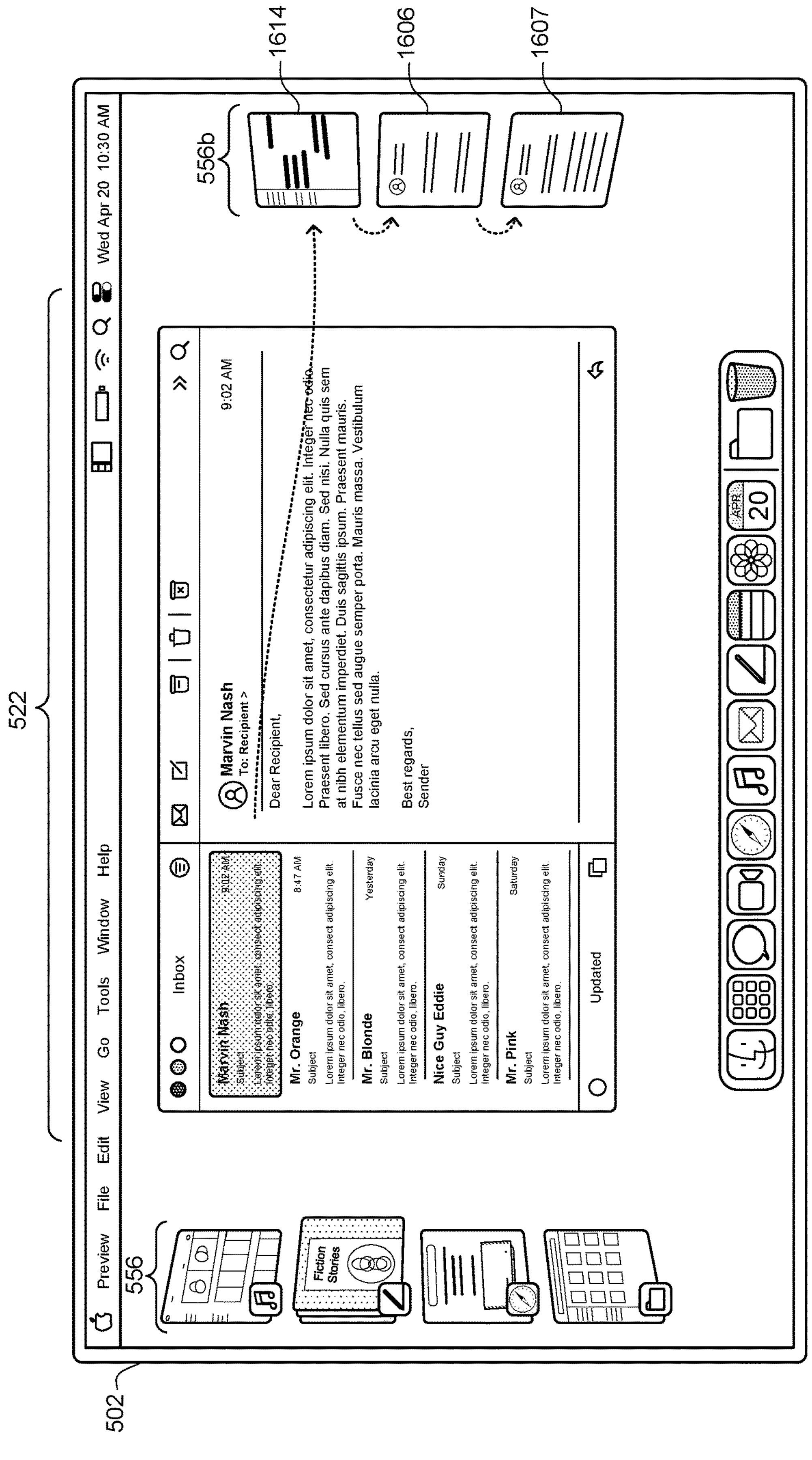

FIGS. 16A-16H illustrate user inputs for removing windows from the stage region in the concentration mode described above, in accordance with some embodiments. In FIG. 16A, user input 1602 selects a minimize affordance for window 1604, which, in a regular desktop mode, may normally cause the window to minimize to the dock. However, in concentration mode, selection of the minimize affordance causes the window to be minimized to the secondary strip 556*b* as a window representation 1606, as shown in FIG. 16B. In some embodiments, other application windows may be minimized to the secondary strip. For example, in FIG. 16C, user input 1608 selects a messages window representation for display in the stage region, creating a set of mail windows 1604 and a messages window 1610, as shown in FIG. 16D. In FIG. 16D, user input 1612 selects a minimize affordance in the messages window, causing the messages window to minimize to the secondary strip 556*b* as a window representation 1614, along with the child mail window representations 1606 and 1607, as shown in FIG. 16E.

Figure 16F:
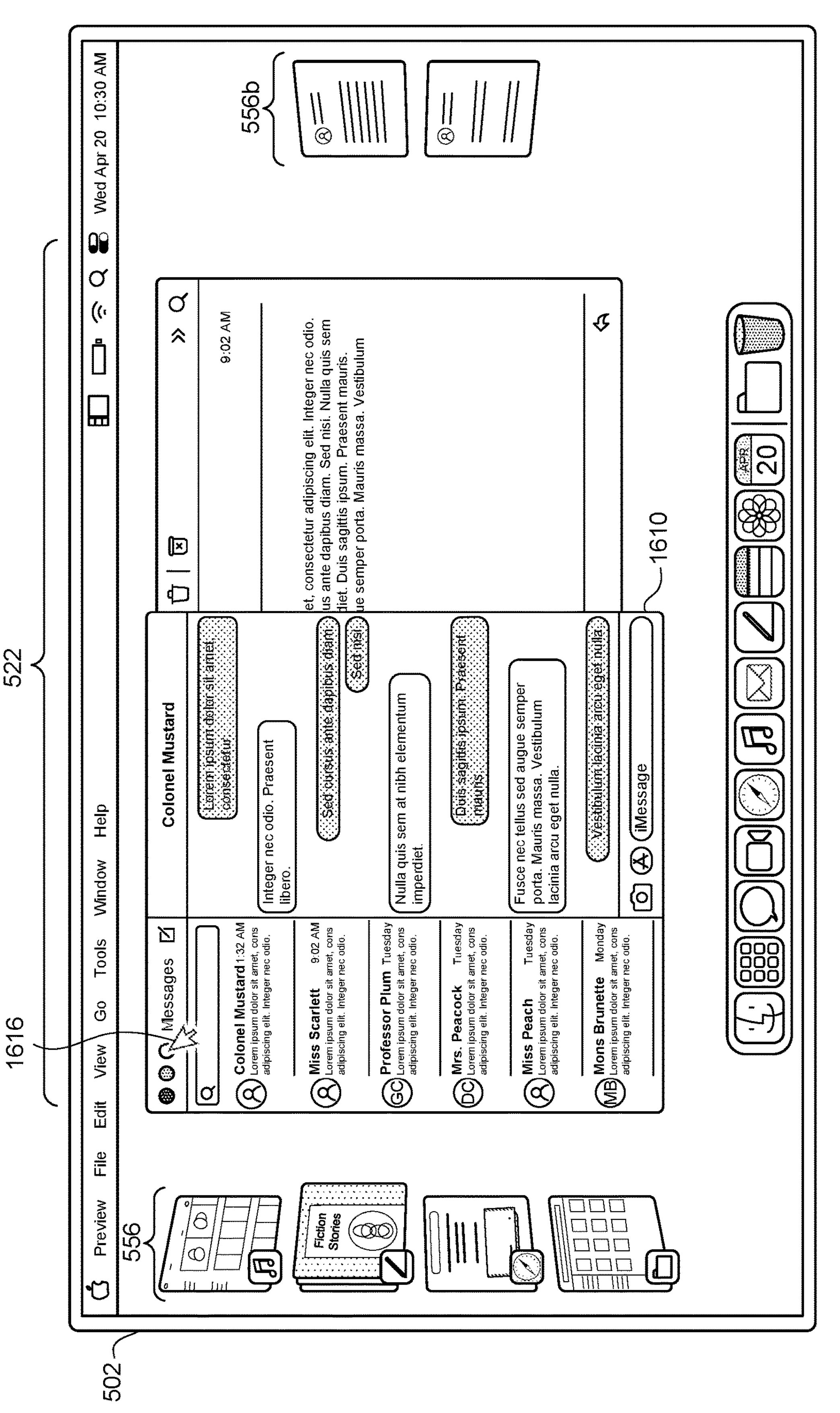
Figure 16G:
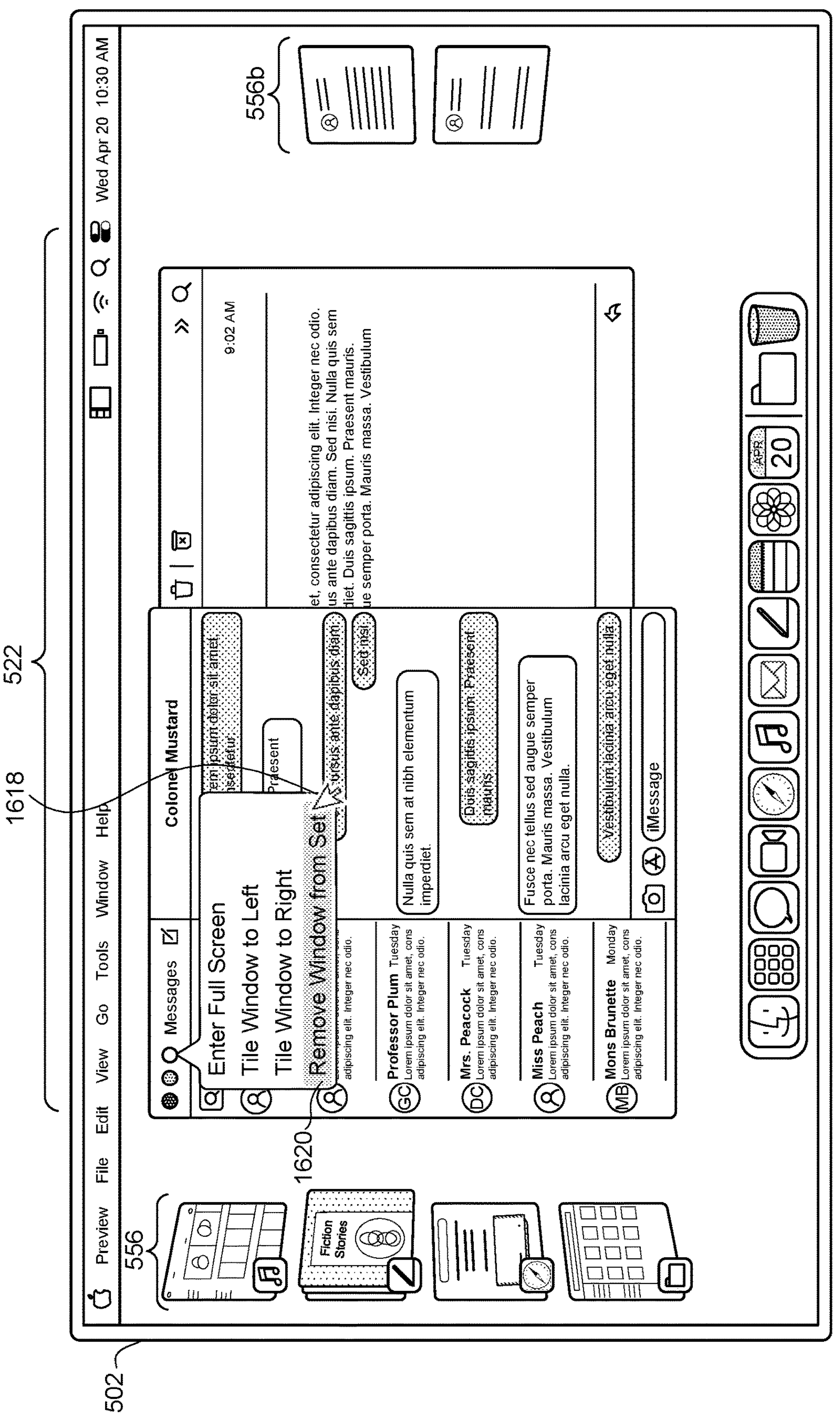
Figure 16H:
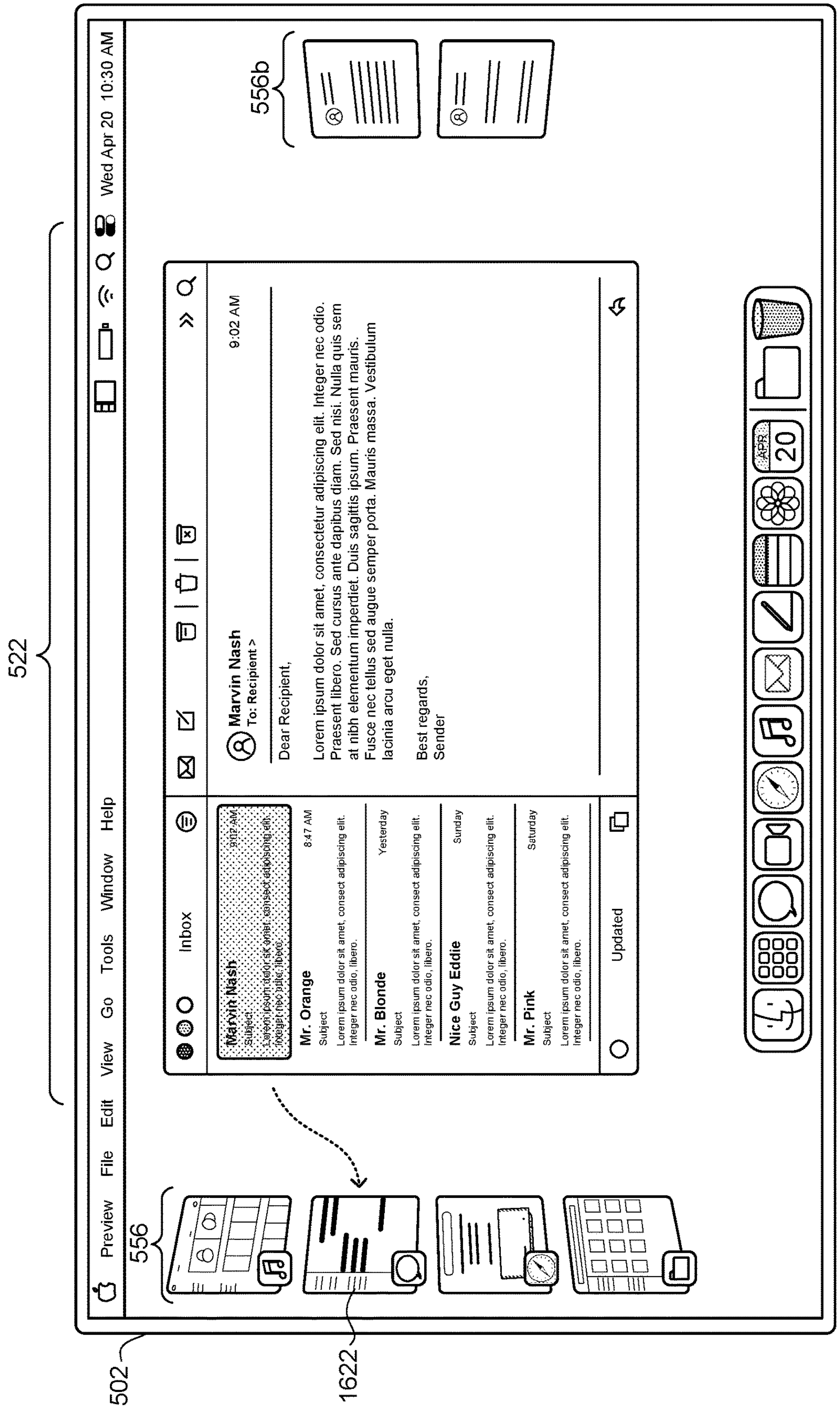

FIGS. 16F-16H illustrate user inputs for removing a window from a window grouping in the concentration mode described above in accordance with some embodiments. In FIG. 16F, user input 1616 selects a toolbar affordance in the messages window 1610, which opens a menu, as shown in FIG. 16G. In FIG. 16G, user input 1618 selects a "Remove Window from Set" option 1620 in the menu, causing the messages window to be removed from the stage region and replaced back in the strip 556 as a window grouping representation 1622, as shown in FIG. 16H. In some implementations, the window that is being removed from the window grouping returns to a window grouping representation in the strip associated with windows from the same application (e.g., a messages window returns to a messages window grouping representation in the strip). If there is no such window grouping representation in the strip, a new window grouping representation is created in the strip, as in FIG. 16H (window representation 1622).

Figure 16I:
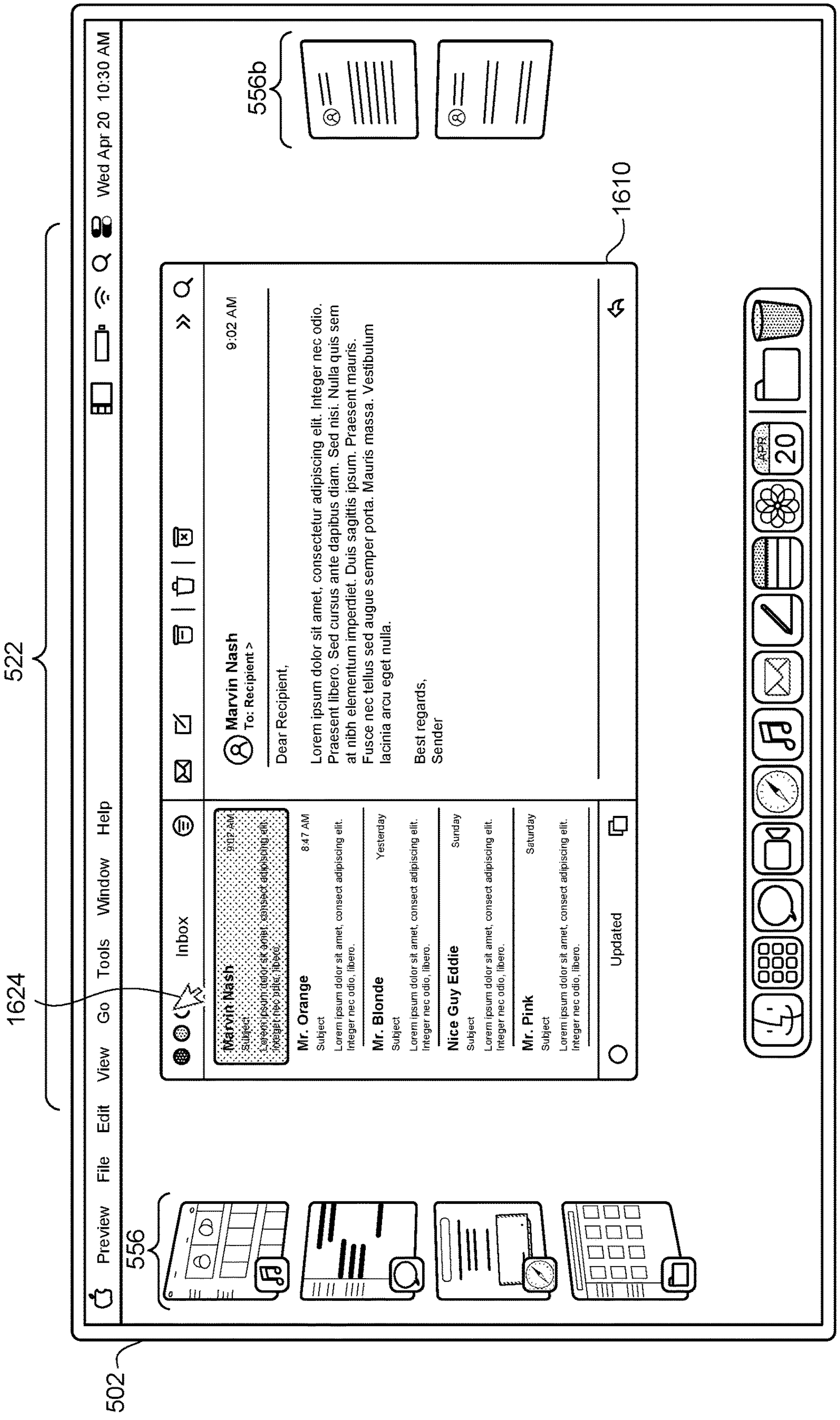
Figure 16J:
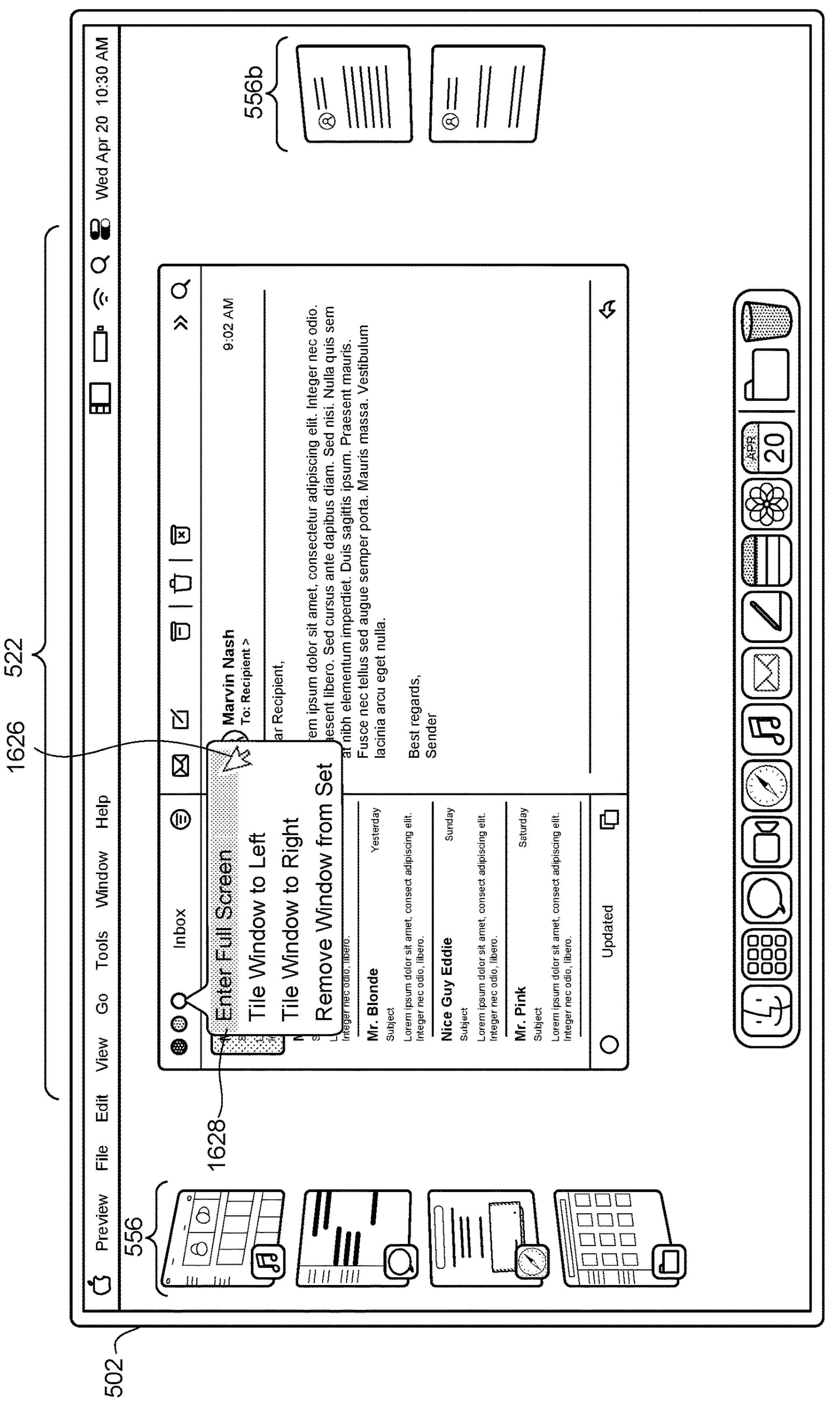
Figure 16K:
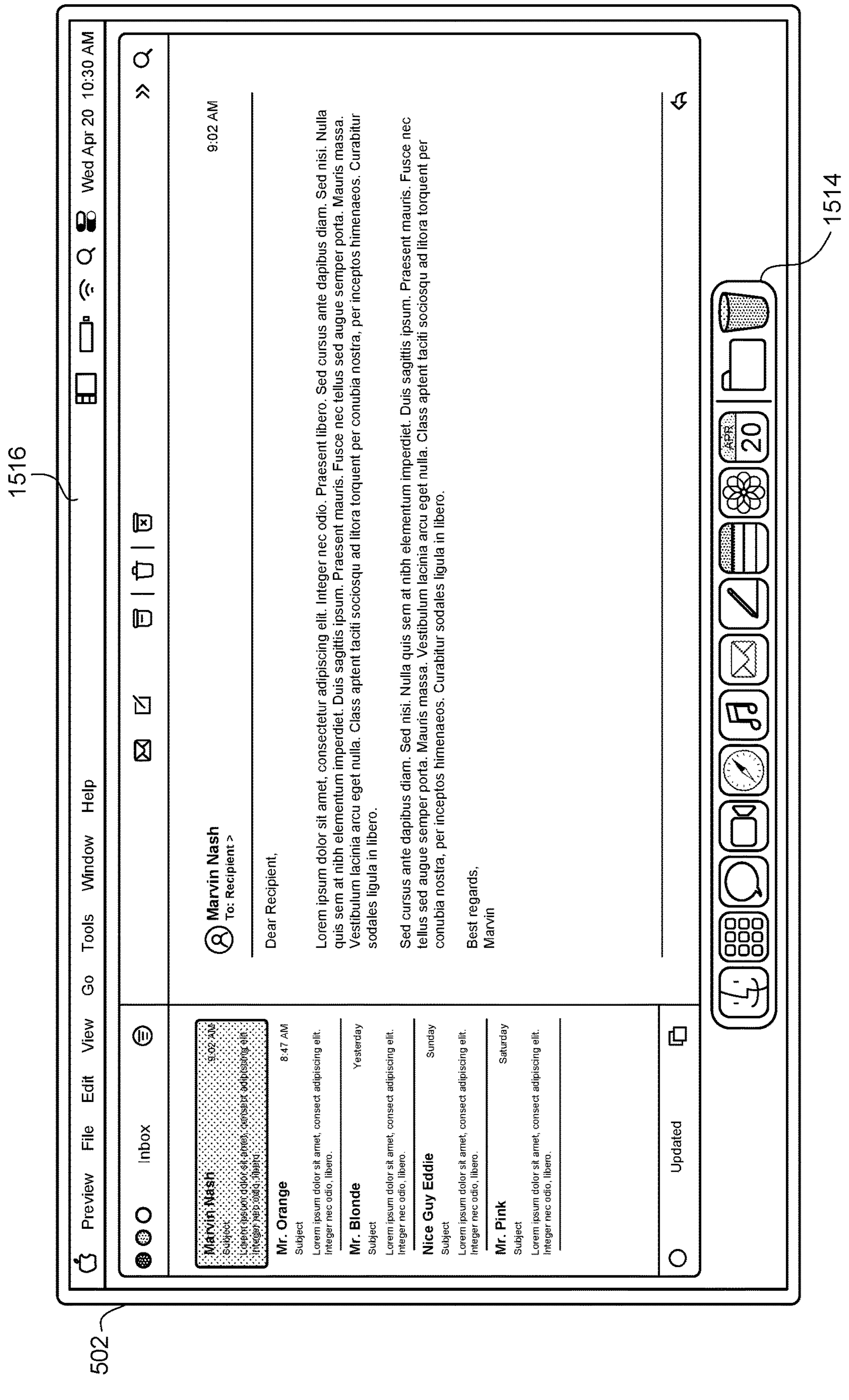
Figure 16L:
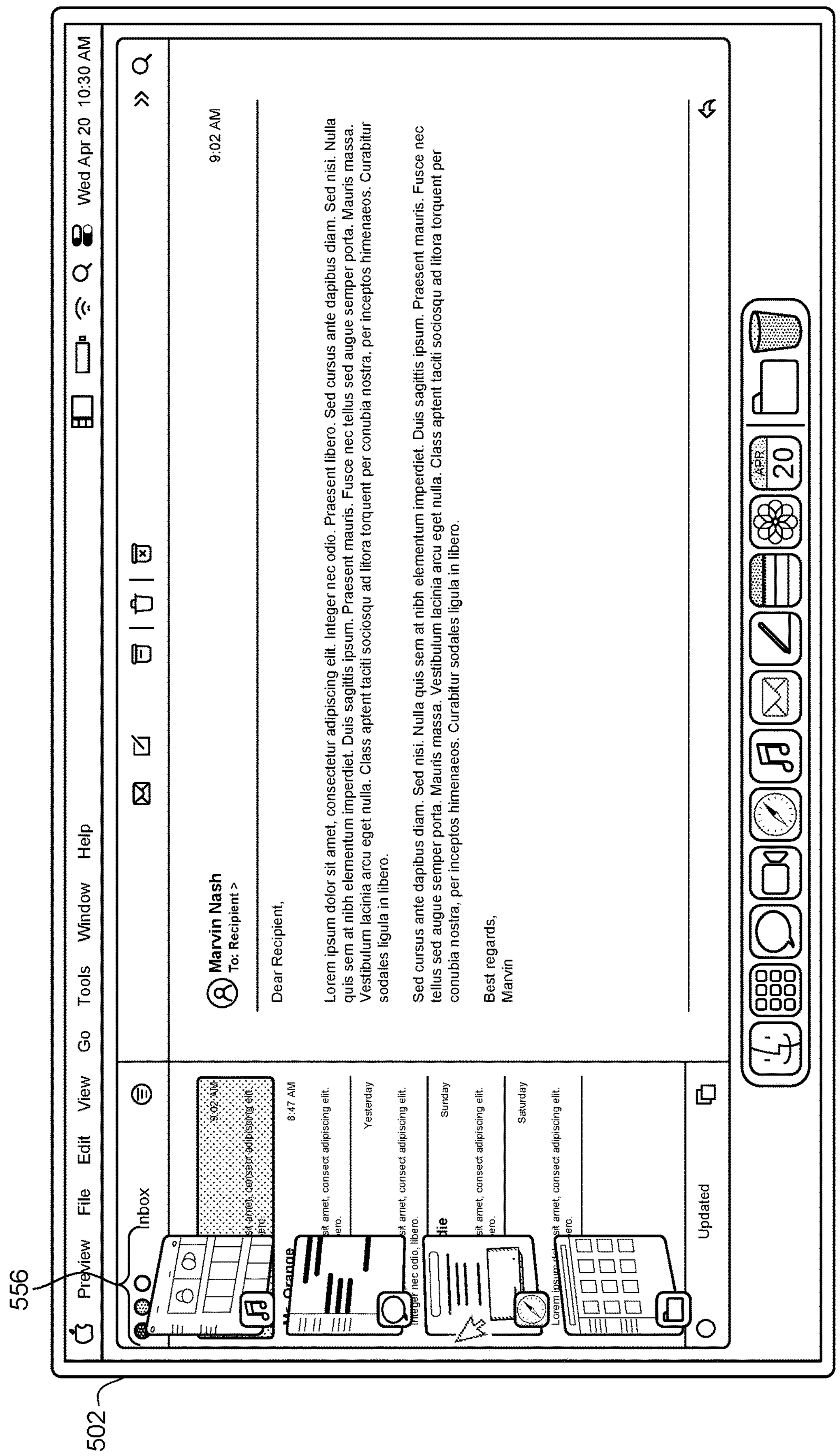
Figure 16M:
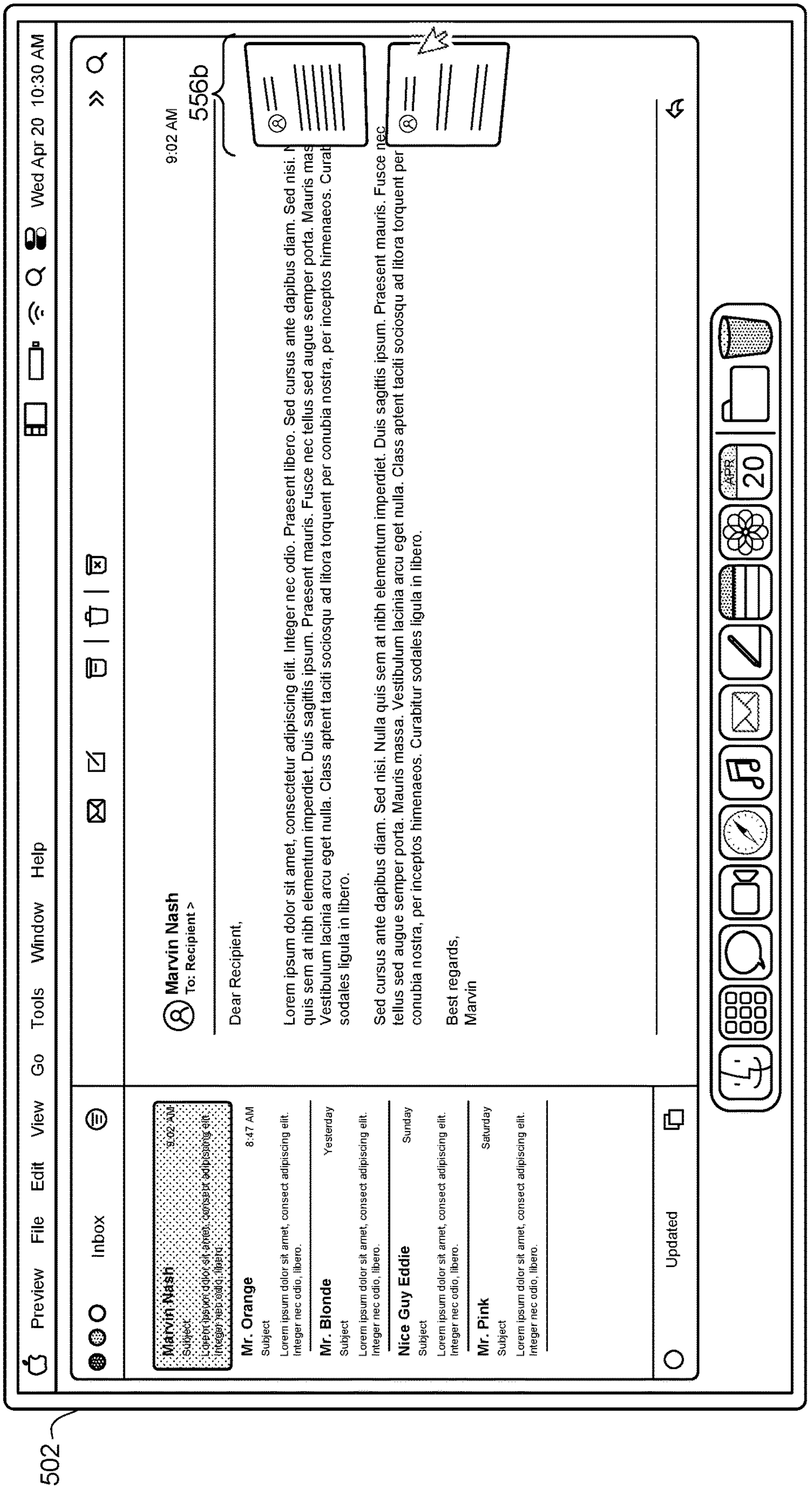
Figure 16N:
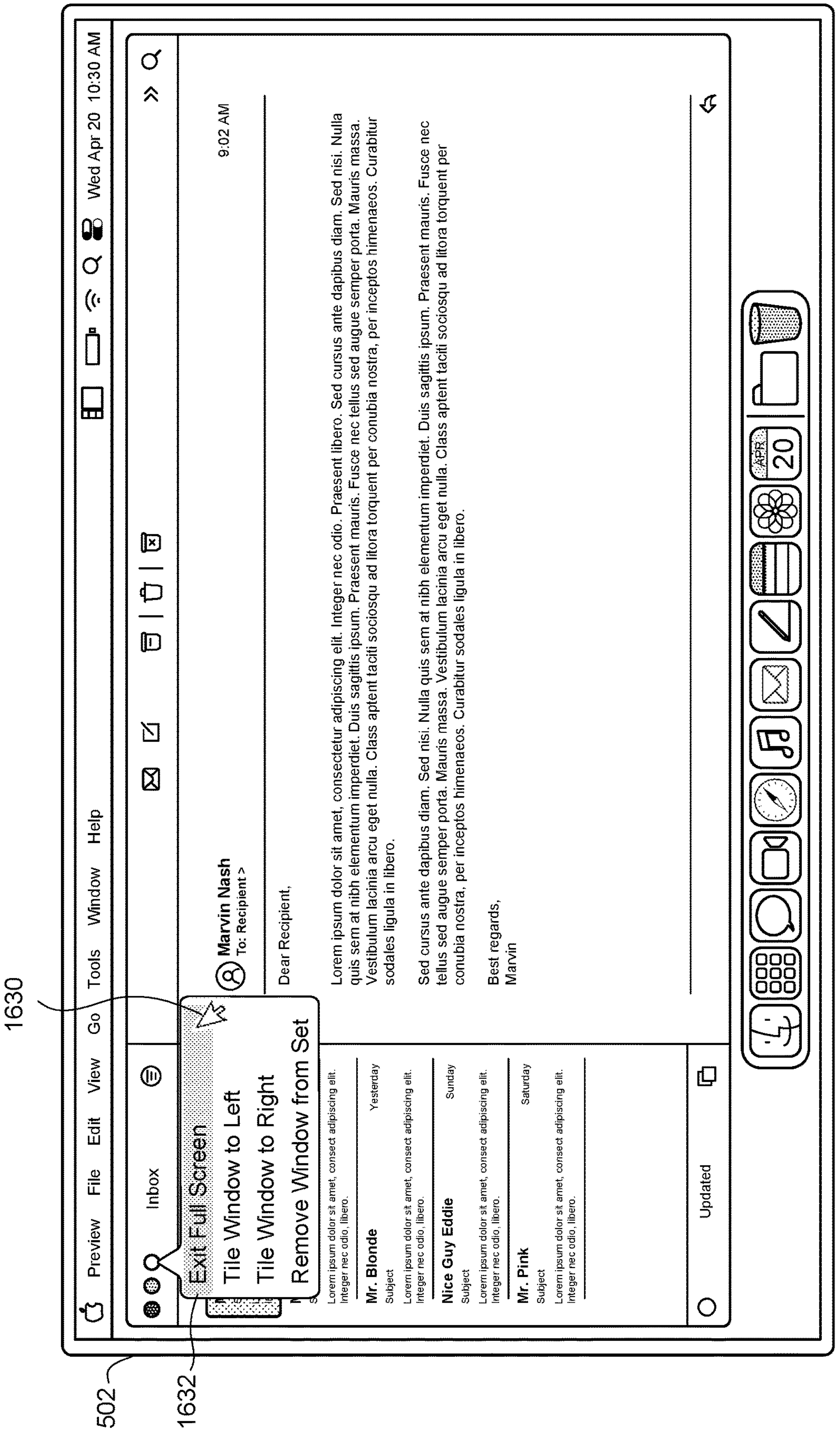
Figure 16O:
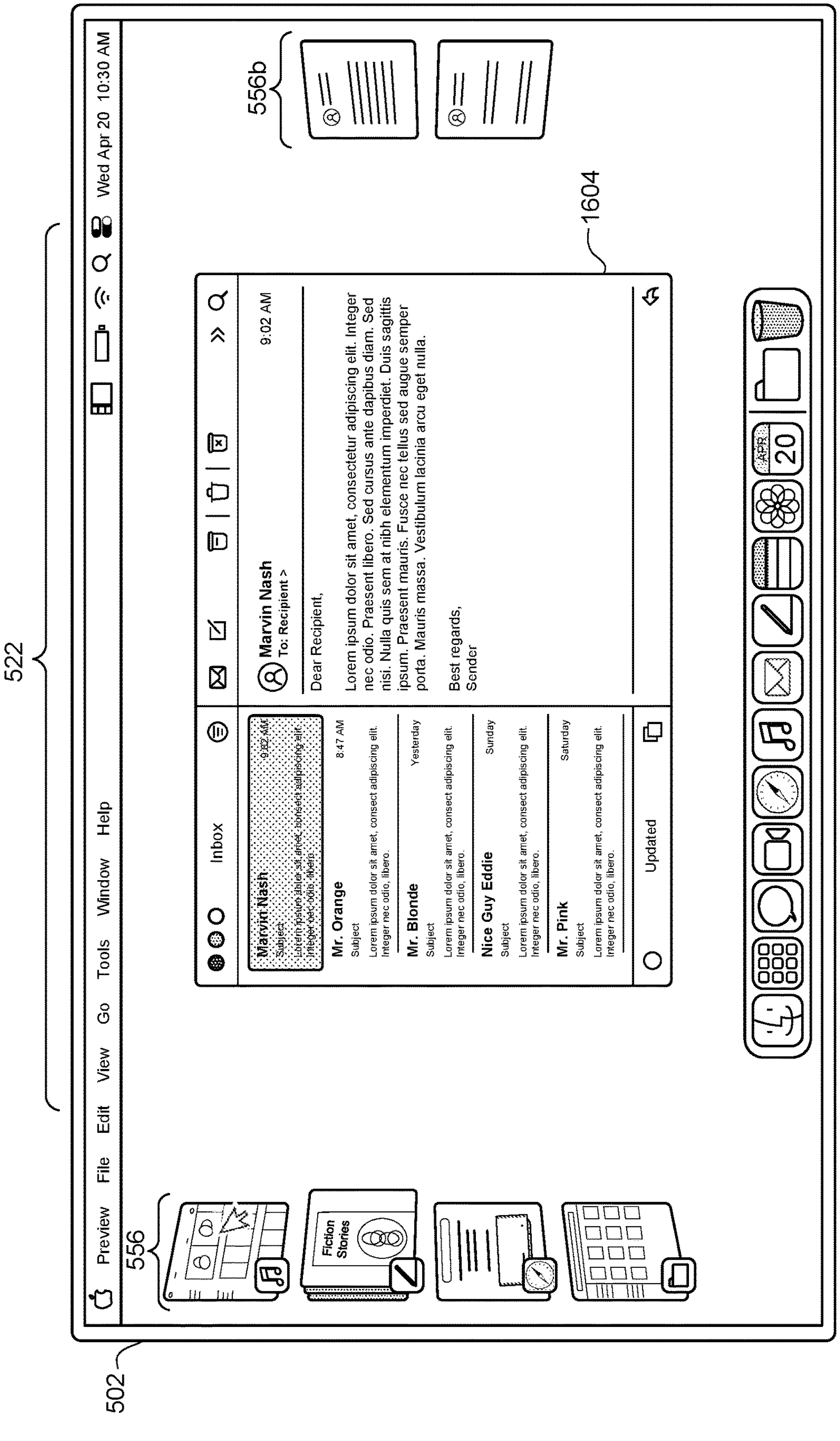

FIGS. 16I-16O illustrate user inputs for full-screen configurations in the concentration mode described above, in accordance with some implementations. In FIG. 16I, user input 1624 selects a toolbar affordance in the mail window 1610, which opens a menu, as shown in FIG. 16J. In FIG. 16J, user input 1626 selects an "Enter Full Screen" option 1628 in the menu, causing the mail window to be resized in a full-screen configuration, as shown in FIG. 16K. In some embodiments, while a window is in the full-screen configuration, the strip(s) move partially or completely off the display, while the toolbar 1516 and/or dock 1514 remain on the screen. In some embodiments, moving a cursor or pointer to within a threshold distance of the edge of the screen causes a corresponding strip 556 to appear, overlaid above the full-screen window, as shown in FIG. 16L (strip 556) and FIG. 16M (secondary strip 556*b*). In some embodiments, the strips autohides when a window is in the full-screen configuration. In some embodiments, the strip(s) remain visible until more than a threshold percentage of the representations in the strip(s) (e.g., 50%) are occluded by the full-screen window. In FIG. 16N, user input 1630 selects an "Exit Full Screen" menu option 1632, which causes the window 1604 to return to the stage region and the strip(s) to return to their normal positions, as shown in FIG. 16O.

Figure 17A:
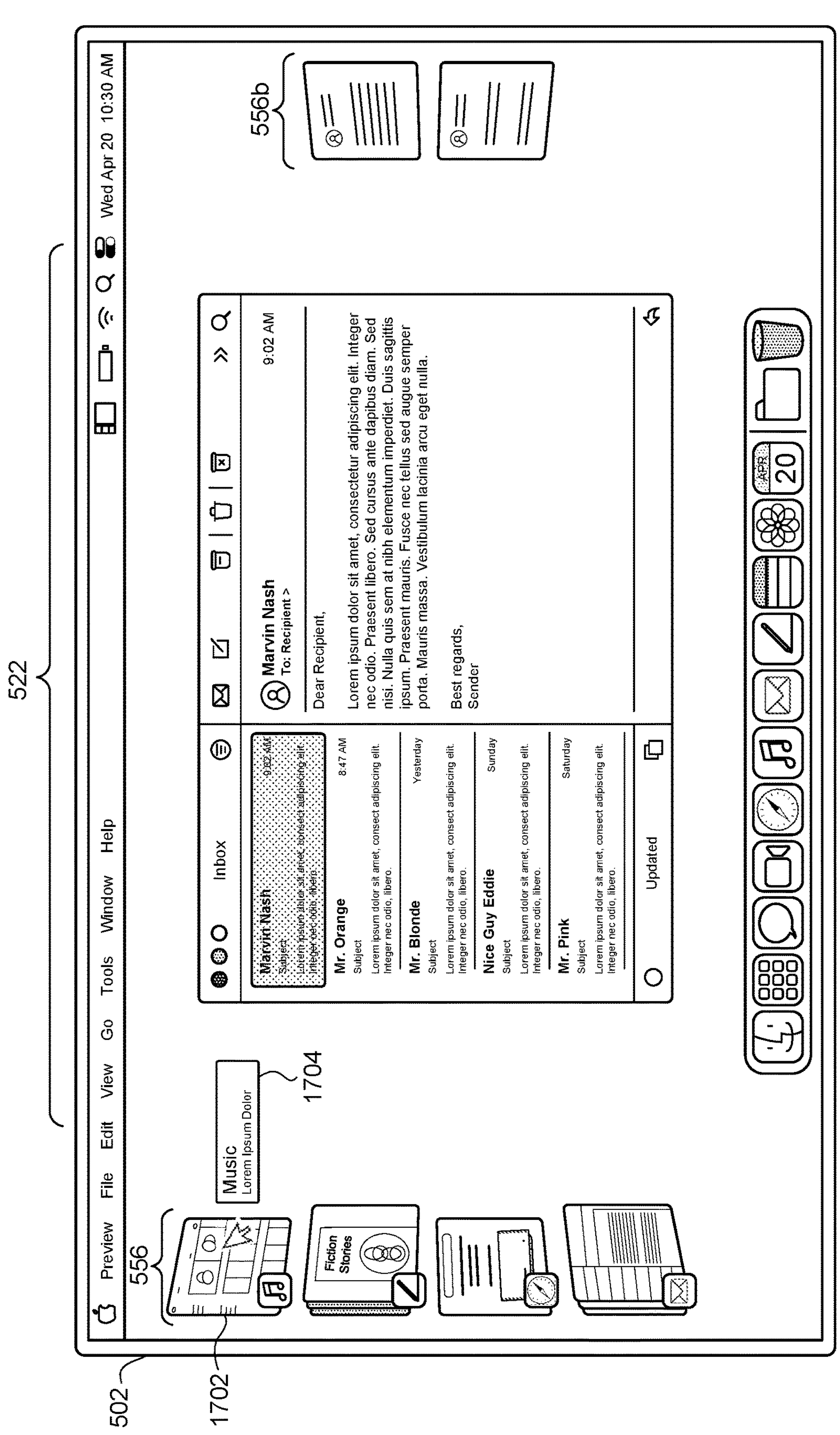
Figure 17B:
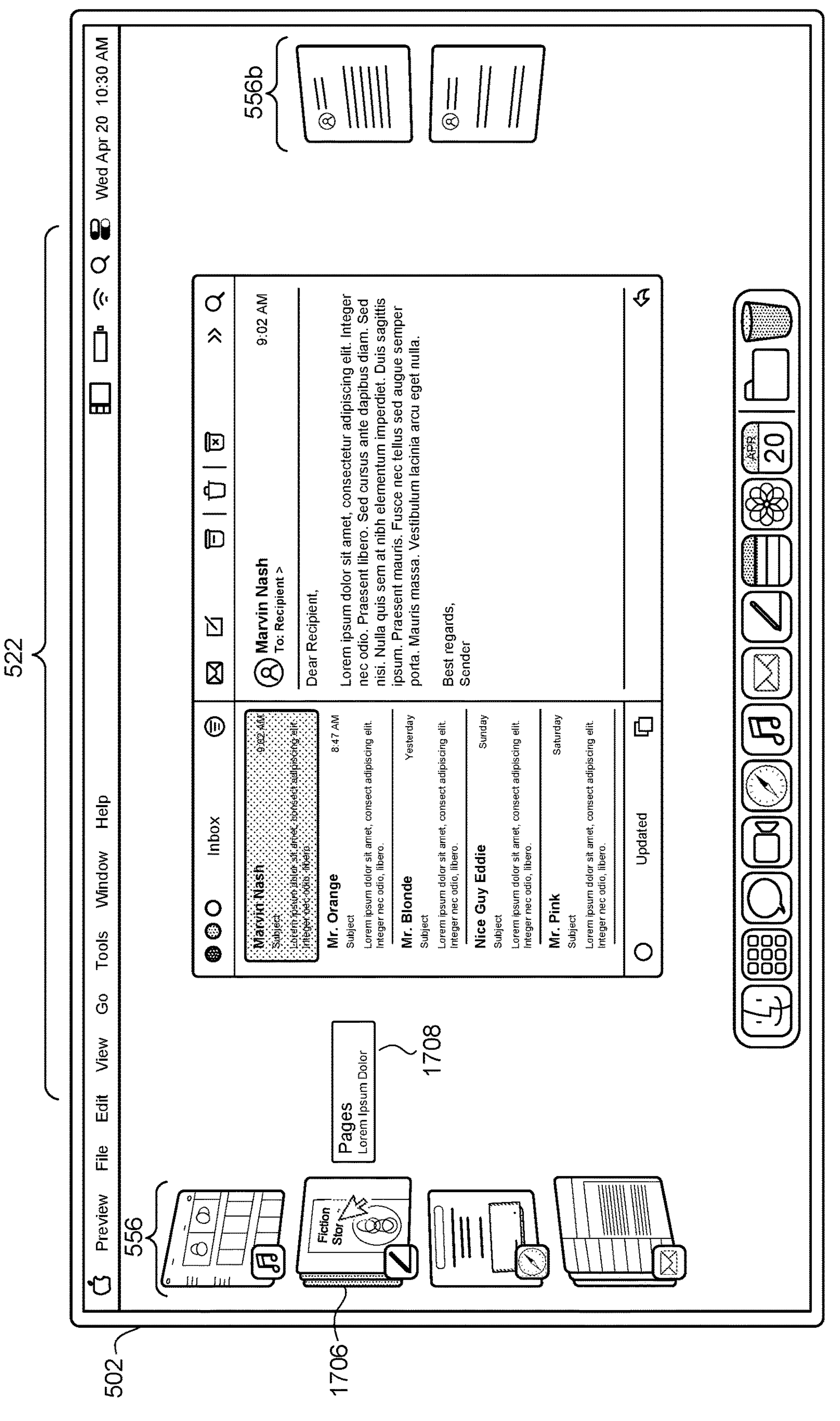
Figure 17C:
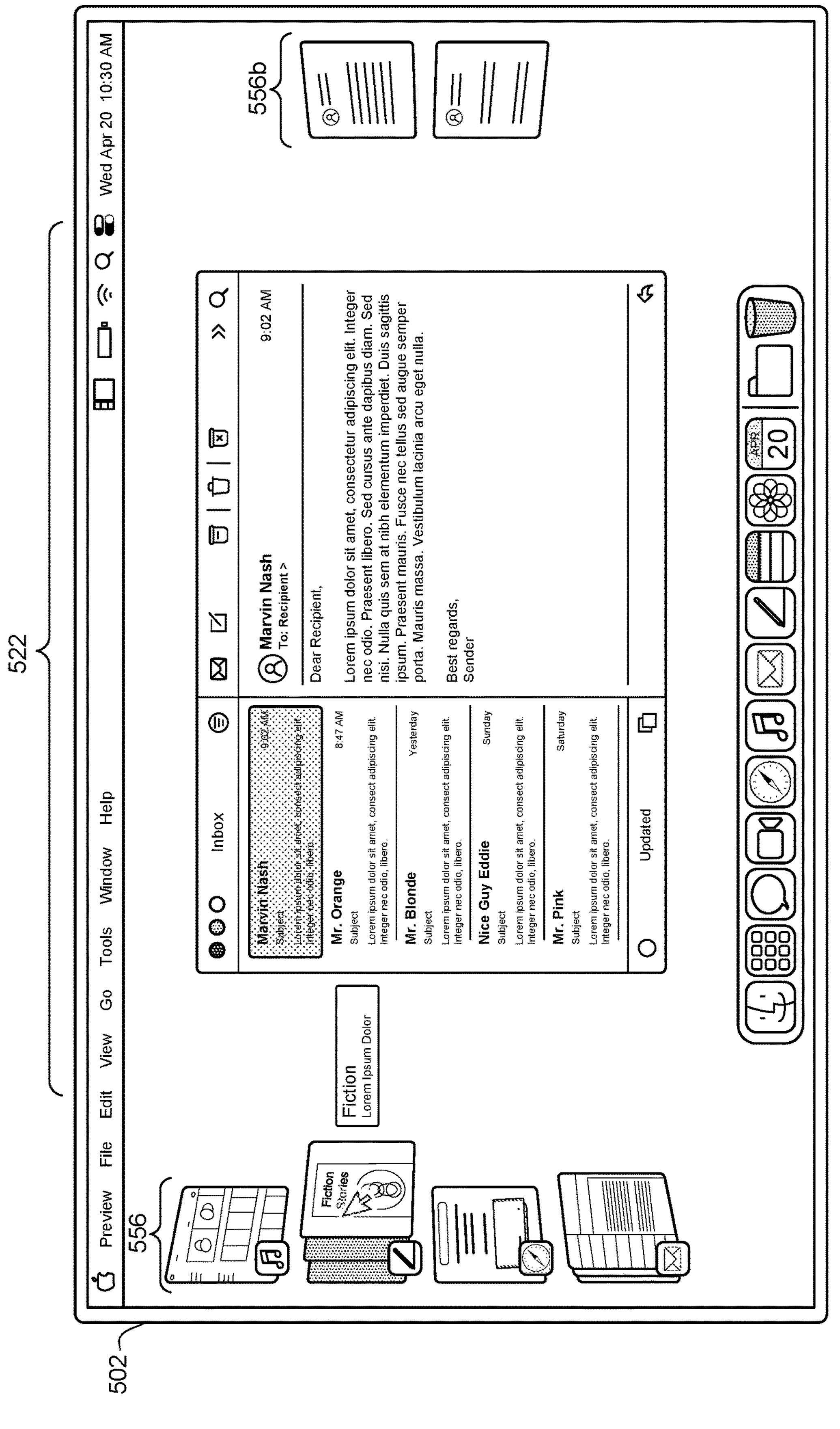

FIGS. 17A-17I illustrate features for labeling and selecting individual window representations among groups of representations in the strip for the concentration mode described above, in accordance with some embodiments. In some embodiments, as shown in FIG. 17A, while a mouse pointer or cursor hovers over a window representation 1702 in the strip, a label 1704 appears proximate to the window representation, which identifies the application and/or the specific application window corresponding to the window representation 1702. In some embodiments, as shown in FIG. 17B, while a mouse pointer or cursor hovers over a group of window representations 1706 in the strip, a label 1708 appears as described above. As the mouse pointer or cursor continues to hover, the window representations in the window grouping fan out, indicating the contents of each window representation, as shown in FIG. 17C.

Figure 17D:
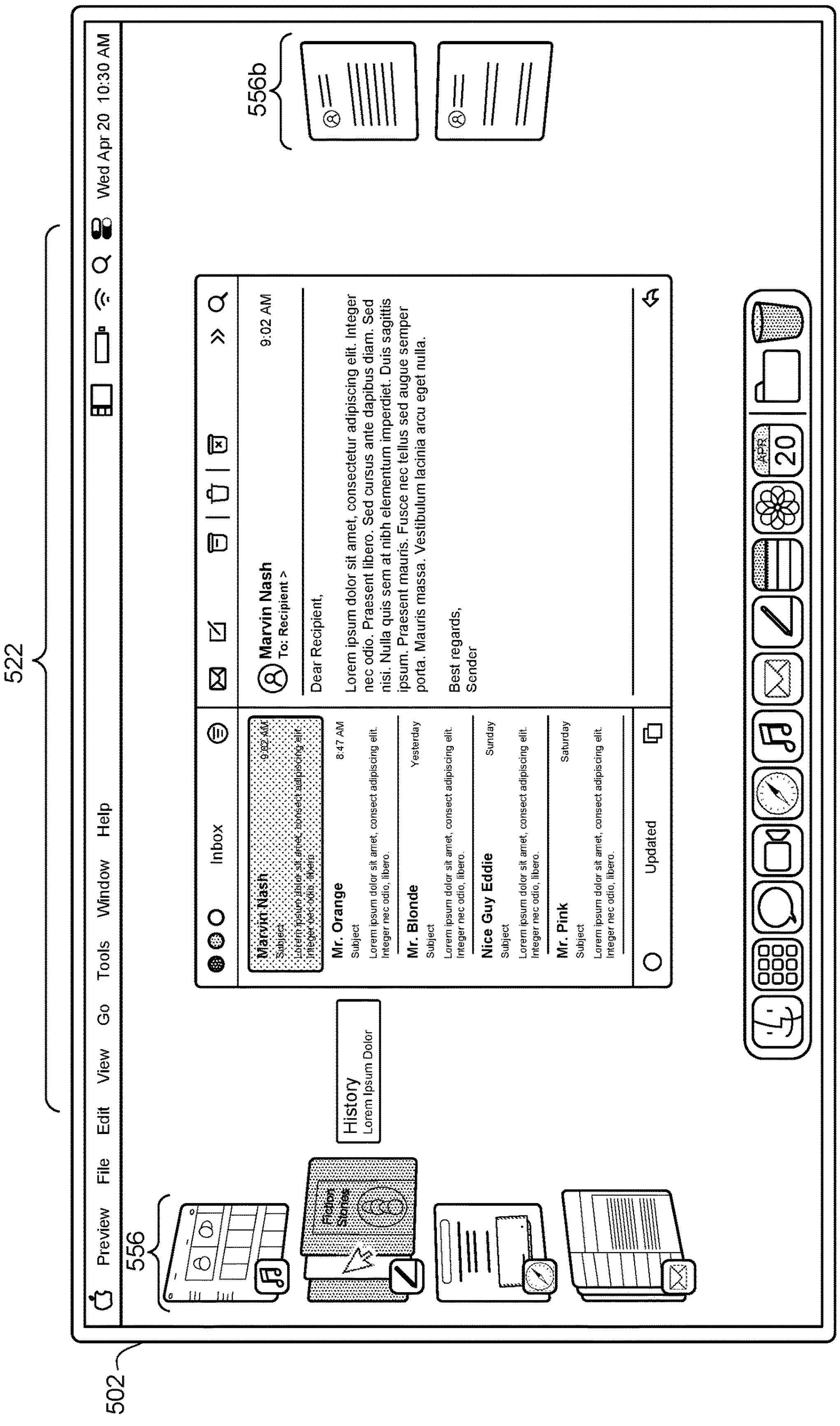
Figure 17E:
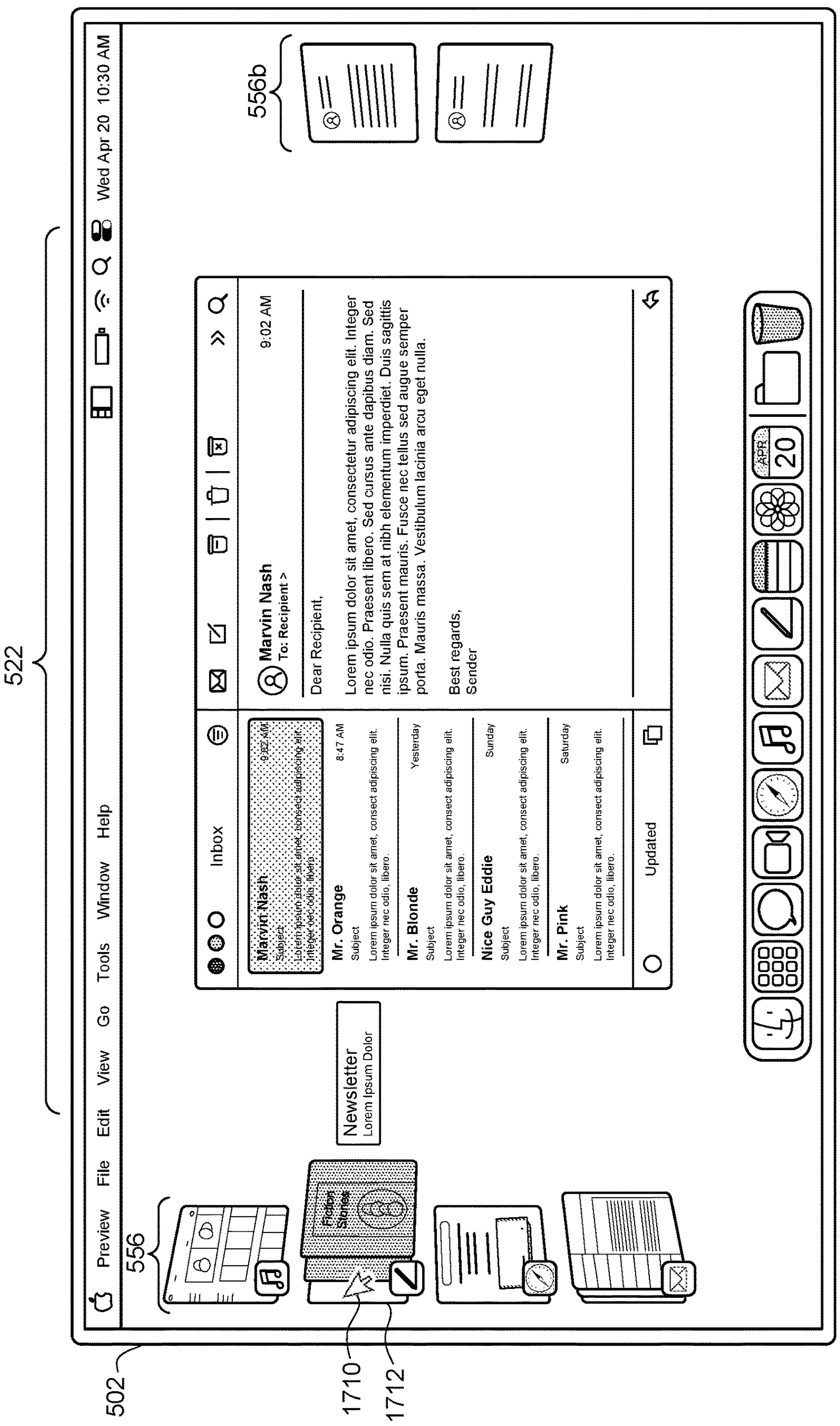

In some embodiments, the window representation associated with a window that will open if the mouse pointer or cursor selects the representation, is graphically rendered differently from the other window representations, as illustrated in FIG. 17D (in which device 502 graphically highlights a history window) and in FIG. 17E (in which device 502 graphically highlights a newsletter window 1712). For example, the window representation under the pointer or cursor (the representation that will open upon a mouse click or some other user input selection) may increase in size, appear brighter, and/or appear less transparent than the other window representations, which may appear smaller, more transparent, and/or more dimmed, further indicating to the user which window representation will be selected upon a mouse click, touchpad tap, screen tap, or the like. In some embodiments, the window representation on the top (e.g., on the topmost layer) of the group of window representations may be biased for selection. As a result, in these embodiments, selecting anywhere in the group of window representations before the group is fanned out causes a window corresponding to the top window representation in the window grouping to open in the stage region (or opens windows associated with the entire window grouping).

Figure 17F:
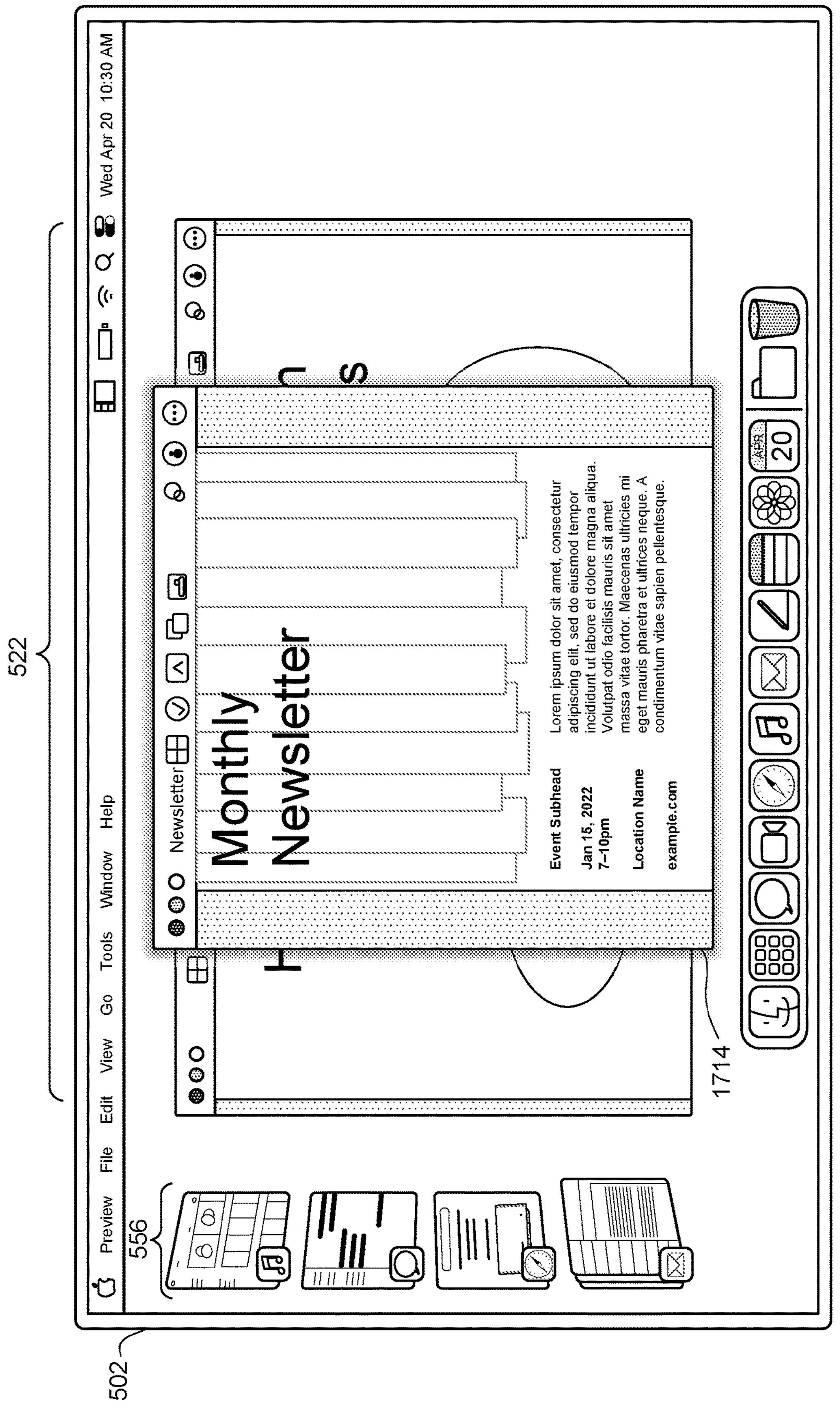

In some embodiments, selection of a particular window representation in a window grouping representation causes one window associated with that window representation to be displayed in the stage region. In some embodiments, selection of a particular window representation in a window grouping representation causes a plurality of or all of the window representations to open into corresponding windows in the stage region (and sometimes also the right stage region), with the window corresponding to the selected window representation opening in the foreground. For example, in FIG. 17E, user input 1710 selects the bottom word processor window representation 1712, which causes a plurality of or all of the word processor windows corresponding to the representations in the window grouping to open with the window corresponding to the bottom representation 1712 opening in the foreground (window 1714), as shown in FIG. 17F. As another example, in FIG. 17G, window grouping representation 1716 is fanned out as described above, and in FIG. 17H, the middle window representation 1718 is selected, causing a plurality of or all of the word processor windows associated with the group to open in the stage region, with the window associated with the middle window representation opening in the foreground (window 1720), as shown in FIG. 17I.

Figure 17G:
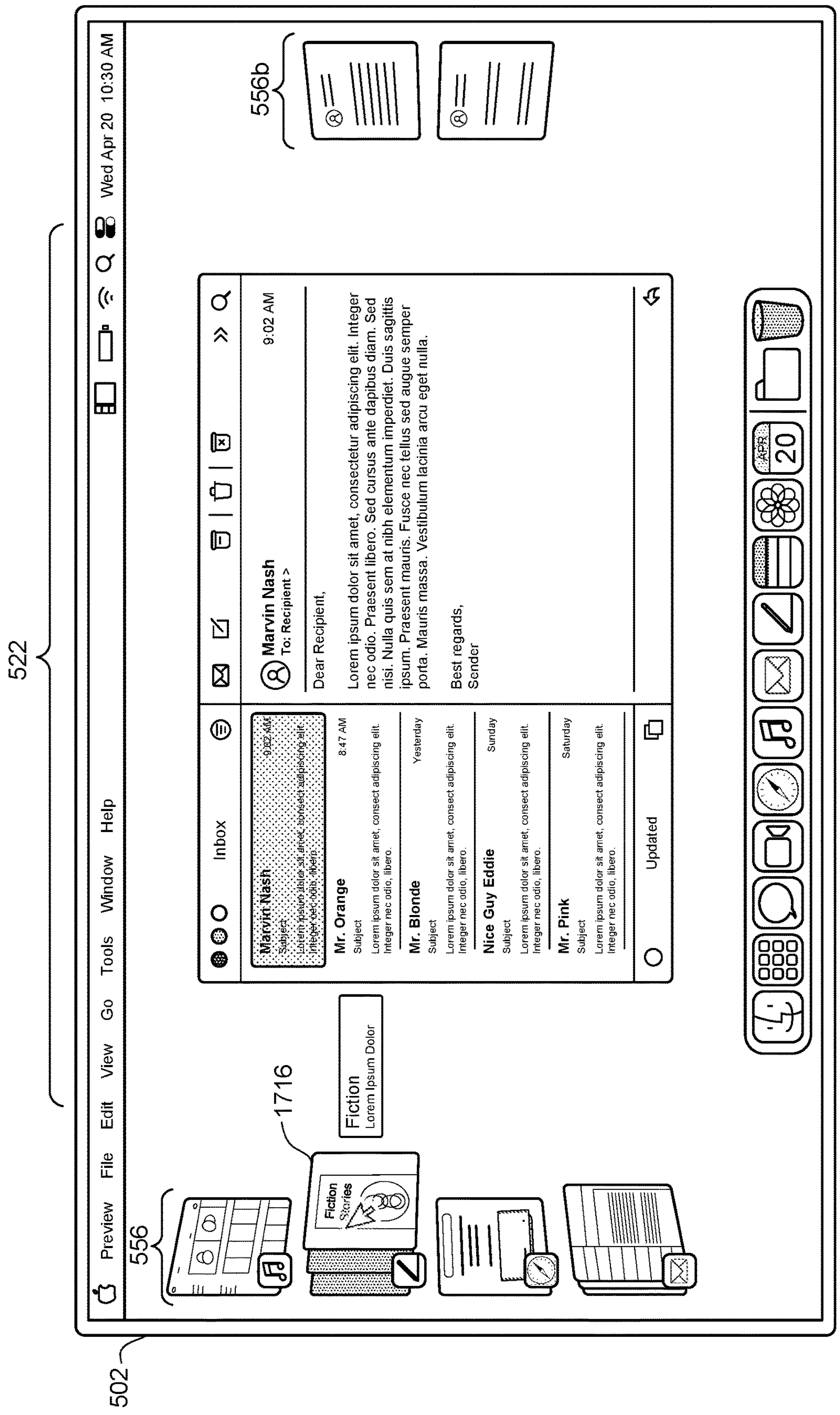
Figure 17H:
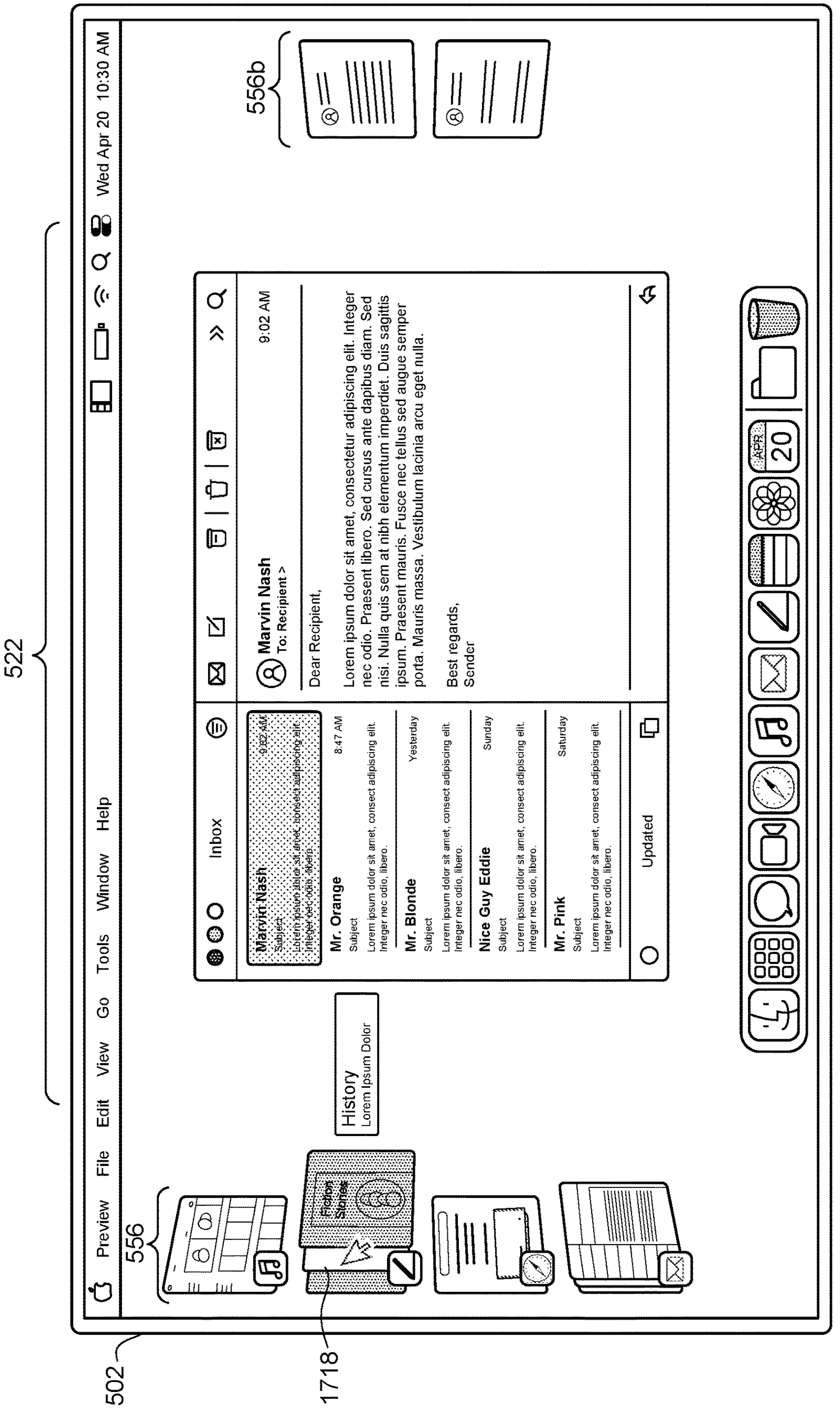
Figure 17I:
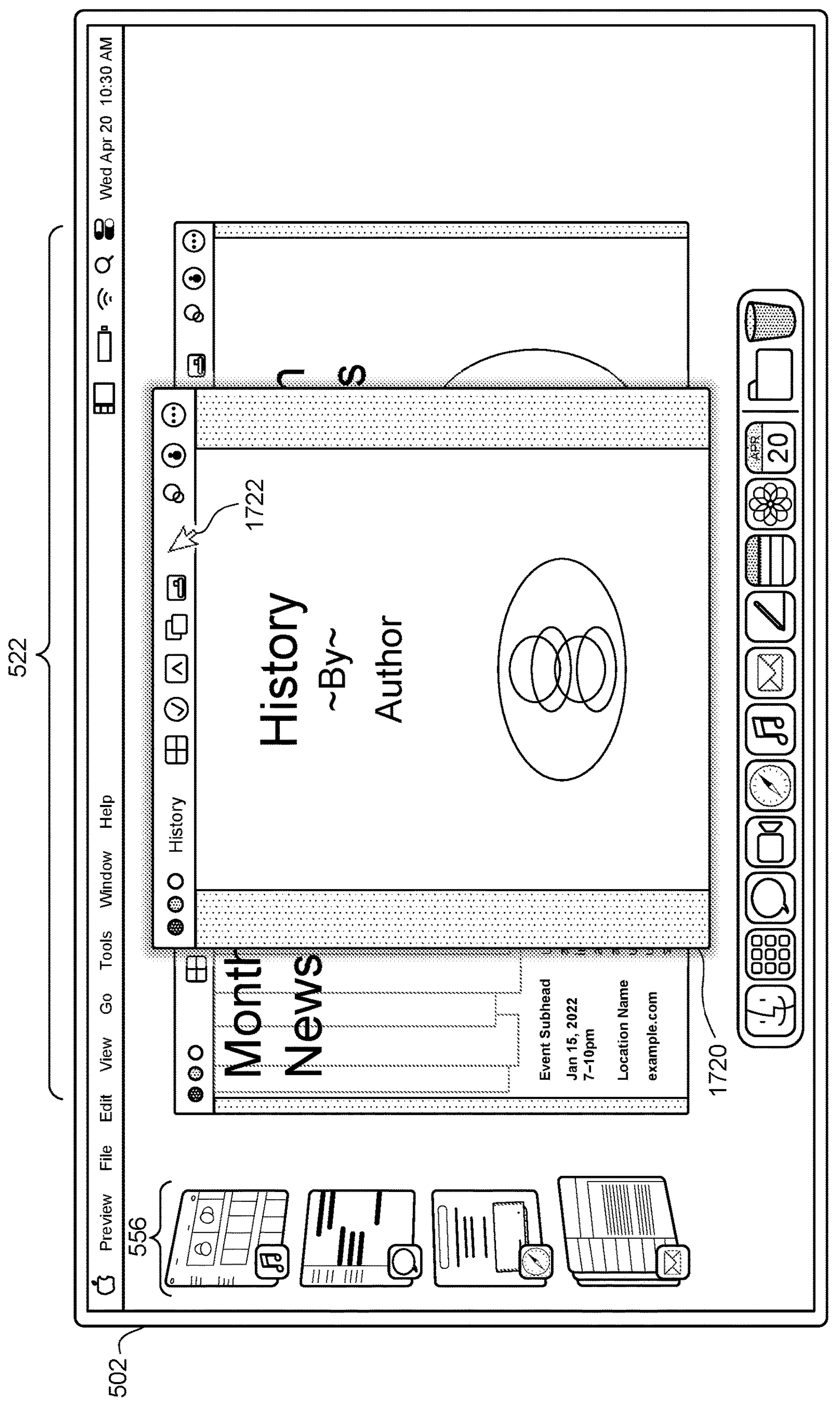
Figure 17J:
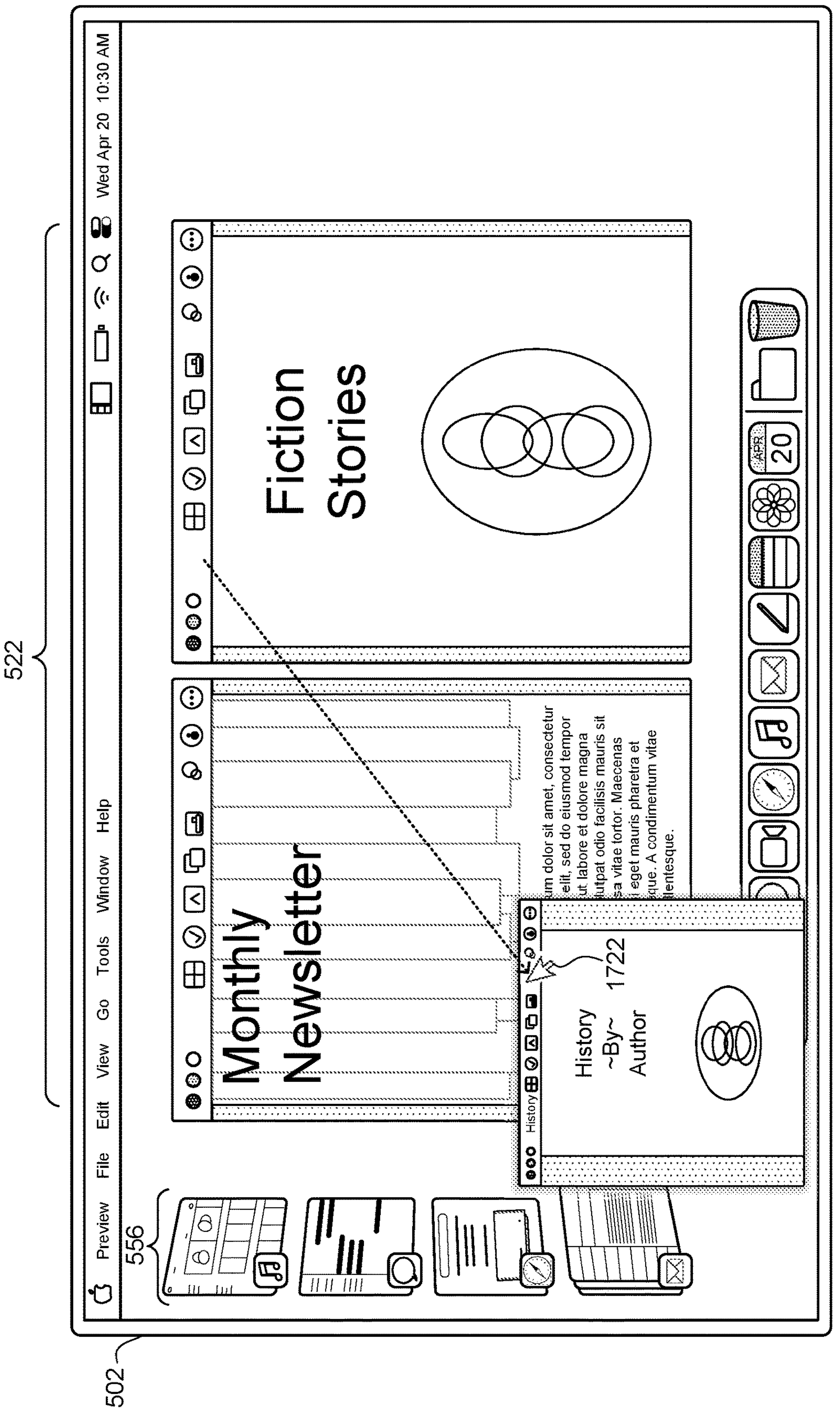
Figure 17K:
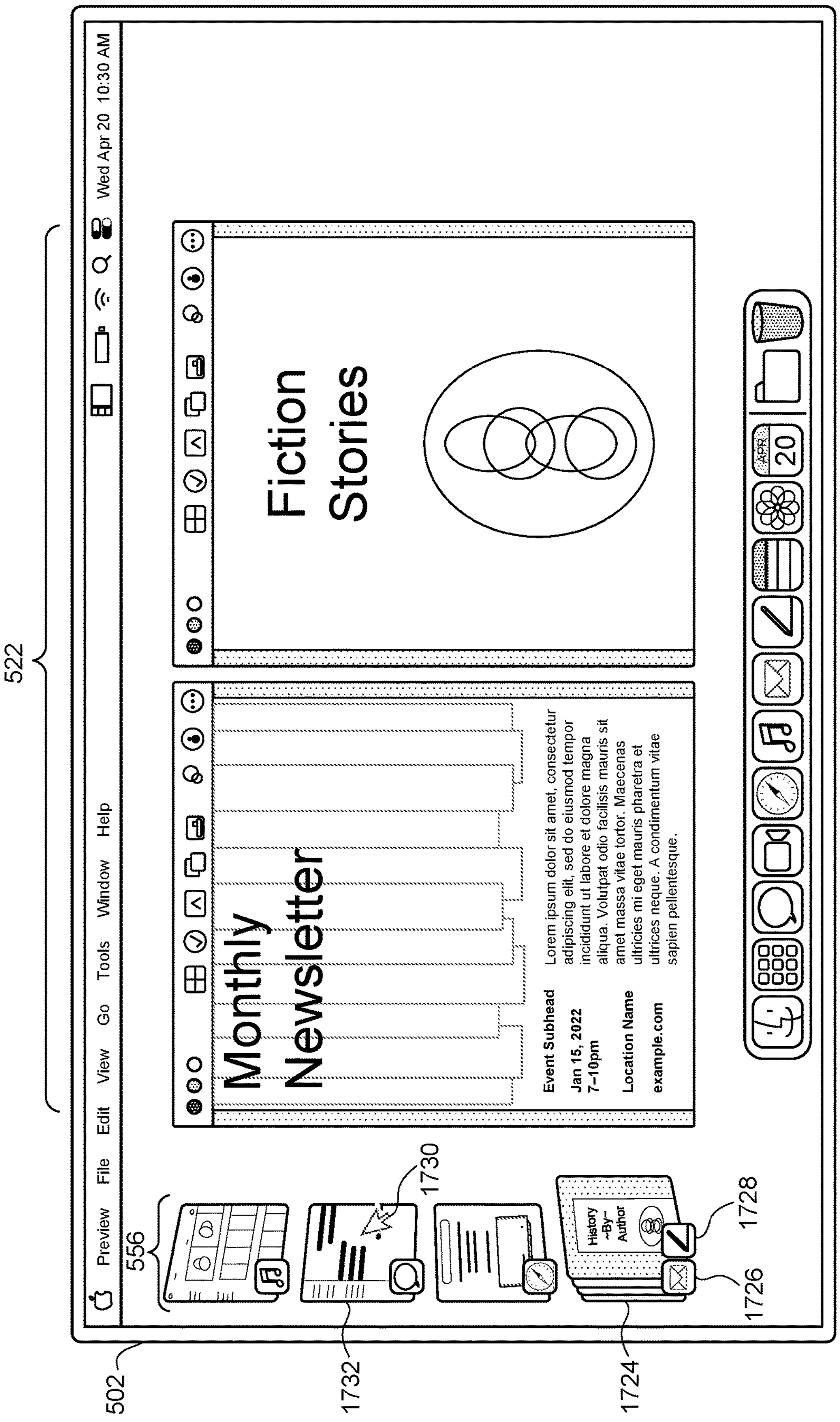
Figure 17L:
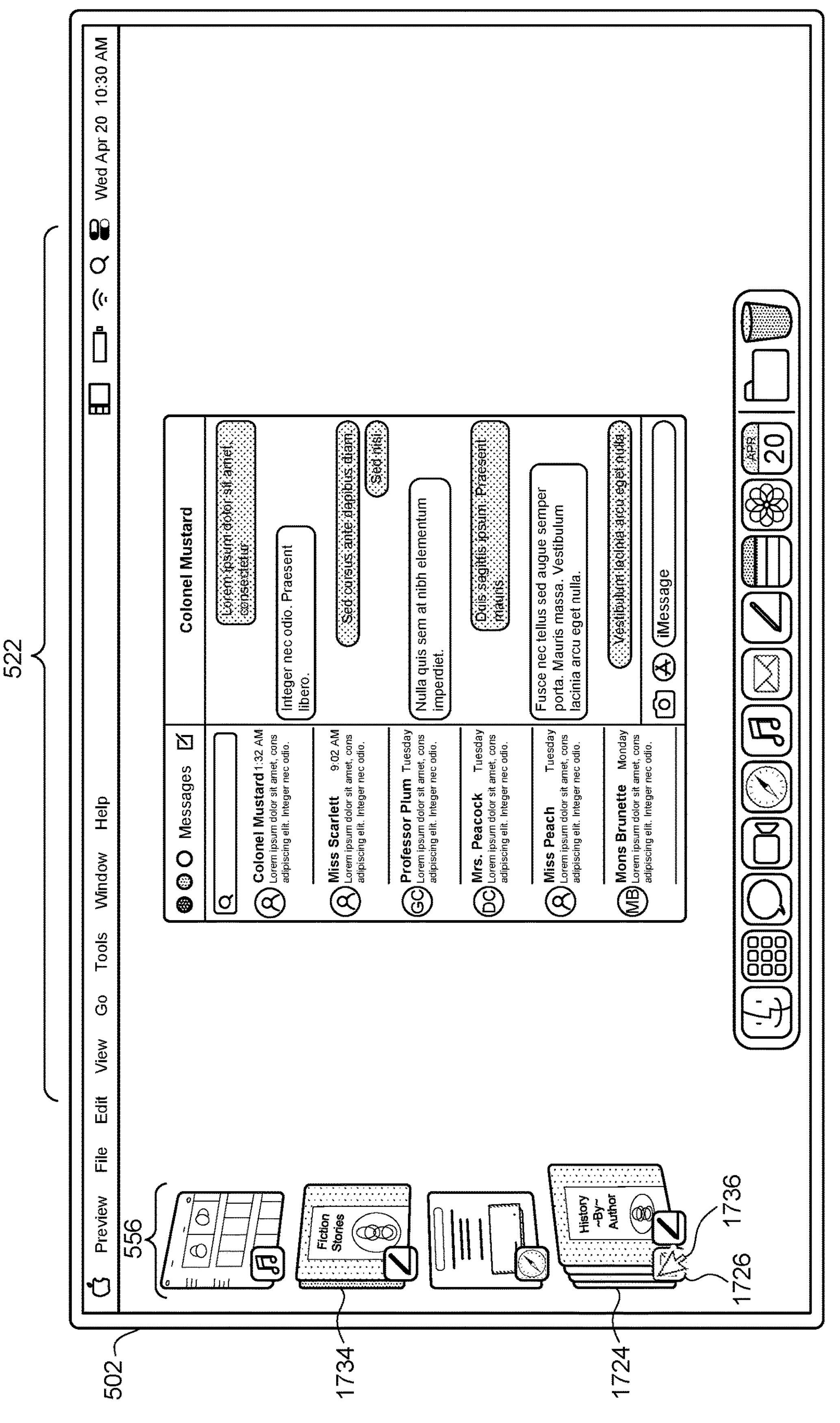
Figure 17M:
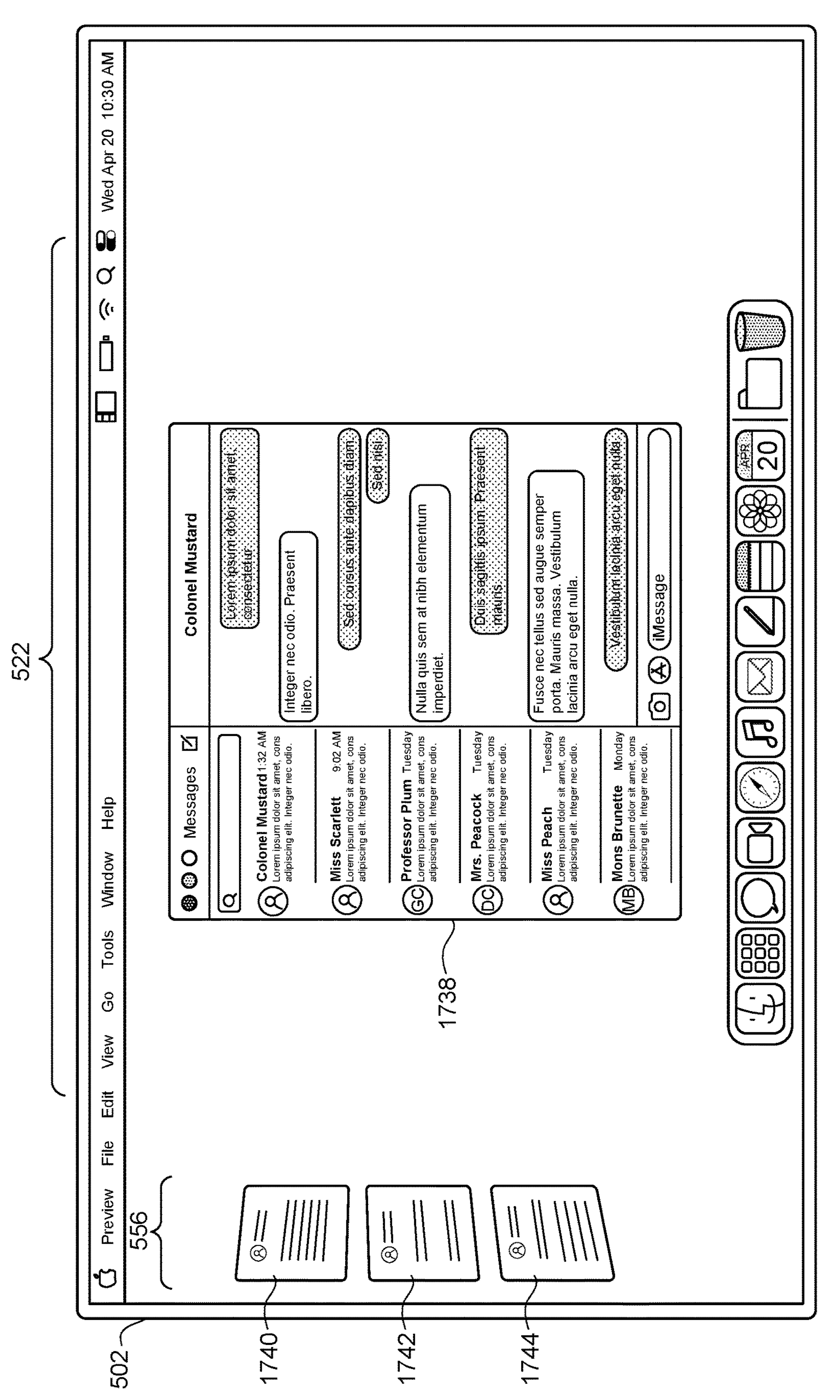
Figure 17N:
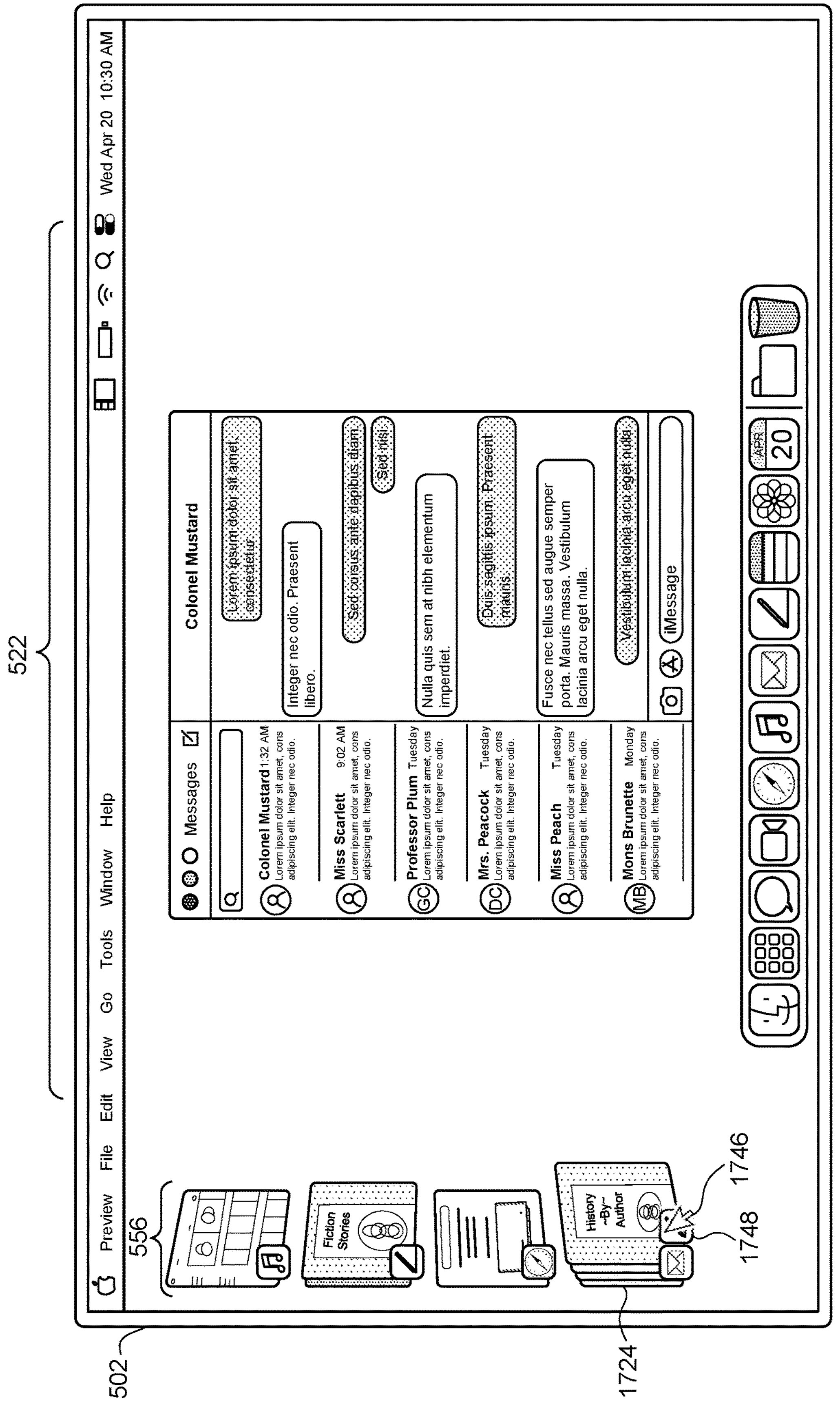
Figure 17O:
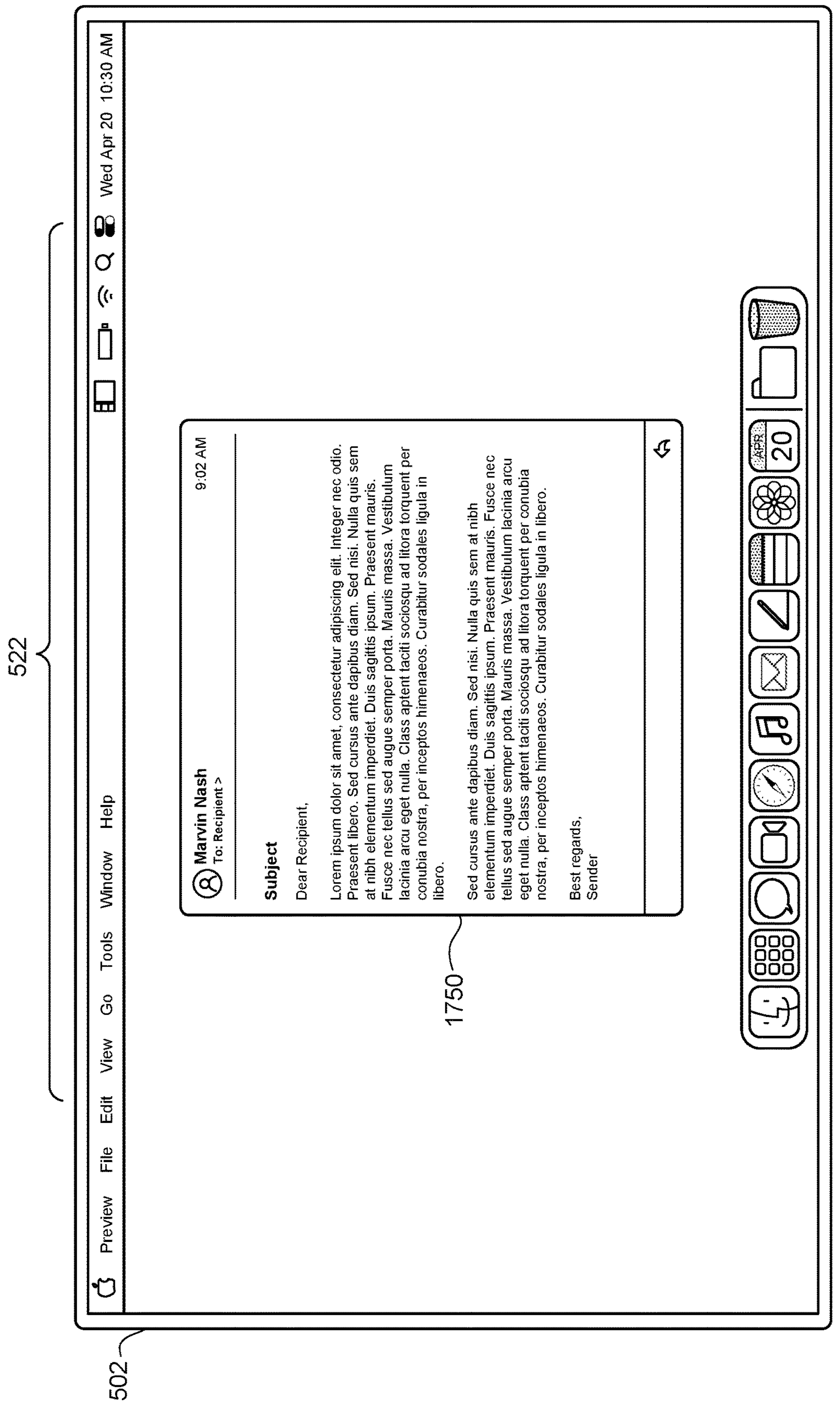

FIGS. 17I-17O illustrate features related to hybrid window groupings in the concentration mode described above, in accordance with some embodiments. In FIG. 17I, in response to detecting user input 1722, device 502 removes word processor window 1720 from the currently open window grouping, as shown in FIG. 17J, and places the window in mail window grouping 1724 (also referred to as a multi-application grouping), as shown in FIG. 17K. As a result, window grouping representation 1724 includes mail window representations and a word processor window representation, indicated by two application icons 1726 and 1728 in the window grouping representation 1724. In FIG. 17K, user input 1730 selects window grouping representation 1732, which causes the remaining word processor windows to be moved to a word processor window grouping representation 1734 in the strip, as shown in FIG. 17L. In FIG. 17L, user input 1736 selects the mail application icon 1726 in window grouping representation 1724, causing the mail application windows (and not the word processor application window) in the corresponding set to open in the stage region, as shown in FIG. 17M, with a main window 1738 in the stage region and child windows 1740, 1742, and 1744 replacing the main strip as described above. In another example, in FIG. 17N, user input 1746 selects the word processor application icon 1748 in window grouping representation 1724, causing the word processor application window 1750 (and not the mail application windows) in the corresponding set to open in the stage region, as shown in FIG. 17O.

FIGS. 18A-18L are flow diagrams illustrating method 1800 of window management of open windows included a virtual workspace, in accordance with some embodiments. Method 1800 is performed at an electronic device (e.g., laptop display device 300, tablet display device 100, or desktop display device in FIG. 1A; portable multifunctional device 100 in FIG. 2; or electronic device in FIG. 3A) with a display (e.g., display devices 101, 201, and 301 in FIGS. 1A-1B) and one or more input devices (e.g., a touch-sensitive display 101 of tablet device 100 in FIG. 1A; mouse input device 202, keyboard input devices 203 and 305, and touchpad 309 in FIG. 1B; or touchpad 355 in FIG. 3 and touch-sensitive surface 451 in FIG. 4B). Some operations of method 1800 are, optionally, combined and/or the order of some operations is, optionally, changed.

As described herein, the method 1800 provides an improved mechanism for window management of open windows (optionally executed by multiple different applications) included in one or more virtual workspaces and/or in one or more displays (e.g., connected or otherwise in communication). A concentration mode is activated (e.g., in response to user input) that causes an electronic device to automatically perform window management operations that unclutter a screen space (e.g., by moving, shrinking, and/or grouping open windows). At the same time visibility of windows is maintained to provide easy access to windows that have been moved, shrunk, and/or grouped (e.g., one click or tap away). Further, in concentration mode, (direct) interaction with a select subset of windows is also provided (e.g., ability to directly invoke full functionality provided by a window). Accordingly, a user is provided with an ability to concentrate on manipulating content or invoking functionality of the select subset of windows without losing sight of other open windows and/or window groups. Further, flexibility is provided in concentration mode to reorganize open windows in response to user input and preserve such modifications when switching between window groups or active windows. In some embodiments, method 1800 automatically performs operations (e.g., window management operations) when a set of conditions have been met (e.g., when the electronic device is in the concentration mode) without requiring further user input, thereby reducing the number of inputs needed to unclutter the screen space, manage, and/or interact with open windows.

A computer system is in communication with a display generation component (e.g., a display, a display on a laptop, a touchscreen, a tablet, a smartphone, a heads-up display, a head-md display (HMD), and other integrated displays or separate displays) and one or more input devices (e.g., a trackpad, a mouse, a keyboard, a microphone, a touchscreen, a stylus, a controller, joystick, buttons, scanners, cameras, etc.). The computer system concurrently displays (1804), via the display generation component: a first set of one or more windows in an interactive mode and a representation of a second set of one or more windows in a non-interactive mode. While a window is displayed in an interactive mode, the content of the window can be manipulated in response to user inputs (e.g., scrolled, selected, edited, and/or updated). For example, windows that are displayed in the interactive mode in stage region 522 respond to user inputs without the need to first activate the windows (e.g., windows displayed in stage region 522 in FIGS. 6A-6H; and FIGS. 7A-7U). In some embodiments, the representation of the second set of one or more windows corresponds to a representation of a first window grouping of one or more open windows grouped together (or displayed in proximity to each other). For example, the first window grouping includes reduced scale representations of the second set of one or more windows. While a representation of a window is displayed in a non-interactive mode, the content of the window is not available to be manipulated in response to user inputs (e.g., window representations 708 and 710 in FIG. 7B).

In some embodiments, the representation of the first window grouping is a collection or composition of reduced scale representations of each window of the second set of one or more windows stacked together and individually selectable (e.g., stacks of window thumbnails 604*a*-612*a* in FIGS. 6A-6H). In some embodiments, the state of the second set of one or more windows immediately prior their inclusion in the first window grouping is preserved. In some embodiments, the first window grouping can be a grouping of one window. In some embodiments, windows that are displayed in the non-interactive mode first need to be activated or the respective window grouping to which the windows belong need to be activated before the electronic device responds to user inputs manipulating content of the windows. In some embodiments, input that manipulates content of a respective window includes entering text, copying, pasting, scrolling, inserting content (e.g., inserting pictures, multimedia content, documents, and other attachments), and/or interacting with controls (e.g., selectable user interface elements). In some embodiments, input that manipulates content of a window is different from input that manipulates a size or a position of the window, such that an application associated with the window performs a respective operation in response to inputs that manipulate the content of application. In some embodiments, windows that belong to the same window grouping are associated with the same application. In some embodiments, windows that belong to the same window grouping are associated with different applications. For example, the first set of one or more windows can include one window for a notes application and another window for a browser application, where, optionally, the windows can be displayed overlaying each other, side-by-side, or in another overlapping or non-overlapping manner).

The computer system detects (1806) an input selecting the representation of the second set of one or more windows. For example, input selecting the representation of the second set of one or more windows (e.g., such as inputs 611, 618, 624, 630 in FIGS. 6A-6H; inputs 704, 720, 728, 734, 758 in FIGS. 7A-7S) and/or input selecting a specific window that is included in the representation of the second set of one or more windows (input 766 in FIGS. 7T-7U). In some embodiments, the input selecting the representation of the second set of one or more windows can be performed using a focus selector, a touch-screen gesture, a voice command, a key combination on a keyboard, a combination of different input modalities, and/or other means for selecting a user interface element (e.g., input selecting a representation of a window grouping). In some embodiments, the input selecting the representation of the second set of one or more windows selects and activates a respective window included in the representation of the second set of one or more windows, such that the selected window is displayed in the interactive mode and content of the window can be manipulated. In some embodiments, what window is displayed in the interactive mode is selected in accordance with previous state of the selected representation of the second set of one or windows. In some embodiments, the window that is displayed in the interactive mode is a target window selected within the representation of the second set of one or windows (e.g., if a target window is selected as opposed the whole window grouping). In some embodiments, a representation of windows grouped together, such as a representation of the first set of one or more windows and a representation of the second set of one or more windows, can include a single window or multiple windows of the same or different applications (e.g., stack of windows 1724 includes windows from the mail application and the pages application, FIG. 17K).

In response to detecting the input, the computer system ceases (1808) to display the first set of one or more windows in the interactive mode and concurrently displays, via the display generation component: one or more of the second set of one or more windows in the interactive mode, and a representation of the first set of one or more windows in a non-interactive mode. In some embodiments, windows displayed in the interactive mode, including the one or more of the second set of one or more windows, are displayed in a main interaction region also referred to as a stage region (e.g., stage region 522) and optionally, one or more other windows of the second set of one or more windows are displayed in an inactive state or non-interactive mode in a separate region, e.g., a region for switching active windows in the stage region (e.g., strip 556*b* in FIG. 17K), which is also referred to as the right strip or a window switcher region. In some embodiments, application switcher region (a left strip 556*b*) and a window switcher region (right strip 566*b*) are combined in the same margin region, (margin region 524 in FIG. 7E).

In some embodiments, the representation of the first set of one or more windows corresponds to a representation of a second window grouping of one or more open windows grouped together (or displayed in proximity to each other), where the second window grouping includes reduced scale representations of the first set of one or more windows (e.g., a cluster or a stack of window thumbnails, such as stacks of window thumbnails 604*a*-612*a* displayed in left strip 566 in FIGS. 6A-6H). In some embodiments, the state of the first set of one or more windows immediately prior their inclusion in the second window grouping is preserved (FIGS. 8K-8L). In some embodiments, the second window grouping can be a grouping of one window. In some embodiments, the first set of one or more windows, which were displayed in the interactive mode prior to detecting the input, are automatically grouped together in response to the input and are included in a system-generated window grouping (e.g., the second window grouping) that includes a reduced scale representation for each window in the first set of one or more windows.

Switching from a normal mode of operating windows to a concentration mode, automatically (e.g., without further user input directed to open windows) adds open windows into a number of window groupings, removes open windows from a main interaction area (and optionally collects hidden minimized windows into the window groupings), provides representations of respective window groupings in a sidebar region, and maintains a currently active window in the main interaction area in interactive mode, thereby automatically organizing open windows in the virtual workspace. In concentration mode, open windows are grouped optionally by application (or other criteria), where grouped windows are displayed in non-interactive mode, in accordance with some embodiments. In a normal mode, windows included in a virtual workspace are not necessarily organized by application or other criteria, and/or windows in the background can be completely occluded, and/or minimized windows can be hidden from view. Further, replacing currently active grouping of windows with a grouping of windows from the sidebar (in response to a selection input) reduces number, extent, and/or nature of inputs needed to perform an operation. Automatically organizing open windows in a virtual workspace unclutters the virtual workspace while maintaining visibility of windows that are removed from the main interaction area, thereby reducing the number of inputs needed to manage multiple open windows from different applications in a limited screen area.

The computer system displays (1810), in a first display region, the first set of one or more windows displayed in the interactive mode or the one or more of the second set of one or more windows displayed in the interactive mode are displayed, and the computer system displays representation of the second set of one or more windows or the representation of the first set of one or more windows in a second display region different from the first display region. In some embodiments, the first display region of the display generation component corresponds to an area on the screen that is designated for interaction with one or more application windows that are displayed in the interactive mode (e.g., a main interaction region, an application display region, or stage region, such as stage region 522). The stage region is where windows are displayed in the interactive mode, such that content of the windows is available for manipulation in response to user inputs, and the windows are displayed at a regular size (as opposed to at a reduced scale). In some embodiments, the first display region occupies most of the center of the screen, where, optionally, a left margin region (e.g., region 524), a right margin region (e.g., region 526), and a bottom margin region are reserved for different content. In some embodiments, the bottom margin region is occupied by a dock that displays application icons for launching applications (e.g., dock 528 in FIG. 5J). In some embodiments, the left margin region, also referred to as a left strip or a sidebar, is occupied by representations of window groupings, such as the representation of the first set of one or more windows and/or the representation of the second set of one or more windows. In some embodiments, in response to detecting input selecting a window grouping, the windows in the stage region are removed from the stage region and automatically included as reduced scale representations in an automatically generated grouping, a representation of which is displayed in the left strip (e.g., the same region where the selected window grouping was displayed prior to its selection, e.g., strip 566 in FIGS. 6A-7U). For example, the first set of one or more windows, which were displayed in the interactive mode prior to detecting the input, are automatically removed from stage region (without user input other than selecting the representation of the second set of one or more windows). In some embodiments, the right margin region, also referred to as a right strip or a window switcher region (e.g., strip 556*b*), is occupied by one or more ungrouped windows that are displayed in non-interactive mode and that are associated with the windows displayed in the stage region (e.g., window 706 and reduced scale window representations 708 and 710 in FIG. 7B belong to the same window grouping). In some embodiments, the right margin region or the window switcher region can have a different location (and/or can be combined with the left strip). In some embodiments, the first region and the second region are virtual regions where their corresponding contours are not necessarily visually outlined or shown. In some embodiments, the first and second regions are borderless thereby keeping the division invisible to a user. In some embodiments, the first display region (e.g., stage region 522) is the main interaction region in which a user manipulates content of windows. In some embodiments, the second display region (e.g., left strip 566) that includes windows grouped by applications (or other criteria) operates as an application switcher, such that windows executed by (or associated with) applications that are different from applications executing windows in the stage region can be displayed in the stage region (first display region) by selecting windows from one of the window groupings or by selecting another grouping to be the one active and/or displayed in the stage region. In some embodiments, a right display region (e.g., right strip 556*b*), which includes windows associated with windows in the stage region operate as a window switcher, such that a window selected from the right strip replaces a window displayed in the stage region. In some embodiments, location and/or position of the second display region and the third display region can be different, such that the second display region does not have to be on the left side of the stage region and/or the third display region does not have to be on the right side of the stage region. In some embodiments, interactive mode refers to a mode of operating with windows in the stage region (or main interaction region), and non-interactive mode refers to a mode of operating with the left strip (or application switcher region) and/or right strip (or window switcher region), where windows need to be brought to the stage region to manipulate their content, to execute available functions, and/or otherwise interact with them. In some embodiments, in a concentration mode (also referred to as continuous concentration mode), a screen or display is automatically divided and organized into functional regions, where some regions are in the interactive mode (e.g., the stage region 522) and some regions are in the non-interactive mode (the left strip 566 or an application switcher region, and/or the right strip 566*b* or a window switcher region). In some embodiments, the application switcher region and the window switcher region are displayed in the same sidebar, such as the left strip 566.

Automatically dividing the display into functional regions in response to activating the concentration mode, where one main region is in the interactive mode (e.g., the stage region) and other regions are in the non-interactive mode (the left strip or an application switcher region, and/or the right strip or a window switcher region) allows a user to focus operations on a subset of windows displayed in the main interaction region while maintaining visibility and easy access to related and unrelated open windows, thereby reducing the number of inputs needed to manage multiple open windows from different applications in a limited screen area.

In response to detecting the input, the computer system concurrently displays (1812), via the display generation component: two or more of the second set of one or more windows in the interactive mode and representations of one or more other windows of the second set of one or more windows in the non-interactive mode (or in an inactive state), and the one or more other windows are associated with the one or more of the second set of one or more windows. Content of the one or more other windows of the second set of one or more windows that are displayed in the non-interactive mode is not available to be manipulated in response to user inputs (e.g., window representations of the representations of one or more other windows of the second set of one or more windows need first to be selected and activated before content in the windows can be manipulated). In some embodiments, the one or more of the second set of one or more windows displayed in the stage region and the one or more other windows of the second set of one or more windows are associated (e.g., associated by being included in the same window grouping by a grouping criteria such as by application, application type, or in accordance with user inputs). In some embodiments, in response to selecting a representation of a window grouping, such as the representation of the second set of one or more windows, a subset of windows are displayed in the interactive mode (e.g., in the stage region 522) and one or more other windows included in the selected window grouping are displayed ungrouped in non-interactive mode (e.g., in the right strip 566*b* or other sidebar region).

Automatically displaying a subset of windows included in a respective window grouping in the interactive mode and displaying representations of one or more other windows included the respective window grouping in the non-interactive mode (e.g., in a sidebar region) provides ability to switch windows that are displayed in interactive mode (e.g., in the main interaction region) without the need to switch to a different window grouping or to search for other relevant open windows elsewhere (e.g., since relevant windows were already included in the respective window grouping), thereby reducing the number of inputs needed to perform an operation.

In response to detecting the input selecting the representation of the second set of one or more windows (e.g., prior displaying the second set of one or more windows in the interactive mode and the representation of the second window grouping comprising the first set of one or more windows in the non-interactive mode), the computer system ceases (1814) to display the representation of the second set of one or more windows in the non-interactive mode. For example, in response to selecting the representation of the second set of one or more windows, the representation of the second set of one or more windows is removed from the left strip and windows in the second set of one or more windows are displayed in the stage region and/or right strip. In some embodiments, different policies are used to determine if and what representation of window grouping to replace the position that was previously occupied by the representation of the second set of one or more windows. For example, according to a "recency policy," the most recently generated grouping is placed on top or in the first position in the left strip (FIGS. 6A-6B). In some embodiments, according to the recency policy, the representation of the first set of one or more windows is displayed in the first or top position in the strip regardless of the position that the representation of the second set of one or more windows occupied (immediately) prior detecting the input. According to a "replacement policy," the representation of a selected window grouping is replaced with a representation of automatically generated grouping including the windows in the stage region and the windows in the right strip, if any (FIGS. 6C-6D). In some embodiments, according to the "replacement policy," the representation of the first set of one or more windows replaces the representation of the second set of one or more windows. In some embodiments, according to the "replacement policy," windows in a selected window grouping representation replaces windows in the stage region and windows in the right strip, if any, and the windows in the stage region and the right strip form a new grouping that replaces the selected window grouping. According to "a placeholder policy," a position of the representation of a selected window grouping remains unoccupied in response to the selection input (FIGS. 6E-6H). In some embodiments, according to the "placeholder policy," the representation of the second set of one or more windows is ceased to be displayed in response to the input selecting the representation of the second set of one or more windows and the position remains unoccupied and the representation of the first of one or more windows is added to another position in the left strip.

Ceasing display of a representation of selected window grouping in response to the selection of the representation of the window grouping provides improved visual feedback to the user (e.g., indicating that the selected window grouping has become the currently active window grouping) and optionally makes space for inactive window groupings (e.g., in the left strip).

In response to detecting the input, the computer system displays (1816): the one or more of the second set of one or more windows in the first display region (e.g., displayed in the interactive mode in the main interaction region, e.g., stage region 522); the representation of the first set of one or more windows in the second display region (e.g., representations of window groupings displayed in application switcher region, e.g., left strip 566); and the representations of the one or more other windows of the second set of one or more windows in a third display region (e.g., reduced scale representations of windows are displayed in an inactive state or non-interactive mode in a window switcher region, e.g., the right strip 566*b*). The third display region is different from the first display region and the second display region. In some embodiments, windows displayed in the third display region need first to be activated and displayed in the first display region in order to interact with or manipulate content of the respective window. In some embodiments, if the one or more other windows of the second set of one or more windows are more than a predetermined number, some of the one or more other windows of the second set of one or more windows that do not fit in the third region (e.g., do not fit in the right strip) can be accessed in response to a selection of an affordance that is optionally displayed in the third display region (e.g., affordance 1020 in FIG. 10C). In some embodiments, windows that do not fit in the third display region are displayed or accessed in response to a gesture-based input. In some embodiments, if window groupings in the second display region are more than a predetermined number, some of the window groupings that do not fit in the second display region (e.g., left strip) can be accessed in response to a selection of an affordance that is optionally displayed in the second display region (e.g., affordance 1004 in FIG. 10C). In some embodiments, window groupings that do not fit the second display region are displayed or accessed in response to a gesture-based input.

Automatically dividing the display into functional regions (e.g., 524, 522, and 526) in response to activating the concentration mode, where one main interaction region is in the interactive mode and other regions are in the non-interactive mode (the left strip or an application switcher region, and/or the right strip or a window switcher region) allows a user to focus operations on a subset of windows displayed in the main interaction region while maintaining visibility and easy access to related and unrelated open windows (and/or grouped and/or ungrouped), thereby reducing the number, extent, and/or nature of inputs needed to manage multiple open windows from different applications in a limited screen area.

In some embodiments, prior to detecting the input selecting the representation of the second set of one or more windows (e.g. the second window grouping), the computer system displays (1818) the first set of one or more windows in the first display region in the interactive mode (e.g., the first set of one or more windows are displayed in the stage region 522) concurrently with a third set of one or more windows that are associated with the first set of one or more windows, wherein the third set of one or more windows are displayed in the non-interactive mode (optionally ungrouped) in the third region (e.g., the right strip 566*b*). After detecting the input, the representation of the first set of one or more windows displayed in the second display region in the non-interactive mode further includes the third set of one or more windows. For example, the second window grouping includes reduced scale representations of the first set of one or more windows and the third set of one or more windows (e.g., windows that were displayed in the main interaction region and windows that were displayed in a window switcher region).

In some embodiments, when concentration mode is active, a user can add more windows to the main interaction region (e.g., by selecting, dragging and dropping open windows from a different window grouping or from a separate virtual workspace to the stage region). In some embodiments, additional windows can be added to the window switcher region (e.g., by selecting a user interface element for minimizing a respective window from the stage region to a window switcher region). In some embodiments, adding windows to the main interaction region and the window switcher region associates the windows, such that the electronic device automatically groups the associated windows in the same window grouping. For example, windows in the main interaction region and windows in the window switcher region are grouped in response to a user switching to another application (e.g., by selecting an application icon from the dock or in response to switching to a different window grouping, if any is included in the application switcher region).

Automatically grouping together windows included in the main interaction region (e.g., the stage region 522) and windows included in the window switcher region (e.g., 556*b*) to the same window grouping reduces the number, extent, and/or nature of inputs needed from a user to perform an operation (e.g., to unclutter the screen and/or to search for relevant windows and/or manage multiple open windows).

In some embodiments, the representation of the second set of one or more windows corresponds (1820) to a first window grouping and windows included in the first window grouping are grouped at least partially in response to a prior user input, where the first window grouping includes a first window from a first application and a second window from a second application different from the first application (e.g., the first window grouping is a multi-application window grouping, such as window grouping 1724 in FIG. 17K). In some embodiments, when a user enters a concentration mode, initially, open windows are optionally grouped by application and, optionally, are displayed in the application switcher region that includes window groupings (e.g., left strip 566). Subsequently, a user can modify the composition of a respective grouping by selecting the grouping and adding and placing windows from different groupings on the stage region (e.g., via a drag and drop operation), thereby associating windows from different applications. For example, when a different window grouping is selected (or activated), the windows displayed in the stage region are added to a new, automatically generated grouping even though the windows are associated with more than one application. In some embodiments, when a user enters concentration mode, windows (e.g., open windows) can also optionally be grouped by application type (or other criteria).

Grouping together windows from different applications at least partially in response to a user input provides a user with further control over what windows are grouped and kept together (e.g., based on relevancy, or the need for multi-tasking between windows from different application), thereby providing additional control options without cluttering the UI with additional displayed controls.

While displaying the first window from the first application and the second window from the second application in the interactive mode and one or more other windows of the second set of one or more windows in the non-interactive mode, the computer system detects (1822) an input removing the second window from the first window grouping. In response to detecting the input removing the second window from the first window grouping, the computer system (automatically, e.g., without user input directed to the one or more other windows of the second set of one or more windows) removes at least one window from the one or more other windows of the second set of one or more windows that are associated with the second application. In some embodiments, if a window is removed from a multiple application window set so that application windows of one application remain in the stage region (e.g., without windows from other applications), other associated windows of the same application (the remaining ones) are displayed in the right strip without displaying windows of other applications, thereby decoupling a multiple application window grouping by removing windows of different applications from the stage region.

Decoupling a multiple application window grouping in response to user input removing windows from the stage region that are associated with different application reduces the number, extent, and/or nature of inputs needed to perform an operation (e.g., removing window representations from the window switcher region that are no longer relevant).

In some embodiments, the computer system adds (1824) the second window (the one removed from the first window grouping) to a third window grouping that includes a window from the second application. In some embodiments, an application window that is removed from the stage region is grouped with other windows associated with the same application. Automatically grouping an application window that is removed from the stage region with windows from a different window grouping (which includes windows of the same application that the removed window is associated with) reduces the number, extent, and/or nature of inputs needed to perform an operation (e.g., managing open windows).

The representation of the first set of one or more windows includes (1826) windows associated with a first application and the representation of the second set of one or more windows includes windows associated with a second application different from the first application. In some embodiments, when a user enters a concentration mode, initially, open windows are included in different window groupings (e.g., displayed in the "left stirp" 556) organized by application, such that windows associated with the same application are added to the same window grouping. Automatically grouping windows by application reduces the number, extent, and/or nature of inputs needed to perform an operation (e.g., managing open windows from multiple applications included in a virtual workspace).

In some embodiments, the representation of the second set of one or more windows corresponds to a first window grouping and the representation of the first set of one or more windows corresponds to a second window grouping. Prior to detecting the input selecting the representation of the first window grouping, the computer system displays (1828) one or more representations of windows of a third set of one or more windows concurrently with the first set of one or more windows and the first window grouping, wherein the third set of one or more windows are associated with the first set of one or more windows and the third set of one or more windows are displayed in the non-interactive mode in a third display region different from the first display region and the second display region. In response to detecting the input selecting the representation of the first window grouping and in accordance with a determination that the second set of one or more windows were displayed in the interactive mode (e.g., all windows of the second set were all displayed in the interactive and no windows included in the second set of one or more windows were displayed in the non-interactive mode) when the second window grouping was active, the computer system redisplays the second set of one or more windows in the interactive mode in the first display region (e.g., stage region 522) without displaying representations of windows in the third display region (e.g., right strip **556*b*). For example, windows that were displayed in the stage region before deactivation of a grouping are redisplayed in the stage region after reactivation of the grouping. In some embodiments, if a first subset of the second set of one or more windows were displayed in the interactive mode and a second subset of the second set of one or more windows were displayed in the non-interactive mode prior to detecting the input selecting the representation of the first window grouping, then the first subset of the second set of one or more windows are redisplayed in the interactive mode and the second subset of the second set of one or more windows are displayed in the non-interactive mode in response to detecting the input selecting the representation of the first window grouping. For example, windows that were displayed in the stage region before deactivation of a grouping are redisplayed in the stage region after reactivation of the grouping and windows that were displayed in a window switcher region (e.g., right strip 556*b*) before deactivation of a grouping are redisplayed in the window switcher region after reactivation of the grouping. Ceasing to display a window switcher region (e.g., right strip 556*b***) if there are no relevant windows that are associated with windows in the stage region provides for efficient viewing and interacting with a plurality of user windows on the same screen or virtual workspace, thereby reducing the number of inputs needed to perform an operation.

In some embodiments, a first window (e.g., 738, FIG. 7I) of the second set of one or more windows is associated with a first application (e.g., the first window can be an open document associated with a text editing application, an open window associated with an email application window, an open window associated with a message application, and/or open windows associated with other applications). While displaying the first window in the interactive mode (e.g., while displaying the first window in the stage region where content of the window can be manipulated), the computer system detects (1830) an input (e.g., 740, FIG. 7I) opening a second window. For example, an input opening a second window is an input directed to an application launch icon of the first application, an input directed to a menu option in the first window for opening another window of the same kind (e.g., an input selecting a "Compose Message" affordance in window 738), an input directed to a menu option in the first window for opening a child window, and other inputs that cause the opening of a new window associated with the same application. In response to detecting the input opening the second window and in accordance with a determination that the second window is associated with the first application and that the second window is a sibling window of the first window, the computer system replaces a display of the first window in the interactive mode with a display of the second window in the interactive mode (e.g., an embodiment in which window 744 replaces window 738 in stage region 522 in FIG. 7J). In some embodiments, the first window and the second window are siblings if the first window and the second window belong to the same level (e.g., hierarchy), such as application main windows. For example, if the first window is a document, a sibling window is also a document (e.g., newly open). In some embodiments, sibling windows can share the same parent window, if any; and/or sibling windows belong to the same application and are non-child windows of each other. In some embodiments, closing one sibling window does not close the other sibling window(s) that are displayed in the interactive mode and/or minimizing a sibling window does not minimize other sibling window(s) that are displayed in the interactive mode. In some embodiments, if the two sibling windows are displayed concurrently in the interactive mode (e.g., in the stage region) and the first window is the active window for the associated application, if the first window is closed, the second window becomes the active window for the application (e.g., closing window 744 causes window 738 to become active in FIG. 7J).

In some embodiments, display of the first window is maintained and the first window is displayed in the non-interactive mode in the third region (e.g., display of the replaced sibling window is maintained, e.g., by adding the replaced sibling window to a window switcher region such as right strip 556*b* in FIG. 7O). For example, the first window (e.g., 750, FIG. 7N) is not minimized, dismissed, or hidden and is instead displayed, e.g., as a reduced scale representation, in the third region (e.g., right strip 556*b*, FIG. 7O), where if selected would replace the second window in the interactive mode. In some embodiments, when the second set of one or more windows are associated with the same application (e.g., word processor windows in stage region area 522 and right strip 556*b* in FIG. 7G), and a new window associated with a different application is open (e.g., mail windows via user input 734, FIG. 7G) while the second set of one or more windows are displayed in the interactive mode (e.g., mail windows are opened via user input 734 while word processor windows are open in stage region 522 and right strip 556*b*, FIG. 7G), the second set of one or more windows cease to be displayed in the interactive mode and are automatically included in a window grouping representation (e.g., word processor windows moved to left strip 556, FIG. 7H). For example, launching a new application (e.g., mail application) that is different from the application of the windows displayed in the stage region and/or right strip (e.g., word processor application) causes the device to automatically remove the windows that are currently displayed in the stage region and/or right strip (e.g., remove the word processor windows), place those windows in a window grouping in the left strip where their respective content is not available for manipulation, and display a window of the newly launched application in the interactive mode (e.g., place a mail window in the stage region 522, FIG. 7H).

Automatically replacing an application window (e.g., without user input directed to the application window being replaced), which is displayed in the interactive mode (e.g., in the stage region 522) with a sibling window in response to opening the sibling window, reduces the number, extent, and/or nature of inputs needed to perform an operation (e.g., switch between sibling windows and/or manage open windows). Further, the computer system optionally maintains visibility of the replaced window, (e.g., by displaying the replaced window in non-interactive mode in a window switcher region), thereby reducing number, extent, and/or nature of inputs needed to perform an operation (e.g., switch between windows and/or find open windows).

In some embodiments, in response to detecting the input opening the second window, and in accordance with a determination that the second window is associated with the first application and that the second window is a child window of the first window (e.g., the first window is a parent of the second window, such that if the parent window is closed the child window is also closed and if the child window is closed the parent window is not closed), the computer system concurrently displays (1832) the second window and the first window in the interactive mode. In some embodiments, the second window can be displayed overlaying the first window (e.g., a pop-up window). For example, if the first window is a main window for a Mail application, the second window can correspond to a Compose New Email window that is displayed on top of the main window in response to an input directed to a menu option in the main window (e.g., 744 is displayed on top 738 in FIG. 7K). Displaying a child window in the main interaction region concurrently with a respective parent window of the child window, in response to opening the child window, reduces the number, extent, and/or nature of inputs needed to perform an operation.

While concurrently displaying the one or more of the second set of one or more windows in the interactive mode in the first display region (e.g., 902 and 908 in FIG. 9G) and the representation of the first set of one or more windows in the non-interactive mode in the second display region (e.g., 916, FIG. 9G), the computer system detects (1834) a second user input (e.g., 914, FIG. 9G) that corresponds to a request to insert a first window of the first set of one or more windows in the first display region. In some embodiments, the second display region includes representations of window groupings (e.g., strip 556, FIG. 9G), including the representation of the first set of one or more windows that corresponds to a second window grouping. In some embodiments, the second user input corresponds to an input that drags a first window representation from the second window grouping and drops the first window representation in the first display region (e.g., optionally on top of other windows displayed in the stage region or at an unoccupied location within the stage region) (e.g., input 914, FIGS. 9G-9J). In response to detecting the second user input, the computer system associates the first window with the second set of one or more windows, and displays the first window concurrently with the one or more of the second set of one or more windows in the interactive mode.

In some embodiments, a window can be dragged from a representation of a window grouping displayed in a sidebar (e.g., the left strip 566) and dropped in the stage region, thereby associating the dragged window with windows in the stage region (and/or any windows in the right strip 566*b* or other window switcher region). In some embodiments, in response to detecting the second user input that drags the first window out of the second window grouping (e.g., input 914, FIGS. 9G-9J), the first window is dissociated from the second window grouping, such that the second window grouping no longer includes a representation of the first window (e.g., window grouping 916 in FIG. 9G no longer includes the "Fiction Stories" representation in FIGS. 9H-9J). Also, in response to the second user input, the first window is associated with the second set of one or more windows, such that if a different window grouping is selected (such as the second window grouping), the first window and the second set of one or more windows would be added automatically to the same window grouping.

Dragging a window from a representation of window grouping displayed in a sidebar (e.g., left strip 566) to the main interaction region (e.g., the stage region), automatically associates the dragged window with windows displayed in the main interaction region and optionally automatically disassociates the dragged window with windows in the window grouping from which it is dragged, thereby reducing the number, extent, and/or nature of inputs needed to perform an operation (e.g., manage multiple open windows from different applications in a limited screen area).

In some embodiments, the second display region (e.g., the left strip 566) includes (1836) representations of a plurality of window groupings (e.g., window groupings 604*a*-612*a*), including the representation of the second set of one or more windows or the representation of the first set of one or more windows. Concurrently displaying multiple different representations of groups of windows in the same region (e.g., the left strip 566) provides for efficient viewing and interacting with multiple open windows from different applications on the same limited display area without the need to manually group windows, thereby reducing the number, extent, and/or nature of inputs needed to perform an operation.

In some embodiments, the representations of the plurality of window groupings are (1838) displayed in the second display region (e.g., left strip 566) in an order sorted by recency of use of the plurality of window groupings (e.g., according to "recency policy" described in FIGS. 6A-6B). In some embodiments, the display order of the window groupings in the second display region corresponds to (e.g., reflects) an order in which the plurality of groupings have been most recently used, accessed, activated, or selected for interaction. For example, windows displayed in the interactive mode in the main interaction region (e.g., stage region) and/or any windows that are related to or associated with the windows in the stage region (e.g., windows displayed in a window switcher region, e.g., right strip 566*b*) are automatically grouped into a respective window grouping and removed from the first display region (and the third display region) in response to detecting an input selecting a different window grouping from the second display region. Automatically displaying multiple window groupings in an order that corresponds to (e.g., reflects) an order in which the multiple window groupings have been most recently accessed or activated, enhances the operability of the device, and makes the user interface more efficient (e.g., by organizing multiple open windows from different applications, which reduces the number of inputs needed to find open windows).

In some embodiments, a first window grouping of the plurality of window groupings include windows of a first application, and a second window grouping of the plurality of window groupings include (1840) windows of a second application different from the first application. In some embodiments, in accordance with a determination that a concentration mode is activated, open windows (e.g., a subset of open windows or all open windows) are automatically (e.g., without further user input) grouped by application. For example, in accordance with a determination that open windows are associated with one application, a single window grouping is created with all those open windows in response to activating the concentration mode. In accordance with a determination that windows of more than one application are open at the same time, a window grouping is created for each application that has at least one window that has been open. In some embodiments, open windows are grouped by application (representation of window groupings show in strip 566 in FIGS. 7A-7D). Automatically grouping open windows by application in response to activating the concentration mode reduces the number of inputs needed to perform an operation (e.g., manage multiple open windows from different applications in a limited screen area).

In some embodiments, windows included in a first window grouping are grouped (1842) at least partially in response to a prior user input, wherein the first window grouping includes a first window from a first application and a second window from a second application different from the first application (e.g., 1724, FIG. 17K). In some embodiments, in response to activating a concentration mode, initially, open windows are optionally grouped by application type and, optionally, displayed in the second display region (groupings in left strip 556 in FIG. 9A). Subsequently, a user can modify the composition of a respective window grouping by selecting the window grouping (e.g., 906, FIG. 9A), adding and placing windows from different window groupings on the stage region (e.g., via a drag and drop operation, adding messages window 908 to stage region 522 in FIGS. 9B-9D), thereby associating open windows from different applications, such that when a different window grouping is selected (or activated to be displayed in the stage region), the windows associated together in the stage region in response to a user input are added to a new, automatically generated window grouping (e.g., a window grouping including messages window 908 and browser window 902 in FIG. 9D). In some embodiments, associating windows from different applications in the stage region causes the associated windows to be grouped in the same window grouping even if those windows are associated with different applications (e.g., a window grouping including messages window 908 and browser window 902 in FIG. 9D). Grouping windows at least partially in response to prior user inputs (e.g., allowing a user to change composition of a window grouping by adding windows from different applications to the stage region) provides additional control options without cluttering the UI with additional displayed controls.

In some embodiments, the first set of one or more windows correspond to a first window grouping and the second set of one or more windows corresponds to a second window grouping. While the first window grouping is active (such that windows of the first window grouping are displayed in the interactive mode, e.g., in the stage region or main interaction region), the computer system displays (1844) a representation of the second window grouping in a display region for switching window groupings that includes representations of a plurality of window groupings (e.g., the left strip). The computer system further detects an input directed to the region for switching window groupings. In some embodiments, the input directed to the region for switching window groupings corresponds to a scroll input, such as a swipe gesture, within the region for switching window groupings, or a tap or selection of an overflow selectable user interface object/element (e.g., 1004, FIG. 10A). In response to detecting the input directed to the region for switching window groupings, the computer system displays the representations of the plurality of window groupings, including previously undisplayed representations included in the display region for switching window groupings (e.g., 1006 in FIG. 10B). Revealing previously undisplayed representation of window groupings (e.g., in response to a scrolling input or an input activating an affordance) provides for efficient viewing and interacting with multiple window groupings displayed on the same screen, thereby reducing the number of inputs needed to perform an operation.

In some embodiments, the first set of one or more windows and the second set of one or more windows are associated (1846) with a first virtual workspace that operates in a concentration mode. In some embodiments, in response to activating concentration mode, a virtual workspace or a desktop that includes multiple open windows associated with different applications are automatically organized and decluttered (e.g., windows organized in transition between FIGS. 15A-15B). For example, open windows are removed from the stage region and are automatically organized into different window groupings (e.g., 556, FIG. 15B). In some embodiments, initially all open windows are removed from the stage region (e.g., including minimized windows, hidden windows, or windows that are running). In some embodiments, icons that are otherwise displayed in a normal mode are also temporarily hidden when concentration mode is activated (e.g., icon 1506 in FIG. 15A is hidden in FIG. 15B). In some embodiments, in the concentration mode, initially the windows are grouped by application (e.g., FIGS. 7A-7D). Subsequently, a user can change a window grouping composition by associating windows of different applications, e.g., by dragging and dropping windows from different groupings onto the stage region (e.g., adding window 908 to grouping with window 902 in FIGS. 9A-9D). Accordingly, in the concentration mode, a user can interact with or manipulate content of a subset of all open windows, while maintaining an overview of other open windows grouped by application or grouped at least partially in accordance with user inputs. Window groupings preserve the state of the windows in the stage region and any windows in the window switcher region (e.g., state of full-screen window 806 is preserved in FIG. 8J and recovered in FIG. 8L). Further, in the concentration mode, the appearance of the windows that are not displayed in the stage region are shrunk (decreased in size compared to the size of the windows in the stage region), so that windows associated with a respective virtual workspace fit on a single screen. In some embodiments, window representations included in window groupings are reduced to the same size (or approximately the same size). The size of window representations included in the groupings optionally does not depend on the number of windows included in the respective window grouping. In some embodiments, a window grouping can be expanded in response to a hover action over the respective grouping, such that windows within the grouping can be individually selected for interaction in the stage region. Automatically grouping open windows (e.g., by application, other criteria, or in response to user input) included in a respective virtual workspace in response to activating the concentration mode, reduces the number, extent, and/or nature of inputs needed to perform an operation (e.g., manage multiple open windows from different applications in a limited screen area).

In some embodiments, the computer system (1848) is associated with a plurality of virtual workspaces, including the first virtual workspace (e.g., 1527*h*, FIG. 15E) that operates in the concentration mode and a second virtual workspace (e.g., 1527*i*, FIG. 15E) that operates in a second mode different from the concentration mode. In some embodiments, an operating system of the computer system allows a user to divide a desktop environment into virtual workspaces (e.g., virtual desktops 1-3, 1527*h*-1527*j*, FIG. 15E) that can each operate in different modes. Organizing desktop environment into virtual workspaces or desktops compensates for limits of an area of the display, and/or reduces clutter that is associated with running multiple applications that have open windows. Examples of different modes include, but are not limited to, a full-screen mode, a split screen mode, a shared screen mode, a concurrent input mode, non-concurrent input mode, and a normal mode. In some embodiments, the full-screen mode is referred to a full-view. In some embodiments, the split-screen mode is referred to as a split-screen view. In some embodiments, in the "full screen" mode, a single window takes up substantially the whole area of a display area of the display generation component, where a desktop, a wallpaper, icons on the desktop and/or optionally toolbars are no longer visible (e.g., FIG. 8L). In some embodiments, a window displayed in full-screen mode takes up the available application display space, even if the system has reserved some portion of the display region for displaying system information (e.g., a status bar, menu bar, and/or dock/application launching interface). In some embodiments, in a "split screen mode", the display area of the display generation component is split by two windows (e.g., typically in equal sizes, but it does not have to be) that takes up substantially the whole area of the display generation component (e.g., the desktop is no longer visible) (e.g., 1102, 1104 in FIG. 11E; 1204, 1202 in FIGS. 12N-12Q). In some embodiments, in a "shared screen mode", the display area is shared by more than two windows and that takes up substantially the whole display area (e.g., the desktop is no longer visible) (e.g., 1402, 1404, and 1406 in FIG. 14T). In some embodiments, in a concurrent input mode, content of two or more windows can be manipulated in the stage region (e.g., when not in overlapping arrangement) (e.g., 1402, 1404, and 1406 in FIG. 14T). In some embodiments, in a non-concurrent input mode, windows in the stage region are overlapping and content or functionality of windows that are being occluded is not fully or completely available for manipulation unless the windows are brought to the foreground (e.g., FIGS. 12A-12K). In some embodiments, in a "normal mode," windows can be displayed on top of each other in different sizes, and/or portions of the desktop are visible, and/or icons on the desktop are visible, and/or toolbars or docks are visible, and/or windows can be resized and moved across the screen (e.g., without automatic decluttering or rearrangement) (e.g., FIG. 15A). In some embodiments, a user can switch between the different virtual workspaces (e.g., between virtual workspace 1527*h* and virtual workspace 1527*i* in FIG. 15E). For example, a user can toggle between different virtual workspaces in response to a key combination, by moving the focus selector to a particular area of the screen, or otherwise switch between the virtual workspaces (e.g., such as swipe gestures in different direction and/or with different number of fingers involved).

Organizing a desktop environment into virtual workspaces or desktops that can operate in different modes compensates for limits of an area of the display, and/or reduces clutter that is associated with running multiple applications that have open windows.

In some embodiments, while concurrently displaying, in a first user interface, the one or more of the second set of one or more windows in the interactive mode and the representation of the first set of one or more windows in the non-interactive mode (e.g., the second display region includes representations of window groupings, including the representation of the first set of one or more windows that corresponds to a second window grouping), the computer system detects (1850) a third user input that corresponds to a request to display an overview of the plurality of virtual workspaces. In some embodiments, the third input is performed using a focus selector, a touch-screen gesture, a voice command, a key combination on a keyboard, combination of different input modalities, and/or other means requesting display of the overview of the plurality of virtual workspaces. In response to detecting the third user input, the computer system ceases display of the first user interface without exiting the concentration mode, e.g., windows in the stage region and/or right strip, and window groupings in the left strip are no longer displayed, e.g., temporarily removed until a request to return to the first user interface is received/detected. Such a request to return to the first user interface can include selecting a representation of the first virtual workspace, selecting a dedicated user interface element or an affordance, or selecting a representation of one of the window groupings that is included in the first virtual workspace. Further, in response to detecting the third user input, the computer system concurrently displays in a second user interface (e.g., 1527, FIG. 15E), via the display generation component: a plurality of representations corresponding to the plurality of virtual workspaces; a second representation of the second set of one or more windows; a second representation of the first set of one or more windows; and a user interface element for enabling or disabling the concentration mode (e.g., a toggle affordance, such as 1528 in FIG. 15E). In some embodiments, a representation of a virtual workspace corresponds to a reduced scale representation of the virtual workspace, such as a snapshot of the screen where content and arrangement of windows and/or icons is preserved and visible (e.g., 1527*h* in FIG. 15E). In some embodiments, the second representation of the second set of one or more windows includes reduced scale representations of the second set of one or more windows grouped together or displayed in close proximity to each other, such as clustered or stacked window thumbnails (e.g., 1527*a*-1527*g* in FIG. 15E). In some embodiments, the second representation of the first set of one or more windows includes reduced scale representations of the first set of one or more windows grouped together or displayed in proximity to each other, such as clustered or stacked window thumbnails (e.g., 1527*a*-1527*g* in FIG. 15E).

In some embodiments, representations of active virtual workspaces can be displayed in a dedicated region, such as a top portion of the display, and the second representation of the second set of one or more windows and the second representation of the first set of one or more windows are displayed in a remaining area. In some embodiments, detecting a selection of the user interface element for enabling or disabling the concentration mode, and in response to detecting the selection of the user interface element, the computer system enables or disables the concentration mode (e.g., toggle between enabled or disabled state in response to the selection).

Displaying concurrently, in the same system user interface, multiple groupings of open windows associated with a currently active virtual workspace (e.g., 1527*a*-1527*g* in virtual workspace 1527*h*, FIG. 15E) and an overview of other virtual workspaces (e.g., 1527*i* and 1527*j* in FIG. 15E) allows a user to switch between different virtual workspaces (e.g., 1527*h*, 1527*i*, and 1527*j* in FIG. 15E), allows a user to change modes of operations of the different workspaces or to add windows or window groupings from one virtual workspace to another, thereby providing efficient viewing and interacting with multiple open windows associated with multiple different applications across multiple different virtual workspaces and reducing the number, extent, and/or nature of inputs needed to manage multiple open windows from different applications in a limited screen area.

In some embodiments, the concentration mode for a currently active virtual workspace is activated (1852) (or deactivated) from a system user interface for switching between different virtual workspaces (e.g., 1527 in FIG. 15E). In some embodiments, in the system user interface for switching between different virtual workspaces, open windows associated with the currently active virtual workspace can be displayed and grouped according to different modes. For example, the system user interface shows multiple or all open and unhidden windows, optionally grouped or ungrouped and optionally, where groupings can be based on application or application type (e.g., 1527*a*-1527*g*). In some embodiments, the system user interface shows opened windows according to an "app mode" (e.g., showing all open and minimized windows for a currently active application). In some embodiments, in the system user interface for switching between different virtual workspaces (e.g., interface 1527, FIG. 15E), open windows associated with the currently active virtual workspace (e.g., 1527*a*-1527*g* in virtual workspace 1527*h*) are displayed and grouped according a state in which the windows were displayed in the concentration mode, including multi-application groupings (e.g., groupings generated partially in response of user input, such as input that create a composite group consisting of windows from more than one application, e.g., 1724, FIG. 17I-17O). In some embodiments, in the system user interface for switching between different virtual workspaces, open windows can be grouped by application. In some embodiments, open windows that are displayed and grouped in the system user interface for switching between different virtual workspaces are concurrently displayed with representations of other (e.g., nonactive) virtual desktops (e.g., virtual desktops correspond to other available virtual workspaces).

Providing a user interface element for enabling/disabling concentration mode (e.g., affordance 1528 in FIG. 15E) for a currently active virtual workspace in the same system user interface that includes multiple groupings of open windows associated with the currently active virtual workspace and representations of other virtual workspaces, reduces the number, extent, and/or nature of inputs needed to perform an operation (e.g., reduces the number, extent, and/or nature of inputs needed to enter concentration mode as there is no need to open a settings user interface and open different menu options or settings categories to search for a away to change the mode of operation of a currently active virtual workspace).

In some embodiments, while displaying the system user interface for switching between different virtual workspaces and in accordance with a determination that the first virtual workspace that operates in the concentration mode is currently active (e.g., virtual workspace 1527*h* in interface 1527, FIG. 15E), the computer system displays (1854) the first set of one or more windows and the second set of one more windows according to a (preserved) state of the first set of one or more windows and the second set of one more windows in concentration mode (e.g., displays windows and representations in regions 522 and 556, respectively, in FIG. 15F). For example, states of the windows and corresponding groupings are preserved when the system user interface is activated or displayed, including any multi-application groupings (optionally at least partially, generated in response to user input) are preserved. In some embodiments, window groupings that are available in the first virtual workspace (e.g., 1527*a*-1528*g* in virtual workspace 1527*h*, FIG. 15E) are preserved and displayed in the system user interface for switching between different virtual workspaces (e.g., 1527, FIG. 15E). Further, in accordance with a determination that the second virtual workspace that operates in the second mode is currently active (e.g., 1527*i*, FIG. 15E), the computer system displays representations of window groupings generated by application that include a plurality of open windows associated with the second virtual workspace (e.g., window groupings associated with virtual workspace 1527*i*, FIG. 15E).

Preserving the state of open windows included in a virtual workspace (e.g., preserving how windows are grouped, corresponding overlaying or non-overlaying arrangements and layer order, what modes windows are displayed in, and preserving other ways windows are organized in the concentration mode), including mode of operation of the virtual workspace and window groupings, reduces the number, extent, and/or nature of inputs to perform an operation (e.g., manage multiple open windows from different applications in a limited screen area).

Figure 15C:
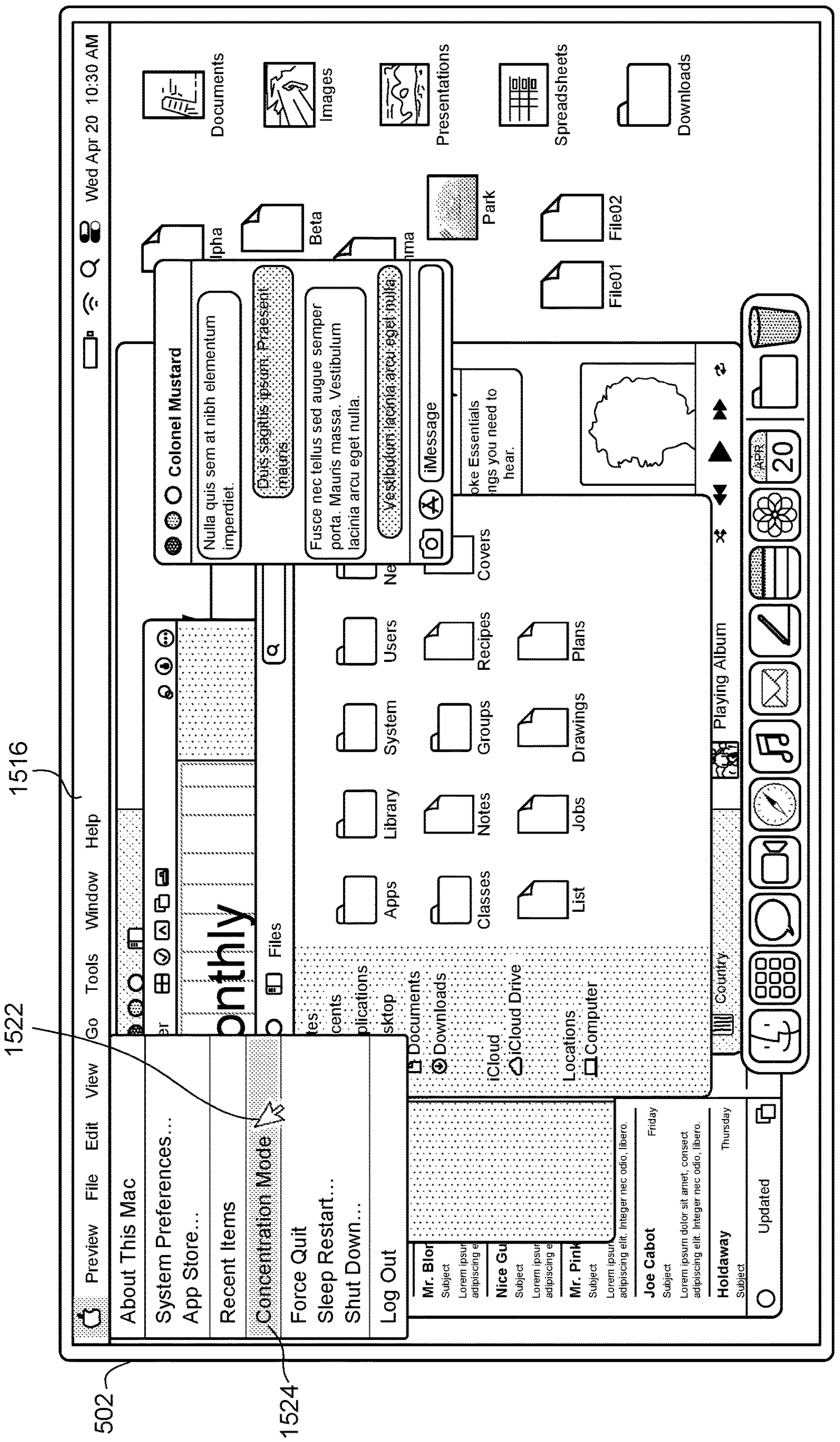
Figure 15D:
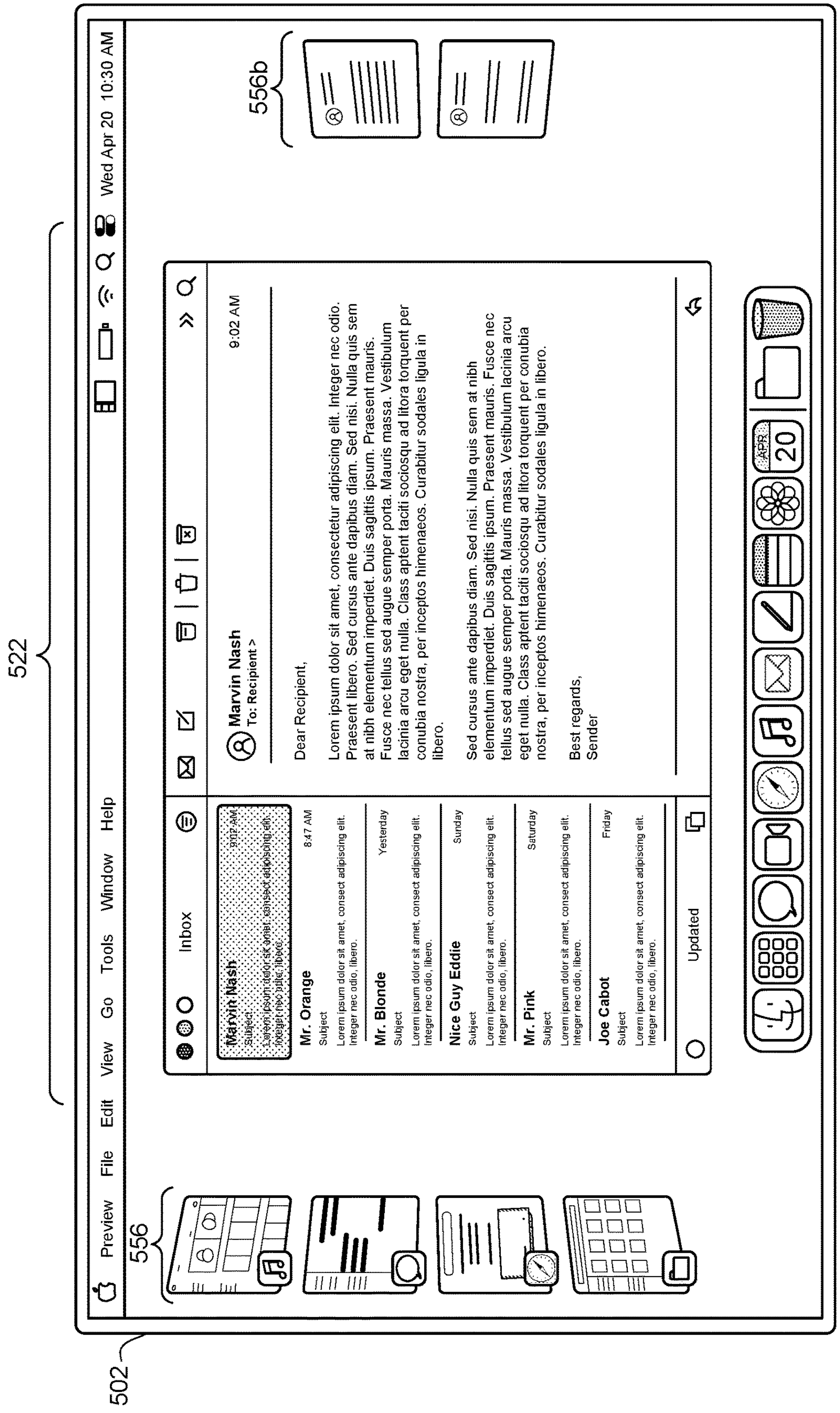
Figure 15E:
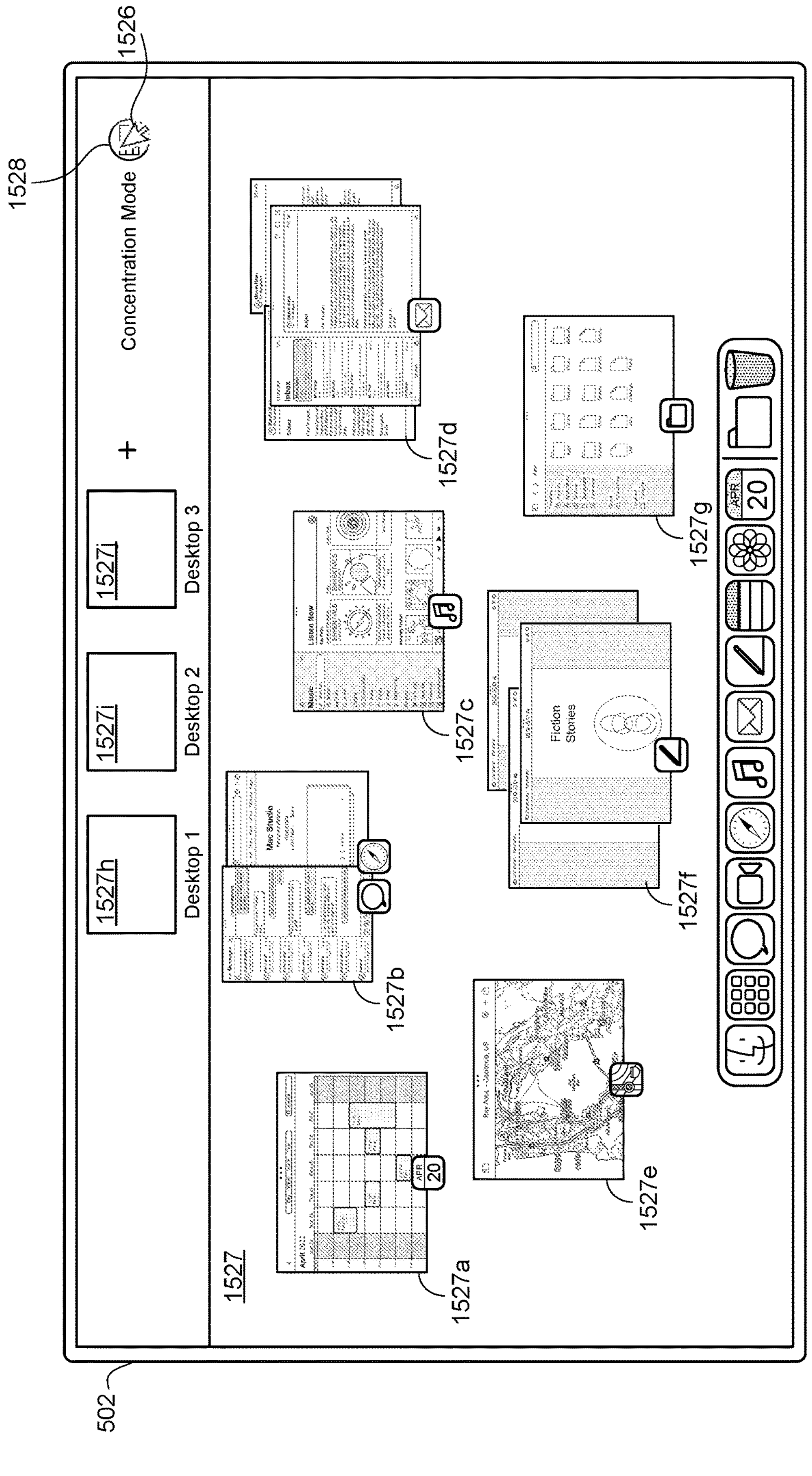
Figure 15F:
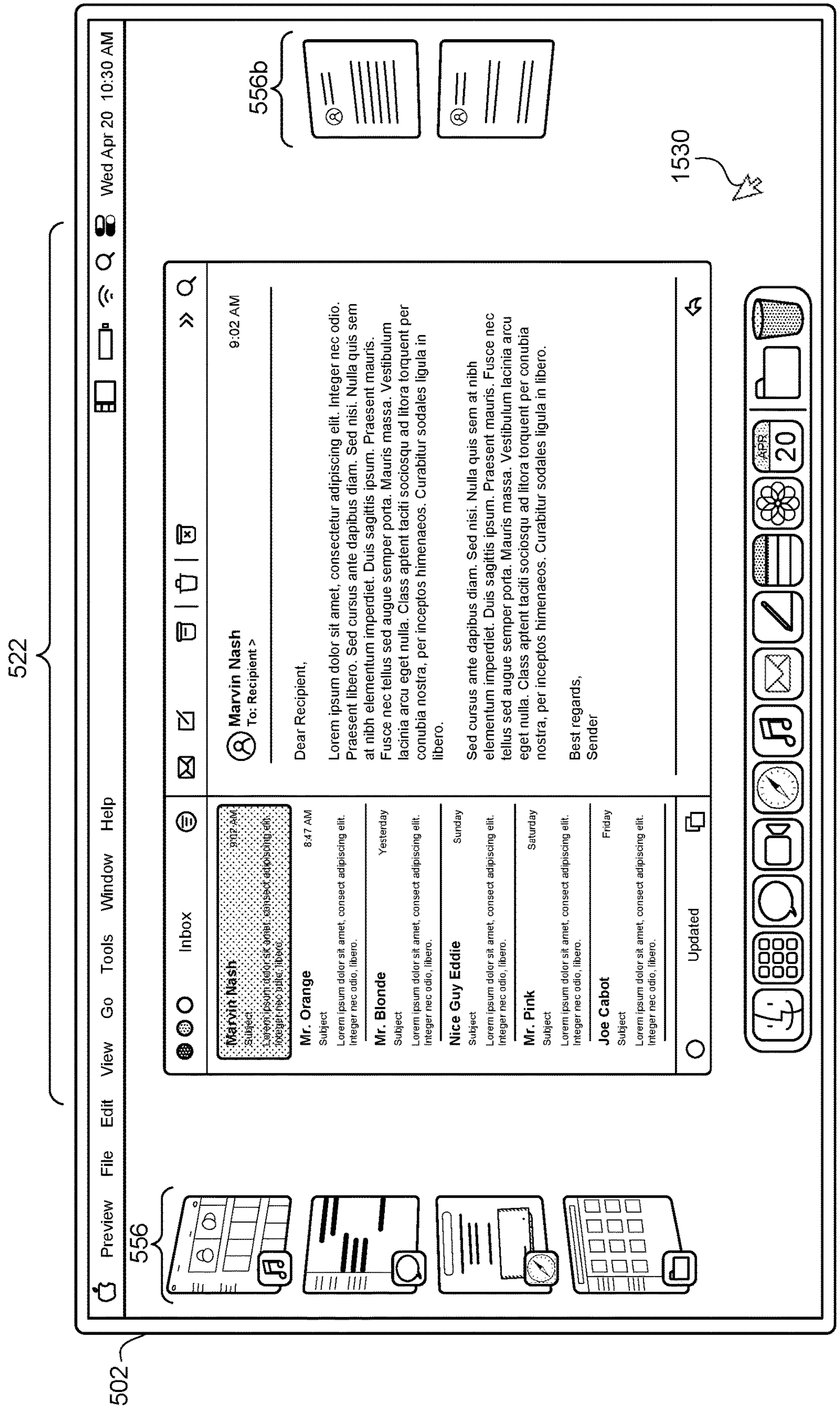
Figure 15G:
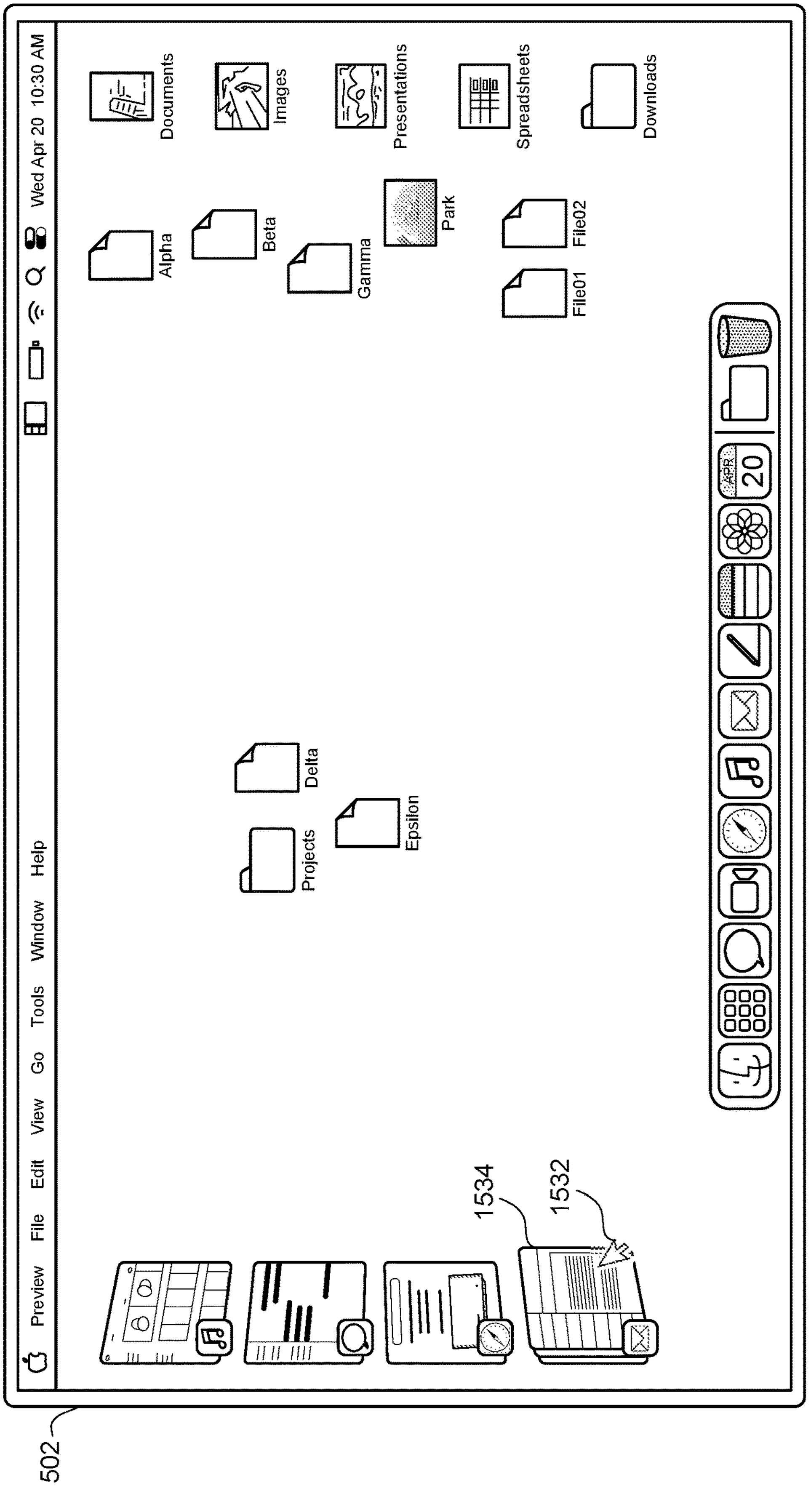
Figure 15H:
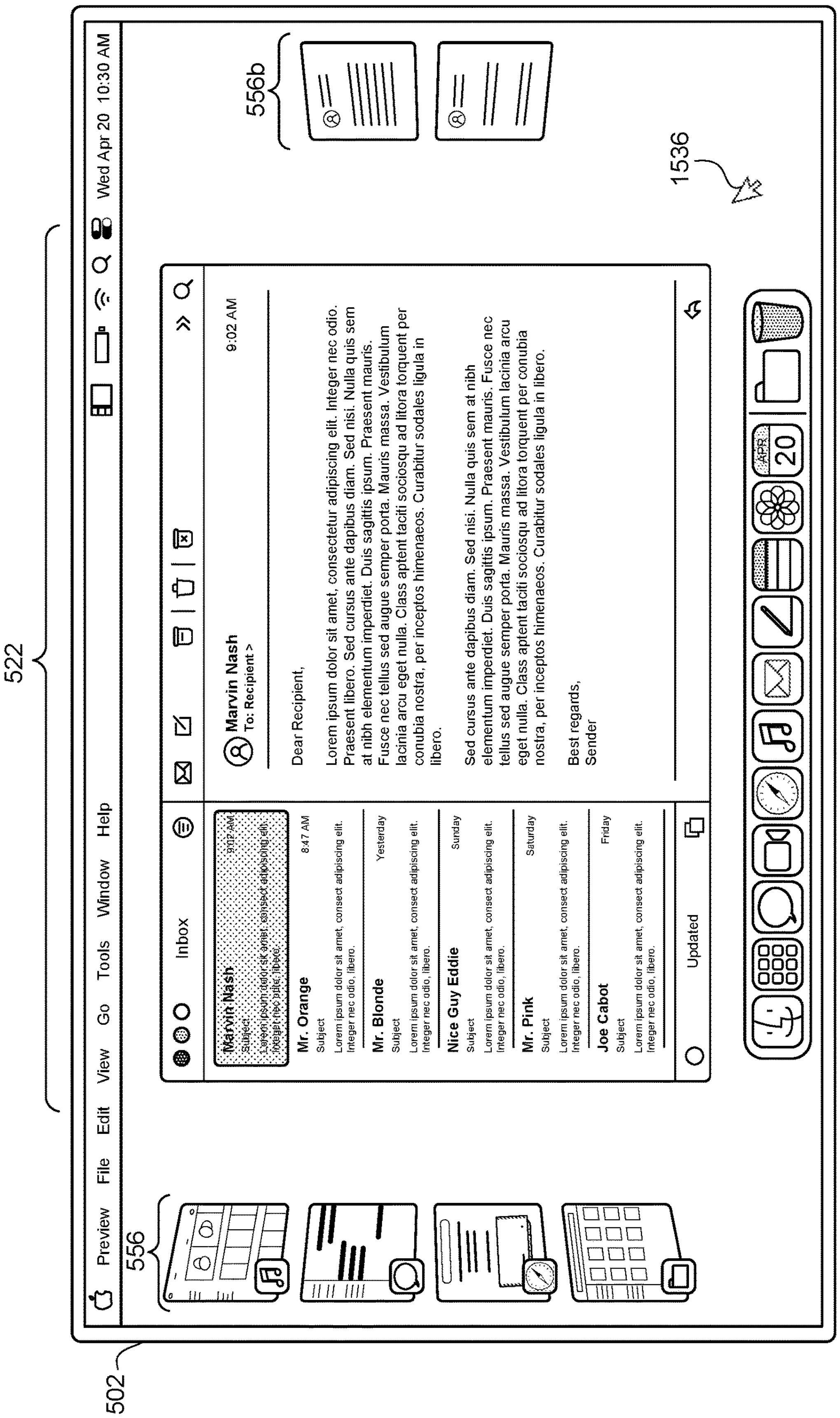
Figure 15I:
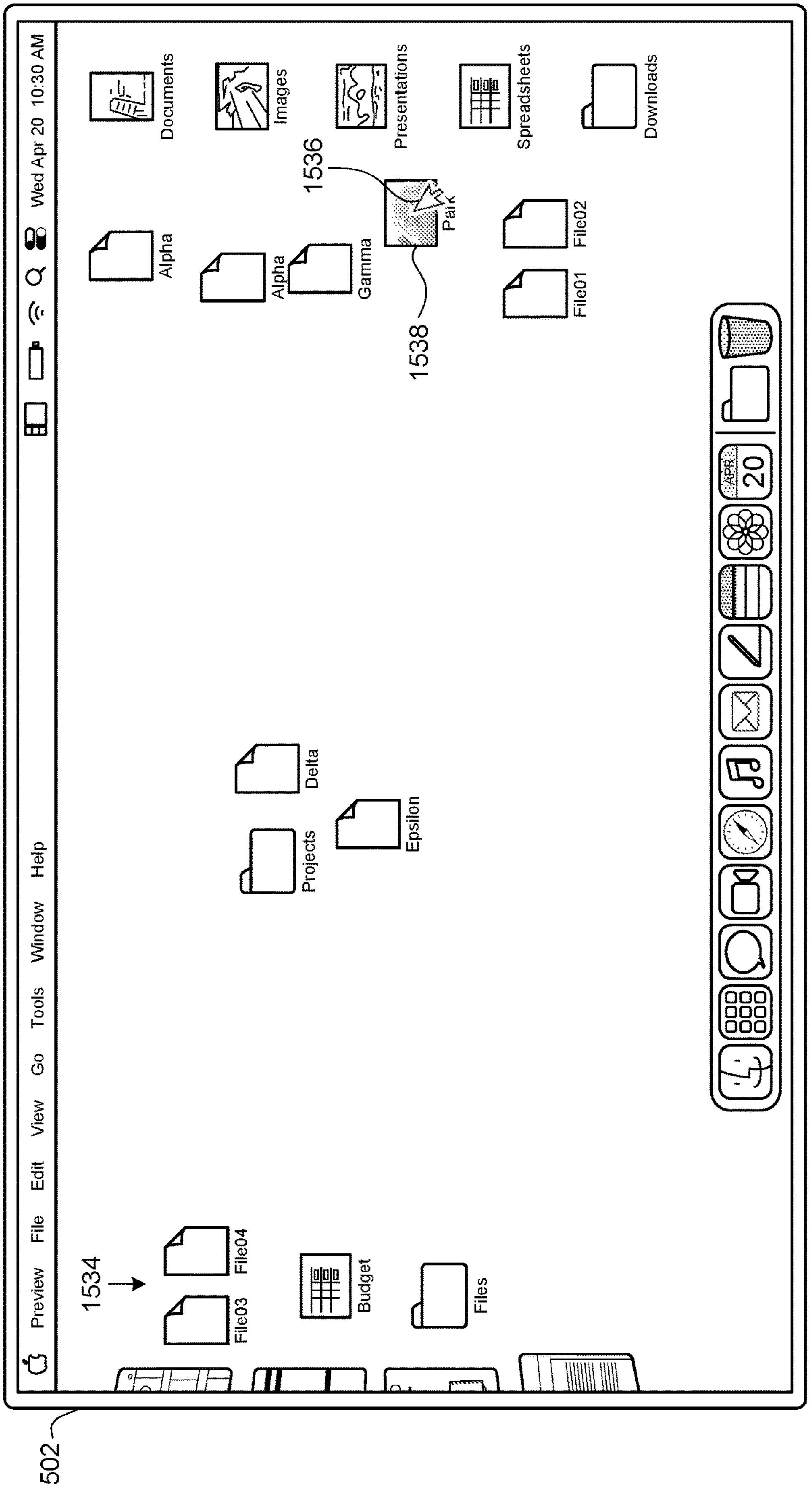
Figure 15J:
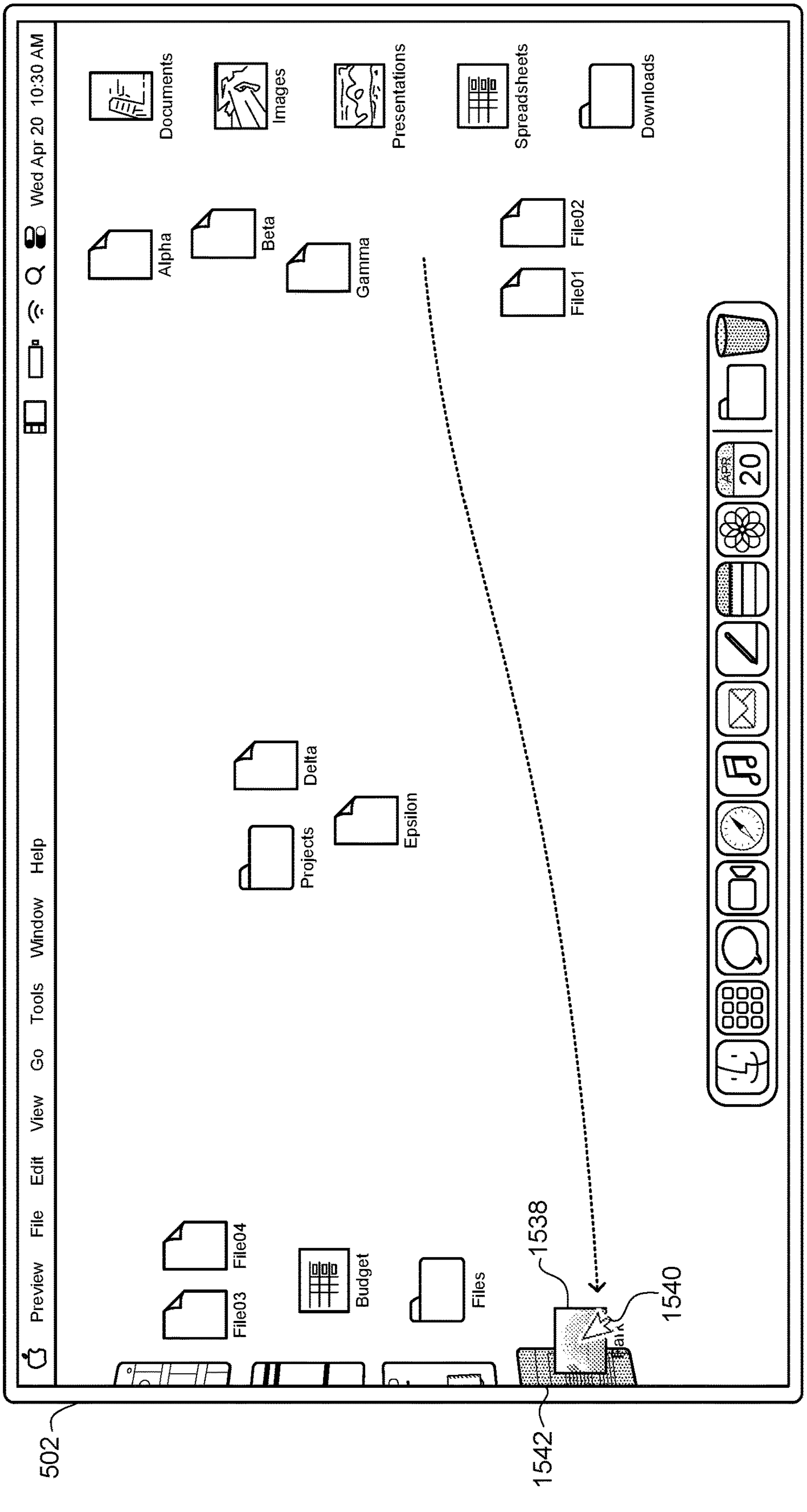
Figure 15K:
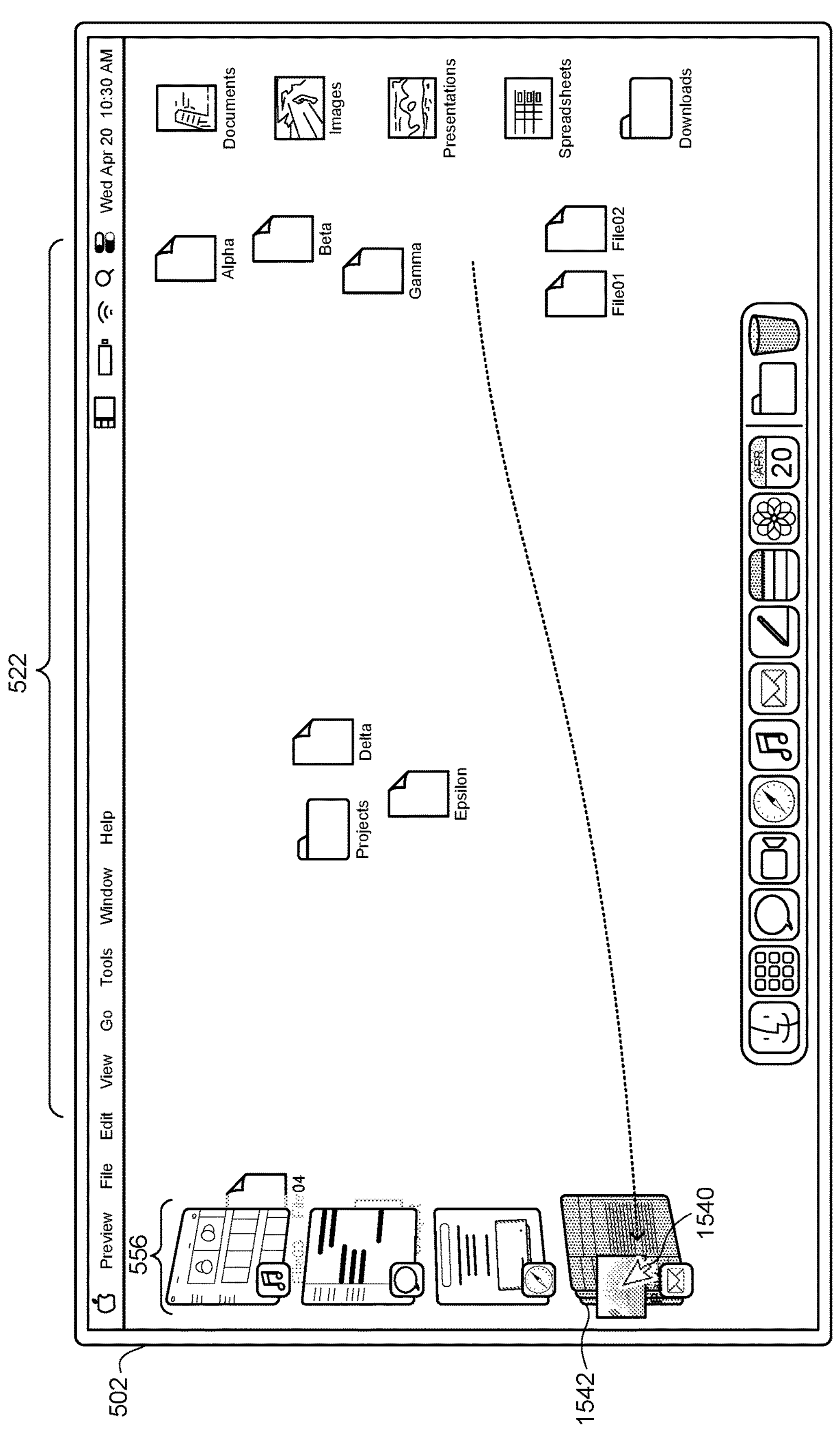
Figure 15L:
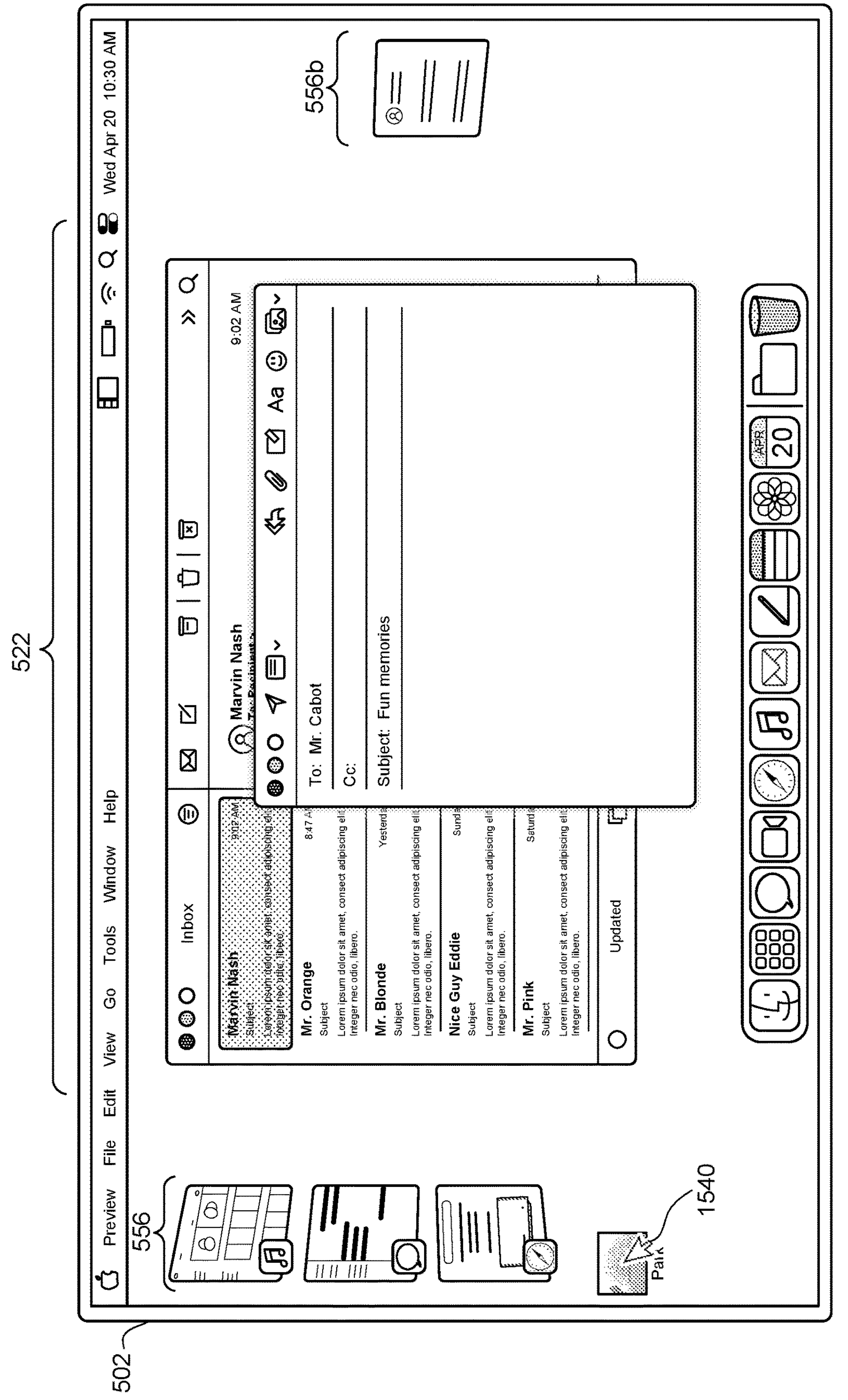
Figure 15M:
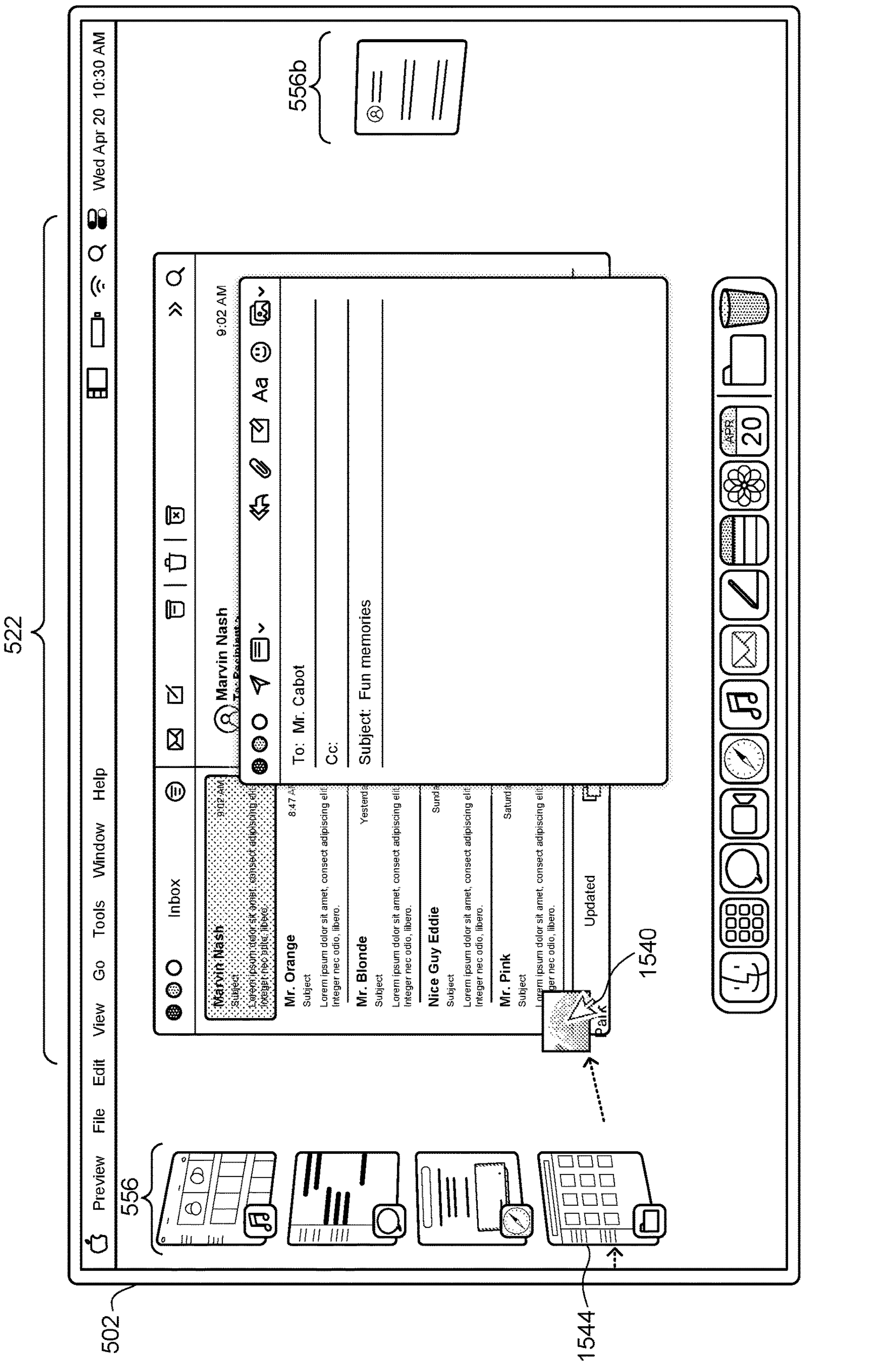
Figure 15N:
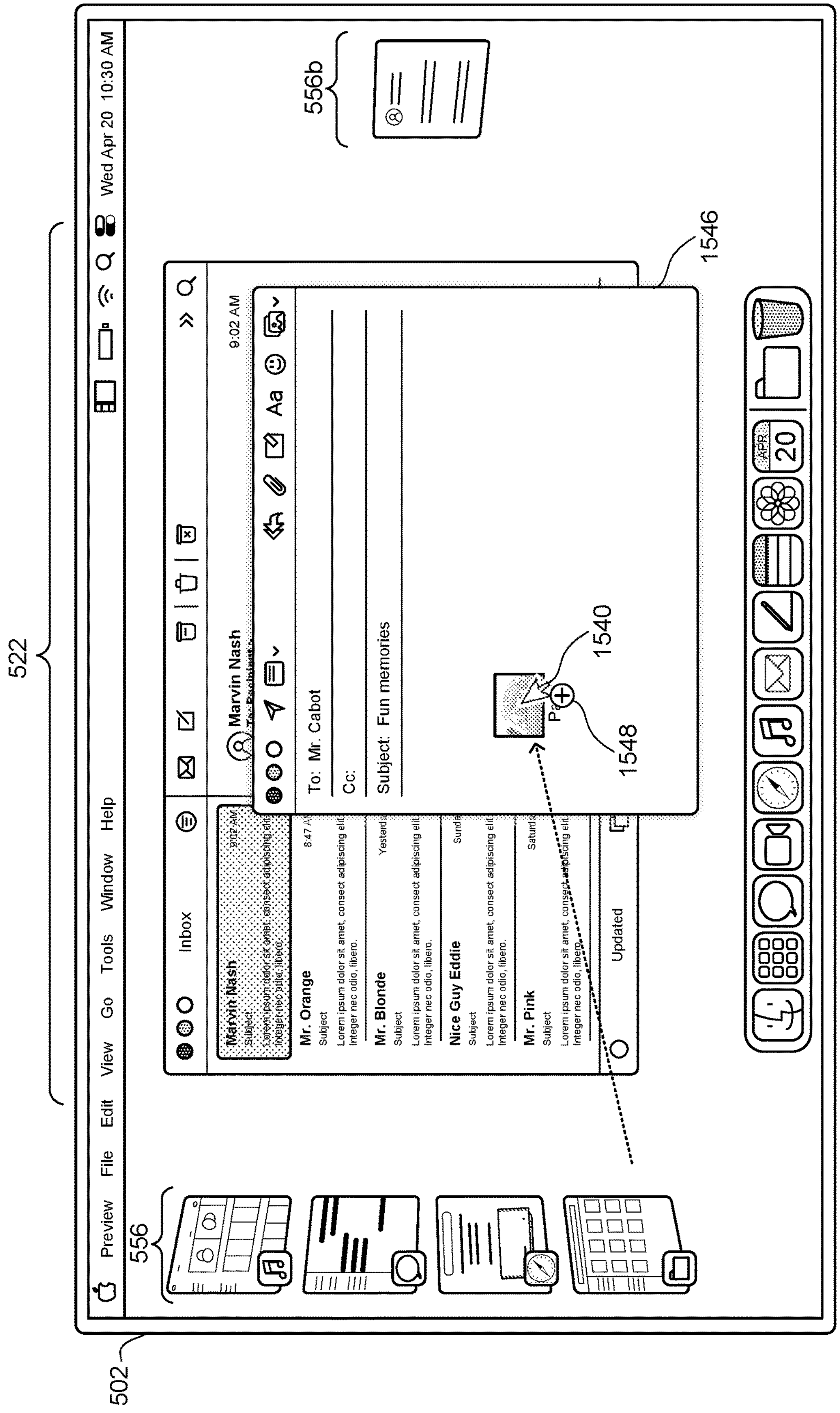
Figure 15O:
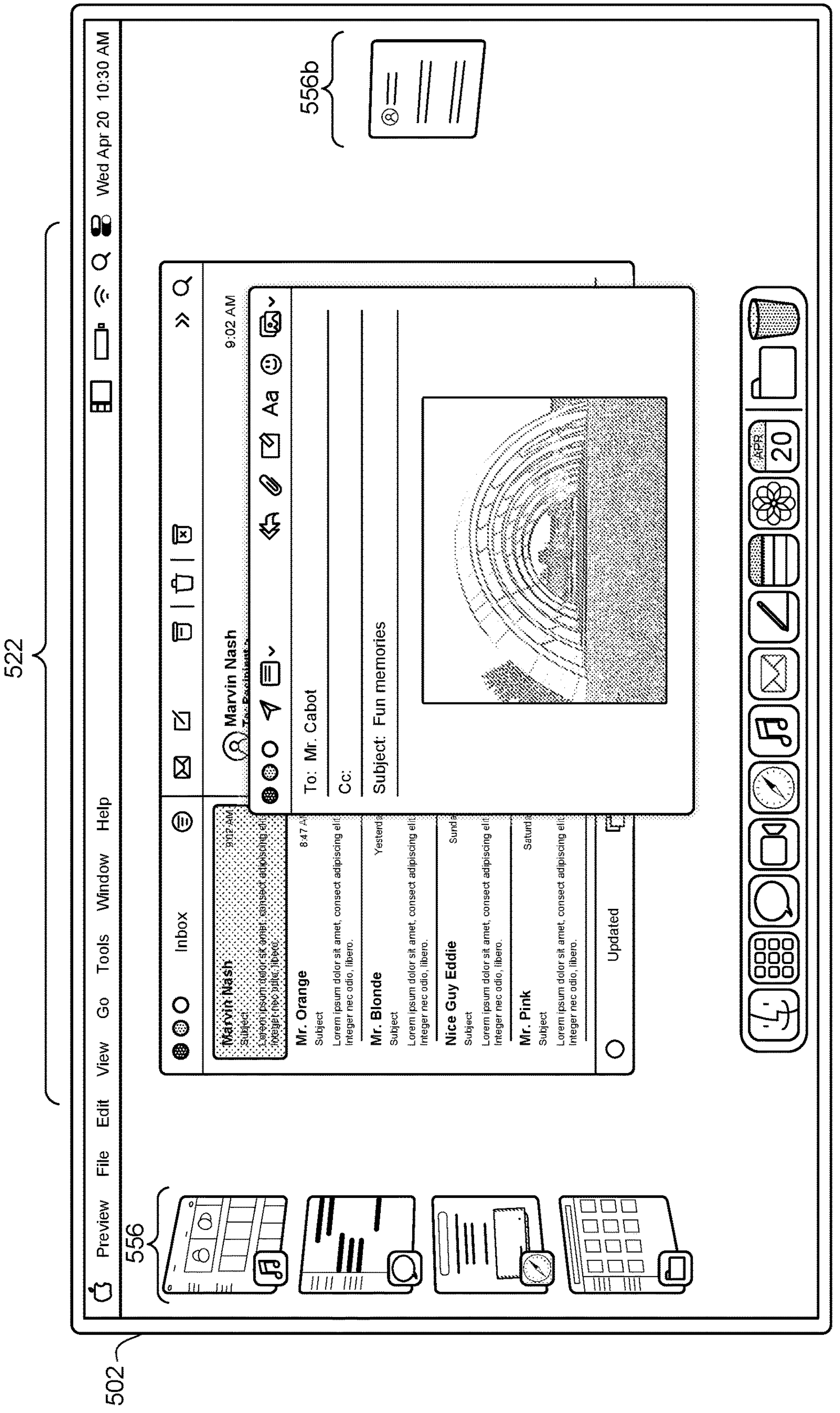
Figure 15P:
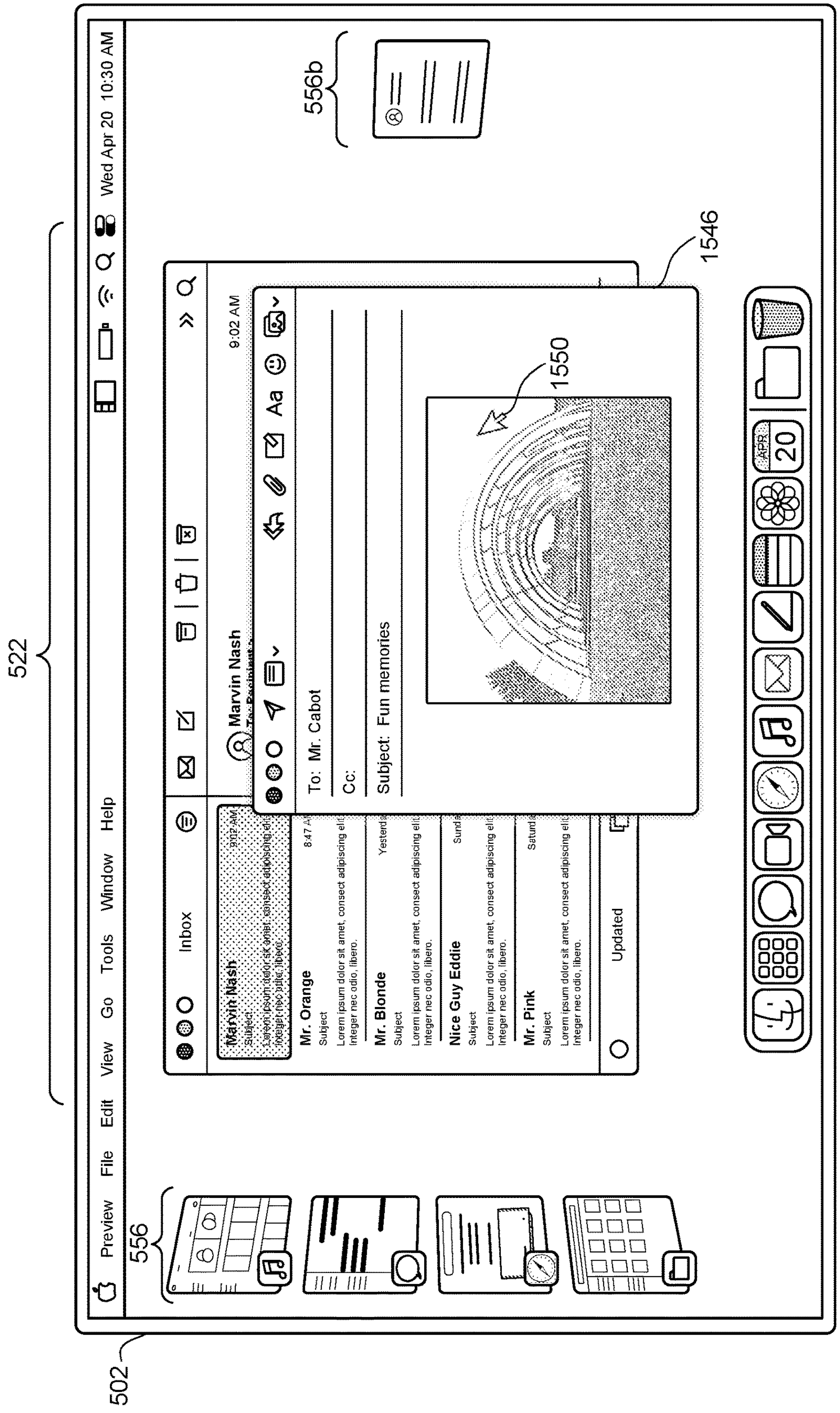
Figure 15Q:
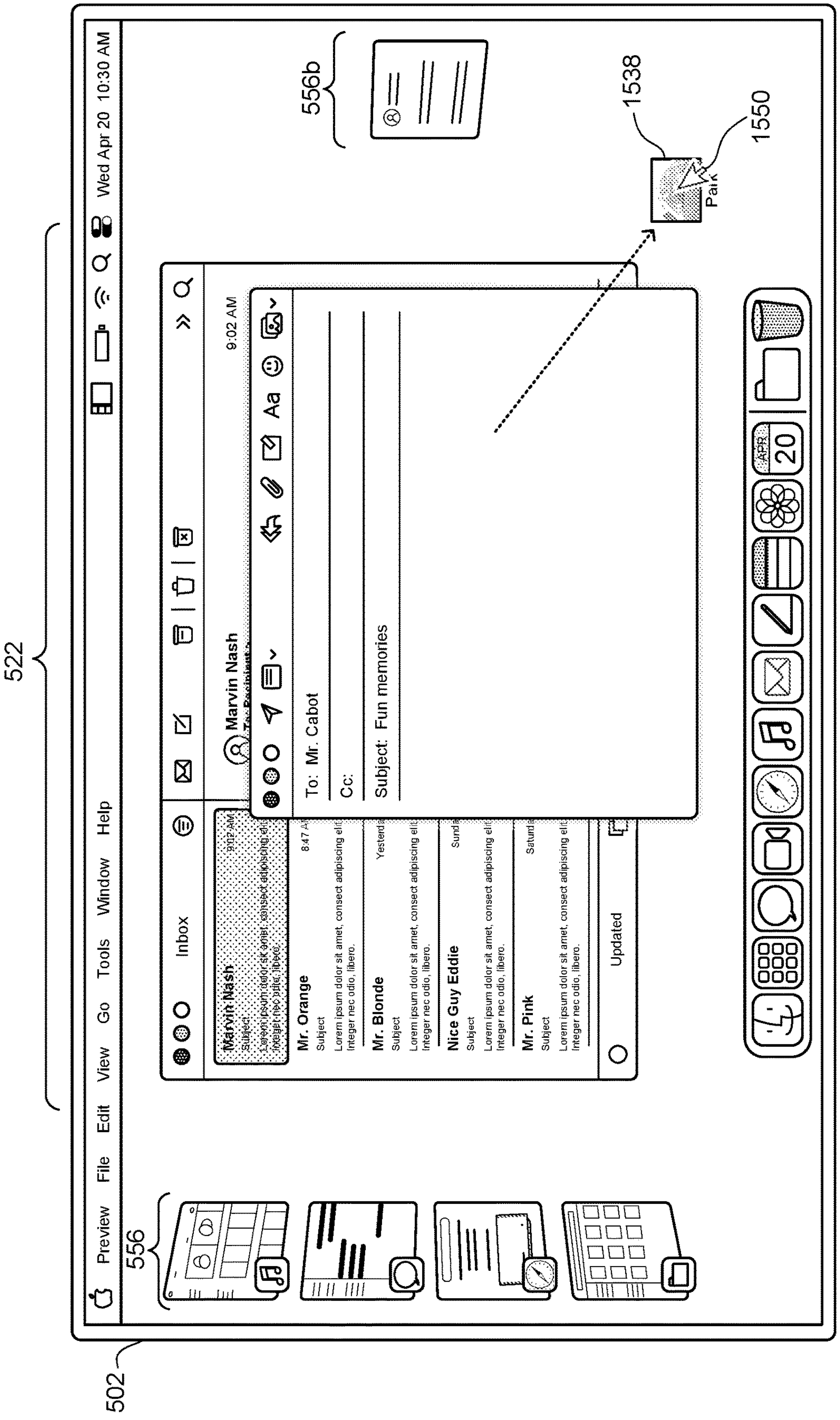
Figure 15R:
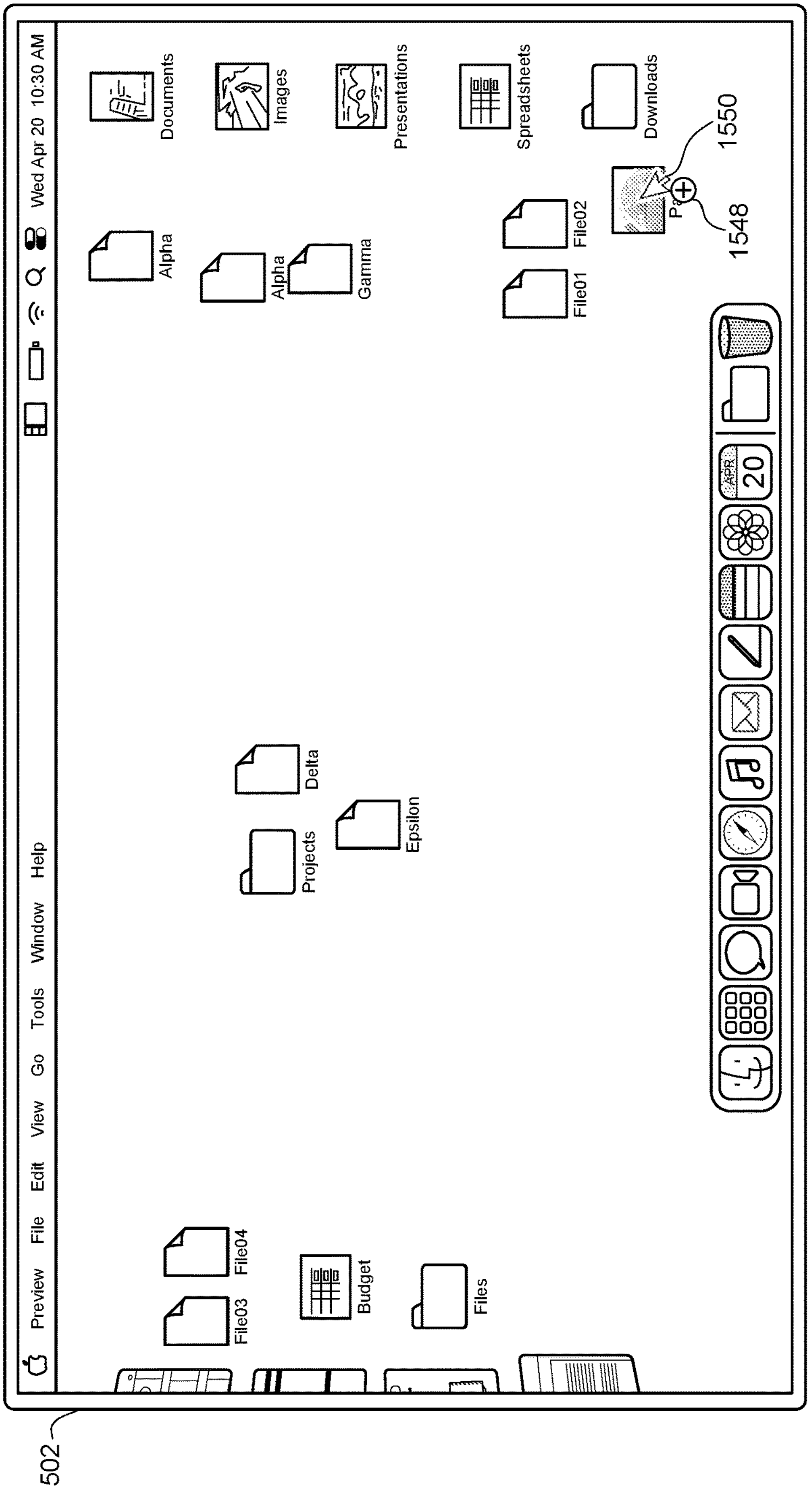
Figure 15S:
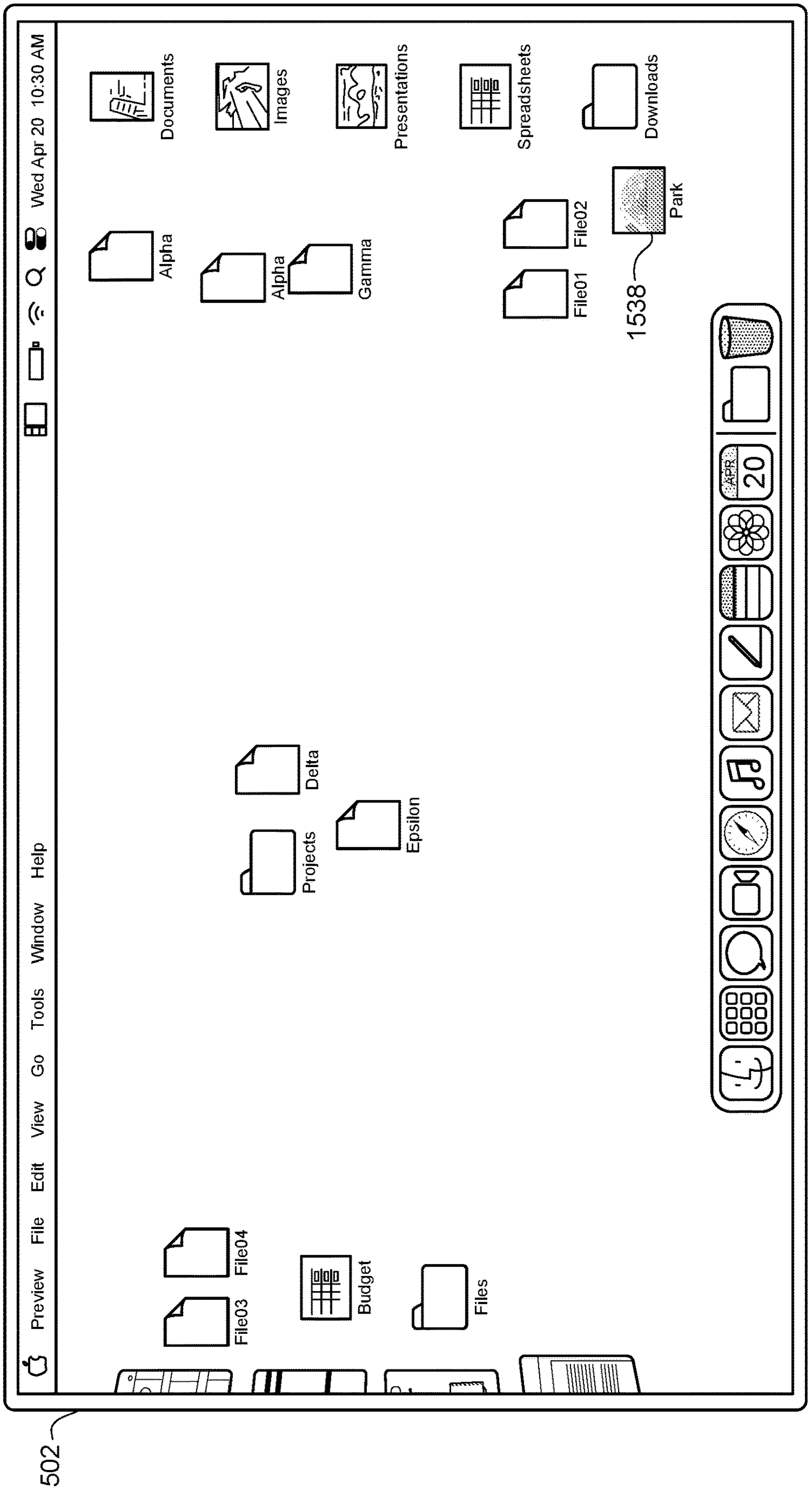

In some embodiments, the concentration mode for a currently active virtual workspace is activated (1856) (or deactivated) from one or more of a taskbar (e.g., 1516, FIG. 15A), a status bar, or a menu bar (e.g., 1524, FIG. 15C). In some embodiments, detecting a selection of a menu option included in a menu bar for enabling or disabling concentration mode is detected (e.g., 1524, FIG. 15C), and in response to detecting the selection of the menu option, enabling, or disabling the concentration mode. Providing a menu option for activating the concentration mode in a menu bar of a currently active virtual workspace reduces the number, extent, and/or nature of inputs needed to perform an operation (e.g., enter concentration mode for a particular virtual workspace).

In some embodiments, while the first virtual workspace (including the first set of one or more windows and the second set of one or more windows) operates in the concentration mode, the computer system detects (1858) an input selecting an application icon associated with a respective application (e.g., 1736, FIG. 17L), where the application icon is displayed in a sidebar. For example, application icons can be displayed near or over window groupings displayed in the left strip, identifying what applications are executing the windows included in the window groupings (e.g., 1236, FIG. 17L). In response to detecting the input selecting the application icon associated with the respective application, the computer system displays a plurality of application windows associated with (or executed by) the respective application (e.g., 1740, 1742, 1744 in FIG. 17M). In some embodiments, the plurality of application windows are displayed in the stage region or a main interaction region in an interactive mode (e.g., 1750, FIG. 17O). In some embodiments, the plurality of application windows are displayed in a region different from the main interaction region. In some embodiments, the plurality of window are displayed at a reduced scale representation and/or in an inactive state (e.g., 1740, 1742, 1744 in FIG. 17M). In some embodiments, the application icon is associated with a respective window grouping (optionally displayed in proximity to the respective window grouping). In some embodiments, the plurality of windows that are displayed are windows associated with the respective application included in the respective window grouping associated with the application icon (e.g., without displaying windows included in the respective grouping that are associated with a different application, if the respective window grouping is a multi-application window grouping). In some embodiments, displaying the plurality of windows associated with respective application in response to selecting the application icon includes replacing representation of window groupings displayed in the left strip with representation of windows associated the respective application (e.g., thereby replacing the application switcher region with a window switcher region including windows associated with the respective application), shown in FIGS. 17L-17M.

Displaying multiple windows associated with a respective application in a sidebar (e.g., the left strip) in response to selecting an application icon associated with the respective application and/or associated with a respective window grouping that includes windows of the respective application, reduces the number of inputs to perform an operation (e.g., manage multiple open windows from different applications in a limited screen area and/or switch between different open windows).

In some embodiments, the plurality of application windows are displayed (1860) in an application display region. In some embodiments, the application display region is the main interaction region (e.g., the stage region 522). In some embodiments, the application display region is a region that is different from the main interaction region. In some embodiments, the application display region is displayed in a margin region, such as margin 524. Displaying multiple windows associated with a respective application in an application display region in response to selecting an application icon associated with the respective application, reduces the number, extent, and/or nature needed of inputs to perform an operation (e.g., manage multiple open windows from different applications in a limited screen area and/or switch between different open windows).

In some embodiments, the plurality of application windows are displayed (1862) in the sidebar. In some embodiments, the application switcher region and the window switcher region are displayed in the same sidebar, such as the left strip 556. Displaying multiple windows associated with a respective application in a sidebar region (e.g., the left strip) in response to selecting an application icon associated with the respective application, reduces the number, extent, and/or nature of inputs to perform an operation (e.g., manage multiple open windows from different applications in a limited screen area and/or switch between different open windows).

While displaying a first window of the second set of one or more windows in the interactive mode, the computer system detects (1864) a first portion of a (continuous) user input for window resizing, wherein the first portion corresponds to a selection input (e.g., 802*a* in FIG. 8A). For example, a click if a focus selector is used as input mechanism or a touch and hold (without liftoff) if a touch-based input mechanism is used. In some embodiments, the first portion is directed a predetermined portion of the first window, such as a right bottom corner or a right upper corner of the first window; or bottom two corners of the first window; or other combination of corners and/or edges or borders of the first window (e.g., 804, FIG. 8A). Before termination of the user input for window resizing, the computer system detects a second portion of the user input for window resizing (e.g., 802*b*, FIGS. 8B-8F). In some embodiments, the second portion corresponds to a drag input (e.g., 802*b* dragging the lower right corner of window 806 down in FIG. 8B). In response to detecting the second portion of the user input for window resizing, the computer system resizes (e.g., increasing or decreasing the size of) the first window in accordance with the second portion of the user input for window resizing (FIGS. 8A-8F). For example, as a user drags a respective corner of the first window, the first window is enlarged or shrunk (e.g., FIGS. 14P-14Q). In some embodiments, the resizing operation of the first has a direction and/or magnitude that are optionally based on the direction/magnitude of the second portion of the input for window resizing. In some embodiments, resizing the first window in accordance with the second portion of the user input for window resizing includes symmetrically resizing the first window in two opposite directions (FIGS. 8D-8F; FIGS. 13H-13J; FIGS. 14P-14Q). For example, as a user drags a right corner or edge of the first window in a rightward direction, the size of the first window is symmetrically increased in both the rightward and leftward directions, in accordance with the dragging input. Similarly, as a user drags a left corner or edge of the first window in a leftward direction, the size of the first window is symmetrically increased in both the rightward and leftward directions. In another example, as a user drags a right corner or edge of the first window in a leftward direction, the size of the first window is symmetrically decreased in both the rightward and leftward directions, in accordance with the dragging input. Similarly, as a user drags a left corner or edge of the first window in a rightward direction, the size of the first window is symmetrically increased in both the leftward and leftward directions.

Clicking (or touching) and dragging a window corner or other portion of the window to resize the window (optionally symmetrically) provides additional control options (e.g., options for resizing a window) without cluttering the UI with additional displayed controls.

In some embodiments, resizing the first window in accordance with the second portion of the e for window resizing includes moving a first edge of the first window. In response to detecting the second portion of the user input and in accordance with a determination that the first edge of the first window is a threshold distance away from a predetermined location (e.g., the predetermined location can correspond to a snap point or a snap line), the computer system automatically resizes (1866) the first window, such that the first edge of the first window is snapped to the predetermined location (e.g., FIGS. 12A-12C). Further, in response to detecting the second portion of the user input and in accordance with a determination that the first edge of the first window is less than the threshold distance away from the predetermined location, forgoing automatically resizing the first window. For example, the window snaps to its original position to prior detecting the input for window resizing. In some embodiments, windows snaps to its original position prior detecting input for moving a window (e.g., FIGS. 12D-12F). In some embodiments, as a user drags a respective corner of the first window, the first window automatically snaps to the closest predetermined snap points or lines, and if the user continues to drag the respective corner in the same direction, the first window automatically snaps to the next closest predetermined snap points.

Snapping a window that is being resizing to predetermined snap points/lines in accordance with a determination that an edge of the first window is a threshold distance away from a predetermined snap points/lines, enhances the operability of the device and makes the user interface more efficient (e.g., by readjusting windows that are being resized into an organized manner, which reduces the number of inputs needed to position multiple open windows of different sizes in a main interaction region without impairing window content visibility).

In some embodiments, the first window is displayed in the interactive mode (e.g., in a main interaction region, such as the stage region) concurrently with a second window of the second set of one or more windows displayed in the interactive mode (e.g., the first and second window are displayed in overlapping or non-overlapping arrangement in the stage region). In response to detecting the second portion of the user input for window resizing or in response to detecting an input moving the first window, and in accordance with a determination that resizing or moving the first window would cause the second window to be occluded by the first window beyond a threshold amount, the computer system (1868) ceases display of the second window in the interactive mode (e.g., 1302, FIGS. 13A-13D). Further, in response to detecting the second portion of the user input for window resizing or in response to detecting an input moving the first window, and in accordance with a determination that resizing or moving the first window would cause the second window to be occluded by the first window less than the threshold amount, the computer system maintains display of the second window in the interactive mode. In some embodiments, the second window can be minimized and switched to inactive state. In some embodiments, the second window can be displayed in the stage region and be at least partially visible. For example, a small amount or a portion of the second window can be visible so that a user can reactivate the window (e.g., 1302, FIGS. 13A-13D). In some embodiments, the second window is pushed aside, and a reduced scale representation of the second window in the inactive state can be displayed in the right strip or the region for window switching.

Automatically removing a respective window (e.g., without further user input directed to the respective window) from the main interaction region (e.g., the stage region) in accordance with a determination that another window, which is moved or resized, would occlude the respective window beyond a threshold amount, enhances the operability of the device, and makes the user interface more efficient (e.g., by automatically organizing multiple open windows from different applications, which reduces the number of inputs needed to find open windows).

In some embodiments, the first window is displayed in the interactive mode in a main interaction region (e.g., stage region 522), and one or more other windows of the second set of one or more windows are displayed in the non-interactive mode in a region for switching windows (e.g., "right strip," a side bar or other region for switching between active windows, such as a window switcher that includes windows in an inactive/minimized state that are related with windows in the stage region; or the left strip if the left strip is a dedicated region for both the application switcher and the window switcher). In response to detecting the second portion of the user input for window resizing, in accordance with a determination that an edge of the first window is a threshold distance away from the region for switching windows, the computer system ceases (1870) to display one or more other windows of the second set of one or more windows (FIGS. 8D-8E). Further, in response to detecting the second portion of the user input for window resizing and in accordance with a determination that the edge of the first window is less than the threshold distance away from the region for switching windows, the computer system forgoes ceasing to display the one or more other windows of the second set of one or more windows. In some embodiments, while the first window is resized (e.g., enlarged), a space between the first window and the window switcher is shrunk beyond a threshold amount (e.g., an area of no overlap is reduced), the window switcher is dismissed, pushed aside, hidden, or otherwise moved to make room for the enlarged window (FIGS. 8D-8E), where the window switcher region can be redisplayed in response to user input (e.g., moving a cursor to an edge of the display).

Automatically moving aside or out of the way windows displayed in a window switcher region (e.g., without user input directed to the windows in the window switcher region) in response to detecting that a window in a main interaction region is enlarged beyond a threshold distance away from the window switcher region, enhances the operability of the device, and makes the user interface more efficient (e.g., by automatically organizing multiple open windows, which reduces the number of inputs needed to find open windows).

In some embodiments, a plurality of window groupings are displayed in a region for switching applications (e.g., such as left strip 566), including the representation of the second set of one or more windows (e.g., the representation of the second set of one or more windows corresponds to a first window grouping) and the representation of the first set of one or more windows (e.g., the representation of the first set of one or more windows corresponds to a second window grouping). In response to detecting the second portion of the user input for window resizing, and in accordance with a determination that an edge of the first window is a threshold distance away from the region for switching applications, the computer system ceases (1872) to display of the plurality of window groupings (FIGS. 8D-8E). Further, in response to detecting the second portion of the user input for window resizing, and in accordance with a determination that the edge of the first window is less than the threshold distance away from the region for switching applications, the computer system forgoes ceasing display of the plurality of window groupings.

Automatically moving aside or out of the way representations of window groupings displayed in an application switcher region (e.g., without being directed to the representations of the window groupings), in response to detecting that a window in a main interaction region is enlarged beyond a threshold distance away from the application switcher region, enhances the operability of the device, and makes the user interface more efficient (e.g., by automatically organizing multiple open windows, which reduces the number of inputs needed to interact with the windows and unclutter the main interaction region).

In some embodiments, the computer system detects (1874) an input moving a focus selector to a first edge or to a second edge opposite of the first edge of a display region of the display generation component (e.g., input 810 in FIG. 8G, FIG. 8H, or FIG. 8I). In response to detecting the input moving the focus selector, the computer system displays the region for switching applications (e.g., strip 556 in FIG. 8D is redisplayed or revealed in FIG. 8G, FIG. 8H, or FIG. 8I) or the computer system displays the region for switching windows (e.g., redisplays or reveals the region for switching windows, including one or more other windows of the second set of one or more windows) based on whether the focus selector is moved to the first edge or the second edge (FIG. 8I). In some embodiments, the focus selector can be moved to an edge of either side of a display to reveal either the region for switching applications (and representations of window groupings included thereof) or the region for switching windows (and reduced size representations of windows included thereof, optionally displayed ungrouped and in the non-interactive mode), respectively.

Revealing the region for switching applications or the region for switching windows depending on which side of the display a focus selector is moved to, reduces the number, extent, and/or nature of inputs needed to perform an operation (e.g., revealing hidden region(s) for switching applications and/or windows and/or to maintain uncluttered display).

In some embodiments, in response to detecting the second portion of the user input for window resizing, and in accordance with a determination that an edge of the first window is a threshold distance away from a region for launching applications (e.g., a dock including application launch icons), the computer system ceases (1876) display of the region for launching applications. For example, the dock can also be pushed aside or hidden to make space for the first window that is being enlarged (e.g., 528, FIG. 8A-8D). Automatically moving aside or out of the way a region for launching applications in response to detecting that a window in a main interaction region is enlarged beyond a threshold distance away from the region for launching applications, enhances the operability of the device, and makes the user interface more efficient (e.g., by automatically organizing multiple open windows, which reduces the number of inputs needed to interact with the windows and unclutter the main interaction region).

In some embodiments, while displaying a third window of the second set of one or more windows in the interactive mode and the one or more other windows of the second set of one or more windows in the non-interactive mode (e.g., in a window switcher region, such as the right strip 566, or the left strip if the left strip combines the window switcher region with the application switcher region), the computer system detects (1878) an input (e.g., input 812 directed to window 814, FIG. 8J) directed to a fourth window of the one or more other windows of the second set of one or more windows, wherein the third window is displayed at a first size. In response to detecting the input directed to the fourth window, the computer system activates the fourth window, including displaying the fourth window in the interactive mode at a size that the fourth window was previously displayed in the interactive mode (e.g., 816, FIG. 8K). The computer system also displays a reduced scale representation of the third window in the non-interactive mode. Further, the computer system detects an input directed to the reduced scale representation of the third window. In response to detecting the input directed to the reduced scale representation of the third window, the computer system redisplays the third window at the first size in the interactive mode. In some embodiments, the size of the windows as displayed in the main interaction region (e.g., the stage region) is preserved if a user switches between windows displayed in the stage region (e.g., in addition to when a user switches between window groupings), such that when a window that was removed from the stage region is selected and redisplayed again in the interactive mode in the stage region, it is the displayed in the same size that the window had (e.g., immediately) prior the window's removal from the stage region.

Preserving sizes of different windows if a user switches between different windows in the main interaction region (e.g., by selecting windows from the window switcher region, such as the right strip or the left strip if the left strip combines both window switcher and application switcher region) enhances the operability of the device, and makes the user interface more efficient (e.g., by automatically preserving any window size adjustments made by a user, which reduces the number of inputs needed to position multiple open windows of different sizes in a main interaction region).

In some embodiments, the representation of the second set of one or more windows corresponds to a first window grouping of a plurality of window groupings included in an application switcher interface (e.g., interface 1006 in FIG. 10B, including the plurality of window groupings without displaying other user interface element, such as ungrouped windows, desktop icons, docks, toolbars, or other user interface elements that do not correspond to representations of window groupings) and the representation of the first set of one or more windows corresponds to a second window grouping of the plurality of window groupings. While displaying a first user interface including the one or more of the second set of one or more windows displayed in the interactive mode in the first display region (e.g., the stage region) and the representation of the first set of one or more windows displayed in the second display region (e.g., left strip), the computer system detects (1880) a swipe input moving in a first direction (e.g., swipe from left to right from strip 556 in the direction of stage region 522 in FIG. 10A). In some embodiments, the swipe input is performed with two fingers while a cursor/focus selector is located in or displayed in left strip region (e.g., swipe from left to right from strip 556 in the direction of stage region 522 in FIG. 10A). In some embodiments, the swipe input is an input dragging over the left strip toward a center of the display region. In some embodiments, the application switcher interface is displayed in accordance with a determination that the swipe input is a threshold distance away from the center or a center line of the display region. In response to detecting the swipe input moving in the first direction, the computer system displays the application switcher interface (e.g., 1006, FIG. 10B) including representations of the plurality of window groupings (e.g., 1008, 1010, and 1012 in FIG. 10B). In some embodiments, if not all of the representations of the currently active window groupings can fit in the application switcher interface, the remaining representations (the ones for which there is no space to fit in the application switcher interface) of the plurality of window groupings can be accessed or revealed in response to a scrolling input. Swiping in a direction opposite of a direction of the application switcher region (e.g., swiping from left to right if the application switcher region is in the left strip or swipe up/down if the application switcher region is otherwise located in a top or bottom margin) to cause display of an application switcher interface, which includes previously undisplayed window groupings, reduces the number, extent, and/or nature of inputs needed to perform an operation (e.g., reveal previously undisplayed representations of window groupings).

In some embodiments, the one or more other windows of the second set of one or more windows are included in a window switcher interface (e.g., 1022, FIG. 10D) for open windows associated with windows in the interactive mode (e.g., windows in the stage region and windows in the window switcher interface are executed by the same application and/or are associated in a window grouping). While displaying the one or more of the second set of one or more windows in the interactive mode, the computer system detects (1882) a swipe input moving in a second direction (e.g., swipe from right to left). In some embodiments, the swipe input is performed with two fingers while a cursor/focus selector is displayed in the right strip region (e.g., from strip region 556 toward stage region 522 in FIG. 10C). In response to detecting the swipe input moving in the first direction, the computer system displays the window switcher interface (e.g., 1022, FIG. 10D), including representations of the one or more other windows of the second set of one or more windows (e.g., reduced scale representation 1026 of the second set of one or more windows displayed in inactive state, FIG. 10D). In some embodiments, if not all representations of the one or more other windows of the second set of one or more windows can fit in the window switcher interface, the remaining representations of the second set of one or more windows (the ones for which there is no space to fit in window switcher interface) can be accessed or revealed in response to a scrolling input. Swiping in a direction opposite of a direction of the window switcher region (e.g., swiping from right to left if the window switcher region is in the right strip or from left to right if the application switcher and window switcher are combined in the left strip region) to cause display of a window switcher interface, which includes previously undisplayed windows at reduced size (e.g., inactive window thumbnails related to windows in the stage region), reduces the number of inputs needed to perform an operation.

In some embodiments, the representation of the second set of one or more windows corresponds to a first window grouping. While the representation of the first window grouping is active, including displaying a first window of the second set of one or more windows in the interactive mode (e.g., displaying the first window in the stage region or the main interaction region), the computer system detects (1884) an input removing the first window from the first window grouping (e.g., minimizing or dragging and dropping window 750 in FIGS. 7M-7O). In response to detecting the input removing the first window from the first window grouping, the computer system ceases display of the first window in the interactive mode (e.g., removing the window from the stage region or main interaction region) and forgoes displaying the first window in a right strip region (e.g., region for switching windows, including windows in an inactive state and displayed as reduced scale representations). In some embodiments, a reduced scale representation of the first window is optionally displayed in the left strip region. Automatically removing a window from the main interaction region (e.g., the stage region) if a window is removed from a respective window grouping that is currently active (e.g., having windows that are displayed in the stage region), enhances the operability of the device, and makes the user interface more efficient (e.g., by automatically decoupling a window from a window grouping, which reduces the number of inputs needed to interact with open windows and unclutter the main interaction region).

In some embodiments, in accordance with a determination that the input removing the first window from the first window grouping is a first minimizing input, the computer displays (1886) the first window in the right strip region (e.g., 750, FIGS. 7M-7O). In some embodiments, if a window displayed in the main interaction region (e.g., the stage region) is minimized (e.g., as opposed to closed or removed from currently active virtual workspace), the minimized window is added to a window switcher region (e.g., the right strip or the left strip if the left strip combines the application switcher region and the window switcher region). Automatically adding a window to a window switcher region (e.g., the right strip or the left strip if the left strip combines the application switcher region and the window switcher region) in response to minimizing the window allows a user to focus operations on windows displayed in the main interaction region while maintaining visibility and easy access to other open windows, thereby reducing the number of inputs needed to manage multiple open windows from different applications in a limited screen area.

In some embodiments, in accordance with a determination that the input removing the first window from the first window grouping is a second minimizing input that minimizes a window to a dock, and in accordance with a determination that the first set of one or more windows and the second set of one or more windows are included in a virtual workspace that is in a concentration mode, the computer system forgoes minimizing (1888) the first window to the dock (e.g., sends windows to strip 556, FIG. 15B). In some embodiments, the dock corresponds to a user interface element that is displayed consistently on a display, e.g., in concentration mode, desktop mode, and/or normal mode, and that includes selectable application launch icons and/or optionally minimized windows that are not visible or are hidden and are still running. In some embodiments, the first window is instead displayed in a display region for switching windows (e.g., the right strip or the left strip). In some embodiments, windows that were minimized to a dock user interface (e.g., dock that includes application launch icons and/or open windows that are minimized) of a virtual workspace prior activating the concentration mode, are removed from the dock user interface in response to activating the concentration mode (e.g., in addition to being removed from the dock, the minimized windows are automatically grouped by application and/or displayed in application switcher interface). Automatically removing minimized windows (e.g., without further user input directed to the minimized windows) from a dock user interface in response to activating the concentration mode reduces the number of inputs needed to manage multiple open windows from different applications in a limited screen area.

In some embodiments, the display generation component is a first display generation component (e.g., 500, FIG. 11A) that is connected to (or in communication with) a second display generation component (e.g., 502, FIG. 11A), wherein the first display generation component is displaying a first virtual workspace and the second display generation component is displaying a second virtual workspace. The computer system detects (1890) an input (e.g., 1518, FIG. 15A) activating concentration mode in the first virtual workspace or the second virtual workspace. In response to detecting the input activating the concentration mode in the first virtual workspace or the second virtual workspace, the computer system activates the concentration mode in the first virtual workspace and the second virtual workspace (e.g., activating the interface in FIG. 15B on devices 500 and 502 in FIG. 5K). In some embodiments, concentration mode is activated in multiple workspaces that are displayed in respective multiple connected displays in response to activating the concentration mode with respect to one virtual workspace. Automatically activating concentration mode in multiple workspaces that are displayed in respective multiple connected displays in response to activating the concentration mode with respect to one virtual workspace reduces the number of inputs needed to manage multiple open windows from different applications displayed in multiple virtual workspaces of multiple connected displays.

In some embodiments, the first virtual workspace (e.g., 1527*h*, FIG. 15E) includes a first plurality of open windows, including the first set of one or more windows and the second set of one or more windows (e.g., 1527*a*-1527*g* in FIG. 15E, and windows on desktop 1502 in FIG. 15A). The second virtual workspace (e.g., 1527*i*, FIG. 15E) includes a second plurality of open windows (e.g., windows in a second desktop 1502, FIG. 15A). In some embodiments, activating the concentration mode in the first virtual workspace and the second virtual workspace includes (1892) displaying windows in a first set of window groupings including the first plurality of open windows (e.g., one of the groupings in strip 556, FIG. 15B) and a second set of window groupings including the second plurality of open windows (e.g., another of the groupings in strip 556, FIG. 15B). In some embodiments, application windows included in a first display (e.g., 500, FIG. 11A) are automatically added to window groupings associated with the first display (e.g., without grouping windows included in other connected displays) (e.g., one of the groupings in strip 556, FIG. 15B), and application windows included in a second display (e.g., connected to the first display) (e.g., 502, FIG. 11A) are automatically added to window groupings associated with the second display (e.g., without grouping windows included in other connected displays, such as windows from the first displays) (e.g., another of the groupings in strip 556, FIG. 15B). In some embodiments, application windows included in a first workspace (e.g., applications 1527*a*-1527*g* in a first desktop 1527*h*) are automatically added to window groupings associated with the first virtual workspace (e.g., without grouping windows included in other virtual workspaces) (e.g., one of the groupings in strip 556, Figure and application windows included in a second virtual workspace (e.g., applications in an optional second desktop 1527*h*) are automatically added to window groupings associated with the second virtual workspace (e.g., without grouping windows included in other virtual workspace, such as windows from the first virtual workspace) (e.g., another of the groupings in strip 556, FIG. 15F). Collecting and grouping application windows on a per-display and/or per workspace basis reduces the number, extent, and/or nature of inputs needed to manage multiple open windows from different applications displayed in multiple virtual workspaces of multiple connected displays while maintaining user's distribution of windows across multiple displays and/or workspaces.

In some embodiments, the second display generation component is associated with a third virtual workspace (e.g., 1527*j*, FIG. 15E) in addition to the second virtual workspace (e.g., 1527*i*, FIG. 15E), and the third virtual workspace includes a third plurality of open windows (e.g., windows in a third desktop 1502, FIG. 15A). In some embodiments, activating the concentration mode in the first virtual workspace and the second virtual workspace includes (1894) displaying windows in a third set of window groupings including the third plurality of open windows (in addition to the first set of window groupings including the first plurality of open windows and a second set of window groupings including the second plurality of open windows) (e.g., another of the groups in strip 556, FIG. 15F). Collecting and grouping application windows on a per-display and/or per workspace basis reduces the number of inputs needed to manage multiple open windows from different applications displayed in multiple virtual workspaces of multiple connected displays while maintaining user's distribution of windows across multiple displays and/or workspaces.

In some embodiments, the computer detects (1896) a multitasking gesture (e.g., multiple finger pinch or swipe up from bottom edge while desktop 1502 is displayed in FIG. 15A). In response to detecting the multitasking gesture, the computer system displays an application-switcher user interface (including a plurality of representations of groupings of windows organized by an application). Displaying an application switching user interface in response to detecting a multitasking gesture reduces the number of inputs needed to perform an operation.

In some embodiments, the one or more of the second set of one or more windows displayed in the interactive mode includes (1898) windows from different applications (e.g., 1402, 1404, and 1406 in FIG. 14C). In some embodiments, windows for the same application and other applications are displayed in a same region. Allowing windows from different applications to be grouped together or to be displayed together in the main interaction region (e.g., the stage region) unclutters the display while proving multi-tasking and multi-app flexibility, thereby reducing the number of inputs needed to perform an operation (e.g., managing multiple open windows from different applications in a limited screen).

It should be understood that the particular order in which the operations in 22A-18H have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1900, 2000, 2100, 2200, and 2300) are also applicable in an analogous manner to method 1800 described above with respect to FIGS. 18A-18L.

FIGS. 19A-19D are flow diagrams illustrating method 1900 of window management of open windows included in two or more displays that are connected or otherwise in communication, in accordance with some embodiments. Method 1900 is performed at an electronic device (e.g., laptop display device 300, tablet display device 100, or desktop display device in FIG. 1A; portable multifunctional device 100 in FIG. 2; or electronic device in FIG. 3A) with a display (e.g., display devices 101, 201, and 301 in FIGS. 1A-1B) and one or more input devices (e.g., a touch-sensitive display 101 of tablet device 100 in FIG. 1A; mouse input device 202, keyboard input devices 203 and 305, and touchpad 309 in FIG. 1B; or touchpad 355 in FIG. 3 and touch-sensitive surface 451 in FIG. 4B). Some operations in method 1900 are, optionally, combined and/or the order of some operations is, optionally, changed.

As described below, method 1900 provides an improved mechanism for window management of open windows included in two or more displays that are connected or otherwise in communication, such as a tablet or a laptop (e.g., device 500, FIG. 11A) connected to one or more external monitors or displays (e.g., device 502, FIG. 11A). Windows that are displayed on an external display in an overlapping arrangement (e.g., windows 1102 and 1004 on device 502, FIG. 11A) are automatically transferred (e.g., without user input directed to the windows) to an integrated display of an electronic device that is being used (e.g., 500, FIG. 11A), where one, more, or all of the transferred windows are displayed in a non-overlapping arrangement (e.g., 1102 and 1104 in FIG. 11B). The aforementioned transferring of windows in response to a first of the electronic devices (e.g., tablet or laptop 500, FIG. 11B) detecting disconnection from a second of the electronic devices (e.g., external display 502, FIG. 11B) or in response to a user input requesting the windows to be transferred, where the non-overlapping arrangement is based on various criteria (e.g., including number of windows that are transferred, previous arrangement of the windows on the external display, resolution of the integrated display). Accordingly, open windows transferred from the disconnected display are automatically rearranged in a non-overlapping arrangement on the integrated display (e.g., as opposed to placing the transferred windows on top of windows previously displayed on the integrated display; or as opposed to hiding/minimizing the transferred windows, such that a user would need to search for transferred windows). Automatically rearranging windows transferred from a disconnected (external) display (e.g., without user input arranging the windows being transferred) reduces the number, extent, and/or nature of inputs needed to perform an operation (e.g., redisplay or rearrange windows that have been transferred from a disconnected display).

An electronic device with an integrated display (e.g., a computer with a display that is part of, attached to, or otherwise integrated with a body of the computer system that houses other components such as memory, processors, optionally, keyboard, such as a display on a laptop, a touchscreen, a tablet, a smartphone) and one or more input devices (e.g., a trackpad, a mouse, a keyboard, a microphone, a touchscreen, a stylus, a controller, joystick, buttons, scanners, cameras, etc.) is in communication with (or connected to) an external display (e.g., an external display that is connected to the computer system, e.g., a tablet or a laptop that is connected to an external display). For example, desktop display device 200 operates in connection with a tablet display device 100 in FIG. 1B. At the electronic device, a first set of windows in a first arrangement is displayed (1904) on the external display (e.g., 1102 and 1104 on display 502, FIG. 11A). The first arrangement is an overlapping arrangement. In some embodiments, in an overlapping arrangement of windows, at least one window (e.g., 1104, FIG. 11A) is displayed overlaying at least a portion of at least one other window (e.g., 1102, FIG. 11A), where the portion of the window that is being overlaid is occluded by the overlaying window (e.g., the window on top). In some embodiments, the overlaying window can be a pop-up window, a child window, or a sibling window of the same application as the window being overlaid, and/or a window generated by or associated with a different application than the one executing the overlaid window. In some embodiments, the first set of windows in the first arrangement are displayed in the stage region (e.g., in an interactive portion of the display or a main interaction region, where content of the windows is available for manipulation) and, optionally, the first set of windows in the first arrangement are displayed on the external display concurrently with one or more window groupings (e.g., open windows grouped by application) that are optionally displayed in a region for switching between window groupings (e.g., region for switching to open windows of a different application, such as the left strip). While displaying the first set of windows (in the first overlapping arrangement) on the external display, the electronic device receives (1906) a request to display the first set of windows on the integrated display. In some embodiments, the request to display the first set of windows on the integrated display is disconnecting, unplugging the external display, or otherwise terminating any other communication between the electronic device and the external display. In response to receiving the request to display the first set of windows on the integrated display, the electronic device (automatically, e.g., without user input) displays (1910) the first set of windows in a second arrangement on the integrated display (e.g., 1102 and 1104 on display 500, FIG. 11B). The second arrangement is a non-overlapping arrangement. In some embodiments, a user does not have to arrange the windows in a non-overlapping arrangement, and the user does not have to move the windows from the external display to the integrated display, or search for transferred windows. In some embodiments, the non-overlapping arrangement corresponds to an arrangement of windows in which no window overlays another window, e.g., content of the windows are visible as opposed to obscured, partially or wholly, by other windows). In some embodiments, displaying windows in the non-overlapping arrangement, such as a side-by-side view, maximizes screen space and declutters the screen while allowing a user to manipulate content of the windows without the need activate windows or bring them to the foreground. Accordingly, changing arrangement of windows from an overlapping to non-overlapping arrangement changes not only how windows are arranged but also how a user can interact with the windows, where full functionality of the windows displayed in the non-overlapping arrangement (e.g., side-by-side) is available for manipulation in response user inputs. In some embodiments, the electronic device does not have an integrated display and the electronic device is connected to or in communication with multiple external displays.

In some embodiments, a first window at least partially overlays (1912) a second window in the first arrangement, and neither the first window nor the second window overlay one another in the second arrangement. In some embodiments, the non-overlapping arrangement of windows corresponds to an arrangement in which windows are displayed side-by-side (e.g., in a side-by-side view), where no window is overlaying another window and the windows can be directly interacted with (e.g., 1102 and 1104, FIG. 11B). For example, in the side-by-side view, windows are displayed in a concurrent input mode in which they can be interacted with directly, e.g., content of all windows in the non-overlapping arrangement is available for manipulation without the need to first activate the windows. In some embodiments, in the side-by-side view, the first set of windows share substantially the entirely screen or display area of the integrated display such that the windows are aligned and displayed adjacent to each other without displaying any (significant) portion of a wallpaper, a screen background, icons, menus, docks, toolbars, or other windows that are not included in the first set of windows (e.g., full frame or available screen space of the integrated display is taken up by the first set of windows that share the integrated display). In some embodiments, the first set of windows displayed side-by-side corresponds to two windows displayed in a shared screen view (e.g., 1102 and 1104, FIG. 11B). In some embodiments, more than two windows may be displayed in the side-by-side view. In some embodiments, if the number of windows in the first set of windows is more than a maximum number of permitted windows to be displayed side-by-side, then each of the windows may be resized, such that the windows are not overlapping or overlaying each other while at the same time the size of the windows is reduced to the extent necessary (e.g., only to the extent necessary) to display the windows (e.g., all windows) without overlapping each other on the available space of the screen.

Automatically rearranging and displaying in a side-by-side view windows that are transferred from an external display in response to detecting that the external display is disconnected or in response to user input requesting the transfer, performs an operation (e.g., rearranging in a side-by-side view on the integrated display) when a set of conditions have been met (e.g., an external display, on which windows in the overlapping arrangement are displayed, is disconnected) without requiring further user input.

In some embodiments, displaying the first set of windows in the second arrangement includes displaying (1914) a full screen view of a first application window of the first set of windows. In some embodiments, the first application window is displayed in the full screen view without displaying other windows of the first set of windows (e.g., additionally without displaying a desktop, a wallpaper and/or any icons displayed on a desktop) (e.g., 1102 and 1104, FIG. 11B). In some embodiments, "full screen" view corresponds to a mode in which a window that is displayed in full-screen view takes up the available application display space on the display, even if the electronic has reserved some portion of the display region for displaying system information (e.g., a status bar, menu bar, and/or dock/application launching interface). In some embodiments, the first application window that is being displayed in full screen view corresponds to a window that was displayed in the foreground (e.g., was the active window in the stage region) when the request to display the first set of windows on the integrated display was detected. In some embodiments, if a single window was included in and/or transferred from the external display, the window is displayed in full screen view on the integrated display.

Automatically displaying in a full screen view a respective window that was displayed on the external display when the external display was disconnected or in response to a user input requesting the transfer, enhances the operability of the device, and makes the user interface more efficient (e.g., by automatically reorganizing multiple open windows that are transferred to the integrated display, which reduces the number of inputs needed to find transferred windows).

In some embodiments, in response to receiving the request to display the first set of windows on the integrated display, and in accordance with a determination that a count of windows in the first of one or more windows is not above a first threshold number of windows (e.g., in accordance with a determination that the number of windows is no more than two windows), the electronic device concurrently displays (1916) the first set of windows in the integrated display, such that no window in the first set of windows overlays another window in the first set of one or more windows (e.g., windows in the first set of windows are displayed in a side-by-side view). Further, in response to receiving the request to display the first set of windows on the integrated display and in accordance with a determination that a count of windows in the first of one or more windows is above a first threshold number of windows, the electronic device displays the first set of windows separately in a full screen view (e.g., 1102 and 1104, FIG. 11B, vs. 1102, FIG. 11G). For example, a first window is displayed in the full screen view without concurrently displaying one or more other windows of the first set of windows. In some embodiments, displaying the first set of windows separately in a full screen view corresponds to displaying one window at a time in a full screen view. Further, a full screen view is also rendered for the one or more other windows of the first set of windows, where a full screen view of a respective window in the one or more other windows is available to be displayed (on the integrated display) in response to a request to switch or navigate to a respective window in the first set of windows (e.g., in response to a swipe input in a respective direction or in response to moving a focus selector towards a side edge of the integrated display (e.g., left or right edge or side). For example, a user can switch between full screen views of the first set of windows in response to navigation request (e.g., without the need for additional user input to change display more of the respective window). In some embodiments, the request to switch to between full screen views of windows in the first set of windows can be a touch gesture on a touch-sensitive display (e.g., a swipe gesture, e.g., using one, two, or "n" number of fingers), a key combination on a keyboard, directing a cursor or a focus selector to a predetermined area of the screen that causes navigation to an adjacent window, or other input mechanism. In some embodiments, if there are no more than a first threshold number of windows in the window grouping (e.g., no more than two) that were displayed on the external display in the main interaction area, windows transferred from the external display are displayed in a side-by-side view on the integrated display, and if there are more than a threshold number of windows in the group, the windows transferred from the external display are displayed separately (e.g., one at a time) as full screen views.

Automatically displaying windows transferred from the external display in a side-by-side view or in a full screen view, depending on the number of windows that are transferred (e.g., below or above a threshold number), enhances the operability of the device, and makes the user interface more efficient (e.g., by automatically reorganizing multiple open windows that are transferred to the integrated display, which reduces the number of inputs needed to find transferred windows).

In some embodiments, the request to display the first set of windows on the integrated display is received in response to detecting that the electronic device is no longer in communication with the external display. In some embodiments, the electronic devices moves (1918) (automatically, e.g., without user input) the first set of windows to the integrated display (e.g., 1102 and 1104, FIG. 11B). Automatically rearranging windows, which are transferred from the external display to the integrated display, from an overlapping arrangement to a non-overlapping arrangement enhances the operability of the device, and makes the user interface more efficient (e.g., by automatically reorganizing multiple open windows that are transferred to the integrated display, which reduces the number of inputs needed to find transferred window.

While displaying a first window on the integrated display, the electronic device detects (1920) a selection input directed to an affordance for window arrangement (e.g., a user interface element) of the first window (e.g., 534, FIGS. 5E-5G). While maintaining the selection input, the electronic device detects a drag input (e.g., a touch-based drag input if a touchscreen is used to detect the drag input or a cursor drag input if a pointing device is used detect the drag input such as a trackpad, a touchpad, a mouse, a stylus, where the pointing device can be integrated or detached from the electronic device). In response to detecting the drag input while maintaining the selection input, the electronic device moves the first window from the integrated display to the external display. In some embodiments, windows in the first set of windows are dragged, optionally one by one, from the integrated display to the external display by grabbing/selecting a window arrangement affordance and dragging the windows to the external display. In some embodiments, a respective window that is moved from the integrated display to the external display is placed on or added to the stage region, thereby being displayed in the interactive mode. In some embodiments, the concentration mode is automatically activated on the external display in response to detecting that the integrated display is in communication with the external display (as described above).

Transferring a window from the integrated display to the external display by selecting and dragging a window arrangement affordance provides a dedicated control and/or area on the window for moving the window, thereby reducing user errors that occur when a user searches for available portions of the window that can be used or are available to be used for moving the window (e.g., by accidently selecting content of the window), thereby reducing the number, extent, and/or nature of inputs needed to perform an operation.

While displaying the first set of windows in the first arrangement on the external display in a first display region (e.g., a region for main interaction with windows, such as the stage region) (e.g., 522, FIG. 6A), the electronic device concurrently displays (1922) a plurality of window groupings in a second display region (e.g., a region for switching between currently active apps and their corresponding windows, such as the left strip) (e.g., 524, FIG. 6A). In some embodiments, the plurality of window groupings includes windows grouped by applications that execute currently open windows. In some embodiments, windows that are not displayed in the main interaction region (e.g., in an interactive mode on the stage region) are not displayed in a non-overlapping arrangement if transferred to the integrated display.

Automatically transferring windows (displayed in the interactive mode concurrently with representations of window groupings on the external display) (e.g., 1102 and 1104, FIG. 11A) and rearranging the transferred windows from an overlapping to non-overlapping arrangement (e.g., 1102 and 1004, FIG. 11B), enhances the operability of the device, and makes the user interface more efficient (e.g., by automatically reorganizing multiple open windows that are transferred to the integrated display, which reduces the number of inputs needed to find transferred windows.

In some embodiments, in response to receiving the request to display the first set of windows on the integrated display and in accordance with a determination that a resolution of the integrated display is above a threshold level, the electronic device (automatically, e.g., without additional user input) displays (1924) the first set of windows in the first arrangement on the integrated display. In some embodiments, in accordance with a determination that a resolution of the integrated display is below a predetermined threshold level, the arrangement of the first set of windows is changed from the first arrangement to the second arrangement (e.g., from overlapping to non-overlapping) to accommodate a smaller display and/or a low resolution that the integrated display may have. And, in accordance with a determination that the resolution of the integrated display is equal to or above the predetermined threshold level, displaying the first set of windows in the first arrangement (e.g., thereby maintaining the first arrangement of the first of windows that was in the external display). In some embodiments, a user can restore the first arrangement (the overlapping arrangement on the external display) on the integrated display, after the windows are displayed in the second arrangement on the integrated display (in response to the request), by increasing the resolution of the integrated display. In some embodiments, the overlapping arrangement of transferred windows is maintained if windows on a first external display are transferred to a second external display in response to detecting that the first external display is no longer in communication with the electronic device.

Preserving an overlapping arrangement of windows displayed on the external display when transferred to the integrated display if a resolution of the integrated display is above a threshold level, reduces the number, extent, and/or nature of inputs needed to perform an operation.

In some embodiments, in the first arrangement on the external display (the overlapping arrangement), the amount of overlap between windows in the first set of windows is constrained (1926). In some embodiments, windows in the overlapping arrangement are displayed in the stage region in the interactive mode, and the amount of overlap between windows in the stage region is constrained, and/or the number of windows that are displayed is limited to a predetermined amount (e.g., to also satisfy a requirement that windows in the stage region are at least partially visible and can be interacted with). Limiting an amount of overlap between windows displayed in the overlapping arrangement (e.g., on the external display) maintains sufficient visibility of windows displayed in a main interaction region (e.g., the stage region) and/or provides for efficient viewing and interacting with a plurality of overlapping windows displayed on the same screen, thereby reducing the number of inputs needed to perform an operation (e.g., bring a respective window that is otherwise partially occluded to the foreground by selecting the visible portion of the respective window).

In some embodiments, while displaying the first set of windows in the first arrangement on the external display, including displaying a first window (e.g., 1304, FIG. 13B) occluding at least a portion of a second window (e.g., 1302, FIG. 13B) of the first set of windows, the electronic device detects (1928) an input (e.g., 1301, FIGS. 13B-13C) enlarging the first window. In response to detecting the input enlarging the first window and in accordance with a determination that the first window would occlude the second window by more than a predetermined amount, the electronic device automatically moves the second window to maintain visibility of the second window (e.g., 1306, FIG. 13C). Further, in response to detecting the input enlarging the first window, and in accordance with a determination that the first window would occlude the second window by no more than the predetermined amount, the electronic device forgoes moving the second window. For example, a portion of a respective window that is occluded by another window of the first set of windows is limited to a predetermined amount. For example, if an occluded portion of a respective window is increased, e.g., in response to a user input enlarging a respective overlaying window (e.g., the window on top that occludes the window underneath), at least a portion of the respective window remains visible, such that a user can bring the respective window to the foreground by selecting the visible portion of the respective window. For example, at least some portion of each window that is displayed in the stage region is visible (e.g., at all times or when the user is not actively rearranging the windows) (e.g., 1306, FIG. 13C).

Maintaining a predetermined amount of visibility of a window that is being occluded by another window provides for efficient viewing and interaction with a plurality of overlapping windows displayed on the same screen, thereby reducing the number, extent, and/or nature of inputs needed to perform an operation (e.g., bring a respective window that is otherwise partially occluded to the foreground by selecting the visible portion of the respective window).

In some embodiments, a number of windows displayed concurrently in the first arrangement on the external display (the overlapping arrangement) is limited (1930) to a predetermined amount. For example, the number of windows that can be displayed in the stage region is limited to three, four, or "n" number of windows that can, optionally, be modified. In some embodiments, the number of windows that can be open is not dependent on the arrangement of the windows in the stage region. Limiting the number of windows that can be displayed concurrently in an overlapping arrangement (e.g., on the external display) reduces the number, extent, and/or nature of inputs needed to perform an operation (e.g., reduces the number of inputs needed to unclutter the screen space, manage, and/or interact with open windows).

In some embodiments, while displaying the first set of windows in an interaction region (e.g., the stage region) in the external display (e.g., displaying window 512 in FIG. 5E), the electronic device detects (1932) a request to display a new window in the external display (e.g., in addition to the first set of one or more windows). In some embodiments, the request to display a new window can be a request to open a new window on the external display (e.g., selection 550 of the icon 552 in FIGS. 5H-I) or a request to move a window from the integrated display to the external display (e.g., window 534 being dragged onto the external display, as shown in FIGS. 5E-5G). In response to detecting the request to display the new window in the external display and in accordance with a determination that a number of windows that are open in the external display, including the new window and the first set of windows, is above the predetermined amount, the electronic device ceases to display a respective window of the first set of windows in the interaction region (e.g., if window 534 is added to the stage region, that already displays window 512, window 512 is no longer displayed in the stage region of FIGS. 5E-5F). Further, in response to detecting the request to display the new window in the external display and in accordance with a determination that the number of windows that are open in the external display is no more than the predetermined amount, the electronic device displays the new window in the interaction region of the external display (e.g., without ceasing to display a window of the first set of windows of windows that were already displayed in the interaction region). In some embodiments, the respective window that is being removed from the interaction region (to free up space for the new window) can be added to another region for switching windows in the interaction region (e.g., the right strip or left strip if the left strip combines an application switcher and a window switcher regions) that includes, for example, reduced scale representations of windows that are related to the windows in the interaction region (e.g., can be automatically grouped together and removed at the same time from the display in response to detecting an input selecting a different window grouping). This can be seen, for example, by window 512 moving to the left strip in FIG. 5G.

If more than a threshold number of windows are open in a main interaction region (e.g., on the external display), and a request to open a new window (or to display or add another window) in the main interaction region is detected, a previously displayed window is evicted or otherwise removed from the main interaction region (and optionally added to a window switcher region or to an existing window grouping that includes other windows of the same application), thereby performing an operation when a set of conditions has been met without requiring further user input. Again, this can be seen, for example, by window 512 moving to the left strip in FIG. 5G.

In some embodiments, while displaying the first set of windows in an interaction region (e.g., the stage region) in the external display, the electronic device detects (1934) a request to display a new window in the external display (e.g., in addition to the first set of one or more windows). In response to detecting the request to display the new window in the external display. In accordance with a determination that a number of windows that are open in the external display, including the new window and the first set of windows, is above the predetermined amount, the electronic device displays a prompt to select a respective window of the first set of windows to be removed from the interaction region. For example, in FIGS. 5F-5G, if the threshold number is one window, once the window 534 is added to the stage region when window 512 was already there, the user may receive a prompt to select which window should remain in the stage region and/or which window should be moved to the left strip. Further, in response to detecting the request to display the new window in the external display and in accordance with a determination that the number of windows that are open in the external display is no more than the predetermined amount, the electronic device displays the new window in the interaction region of the external display (and forgoes displaying the prompt). For example, in FIGS. 5F-5G, if the threshold number is two windows, when the window 534 is added to the stage region when window 512 was already there, both of windows 534 and 513 are displayed in the stage region.

If more than a threshold number of windows are open in a main interaction region (e.g., on the external display), and a request to open a new window or to display or add another window in the main interaction region is detected, a previously displayed window is evicted or otherwise removed from the main interaction region (and optionally added to a window switcher region or to an existing window grouping that includes other windows of the same application), thereby performing an operation when a set of conditions has been met without requiring further user input. Again, this can be seen, for example, by window 512 moving to the left strip in FIG. 5G.

In some embodiments, while displaying the first set of windows in an interaction region (e.g., the stage region) on the external display, the electronic device detects (1936) a request (e.g., selection 550 of FIG. 5H) to open a new window in the external display (e.g., in addition to the first set of one or more windows). In response to detecting the request to open the new window in the external display, and in accordance with a determination that a number of windows that are open in the external display, including the new window and the first set of windows, would be above the predetermined amount, the electronic device displays visual feedback indicating that the predetermined number of windows is exceeded and (automatically) prevents the new window from opening. For example, in FIG. 5I, if only one window is allowed in the stage region, the calendar window 548 may have not been able to open. Further, in response to detecting the request to open the new window in the external display and in accordance with a determination that the number of windows that are open in the external display is no more than the predetermined amount, the electronic device displays the new window in the interaction region of the external display (e.g., without displaying a warning or visual feedback that the predetermined number of windows is exceeded). For example, in FIGS. 5H-I, if only two windows are allowed in the stage region, the calendar window 548 will be displayed in addition to the map window 534.

If more than a threshold number of windows are already open in a main interaction region (e.g., on the external display), and a request to open a new window in the main interaction region is detected, a warning is displayed or other visual feedback indicating that additional windows are not permitted and the new window is prevented from opening, thereby maintaining the main interaction region uncluttered and/or performing an operation when a set of conditions has been met without requiring further user input. For example, in FIG. 5I, if only one window is allowed in the stage region, the calendar window 548 may have not been able to open and a warning displayed.

In some embodiments, while a window is open on the integrated display (e.g., the window can be displayed, minimized, hidden, or otherwise executing on the integrated display), wherein the window is associated with a first application, the electronic device detects (1938) an input directed to an application icon for launching the first application on the external display (e.g., tap or click 550 on an application icon 552 for launching the first application that is displayed on a dock user interface of the external display, where the dock user interface includes various application launch icons, as shown in FIG. 5H). In response to detecting the input directed to the application icon displayed on the external display, the electronic device moves the window from the integrated display to the external display. For example, the system moves the calendar window 548 from the tablet (or other device with an integrated display, as shown in FIG. 5H-I) to a connected external display by clicking, tapping, or selecting an application launch icon (e.g., 550, 552 FIG. 5H) of the first application on the external display or otherwise launching the first application on the external display.

Automatically moving the window of the respective application from the integrated display to the external display in response to detecting the input directed to an application icon for launching the respective application, where the application icon is displayed in the external display, occurs without requiring further user input directed to move the window from the integrated to the external display.

In some embodiments, while the window associated with the first application is open on the external display (e.g., in the interaction region or stage region), the electronic device detects (1940) an input directed to an application icon for launching the first application on the integrated display (e.g., tap or click 544 on an application icon 546 for launching the first application that is displayed on a dock user interface of the integrated display 500). In response to detecting the input directed to the application icon displayed on the integrated display, the electronic device automatically moves the window from the external display to the integrated display (e.g., moves window 548 from the external display 502 back to the integrated display 500 in FIGS. 5H-I). For example, a user can move the window back from the external display to the tablet (or other device with an integrated display) by clicking, tapping, or selecting an application launch icon of the first application on the tablet or otherwise launching the first application on the tablet.

Automatically moving a window of a respective application from the external display to the integrated display in response to detecting an input directed to an application icon at the integrated display for launching the respective application, is performed without requiring further user input (e.g., without requiring the user to move the window from the external to the internal display).

In some embodiments, while displaying a second window on the integrated display, the electronic device detects (1942) a selection input directed to a portion of the first window (e.g., the portion of the first window corresponds to portion of a frame of the first window, such as unoccupied area of a toolbar or one of the corners of the first window, or the portion of the first window corresponds to the affordance for arranging windows). While maintaining the selection input, the electronic device detects an input moving the second window in a direction towards the external display. In response to detecting the input moving the second window in a direction towards the external display, the electronic device moves the first window from the integrated display to the external display using inertia. In some embodiments, the first window is moved from the integrated display to the external display with (simulated) inertia, where motion (or movement) of the first window continues after the input moving the second window ends (e.g., after a liftoff if a touch-based input device is used or after release of a click if a pointing device is used). For example, if the user drags windows 534 from the internal display towards the external display, as shown in FIGS. 5E-5G, the movement of the window has some (simulated) inertia and will continue moving some distance even if the drag input ceases. Further, optionally motion of the first window continues with a magnitude based on the magnitude of the input at the end of the input and that optionally the movement is based on simulated physical properties (e.g., simulated mass, and/or friction). In some embodiments, the input moving the second window in the direction of the external display has a higher speed, velocity, or acceleration compared to a drag input, and the input moving the window does not reach an edge of the external display, where the drag input moves across the integrated display and to the external display, in which case the window is moved so as long as a user is dragging it. For example, a user can "throw" the second window to the external display as opposed to dragging it to the external display (e.g., 534 and 536*a*-536*b*, FIGS. 5E-5G).

Using simulated inertia to move a window from the integrated display to the external display reduces the number, extent, and/or nature of user input necessary to move the window, reduces the time necessary to move the window, and/or provides visual feedback that the window is and can be moved to the external display.

In some embodiments, while displaying a third window on the integrated display, the electronic device detects (1944) an activation (or selection) input directed to an affordance for window arrangement (e.g., a user interface element) of the third window (e.g., 518*d*, 520, FIG. 5C). In response to detecting the activation directed to an affordance for window arrangement, the electronic device displays a plurality of options for moving the third window to the external display, wherein a first option from the plurality of options specifies a first arrangement for the third window on the external display and a second option from the plurality of options specifies a second arrangement for the third window on the external display, the second option different from the first option. For example, a first option corresponds to an option for displaying the third window in full screen view on the external display. A second option corresponds to an option for displaying the third window in split screen or side-by-side view with other windows open on the external display. In yet another example, a third option corresponds to an option for displaying the third window in a slide over mode (in which one application is displayed overlaying another application on the display). In some embodiments, the affordance for window arrangement can be used to transfer windows from the external display to the integrated display and vice versa (e.g., 518*d*, FIG. 5C; see also FIG. 16G).

Using an affordance for window management, including multiple options on how to move/transfer a window associated with the affordance, provides further control over movement of windows from one display to another, and/or reduces the number of inputs needed to arrange the windows on the display the windows are being transferred to.

It should be understood that the particular order in which the operations in 19A-19D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1800, 2000, 2100, 2200, and 2300) are also applicable in an analogous manner to method 1800 described above with respect to FIGS. 19A-19D.

FIGS. 20A-20D are flow diagrams illustrating a method 2000 of window management and window interaction, in accordance with some embodiments. Method 2000 is performed at an electronic device (e.g., laptop display device 300, tablet display device 100, or desktop display device in FIG. 1A; portable multifunctional device 100 in FIG. 2; or electronic device in FIG. 3A) with a display (e.g., display devices 101, 201, and 301 in FIGS. 1A-1B) and one or more input devices (e.g., a touch-sensitive display 101 of tablet device 100 in FIG. 1A; mouse input device 202, keyboard input devices 203 and 305, and touchpad 309 in FIG. 1B; or touchpad 355 in FIG. 3 and touch-sensitive surface 451 in FIG. 4B). Some operations in method 2000 are, optionally, combined and/or the order of some operations is, optionally, changed.

As described below, the method 2000 provides an improved mechanism for window management and window interaction with windows that are displayed in a main interaction region (e.g., application display region for interaction with open windows, such as the stage region). When a concurrent input mode is activated for multiple open windows displayed in the main interaction region, a user can multi-task between the windows displayed in concurrent input mode in the main interaction region, while optionally maintaining visibility of an application switcher region (optionally including multiple window groupings of other open windows) and/or a window switcher region (optionally including other windows that can be selected to replace windows in the main interaction region), where in concurrent input mode full functionality of the windows is available for activation and content of the windows is available for manipulation without the need to first activate the windows, thereby reducing the number of inputs needed to multi-tasks using multiple windows that are optionally associated with different application. Further, method 2000 allows a user to switch from non-concurrent input mode to the concurrent input mode by rearranging windows from an overlapping arrangement to a non-overlapping arrangement (and vice versa) without requiring further user input.

A computer system is in communication with a display generation component (e.g., a display, a display on a laptop, a touchscreen, a tablet, a smartphone, a heads-up display, a head-mounted display (HMD), and other integrated displays or separate displays) and one or more input devices (e.g., a trackpad, a mouse, a keyboard, a microphone, a touchscreen, a stylus, a controller, joystick, buttons, scanners, cameras, etc.). At the computer system, a first window and a second window are concurrently displayed (2004), via the display generation component (e.g., windows 1204 and 1224 in FIG. 12F). The computer system detects (2006) an input directed to the first window (e.g., input 1226 in FIG. 12O). In response to detecting the input directed to the first window, where the input is of a first type or a second type different from the first type, and in accordance with a determination that the first window and the second window are in a concurrent input mode, computer system performs (2008) an operation in a respective application associated with the first window (e.g., selects the message in window 1204 in FIG. 12O). In some embodiments, in a concurrent input mode, full functionality of concurrently displayed windows is available, where it is not necessary to first activate a window so that the window responds to user input (e.g., performs the operation in the respective application). In some embodiments, the operation includes manipulating content in the first window, such as activating selectable user interface elements and/or performing respective functions that are executed in response to activating the selectable user interface elements; performing scrolling operations or otherwise navigating within content and functions provided by the first window; position a focus selector within content in the first window; selecting content in the first window without necessary executing a function associated with selected content; adding content to the first window, such as adding an attachment to a message or an email; or other functionality that is made available for user interaction in the first window. In some embodiments, performing the operation in the respective application does not include moving or resizing the first window. In some embodiments, the operation is performed based on the detected input. Further, in response to detecting the input directed to the first window and in accordance with a determination that the first window and the second window are not in the concurrent input mode, and that the first window is not active (e.g., the first window is associated with a currently running application but is not displayed in the foreground or is not the currently active window, e.g., the second window is the currently active window), computer system forgoes performing the operation in the respective application associated with the first window (e.g., input 1220 makes window 1202 active as shown in FIG. 12J). In some embodiments, when concurrent input mode is not active, limited functionality is available in the window that is overlaid by another window, where it is necessary to first activate the overlaid window so that the window responds to the input. In some embodiments, when the first window and the second window are displayed in an overlapping arrangement, the concurrent input mode is not active (e.g., as shown in FIG. 12J). In some embodiments, windows are displayed in the concurrent input mode when windows are displayed in the interactive mode in a non-overlapping arrangement (e.g., in the stage region 522, as show in FIG. 12N). In some embodiments, the input causes the first window to become active, e.g., the first window is brought to the foreground and becomes active, and the second window is pushed backward, where the first window is displayed at least partially overlaying the second window (e.g., FIG. 12J). In some embodiments, at least partial display of the second window is maintained when the first window is made active (e.g., if the first window overlays less than the whole second window) (e.g., if window 1304 is selected with input 1316, window 1302 is moved so that it remains visible, as shown in FIGS. 13M and 13N). In some embodiments, the application associated with the second window remains running, and the window remains open, even though it is in the background. In some embodiments, the first window and the second window are included in a virtual workspace that is associated with a concentration mode. In some embodiments, a concurrent input mode is a mode of interaction with windows displayed in a main interaction region (e.g., the stage region) available in the concentration mode, including displaying the first window and the second window the main interaction area (e.g., as opposed to displaying the first and second window at reduced scale representation in an inactive state, such as in a sidebar).

In some embodiments, in response to detecting the input directed to the first window and in accordance with a determination that the first window and the second window are not in the concurrent input mode and that the first window is not active, computer system makes (2010) the first window active (e.g., input 1220 makes window 1202 active in FIGS. 12I-12J). In some embodiments, an inactive window, included in a set of windows displayed in the main interaction region in a non-concurrent input mode, is activated (in response to a selection input), thereby performing an operation (making the window active) when a set of conditions has been met without requiring further user input (e.g., 908, FIG. 9F; 1212, FIGS. 12F-12G).

In some embodiments, in response to detecting the input directed to the first window and in accordance with a determination that the first window and the second window are not in the concurrent input mode and that the first window is not active, the computer system makes (2012) the second window inactive in addition to (or concurrently with) making the first window active (e.g., both windows 1202 and 1212 would be made active in FIGS. 12F-12G). An inactive window, included in a set of windows displayed in the main interaction region in a non-concurrent input mode, when activated (e.g., in response to a selection input) causes another window in the set of windows to become inactive, thereby performing an operation when a set of conditions has been met without requiring further user input (e.g., maintaining non-concurrent input mode for the set of windows displayed in the main interaction when a user manipulates content of the windows displayed in the non-concurrent input mode).

In some embodiments, in response to detecting the input directed to the first window, and in accordance with a determination that the first window and the second window are not in the concurrent input mode and that the first window is active, the computer system performs (2014) the operation in the respective application associated with the first window (e.g., input 1212 selects another email message in FIGS. 12G-12H). In some embodiments, content of an active window, included in a set of windows displayed in the main interaction region can be directly manipulated regardless of whether the set of windows are displayed in concurrent input mode or non-concurrent input mode (e.g., 1216, FIG. 12H).

Content of an active window, included in a set of windows displayed in the main interaction region, can be directly manipulated regardless of whether the set of windows are displayed in a concurrent input mode or a non-concurrent input mode, enhances the operability of the device, and makes the user interface more efficient (e.g., by providing an ability to switch between concurrent input mode and non-concurrent input mode while maintaining ability to manipulate content of windows in an active state).

In some embodiments, the first input is (2016) of the first type and the first input corresponds to a drag-and-drop input, where a selected item is dropped in the first window (e.g., photo 1540 is dragged into window 1546 as shown in FIGS. 15I-15O). In some embodiments, an application icon, or a file can be dragged from the desktop and dropped in the first window (to add the file, image, or other object to the first window). In some embodiments, there are types of inputs that are available for windows displayed in the main interaction region without regard to whether the windows are displayed in a concurrent input mode or a non-concurrent input mode. In some embodiments, other types of inputs are available for active windows of a set of windows displayed in the main interaction region and not available for inactive windows of the set of windows if the set of windows is in the non-concurrent input mode.

Content of active windows displayed in the concurrent input mode in the main interaction region can be manipulated by dragging and dropping an object to the respective windows, thereby reducing the number of inputs needed to perform an operation (e.g., visibility and state of the windows is maintained as a user drags and drops the object) and/or providing additional control options without cluttering the UI with additional displayed controls (e.g., there is no need windows for displaying control options for adding objects).

In some embodiments, the first input is of the first type (2018), and the first input is an input selecting an entry of multiple entries within the first window. In some embodiments, an input selecting an entry of multiple entries is a row selection input (e.g., selection 1212 selecting an email message in a list as shown in FIG. 12F-12G). Examples of a row selection input include selection of one conversation from a list of conversations in a messages application; selection of an email from a list of emails; selection of a song or album from a list of songs or albums, respectively; or selection of other entries or rows from a number of selectable entries of rows (e.g., 1216, FIG. 12H).

Content of active windows and content of windows displayed in the concurrent input mode in the main interaction region can be manipulated in response to detecting a row selection input, thereby reducing the number, extent, and/or nature of inputs needed to perform an operation In response to detecting the input directed to the first window and in accordance with a determination that the input is of the second type, the computer system performs (2020) an operation in the respective application associated with irrespective of whether the first window and the second window are displayed in concurrent input mode (e.g., selecting 1212 a message in FIG. 12F occurs no matter if the window 1204 is in a concurrent input mode or not). In some embodiments, windows that are not in a concurrent input mode can still be displayed in an interactive mode in the main interaction (e.g., the stage region), such that windows need not be selected from a sidebar (e.g., left strip or right strip) and brought to the stage region. In some embodiments, windows that are displayed in an overlapping arrangement in the main interaction region are not displayed in the concurrent input mode. In some embodiments, there are types of inputs that are available for windows displayed in the main interaction region without regard to whether the windows are displayed in concurrent input mode or non-concurrent input mode. In some embodiments, other types of inputs are available for active windows of a set of windows displayed in the main interaction region and not available for inactive windows of the set of windows if the set of windows is in the non-concurrent input mode.

When an input directed to a window included in a set of windows displayed in the main interaction region is of a second type that is different from the first type, the window responds to the input regardless of whether the window is an active state, or the set of windows are displayed in the concurrent input mode or the non-concurrent input mode, thereby performing an operation (e.g., allowing the interaction) when a set of conditions has been met without requiring further user input.

In some embodiments, the second type of input is (2022) a button activation input. When an input directed to a window included in a set of windows displayed in the main interaction region is a button activation input, the window responds to the button activation input regardless of whether the window is in an active state, or the set of windows are displayed in the concurrent input mode or the non-concurrent input mode, thereby enhancing the operability of the device, and making the user interface more efficient (e.g., by responding to button activation inputs regardless of arrangement and/or input mode in which windows are displayed, which reduces the number of inputs needed to interact with the windows).

In some embodiments, the second type of input is (2024) a scrolling input. When an input directed to a window included in a set of windows displayed in the main interaction region is a scrolling input, the window responds to the scrolling input regardless of whether the window is an active state, or the set of windows are displayed in concurrent input mode or non-concurrent input mode, thereby enhancing the operability of the device, and making the user interface more efficient (e.g., by responding to scrolling inputs regardless of whether the scrolling inputs are directed to a foreground window or a background window, which reduces the number of inputs needed to interact with the windows). For example if the user scrolled through the messages in window 1304 in FIG. 13J.

In some embodiments, in response to detecting the input directed to the first window and in accordance with a determination that the input is of the second type, computer system performs (2026) an operation in the respective application irrespective of whether the first window is active (e.g., in an active state). When an input directed to a window included in a set of windows displayed in the main interaction region is of a second type that is different from the first type, the window responds to the input regardless of whether the window is an active state, or the set of windows are displayed in the concurrent input mode or the non-concurrent input mode, thereby performing an operation when a set of conditions has been met without requiring further user input. For example, the clicking of the button or scrolling described above.

In some embodiments, in response to detecting the input is of the first type and that the input is directed to the second window (e.g., 1220 in FIG. 12J), and in accordance with a determination that the second window is in active state, the computer system performs (2028) an operation in a respective application associated with the second window irrespective of whether the first window is in active state (where the operation is performed based on the input). In some embodiments, content of an active window, included in a set of windows displayed in the main interaction region, can be directly manipulated regardless of whether the set of windows are displayed in the concurrent input mode or the non-concurrent input mode. Content of an active window, included in a set of windows displayed in the main interaction region, can be directly manipulated regardless of whether the set of windows are displayed in the concurrent input mode or the non-concurrent input mode, thereby performing an operation when a set of conditions has been met without requiring further user input and/or providing an ability to switch between the concurrent input mode and the non-concurrent input mode while maintaining an ability to manipulate content of windows displayed in an active state.

In some embodiments, the first window and the second window overlap at least partially (e.g., the first and the second window are in overlapping arrangement when one window occludes portions of the other window) (e.g., FIG. 12J). In response to detecting that the first window and the second window cease to (or no longer) overlap, the computer system activates (2030) the first window and the second window (e.g., 1224, FIG. 12N; 1226, FIG. 12O). In some embodiments, the first and second windows cease to overlap in response to user input changing the spatial arrangement of the first and second window (e.g., in relation to one another). In some embodiments, when windows cease to overlap in the main interaction region (e.g., the stage region), windows are automatically displayed in the concurrent input mode. Changing the mode of interaction from the non-concurrent input mode to the concurrent input for a set of windows displayed in the main interaction region (the stage region) in response to rearranging the set of windows from overlapping to non-overlapping, reduces the number, extent, and/or nature of inputs needed to perform an operation.

In some embodiments, in accordance with a determination that the first window is active, the computer system displays (2032) a visual indication that the first window is active (e.g., if window 1202 is active, it may be displayed with a brighter/lighter color in FIG. 12J). In accordance with a determination that the second window is active, the computer system displays a visual indication that the second window is active. In some embodiments, displaying a visual indication can include changing a brightness, shadow, simulated depth; changing size of the active window, such as making the active window larger (e.g., compared to inactive windows); changing layering order of the first and second window (e.g., the "z" order), such as the active window is brought to the foreground; or otherwise making the active window more prominent in relation to any inactive windows (e.g., 1202, FIG. 12F). Visually indicating which window(s) in a set of windows displayed in the main interaction region are active provides improved visual feedback to the user.

In some embodiments, in accordance with a determination that the first window is inactive, the computer system displays (2034) a visual indication that the first window is inactive (e.g., if window 1202 is active, window 1204 may be displayed with a darker color in FIG. 12J). In accordance with a determination that the second window is inactive, the computer system displays a visual indication that the second window is inactive. In some embodiments, displaying a visual indication can include changing a brightness, shadow, or simulated depth; changing size of the inactive window, such as making the inactive window smaller (e.g., compared to active windows); changing layering order of the first and second window (e.g., "z order"), such as the inactive window is sent to the background; or otherwise making the inactive window less prominent in relation to any active windows. Visually indicating which window(s) in a set of windows displayed in the main interaction region are inactive provides improved visual feedback to the user.

In some embodiments, while a respective window is in an active state, the computer system detects (2036) an occurrence of a condition corresponding to changing the respective window from the active state to an inactive state (e.g., selection 1212 making window 1204 active in FIG. 12F). In response to detecting the occurrence of the condition, the computer system changes an appearance of the window to indicate that a state of the respective window has changed from the active state to the inactive state. In some embodiments, in accordance with a determination that a change of state of the first window is detected (from a first state to a second state, such as from an active state to inactive state or vice versa), the computer system displays a visual indication indicating the change of state of the first window. Further, in accordance with a determination that a change of state of the second window is detected (from a first state to a second state, such as from an active state to inactive state or vice versa), the computer system displays a visual indication indicating the change of the second window (e.g., 1202, FIG. 12G). In some embodiments, when a window changes state from active to inactive or vice versa, a visual indication is provided indicating the respective change of state. For example, if window changes from inactive to active, the window increases in size, or if a window changes from active no inactive, the window decreases in size. Providing a visual indication indicating a respective change of state of a window displayed in the main interaction region, e.g., when a window changes state from active to inactive or vice versa, provides an improved visual feedback to the user.

In some embodiments, while the first window and the second window are concurrently displayed in a non-overlapping arrangement, the computer system detects (2038) an input that changes an arrangement of the first window and the second window from the non-overlapping arrangement to an overlapping arrangement (e.g., the input corresponds to moving the first window over the second window or vice versa, such as dragging and dropping input) (e.g., resizing window 1304 so it overlays 1302 in FIGS. 13A-13C). In response to detecting the input that changes the arrangement, the computer system transitions display of the first window and the second window from the concurrent input mode to non-concurrent input mode. In some embodiments, full functionality of concurrently displayed windows is available when the windows are displayed in concurrent input mode (e.g., in a main interaction region, such as the stage region), such that it is not necessary to first activate a window so that the window responds to user input and/or the windows displayed in the concurrent input mode respond to different types of inputs, regardless of the type of input. In some embodiments, when windows displayed in main interaction region are displayed in the non-concurrent input mode (e.g., concurrent input mode is not active), limited functionality is available in the window that is overlaid by another window, where it is necessary to first activate the overlaid window so that the window responds to the input. In some embodiments, based on a type of input that is detected, windows optionally respond to a user input regardless of whether the windows are in the concurrent input mode. In some embodiments, if a set of two or more windows are displayed in the concurrent input mode, the mode of interaction of the two or more windows changes from the concurrent input mode to the non-concurrent input mode in response to detecting that one window is dragged on top of another window in the set of two or more windows, thereby changing the mode of interaction in response to changing the layout or arrangement of the windows from non-overlapping to overlapping.

Automatically transitioning windows displayed in the concurrent input mode to the non-concurrent input mode when one window is dragged on top of another provides for efficient viewing and interacting with a plurality of open windows in a main interaction region on the same screen, thereby reducing the number, extent, and/or nature of inputs needed to perform an operation.

In some embodiments, while concurrently displaying the first window and the second window in an overlapping arrangement, the computer system detects (2040) an input that changes an arrangement of the first window and the second window from the overlapping arrangement to a non-overlapping arrangement (e.g., the input includes moving, resizing, or closing one or more windows, including the first window and/or the second window) (e.g., rearranging windows 1402, 1404, and 1406 in FIGS. 14N-14T). In response to detecting the input that changes the arrangement, the computer system transitions display of the first window and the second window from non-concurrent input mode to a concurrent input mode. In some embodiments, in accordance with a determination that two windows no longer overlap, the two windows are transitioned to a concurrent input mode. In some embodiments, if a set of two or more windows are displayed in non-concurrent input mode, the mode of interaction of the two or more windows changes from the non-concurrent input mode to the concurrent input mode in response to detecting a changes of an arrangement of windows such that there are no more overlapping windows, thereby changing the mode of interaction in response to changing layout or arrangement of the windows from non-overlapping to overlapping.

Automatically transitioning windows from non-concurrent input mode to concurrent input mode in response to detecting a change of an arrangement of windows such that there are no more overlapping windows, thereby changing the mode of interaction in response to changing a layout or an arrangement of the windows from non-overlapping to overlapping and/or providing for efficient viewing and interacting with a plurality of open windows in a main interaction region on the same screen, thereby reducing the number of inputs needed to perform an operation.

In some embodiments, in accordance with a determination that the first window and the second widow are concurrently displayed in an overlapping arrangement, and that there is sufficient space to display the first window and the second window in a non-overlapping arrangement (e.g., there is sufficient space in a main interaction region of a virtual workspace associated that is displayed on the display generation component), the computer system automatically (e.g., without user input directed to the first window or the second window) rearranges (2042) the first window and second window in a non-overlapping arrangement (e.g., windows 1402 and 1406 in FIGS. 14T-14V). In some embodiments, windows are rearranged automatically (without user input rearranging the windows) into a non-overlapping arrangement if there is room in the main interaction region to make them non-overlapping.

Automatically rearranging windows (without user input rearranging the windows) into a non-overlapping arrangement if there is room in the main interaction region to make them non-overlapping provides for efficient viewing and interacting with a plurality of open windows in a main interaction region of the same screen, thereby reducing the number, extent, and/or nature of inputs needed to perform an operation.

In some embodiments, the first window and the second widow are constrained (2044) to predefined sizes. In some embodiments, in a case where the first window and the second are displayed in a main interaction region or an application display area of a virtual workspace that is operating in a concentration mode, the size of windows, including the first and second windows, is constrained or limited to predefined sizes. In some embodiments, the predefined sizes are smaller compared to regular sizes of the windows when displayed in a normal mode. For example, in normal mode sizes of windows are constrained by the display generation component without being constrained to other predefined sizes. In some embodiments, the sizes of windows displayed in the main interaction region are limited to a plurality of discrete sizes, where a window cannot be adjusted to a size that is not predefined (e.g., a size that is in between two predefined sizes).

Limiting the size of the windows to predetermined or predefined sizes reduces the extent of inputs needed to resize a window and/or reduces clutter in the main interaction region, thereby providing for efficient viewing and interacting with a plurality of windows on the same screen, thereby reducing the number, extent, and/or nature of inputs needed to perform an operation.

In some embodiments, the predefined sizes are (2046) constrained in height, width, or height and width. Limiting size of windows to predetermined or predefined heights and/or widths reduces the extent of inputs needed to resize a window and/or reduces clutter in the main interaction region, thereby providing for efficient viewing and interacting with a plurality of windows on the same screen, thereby reducing the number of inputs needed to perform an operation.

In some embodiments, the predefined sizes are (2048) based on rational number ratios of an application display area of the display generation component (e.g., ¼, ⅓, ½, ⅔, ¾ of the application display area). In some embodiments, the application display area corresponds to the main interaction area (e.g., the stage region). In some embodiments, the main interaction is an application display area that is less than the whole display area, leaving room for sidebar regions optionally displaying groupings of open windows, minimized/inactive windows, or other regions such a dock including application launch icons. Limiting the size of windows to predetermined rational number ratios of the main interaction region reduces the number, extent, and/or nature of inputs needed to resize a window and/or reduces clutter in the main interaction region. Accordingly, providing for efficient viewing and interacting with a plurality of windows on the same screen and reducing the number, extent, and/or nature of inputs needed to perform an operation.

In some embodiments, in accordance with a determination that the first window is moved in an application display area of the display generation component, the computer system snaps (2050) the first window to a (non-displayed, predefined) grid of the display area (e.g., based on rational number ratios of the application display area). An organized arrangement of windows snapped to a grid can be seen for example in FIG. 14Y. In accordance with a determination that the second window is moved in an application display area of the display generation component, the computer system snaps the second window to a (non-displayed, predefined) grid of the display area (e.g., based on rational number ratios of the application display area). In some embodiments, if the first window and the second window are displayed in a main interaction region (or an application display area) of a virtual workspace that is operating in a concentration mode, when windows are resized in response to user input (e.g., a click and drag input), windows being resized automatically snap (without further user input) to the closest snap points/lines in a grid (e.g., 1202 and 1204 in FIGS. 12B-12C; 1202 in FIGS. 12E-12F; and 1202 in FIGS. 12R-12S). In some embodiments, by enlarging the first window by an amount that would cause the first window to occupy an area of the main interaction region that is occupied by the second window, the size of the second window is reduced (e.g., by the amount of size increase of the first window) to make room for the enlarged window, such that both the first window and the second window snap to predetermined positions on the grid (e.g., instead of causing overlap of between the first window and the second window).

Snapping windows to a predefined grid when the windows are moved in the main interaction region (e.g., the stage region) reduces the number, extent, and/or nature of inputs needed to resize a window.

In some embodiments, the first window and the second window are displayed in an overlapping arrangement. In accordance with a determination that there is sufficient space in a main interaction region (e.g., the stage region 522) to display the first window and the second window in a non-overlapping arrangement without resizing the first window or the second window, the computer system automatically (without user input resizing/moving the first or the second window) arranges (2052) the first window and the second window to reduce (e.g., minimize) an amount of overlap between the first window and the second window (e.g., spread out the windows to an extent possible within the stage region, e.g., arrangement is changed from overlapping to non-overlapping) (e.g., window 1406 and 1402 are moved to minimize overlap in FIGS. 14S-14T). In some embodiments, if application windows in the stage region include enough combined width/height to occupy entire width/height of the stage region, the application windows are automatically arranged to minimize overlap (e.g., movement of windows 1402, 1404, and 1406 in FIGS. 14W-14AE). In some embodiments, in addition to minimizing overlap between the first window and the second window, arrangement also minimizes the amount of combined movement (e.g., total movement of both the first window and the second window). Automatically arranging windows to minimize an amount of overlap when combined width/height of the windows occupy the main interaction region (e.g., full extent of the main interaction region), enhances the operability of the device, and makes the user interface more efficient (e.g., by readjusting windows into an organized manner, which reduces the number of inputs needed to position multiple open windows of different sizes in a main interaction region without impairing window content visibility and/or maximizing available screen space).

In some embodiments, arranging the first window and the second window in the non-overlapping arrangement includes aligning (2054) a first edge of the first window that is on an opposite side of a first edge of the second window, such that the first window is moved in a first direction opposite of the first edge of the first window and/or the second window is moved in a second direction opposite of the first direction (e.g., window 1404 is moved to the left in FIGS. 14AD-14AE). In some embodiments, the first window and the second window are both moved. In some embodiments, one of the first or the second window is moved without moving the other. In some embodiments, the first window and the second window are spread apart such that an edge of the first window that was overlapping the second window is aligned with an edge of the second window that was overlapping the first window prior the arrangement. In some embodiments, a right edge of the first window, which is displayed on a left side of the second application window, is aligned with a left edge of the second window, which is displayed on a right side of the first window. In some embodiments, a bottom edge of the first window, which is displayed on a top side of the second application window, is aligned with a top edge of the second window, which is displayed on a bottom side of the first window. In some embodiments, a left side or edge of a left application window is aligned with (undisplayed) left side of the stage region and a right side of right application window is aligned with (undisplayed) right side of the stage region. In some embodiments, a top side or edge of a top application window is aligned with (undisplayed) top side of the stage region and a bottom side of the bottom application window is aligned with (undisplayed) bottom side of the stage region.

When windows displayed in the main interaction region are rearranged to minimize the amount of overlap, the windows are spread out, such that edges of windows are aligned with undisplayed edges of the main interaction region (e.g., a left side of a an application window displayed on the left is aligned with a left side of the main interaction region and a right side of an application window displayed on the right is aligned with a right side of the main interaction region). Spreading out windows to minimize the amount of overlap enhances the operability of the device, and makes the user interface more efficient (e.g., by readjusting windows into an organized manner, which reduces the number of inputs needed to position multiple open windows of different sizes in a main interaction region without impairing window content visibility while at the same time maximizing available screen space).

In some embodiments, in accordance with a determination that there is insufficient space in the main interaction region (e.g., the stage region 522) to display the first window and the second window in a non-overlapping arrangement without resizing the first window or the second window, the computer system automatically (without user input resizing/moving the first or the second window) arranges (2056) the first window and the second window to be displayed less than a threshold distance from each other (e.g., spread out the windows to an extent possible within the stage region). For example, in FIGS. 14G-14H, the windows could be spread out to occupy the entire stage region. In some embodiments, if application windows in the stage region include enough combined width/height to occupy entire width/height of the stage region, the application windows are automatically arranged to minimize overlap. In some embodiments, in addition to minimizing overlap between the first window and the second window, arrangement also minimizes the amount of combined movement (e.g., total movement of both the first window and the second window). In some embodiments, a left side or edge of a left application window is aligned with (undisplayed) left side of the stage region and a right side of right application window is aligned with (undisplayed) right side of the stage region. In some embodiments, a top side or edge of a top application window is aligned with (undisplayed) top side of the stage region, and a bottom side of the bottom application window is aligned with (undisplayed) bottom side of the stage region.

If combined width/height of the windows occupy less than entirety of the main interaction region, when windows are automatically rearranged to remove overlap between the windows, the windows are moved less than a threshold distance from one another (e.g., reducing or minimizing gap between the windows), thereby enhancing the operability of the device, and making the user interface more efficient (e.g., by readjusting windows into an organized manner, which reduces the number of inputs needed to position multiple open windows of different sizes in a main interaction region without impairing window content visibility while at the same time maximizing available screen space).

In some embodiments, in accordance with a determination that two or more application windows, including the first window and the second window, are concurrently displayed in the main interaction region, the computer system arranges (2058) the two or more application windows to be centered in the main interaction area in addition to reducing an amount of overlap. Automatically arranging the two or more application windows to be centered in the main interaction area in addition to reducing an amount of overlap, enhances the operability of the device, and makes the user interface more efficient (e.g., by automatically organizing multiple open windows, which reduces the number of inputs needed to interact with the windows and unclutter the main interaction region).

In some embodiments, the computer system detects (2060) an input corresponding to a request to move the first window along a respective axis (e.g., vertically) (e.g., window 1406 in FIG. 14U). In response to detecting the input corresponding to the request to move the first window along the respective axis, and in accordance with a determination that the input corresponds to move the first window to a first position in a first range of positions along the respective axis, the computer system snaps the window to a first snapped position along the respective axis (e.g., window 1406 in FIG. 14V). In response to detecting the input corresponding to the request to move the first window along the respective axis, and in accordance with a determination that the input corresponds to move the first window to a second position in the first range of positions along the respective axis, the computer system snaps the window to the first snapped position along the respective axis. In response to detecting the input corresponding to the request to move the first window along the respective axis, and in accordance with a determination that the input corresponds to move the first window to a third position in a second range of positions along the respective axis, the computer system snaps the window to a second snapped position along the respective axis that is different from the first snapped position. In response to detecting the input corresponding to the request to move the first window along the respective axis, and in accordance with a determination that the input corresponds to move the first window to a fourth position in the second range of positions along the respective axis, the computer system snaps the window to the second snapped position along the respective axis (e.g., movement of window 1202 in FIGS. 12S-12T).

When application windows are moved in the main interaction region, the application windows automatically snap along a vertical axis to predetermined positions, such as top, bottom, or center positions or the application, the application windows automatically snap along a horizontal axis to left, right, or center positions, thereby enhancing the operability of the device, and making the user interface more efficient (e.g., by automatically organizing multiple open windows, which reduces the number of inputs needed to interact with the windows and unclutter the main interaction region).

In some embodiments, in response to detecting the input corresponding to the request to move the first window along the respective axis, the computer system moves (2062) a first column that includes the first window and a second column that includes the second window (e.g., positions of two adjacent columns that include application windows are swapped or switched) (e.g., window 1402 being moved in FIG. 14AA-14AE). In some embodiments, a plurality of application windows, including the first window and the second window, are organized in columns that can be moved together (e.g., movement of windows 1402 and 1406 in FIGS. 14W-14Y). Application windows are organized into columns in the main interaction region, where moving one application window within a respective column causes the column to move and swap with an adjacent column that includes another application window, thereby performing an operation when a set of conditions has been met without requiring further user input.

In some embodiments, the computer system detects (2064) a user input adjusting a spatial arrangement of a respective window in a main interaction region. In response to detecting the user input adjusting the spatial arrangement of the respective window, the computer system automatically readjusts spatial arrangement of windows displayed in the main interaction region while the user input adjusting the spatial arrangement of the respective window is being detected (e.g., window 1204 is automatically readjusted while user moves window 1202 in FIGS. 12A-12C). Readjusting spatial arrangement of windows in the main interaction region while a user input manipulates a respective window, enhances the operability of the device, and makes the user interface more efficient (e.g., by automatically organizing multiple open windows, which reduces the number of inputs needed to interact with the windows and unclutter the main interaction region).

In some embodiments, criteria for readjusting the spatial arrangement of the windows displayed in the main interaction region are based (2066) on original location of the windows in the main interaction region in addition to location and size of the respective window (e.g., the respective window is the one that is being manipulated in response to user input). Spatial arrangement of windows displayed in the main interaction region before a user input that manipulates spatial arrangement of a respective window is detected are included in the criteria for automatically readjusting the spatial arrangement of windows in response to the user input that manipulates spatial arrangement of the respective window, thereby enhancing the operability of the device, and making the user interface more efficient (e.g., by automatically organizing multiple open windows, which reduces the number of inputs needed to interact with the windows and unclutter the main interaction region).

It should be understood that the particular order in which the operations in have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1800, 1900, 2100, 2200, and 2300) are also applicable in an analogous manner to method 2000 described above with respect to FIGS. 20A-20D.

FIGS. 21A-21D are flow diagrams illustrating method 2100 of prevention of occlusion of windows, in accordance with some embodiments. Method 2100 is performed at an electronic device (e.g., laptop display device 300, tablet display device 100, or desktop display device in FIG. 1A; portable multifunctional device 100 in FIG. 2; or electronic device in FIG. 3A) with a display (e.g., display devices 101, 201, and 301 in FIGS. 1A-1B) and one or more input devices (e.g., a touch-sensitive display 101 of tablet device 100 in FIG. 1A; mouse input device 202, keyboard input devices 203 and 305, and touchpad 309 in FIG. 1B; or touchpad 355 in FIG. 3 and touch-sensitive surface 451 in FIG. 4B). Some operations in method 2100 are, optionally, combined and/or the order of some operations is, optionally, changed.

As described below, the method 2100 provides an improved mechanism for window management of open windows (optionally executed by multiple different applications) included in one or more virtual workspaces and/or included in one or more displays (e.g., connected or otherwise in communication). When concentration mode is activated, an electronic device automatically performs window management operations that unclutter and organize (e.g., in functional regions) a screen space or display area. For example, in response to activating the concentration mode, open windows are moved, shrunk, and/or grouped while at the same time maintaining visibility of and providing easy access to windows that have been moved, shrunk, and/or grouped (e.g., one click or tap away). In the concentration mode, a set of windows of a currently active window grouping are displayed in a main interaction region while other windows included in the same virtual workspace are grouped (e.g., by application or other criteria) and representations of such (non-active) window groups are displayed in a sidebar region (e.g., the left strip or an application switcher region) and optionally other non-active windows included in the currently active group are displayed at reduced scale in a window switcher region (e.g., a sidebar region, such as a right strip or the left strip if the left strip combines an application switcher and a window switcher regions). Method 2100 provides an improved mechanism for prevention of occlusion of windows displayed in an application interaction region (e.g., such as the stage region or the main interaction region), where spatial arrangement of windows is modified by the electronic device to maintain at least a predetermined amount of windows visible, thereby performing an operation when a set of conditions has been met without requiring further user input and/or reducing the number of inputs needed to perform an operation (e.g., inputs needed to activate or bring to the foreground an occluded window).

A computer system is in communication with a display generation component (e.g., a display, a display on a laptop, a touchscreen, a tablet, a smartphone, a heads-up display, a head-mounted display (HMD), and other integrated displays or separate displays) and one or more input devices (e.g., a trackpad, a mouse, a keyboard, a microphone, a touchscreen, a stylus, a controller, joystick, buttons, scanners, cameras, etc.). The computer system concurrently displays (2104), via the display generation component, a first window (e.g., 1304, FIG. 13A) and a second window (e.g., 1302, FIG. 13A). In some embodiments, the first window and the second window are overlapping (e.g., 1302 and 1304, FIG. 13B). In some embodiments, the first window and the second window are displayed in a non-overlapping arrangement, e.g., the sizes of both windows permit that they be displayed in the non-overlapping arrangement (e.g., 1302 and 1304, FIG. 13A). In some embodiments, the first window and second window are displayed in a main interaction region (e.g., the stage region 522), while representations of plurality of window groupings (e.g., windows grouped by application) are also displayed in a different region. In some embodiments, the computer system detects (2106) an input adjusting a spatial arrangement (e.g., a size, position and/or layer order) of the first window (e.g., 1301, FIG. 13B). In some embodiments, the input adjusting the spatial arrangement of the first window is an input changing location, size, position, order, or other characteristic of the first window on the display. In some embodiments, the first input adjusting the spatial arrangement of the first window corresponds to a movement of the window (changing its location), e.g., dragging the first window in a first direction over the second window, thereby causing the second window to shift horizontally in the opposite direction, e.g., to slide or shift under the first window to maintain at least a minimum amount of the second window visible and free from occlusion by the first window (e.g., window 1302 slides horizontally to maintain visibility of portion 1306, FIG. 13C). In some embodiments, the second window moves or shifts before the first window is dropped on top of the second window. In some embodiments, the input adjusting the spatial arrangement of the first window corresponds to resizing the first, window, e.g., enlarging the first window to occlude more than a predetermined amount of the second window (e.g., 1301, FIG. 13C). In some embodiments, the input adjusting the spatial arrangement of the first window includes changing a layering order between overlapping windows (e.g., by clicking on a larger window that is displayed in a background causing the later window to be displayed in the foreground) (e.g., input 1316 causing window 1302 to shift, FIGS. 13M-13N). In response to detecting the input adjusting the spatial arrangement of the first window and in accordance with a determination that the spatial arrangement of the first window is adjusted such that the first window occludes the second window leaving less than a predetermined amount of the second window visible, the computer system moves (2108) (without user input directed to the second window) the second window at least by an amount sufficient to keep at least the predetermined amount visible (e.g., 1306, FIG. 13D). In some embodiments, in accordance with a determination that the first window is adjusted such that the first window occludes the second window by more than the predetermined amount, moving (without user input directed to the second window) the second window such that at least a sufficient portion (e.g., 1306, FIG. 13D) of the second window remains visible. In some embodiments, the second window is moved laterally or horizontally, e.g., the window slides over from one side of the display to the other. In some embodiments, a window movement policy includes moving the second window so that it takes advantage of the space revealed or freed by the movement of the first window. In some embodiments, the second window is moved if there are no other application windows that would be occluded by the second window, e.g., in accordance with a determination that there is space that is revealed by the movement of the first window (e.g., when adjusting the window includes moving it without enlarging it) (e.g., 1434, FIGS. 14T-14V). In some embodiments, in addition to moving the second window, the size of the second window is reduced (e.g., if adjusting the first window includes enlarging the window, the second window's size is reduced in accordance with a determination that no additional space is revealed/freed). For example, the size of the second window is reduced, and the second window is moved backward behind the first window, where only a small portion (e.g., 1306, FIG. 13D) of the second window is visible. In some embodiments, if a user clicks on the small portion of the second window that is visible, the previous state of the user interface is restored (e.g., 1302, FIG. 13E), where the second window is displayed at its original position prior adjusting the first window and is also displayed at its original size. In some embodiments, based on the distance necessary to move the second window, the computer system determines whether to move the window towards the left, right, or bottom edge of the first window.

Automatically moving a first window (without user input directed to the first window), which is being occluded by a second window, in response to spatial adjustment of the second window to maintain visibility of the first window (e.g., maintain at least a sufficient portion of the occluded window visible), reduces the number, extent, and/or nature of inputs needed to perform an operation (e.g., reduces the inputs needed to find and bring an occluded window to the foreground).

In some embodiments, the input adjusting the spatial arrangement of the first window includes (2110) moving the window in a first direction (e.g., 1202, FIGS. 12A-12C). In some embodiments, the window is moved laterally or horizontally along the x-axis, e.g., from left to right side or from right to left side (e.g., away from a first edge of the display towards a second opposite edge of the display). In some embodiments, the window is moved vertically along the y-axis (e.g., moving away from bottom edge of the display towards the top edge of the display or vice versa). Automatically moving a first window (without user input directed to the first window), which is being occluded by a second window, in response to detecting movement of the second window to maintain visibility of the first window (e.g., maintain at least a sufficient portion of the occluded window visible), reduces the number of inputs needed to perform an operation (e.g., reduces the inputs needed to find and bring an occluded window to the foreground).

In some embodiments, wherein the input adjusting the spatial arrangement of the first window includes (2112) resizing (e.g., enlarging) the first window. In some embodiments, the window is enlarged by selecting a corner/edge of the window and dragging the corner/edge of the window (optionally, without release of the focus selector or lift off the finger from a touch-sensitive input device, such as a trackpad or touchscreen) (e.g., 1202, 1222, FIGS. 12K-12M). In some embodiments, resizing the first window corresponds to enlarging the first window so that it overlays by more than a predetermined portion of the second window, thereby occluding or precluding visibility of the second window with more than a predetermined amount. Automatically moving a first window (without user input directed to the first window), which is being occluded by a second window, in response to detecting resizing (e.g., enlarging) of the second window to maintain visibility of the first window (e.g., maintain at least a sufficient portion of the occluded window visible), reduces the number, extent, and/or nature of inputs needed to perform an operation (e.g., reduces the inputs needed to find and bring an occluded window to the foreground) and/or performs an operation when a set of conditions has been met without requiring further user input.

In some embodiments, in response to detecting the input adjusting the spatial arrangement of the first window and in accordance with a determination that the spatial arrangement of the first window is adjusted such that the first window occludes the second window leaving more than the predetermined amount of the second window visible, the computer system forgoes (2114) moving the second window (e.g., window 1302 is not moved in FIG. 13B). When the spatial arrangement of a first window is adjusted in a way that it does not occlude a second window by more than the predetermined amount, the second window is not moved even if occluded, thereby performing an operation when a set of conditions has been met without requiring further user input (e.g., maintaining an occluded window visible without excessive readjustment of windows displayed in a main interaction region).

In some embodiments, the input adjusting the spatial arrangement of the first window includes (2116) changing a layering order between the first window and the second window. For example, when the input adjusting the spatial arrangement is detected the first window is the background and, in response to the input, the first window is moved one layer up in a "z" order (e.g., along a simulated z-axis) by bringing the first window to the foreground, thereby occluding (partially or completely) the second window (e.g., 912, 908, FIG. 9F). Automatically moving a first window (without user input directed to the first window) to maintain visibility of the first window (e.g., maintain at least a sufficient portion of the occluded window visible), which is being occluded by a second window in response to detecting that the second window is brought to the foreground, reduces the number of inputs needed to perform an operation (e.g., reduces the inputs needed to find and bring an occluded window to the foreground).

In some embodiments, moving the window in the first direction corresponds (2118) to moving the first window in a direction towards the second window. Further, the computer system moves the second window at least by an amount sufficient to keep at least the predetermined amount visible includes moving the second window (without user input directed to the second window) in a direction opposite of the first direction (e.g., such respective positions of the first window and the second window relative to each other are shifted). In some embodiments, the second window (the one that is being occluded) slides underneath (e.g., while the second window is being displayed in the background and the first window is in the foreground) the first window that is being moved over or on top of the second window (e.g., 1302, FIGS. 13B-13C).

Automatically moving a first window (without user input directed to the first window), which is being occluded by a second window, to maintain visibility of the first window (e.g., maintain at least a sufficient portion of an occluded window visible), by shifting the first window such that a predetermined portion remains visible and is extending out during the shifting (e.g., the first window appears to slide underneath the second window), reduces the number of inputs needed to perform an operation (e.g., maintain visibility of windows that are being occluded by other windows that are being moved).

In some embodiments, the second window is (2120) moved horizontally (e.g., laterally, such as from left to right or from right to left). Automatically moving a first window (without user input directed to the first window) to maintain visibility of the first window (e.g., maintain at least a sufficient portion of the occluded window visible), which is being occluded by a second window in response to detecting movement of the second window horizontally, performs an operation when a set of conditions has been met without requiring further user input and/or reduces the number, extent, and/or nature of inputs needed to perform an operation (e.g., reduces the inputs needed to find and bring an occluded window to the foreground) (e.g., 1302, FIGS. 13B-13C).

In some embodiments, the second window is (2122) moved vertically (e.g., upwards, or downwards, or up, or down). In some embodiments, whether the second window is moved horizontally or vertically depends on a direction of any free space that is being revealed (e.g., by movement of the first window). In some embodiments, whether the second window is moved horizontally, vertically, or diagonally minimizes the amount of movement necessary to move the second window and/or maximizes the amount of free space that is available. Automatically moving a first window (without user input directed to the first window) to maintain visibility of the first window (e.g., maintain at least a sufficient portion of the occluded window visible), which is being occluded by a second window in response to detecting vertical movement of the second window, reduces the number, extent, and/or nature of inputs needed to perform an operation (e.g., reduces the inputs needed to find and bring an occluded window to the foreground) (e.g., 1406, FIGS. 14I-14J).

In some embodiments, in response to detecting the input adjusting the spatial arrangement of the first window and in accordance with a determination that an amount of movement along a first axis (e.g., horizontal axis) needed to maintain the second window visible is more than an amount of movement along a second axis (e.g., a vertical axis) and less than the amount of movement along the second axis multiplied by a predetermined multiplier, the computer system moves (2124) the second window along the first axis. For example, the first axis is prioritized over the second axis even if the amount of movement along the first axis needed to maintain the second window visible would be more than the amount movement along the second axis (e.g., horizontal movement of window 1302 is prioritized over vertical movement in FIGS. 13M-13N). Further, in accordance with a determination that the amount of movement along a first axis is more than the amount of movement along the second axis multiplied by the predetermined multiplier, the computer system moves the second window along the second axis. For example, the first axis is no longer prioritized when the amount of movement along the first axis would be more than the amount movement along the second axis multiplied by a predetermined multiplier. In some embodiments, movement along a first axis (e.g., horizontal axis) is assigned priority relative to movement along a second axis (e.g., a vertical axis). In some embodiments, even if the amount of movement of the second window along the second axis would be less than the amount of movement along the first axis to preserve visibility of at least the predetermined amount of the second window, the second window is moved along the first axis. For example, the amount of movement along the first axis needs to be more than the amount of movement along the second axis multiplied by a predetermined multiplier, such as 1.5, 2.0, or a different multiplier.

Prioritizing movement along a first axis over movement along a second axis when moving a window to maintain visibility of the window, enhances the operability of the device, and makes the user interface more efficient (e.g., by readjusting windows into an organized manner, which reduces the number of inputs needed to position multiple open windows of different sizes in a main interaction region without impairing window visibility and/or maximizing available screen space). In some embodiments, the movement along the first axis includes (2126) movement of the second window leftward or rightward, and the movement along the second axis includes movement of the second window vertically from top to bottom. For example, movement of window 1302 horizontally in FIG. 13M. Prioritizing movement along a horizontal axis (e.g., moving an occluded window in a leftward or rightward direction) over movement along a vertical (e.g., moving the occluded window in a direction from top to bottom) when moving a window to maintain visibility of the window, enhances the operability of the device, and makes the user interface more efficient (e.g., by readjusting windows into an organized manner, which reduces the number of inputs needed to position multiple open windows of different sizes in a main interaction region without impairing window visibility and/or maximizing available screen space). This can be seen, for example, in FIGS. 13M-13N.

In some embodiments, in response to detecting the input adjusting the spatial arrangement of the first window, and in accordance with a determination that an amount of movement in a first direction needed to maintain the second window visible is more than an amount of movement in a second direction, the computer system moves (2128) the second window in the second direction (e.g., window 1302 is moved to the left instead of the right in FIGS. 13M-13O). In accordance with a determination that the amount of movement in the first direction is no more than the amount of movement in the second direction, the computer system moves the second window in the first direction. For example, if movement of the window in a leftward direction is less than movement of the window in the rightward direction, the window is moved in the leftward direction. In some embodiments, a direction of movement of the second window is selected to minimize an amount of movement necessary to keep at least the predetermined amount of the second window visible. For example, movement of the second window is selected to minimize total movement of the second window.

When a window is moved in response to detecting that less than the predetermined amount of the second window would remain visible if the second window is not moved, direction of the movement of the window is selected to minimize the total movement of the second window, thereby performing an operation (e.g., automatically moving the window in a direction) when a set of conditions has been met (e.g., determining which distance is less) without requiring further user input.

In some embodiments, the first window and the second window are displayed concurrently with a third window (e.g., the first, second, and third windows can be displayed in the stage region in an overlapping or non-overlapping arrangement) (e.g., FIG. 14W). In response to detecting the input adjusting the spatial arrangement of the first window, and in accordance with a determination that the spatial arrangement of the first window (e.g., window 1406 in FIG. 14X) is adjusted such that: the first window occludes the second window (e.g., window 1406 in FIG. 14X) leaving less than a predetermined amount of the second window visible, and the first window occludes the third window (e.g., window 1402 in FIG. 14X) leaving less than a predetermined amount of the third window visible, the computer system moves (2130) the second window by a first amount sufficient to keep at least the predetermined amount of the second window visible; and the computer system moves the third window at least by a second amount sufficient to keep at least the predetermined amount of the third window visible. In some embodiments, multiple windows can be moved in response to the input adjusting the spatial arrangement of the first window (e.g., movement of windows 1402, 1404, and 1406 in FIGS. 14W-14Y). When a plurality of windows would be occluded in response to spatial adjustment of a first window, leaving less than a predetermined amount of the plurality of windows visible, the plurality of windows are moved by amounts sufficient to keep at least the predetermined amount of the plurality of windows visible, thereby performing an operation when a set of conditions has been met without requiring further user input.

In some embodiments, the second window is (2132) moved in a direction different from a direction in which the third window is moved (e.g., one window can be moved towards the left edge and the one window can be moved towards the right edge) (e.g., movement of windows 1402, 1404, and 1406 in FIGS. 14W-14Y). When a plurality of windows would be occluded in response to spatial adjustment of a first window, leaving less than a predetermined amount of the plurality of windows visible, the plurality of windows are moved in different directions by amounts sufficient to keep at least the predetermined amount of the plurality of windows visible, thereby performing an operation when a set of conditions has been met without requiring further user input.

In some embodiments, the computer system detects (2134) an input corresponding to a request to move the second window (e.g., window 1406 in FIG. 14G) in front of the first window (e.g., window 1404 in FIG. 14G) in a window layer order. In response to detecting the input corresponding to the request to move the second window in front of the first window in the window layer order, the computer system moves the second window in front of the first window in the window layer order and shifts the second window back toward (or, optionally, to) a position at which the second window was displayed prior to the adjustment of the spatial arrangement of the first window that occluded the second window (e.g., 1406, FIG. 14H). When the second window that is occluded by the first window is moved in front of the first window, the second window is moved automatically back toward (or, optionally, to) a position at which the second window was displayed prior to the adjustment of the spatial arrangement of the first window that occluded the second window, thereby performing an operation when a set of conditions has been met without requiring further user input.

In some embodiments, the computer system detects (2136) an input reversing at least a portion of the adjustment of the spatial arrangement of the first window (e.g., in FIG. 12V, window 1202 is first moved to the left, and then later, in FIG. 12W, moved to the right). In some embodiments, the input reversing the adjustment can be detected before terminating the adjustment input but after moving the second window at least by the amount sufficient to keep at least the predetermined amount visible (e.g., window 1202 is only partially moved back in FIG. 12W). In response to detecting the input reversing at least a portion of the adjustment of the spatial arrangement of the first window and in accordance with a determination that a first position of the second window shifted relative to a second position of the first window in response to detecting input adjusting the spatial arrangement of the first window, the computer system shifts the second window back toward (or, optionally, to) a position at which the second window was displayed prior to the adjustment of the spatial arrangement of the first window that occluded the second window (e.g., as shown in FIG. 12X).

Automatically shifting the second window back toward (or to) a position at which the second window was displayed prior to the adjustment of the spatial arrangement of the first window that occluded the second window, if adjustment to first window is removed, thereby performing an operation when a set of conditions has been met without requiring further user input.

In some embodiments, the first window (e.g., window 1402 in FIG. 14I) and the second window (e.g., window 1406 in FIG. 14I) are displayed concurrently with a fourth window (e.g., window 1404 in FIG. 14I) (e.g., the first, second, and fourth windows can be displayed in the stage region in an overlapping or non-overlapping arrangement). The computer system detects (2138) an input (e.g., input 1422 in FIG. 14I) adjusting a spatial arrangement between the first window, the second window, and the fourth window, including occluding the second window (e.g., window 1406 in FIG. 14I) at least by one of the first window or the fourth window while at least the predetermined amount of the second window is visible. In response to detecting the input adjusting the spatial arrangement between the first window, the second window, and the fourth window, and in accordance with a determination that the second window is occluded by the first window and the fourth window, and that no more than the predetermined amount of the second window is visible, the computer system moves the second window so that the second window is no longer occluded by both the first window and the fourth window (e.g., window 1406 is moved as shown in FIG. 14J). In accordance with a determination that the second window is occluded by one of the first window and the fourth window and that no more than the predetermined amount of the second window is visible, the computer system forgoes moving the second window. When a respective window is occluded by two other windows, the respective window is automatically moved to avoid occlusion by the two other windows even though at least the predetermined amount of the respective window was visible prior the movement, thereby performing an operation when a set of conditions has been met without requiring further user input.

In some embodiments, the first window (e.g., window 1404 in FIG. 14W) and the second window (e.g., window 1406 in FIG. 14W) are displayed concurrently with a fifth window (e.g., window 1402 in FIG. 14W) (e.g., the first, second, and fifth windows can be displayed in the stage region in an overlapping or non-overlapping arrangement). In response to detecting the input (e.g., input 1436 in FIG. 14X) adjusting the spatial arrangement of the first window and in accordance with a determination that the spatial arrangement of the first window is adjusted such that the first window occludes the second window and the fifth window, leaving less than the predetermined amount of the second window and the fifth window visible, the computer system moves (2140) (without user input directed to the second window) the second window (e.g., window 1406 moved in a first direction to the right in FIG. 14Y) towards a first edge of the first window (e.g., left, right, or bottom edge), and moves (without user input directed to the third window) the fifth window (e.g., in some embodiments, window 1402 is moved, not as shown in the right direction in Figure Y, but in a second direction different from the first direction) towards a second edge of the first window different from the first edge, wherein the second window and the fifth window are moved at least by the amount sufficient to keep at least the predetermined amount of the second and the fifth window visible. In some embodiments, if multiple windows would be occluded in response to adjusting the spatial arrangement of the first window, the windows can be moved to different edges of the first window (e.g., left, right, and/or bottom). If multiple windows would be occluded in response to adjusting the spatial arrangement of the first window, the windows are moved to different edges of the first window (e.g., left, right, and/or bottom), thereby enhances the operability of the device, and makes the user interface more efficient (e.g., by readjusting windows into an organized manner, which reduces the number of inputs needed to position multiple open windows of different sizes in a main interaction region without impairing window visibility and/or maximizing available screen space).

In some embodiments, the first window (e.g., window 1404 in FIG. 14W) and the second window (e.g., window 1406 in FIG. 14W) are displayed concurrently with a sixth window (e.g., window 1402 in FIG. 14W) (e.g., the first, second, and sixth windows can be displayed in the stage region in an overlapping or non-overlapping arrangement). In response to detecting the input (e.g., input 1436 in FIG. 14X) adjusting the spatial arrangement of the first window and in accordance with a determination that the spatial arrangement of the first window is adjusted such that the first window occludes the second window and the sixth window leaving less than the predetermined amount of the second window and the sixth window visible, and that the second window and the sixth window are closest to a respective edge of the first window relative to other edges of the first window, the computer system moves (2142) the second window and the sixth towards the respective edge of the first window (e.g., windows 1402 and 1406 are moved to the right in FIG. 14Y), wherein the second window and the sixth window are displayed in a predefined arrangement at the respective edge that makes at least a predetermined portion of the second window visible and at least a predetermined portion of the sixth window visible (e.g., in FIG. 14Y the entire windows are visible). In some embodiments, the predefined arrangement includes a stacked arrangement in which the different windows in the predefined arrangement are spaced apart along at least one axis (e.g., an axis that is perpendicular or substantially perpendicular to the respective edge of the first window). In some embodiments, if multiple windows would be occluded in response to adjusting the spatial arrangement of the first window, and two or more of the occluded windows are closest to the same edge of the first window (in comparison to other edges of the first window), the windows are stacked at that edge. If multiple windows would be occluded in response to adjusting the spatial arrangement of the first window, the windows are moved to the same edge of the first window when that edge is the closest one for all the windows that are moved, thereby performing an operation when a set of conditions has been met without requiring further user input.

In some embodiments, the first window and second window are concurrently displayed with a seventh window (e.g., the first, second, and sixth windows can be displayed in the stage region or other main interaction region), and moving the second window at least by the amount sufficient to keep at least the predetermined amount visible includes (2144) moving the second window towards a center of a display area (e.g., center of the whole display area or center of the main interaction area, stage region, or application display area) irrespective of whether the second window would overlap with the seventh window (e.g., window 1406 moves to the center of stage region 522, FIG. 1406). In some embodiments, a window is not constrained from moving toward a center of a display area (e.g., a main interaction region) if that movement would allow to keep at least the predetermined amount of the window visible, even if the movement would cause the window to overlap with yet another window, thereby enhancing the operability of the device, and making the user interface more efficient (e.g., by readjusting windows into an organized manner, which reduces the number of inputs needed to position multiple open windows of different sizes in a main interaction region without impairing window visibility and/or maximizing available screen space).

It should be understood that the particular order in which the operations in FIGS. 21A-21D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1800, 1900, 2000, 2200, and 2300) are also applicable in an analogous manner to method 2100 described above with respect to FIGS. 21A-21D.

FIGS. 22A-22G are flow diagrams illustrating method 2200 of window management and desktop interaction, in accordance with some embodiments. Method 2200 is performed at an electronic device (e.g., laptop display device 300, tablet display device 100, or desktop display device in FIG. 1A; portable multifunctional device 100 in FIG. 2; or electronic device in FIG. 3A) with a display (e.g., display devices 101, 201, and 301 in FIGS. 1A-1B) and one or more input devices (e.g., a touch-sensitive display 101 of tablet device 100 in FIG. 1A; mouse input device 202, keyboard input devices 203 and 305, and touchpad 309 in FIG. 1B; or touchpad 355 in FIG. 3 and touch-sensitive surface 451 in FIG. 4B). Some operations in method 2200 are, optionally, combined and/or the order of some operations is, optionally, changed.

As described below, the method 2200 provides an improved mechanism for window management of multiple open windows (optionally executed by multiple different applications) included in a virtual workspace and interaction with a desktop and respective icons included in the desktop of the virtual workspace. A concentration mode is activated (e.g., in response to user input) that causes an electronic device to automatically perform window management operations that unclutter a screen space, e.g., by moving, shrinking, and/or grouping open windows by application or other criteria, and by hiding icons displayed on the desktop. While in concentration mode, a desktop mode can be invoked such that icons on the desktop are redisplayed and a user can interact with the icons on the desktop while retaining organization of open windows into window groupings, thereby allowing a user to add icons from the desktop to windows displayed in an interactive mode in a main interaction region (e.g., an application display region such as the stage region) and/or add icons from the desktop to representations of window groupings (e.g., a cluster or stack of window thumbnails) and/or thereby reducing the number of inputs needed to perform an operation. Further, window groupings and windows active in the main interaction region automatically move out of the way of redisplayed icons while maintaining visibility of at least portions of the window groupings and active windows or maintaining easy access and ability to redisplay the window groupings and/or active windows if removed, such that a user can return to state of the virtual workspace in concentration mode prior entering desktop mode, thereby reducing the number of inputs needed to perform an operation (e.g., allowing back and forth interaction with icons and window groupings and/or windows in interactive mode).

A computer system is in communication with a display generation component (e.g., a display, a display on a laptop, a touchscreen, a tablet, a smartphone, a heads-up display, a head-mounted display (HMD), and other integrated displays or separate displays) and one or more input devices (e.g., a trackpad, a mouse, a keyboard, a microphone, a touchscreen, a stylus, a controller, joystick, buttons, scanners, cameras, etc.). While in a first mode, the computer system concurrently displays (2202) a first set of windows over a desktop (e.g., 1502, FIG. 15A), which includes one or more selectable icons (e.g., 1506, FIG. 15A) in a respective portion of the desktop. In some embodiments, the first mode corresponds to a normal mode. In some embodiments, in the normal mode, a screen is not divided into a region for interaction (e.g., the stage region), a region for switching to open windows of another application or another window grouping, and/or a region for switching windows in the main region for interaction (e.g., the right strip). Also, in the normal mode, any icons on a desktop that are not occluded by displayed windows are visible (e.g., as opposed to hidden). In some embodiments, in normal mode, the screen is not automatically decluttered and open windows are not automatically grouped together, and/or the screen is cluttered with open windows and/or icons. In some embodiments, the one or more selectable items are not occluded by the windows in the first set of windows, and the one or more selectable items are not hidden (e.g., icon 1506, FIG. 15A). In some embodiments, the desktop can include icons that are not visible because they are occluded by a window (e.g., icons 1534 in FIG. 15I are hidden behind window 1510 in FIG. 15A). In some embodiments, in a second mode, a plurality of icons from the desktop (or all icons from the desktop), including the icons that were selectable and visible in the normal mode, are hidden from display and cannot be selected in the second) (e.g., icons are hidden in FIG. 15B). The computer system detects (2203) a first input requesting to switch from the first mode to a second mode (e.g., 1518, FIG. 15A). In some embodiments, the second mode is the concentration mode. In some embodiments, in the second mode a user can focus on interacting with one or more windows. In one example, a user can focus on interacting with a single window displayed in the main interaction region (e.g., 1610, FIG. 16I) and representations of associated windows of the same application are displayed in the right strip (e.g., 556*b*, FIG. 16I). In another example, a user can focus on interacting with two or more windows associated with a composite set of applications displayed in the main interaction region that belong to the same window group, where the windows can be in an overlapping arrangement or a side-by-side arrangement (1604 and 1610, FIG. 16D). In some embodiments, while a user focuses on interacting with windows of the same group that are displayed in the main interaction region, visibility of representation of other window groups is maintained in a second region, e.g., the left strip or application switcher region (e.g., 556, FIG. 16D), and associated windows in the same group, if any, are displayed in a third region, e.g., the right strip or window switcher region (e.g., 556*b*, FIG. 16D), where respective windows can be quickly selected for display in the interactive region.

In some embodiments, in contrast to the normal mode, desktop icons (including the selectable desktop items displayed in the respective portion of the desktop) are hidden from display (e.g., 1504, 1506, and 1508 in FIG. 15A). In some embodiments, in the second mode (e.g., FIG. 15B), a user can focus on one window grouping at a time without the need to switch to a separate desktop, and, at the same time, a use can quickly switch between window groupings in the same desktop or between windows that belong to the same grouping or otherwise associated with one another. In some embodiments, switching to the second mode is in response to selecting a dedicated affordance (e.g., 1520, FIG. 15A), a key combination on a keyboard, movement of a focus selector to a predetermined region on the screen, and/or other means or input modalities for activating the second mode (e.g., 1524, FIG. 15C). In response to detecting the first input, the computer system displays (2204) concurrently, in the second mode (e.g., concentration mode or continuous concentration mode), one or more windows of the first set of windows (e.g., in stage region 522, FIG. 15B) and the respective portion of the desktop without displaying the one or more selectable icons (e.g., the area of desktop 1502 where icons 1506 are located, but without the icons as shown in FIG. 15B).

In some embodiments, in response to the detecting the first input, windows (e.g., all open windows) are moved off the screen, with just the edges of the windows visible at the side of the screen, giving the user clear access to the desktop and any icons on it (e.g., an embodiment in which windows 1510 and 1512 in FIG. 15A are moved off the screen, with edge portions of the windows visible at the side of the screen, revealing icons 1534 as shown in FIG. 15I).

While displaying the one or more windows in the second mode and the respective portion of the desktop without displaying the one or more selectable icons, the computer system detects (2206) a second input directed to a respective window displayed in the second mode (e.g., a window in stage region 522, FIG. 15B). In some embodiments, the respective portion of the desktop can be blurred while remaining accessible for selection. In response to detecting the second input directed to the respective window displayed in the second mode, the computer system performs (2208) an operation in a respective application that is associated with the respective window (e.g., an input that selects an email for reading or selects a compose affordance for writing a new email in FIG. 15B). In some embodiments, a user can interact with or manipulate content of the first set of windows displayed in the first mode or the subset of windows displayed in the second mode. In some embodiments, in the second mode, windows that are open and/or visible in the normal mode (and can be interacted with) are grouped by application (e.g., windows associated with the same application are grouped together automatically), and one or more corresponding representations of respective groupings are displayed in a separate region for selecting window groupings (e.g., strip 556, FIG. 15B), where a currently active window is displayed in the second mode in a view in which the active window can be interacted with (e.g., in the stage region in which windows are displayed in the interactive mode) (e.g., stage region 522, FIG. 15B), and the window groupings are concurrently displayed with the active window in a display region of the display. In some embodiments, a representation of window grouping includes a representation of each window in the window grouping (e.g., a cluster or stack of window thumbnails). In some embodiments, layout of windows is preserved when the windows are displayed in a window grouping. For example, if a respective set of windows is displayed in a first arrangement in the main interactive region in the second mode, in response to switching to a different window grouping, the respective set of windows are displayed at reduced scale in the first arrangement at one of the window grouping slots in the region for selecting a window grouping.

In some embodiments, in response to detecting the first input, the computer system displays (2210) the one or more windows of the first set of windows in an interactive mode (e.g., windows in stage region 522, FIG. 16A) concurrently with one or more representations of window grouping displayed in a non-interactive mode (e.g., representations in strip 556, FIG. 16A). In some embodiments, in response to switching from the normal mode to the concentration mode, one or more windows remain displayed in interactive mode in a main interaction region, such as the stage region, while the remaining windows that are open and are associated with the desktop, are automatically grouped and displayed in a sidebar, such as the left strip, such that a user first activates or selects a window grouping from a sidebar region (e.g., strip 556, FIG. 16A), to manipulate content of windows that belong to the window grouping. Additionally, the desktop is optionally blurred and/or icons on the desktop are hidden, thereby uncluttering the display. Switching from a normal mode (e.g., where windows included in a virtual workspace are not necessarily organized by application or other criteria, and/or windows in the background can be completely occluded, and/or minimized windows are hidden from view, and/or icons can be occluded by windows displayed on top of them) to a concentration mode, automatically (e.g., without further user input directed to open windows) adds open windows into a number of window groups (e.g., grouped by application, where grouped windows are displayed in a non-interactive mode), removes open background windows from a main interaction area (and optionally collects hidden minimized windows into the window groups), hides desktop icons that were previously displayed in the normal mode, provides representations of respective window groups in a sidebar region, and/or maintains one or more currently active windows in the main interaction area in interactive mode, thereby automatically organizing open windows in the virtual workspace. Automatically organizing open windows in a virtual workspace while maintaining a subset of windows in the main interaction region unclutters the virtual workspace and allows a user to focus on manipulating content of windows in the main interaction region while maintaining visibility of windows that are removed from the main interaction region (e.g., visibility of window groupings), thereby reducing the number, extent, and/or nature of inputs needed to manage multiple open windows from different applications in a limited screen area.

In some embodiments, the computer system receives (2212) a third input to display the one or more selectable icons in the respective portion of the desktop. In some embodiments, the third input corresponds to a click or tap on an unoccupied area on the desktop. In some embodiments, the third input corresponds to a request to enter desktop mode without exiting the concentration mode). In response to receiving the third input, the computer system displays (or redisplays) the one or more selectable icons in the respective portion of the desktop without exiting the second mode. In some embodiments, in response to detecting the third input, the electronic device enters a desktop mode without exiting the second mode (e.g., without exiting concentration mode), in which icons that were previously hidden in response to activating the second mode, are revealed or redisplayed without dissolving organization of the display, e.g., without dissolving any automatically generated window groupings and/or layout and interaction modalities associated with windows displayed in the stage region (or main interaction region) (e.g., transition from FIG. 14F to FIG. 15G). In some embodiments, without exiting the second mode (e.g., without exiting concentration mode), icons on the desktop that were hidden in response to switching from the first mode to the second mode, are redisplayed. In some embodiments, in addition to redisplaying the icons, the one or more windows in the first set of windows are temporarily removed from the display (e.g., pushed to the "side") and/or any window groupings that may have been displayed in the second mode are also temporarily removed, such that mode a user can return to state of the display in the second mode prior (e.g., when exiting the desktop) to detecting the third input.

When desktop icons are hidden in response to activating the concentration mode, the desktop icons can be redisplayed without exiting the concentration mode, e.g., without dissolving any automatically generated window groupings and/or layout and/or interaction modalities associated with windows displayed in the main interaction region, thereby reducing the number, extent, and/or nature of inputs needed to perform an operation (e.g., reducing the number of input necessary to unclutter and organize a virtual workspace while at the same time allow interaction with icons on the desktop without dissolving such organization and/or adding icons from the desktop to windows displayed in the stage region and vice versa).

In some embodiments, the computer system receives (2214) a fourth input dragging a content item (e.g., image, document, music, or other type of file) from a respective window of the one or more windows to the desktop. In response to detecting the fourth input (e.g., 1550, FIGS. 15P-15Q) and in accordance with a determination that the content item is dragged over the desktop (e.g., 1538, FIG. 15Q), the computer system redisplays the one or more selectable icons in the respective portion of the desktop (e.g., icons Projects, Delta, Epsilon, Alpha, Gamma, Documents, Images, Presentations, Spreadsheets, Downloads, File 01, File 02, File03, File04, Budget, and Files, FIG. 15R). In some embodiments, in accordance with a determination that the content item while dragged is not dragged over the desktop, forgo redisplaying the one or more selectable icons in the respective portion of the desktop (e.g., if content item 1538 in FIG. 15Q is dragged over the dock, a grouping, or another window, the computer system would not redisplay the icons on the desktop). In some embodiments, the icons that were hidden in response to activating the concentration mode are redisplayed even before a liftoff is detected or even before termination of the fourth input is detected (e.g., in FIG. 15R, an affordance 1548 for adding the content item 1538 is displayed before a user drops the content item 1538 onto the desktop). In some embodiments, as soon as the dragged content is displayed over the desktop, the icons are redisplayed and/or the desktop is decluttered by moving open windows and/or any window groupings off the screen while maintaining display of edges or small portions of the windows visible at the side of the screen (and/or edges of window groupings, e.g., the window groupings that were displayed in strip 556 in FIG. 15Q are pushed to the left side of the screen in FIGS. 15R-leaving only small portions visible). Accordingly, a user is provided with clear access to the desktop and any icons on it while allowing an opportunity to bring back and reactivate a particular window or window grouping.

When desktop icons are hidden in response to activating the concentration mode, the desktop icons can be redisplayed without exiting the concentration mode (e.g., without dissolving any automatically generated window groupings and/or layout and/or interaction modalities associated with windows displayed in the main interaction region) in response to detecting that a content item is dragged from a window in the main interaction region over the desktop, thereby reducing the number of inputs needed to perform an operation (e.g., reducing the number of inputs necessary to unclutter and organize a virtual workspace while at the same time allowing content items included in windows in the stage region to be added to the desktop).

In some embodiments, the third input corresponds (2216) to a selection input directed to the desktop. In some embodiments, the selection input is directed to a portion of the desktop that is unoccupied by a window or window group, or is otherwise visible (e.g., not occluded by other windows or user interface elements, if any) (e.g., 1530, FIGS. 15F-15G). In some embodiments, the selection input includes a click on the desktop (or area of the display that is unoccupied) if a pointer device is used (e.g., a single click, a double click, or a prolonged click) and a tap input if a touch-based input device (e.g., a touchscreen) (e.g., a tap, a long press, a deep press, or other press or touch). In some embodiments, a keystroke, or a keystroke combination on a keyboard, and/or moving a focus selector to a predetermined area of the display (e.g., a corner of the display while in concertation mode) can be used to activate the desktop mode and redisplay hidden icons. When desktop icons are hidden in response to activating the concentration mode, the desktop icons can be redisplayed without exiting the concentration mode (e.g., without dissolving any automatically generated window groupings and/or layout and/or interaction modalities associated with windows displayed in the main interaction region) in response to a selection input directed to unoccupied portion of the display thereby reducing the number, extent, and/or nature of inputs needed to perform an operation (e.g., reducing the number of input necessary to unclutter and organize a virtual workspace while at the same time allowing a user to interact with icons on the desktop).

In some embodiments, in response to receiving the third input, the computer system displays (or redisplays) (2218)

the one or more selectable icons in the respective portion of the desktop and ceases display of the one or more windows of the first set of windows. In some embodiments, one or more windows that were displayed in the main interaction region while in the concentration mode are hidden when a request to redisplay the desktop icons is detected, such as when a user clicks or selects unoccupied portions of the desktop (e.g., window 1546 and a window in the background, overlaid by window 1546, that are displayed in stage region 522 in FIG. 15P, are hidden in FIGS. 15R-15S). In some embodiments, instead of completely removing the one or more windows, an edge or small portion (e.g., a portion) of the one or more windows is maintained visible, e.g., at one or more sides of the display, thereby providing a user with clear access to the desktop and any icons on it while allowing an opportunity to bring back and reactivate a particular window. In some embodiments, in addition to removing or pushing aside the one or more windows, any window groupings that are available in the second mode are also removed or pushed aside (optionally, while retaining visibility of small portions of the window groupings) (e.g., the window groupings that were displayed in strip 556 in FIG. 15Q are pushed to the left side of the screen in FIGS. 15R-15S, leaving only small portions visible). When hidden desktop icons in the concentration mode are redisplayed in response to entering the desktop mode (e.g., without dissolving any automatically generated window groupings and/or layout and/or interaction modalities associated with windows displayed in the main interaction region), one or more windows displayed in a main interaction region (e.g., displayed in interactive mode in the stage region) are temporarily removed from the display (e.g., while optionally retaining visibility of small portions of the windows, such that a user can easily bring back a selected window to the stage region by selecting the visible portion of the window), thereby uncluttering the display and allowing access to the desktop icons while retaining ability to redisplay the removed windows in the main interaction region.

In some embodiments, the one or more windows of the first set of windows in the interactive mode (e.g., window 1546 and a window in the background, overlaid by window 1546 in stage region 522 in FIG. 15P) are concurrently displayed with one or more representations of window groupings (e.g. window groupings in strip 566 in FIG. 15P) in response to the first user input. In response to receiving the third input (e.g., input 1536 in FIG. 15H), the computer system displays (or redisplays) (2220) the one or more selectable icons in the respective portion of the desktop and ceases display of the one or more representations of window groupings (e.g., window groupings displayed in strip 556, which are partially hidden in FIG. 15I, would be completely removed from screen 502 as opposed to partially). In some embodiments, instead of completing removing the one or more representation of window groupings, a small portion or a portion is maintained visible (e.g., window groupings fully displayed in strip 556 in FIG. 15H are partially hidden in FIG. 15I), such that a user can locate where a particular window grouping, e.g., for the purpose of activating the particular window grouping, activating a window included in the grouping, or adding an icon from the desktop to the particular window grouping. In some embodiments, windows in the stage region are removed or are slid partially of the display without moving the one or more representations of window groupings. In some embodiments, if icons are displayed on the desktop in areas of the desktop that are occluded by window groupings in the second mode (e.g. icons File03, File04, Budget and Files revealed in FIG. 15I are occluded by window groupings in strip 556 in the concentration mode in FIG. 15H), the window groupings are also moved aside (e.g., partially, or completely), to make room for revealed the icons (e.g., window groupings fully displayed in strip 556 in FIG. 15H are partially hidden in FIG. 15I). When hidden desktop icons in the concentration mode are redisplayed in response to entering the desktop mode (e.g., without dissolving any automatically generated window groupings and/or layout and/or interaction modalities associated with windows displayed in the main interaction region), one or more representations of window groupings that are displayed in a sidebar region (e.g., the left strip 566) are temporarily removed from the display (e.g., while optionally retaining visibility of small portions of the representations of window groupings, such that a user can easily bring back a selected representation of window grouping or entire sidebar by selecting or pointing at a visible portion of a representation of a window grouping), thereby uncluttering the display and allowing access to the desktop icons while retaining ability to redisplay the removed windows in the main interaction region.

In some embodiments, in response to detecting the first input requesting to switch from the first mode to the second mode, the computer system ceases (2222) displaying the one or more selectable icons, including fading out the one or more selectable icons until the selectable icons are no longer visible (e.g., when the concentration mode is activated in response to user input 1522 in FIG. 15C, the icons displayed in screen 502 would fade out instead of disappear immediately). In some embodiments, the desktop icons fade out when switching from the normal mode, in which the desktop icons are visible, to the concentration mode, in which the desktop icons are no longer visible, instead of immediately disappearing or disappearing without delay. In some embodiments, desktop icons can disappear without delay and/or without providing a fading out effect. Fading out desktop icons that are being hidden when switching from the normal mode, in which the desktop icons are visible, to the concentration mode, in which the desktop icons are no longer visible, provides improved visual feedback to the user.

In some embodiments, while displaying the one or more selectable icons without exiting the second mode, the computer system detects (2224) a first selection input selecting a first icon from the one or more selectable icons, where the first icon is displayed in a first location of the desktop (e.g., input 1536 selects icon 1538 in FIG. 15I). While maintaining the selection input, the computer system detects a drag input moving the first icon from the first location to a respective window of the one or more windows (e.g., the input 1540 that drags icon 1538 from a location on the desktop to a respective window as shown in FIGS. 15K-15N). In response to detecting the drag input, the computer system displays the first icon over at least a portion of the respective window (e.g., in response to input 1540, icon 1538 is displayed over a portion of window 1546 in FIG. 15N). The computer system detects termination of the drag input while the first icon is displayed over the portion of the respective window. In response to detecting termination of the drag input while the first icon is displayed over the portion of the respective window, the computer system adds the first icon (or content associated with the first icon) to the respective window (e.g., content of icon 1538 is displayed in window 1546 in FIG. 15O). In some embodiments, the one or more windows, which are otherwise displayed in the main interaction area (e.g., the stage region) in the concentration mode, are hidden in response to entering the desktop mode (in which icons are redisplayed without dissolving organization of open windows in the concentration mode), and are redisplayed when the drag input reaches an edge of the display (e.g., if an input drags icon 1538 in FIGS. 15I-15O to an edge of the display, as opposed to one of the window groupings in strip 566, then the window that was displayed in stage region 522 in FIG. 15H would be redisplayed). In some embodiments, small portions of the one or more windows are visible, and the drag input is directed to one such small portion of a respective window. In some embodiments, in response to the request to add the first icon to the respective window, the state of the display in the second mode is restored, e.g., the one or more windows are redisplayed in the main interaction region (the stage region) and the one or more window groupings are also redisplayed in the sidebar or left strip, in which window groupings were displayed (e.g., in the non-interactive mode) prior to being pushed to the side or removed from the desktop. When hidden desktop icons in the concentration mode are redisplayed in response to an input without exiting the concentration mode (e.g., without dissolving any automatically generated window groupings and/or layout and/or interaction modalities associated with windows displayed in the main interaction region), a user can interact with icons on the desktop including dragging icons from the desktop to a window that was displayed in the main interaction region prior activating the desktop mode, thereby reducing the number of inputs needed to perform an operation (e.g., reducing the number of input necessary to unclutter and organize a virtual workspace while at the same time allow interaction with icons on the desktop without dissolving such organization and/or adding icons from the desktop to windows displayed in the stage region and vice versa).

In some embodiments, the one or more windows of the first set of windows in the interactive mode are concurrently displayed with one or more representations of window groupings in response to the first user input. For example, in response to user input 1522 in FIG. 15C, the concentration mode is activated, and the one or more windows are displayed in the stage region or main interaction area, and the one or more other windows of open windows associated with the desktop are grouped in window groupings, which are displayed to the side in a sidebar, such as strip 566 in FIG. 15D. While displaying the one or more selectable icons without exiting the second mode (e.g., concentration mode), the computer system detects (2226) a fifth input, including a first portion and a second portion, wherein the first portion corresponds to a selection input selecting a second icon and the second portion corresponds to a drag input dragging the second icon from the desktop to a respective representation of a window grouping of the one or more window groupings (e.g., a representation of a window grouping can be a collection of reduced scale representations of the windows included in the window grouping that are, optionally, stacked over each other). For example, selection input 1536 selects icon 1538 in FIG. 15I, and drag input 1540 in FIG. 15O drags icon 1538 to one of the window groupings in strip 566 in FIG. 15J. In response to detecting that the second icon is displayed over the respective representation of the window grouping in accordance with the drag input and before termination of the fifth input (e.g., before a liftoff or dropping the second icon onto a window or window grouping), the computer system opens the representation of the window grouping, including displaying windows included in the window grouping (e.g., windows included in window grouping 1542 are displayed in the stage region 522 in FIG. 15L). In some embodiments, as a user drags an icon over a window grouping (e.g., input 1540 in FIG. 15K), the window grouping is activated, such that windows included in the grouping are displayed in the main interaction region (e.g., windows included in window grouping 1542 are displayed stage region 522) and/or a window switcher (e.g., a window included in window grouping 1542 is displayed in right strip 566*b*) in accordance with most recent state of the window grouping. In some embodiments, as a user drags an icon over a representation of a window grouping, the representation of the window grouping is expanded or springs open, such that window representations included in the window grouping are individually selectable (e.g., as opposed to stack upon each other) and/or are spread apart such that they no longer overlap each other, or amount of overlap that existed before expanding the window grouping is reduced (e.g., window grouping 1542 can spring open in response to user input 1540 similar to how the second window grouping from top to bottom in strip 566 is expanded in FIG. 17C or it can be expanded more). In some embodiments, the size of the reduced scale representation can also increase (e.g., size can be more than when representations of windows are stacked but less than the full-scale representation of windows, e.g., when displayed in normal mode or when display in the stage region in interactive mode).

When hidden desktop icons in the concentration mode are redisplayed in response to an input without exiting the concentration mode (e.g., without dissolving any automatically generated window groupings and/or layout and/or interaction modalities associated with windows displayed in the main interaction region), a user can interact with icons on the desktop including dragging icons from the desktop to a window group representation (e.g., displayed in a sidebar prior activating the desktop mode) that causes the window group to springs open (e.g., thereby allowing the icon to be added to a selected window included in the window group), thereby reducing the number of inputs needed to perform an operation (e.g., reducing the number, extent, and/or nature of inputs necessary to unclutter and organize a virtual workspace while at the same time allow interaction with icons on the desktop, including adding icons from the desktop to window groupings displayed in a sidebar without dissolving such organization).

In some embodiments, after opening the representation of the window grouping and while maintaining the selection of the second icon, the computer system detects (2228) a drag input moving the second icon over a window of the window grouping (e.g., drag input 1540 in FIGS. 15K-15N). The computer system detects termination of the drag input while the second icon is displayed over the window of the window grouping and in response to detecting termination of the fifth input (e.g., detecting a liftoff if a touch input or detecting a drop portion of the drag and drop input), adding the second icon to the window grouping (e.g., drag input 1540 in FIG. 15N is terminated and content associated with the dragged icon 1538 is displayed in FIG. 15O). For example, a user can add a photo or file to an email or other message. In some embodiments, the second icon (or its content) is added to a window after the window is displayed in the main interaction region (e.g., an image associated with content item 1538 is displayed in window 1546 after window 1546 is first displayed in stage region 522 in response to drag input 1540). In some embodiments, second icon (or its content) is added to a reduced scale representation of a window before the window is displayed in the stage region. For example, after the window grouping is expanded and while the second icon is displayed over a respective window representation included in the window grouping, the respective icon is dropped into one of the respective window representation (e.g., icon 1538 can be dropped over a window representation included in the last window grouping from top to bottom in strip 566 in FIG. 15K), thereby adding the second icon in the respective window representation and displaying the respective window in the interactive mode in the stage region. In some embodiments, after the second icon is added to the respective window representation (or in response to detecting that the second icon has been dropped onto the respective window representation), the respective window can be displayed in the interactive mode, the representations of the window groupings can be redisplayed, and, optionally, desktop icons can be hidden. In some embodiments, in some embodiments, after the second icon is added to the respective window representation, the electronic device can exit the desktop mode while remaining in the second mode (concentration mode).

When hidden desktop icons in the concentration mode are redisplayed in response to an input without exiting the concentration mode (e.g., without dissolving any automatically generated window groupings and/or layout and/or interaction modalities associated with windows displayed in the main interaction region), a user can interact with icons on the desktop including dragging icons from the desktop to a window group representation (e.g., displayed in a sidebar prior activating the desktop mode) that causes the window group to spring open, where the icon can be added to individual windows included in the window group representation, thereby reducing the number of inputs needed to perform an operation (e.g., reducing the number, extent, and/or nature of input necessary to unclutter and organize a virtual workspace while at the same time allow interaction with icons on the desktop, including adding icons from the desktop to window groupings displayed in a sidebar without dissolving such organization).

In some embodiments, in response to the first user input, the computer system concurrently display (2230) the one or more windows of the first set of windows in the interactive mode with one or more representations of window groupings in the second mode (e.g., in response to activating the concentration mode, the one or more windows are displayed in the stage region or main interaction area, and the one or more other windows of open windows associated with the desktop are grouped in window groupings, which are displayed to the side in a sidebar). In response to receiving the third input (e.g., a request to enter desktop mode without exiting the concentration mode) and in accordance with a determination that at least one icon is located in a portion of the desktop that is occluded by at least a portion of a representation of a window grouping of the one or more representations of window groupings in the second mode (e.g., the concentration mode), moving the representation of the window grouping to avoid overlapping the portion of the desktop where the at least one icon is located. (e.g., the window grouping is partially or completely moved away or pushed to a side of the display). For example, one of the window groupings fully displayed in strip 556 in FIG. 15H would be partially hidden in FIG. 15I (e.g., if only one window grouping needs to move aside to make room for icon(s) displayed underneath it without moving other window groupings displayed in strip 566 in FIG. 15H). In some embodiments, a window grouping displayed in a sidebar (or the left strip) in the second mode is moved away (e.g., slide off the display), in accordance with a determination that there is one or more icons that are located in a location where the one or more icons would be occluded by the window grouping when the desktop mode is active, if the window grouping is not moved away (e.g., window groupings displayed in strip 566 in FIG. 15H are pushed aside in FIG. 15I to reveal icons File03, File04, Budget and Files).

Automatically moving a window grouping (the window grouping is displayed in a sidebar in the concentration mode) out of the way of redisplayed icons while maintaining visibility of at least portions of the window grouping or maintaining easy access and the ability to redisplay the window grouping, thereby reducing the number, extent, and/or nature of inputs needed to perform an operation (e.g., allowing back and forth interaction with icons and window groupings and/or windows in the interactive mode).

In some embodiments, in response to receiving the third input (e.g., a request to enter the desktop mode without exiting the concentration mode) and in accordance with a determination that the at least one icon is located in the portion of the desktop that is occluded by at least the portion of the representation of the window grouping in the second mode, the computer system moves (2232) aside the one or more representation of window groupings (e.g., window groupings are partially or completely moved away or pushed to a side of the display). In some embodiments, window groupings displayed in a sidebar or the left strip in the second mode are moved away in accordance with a determination that icons are located underneath them in the desktop mode. In some embodiments, all window groupings are pushed aside even if less than all of the window groupings would occlude desktop icons in the desktop mode. For example, all window groupings that are fully displayed in strip 556 in FIG. 15H are partially hidden in FIG. 15I. Automatically moving multiple window grouping (the window grouping is displayed in a sidebar in the concentration mode) out of the way of redisplayed icons while maintaining visibility of at least portions of the window groupings or maintaining easy access and the ability to redisplay the window groupings, thereby reducing the number of inputs needed to perform an operation (e.g., allowing back and forth interaction with icons and window groupings).

In some embodiments, moving aside the representation of the window grouping includes (2234) moving the representation of the window grouping towards an edge of the display generation component, including partially sliding the representation of the window grouping off of the display area of the display generation component (e.g., window groupings that are fully displayed in strip 556 in FIG. 15H are pushed partially off the display in FIG. 15I). Automatically sliding a window grouping (the window grouping is displayed in a sidebar in the concentration mode) at least partially off of the display area to make room for redisplayed icons reduces the number, extent, and/or nature of inputs needed to perform an operation (e.g., allowing back and forth interaction with icons and window groupings).

In some embodiments, while displaying the one or more selectable icons in the respective portion of the desktop without exiting the second mode, the computer system detects (2236) an input corresponding to a request to move one or more icons on the desktop to a location occupied by one or more of the representations of window groupings (e.g., a request to move one or more icons directly via drag and drop, a request to change organization styles of the desktop icons, or a request to expand one or more sets of desktop icons). In response to detecting the input corresponding to the request to move the one or more icons on the desktop to the location occupied by the one or more representations of the window groupings, moving the one or more representation of window groupings to avoid overlapping the location of the one or more icons on the desktop. When in the desktop mode where icons are redisplayed without exiting the concentration mode (e.g., thereby retaining automatically generated window groupings and/or layout and interaction modalities associated with windows displayed in the stage region), one or more icons can be moved to locations occupied by one or more representations of window groupings, where when such movement of icons is detected, the window groupings automatically move out of the way, thereby performing an operation when a set of conditions has been met without requiring further user input.

In some embodiments, the movement of the at least some icons is in accordance with a user input dragging the at least some icons (2238). When in the desktop mode where icons are redisplayed without exiting the concentration mode (e.g., thereby retaining automatically generated window groupings and/or layout and interaction modalities associated with windows displayed in the stage region), one or more icons can be moved to locations occupied by one or more representations of window groupings based on a user dragging the one or more icons, where when such movement of icons is detected the window groupings automatically move out of the way, thereby performing an operation when a set of conditions has been met without requiring further user input. For example, in response detecting an input moving multiple selected icons on the desktop towards location occupied by window groupings, the windows groupings, such as window groupings displayed in strip 566 in FIG. 15I, are moved out of the way of the expanded stack of icons.

In some embodiments, movement of the at least some icons is (2240) in accordance with a user input expanding a group of icons of the one or more icons. In some embodiments, desktop icons can be grouped into a stack of icons (e.g., grouped by icon type or other criteria), and when such a stack of icons is expanded, window groupings automatically move out of the way to make room for the expanded stack of icons. Automatically moving windows or window groupings out of the way of an expanded stack of icons when in the desktop mode, performs an operation when a set of conditions has been met without requiring further user input.

In some embodiments, in response to detecting the first input, the computer system concurrently displays (2242): the one or more windows of the first set of windows in the interactive mode (e.g., in response to switching from normal mode to the concentration mode, one or more windows of the windows that are open and associated with the desktop are displayed in an interactive mode in a main interaction region, such as the stage region); a plurality of representations of window groupings displayed in a non-interactive mode (e.g., in response to switching from normal mode to concentration mode, in addition to displaying the one or more windows in the interactive mode, the remaining windows that are open and are associated with the desktop, are automatically grouped and displayed in a sidebar, such as the left strip, such that a window grouping needs to be activated or selected in order to manipulate content of windows that belong to the window grouping); and one or more reduced scale representations of windows in the non-interactive mode, wherein the one or more reduced scale representations of windows are associated with the one or more windows in the interactive mode. While displaying the one or more selectable icons in the respective portion of the desktop without exiting the second mode, the computer system detects a selection of the one or more icons. While maintaining the selection of the one or more icons, the computer system detects movement of the one or more icons to a location occupied by the one or more reduced scale representations of windows. In response to detecting the movement of the at least some icons, the computer system moves the one or more reduced scale representations of windows to avoid overlapping the location of the one or more icons on the desktop. For example, if an input in FIG. 15G is detected that selects icons Projects, Delta and Epsilon, and the input moves the selected icons towards the window groupings displayed in strip 566, the window groupings move out of the way. When in the desktop mode where icons are redisplayed without exiting the concentration mode (e.g., thereby retaining automatically generated window groupings and/or layout and interaction modalities associated with windows displayed in the stage region), one or more icons can be moved to locations occupied by one or more reduced scale representations of windows (e.g., displayed in non-interactive mode in a sidebar or window switcher region, such as the right strip), where such movement of icons causes the reduced scale representations of windows to automatically move out of the way of the one or more icons, thereby performing an operation when a set of conditions has been met without requiring further user input.

In some embodiments, the computer system receives (2244) an input selecting a content item (e.g., image, document, music, or other type of file) displayed in a respective window of the one or more windows, wherein the content item is to be dragged from (or out of) the respective window to the desktop (e.g., input 1550 in FIG. 15P selects content displayed in window 1546). In response to detecting the input selecting the content item, before termination of the selection input and in accordance with a determination that a predetermined amount of time has passed before the content item is dragged over the desktop, the computer system minimizes the respective window (e.g., minimizing the respective window corresponds to hiding the respective window from display while leaving the respective window open and executing; adding the respective window to a window grouping in a window switcher region; or adding the respective window to a dock where other minimized windows are included). For example, if input 1550 in FIG. 15P selects the image displayed in email window 1546 and a predetermined amount passes before the selected image is dragged out of window 1546, then window 1546 would be minimized (and optionally the window overlaid by window 1546 would be minimized). In accordance with a determination that the selected content item is dragged over the desktop before the predetermined amount of time has passed, the computer system redisplays the one or more selectable icons in the respective portion of the desktop and forgoing minimizing the respective window. For example, input 1550 in FIG. 15P is detected that drags content item 1538 out of window 1546 onto desktop, as shown in FIGS. 15P-15Q, icons on the desktop are redisplayed, as shown in FIG. 15S. In some embodiments, when a user selects an item to be dragged from a window in the stage region and it takes some time to drag it over the desktop (e.g., item stays within the borders of the window while the selection input is maintained), the window is minimized. In some embodiments, in accordance with a determination that the content item being dragged is not being dragged over the desktop, the computer system forgoes redisplaying the one or more selectable icons in the respective portion of the desktop. In some embodiments, the icons that were hidden in response to activating the concentration mode are redisplayed even before a liftoff is detected or before termination of the selection input is detected, e.g., as soon as the dragged content is displayed over desktop area, the icons are redisplayed and/or the desktop is decluttered by moving open windows and/or any window groupings off the screen (at least partially) while maintaining display of edges or small portions of the windows (and/or edges of window groupings) at the side of the screen, thereby providing a user with clear access to the desktop and any icons on it while allowing an opportunity to bring back and reactivate a particular window or window grouping.

Automatically minimizing a window out of which a content item is dragged in accordance with a determination that a predetermined amount of time has passed before the content item is dragged over the desktop, enhances the operability of the device, and makes the user interface more efficient (e.g., by automatically organizing multiple open windows, which reduces the number of inputs needed to interact with the windows and unclutter the main interaction region).

It should be understood that the particular order in which the operations in FIGS. 22A-22G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1800, 1900, 2000, 2100, and 2300 are also applicable in an analogous manner to method 800 described above with respect to FIGS. 22A-22G.

FIGS. 23A-23E are flow diagrams illustrating method 2300 of window management and sidebar interaction, in accordance with some embodiments. Method 2300 is performed at an electronic device (e.g., laptop display device 300, tablet display device 100, or desktop display device in FIG. 1A; portable multifunctional device 100 in FIG. 2; or electronic device in FIG. 3A) with a display (e.g., display devices 101, 201, and 301 in FIGS. 1A-1B) and one or more input devices (e.g., a touch-sensitive display 101 of tablet device 100 in FIG. 1A; mouse input device 202, keyboard input devices 203 and 305, and touchpad 309 in FIG. 1B; or touchpad 355 in FIG. 3 and touch-sensitive surface 451 in FIG. 4B). Some operations in method 2300 are, optionally, combined and/or the order of some operations is, optionally, changed.

As described below, the method 2300 provides an improved mechanism for window management of open windows (optionally executed by multiple different applications) included in one or more virtual workspaces and/or in one or more displays (e.g., connected or otherwise in communication). When concentration mode is activated, an electronic device automatically performs window management operations that unclutter and organize (e.g., in functional regions) a screen space, e.g., by moving, shrinking, and/or grouping open windows while at the same time maintain visibility of and provide easy access (e.g., one click or tap away) to windows that have been moved, shrunk, and/or grouped. In concentration mode, while a set of windows of a currently active window grouping are displayed in a main interaction region (e.g., the stage region), other windows included in the same virtual workspace are grouped (e.g., by application or other criteria) and representations of such (non-active) window groups are displayed in a sidebar region (e.g., the left strip or an application switcher region) and optionally other non-active windows included in the currently active group are displayed at reduced scale in a window switcher region (e.g., a sidebar region, such as a right strip or the left strip if the left strip combines an application switcher and a window switcher regions). Accordingly, while a direct interaction (e.g., ability to directly invoke functionality provided by a window without the need to activate the window) with a select subset of windows is provided in a main interaction region (e.g., thereby allowing a user to concentrate on manipulating content or invoking functionality of a select subset of windows), a user can switch between active window groups by selecting representations of window groups displayed in the sidebar while continuing to display other representations of window groups; and a user can optionally switch between windows by selecting reduced scale representation of window included in the same active grouping and displayed in the window switcher region optionally while continuing to display other reduced scale representations displayed in the window switcher region, thereby replacing windows displayed in the main interaction region without losing sight of other open windows and/or window groups. Ability to focus on interaction with a subset of windows displayed in the main interaction region while at the same time have flexibility to switch the subset of windows that is being interacted displayed with by selecting grouped or ungrouped windows from a sidebar region, without dissolving or losing sight of displayed inactive open windows and/or inactive window groups, provides for efficient viewing and interacting with a plurality of open windows on the same (limited) screen, thereby reducing the number of inputs needed to perform an operation.

A computer system that is in communication with a display generation component (e.g., a heads-up display, a head-mounted display (HMD), a display, a touchscreen, a projector, a tablet, a smartphone, etc.) and one or more input devices (e.g., cameras, controllers, touch-sensitive surfaces, joysticks, buttons, etc.). At the computer system, a plurality of representations of window groups are (2304) displayed (e.g., in a "sidebar" or a left strip), including a first representation of a first window group that includes a first set of two or more windows and a second representation of a second window group that includes a second set of one or more windows (e.g., the sidebar or a left strip region is a region designated for displaying representations of window groups, where each window group is displayed in a respective slot or position). In some embodiments, one or more windows of a currently active window grouping are displayed in a different region (e.g., a region for interaction with content of the windows displayed therein) concurrently with the plurality of representations of window groups. The computer system detects (2306) an input selecting the first representation of the first window group of the plurality of representations (e.g., the representation of a window group is a collection of representations of each windows in the group, where, optionally, layout and/or modes of interaction of the windows in the group that was last displayed in the stage region and/or a right strip region is preserved and/or reflected in the representation of the window group). In response to detecting the input selecting the first representation of the first window group (e.g., input 704 selecting window grouping 702 in FIG. 7A), the computer system makes (2308) the first window grouping active while continuing to display the second representation of the second window grouping in the plurality of representations of window groupings (and, optionally, continuing to display a remainder of the plurality of representations of the plurality of window groups). For example, window 706 is displayed in the stage region 522, and windows 708, 710 are displayed in strip 566*b* (FIG. 7B) in response to activating window grouping 702 displayed in FIG. 7A, while other window groupings in strip 566 remain displayed (FIG. 7B). In some embodiments, making the first window grouping active includes opening the first window grouping, and displaying windows included in the grouping in the stage region in the interactive mode and/or right strip (or other sidebar) in the non-interactive mode). Making the first window group active while continuing to display the second representation of the second window group in the plurality of representations of window groups includes: in accordance with a determination that the input selecting the first representation is directed to a first portion of the first representation of the first window group, making a first window of the first window group more prominent relative to other windows associated with the first window group; and in accordance with a determination that the input selecting the first representation is directed to a second portion of the first representation of the first window group, making a second window of the first window group more prominent relative to other windows associated with the first window group. For example, if input 704 in FIG. 7A selects one of the windows displayed in window grouping 702 (instead of the window grouping 702 as a whole), window group 702 would become active, and the selected window would be displayed in the stage region 522. In some embodiments, while displaying representations of multiple window groups in a sidebar region (e.g., an application sidebar region or the left strip), one of the window groups is selected that causes the selected window group to be active, e.g., thereby displaying one, two, or more windows of the selected window group, in the main interaction region, while continuing to display other inactive window groups in the sidebar (and optionally while continuing to display other inactive windows of the selected window group in a window switcher region), where location of the selection input determines which, if any, of the windows in the main interaction region would be displayed more prominently (e.g., thereby reducing the number of inputs that might otherwise be needed to reorganize the main interaction region post-selection of the window group) relative to other windows in the selected window group. In some embodiments, making a first window more prominent includes displaying the first window in an interactive mode in the stage region and displaying any other windows associated with first window grouping as reduced scale representations in a non-interactive mode (e.g., displaying the associated windows in the right strip). For example, the selected target window is displayed in the stage region in the interactive mode (in which content of target window is available directly for manipulation in response to user inputs), where other (e.g., any other) associated windows are displayed in the right strip in the non-interactive mode (e.g., windows 708 and 710 in the right strip 566*b*, which are associated with window 706 in the stage region). In some embodiments, making the first window more prominent relative to other windows associated with the group includes displaying the first window and the associated windows in an overlapping arrangement on the stage region (e.g., in an interactive mode), where the first window is displayed in the foreground, the first window is not overlaid by (e.g., any other of) the associated windows, and the first window at least partially overlays one or more of the associated windows. For example, in response to detecting user input 1032 selecting the Browser application window in the window group 1012, which as illustrated in FIG. 10F was previously a background window relative to the Message application window, the Browser application window 1034 is displayed in the foreground in stage region 522 (e.g., more prominently) and the Message application window 1036 is displayed in the background in FIG. 10G. In some embodiments, in response to selecting the first representation of the first window group, a state of windows, which are included in the first representation of the first window group, is restored to a state in which the windows were when the first window group was active prior to switching to a different window group. For example, in response to detecting user input 1014 selecting window group 1010 in FIG. 10B, windows of the mail application are redisplayed in the state they were prior deactivating window group 1010, as shown in FIG. 10C. For example, if the windows included in the first window group were displayed on the stage region in a first overlapping arrangement, upon reactivation of the first window group, the windows are displayed in the same first overlapping arrangement that they were prior to switching to a different window group or different overlapping arrangement depending on which window representation is selected, thereby making that window representation more prominent in the stage region relative to other windows in the overlapping arrangement (e.g., layer order interaction changes without changing which windows are included in the stage region). Alternatively, if the first window was displayed in the stage region and the rest of the associated windows that are included in the group were displayed in the "right strip," then upon reactivation of the first window group, the first window is displayed prominently in the stage region and the remainder of the associated windows are displayed in the right strip, thereby restoring the state of the windows there were in prior to switching to (or activating) a different window group. For example, in response to detecting user input 1014 selecting window group 1010 in FIG. 10B, window 1016 of the mail application is redisplayed in the stage region 522 and the remaining windows of the mail application are displayed as reduced scale representation in strip 566*b*, as shown in FIG. 10C. In some embodiments, when activating the window group, a user can select a particular target window included in the first window group. In some embodiments, in response to selecting a target window, the selected target window is displayed in the stage region (e.g., stage region 522) and the remainder of the associated windows are displayed in the right strip (e.g., strip 556*b*).

While displaying representations of multiple window groups in a sidebar region (e.g., an application sidebar region or the left strip), one of the window groups is selected that causes the selected window group to be active, e.g., thereby displaying one, two, or more windows of the selected window group, in a main interaction region, while continuing to display other inactive window groups in the sidebar (and optionally while continuing to display other inactive windows of the selected window group in a window switcher region in the same or other sidebar), thereby reducing the number of inputs needed to perform an operation (e.g., reducing the number of inputs needed to manage and interact with multiple open windows from different applications in a limited screen area). Further, location of the selection input determines which, if any, of the windows that would be displayed in the main interaction region would be displayed more prominently relative to other windows in the selected window group, thereby reducing the number of inputs needed to perform an operation (e.g., reducing the number of inputs that might otherwise be needed to reorganize the main interaction region post-selection of the window group.)

In some embodiments, while displaying the plurality of representations of window groups (and prior detecting the input selecting the first representation of the first window group), a third window group is active, wherein the third window group includes a third set of one or more windows.

For example, windows that belong to an active window group (including the third window group), are displayed in the stage region (or main interaction region for manipulating content of windows) and/or the right strip (or sidebar for switching windows) and, optionally, when the group is active a corresponding representation of the active window group is not displayed in the left strip (or sidebar for application switching (e.g., if windows are grouped by application) or group switching). In response to selecting the first representation of the first window group, (concurrently with or) in addition to making the first window group active, the computer system deactivates (2310) the third window group. For example, in response to detecting input 704 selecting window grouping 702 in FIG. 7A, window grouping 702 is activated, where the window grouping that has Message window displayed in stage region 522 is deactivated (e.g., a window grouping including the Messages window is displayed on top in strip 556 in FIG. 7B). In some embodiments, deactivating the third window group includes removing or ceasing to display windows that were displayed in a main interaction region (or the stage region) and/or any windows that were displayed in the window switcher region (or right strip) and automatically generating (without additional user input) a third representation of the third window group (one that includes the removed windows) and displaying the third representation in the left strip (or sidebar for application switching (e.g., if windows are grouped by application) or group switching). In some embodiments, different policies are used to determine if and what window group representation to replace the position that was previously occupied by the first representation of the first window group (as described above in relation to FIGS. 6A-6E). For example, according to a "recency policy," the most recently generated grouping is placed on top or in the first position in the left strip (e.g., 612*a* in FIG. 6B). In some embodiments, according to the "recency policy," the third representation of the third window group is displayed in the first or top position in the strip regardless of the position that the first representation of the first window group occupied (immediately) prior detecting the input selecting the first representation of the first window group. According to a "replacement policy," the representation of a selected window grouping (e.g., 606*a* selected in FIG. 6C) is replaced with automatically generated representation of a grouping that includes the windows in the stage region and the windows in the right strip, if any (e.g., 606*a* is replaced with 608*a* in FIG. 6D). In some embodiments, according to the "replacement policy," the first representation of the first window group (the one that is selected to be active) is replaced with the third representation of the third window group. In some embodiments, according to the "replacement policy," windows in a selected window grouping representation replaces windows in the stage region and windows in the right strip, if any, and the windows in the stage region and the right strip form a new representation of the corresponding grouping that replaces the selected/activated window grouping. According to "a placeholder policy," a position of the representation of a selected window grouping (e.g., window grouping 606*a* selected in FIG. 6E) remains unoccupied in response to the selection input (e.g., placeholder representation 614*a*, FIG. 6F). In some embodiments, according to the "placeholder policy," the first representation of the first window is ceased to be displayed in response to the input selecting the first representation of the first window and the position remains unoccupied and the representation of the third representation of the third window group is added to another position in the left strip.

While displaying representations of multiple window groups in a sidebar region (e.g., an application sidebar region or the left strip), one of the window groups is selected that causes the selected window group to be active, e.g., thereby displaying one, two, or more windows of the selected window group in a main interaction region, and that causes a window group that was active before the selection to become inactive in response to the selection, while continuing to display other inactive window groups in the sidebar (and optionally while continuing to display other inactive windows of the selected window group in a window switcher region in the same or other sidebar), thereby reducing the number, extent, and/or nature of inputs needed to perform an operation (e.g., reducing the number of inputs needed to unclutter the screen space, manage, and/or interact with open windows).

In some embodiments, the plurality of representations of window groups are displayed in a region for switching between window groups (e.g., a left strip 566 or a sidebar, or an application switcher region if window groups are grouped by application). Deactivating the third window group includes (2312) displaying a third representation of the third window group in the first region concurrently with the second representation of the second window group (e.g., when deactivated the window group that includes one Browser window in stage region 522 in FIG. 6C, a representation 608*a* is displayed strip 556 in FIG. 6D). In some embodiments, the representation of the third window group includes (or is a composite of) reduced scale representations of the third set of one or more windows (window group 608*a* includes a reduced scale representation of the Browser window, as illustrated in FIG. 6D). In some embodiments, the window group that was active before selection of another window group from the sidebar is caused to become inactive in response to the selection and also a representation of the window group that has become inactive is added and/or displayed concurrently with other inactive window groups displayed in the sidebar.

While displaying representations of multiple window groups in a sidebar region (e.g., an application sidebar region or the left strip), a representation of a first window group of the window groups is selected that causes the first window group to become active, e.g., thereby displaying one, two, or more windows of the selected window group in a main interaction region, and that causes a second window group that was active before the selection to become inactive in response to the selection and also to display a representation of the second window group concurrently with representations of other inactive window groups displayed in the sidebar (and optionally while continuing to display other inactive windows of the selected window group in a window switcher region in the same or other sidebar), thereby reducing the number of inputs needed to perform an operation (e.g., reducing the number of inputs needed to unclutter the screen space, manage, and/or interact with open windows).

In some embodiments, deactivating the third window group includes (2314) replacing the (selected or activated) first representation of the first window group with the third representation of the third window group. In some embodiments, different polices govern what window groups are displayed in the left strip. According to a "replacement policy," the representation of a selected window group is replaced with automatically generated representation of a group that includes the windows in the stage region and the windows in the right strip, if any. In some embodiments, according to the "replacement policy," the first representation of the first window group (the one that is selected to be active) is replaced with the third representation of the third window group, such that the third set of windows are no longer displayed in the stage region and/or right strip.

While displaying representations of multiple window groups in a sidebar region (e.g., an application sidebar region or the left strip), a representation of a first window group of the window groups is selected that causes the first window group to become active, e.g., thereby displaying one, two, or more windows of the selected window group in a main interaction region, and that causes a second window group that was active before the selection to become inactive in response to the selection and also to display a representation of the second window group concurrently with representations of other inactive window groups displayed in the sidebar (and optionally while continuing to display other inactive windows of the selected window group in a window switcher region in the same or other sidebar), thereby reducing the number of inputs needed to perform an operation (e.g., reducing the number of inputs needed to unclutter the screen space, manage, and/or interact with open windows).

In some embodiments, making the first window group active includes (2316): in accordance with a determination that the input selecting the first representation is directed to a (reduced scale) representation of a first window of the first set of two or more windows that are included in the first representation of the first window group, displaying the first window in an interactive mode in a region for interacting with windows (e.g., a main interaction region for manipulating window content, such as the stage region) and displaying representations of other windows of the first set of one or more windows in a non-interactive mode in a region for switching windows (e.g., in response to detecting user input 1014 selecting window group 1010 in FIG. 10B, window 1016 of the mail application is redisplayed in the stage region 522 and the remaining windows of the mail application are displayed as reduced scale representation in strip 566*b*, as shown in FIG. 10C). For example, reduced scale representations, minimized versions, or thumbnails of other inactive windows of the first set of one or more windows are displayed in non-interactive mode in a sidebar region (e.g., the right strip, a window switcher sidebar, or the left strip if the left strip combines an application switcher and a window switcher), such that windows displayed in the non-interactive mode need to be selected, activated, and/or displayed in the stage region first before their content can be manipulated. In some embodiments, the region for switching windows is optionally on an opposite side of the region for switching groups (or an application switcher region) (e.g., strip 556*b* is displayed on opposite side of strip 566). Further, making the first window group active includes: in accordance with a determination that the input selecting the first representation is directed to a (reduced scale) representation of a second window of the first set of two or more windows that are included in the first representation of the first window group, displaying the second window in the interactive mode in the region for interacting with windows (e.g., a main interaction region for manipulating window content, such as the stage region) and displaying representations of other windows of the first set of one or more windows in the non-interactive mode (e.g., reduced scale representations or minimized versions of the remainder of the first set of one or more windows are displayed in an inactive state, such that the remainder of the first set of one or more windows need to be selected or activated first before their content can be manipulated) in the region for switching windows (e.g., in a region for switching windows that are displayed in the interactive mode, such as the right strip, a sidebar, or other region for switching windows). While displaying representations of multiple window groups in a sidebar region (e.g., an application sidebar region or the left strip), a representation of a first target window of a first window group is selected that causes the first window group to become active; the first target window to be displayed in the main interaction region (e.g., the stage region); and other inactive windows in the first window group to be displayed in a window switcher region, thereby reducing the number of inputs needed to perform an operation (e.g., reducing the number of inputs needed to unclutter the screen space, manage, and/or interact with open windows).

In some embodiments, displaying the plurality of representations of window groups includes (2318) displaying two or more representations of window groups in a region for switching window groups (e.g., the left strip, a sidebar, or an application switcher region). In some embodiments, a number of representations of window groups that concurrently fit in the region for switching window groups is limited, and representations of other inactive window groups of the plurality of representations of window groups are accessible in response to a user input (e.g., selecting an affordance or performing a gesture on a touch-sensitive surface, or a combination of keys). For example, in response to detecting selection of affordance 1004 (FIG. 10E), window groups that do not fit in strip 566 are revealed in user interface 1006, as shown in FIG. 10F. When concentration mode is activated, the electronic device automatically performs window management operations that unclutter and organize a screen space, e.g., by moving, shrinking, and/or grouping open windows while at the same time maintaining visibility of and providing access (e.g., one click or tap away) to windows that have been moved, shrunk, and/or grouped. For example, windows included in the same virtual workspace are grouped (e.g., by application or other criteria) in response to activating the concentration mode and representations of such (non-active) window groups are displayed in a sidebar region (e.g., the left strip or an application switcher region) while optionally a set of windows of a currently active window grouping are displayed in a main interaction region (e.g., the stage region), thereby providing for efficient viewing and interacting with a plurality of open windows on the same (limited) screen and reducing the number of inputs needed to perform an operation (e.g., a user can switch between active window groups by selecting representations of window groups displayed in the sidebar while optionally continuing to display other representations of window groups.)

In some embodiments, prior detecting the input selecting the first representation of the first window group, the computer system detects (2320) a hover input over the first representation of the first window group. For example, a focus selector, a cursor, a stylus, an air gesture (e.g., without contacting the display) or other focus indicator is positioned over area of the displayed that is occupied by the first representation, such that the electronic device responds to the hover input, without selecting or clicking the first representation of the first window group). In response to detecting the hover input, the computer system changes appearance of the first representation of the first window group. In some embodiments, changing the appearance of the first representation of the first window group includes expanding the first representation of the first window group, such that representations of individual windows included in the first window group are spread apart and are individually selectable (e.g., in response to detecting hover input 1716 in FIG. 17G or hover input 1718 in 17H, the window group is expanded such that the windows are individually selectable). In some embodiments, size, brightness, or other visual characteristic of the first representation of the first window group can be changed to increase prominence of the first representation of the first window group in relation to other representations of window groups displayed in the region for switching window groups (e.g., the second window grouping from top to bottom in the left strip 566 is shown with different visual characteristics relative to other window groupings in the left strip 566, as show in FIGS. 17G-17H). Changing appearance of a representation of a window group in response to detecting an input hovering over the representation of the window group provides an improved visual feedback to a user (e.g., indicating a window group that is being hovered over and can be selected to become active).

In some embodiments, changing appearance of the first representation of the first window group includes (2322) moving representations of the first set of two or more windows away from each other (e.g., spreading apart reduced scale representations of windows included in the first window group), wherein the representation of the first set of two or more windows are included in the first representation of the first window group. In some embodiments, hovering over a representation of a respective window group causes the representation of the respective window group to expand by, e.g., spreading apart reduced scale representations of windows included in the first window group, such that individual representations of windows can be selected to be prominently displayed in the stage region (e.g., relative to other windows included in the respective window group). For example, in response to detecting hover input 1716 in FIG. 17G or hover input 1718 in 17H, the window group is expanded such that the windows are individually selectable. Expanding a representation of a window group that is being hovered over by moving representations of windows away from each other provides improved visual feedback to the user and allows the user to individually select a target window representation to be displayed in interactive mode in the main interaction region, thereby reducing the number of inputs needed to perform an operation (e.g., reducing the number of inputs that might otherwise be needed to reorganize the main interaction region post-selection of the window group).

In some embodiments, in accordance with a determination that the representations of the first set of two or more windows are spread apart (e.g., have moved away from each other sufficiently, to reduce an amount of overlap or such that more or most of the representations of the first set of two or more windows are visible) and that the hover input has not moved away from the first representation of the first window group beyond a threshold distance, the computer system forgoes (2324) movement of the representations of the first set of two or more windows (e.g., forgoing movement of the first set of two or more windows away from each other or towards each other). In some embodiments, once a representation of a respective window group that is being hovered over is expanded by moving window representation included in the respective window group away from each other, window representations cease to move while the hover input is near (e.g., within threshold distance away) of the (expanded) representation of the window grouping. Ceasing to move window representations once the representation of the respective window group that is being hovered over has been expanded provides improved visual feedback to the user.

In some embodiments, before termination of the hover input and in accordance with a determination that the hover input has moved away from the first representation of the first window group beyond the threshold distance, the computer system reverts (2326) at least a portion of the changes (or, optionally all of the changes) in the appearance of the first representation of the first window group that were made in response to detecting the hover input. In some embodiments, when the hover input moves beyond the threshold distance away from the (expanded) representation of the respective window that is being hovered over (e.g., the hover input leaves the expanded representation of the respective window group), at least a portion of the changes in appearance that were caused by the hovered input are reverted (e.g., the representation of the respective window group can be contracted, e.g., by moving window representations back towards each other). Reverting at least some of the changes in appearance that were caused by the hovered input when the hover input moves beyond the threshold distance away from the (expanded) representation of the respective window that is being hovered over provides improved visual feedback to the user.

In some embodiments, in accordance with a determination that the hover input is maintained over (or within a predetermined distance such that it is still interpreted by the electronic device to be over the first representation) the first representation of the first window group for a predetermined amount of time, the computer system displays (2328) additional information (or control options) related to the first representation of the first window group. For example, if the hover input over window grouping 1716 in FIG. 17G is maintained for the predetermined amount of time, information related to the window grouping 1716 would be displayed (as opposed to information related to the particular window that it is being hovered over, as described below). In accordance with a determination that the hover input is maintained over the first representation of the first window group for less than the predetermined amount of time, the computer system forgoes displaying the additional information. In some embodiments, additional information can include information related to what application is executing windows included in the first window group, number of windows included in the group, or control options for performing actions related to the first representation of the window group or the first set of two or more windows. Displaying additional information about a window group over the representation of which a hover input is detected provides improved visual feedback to the user.

In some embodiments, in accordance with a determination that the hover input is maintained over a representation of a third window of the first set of two or more windows (e.g., optionally the hover input is maintained at least for a predetermined amount of time and/or within a predetermined distance away from the representation of the third window, such that it is interpreted by the electronic device to be a hover input over the representation of the third window), the computer system changes (2330) a visual characteristic of the representation of the third window. For example, in response to detecting hover input 1716 over the first or trop window related to the Pages application in FIG. 17G, information related to the first window is displayed (e.g., related to Fiction stories), and in response to detecting hover input 1718 over the second window related to the Pages application in FIG. 17H, information related to the second window is displayed (e.g., related to History). In some embodiments, changing a visual characteristic of the representation of the third window includes changing brightness, size, position or simulated depth or angle (if any), such that the third window (that is a target window to be selected) appears more prominent compared to a remainder of representations of windows of the first set of two or more windows. Changing a visual characteristic of a representation of a respective window over which a hover input is maintained (e.g., for a predetermined amount of time), where the change of appearance displays the respective more prominently compared to other window representations included in the same window group representation, provides improved visual feedback to the user.

In some embodiments, changing the visual characteristic of the representation of the third window includes (2332) increasing a relative brightness level (e.g., relative to a background of a desktop or relative to other representations of windows of the first set of two or more windows). For example, as shown in FIG. 17D, the middle window representation under the hover input is brighter than the other window representations. Increasing brightness of a representation of a respective window over which a hover input is maintained (e.g., for a predetermined amount of time) relative to other window representations included in the same window group representation, provides improved visual feedback to the user.

In some embodiments, changing the visual characteristic of the representation of the third window includes (2334) removing a tint that is based on a background of a desktop. For example, as shown in FIG. 17D, the middle window representation under the hover input is brighter than the other window representations. Changing a visual characteristic of a representation of a respective window over which a hover input is maintained (e.g., for a predetermined amount of time), including removing a tint that is based on a background of a desktop, provides improved visual feedback to the user.

In some embodiments, the plurality of representations of window groups (or window grouping representations) are displayed in a region for switching window groups (e.g., a left strip or a sidebar, or an application switcher region if window groups are grouped by application) (e.g., the window grouping/group representations displayed in the left strip 556 shown in FIG. 17D). Making the first window group active includes displaying a respective window in an interactive mode in a region for interacting with windows (e.g., a main interaction region for manipulating window content, such as the stage region). The computer system detects (2336) an input directed to the respective window (e.g., input moving the respective window or resizing the respective window, e.g., by grabbing and moving a corner or edge of the respective window). For example, in FIGS. 16I-16J, the user makes the window 1610 a full screen window, as shown in FIG. 16K. In response to detecting the input directed to the respective window, in accordance with a determination that an edge of the respective window is a threshold distance away from the plurality of representations of window groups (e.g., or a threshold distance away from the region for switching window groups, where outline or border of the region for switching window groups is not necessarily visible), the computer system moves at least some of the plurality of representations of window groups. In FIG. 16K, the strip of window grouping representations is removed from the display, e.g., is no longer displayed. In some embodiments, the plurality of representations window groups move out of the way (e.g., all at once or a subset) (e.g., as shown in FIG. 16K) if the respective window would overlap by more than a threshold amount (e.g., due to the respective window moving or being resized). In some embodiments, the plurality of representation of window groups are pushed to a side of the display, such that the plurality of window groups are partially visible while making room for the respective window, and/or the plurality of window groups are minimized or the size of the plurality of window groups is reduced, e.g., by moving window representations towards each other (e.g., while an enlarged window in the stage region is not shown in FIG. 15S, one can see what the window grouping representations moved partially off the screen looks like). Moving the plurality of representations window groups out of the way (e.g., all at once or a subset) if a respective window displayed in the main interaction region would overlap the representations of window groups (or portion thereof) by more than a threshold amount, e.g., due to the respective window being moving or resized, automatically unclutters the display (without further input directed to the representations of window groups) and provides for efficient viewing and interacting with a plurality of open windows on the same (limited) screen, thereby reducing the number of inputs needed to perform an operation.

In some embodiments, while the at least some of the plurality of representations are partially visible, the computer system detects (2338) a hover input that is a threshold distance away from the at least some of the plurality of representations of window groups. In response to detecting the hover input, the computer system moves (or shifting) the at least some of the plurality of representations of window groups back towards a center of the region for interacting with windows (e.g., moving towards the center of the stage region or at least in that direction) of the display generation component. For example, in FIG. 15S, if the user input hovers over the partially visible window grouping representations, the representations are moved back onto the screen, as shown in FIG. 15K. In some embodiments, when representation of groups of windows are minimized or pushed aside, a hover input directed to the representations of the window groups causes the representations of the window groups to shift back toward a center of the display. When representations of window groups have been moved away to be make room for an enlarged window displayed in the main interaction region (e.g., representations of window groups can be partially visible), a hover input directed to the representation(s) of the window groups causes the representations of at least one window groups to be redisplayed and to moved back toward a center of the display, thereby providing for efficient viewing and interacting with a plurality of open windows on the same (limited) screen and reducing the number of inputs needed to perform an operation.

In some embodiments, the plurality of representations of window groups displayed in the region for switching window groups move (2340) together (e.g., as shown in FIG. 15S). In some embodiments, the whole region for switching window groups is revealed or moved back towards the center, including the plurality of representations of window groups displayed in the region (e.g., as shown in FIG. 15K). When representations of window groups have been moved away to make room for an enlarged window displayed in the main interaction region (e.g., representations of window groups can be partially visible), a hover input directed to one or more of the representations of the window groups causes the representations of the window groups to be redisplayed and to move back toward together towards a center of the display (e.g., the whole region including the representations of window groups), thereby providing for efficient viewing and interacting with a plurality of open windows on the same (limited) screen and reducing the number of inputs needed to perform an operation.

In some embodiments, the input that selects the first representation of the first window group and makes the first window group active includes (2342) an input corresponding to a request to drag an object over the first representation of the first window group (e.g., so that the object can be dropped in the first or second window of the first window group that are displayed in the stage region in response to dragging the over) (e.g., as shown in FIG. 15K, an object 1540 is dragged over a window group 1542). In some embodiments, the object does not have to be dropped before the first window group becomes active, e.g., hovering over the first representation of the first window group with the object is sufficient to make the first window group active (e.g., as shown in FIG. 15L). Causing the electronic device to make windows included in a respective window group active in response to detecting that an object is being dragged over the representation of the respective window group, provides mechanism for adding an object to a window that was previously inactive, thereby reducing the number of inputs needed to perform an operation.

In some embodiments, wherein the plurality of representations of window groups are displayed in a region for switching window groups. The computer system detects (2344) an input selecting a setting for hiding the region (e.g., left strip 566 in FIG. 15L) for switching groups. In response to detecting the input selecting the setting: ceasing to display the region for switching window groups. In some embodiments, the region for switching groups can be hidden in accordance with selecting a respective setting. In some embodiments, the left strip or sidebar that includes window groupings can be hidden by default and quickly redisplayed in response an input that is in proximity, threshold distance away, crossing or touching an edge of the display that corresponds to the side of where the region for switching groups is located. For example, if the region for switching groups is located on the left side, such as the left strip, then moving a focus selector to the edge of the display on the left side causes the region for switching window groups, including the plurality of representations of window groups to be redisplayed. Maintaining a sidebar including representation of window groups hidden in response to user selection of a setting, provides further control options over open windows and/or window groupings, thereby reducing the number of inputs needed to perform an operation.

In some embodiments, while the region for switching groups is hidden, the computer system detects (2346) an input requesting redisplay of the region for switching groups. In response to detecting the input requesting redisplay of the region for switching groups, the computer system reveals the region for switching groups. In response to detecting the input requesting redisplay of the region for switching groups and in accordance with a determination that the revealed region for switching groups would overlap area of display that is occupied by an open window, the computer system slides the open window so that the open window no longer overlaps the area of the display. In some embodiments, the window slides partially off of the display (e.g., the sidebar expands on to the display from the left edge moving to the right, and the window slides to the right off of the right edge of the display. Moving a window displayed in the main interaction region out of the way of an expanded or expanding sidebar, which includes multiple representations of window groupings, unclutters the display and reduces the number of inputs needed to perform an operation.

In some embodiments, in accordance with a determination that the region for switching window groups is hidden by default, windows displayed in the region for interacting with windows have (2348) a larger default size that compared to if the region for switching window groups is not hidden by default (e.g., the stage region can be larger when the left or right strips are hidden when not in use). Maintaining a larger default size for windows displayed in the main interaction region when a sidebar region including window group representations is hidden by default, provides improved visual feedback to the user and improves interaction with active windows displayed in the main interaction region.

In some embodiments, in accordance with a determination that the first window or the second window in the interactive mode is switched to a full-screen display, the computer system ceases (2350) display of the region for switching between window groups (including ceasing display of the plurality of representation of window groups) (e.g., ceasing display of the left strip) and ceasing display of the region for switching windows (including ceasing display of the remainder of the first set of one or more windows that are associated with the window in full-screen mode and would otherwise be displayed in the region for switching windows) (e.g., ceasing display of the right strip). For example, this is shown in Figures KI-KJ where a user input enlarges window 1610 to a full screen view, and the left strip of window grouping representations is removed from the display. In some embodiments, an input towards an edge of the display can redisplay the region for switching between window groups or the region for switching windows. Hiding sidebar regions including representations of window groups and/or representations of inactive windows when a window is displayed in full-screen in the main interaction region, unclutters the display and provides for efficient viewing and interacting with one window of a plurality of open windows on the same screen, thereby reducing the number of inputs needed to perform an operation.

In some embodiments, the plurality of representations of window groups are (2352) displayed in a simulated depth relative to a background user interface. For example, representation of windows included in the plurality of representations of window groups are displayed to appear skewed relative to the background interface and/or other coloring and/or shadows can be used to cause a visual effect of depth, such that "bottom" window representations appear closer to the background user interface and "top" window representation appear further away from the background user interface. This visual effect can be seen throughout the Figures, e.g., window group representation 820 in FIG. 8K. Displaying representation of windows groups tilted in a simulated depth of the user interface (e.g., shown with skewed windows, darkening, and/or shadows) provides improved visual feedback to the user.

In some embodiments, icons displayed in the region for switching window groups are (2354) displayed with a visual effect (e.g., a tint and/or shadow) based on desktop background. Displaying icons displayed in the region for switching window groups with a visual effect based on a desktop background provides improved visual feedback to the user (e.g., by improving user's ability to recognize and select application icons related to window groupings).

In some embodiments, the computer system removes (2356) the visual effect in response to detecting a user input that hovers over the icons. Removing visual effects from icons in response to detecting a user input that hovers over the icons provides improved visual feedback to the user (e.g., by indicating to the user that electronic device responds to the user input).

In some embodiments, making the first window group active includes (2358): in accordance with a determination that the input selecting the first representation is directed to a (reduced scale) representation of a first window of the first set of two or more windows that are included in the first representation of the first window group, displaying the first window in an interactive mode in a region for interacting with windows (e.g., a main interaction region for manipulating window content, such as the stage region) and displaying representations of other windows of the first set of one or more windows in a non-interactive mode in a region for switching windows. For example, reduced scale representations, minimized versions, or thumbnails of other inactive windows of the first set of one or more windows are displayed in non-interactive mode in a sidebar region (e.g., the right strip, a window switcher sidebar, or the left strip if the left strip combines an application switcher and a window switcher), such that windows displayed in the non-interactive mode need to be selected, activated, and/or displayed in the stage region first before their content can be manipulated. For example, in FIG. 17E, if the user selects the middle window under the input arrow in the second window grouping representation, just that window can be displayed in the stage region while the first and second windows in the grouping are displayed in the right strip 556*b*. In some embodiments, the region for switching windows is optionally on an opposite side of the region for switching groups (or an application switcher region)). The computer system detects an input selecting a representation of a second window from the other windows of the first set of one or more windows displayed in the non-interactive mode in the region for switching windows. In response to detecting the input selecting the second window from the other windows of the first set of one or more windows displayed in the non-interactive mode in the region for switching windows, replacing the first window with the second window and maintaining display of the other windows of the first set of windows displayed in the non-interactive mode in the region for switching windows (that optionally includes a representation of the first window displayed in the non-interactive mode). For example, in FIG. 7B, if the user then selects 712 a window representation 708 from the right strip, the associated window is displayed in the stage region and the window that was previously in the stage region is moved to the right strip, as shown in FIG. 7C. When selecting an inactive window from a window switcher region (a sidebar, such as the right strip or the left strip if the left strip combines the application switcher and the window switcher), replacing window in the stage region that was active with the selected window from the window switcher region while maintaining display of representations other inactive windows in the window switcher, thereby reduces the number of inputs needed to perform an operation.

In some embodiments, maintaining display of the other windows of the first set of windows displayed in the non-interactive mode in the region for switching windows includes (2360) displaying a representation of the first window in the region for switching windows, where the first window is displayed in the non-interactive mode. When selecting an inactive window from a window switcher region (a sidebar, such as the right strip or the left strip if the left strip combines the application switcher and the window switcher), replacing window in the stage region that was active with the selected window from the window switcher region while maintaining display of representations other inactive windows in the window switcher, including a representation of the replaced window, thereby reduces the number of inputs needed to perform an operation.

It should be understood that the particular order in which the operations in FIGS. 23A-23E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1800, 1900, 2000, 2100, and 2300 are also applicable in an analogous manner to method 800 described above with respect to FIGS. 23A-23E.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

What is claimed is:

1. A method, comprising:

at a computer system that is in communication with a display generation component and one or more input devices:

concurrently, via the display generation component:

displaying, in a first region where interactive windows are displayed, a first set of two or more windows in an interactive mode, wherein, while a window is displayed in an interactive mode, content of the window can be manipulated in response to user inputs; and displaying, in a second region where non-interactive windows are displayed, a representation of a second set of two or more windows in a non-interactive mode, wherein, while a representation of a window is displayed in a non-interactive mode, content of the window is not available to be manipulated in response to user inputs, wherein the second set of two or more windows is different from the first set of two or more windows;

detecting, at the display generation component, an input directed to the representation of the second set of two or more windows, thereby selecting the representation of the second set of two or more windows in the non-interactive mode; and in response to detecting the input directed to the representation of the second set of two or more windows:

ceasing to display the first set of two or more windows in the first region where interactive windows are displayed;

ceasing to display the representation of the second set of two or more windows in the second region where non-interactive windows are displayed; and concurrently displaying, via the display generation component:

two or more of the second set of two or more windows in the first region where interactive windows are displayed; and a representation of the first set of two or more windows in the second region where non-interactive windows are displayed.

2. The method of claim 1, wherein:

the representation of the second set of two or more windows corresponds to a first window grouping, and the representation of the first set of two or more windows corresponds to a second window grouping;

prior to detecting the input selecting the representation of the first window grouping, displaying one or more representations of windows of a third set of one or more windows concurrently with the first set of two or more windows and the first window grouping, wherein the third set of one or more windows is associated with the first set of two or more windows and the third set of one or more windows is displayed in the non-interactive mode in a third region where non-interactive windows are displayed, wherein the third region is different from the first region where interactive windows are displayed and the second display region where non-interactive windows are displayed; and in response to detecting the input selecting the representation of the first window grouping:

in accordance with a determination that the second set of two or more windows was displayed in the interactive mode when the second window grouping was active:

redisplaying the second set of two or more windows in the interactive mode in the first region where interactive windows are displayed without displaying representations of windows in the third region where non-interactive windows are displayed.

3. The method of claim 1, including further comprising:

while concurrently displaying the two or more of the second set of two or more windows in the first region where interactive windows are displayed and the representation of the first set of two or more windows in the second region where non-interactive windows are displayed, detecting a second user input that corresponds to a request to insert a first window of the first set of two or more windows in the first region where interactive windows are displayed; and in response to detecting the second user input:

associating the first window with the second set of two or more windows; and displaying the first window concurrently with the one or more of the second set of two or more windows in the first region where interactive windows are displayed.

4. The method of claim 1, wherein the second region where non-interactive windows are displayed includes representations of a plurality of window groupings, including the representation of the second set of two or more windows or the representation of the first set of two or more windows.

5. The method of claim 4, wherein the representations of the plurality of window groupings are displayed in the second region in an order sorted by recency of use of the plurality of window groupings.

6. The method of claim 4, wherein a first window grouping of the plurality of window groupings includes windows of a first application, and a second window grouping of the plurality of window groupings includes windows of a second application different from the first application.

7. The method of claim 4, wherein windows included in a first window grouping are grouped at least partially in response to a prior user input, wherein the first window grouping includes a first window from a first application and a second window from a second application different from the first application.

8. The method of claim 1, wherein:

the representation of the second set of two or more windows corresponds to a first window grouping of a plurality of window groupings included in an application switcher interface, and the representation of the first set of two or more windows corresponds to a second window grouping of the plurality of window groupings; and the method includes:

while displaying a first user interface including the one or more of the second set of two or more windows displayed in the interactive mode in the first display region where interactive windows are displayed and the representation of the first set of two or more windows displayed in the second region where non-interactive windows are displayed, detecting a swipe input moving in a first direction; and in response to detecting the swipe input moving in the first direction:

displaying the application switcher interface including representations of the plurality of window groupings.

9. The method of claim 1, including:

in response to detecting the input directed to the representation of the second set of two or more windows, concurrently displaying, via the display generation component:

two or more of the second set of two or more windows in the first region where interactive windows are displayed and representations of one or more other windows of the second set of two or more windows in a region where non-interactive windows are displayed, wherein content of the one or more other windows of the second set of two or more windows is not available to be manipulated in response to user inputs and the one or more other windows are associated with the one or more of the second set of two or more windows.

10. The method of claim 9, including:

while displaying, in the first region where interactive windows are displayed, a third window of the second set of two or more windows in the interactive mode and, in the second region where non-interactive windows are displayed, the one or more other windows of the second set of two or more windows in the non-interactive mode, detecting an input directed to a fourth window of the one or more other windows of the second set of two or more windows, wherein the third window is displayed at a first size;

in response to detecting the input directed to the fourth window:

activating the fourth window, including displaying, in the first region where interactive windows are displayed, the fourth window in the interactive mode at a size that the fourth window was previously displayed in the interactive mode; and displaying, in the second region where non-interactive windows are displayed, a reduced scale representation of the third window in the non-interactive mode;

detecting an input directed to the reduced scale representation of the third window; and in response to detecting the input directed to the reduced scale representation of the third window:

redisplaying, in the first region where interactive windows are displayed, the third window at the first size in the interactive mode.

11. The method of claim 9, wherein the one or more other windows of the second set of two or more windows are included in a window switcher interface for open windows associated with windows in the interactive mode, and the method includes:

while displaying the one or more of the second set of two or more windows in the interactive mode, detecting a swipe input moving in a respective direction; and in response to detecting the swipe input moving in the respective direction:

displaying the window switcher interface, including representations of the one or more other windows of the second set of two or more windows.

12. The method of claim 1, including:

in response to detecting the input directed to the representation of the second set of two or more windows:

displaying representations of one or more other windows of the second set of two or more windows in a third region where non-interactive windows are displayed, wherein the third region is different from the first region where interactive windows are displayed and the second region where non-interactive windows are displayed, and the one or more other windows of the second set of two or more windows is not available to be manipulated in response to user inputs and the one or more other windows are associated with the one or more of the second set of two or more windows.

13. The method of claim 12, wherein, prior to detecting the input directed to the representation of the second set of two or more windows, the first set of two or more windows is displayed in the first region where interactive windows are displayed concurrently with a third set of one or more windows associated with the first set of two or more windows, wherein the third set of one or more windows is displayed in the non-interactive mode in the third region where non-interactive windows are displayed; and after detecting the input directed to the representation of the second set of two or more windows, the representation of the first set of two or more windows displayed in the second region where non-interactive windows are displayed mode further includes the third set of one or more windows.

14. The method of claim 1, wherein a first window of the second set of two or more windows is associated with a first application; and the method includes:

while displaying, in the first region where interactive windows are displayed, the first window in the interactive mode, detecting an input opening a second window; and in response to detecting the input opening the second window:

in accordance with a determination that the second window is associated with the first application and that the second window is a sibling window of the first window, replacing display of the first window with display of the second window in the first region where interactive windows are displayed.

15. The method of claim 14, wherein:

in response to detecting the input opening the second window:

in accordance with a determination that the second window is associated with the first application and that the second window is a child window of the first window, concurrently displaying, in the first region where interactive windows are displayed, the second window and the first window in the interactive mode.

16. The method of claim 1, wherein the representation of the second set of two or more windows corresponds to a first window grouping and windows included in the first window grouping are grouped at least partially in response to a prior user input, wherein the first window grouping includes a first window from a first application and a second window from a second application different from the first application.

17. The method of claim 16, including:

while displaying the first window from the first application and the second window from the second application in the interactive mode in the first region where interactive windows are displayed and one or more other windows of the second set of two or more windows in the non-interactive mode in the second region where non-interactive windows are displayed, detecting an input removing the second window from the first window grouping; and in response to detecting the input removing the second window from the first window grouping, removing at least one window from the one or more other windows of the second set of two or more windows that are associated with the second application.

18. The method of claim 17, including:

adding the second window to a third window grouping that includes the at least one window from the one or more other windows of the second set of two or more windows that are associated with the second application.

19. The method of claim 1, wherein the representation of the first set of two or more windows includes windows associated with a first application and the representation of the second set of two or more windows includes windows associated with a second application different from the first application.

20. The method of claim 1, wherein:

the first set of two or more windows corresponds to a first window grouping, and the second set of two or more windows corresponds to a second window grouping;

while the first window grouping is active, displaying a representation of the second window grouping in a display region for switching window groupings that includes representations of a plurality of window groupings;

detecting an input directed to the display region for switching window groupings; and in response to detecting the input directed to the display region for switching window groupings:

displaying the representations of the plurality of window groupings, including previously undisplayed representations included in the display region for switching window groupings.

21. The method of claim 1, wherein the first set of two or more windows and the second set of two or more windows are associated with a first virtual workspace that operates in a concentration mode.

22. The method of claim 21, wherein the computer system is associated with a plurality of virtual workspaces, including the first virtual workspace that operates in the concentration mode and a second virtual workspace that operates in a second mode different from the concentration mode.

23. The method of claim 1, including:

in response to the input directed to the representation of the second set of two or more windows:

moving the first set of two or more windows from the first region where interactive windows are displayed to the second region where non-interactive windows are displayed; and moving the second set of two or more windows from the second region where non-interactive windows are displayed to the first region where interactive windows are displayed.

24. The method of claim 1, including:

in response to the input directed to the representation of the second set of two or more windows:

swapping the first set of two or more windows with the second set of two or more windows in the first region where interactive windows are displayed; and swapping the representation of the second set of two or more windows with the representation of the first set of two or more windows in the second region where non-interactive windows are displayed.

25. A computer system that is in communication with a display generation component and one or more input devices, the computer system comprising:

one or more processors; and memory storing one or more programs, wherein the one or more programs are configured to be executed by the one or more processors, the one or more programs including instructions for:

concurrently, via the display generation component:

displaying, in a first region where interactive windows are displayed, a first set of two or more windows in an interactive mode, wherein, while a window is displayed in an interactive mode, content of the window can be manipulated in response to user inputs; and displaying, in a second region where non-interactive windows are displayed, a representation of a second set of two or more windows in a non-interactive mode, wherein, while a representation of a window is displayed in a non-interactive mode, content of the window is not available to be manipulated in response to user inputs;

detecting, at the display generation component, an input directed to the representation of the second set of two or more windows, thereby selecting the representation of the second set of two or more windows; and in response to detecting the input directed to the representation of the second set of two or more windows:

ceasing to display the first set of two or more windows in the first region where interactive windows are displayed;

ceasing to display the representation of the second set of two or more windows in the second region where non-interactive windows are displayed; and concurrently displaying, via the display generation component:

two or more of the second set of two or more windows in the first region where interactive windows are displayed; and a representation of the first set of two or more windows in the second region where non-interactive windows are displayed.

26. The computer system of claim 25, wherein the one or more programs include instructions for:

while concurrently displaying the two or more of the second set of two or more windows in the first region where interactive windows are displayed and the representation of the first set of two or more windows in the second region where non-interactive windows are displayed, detecting a second user input that corresponds to a request to insert a first window of the first set of two or more windows in the first region where interactive windows are displayed; and in response to detecting the second user input:

associating the first window with the second set of two or more windows; and displaying the first window concurrently with the one or more of the second set of two or more windows in the first region where interactive windows are displayed.

27. The computer system of claim 25, wherein the second region where non-interactive windows are displayed includes representations of a plurality of window groupings, including the representation of the second set of two or more windows or the representation of the first set of two or more windows.

28. The computer system of claim 25, wherein:

the representation of the second set of two or more windows corresponds to a first window grouping of a plurality of window groupings included in an application switcher interface, and the representation of the first set of two or more windows corresponds to a second window grouping of the plurality of window groupings; and the one or more programs include instructions for:

while displaying a first user interface including the one or more of the second set of two or more windows displayed in the interactive mode in the first region where interactive windows are displayed and the representation of the first set of two or more windows displayed in the second region where non-interactive windows are displayed, detecting a swipe input moving in a first direction; and in response to detecting the swipe input moving in the first direction:

displaying the application switcher interface including representations of the plurality of window groupings.

29. The computer system of claim 25, wherein the one or more programs include instructions for:

while displaying, in the first region where interactive windows are displayed, a third window of the second set of two or more windows in the interactive mode and, in the second region where non-interactive windows are displayed, one or more other windows of the second set of two or more windows in the non-interactive mode, detecting an input directed to a fourth window of the one or more other windows of the second set of two or more windows, wherein the third window is displayed at a first size;

in response to detecting the input directed to the fourth window:

activating the fourth window, including displaying, in the first region where interactive windows are displayed, the fourth window in the interactive mode at a size that the fourth window was previously displayed in the interactive mode; and displaying, in the second region where non-interactive windows are displayed, a reduced scale representation of the third window in the non-interactive mode;

detecting an input directed to the reduced scale representation of the third window; and in response to detecting the input directed to the reduced scale representation of the third window:

redisplaying, in the first region where interactive windows are displayed, the third window at the first size in the interactive mode.

30. The computer system of claim 25, wherein one or more other windows of the second set of two or more windows are included in a window switcher interface for open windows associated with windows in the interactive mode, and the one or more programs include instructions for:

while displaying the one or more of the second set of two or more windows in the interactive mode, detecting a swipe input moving in a respective direction; and in response to detecting the swipe input moving in the respective direction:

displaying the window switcher interface, including representations of the one or more other windows of the second set of two or more windows.

31. The computer system of claim 25, wherein a first window of the second set of two or more windows is associated with a first application, and the one or more programs include instructions for:

while displaying, in the first region where interactive windows are displayed, the first window in the interactive mode, detecting an input opening a second window; and in response to detecting the input opening the second window:

in accordance with a determination that the second window is associated with the first application and that the second window is a sibling window of the first window, replacing display of the first window with display of the second window in the first region where interactive windows are displayed.

32. The computer system of claim 31, wherein the one or more programs include instructions for:

in response to detecting the input opening the second window:

in accordance with a determination that the second window is associated with the first application and that the second window is a child window of the first window, concurrently displaying, in the first region where interactive windows are displayed, the second window and the first window in the interactive mode.

33. The computer system of claim 25, wherein:

the first set of two or more windows corresponds to a first window grouping, and the second set of two or more windows corresponds to a second window grouping; and the one or more programs include instructions for:

while the first window grouping is active, displaying a representation of the second window grouping in a display region for switching window groupings that includes representations of a plurality of window groupings;

detecting an input directed to the display region for switching window groupings; and in response to detecting the input directed to the display region for switching window groupings:

displaying the representations of the plurality of window groupings, including previously undisplayed representations included in the display region for switching window groupings.

34. The computer system of claim 25, wherein the one or more programs include instructions for:

in response to the input directed to the representation of the second set of two or more windows:

moving the first set of two or more windows from the first region where interactive windows are displayed to the second region where non-interactive windows are displayed; and moving the second set of two or more windows from the second region where non-interactive windows are displayed to the first region where interactive windows are displayed.

35. The computer system of claim 25, wherein the one or more programs include instructions for:

in response to the input directed to the representation of the second set of two or more windows:

swapping the first set of two or more windows with the second set of two or more windows in the first region where interactive windows are displayed; and swapping the representation of the second set of two or more windows with the representation of the first set of two or more windows in the second region where non-interactive windows are displayed.

36. A non-transitory computer readable storage medium storing one or more programs, the one or more programs comprising instructions that, when executed by a computer system that is in communication with a display generation component and one or more input devices, cause the computer system to:

concurrently, via the display generation component:

display, in a first region where interactive windows are displayed, a first set of two or more windows in an interactive mode, wherein, while a window is displayed in an interactive mode, content of the window can be manipulated in response to user inputs; and display, in a second region where non-interactive windows are displayed, a representation of a second set of two or more windows in a non-interactive mode, wherein, while a representation of a window is displayed in a non-interactive mode, content of the window is not available to be manipulated in response to user inputs;

detect, at the display generation component, an input directed to the representation of the second set of two or more windows, thereby selecting the representation of the second set of two or more windows; and in response to detecting the input directed to the representation of the second set of two or more windows:

cease to display the first set of two or more windows in the first region where interactive windows are displayed;

cease to display the representation of the second set of two or more windows in the second region where non-interactive windows are displayed; and concurrently display, via the display generation component:

two or more of the second set of two or more windows in the first region where interactive windows are displayed; and a representation of the first set of two or more windows in the second region where non-interactive windows are displayed.

37. The non-transitory computer readable storage medium of claim 36, wherein the one or more programs include instructions that, when executed by the computer system, cause the computer system to:

while concurrently displaying the two or more of the second set of two or more windows in the first region where interactive windows are displayed and the representation of the first set of two or more windows in the second region where non-interactive windows are displayed, detect a second user input that corresponds to a request to insert a first window of the first set of two or more windows in the first region where interactive windows are displayed; and in response to detecting the second user input:

associate the first window with the second set of two or more windows; and display the first window concurrently with the one or more of the second set of two or more windows in the first region where interactive windows are displayed.

38. The non-transitory computer readable storage medium of claim 36, wherein the second region where non-interactive windows are displayed includes representations of a plurality of window groupings, including the representation of the second set of two or more windows or the representation of the first set of two or more windows.

39. The non-transitory computer readable storage medium of claim 36, wherein:

the representation of the second set of two or more windows corresponds to a first window grouping of a plurality of window groupings included in an application switcher interface and the representation of the first set of two or more windows corresponds to a second window grouping of the plurality of window groupings; and the one or more programs include instructions that, when executed by the computer system, cause the computer system to:

while displaying a first user interface including the one or more of the second set of two or more windows displayed in the interactive mode in the first region where interactive windows are displayed and the representation of the first set of two or more windows displayed in the second region where non-interactive windows are displayed, detect a swipe input moving in a first direction; and in response to detecting the swipe input moving in the first direction:

display the application switcher interface including representations of the plurality of window groupings.

40. The non-transitory computer readable storage medium of claim 36, wherein the one or more programs include instructions that, when executed by the computer system, cause the computer system to:

while displaying, in the first region where interactive windows are displayed, a third window of the second set of two or more windows in the interactive mode and, in the second region where non-interactive windows are displayed, one or more other windows of the second set of two or more windows in the non-interactive mode, detect an input directed to a fourth window of the one or more other windows of the second set of two or more windows, wherein the third window is displayed at a first size;

in response to detecting the input directed to the fourth window:

activate the fourth window, including displaying, in the first region where interactive windows are displayed, the fourth window in the interactive mode at a size that the fourth window was previously displayed in the interactive mode; and display, in the second region where non-interactive windows are displayed, a reduced scale representation of the third window in the non-interactive mode;

detect an input directed to the reduced scale representation of the third window; and in response to detecting the input directed to the reduced scale representation of the third window:

redisplay, in the first region where interactive windows are displayed, the third window at the first size in the interactive mode.

41. The non-transitory computer readable storage medium of claim 36, wherein one or more other windows of the second set of two or more windows are included in a window switcher interface for open windows associated with windows in the interactive mode, and the one or more programs include instructions that, when executed by the computer system, cause the computer system to:

while displaying the one or more of the second set of two or more windows in the interactive mode, detect a swipe input moving in a respective direction; and in response to detecting the swipe input moving in the respective direction:

display the window switcher interface, including representations of the one or more other windows of the second set of two or more windows.

42. The non-transitory computer readable storage medium of claim 36, wherein a first window of the second set of two or more windows is associated with a first application, and the one or more programs include instructions that, when executed by the computer system, cause the computer system to:

while displaying, in the first region where interactive windows are displayed, the first window in the interactive mode, detect an input opening a second window; and in response to detecting the input opening the second window:

in accordance with a determination that the second window is associated with the first application and that the second window is a sibling window of the first window, replace display of the first window with display of the second window in the first region where interactive windows are displayed.

43. The non-transitory computer readable storage medium of claim 42, wherein the one or more programs include instructions that, when executed by the computer system, cause the computer system to:

in response to detecting the input opening the second window:

in accordance with a determination that the second window is associated with the first application and that the second window is a child window of the first window, concurrently display, in the first region where interactive windows are displayed, the second window and the first window in the interactive mode.

44. The non-transitory computer readable storage medium of claim 36, wherein:

the first set of two or more windows corresponds to a first window grouping, and the second set of two or more windows corresponds to a second window grouping; and the one or more programs include instructions that, when executed by the computer system, cause the computer system to:

while the first window grouping is active, display a representation of the second window grouping in a display region for switching window groupings that includes representations of a plurality of window groupings;

detect an input directed to the display region for switching window groupings; and in response to detecting the input directed to the display region for switching window groupings:

display the representations of the plurality of window groupings, including previously undisplayed representations included in the display region for switching window groupings.

45. The non-transitory computer readable storage medium of claim 36, wherein the one or more programs include instructions that, when executed by the computer system, cause the computer system to:

in response to the input directed to the representation of the second set of two or more windows:

move the first set of two or more windows from the first region where interactive windows are displayed to the second region where non-interactive windows are displayed; and move the second set of two or more windows from the second region where non-interactive windows are displayed to the first region where interactive windows are displayed.

46. The non-transitory computer readable storage medium of claim 36, wherein the one or more programs include instructions that, when executed by the computer system, cause the computer system to:

in response to the input directed to the representation of the second set of two or more windows:

swap the first set of two or more windows with the second set of two or more windows in the first region where interactive windows are displayed; and swap the representation of the second set of two or more windows with the representation of the first set of two or more windows in the second region where non-interactive windows are displayed.

* * * * *